US012111607B2

(12) United States Patent
Fukui et al.

(10) Patent No.: US 12,111,607 B2
(45) Date of Patent: Oct. 8, 2024

(54) ELECTROPHOTOGRAPHIC IMAGE FORMING APPARATUS AND CARTRIDGE

(71) Applicant: CANON KABUSHIKI KAISHA, Tokyo (JP)

(72) Inventors: Yuichi Fukui, Kanagawa (JP); Shinjiro Toba, Kangawa (JP); Takeo Kawanami, Kanagawa (JP); Shinichi Nishida, Kanagawa (JP); Yasuyuki Egami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/377,859

(22) Filed: Oct. 9, 2023

(65) Prior Publication Data

US 2024/0036513 A1 Feb. 1, 2024

Related U.S. Application Data

(60) Division of application No. 17/464,821, filed on Sep. 2, 2021, now Pat. No. 11,829,100, which is a (Continued)

(30) Foreign Application Priority Data

Mar. 18, 2019 (JP) ................................ 2019-050356
Mar. 18, 2019 (JP) ................................ 2019-050357

(51) Int. Cl.
*G03G 21/16* (2006.01)
*G03G 21/18* (2006.01)

(52) U.S. Cl.
CPC ..... *G03G 21/1814* (2013.01); *G03G 21/1821* (2013.01)

(58) Field of Classification Search
CPC ........... G03G 21/1803; G03G 21/1807; G03G 21/1814; G03G 21/1817; G03G 21/1821; G03G 21/1825
See application file for complete search history.

(56) References Cited

U.S. PATENT DOCUMENTS 6,029,027 A 2/2000 Yokomori et al.
6,424,811 B1 7/2002 Tsuda et al.
(Continued)

FOREIGN PATENT DOCUMENTS

CN 1205459 A 1/1999
CN 1523458 A 8/2004
(Continued)

OTHER PUBLICATIONS

Apr. 11, 2024 Examination Report in Australian Patent Application No. 2023203164.

(Continued)

*Primary Examiner* — Hoang X Ngo
(74) *Attorney, Agent, or Firm* — Venable LLP

(57) ABSTRACT

A cartridge includes a photosensitive member, a charging member capable of charging the photosensitive member, and a developing member for depositing toner onto the photosensitive member. A unit includes the developing member and is movable between a developing position in which the toner is capable of being deposited onto the photosensitive member from the developing member and a spaced position in which at least a part of the developing member is spaced from the photosensitive member. The cartridge further includes a contact force receiving portion for receiving a contact force for moving the unit to the developing position when the unit is in the spaced position. The cartridge also includes a spacing force receiving portion for receiving a spacing force for moving the unit to the spaced position when the unit is in the developing position.

51 Claims, 245 Drawing Sheets

Related U.S. Application Data continuation of application No. PCT/JP2020/012812, filed on Mar. 17, 2020.

(56) References Cited

U.S. PATENT DOCUMENTS

| | | | |
|---|---|---|---|
| 6,519,431 | B1 | 2/2003 | Toba et al. |
| 6,542,706 | B2 | 4/2003 | Toba et al. |
| 6,549,736 | B2 | 4/2003 | Miyabe et al. |
| 6,603,939 | B1 | 8/2003 | Toba et al. |
| 6,678,488 | B2 | 1/2004 | Toba et al. |
| 6,836,629 | B2 | 12/2004 | Miyabe et al. |
| 6,937,834 | B2 | 8/2005 | Kanno et al. |
| 6,990,302 | B2 | 1/2006 | Toba |
| 7,149,457 | B2 | 12/2006 | Miyabe et al. |
| 7,158,736 | B2 | 1/2007 | Sato et al. |
| 7,164,875 | B2 | 1/2007 | Miyabe et al. |
| 7,194,225 | B2 | 3/2007 | Yamaguchi |
| 7,212,768 | B2 | 5/2007 | Numagami et al. |
| 7,218,882 | B2 | 5/2007 | Toba et al. |
| 7,224,925 | B2 | 5/2007 | Sato et al. |
| 7,248,810 | B2 | 7/2007 | Miyabe et al. |
| 7,349,657 | B2 | 3/2008 | Sato et al. |
| 7,412,193 | B2 | 8/2008 | Sato et al. |
| 7,463,844 | B2 | 12/2008 | Hashimoto et al. |
| 7,509,071 | B2 | 3/2009 | Yoshimura et al. |
| 7,567,769 | B2 | 7/2009 | Noguchi et al. |
| 7,715,746 | B2 | 5/2010 | Tanabe et al. |
| 7,761,024 | B2 | 7/2010 | Imaizumi et al. |
| 7,773,911 | B2 | 8/2010 | Kawamura |
| 7,860,433 | B2 | 12/2010 | Toba et al. |
| 7,865,115 | B2 | 1/2011 | Oguma et al. |
| 7,894,733 | B2 | 2/2011 | Tanabe et al. |
| 7,907,866 | B2 | 3/2011 | Imaizumi et al. |
| 7,953,340 | B2 | 5/2011 | Tanabe et al. |
| 8,145,095 | B2 | 3/2012 | Sakurai et al. |
| 8,175,487 | B2 | 5/2012 | Imaizumi et al. |
| 8,213,831 | B2 | 7/2012 | Toba et al. |
| 8,301,054 | B2 | 10/2012 | Tanabe et al. |
| 8,442,412 | B2 | 5/2013 | Imaizumi et al. |
| 8,463,157 | B2 | 6/2013 | Sakurai et al. |
| 8,521,060 | B2 | 8/2013 | Numata et al. |
| 8,626,031 | B2 | 1/2014 | Toba et al. |
| 8,712,284 | B2 | 4/2014 | Toba et al. |
| 8,843,023 | B2 | 9/2014 | Fujinaka et al. |
| 8,862,014 | B2 | 10/2014 | Imaizumi et al. |
| 8,873,996 | B1 | 10/2014 | Buchanan et al. |
| 8,879,944 | B2 | 11/2014 | Takarada et al. |
| 8,879,954 | B2 | 11/2014 | Nonaka et al. |
| 8,909,096 | B2 | 12/2014 | Fukui et al. |
| 8,983,335 | B2 | 3/2015 | Yamashita et al. |
| 9,002,230 | B2 | 4/2015 | Imaizumi et al. |
| 9,025,998 | B2 | 5/2015 | Morioka et al. |
| 9,052,640 | B2 | 6/2015 | Kashiide et al. |
| 9,122,240 | B2 | 9/2015 | Hashimoto |
| 9,182,703 | B1 | 11/2015 | Sato |
| 9,188,940 | B2 | 11/2015 | Fukui et al. |
| 9,213,266 | B2 | 12/2015 | Toba |
| 9,223,242 | B2 | 12/2015 | Suzuki et al. |
| 9,274,489 | B2 | 3/2016 | Takarada et al. |
| 9,274,494 | B2 | 3/2016 | Shiraki |
| 9,291,994 | B2 | 3/2016 | Kanno et al. |
| 9,304,488 | B2 | 4/2016 | Toba et al. |
| 9,367,025 | B2 | 6/2016 | Takarada et al. |
| 9,429,902 | B2 | 8/2016 | Kim et al. |
| 9,429,906 | B2 | 8/2016 | Yoshimura et al. |
| 9,541,863 | B2 | 1/2017 | Kashiide et al. |
| 9,575,437 | B2 | 2/2017 | Oba et al. |
| 9,688,008 | B2 | 6/2017 | Takarada et al. |
| 9,720,374 | B2 | 8/2017 | Kanno et al. |
| 9,727,021 | B2 | 8/2017 | Fukui et al. |
| 9,733,612 | B2 | 8/2017 | Toba et al. |
| 9,836,020 | B2 | 12/2017 | Yoshimura et al. |
| 10,168,664 | B2 | 1/2019 | Yoshimura et al. |
| 10,289,066 | B2 | 5/2019 | Takahashi et al. |
| 10,353,339 | B2 | 7/2019 | Koishi et al. |
| 10,401,788 | B2 | 9/2019 | Yoshimura et al. |
| 10,591,868 | B2 | 3/2020 | Yoshimura et al. |
| 10,705,481 | B2 | 7/2020 | Sugimoto et al. |
| 10,739,723 | B2 | 8/2020 | Takahashi et al. |
| 11,156,954 | B2 | 10/2021 | Yoshimura et al. |
| 2004/0184835 | A1 | 9/2004 | Park |
| 2007/0071495 | A1 | 3/2007 | Hashimoto et al. |
| 2007/0160386 | A1 | 7/2007 | Kawamura |
| 2008/0138107 | A1 | 6/2008 | Mori et al. |
| 2009/0214230 | A1 | 8/2009 | Kweon et al. |
| 2011/0311272 | A1 | 12/2011 | Nitani et al. |
| 2012/0070186 | A1 | 3/2012 | Kikuchi et al. |
| 2012/0201567 | A1 | 8/2012 | Toba et al. |
| 2012/0243905 | A1 | 9/2012 | Uratani et al. |
| 2013/0164028 | A1 | 6/2013 | Morioka et al. |
| 2013/0170864 | A1 | 7/2013 | Newman et al. |
| 2014/0169829 | A1 | 6/2014 | Maeshima et al. |
| 2014/0270845 | A1 | 9/2014 | Kawakami et al. |
| 2015/0117874 | A1 | 4/2015 | Shiraki |
| 2015/0227110 | A1 | 8/2015 | Yoshimura et al. |
| 2015/0253723 | A1 | 9/2015 | Morioka et al. |
| 2016/0179051 | A1 | 6/2016 | Kim et al. |
| 2016/0231695 | A1 | 8/2016 | Taguchi |
| 2016/0246250 | A1 | 8/2016 | Kamoshida et al. |
| 2016/0378056 | A1 | 12/2016 | Yoshimura et al. |
| 2017/0010580 | A1 | 1/2017 | Yoshimura et al. |
| 2017/0108823 | A1 * | 4/2017 | Numata ............... G03G 21/181 |
| 2017/0108825 | A1 * | 4/2017 | Yoshimura ......... G03G 21/1647 |
| 2017/0139372 | A1 | 5/2017 | Kashiide et al. |
| 2017/0261926 | A1 | 9/2017 | Kashiide et al. |
| 2017/0261927 | A1 | 9/2017 | Sato et al. |
| 2017/0322512 | A1 | 11/2017 | Kamoshida et al. |
| 2017/0351214 | A1 | 12/2017 | Uesugi et al. |
| 2018/0039227 | A1 | 2/2018 | Yoshimura et al. |
| 2018/0067452 | A1 | 3/2018 | Yoshimura et al. |
| 2018/0181057 | A1 * | 6/2018 | Kawakami ......... G03G 21/1814 |
| 2018/0224794 | A1 | 8/2018 | Kamoshida et al. |
| 2018/0239301 | A1 | 8/2018 | Kudo et al. |
| 2018/0259880 | A1 | 9/2018 | Yoshii |
| 2019/0137927 | A1 | 5/2019 | Hiratsuka |
| 2019/0171157 | A1 | 6/2019 | Yoshimura et al. |
| 2019/0187586 | A1 | 6/2019 | Sato |
| 2019/0196364 | A1 | 6/2019 | Minamoto |
| 2019/0369551 | A1 | 12/2019 | Yoshimura et al. |
| 2020/0117136 | A1 | 4/2020 | Nishida et al. |
| 2020/0225616 | A1 | 7/2020 | Yoshimura et al. |
| 2021/0286316 | A1 | 9/2021 | Murakami et al. |
| 2021/0382434 | A1 | 12/2021 | Morioka et al. |
| 2022/0050417 | A1 | 2/2022 | Nishida et al. |

FOREIGN PATENT DOCUMENTS

| | | | |
|---|---|---|---|
| CN | 103186089 | A | 7/2013 |
| CN | 207965488 | U | 10/2018 |
| CO | 16088043 | B | 11/2016 |
| CO | 2017/0001950 | A | 8/2017 |
| EP | 3 177 967 | A | 6/2017 |
| JP | H07-160176 | A | 6/1995 |
| JP | 2005-172906 | A | 6/2005 |
| JP | 2006-259448 | A | 9/2006 |
| JP | 2007-213024 | A | 8/2007 |
| JP | 2008-170950 | A | 7/2008 |
| JP | 2010-054828 | A | 3/2010 |
| JP | 2012-054828 | A | 3/2012 |
| JP | 2013-134461 | A | 7/2013 |
| JP | 2014-067005 | A | 4/2014 |
| JP | 2014-119592 | A | 6/2014 |
| JP | 2015-064410 | A | 4/2015 |
| JP | 2015-084013 | A | 4/2015 |
| JP | 2015-169876 | A | 9/2015 |
| JP | 2018-180556 | A | 11/2018 |
| JP | 2019-003197 | A | 1/2019 |
| JP | 2019-040221 | A | 3/2019 |
| RU | 2393961 | C1 | 7/2010 |
| RU | 2670567 | C2 | 10/2018 |
| RU | 2681657 | C1 | 3/2019 |
| TW | 2011-35379 | A | 10/2011 |
| TW | 2016-21483 | A | 6/2016 |
| TW | 2016-21484 | A | 6/2016 |

(56) References Cited

FOREIGN PATENT DOCUMENTS

| | | |
|---|---|---|
| TW | 2016-29646 A | 8/2016 |
| TW | 2013-37477 A | 9/2016 |
| TW | 201633019 A | 9/2016 |
| TW | 201714029 A | 4/2017 |
| TW | 2018-09923 A | 3/2018 |
| TW | 201901314 A | 1/2019 |

OTHER PUBLICATIONS

Feb. 28, 2024 Office Action in Chilean Patent Application No. 2021-02418 (with English translation).
Aug. 9, 2023 Search Report in Singapore Patent Application No. 11202108005Q.
Jan. 11, 2024 Office Action in Colombian Patent Application No. NC2021/0012550 (with English translation).
Nov. 14, 2023 Office Action in Chinese Patent Application No. 202080021463.X (with English translation).
Dec. 18, 2023 Office Action in Taiwanese Patent Application Pub. No. 112133061.
International Search Report and Written Opinion for International Patent Application No. PCT/JP2020/012812.
Jul. 10, 2023 Office Action in Chilean Patent Application No. 202102418.
Nov. 3, 2022 Extended Search Report in European Patent Application No. 20 774 634.8.
Oct. 14, 2022 Office Action in Chilean Patent Applicaiton No. 202102418.
Feb. 15, 2023 Notice of Allowance in Taiwanese Patent Application No. 111144088.
Mar. 6, 2023 Office Action in Indian Patent Application No. 202147030893.
May 22, 2023 Notice of Acceptance in Australian Patent Application No. 2020242010.
Jun. 2, 2023 Notice of Allowance in Taiwan Patent Application No. 112117691.
May 19, 2022 Office Action in Australian Patent Application No. 2020242010.
May 11, 2022 Office Action in Taiwanese Patent Application No. 109108904.
May 30, 2022 Notice of Allowance in Russian Patent Application No. 2021121562 (with English translation).
English translation of Japanese Patent Application Pub. No. 2019-003197.
English translation of Japanese Patent Application Pub. No. 2019-054828.
Feb. 28, 2024 Notice of Allowance in Chilean Patent Application No. 2021-02418 (with English translation).
Information re Offer for Sale of Claimed Invention Before Mar. 18, 2019 and Mar. 17, 2020.
May 21, 2024 Extended Search Report in European Patent Application No. 24 153 169.8.
Jul. 1, 2025, 2024 Notice of Allowance in Korean Patent Application No. 10-2021-7031255.

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(a)

(b)

(a)

(b)

(c)

(d)

(a)

(b)

(a) (b) (c) (d)

(a)

(b)

(a)

(b)

(a)

(b)

(a)

(b)

(a)

(b)

(a)

(b)

(a)

(b)

(c)

(a)

(b)

(c)

(d)

(a)

(b)

(c)

ELECTROPHOTOGRAPHIC IMAGE FORMING APPARATUS AND CARTRIDGE

TECHNICAL FIELD

The disclosure relates to an electrophotographic image forming apparatus such as a copying machine or a printer which uses an electrophotographic process, and a cartridge which can be mounted to or dismounted from the electrophotographic image forming apparatus.

Here, the electrophotographic image forming apparatus (hereinafter, also referred to as "image forming apparatus") is an apparatus which forms an image on a sheet-like recording material such as paper using an electrophotographic image forming process. Examples of the image forming apparatus include a copying machine, a facsimile machine, a printer (laser beam printer, LED printer, and so on, a multifunction printer thereof, and the like).

The cartridge is a unit which can be mounted to and dismounted from the image forming apparatus described above, and is a unit including a photosensitive member and/or a process means (a charging member, a developing member, a cleaning member, and so on, for example) which is actable on the photosensitive member.

BACKGROUND OF INVENTION

An image forming apparatus which uses an electrophotographic image forming process includes an image forming apparatus which forms an image by a contact developing method which forms an image by performing a developing process in a state in which a developing member (developing roller) is in contact with a photosensitive drum. In such an image forming apparatus, the developing roller is urged toward the photosensitive drum at a predetermined pressure, and is in contact with the surface of the photosensitive drum at a predetermined pressure, during the development process.

In the case that a developing roller including an elastic layer on the surface is used, the following can be considered, for example. That is, if the period during which the image is not formed (the developing roller is not rotating) with the elastic layer kept in contact with the surface of the photosensitive drum is long, the elastic layer of the developing roller is may be deformed by the contact with the surface of the photosensitive drum. By this, image defects such as unintended unevenness of the developer image may occur when the developing process is performed.

Further, as another example, when the developing roller is in contact with the photosensitive drum during the period when the developing process is not performed, the developer carried on the developing roller is unnecessarily deposited to the photosensitive drum, and such a developer is deposited on the recording material with the result of contamination of the recording material. This problem may occur irrespective of the provision of an elastic layer on the surface of the developing roller.

Further, as another example, when the photosensitive drum and the developing roller are in contact with each other for a long period of time other than the period during which the developing process is performed, the photosensitive drum and the developing roller are rubbed against each other for a long period of time. Deterioration of the developing roller or the developer may be accelerated. This may occur with or without an elastic layer on the surface of the developing roller.

In order to avoid the above-mentioned problem, JP-A-2007-213024 and JP-A-2014-67005 discloses an image forming apparatus and a cartridge having a structure for spacing a developing roller from a surface of a photosensitive drum during a period in which developing process is not performed.

SUMMARY OF INVENTION

Problem to be Solved

However, there is still room for further improvement in the conventional techniques described in JP-A-2007-213024 and JP-A-2014-67005. Therefore, it is an object of the present disclosure to further develop the conventional technique.

Means for Solving the Problem

In order to achieve the above object, a typical structure of the invention according to the present application is a cartridge comprising a charging member for charging the photosensitive member; a first unit including the photosensitive member and the charging member; a developing member for depositing toner onto the photosensitive member; a second unit including the developing member and movable between a developing position in which the toner is capable of being deposited onto the photosensitive member from the developing member and a spaced position in which at least a part of the developing member is spaced from the photosensitive member; a holding portion movably supported by the first unit or the second unit and movable between a first position for stably holding the second unit in the spaced position by the first unit and a second position for stably holding a second unit in the developing position by the first unit; and a contact force receiving portion capable of receiving a contact force for moving the holding portion from the first position toward the second position to move the second unit to the developing position, when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

Effect of the Invention

According to the present disclosure, the prior art cartridge and so on can be further developed.

BRIEF DESCRIPTION OF THE DRAWINGS

FIG. 120 is a side view of the process cartridge in the image forming apparatus main assembly and a side view as seen along the lateral direction.

FIG. 121 is a side view of the process cartridge in the image forming apparatus main assembly and a side view as seen along the lateral direction.

FIG. 122 is a side view of the process cartridge in the image forming apparatus main assembly.

FIG. 123 is a side view of the process cartridge in the image forming apparatus main assembly.

FIG. 124 is a side view of the process cartridge in the image forming apparatus main assembly.

FIG. 125 is a side view of the process cartridge in the image forming apparatus main assembly.

FIG. 126 is an exploded perspective view of the process cartridge.

FIG. 127 is a side view of the process cartridge in the image forming apparatus main assembly as viewed along the lateral direction.

FIG. 128 is a side view of the process cartridge in the image forming apparatus main assembly as viewed along the lateral direction.

FIG. 129 is a sectional view of the process cartridge.

FIG. 130 is a schematic sectional view of an image forming apparatus.

FIG. 131 is a schematic sectional view of the process cartridge.

Figure 132:
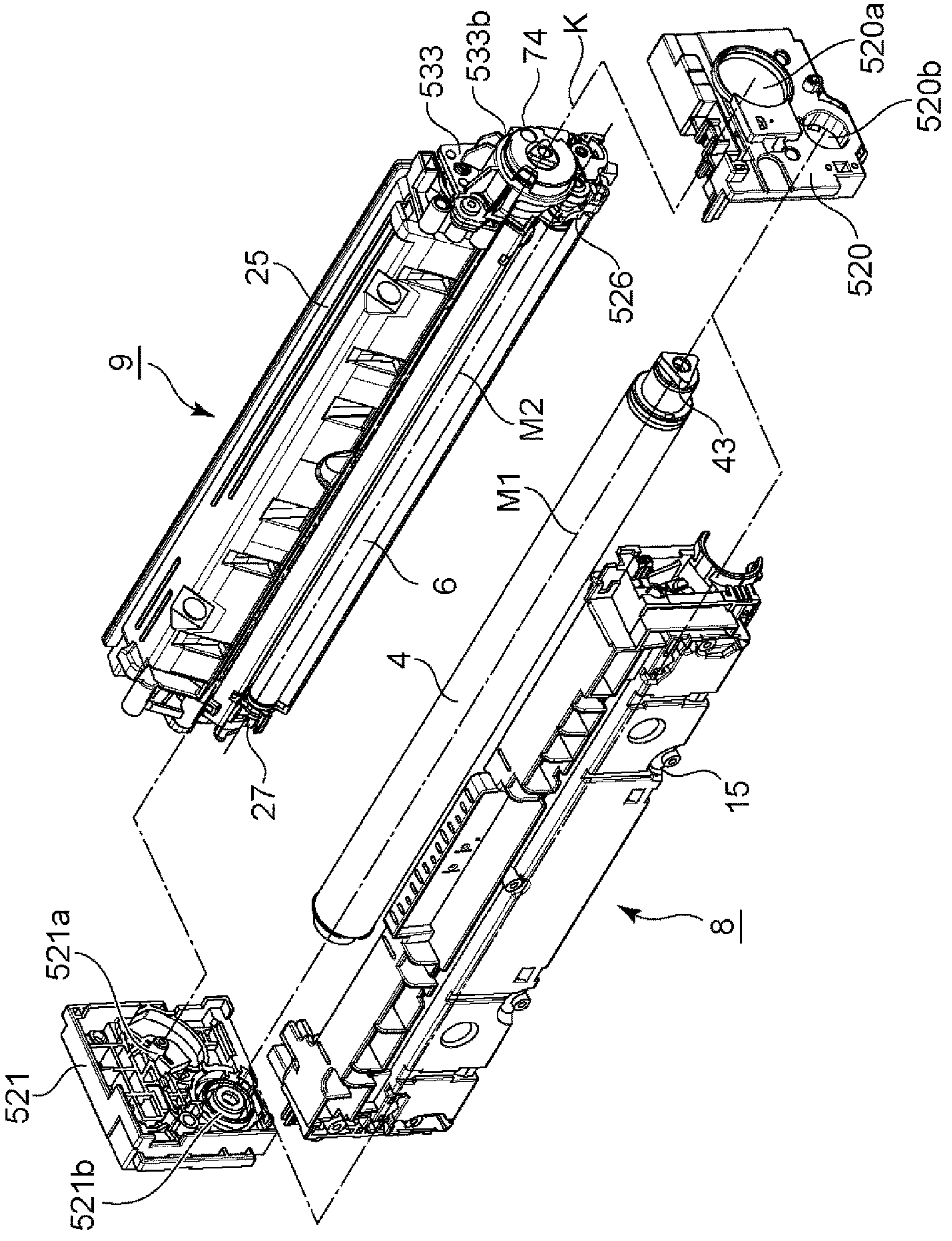

FIG. 132 is an exploded perspective view of the process cartridge.

Figure 133:
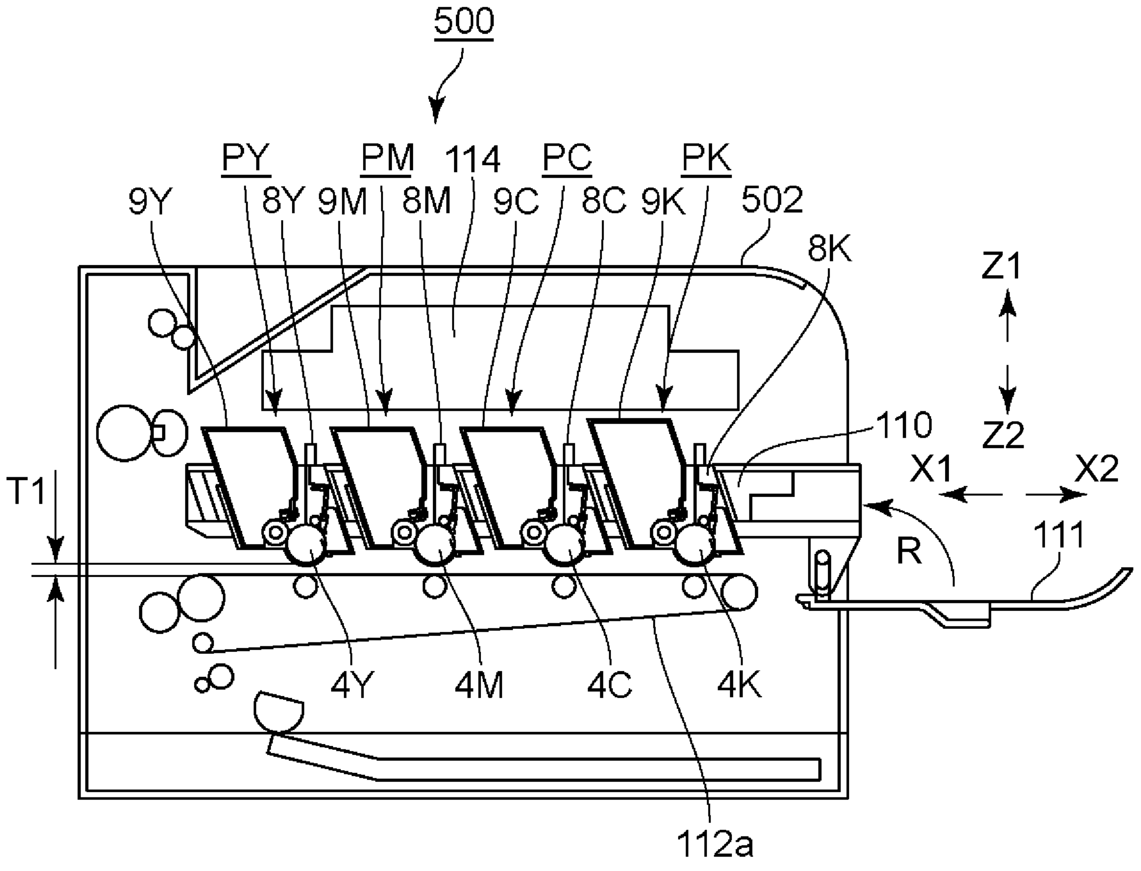

FIG. 133 is a schematic sectional view of the image forming apparatus.

Figure 134:
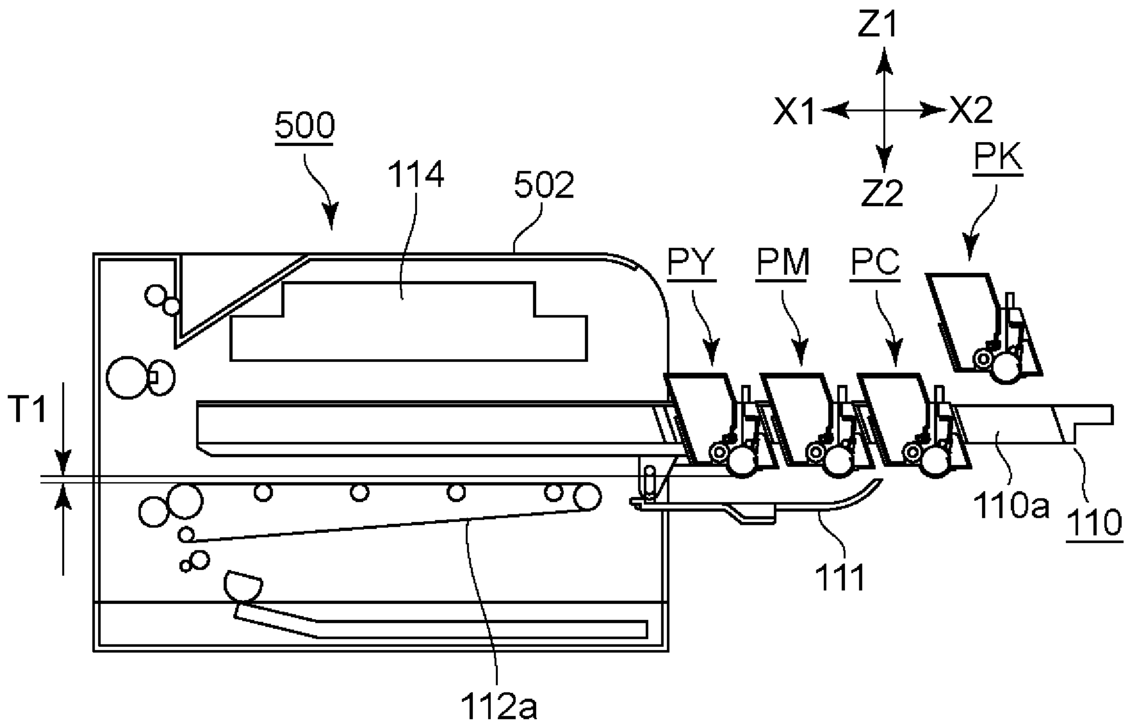

FIG. 134 is a schematic sectional view of the image forming apparatus.

Figure 135:
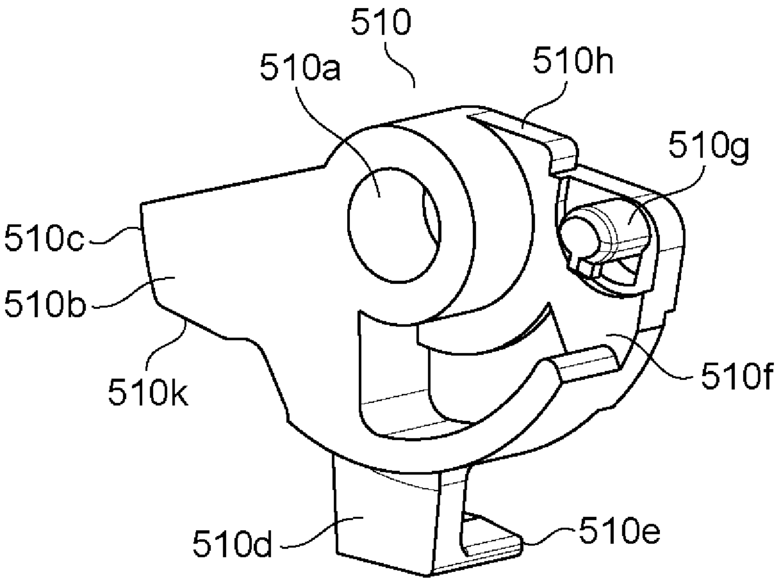
Figure 135:
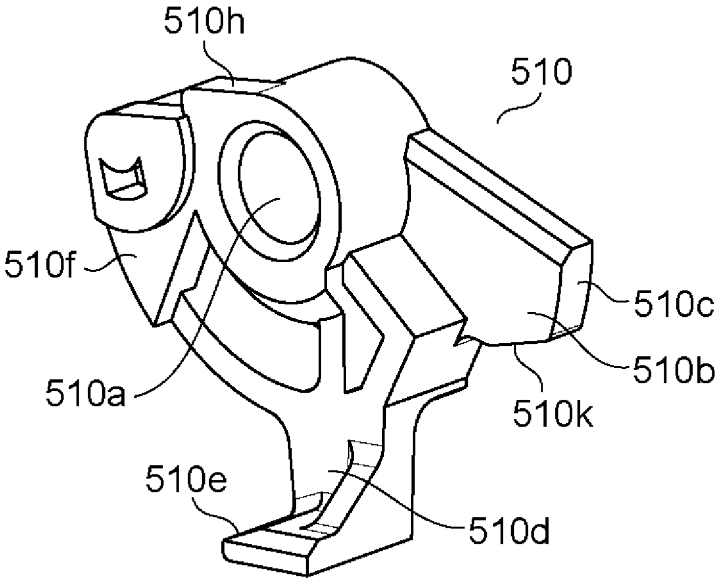

FIG. 135 illustrates a spacer.

Figure 136:
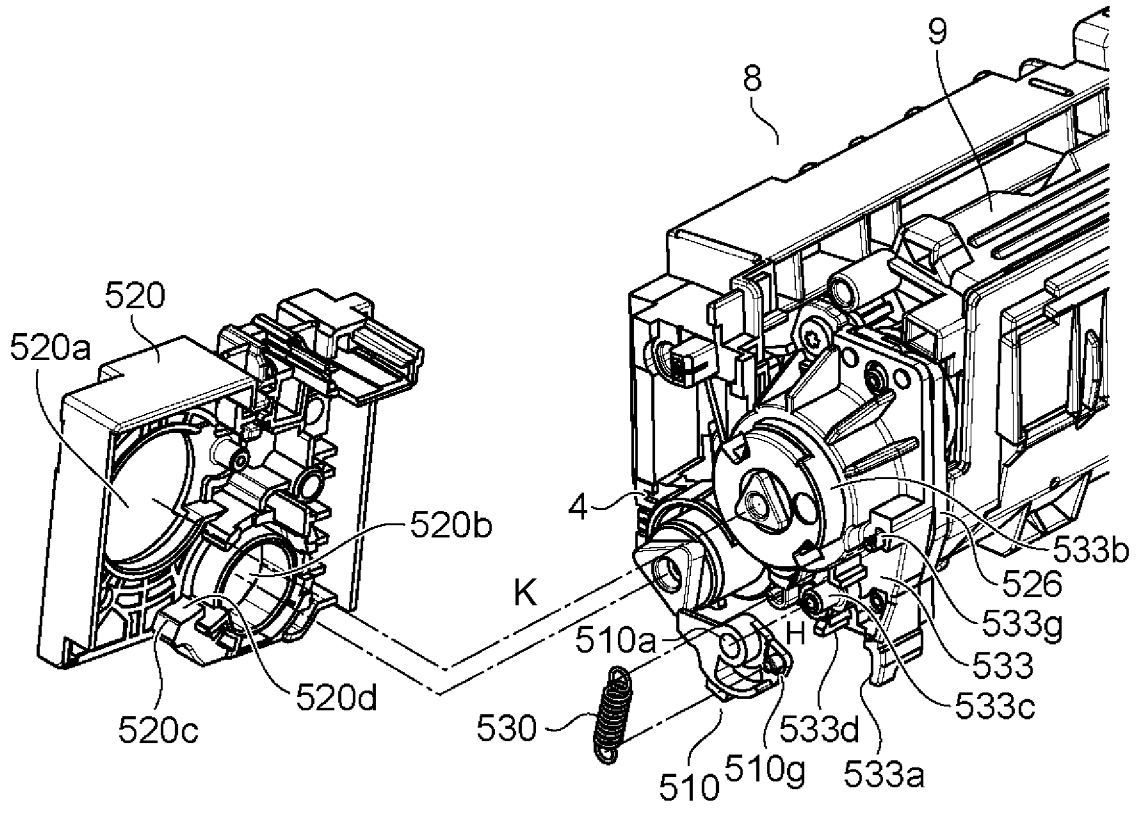

FIG. 136 is an exploded perspective view of the process cartridge.

Figure 137:
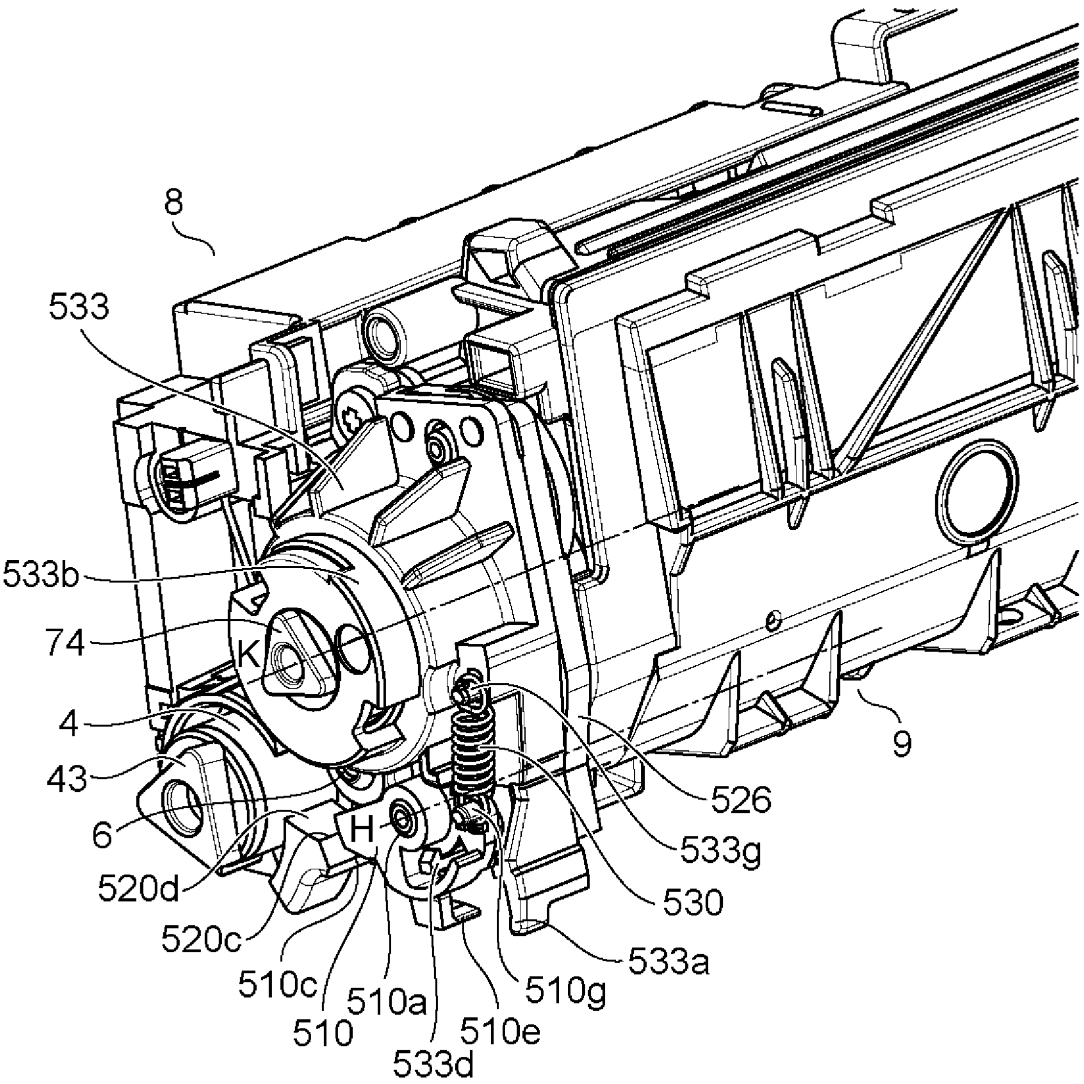

FIG. 137 is a perspective view of the process cartridge.

Figure 138:
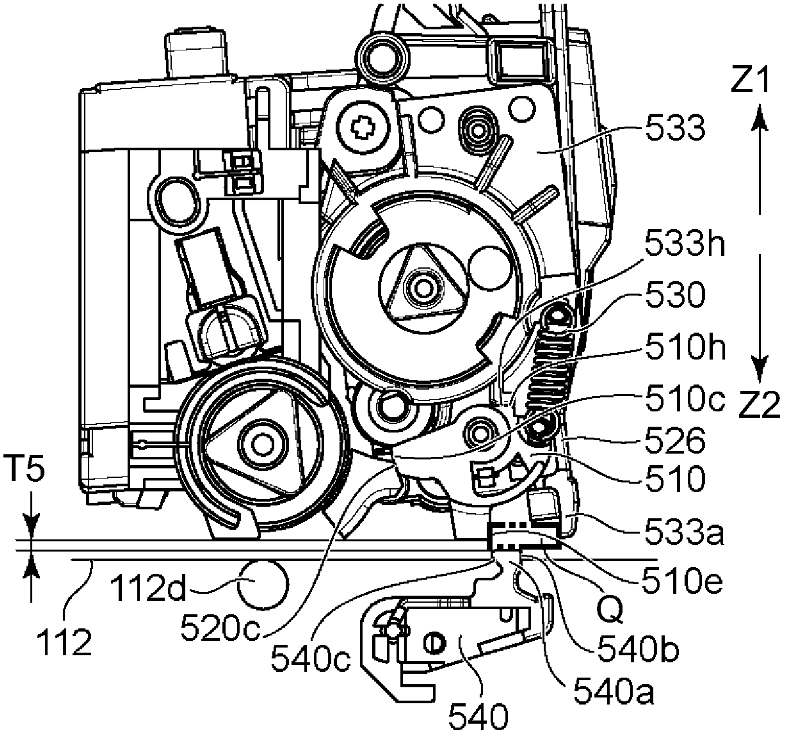
Figure 138:
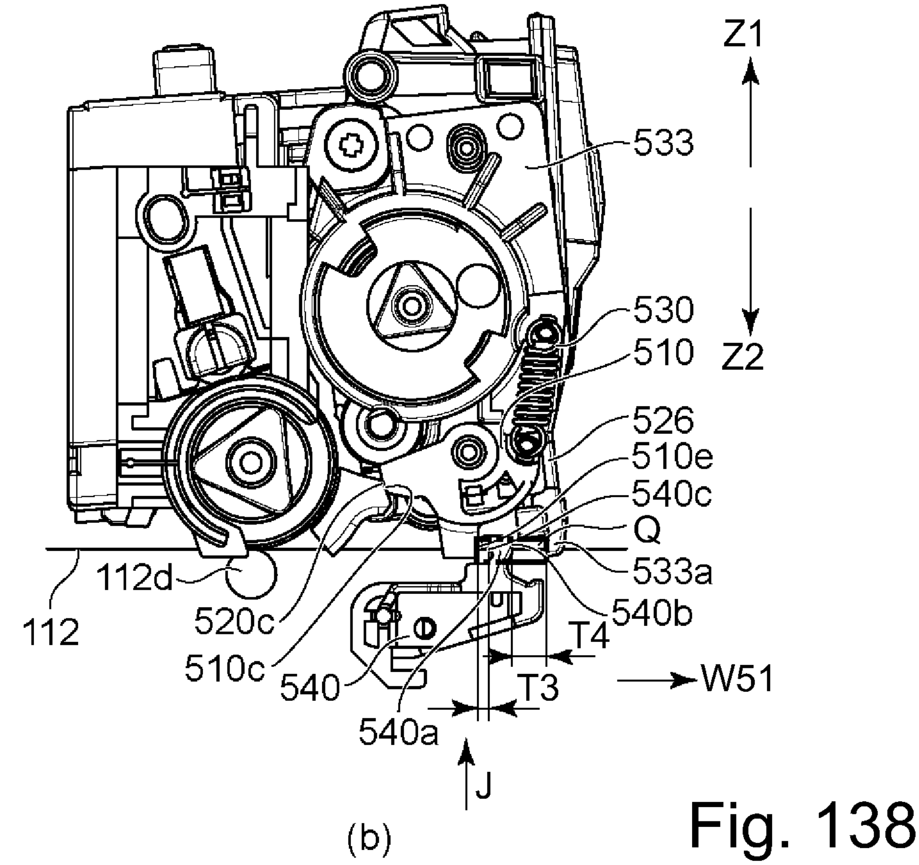

FIG. 138 is a sectional view of the process cartridge inside the image forming apparatus main assembly.

Figure 139:
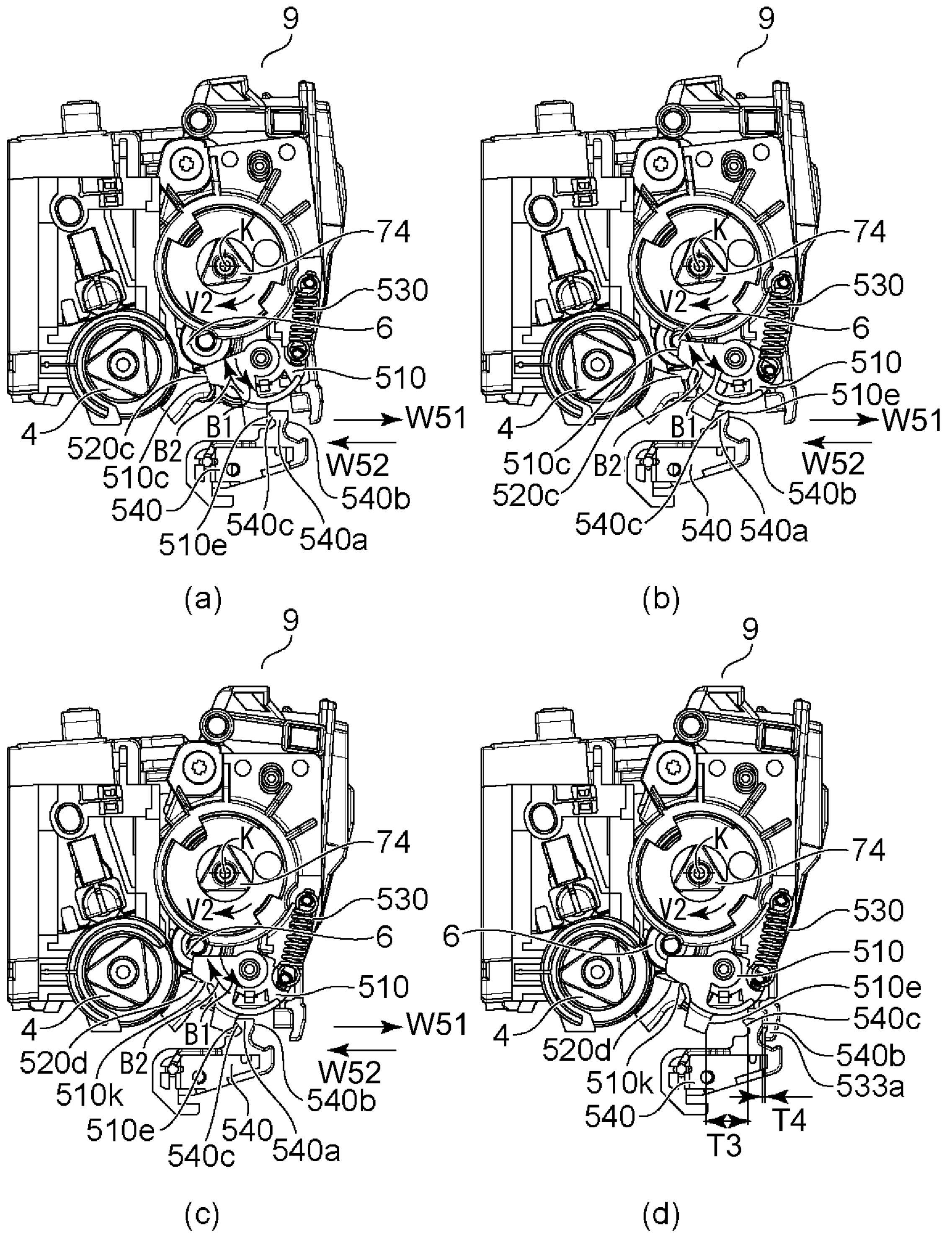

FIG. 139 is a sectional view of the process cartridge inside the image forming apparatus main assembly.

Figure 140:
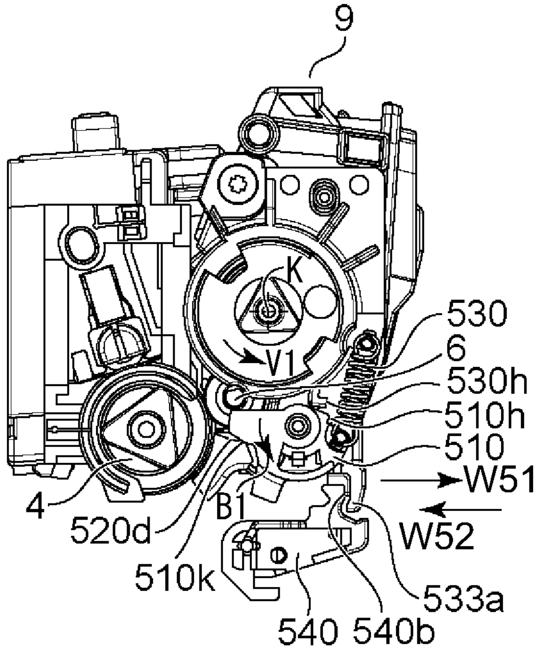
Figure 140:
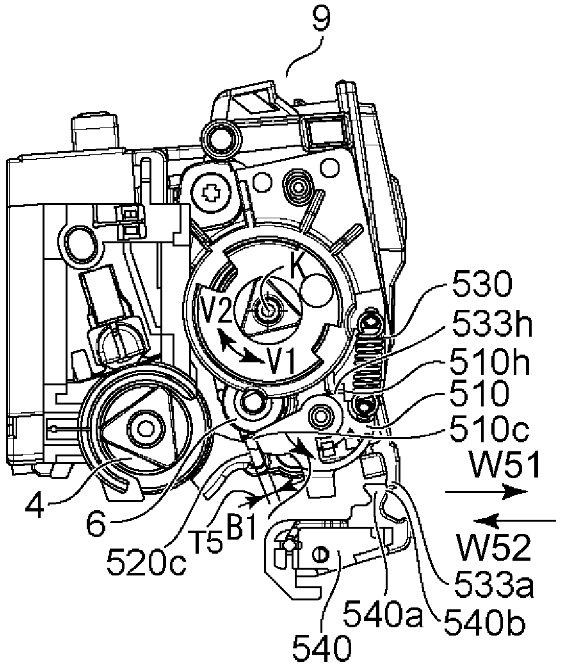
Figure 140:
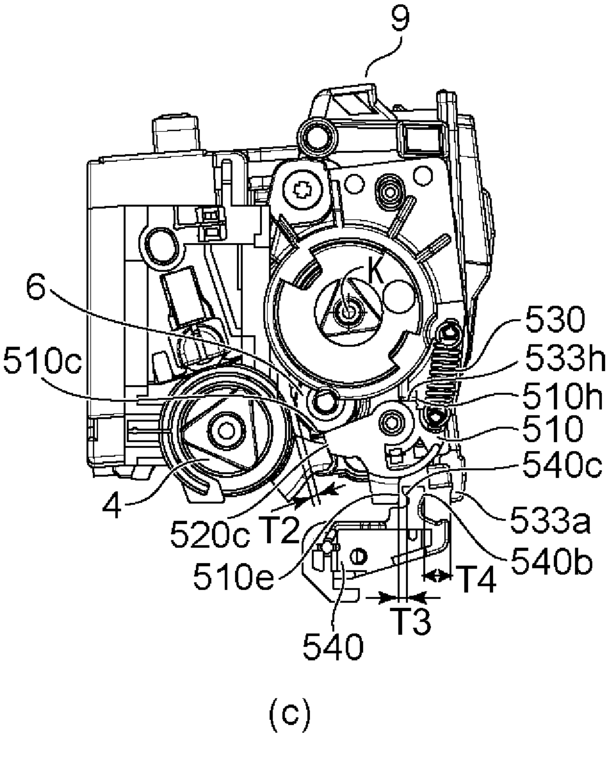

FIG. 140 is a sectional view of the process cartridge inside the image forming apparatus main assembly.

Figure 141:
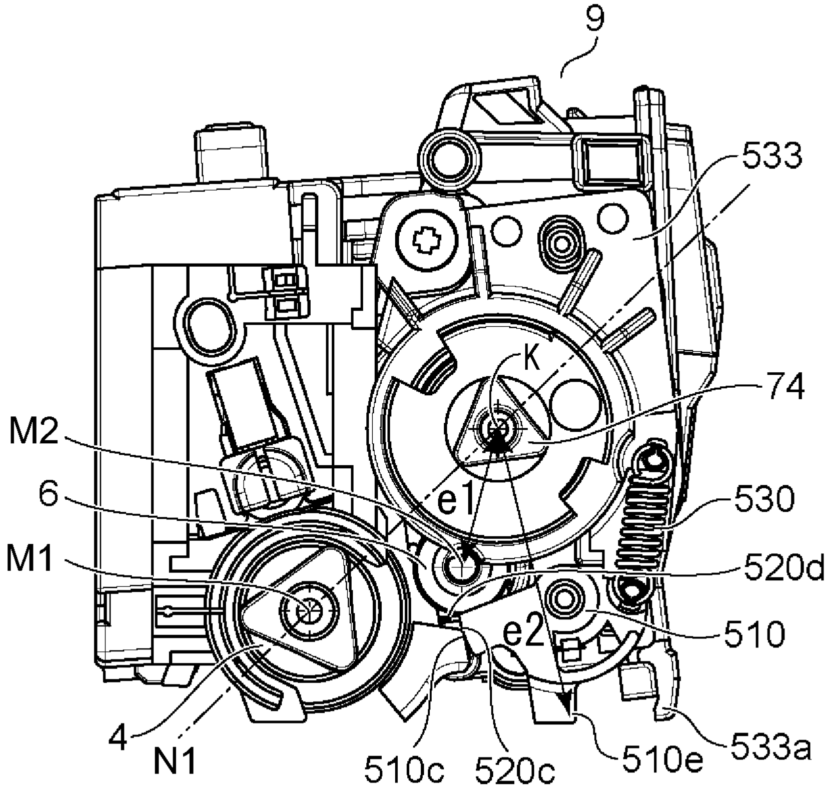

FIG. 141 is a sectional view of the process cartridge inside the image forming apparatus main assembly.

Figure 142:
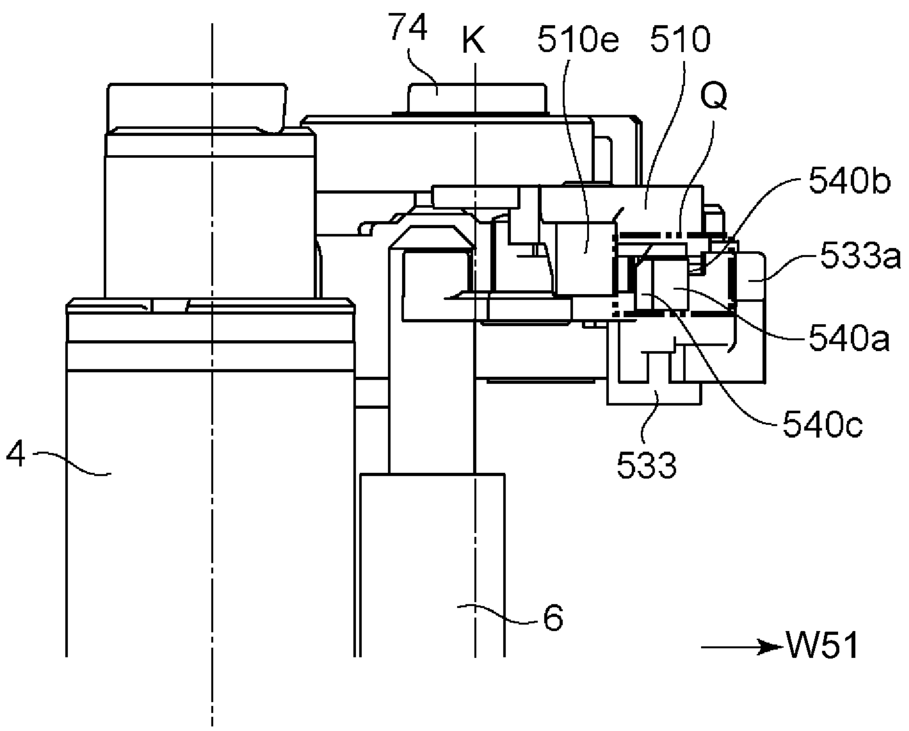

FIG. 142 is an illustration of an arrangement of a separation control member.

Figure 143:
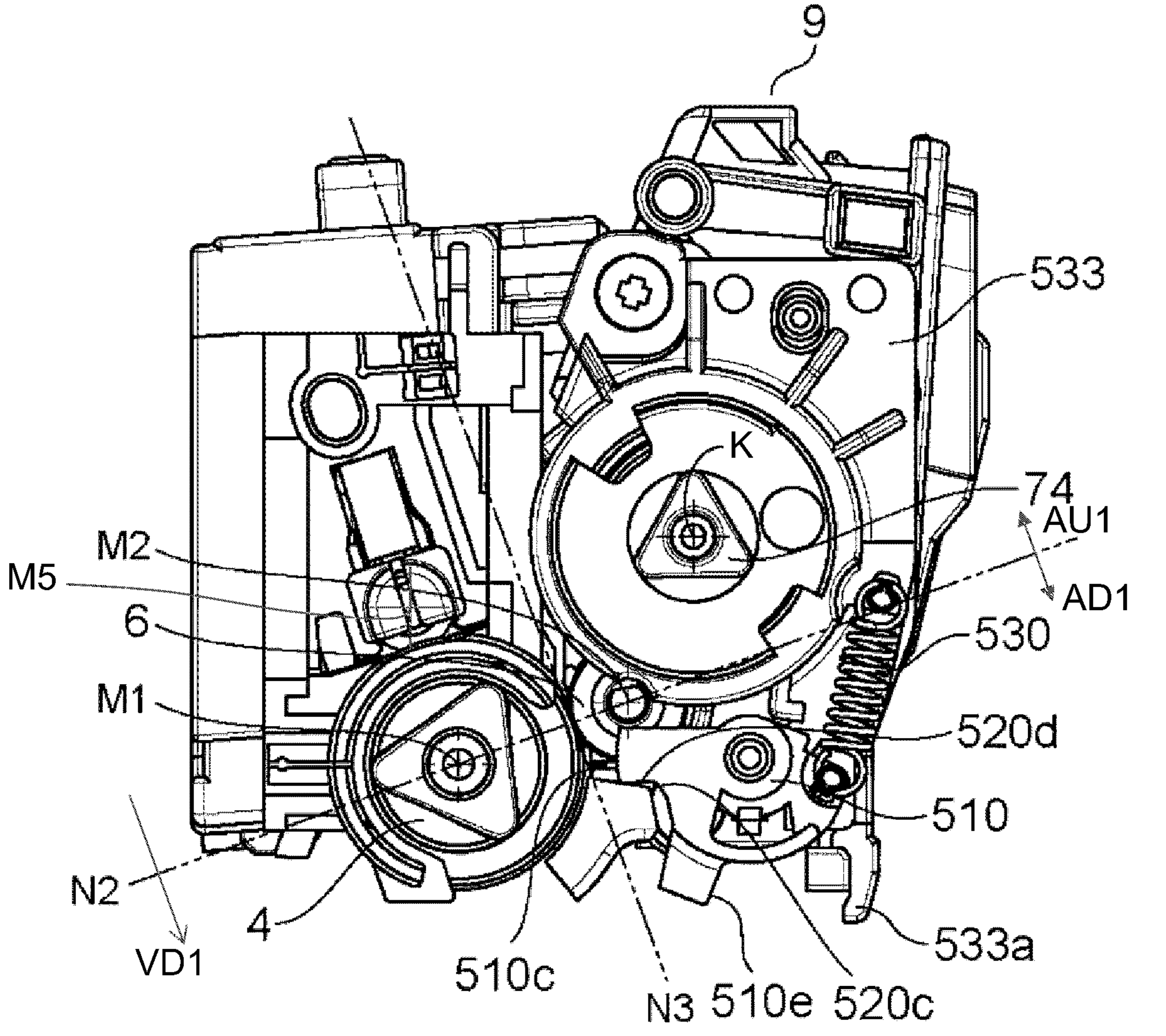

FIG. 143 is a sectional view of the process cartridge in the image forming apparatus main assembly.

Figure 144:
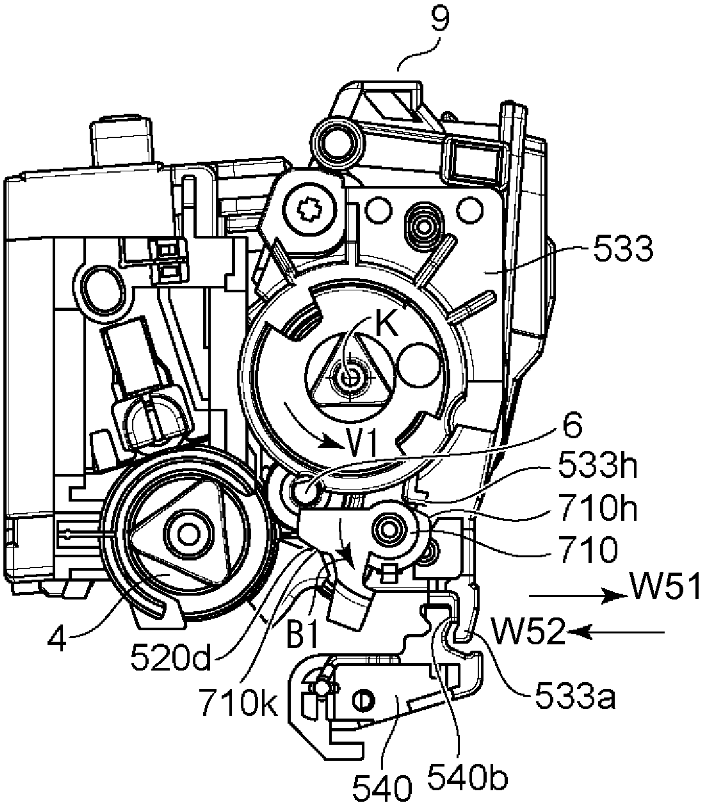
Figure 144:
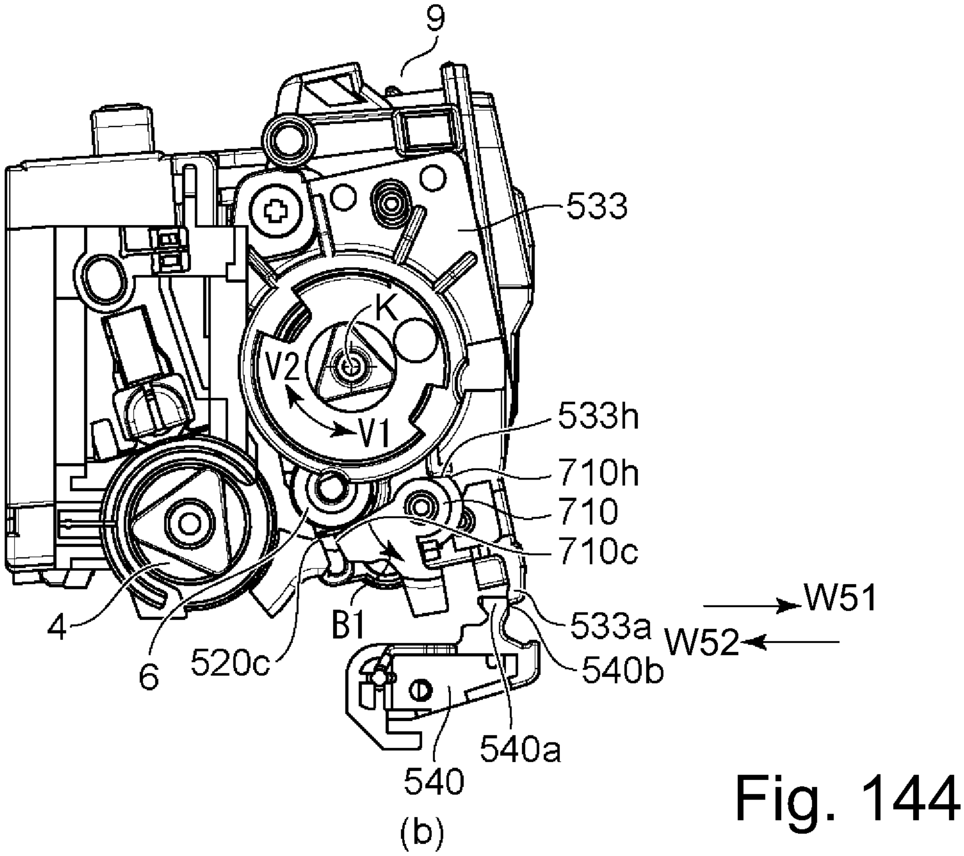

FIG. 144 is a sectional view of the process cartridge inside the image forming apparatus main assembly.

Figure 145:
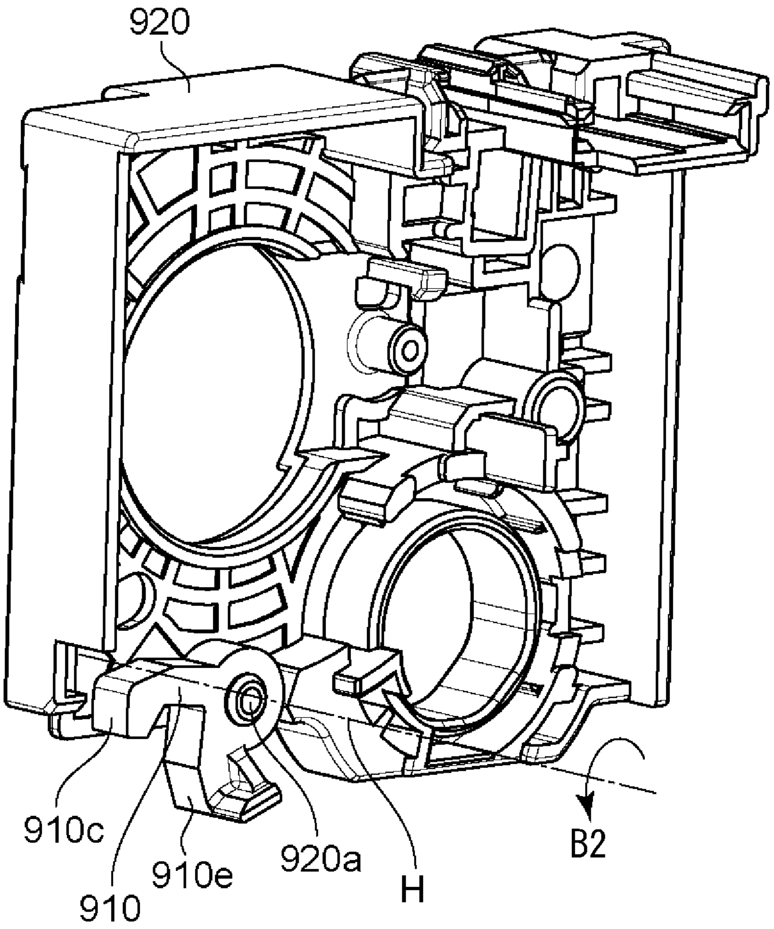

FIG. 145 is an illustration of a drive-side cartridge cover member and a spacer.

Figure 146:
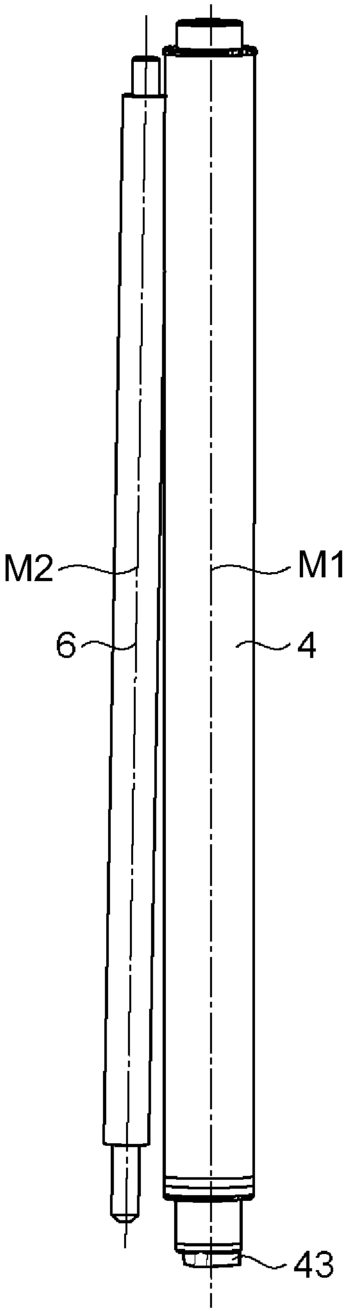

FIG. 146 is an illustration of a positional relationship between a photosensitive drum and a developing roller.

Figure 147:
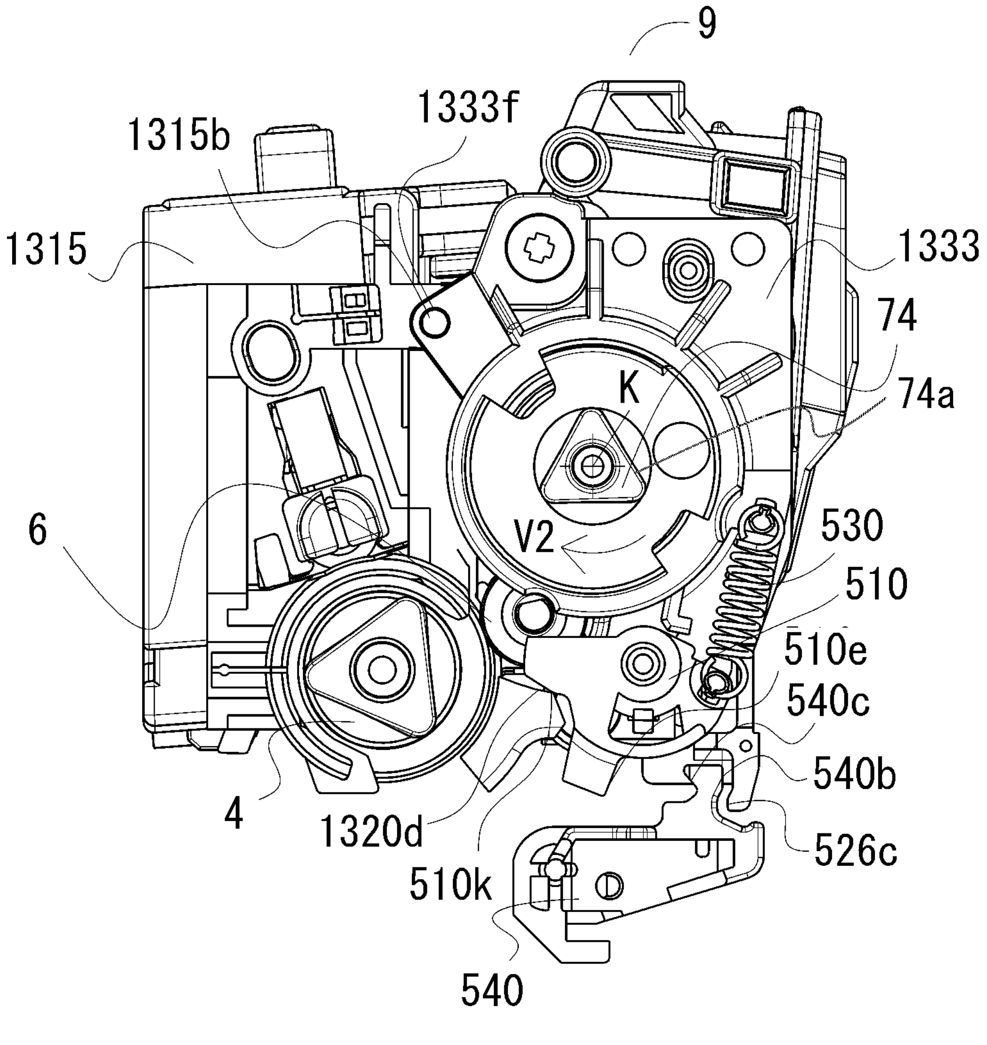

FIG. 147 is a sectional view of the process cartridge.

Figure 148:
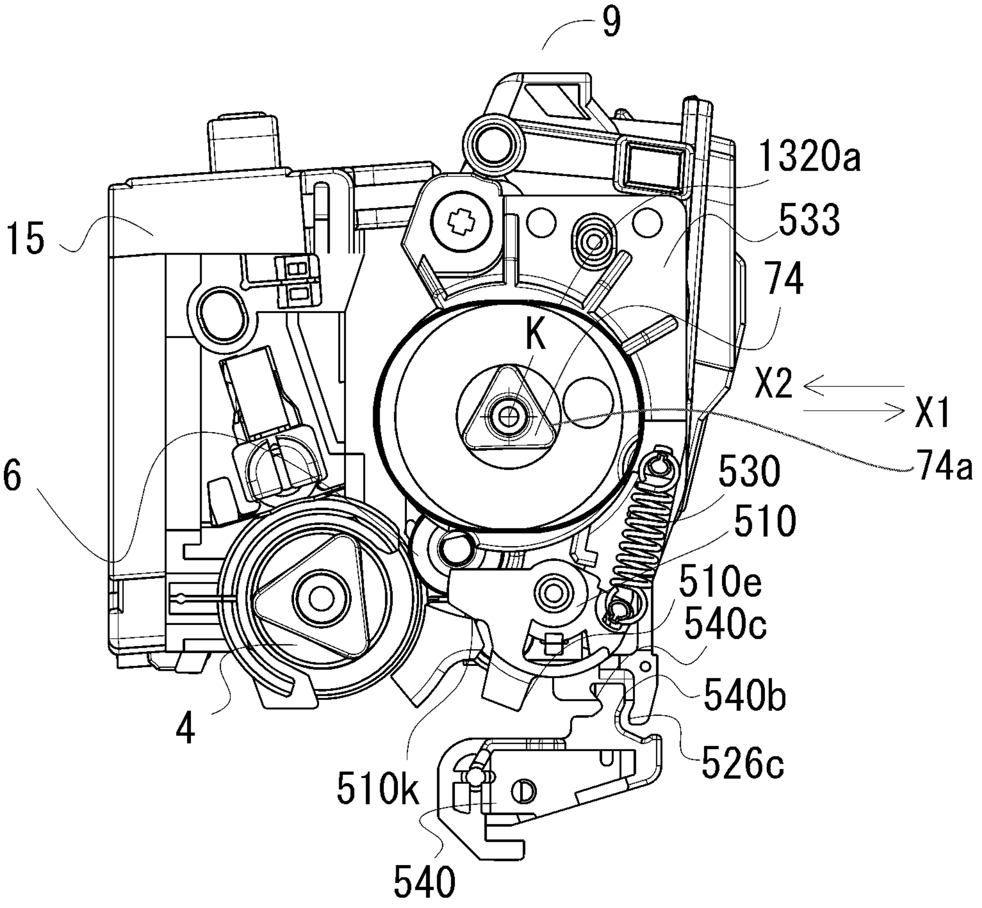

FIG. 148 is a sectional view of the process cartridge.

Figure 149:
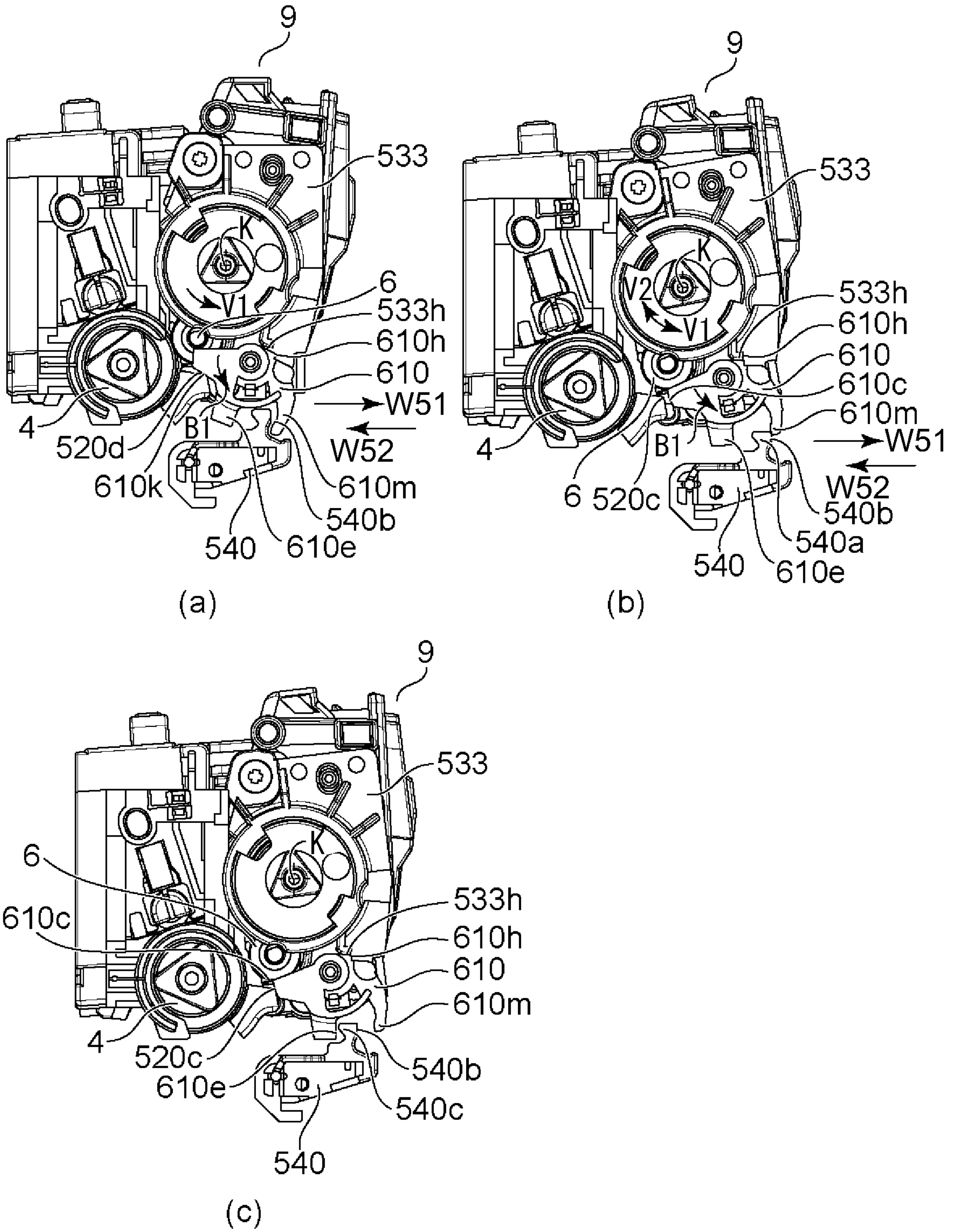

FIG. 149 is a sectional view of the process cartridge in the image forming apparatus main assembly.

Figure 150:
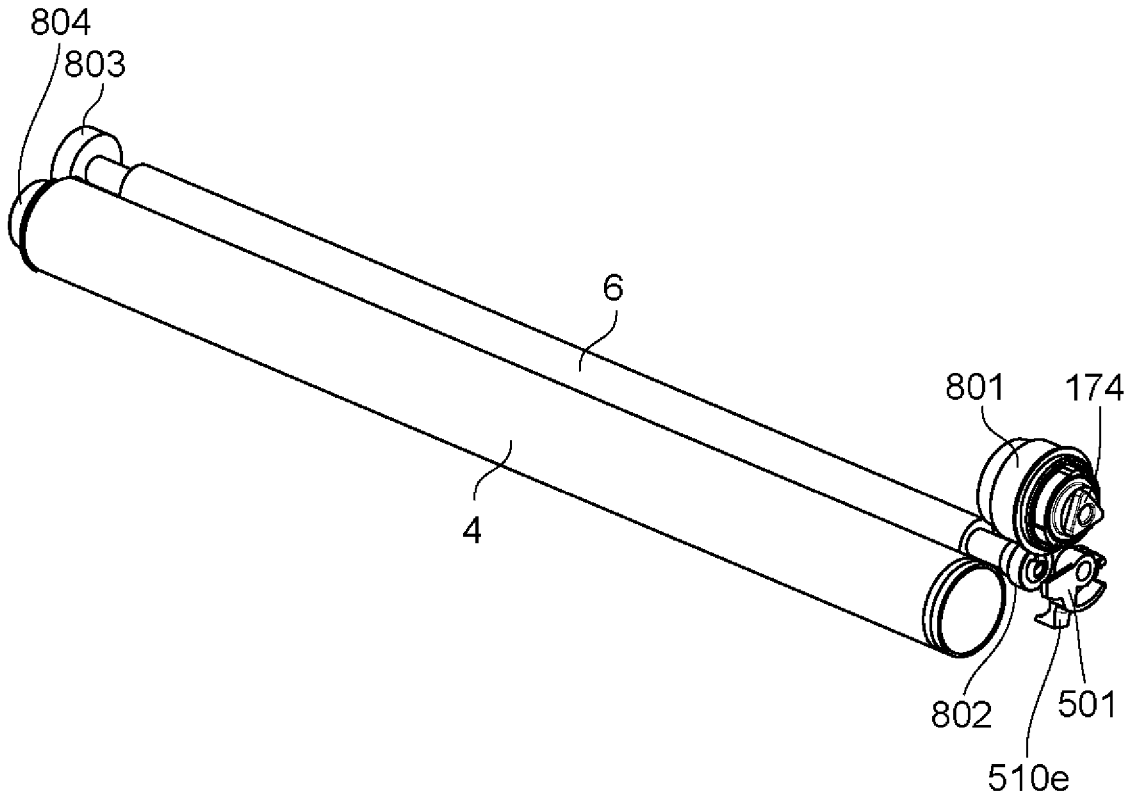

FIG. 150 is an illustration of a driving relationship between a photosensitive drum and a developing roller.

Figure 151:
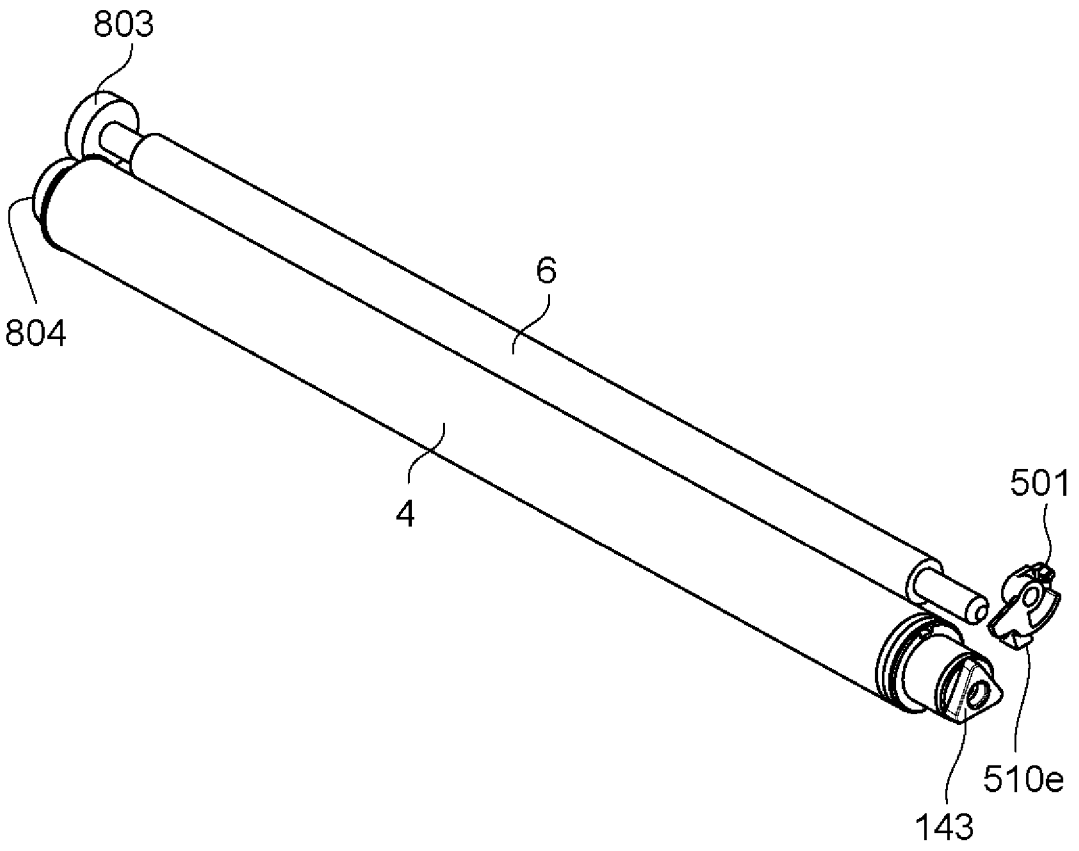

FIG. 151 is an illustration showing a driving relationship between the photosensitive drum and the developing roller.

Figure 152:
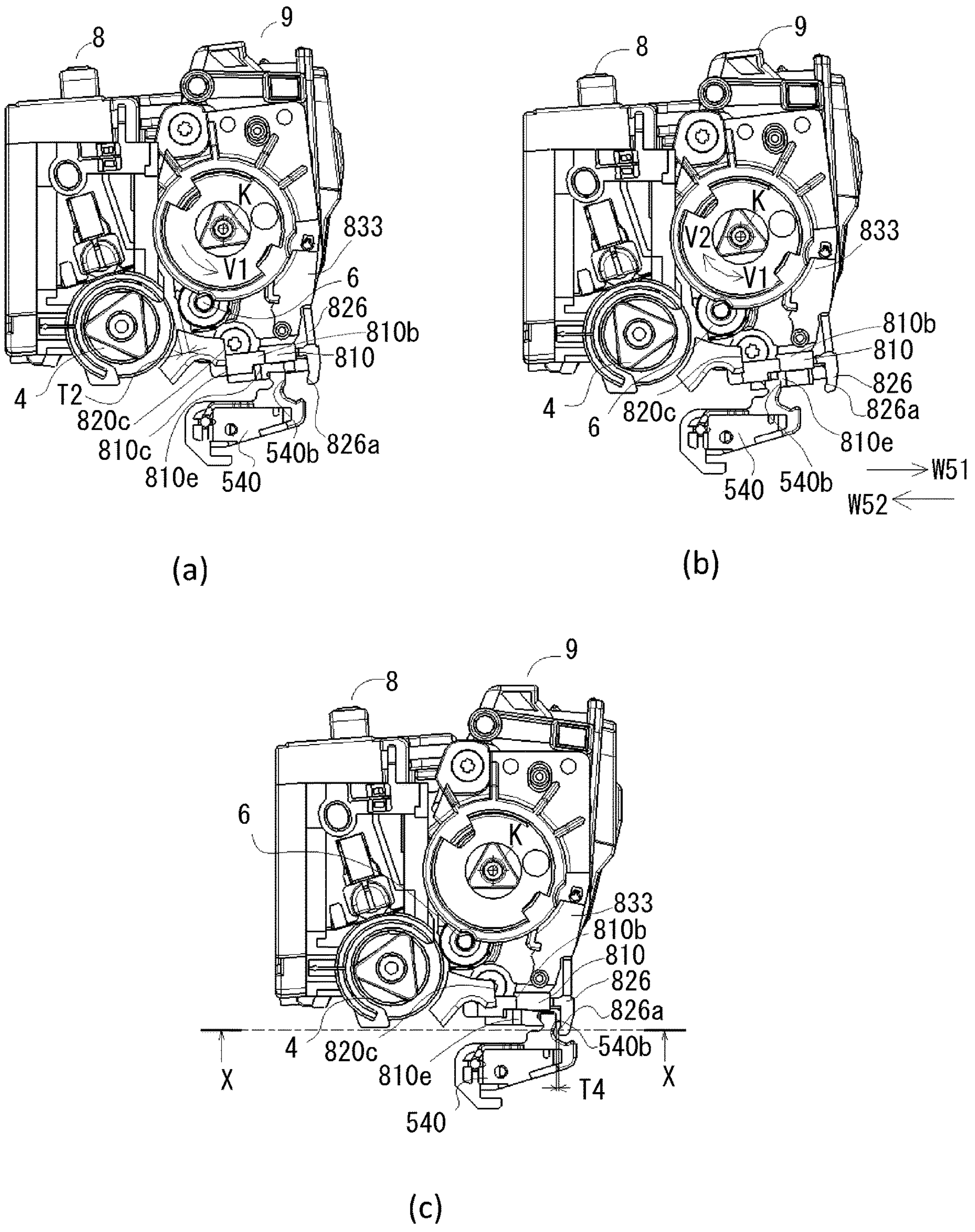

FIG. 152 is a sectional view of a process cartridge inside an image forming apparatus main assembly.

Figure 153:
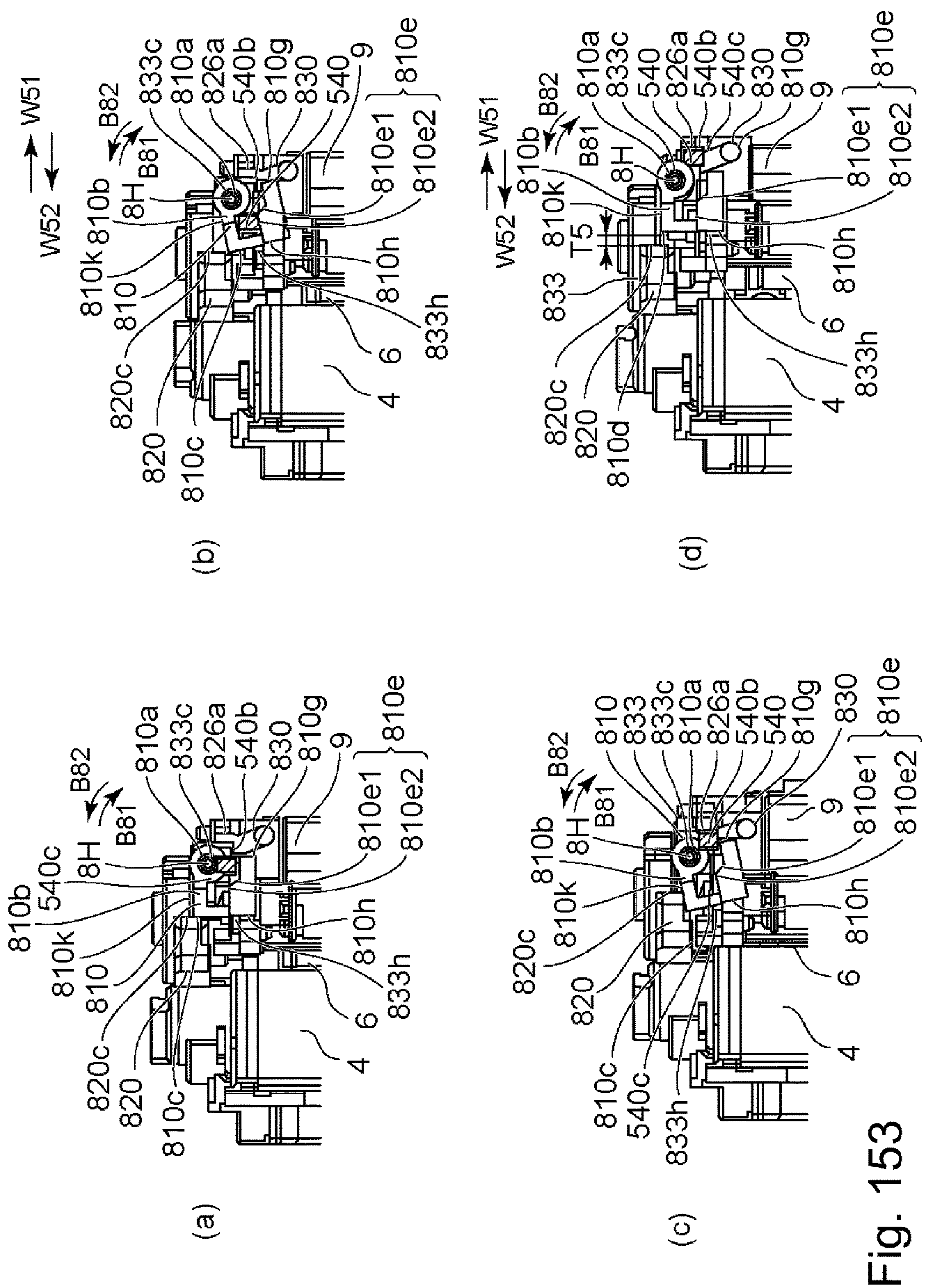

FIG. 153 is a sectional view (XX cross-section) of the process cartridge in the main assembly of the image forming apparatus.

Figure 154:
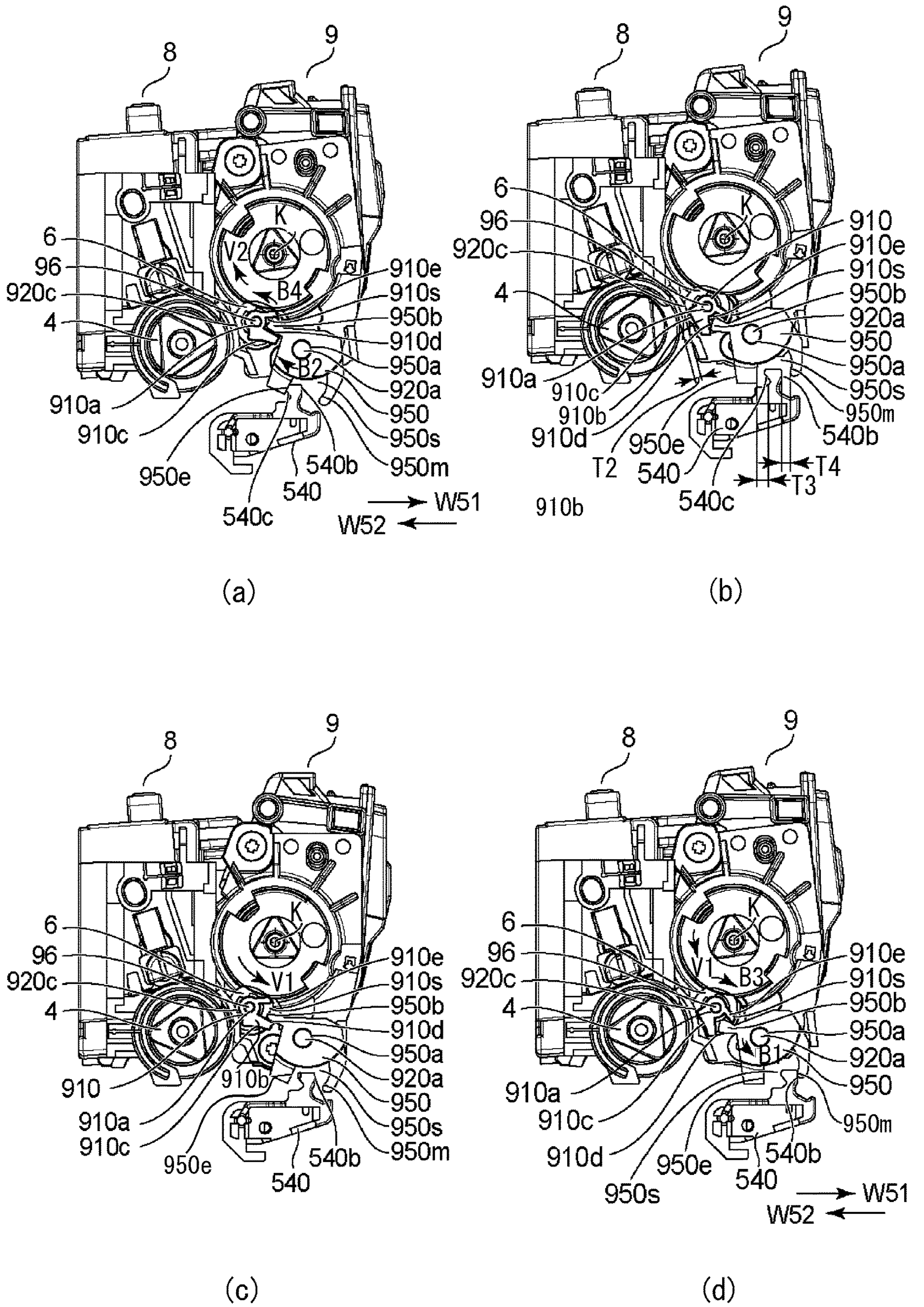

FIG. 154 is a sectional view of a process cartridge inside an image forming apparatus main assembly.

Figure 155:
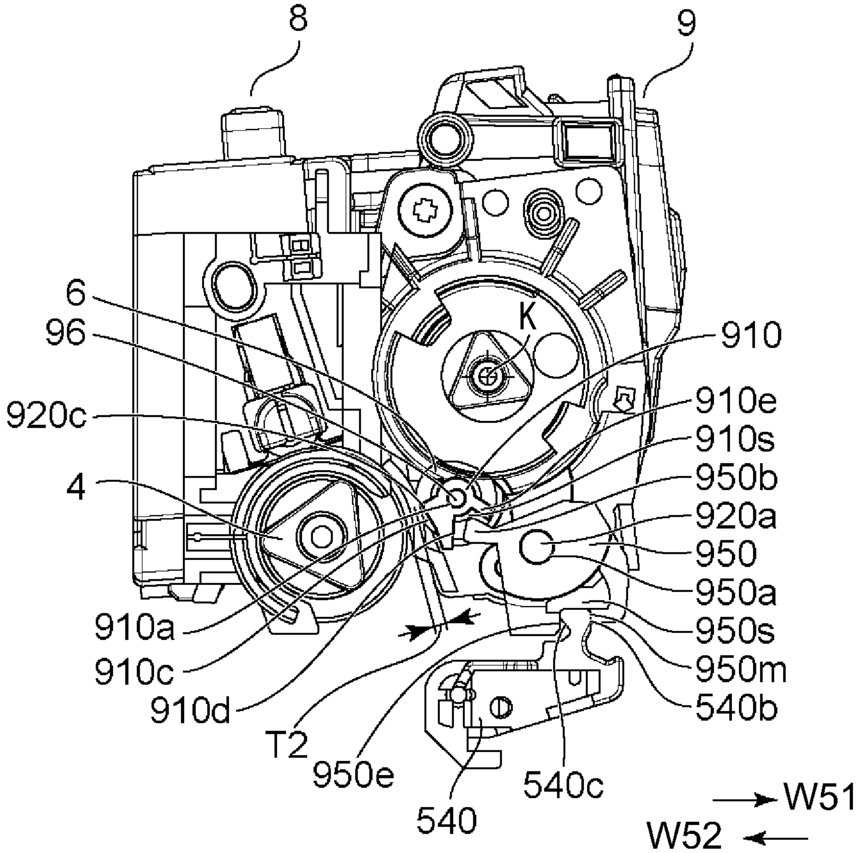

FIG. 155 is a sectional view of the process cartridge in the image forming apparatus main assembly.

Figure 156:
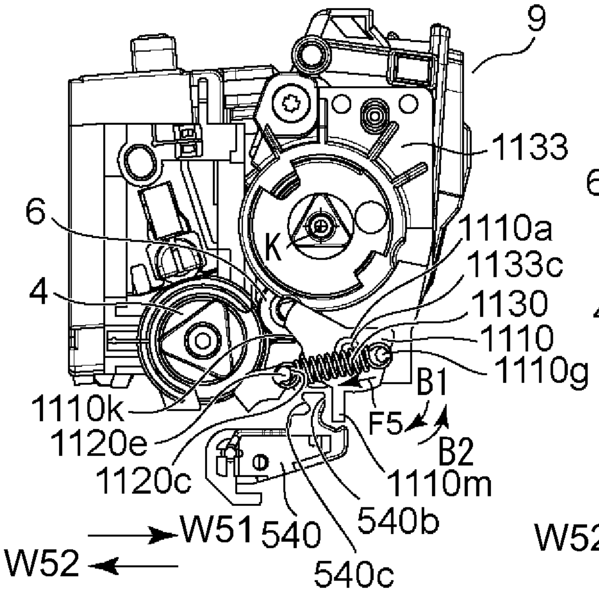
Figure 156:
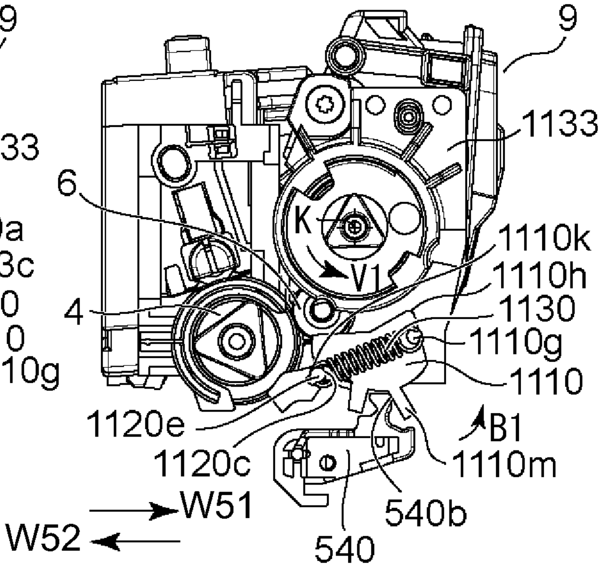
Figure 156:
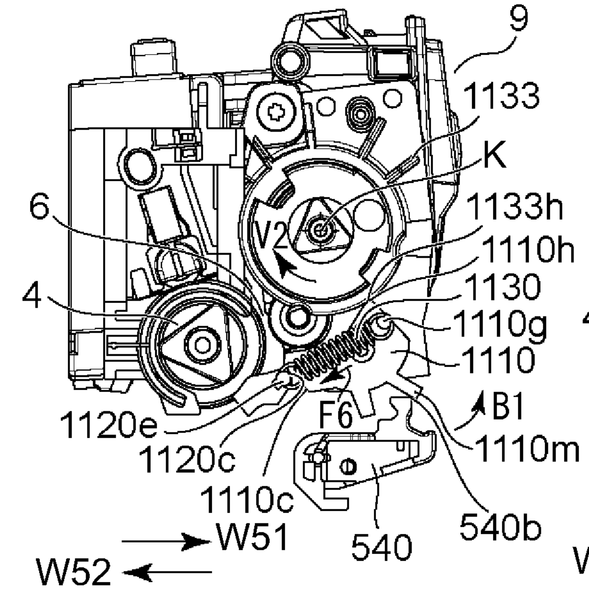
Figure 156:
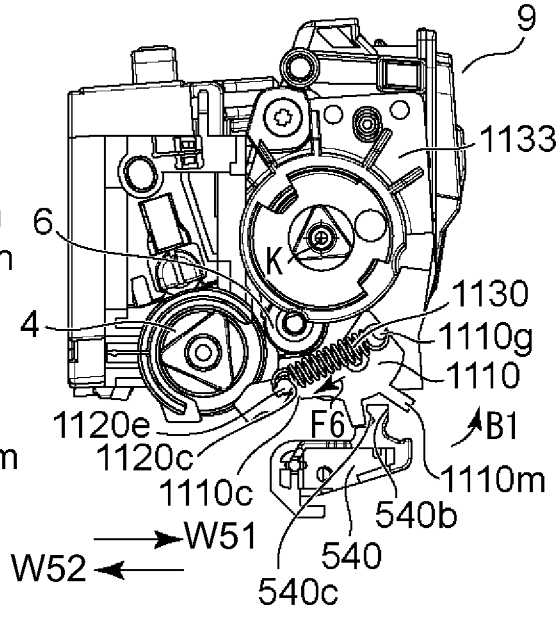

FIG. 156 is a sectional view of a process cartridge inside an image forming apparatus main assembly.

Figure 157:
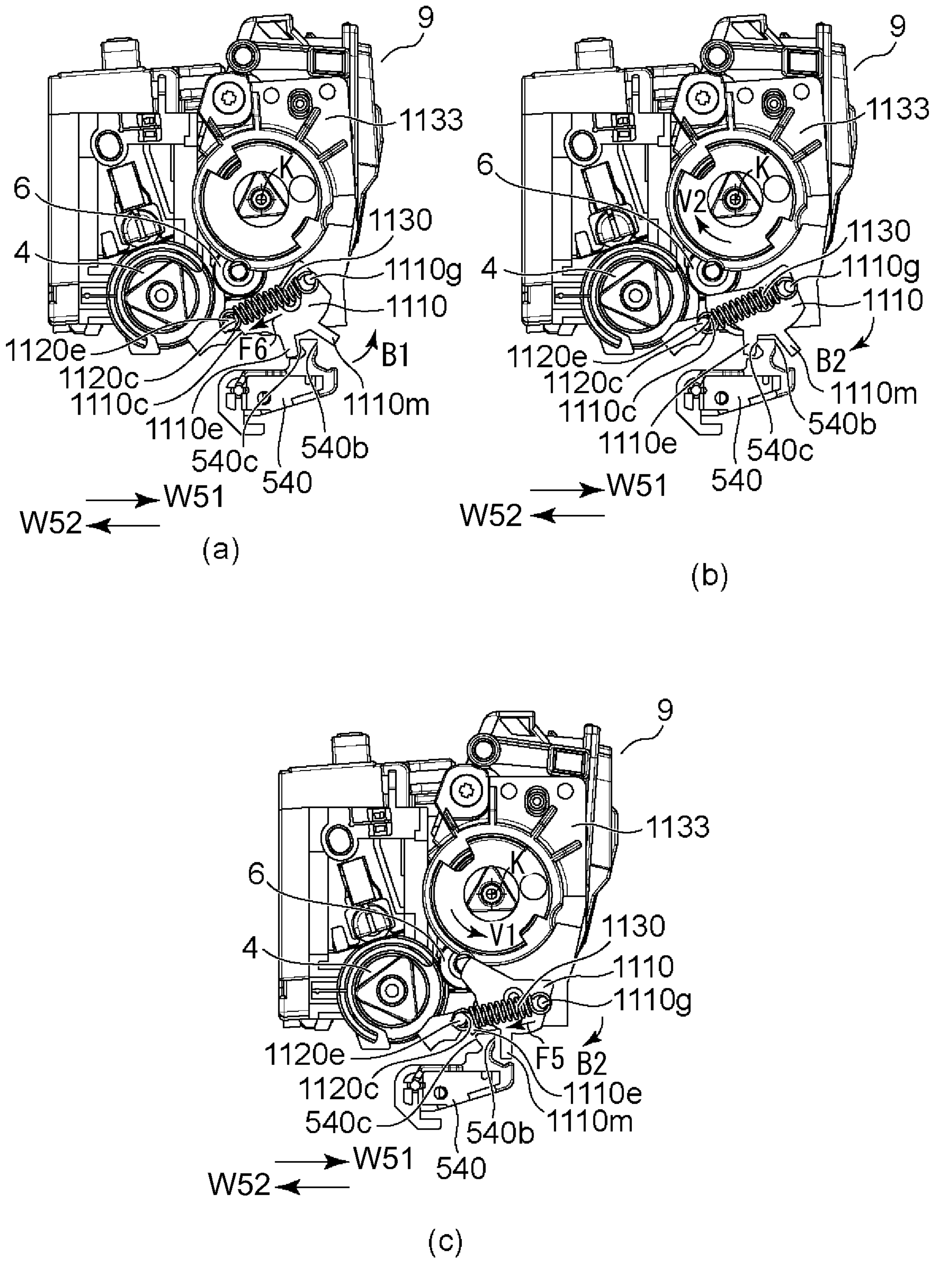

FIG. 157 is a sectional view of the process cartridge inside the image forming apparatus main assembly.

Figure 158:
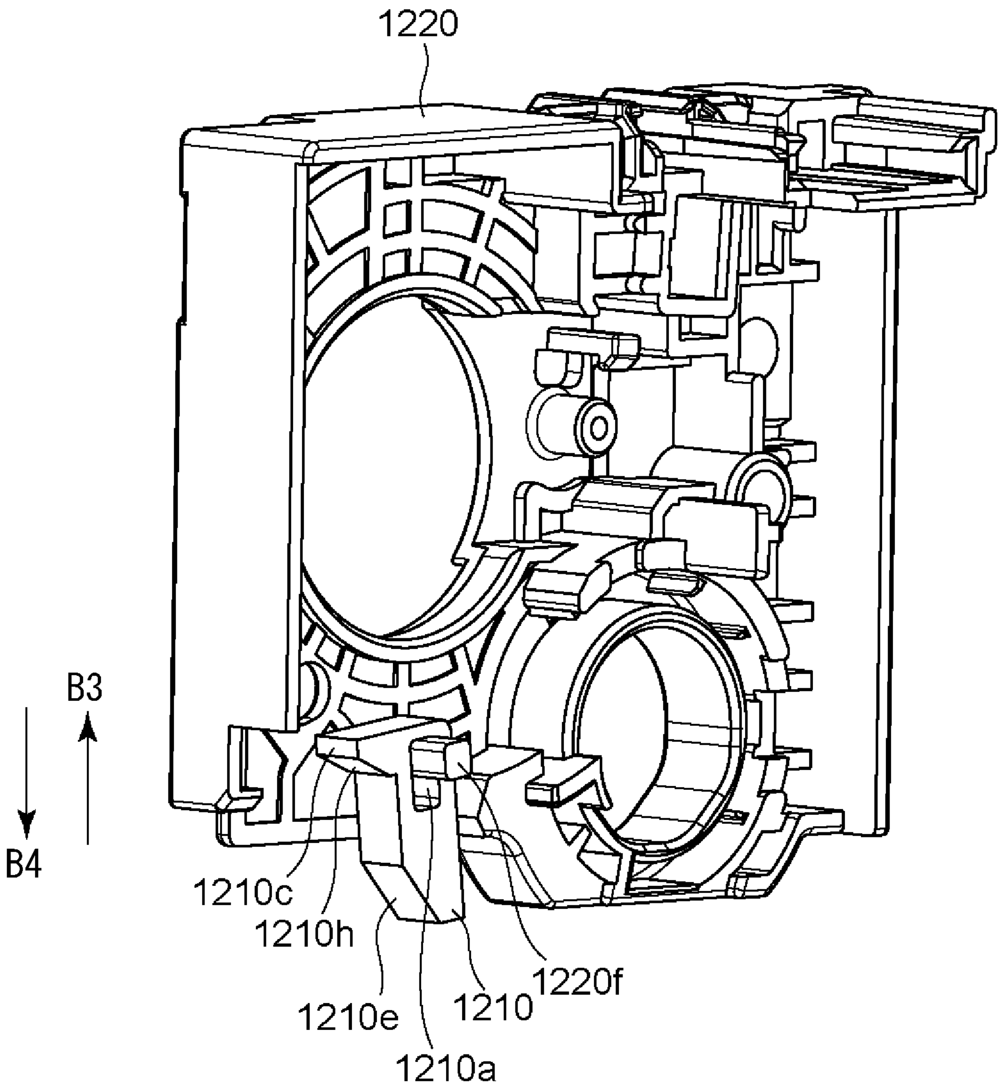

FIG. 158 is a perspective view illustrating a drive-side cartridge cover member and a spacer.

Figure 159:
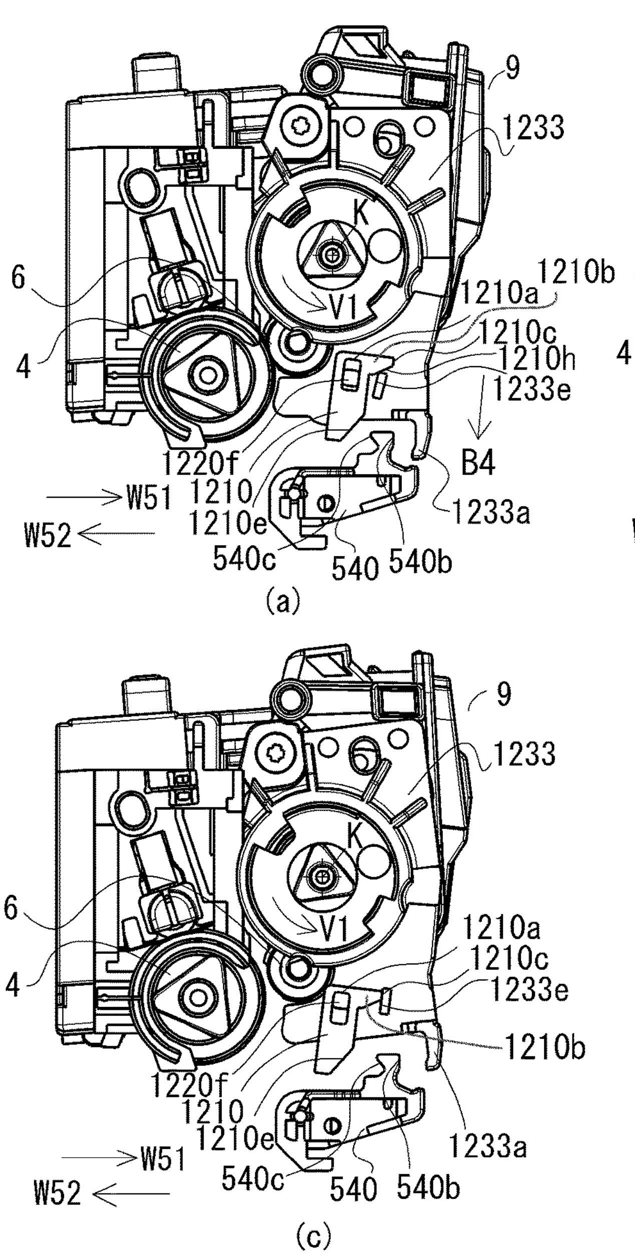

FIG. 159 is a sectional view of the process cartridge in the image forming apparatus main assembly.

Figure 160:
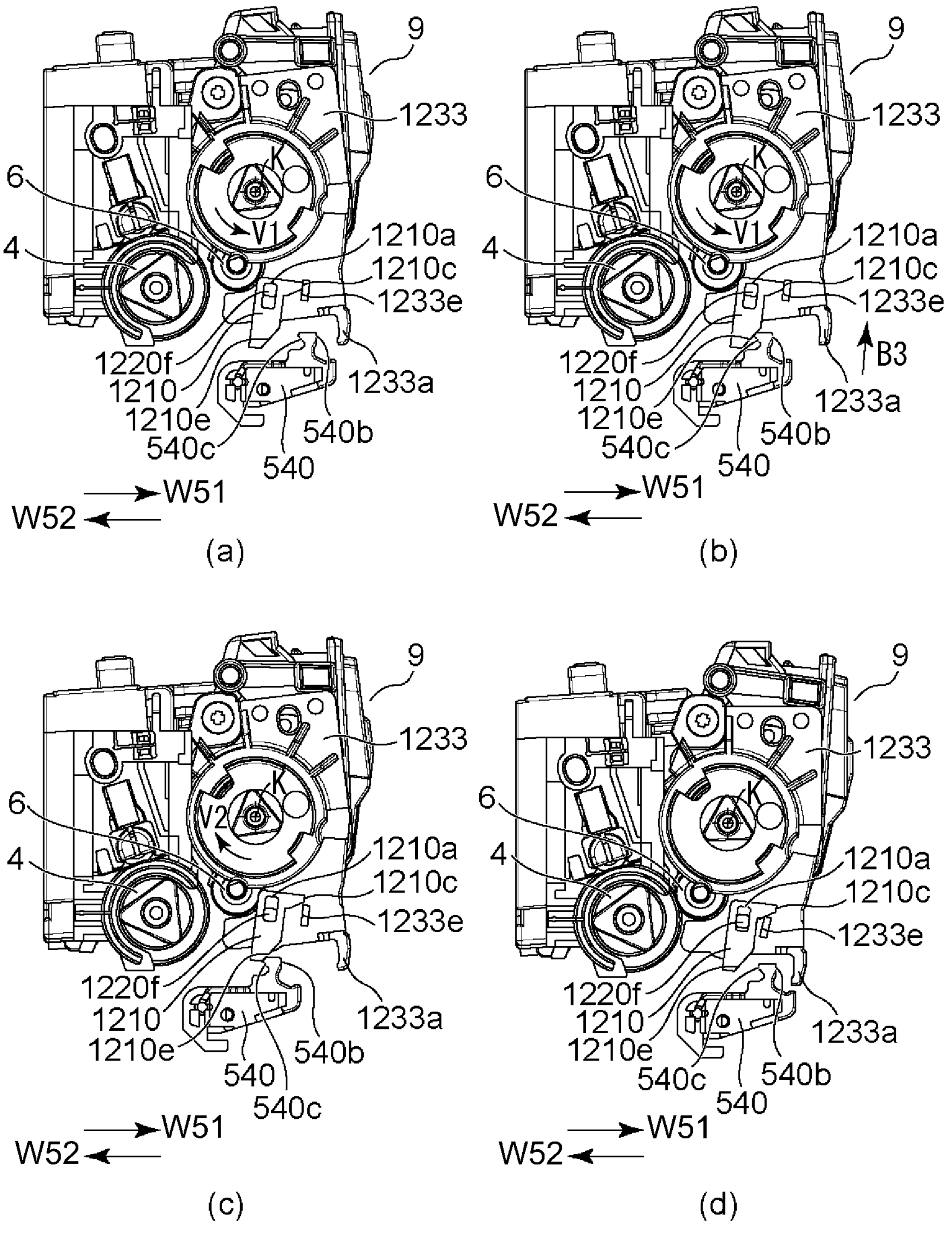

FIG. 160 is a sectional view of the process cartridge inside the image forming apparatus main assembly.

Figure 161:
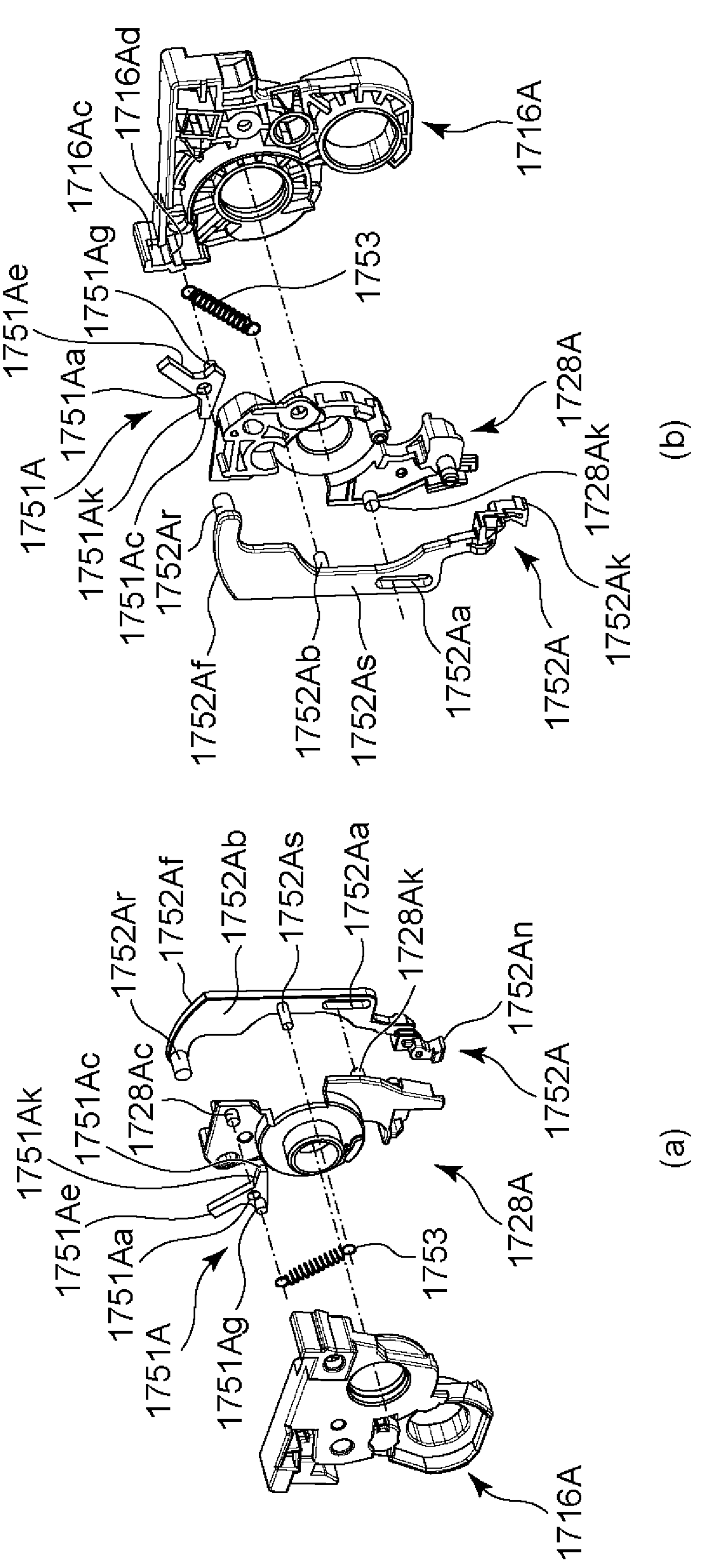

FIG. 161 is an illustration of a relationship between a movable member and a spacer.

Figure 162:
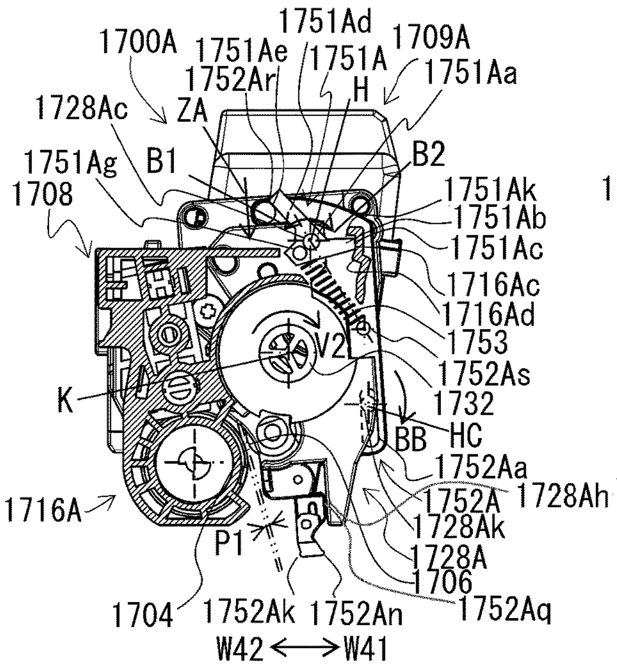
Figure 162:
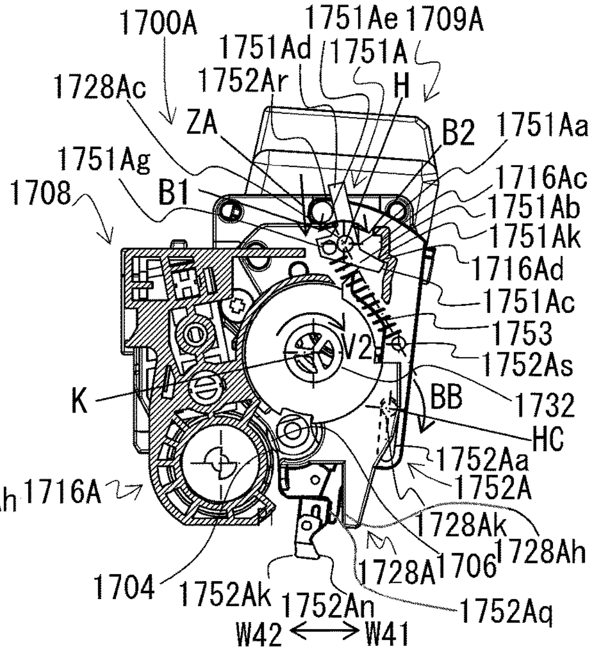

FIG. 162 is a cross-sectional view of a process cartridge.

Figure 163:
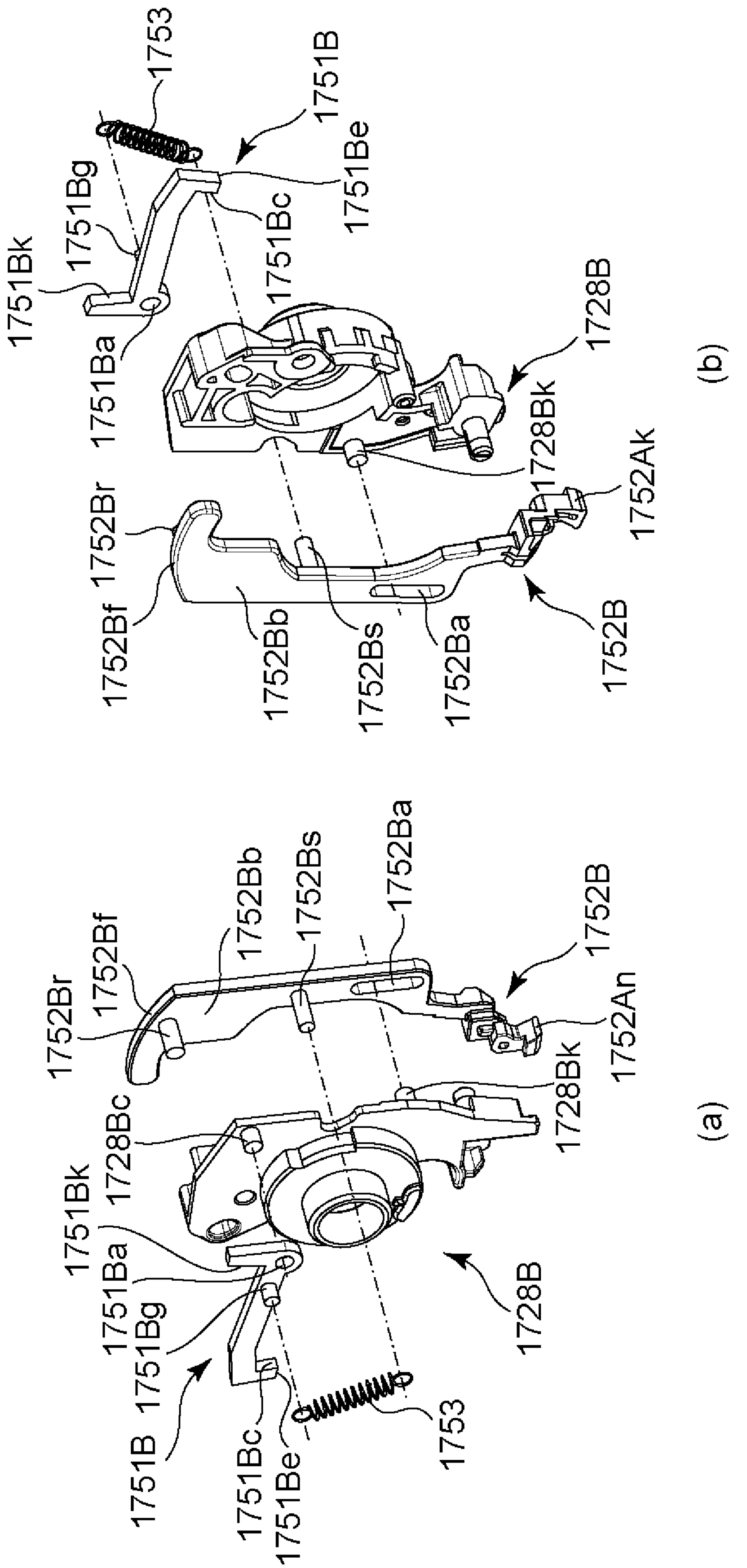

FIG. 163 is an illustration of the relationship between the movable member and the spacer.

Figure 164:
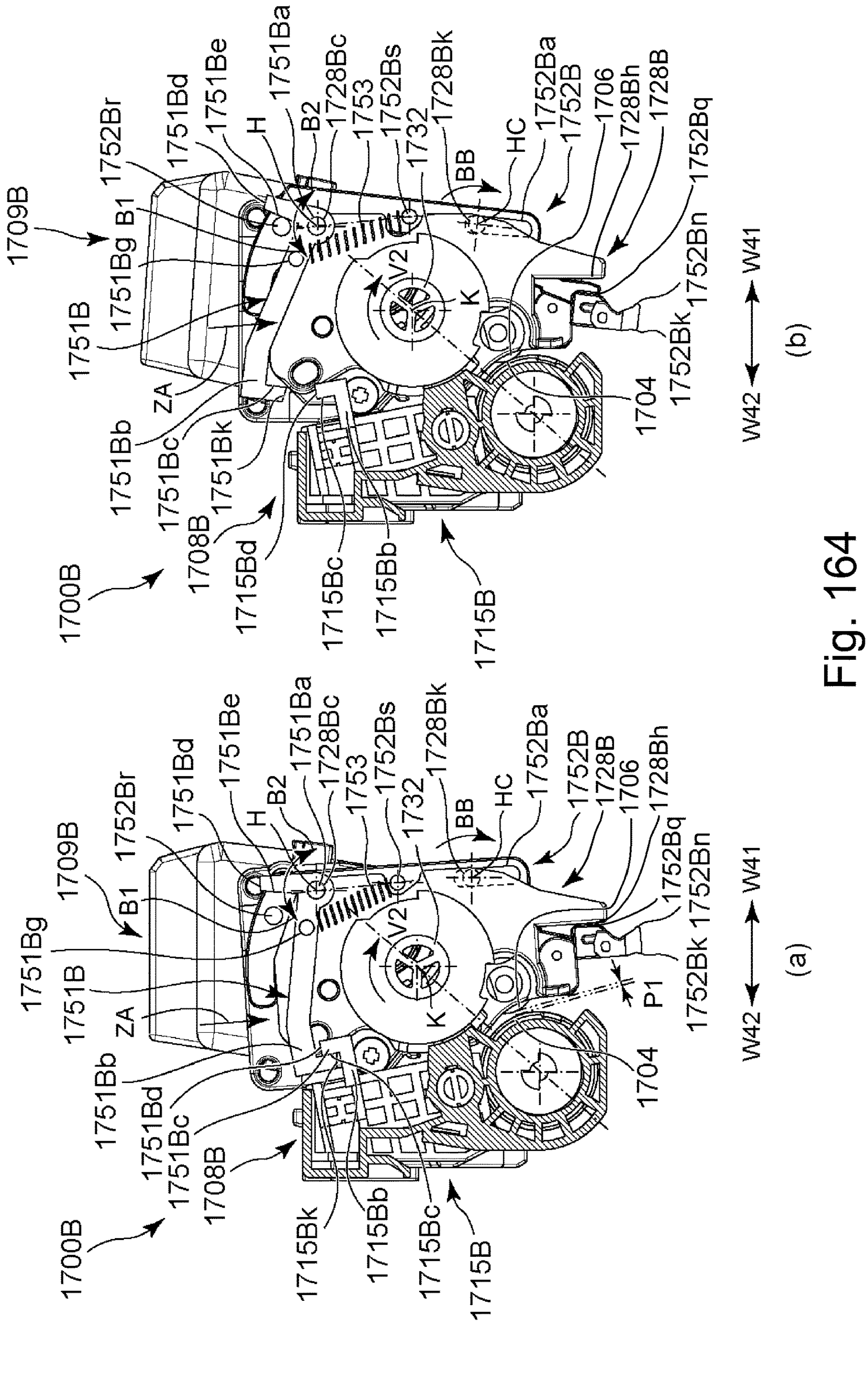

FIG. 164 is a sectional view of the process cartridge.

Figure 165:
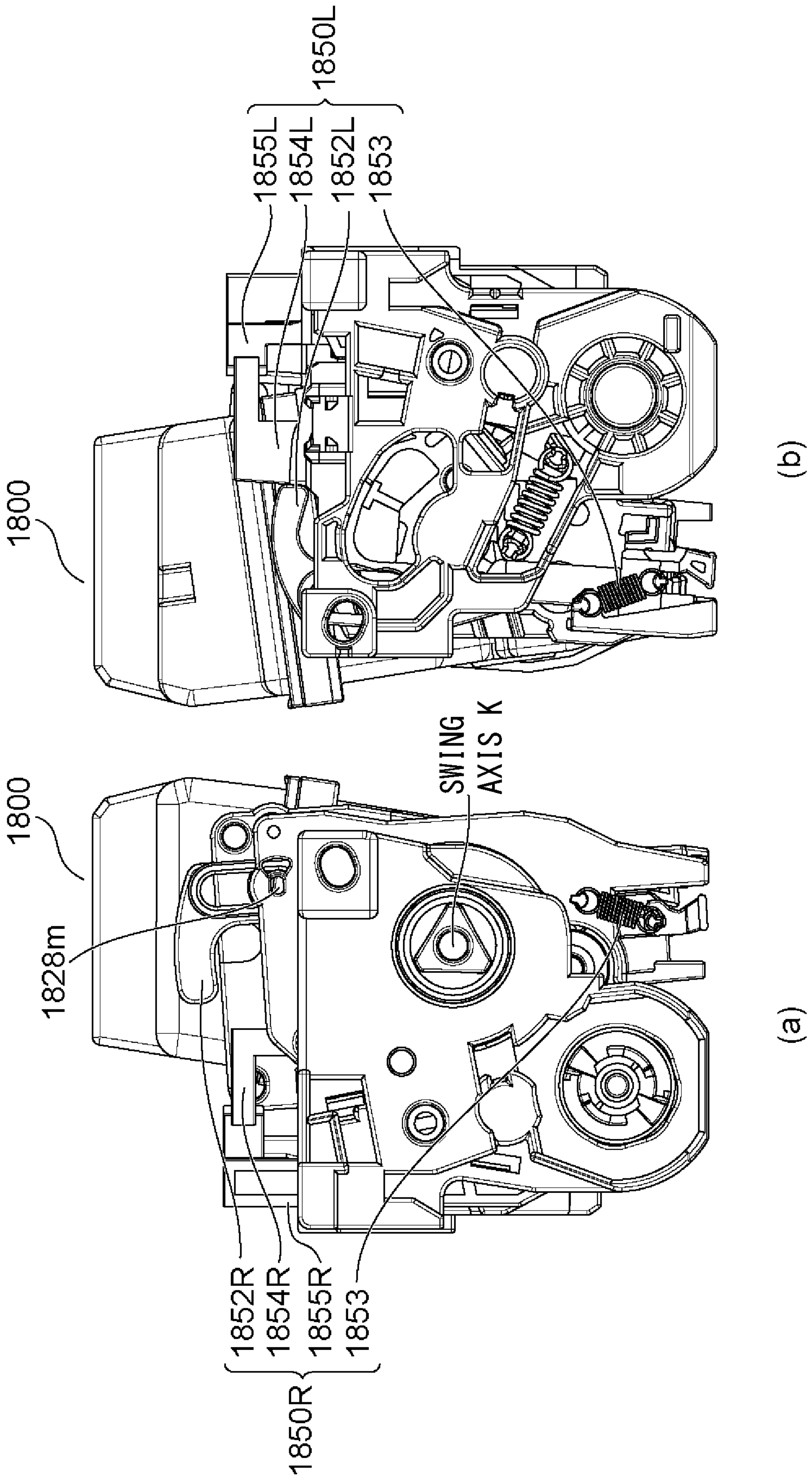

FIG. 165 is a side view of a process cartridge.

Figure 166:
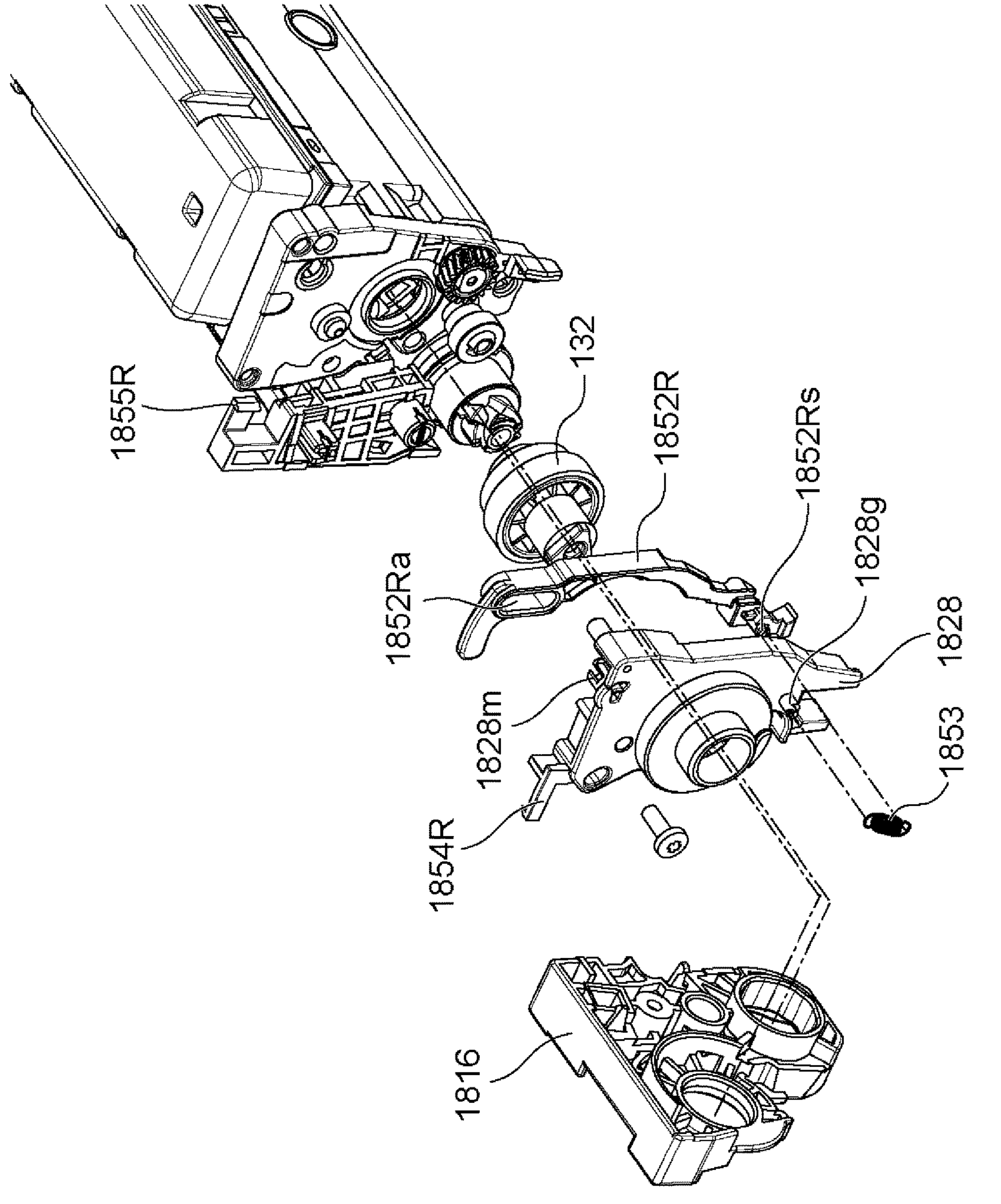

FIG. 166 is an exploded perspective view of the process cartridge.

Figure 167:
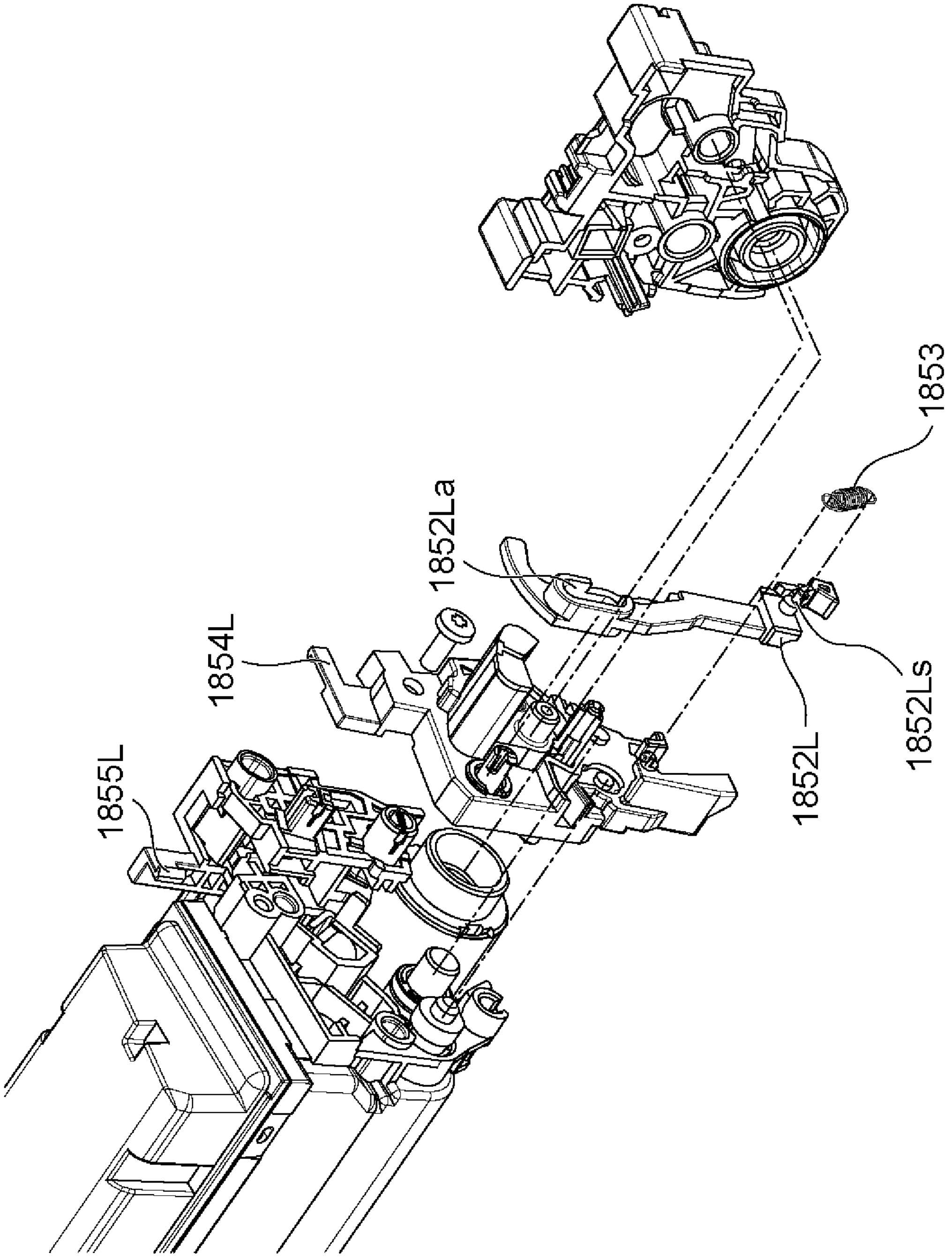

FIG. 167 is an exploded perspective view of the process cartridge.

Figure 168:
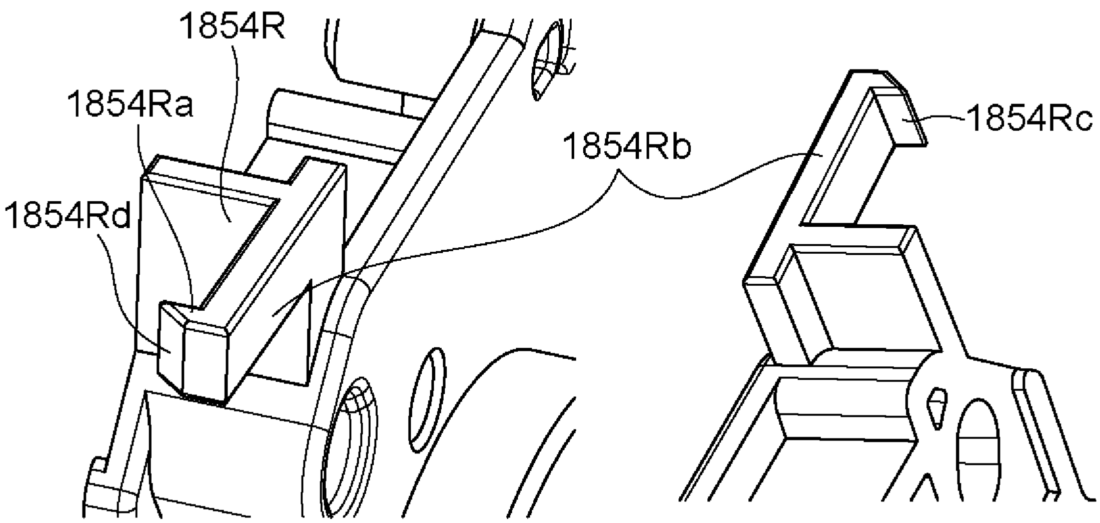

FIG. 168 is a perspective view of a developing side engaging portion.

Figure 169:
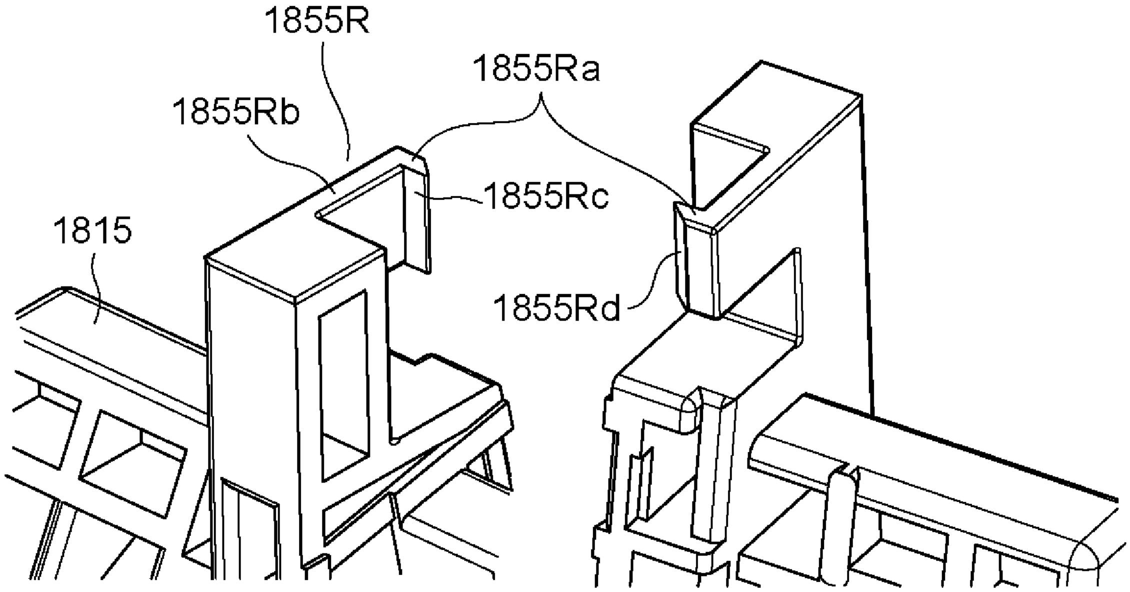

FIG. 169 is a perspective view of a drum side engaging portion.

Figure 170:
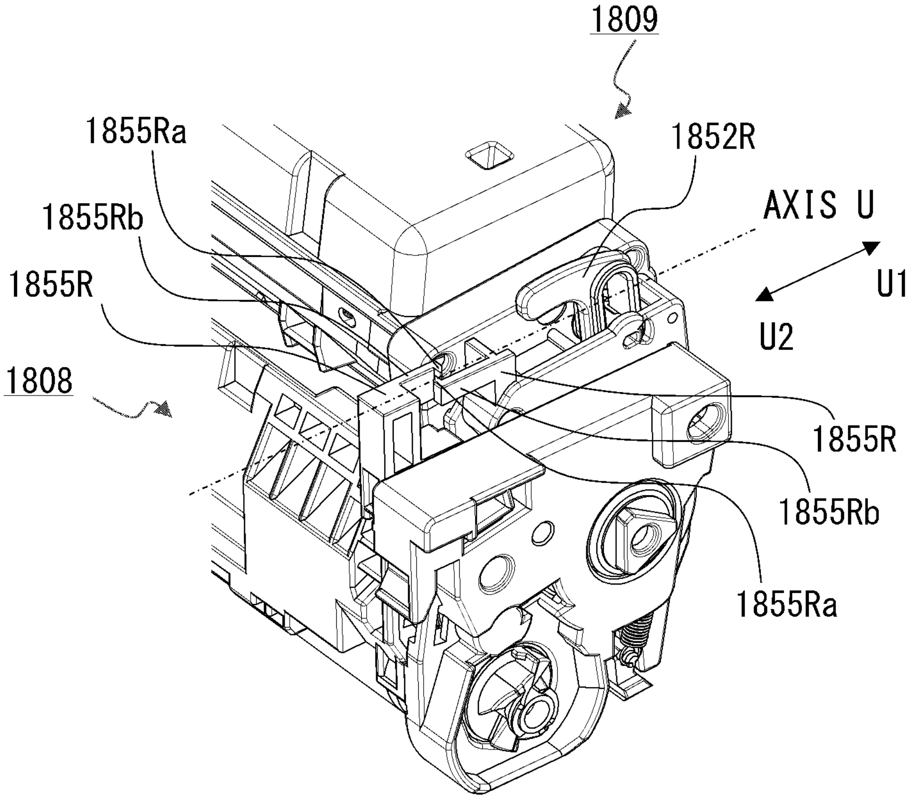

FIG. 170 is a perspective view of the process cartridge.

Figure 171:
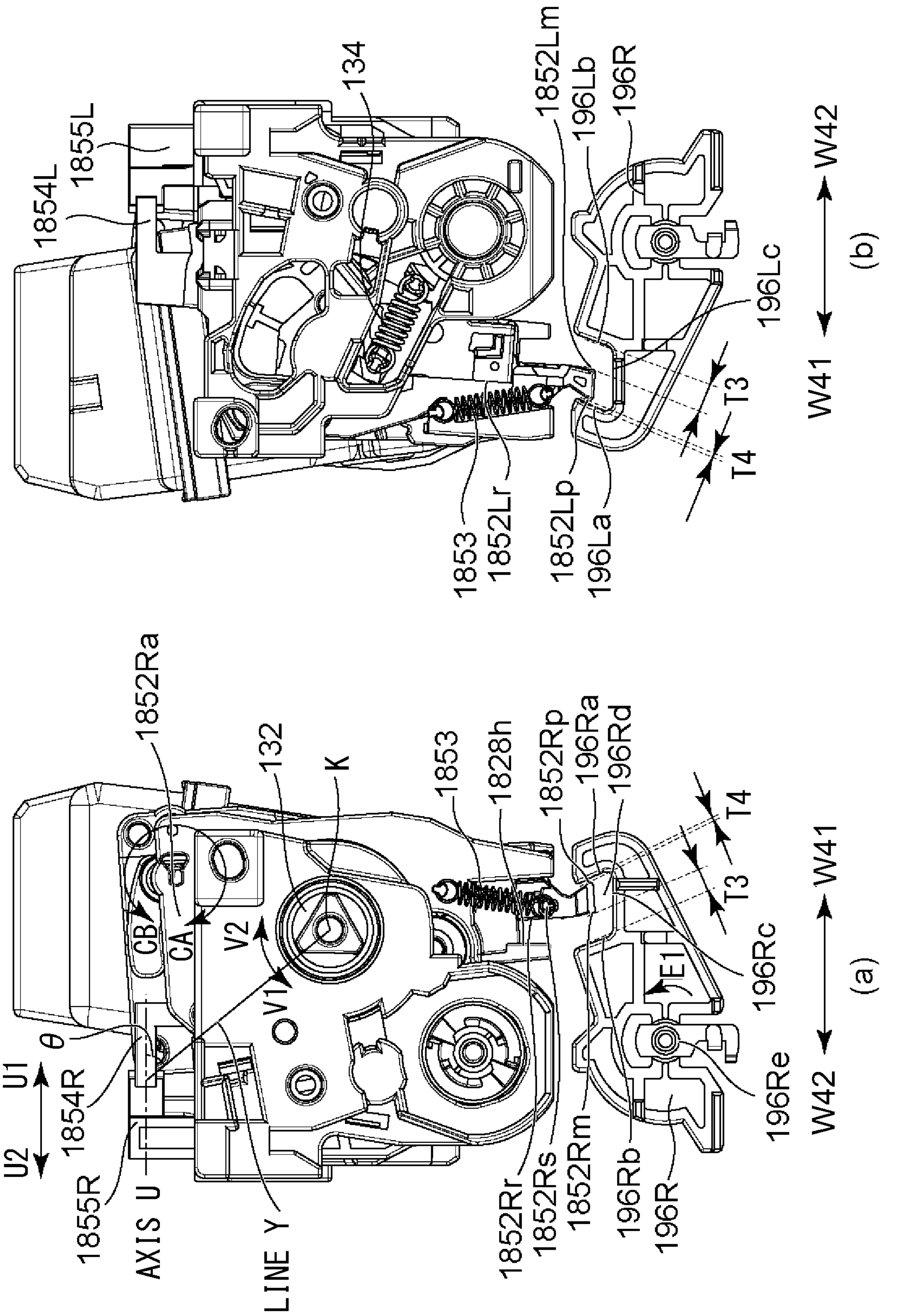

FIG. 171 is a side view of the process cartridge in the image forming apparatus main assembly.

Figure 172:
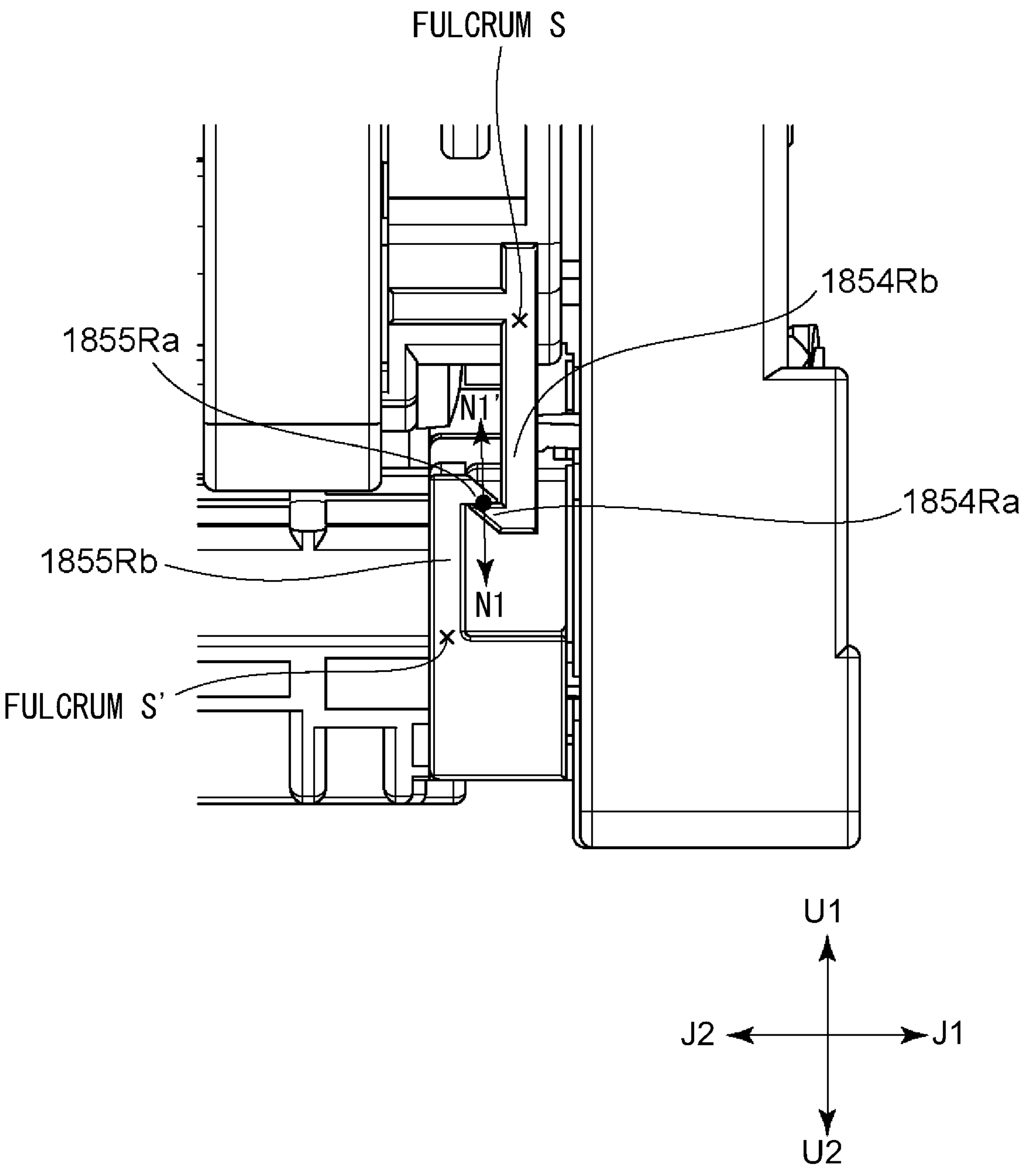

FIG. 172 is a partial top view of the process cartridge.

Figure 173:
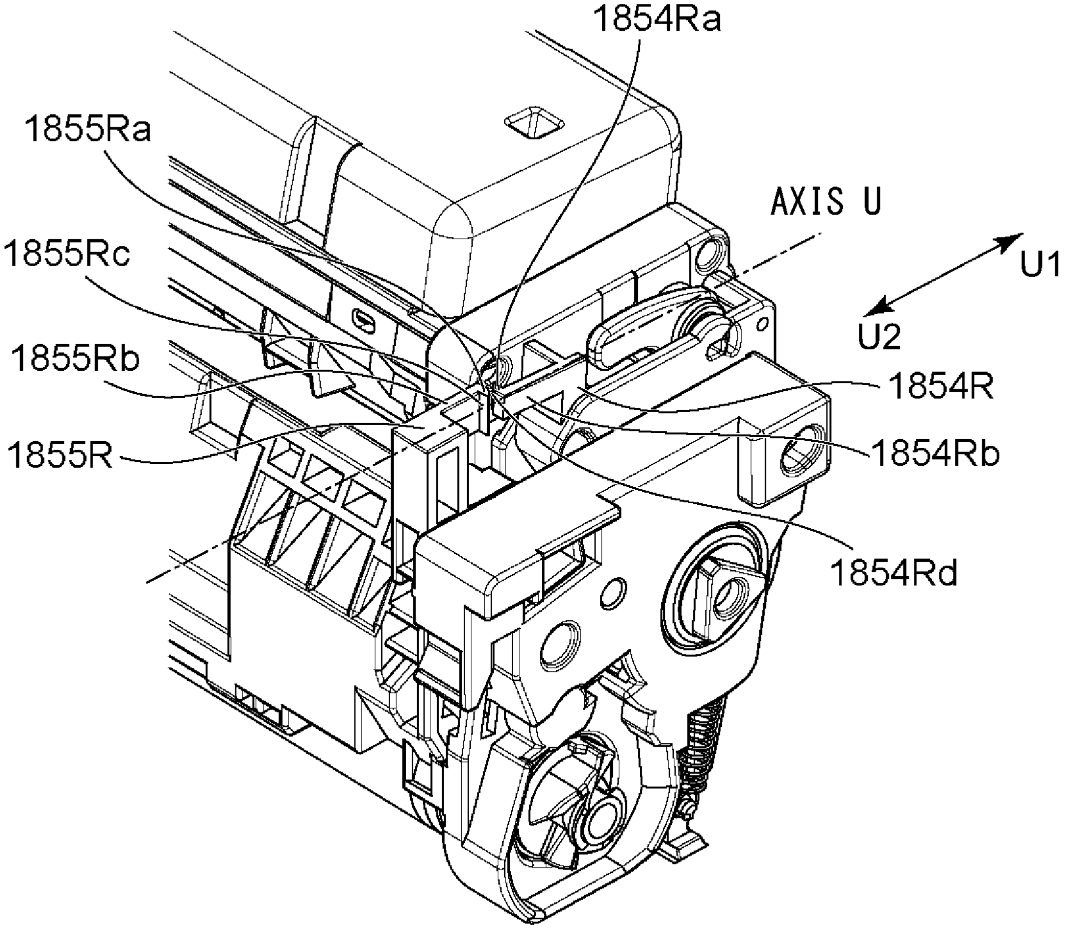

FIG. 173 is a perspective view of the process cartridge.

Figure 174:
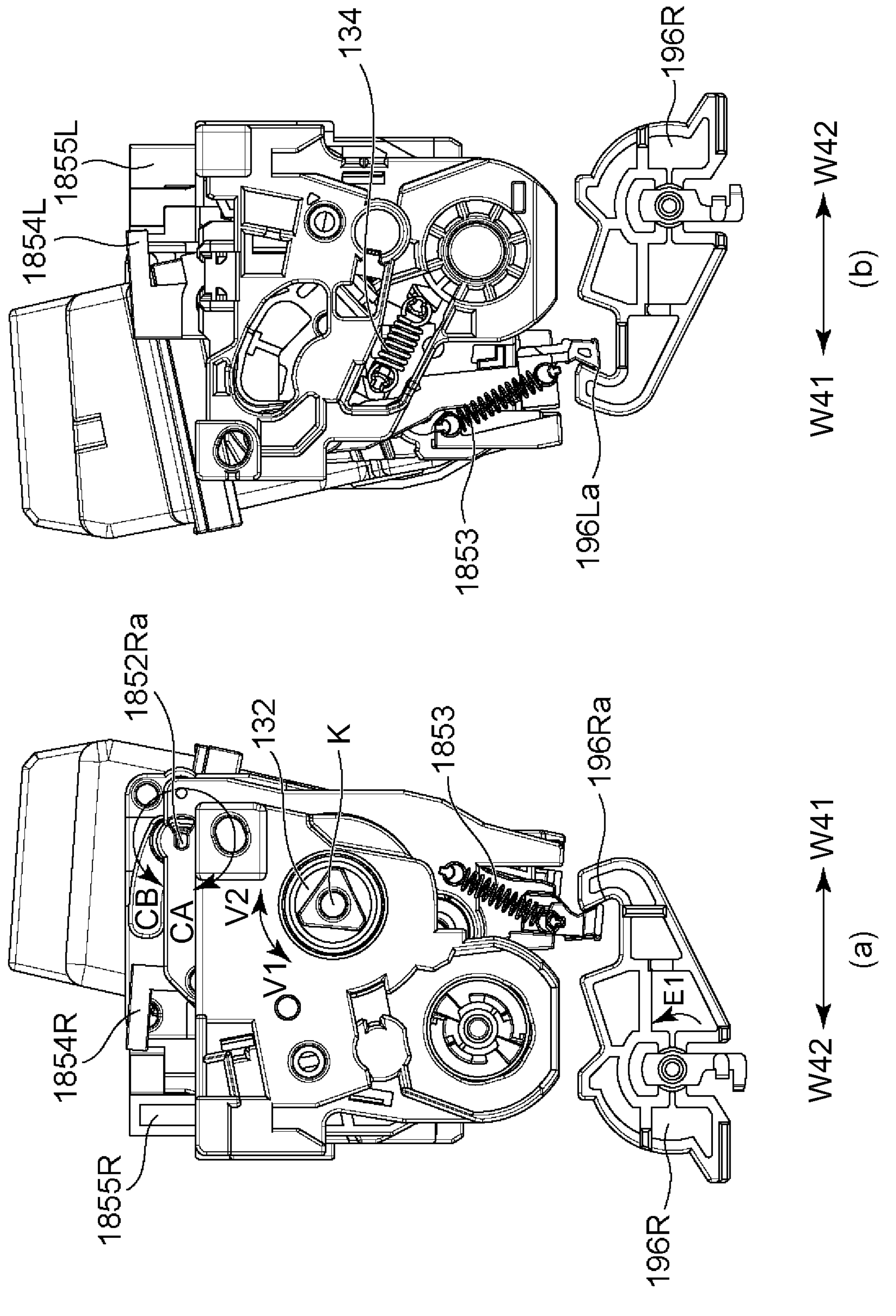

FIG. 174 is a side view of the process cartridge in the image forming apparatus main assembly.

Figure 175:
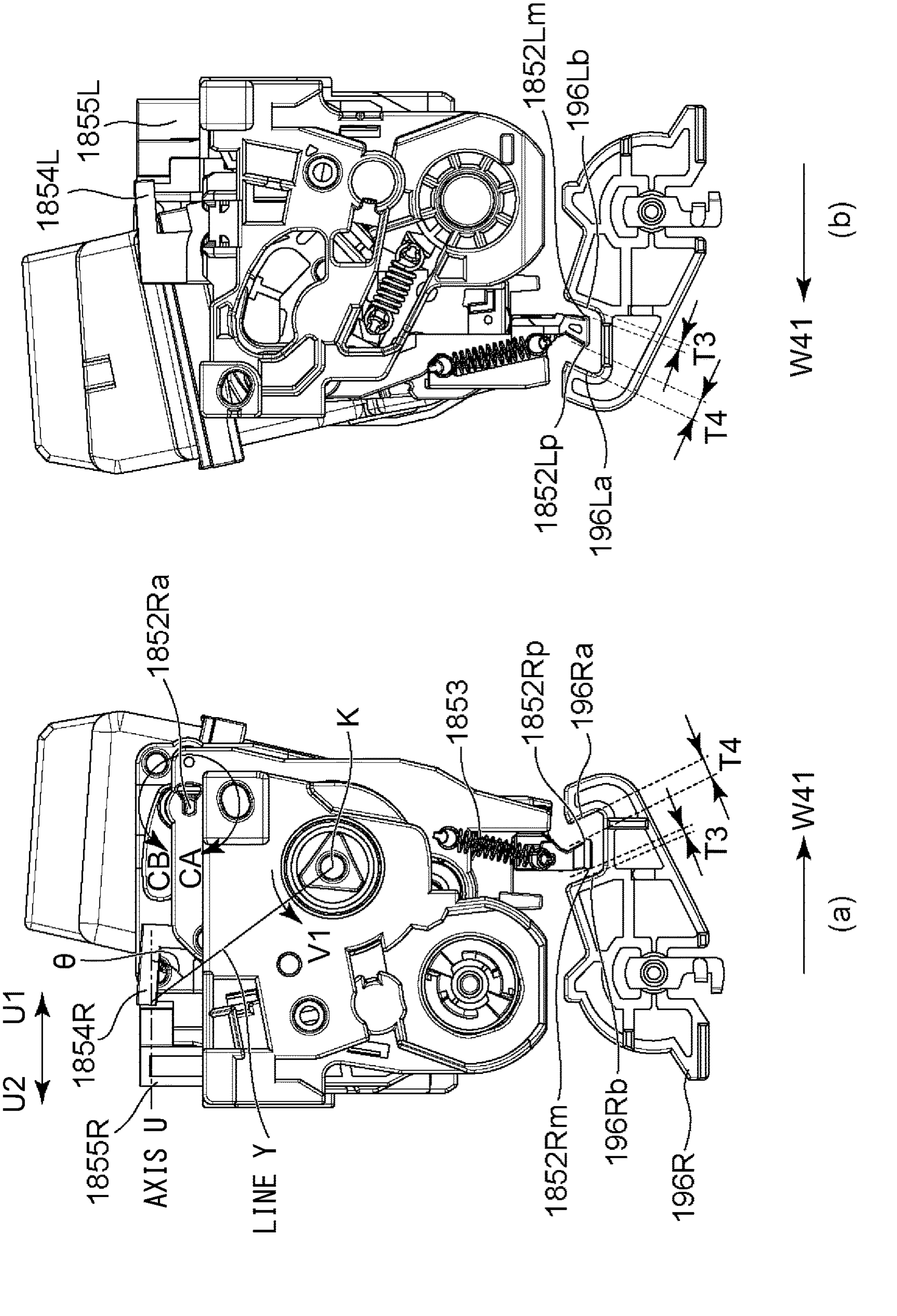

FIG. 175 is a side view of the process cartridge in the image forming apparatus main assembly.

Figure 176:
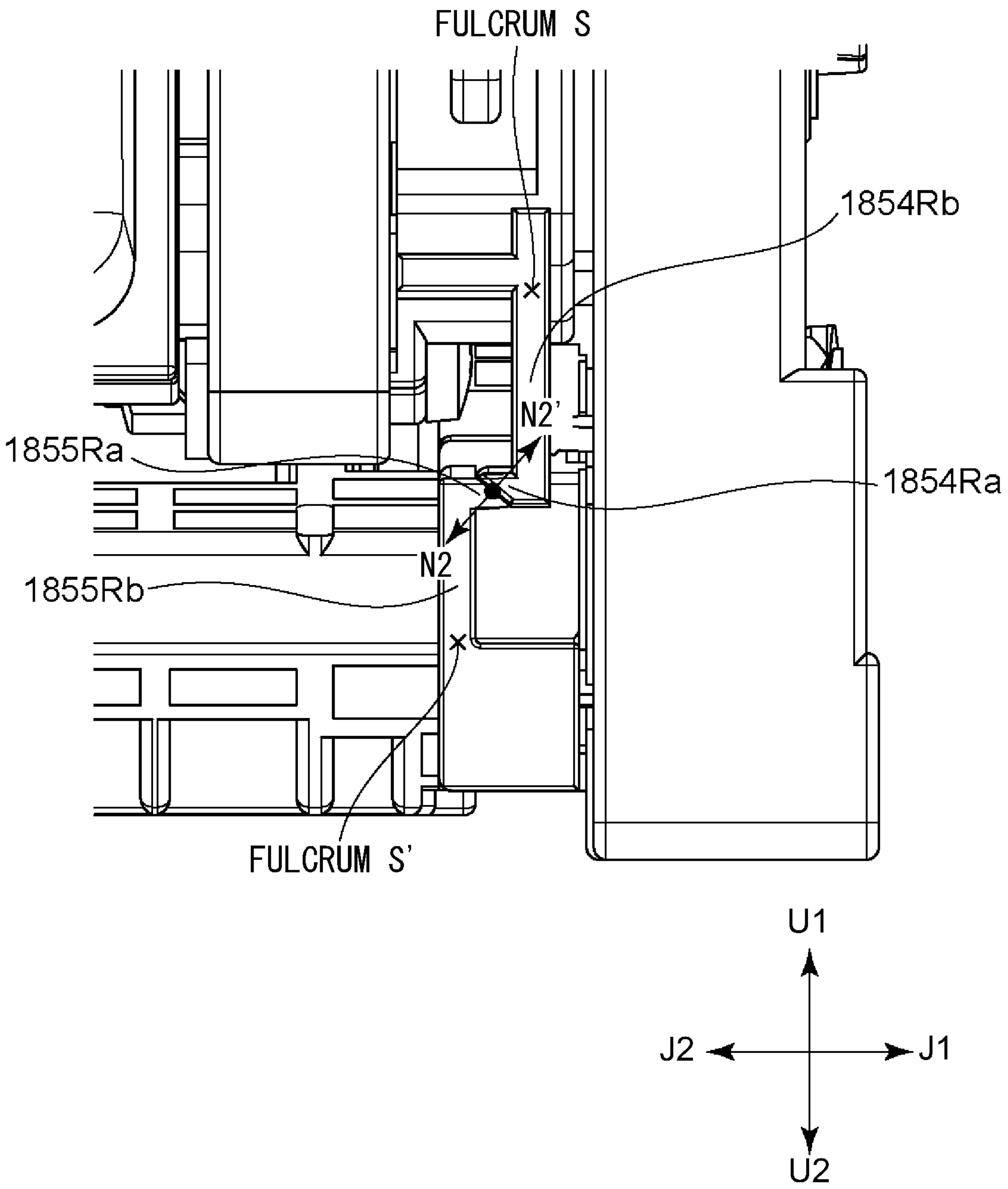

FIG. 176 is a partial top view of the process cartridge.

Figure 177:
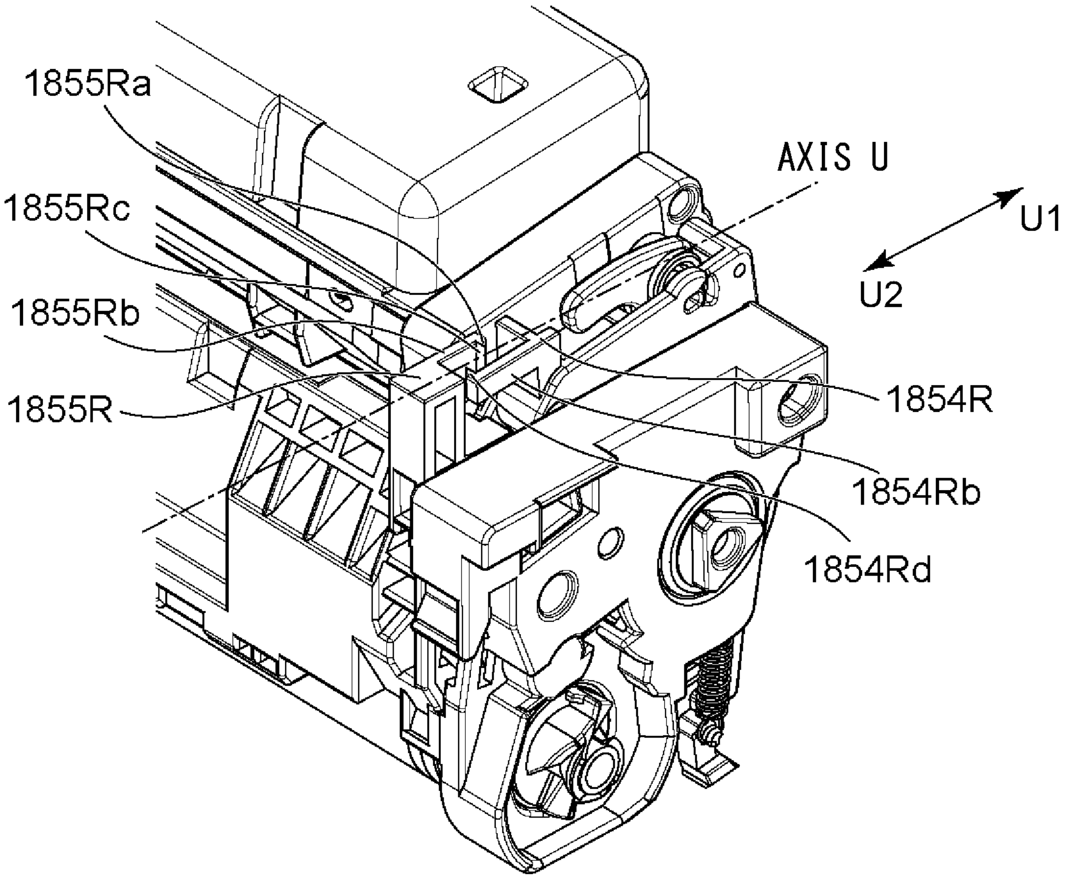

FIG. 177 is a perspective view of the process cartridge.

Figure 178:
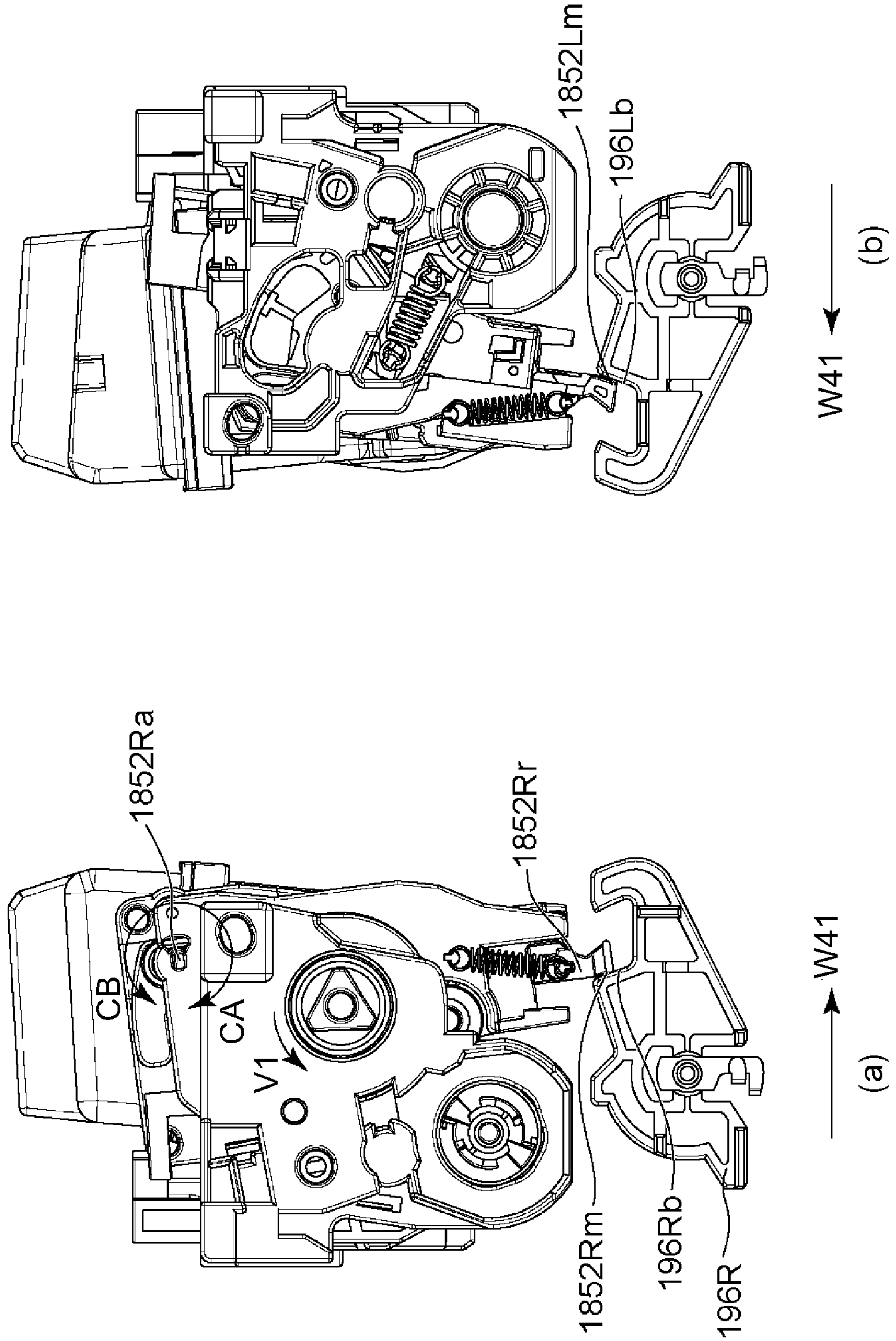

FIG. 178 is a side view of the process cartridge in the image forming apparatus main assembly.

Figure 179:
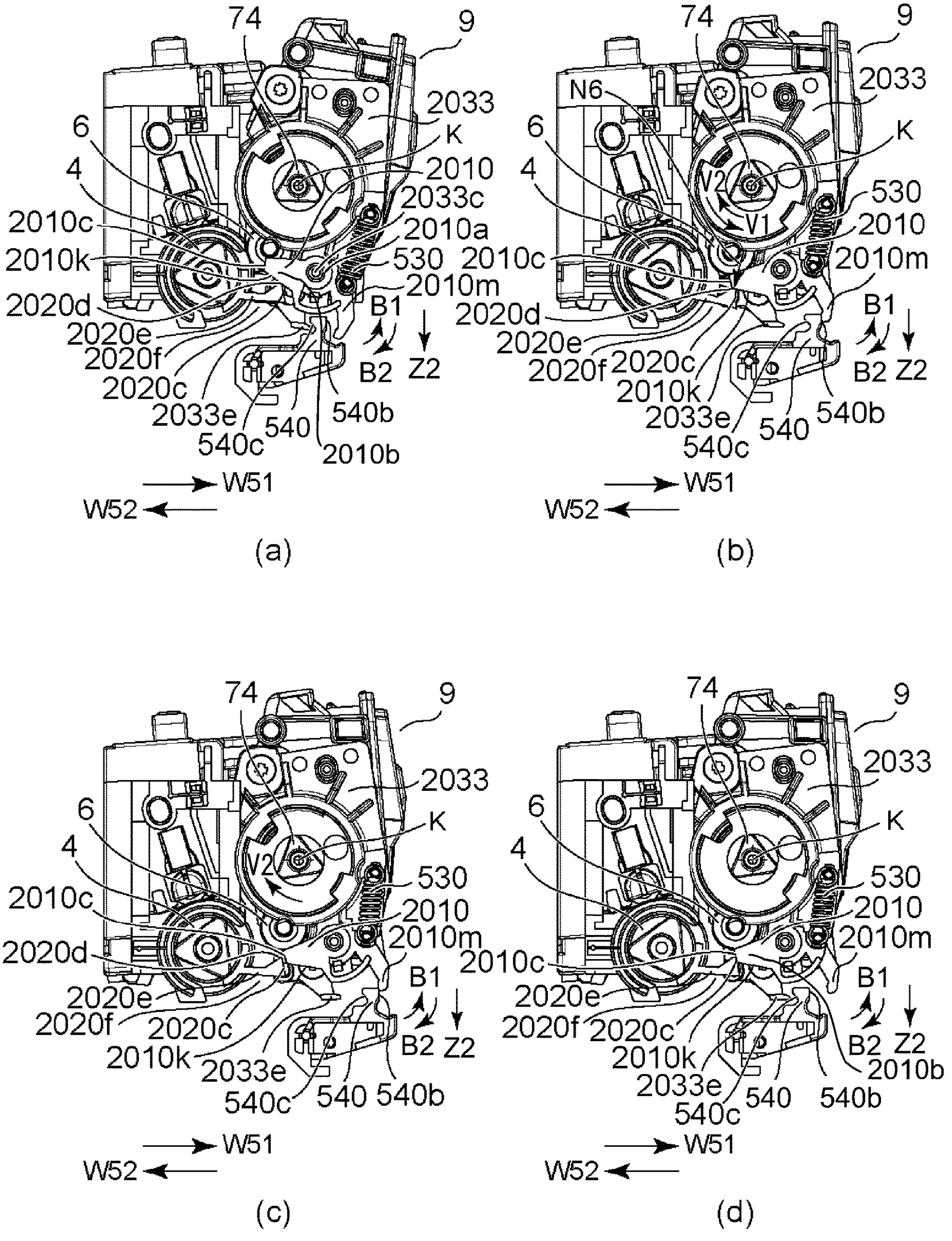

FIG. 179 is a sectional view of a process cartridge inside an image forming apparatus main assembly.

Figure 180:
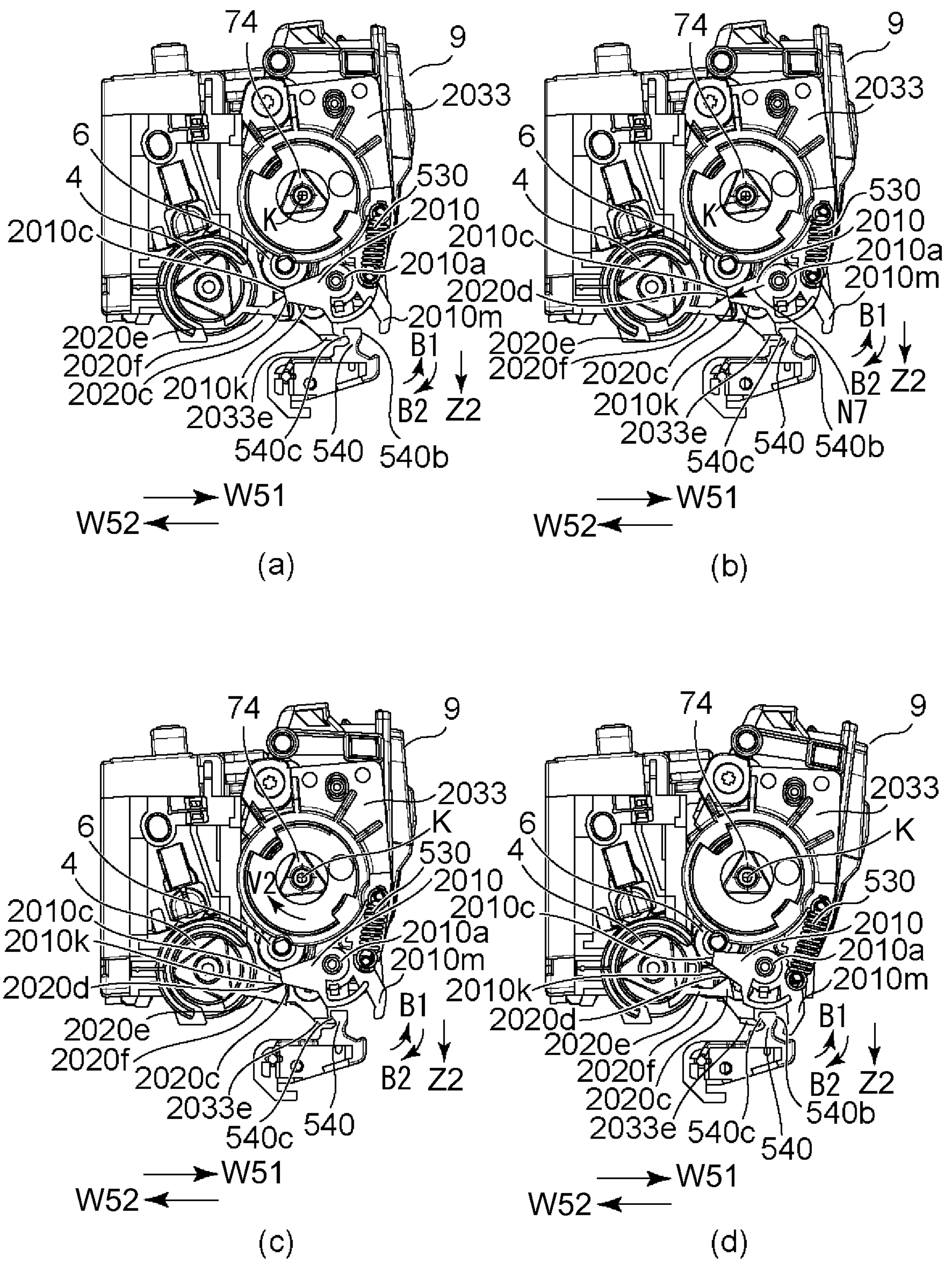

FIG. 180 is a sectional view of the process cartridge inside the image forming apparatus main assembly.

Figure 181:
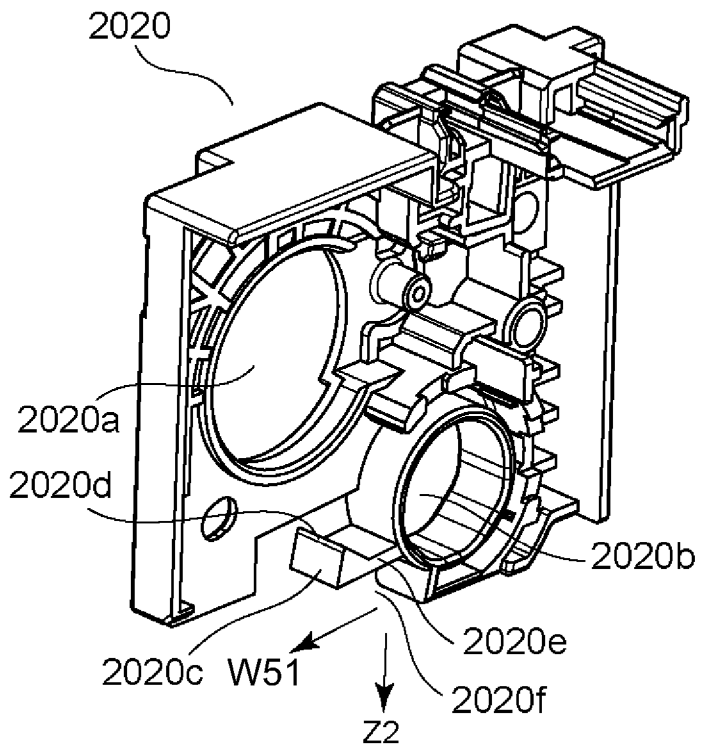
Figure 181:
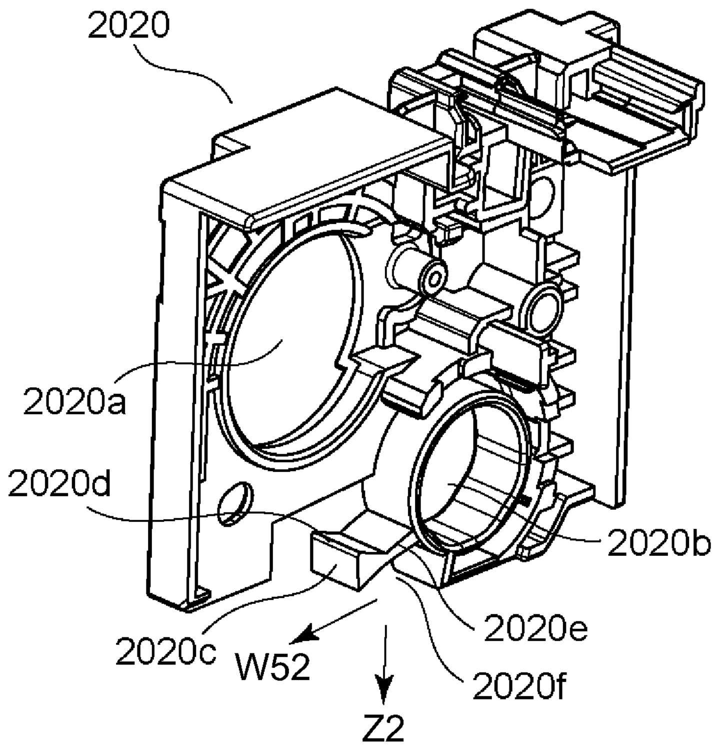

FIG. 181 is a perspective view of a drive-side cartridge cover.

Figure 182:
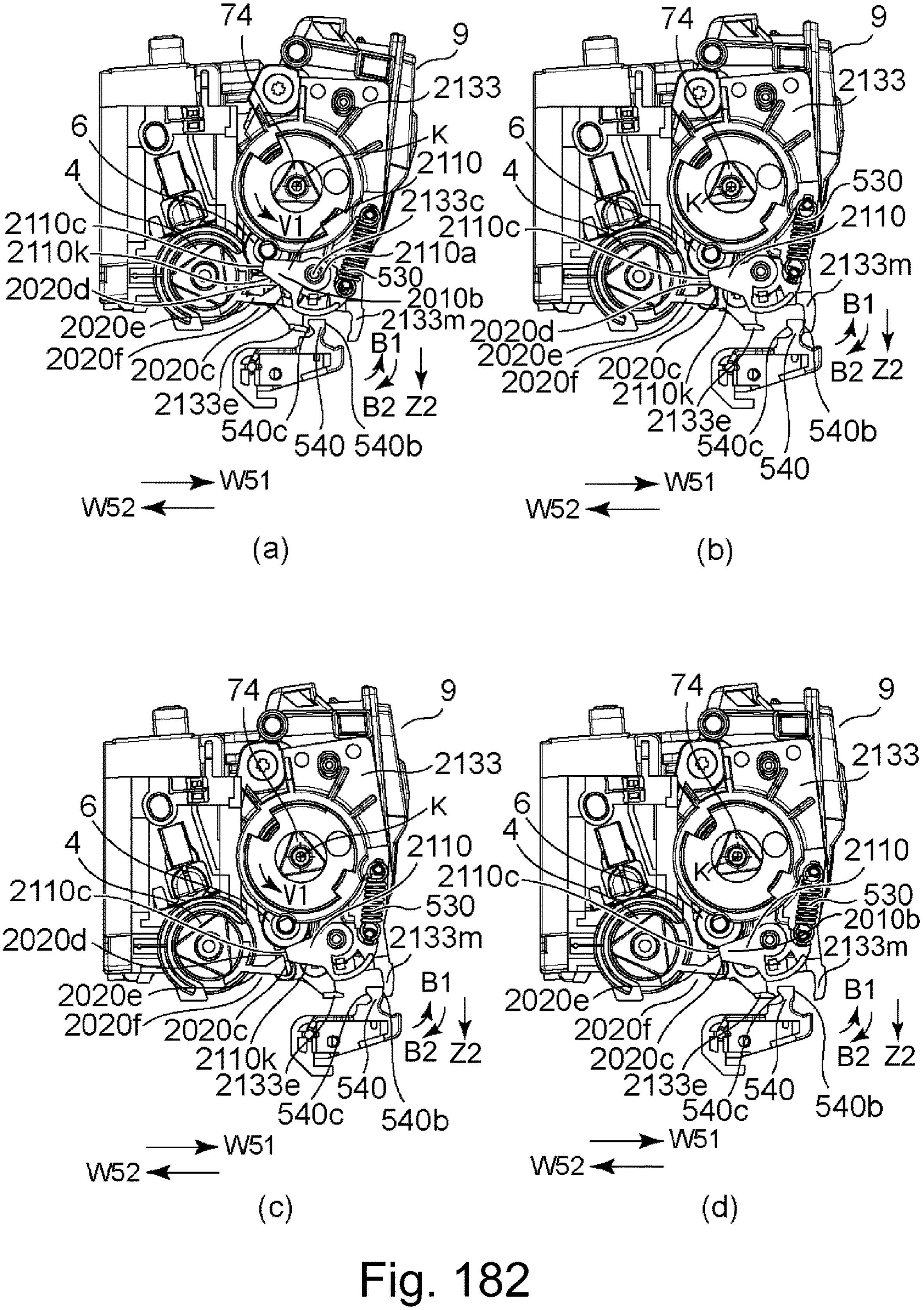

FIG. 182 is a sectional view of a process cartridge in an image forming apparatus main assembly.

Figure 183:
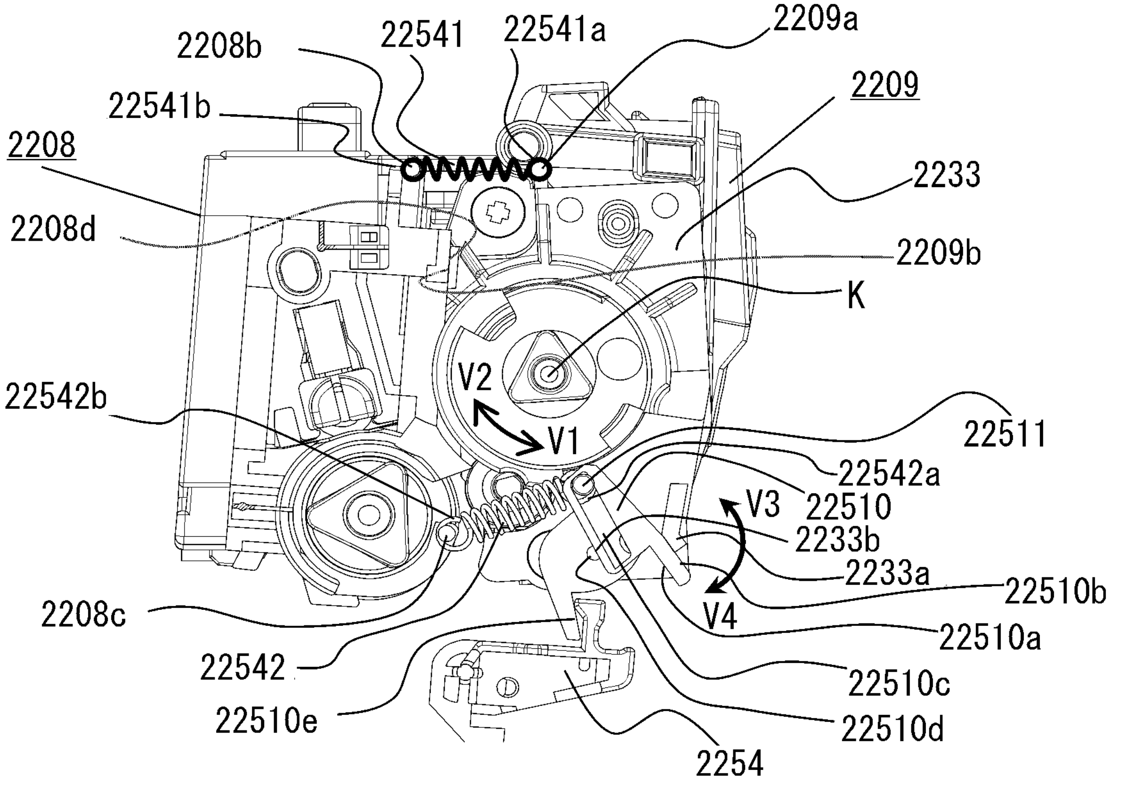

FIG. 183 is a sectional view of a process cartridge inside an image forming apparatus main assembly.

Figure 184:
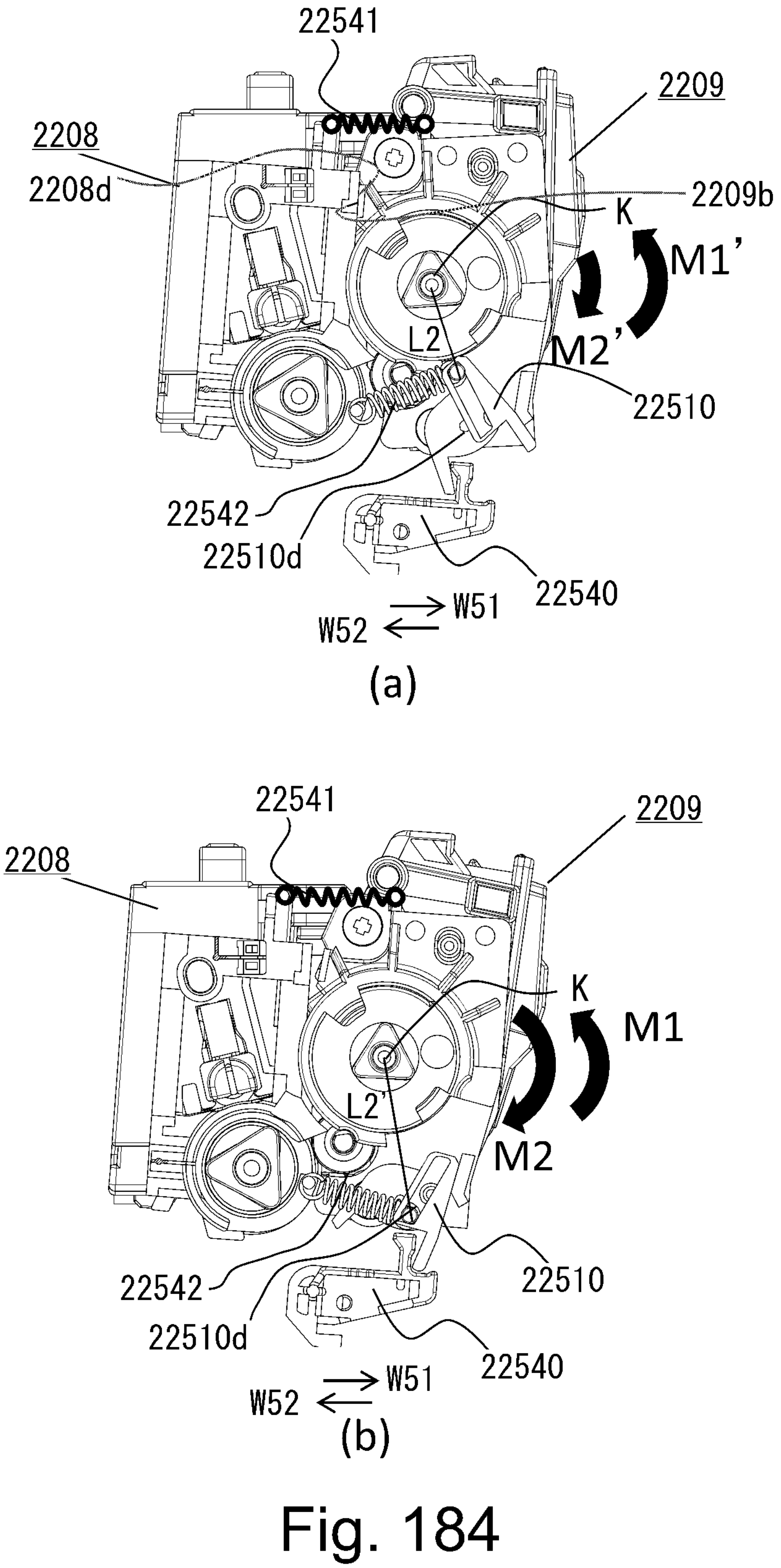

FIG. 184 is a sectional view of the process cartridge inside the image forming apparatus main assembly.

Figure 185:
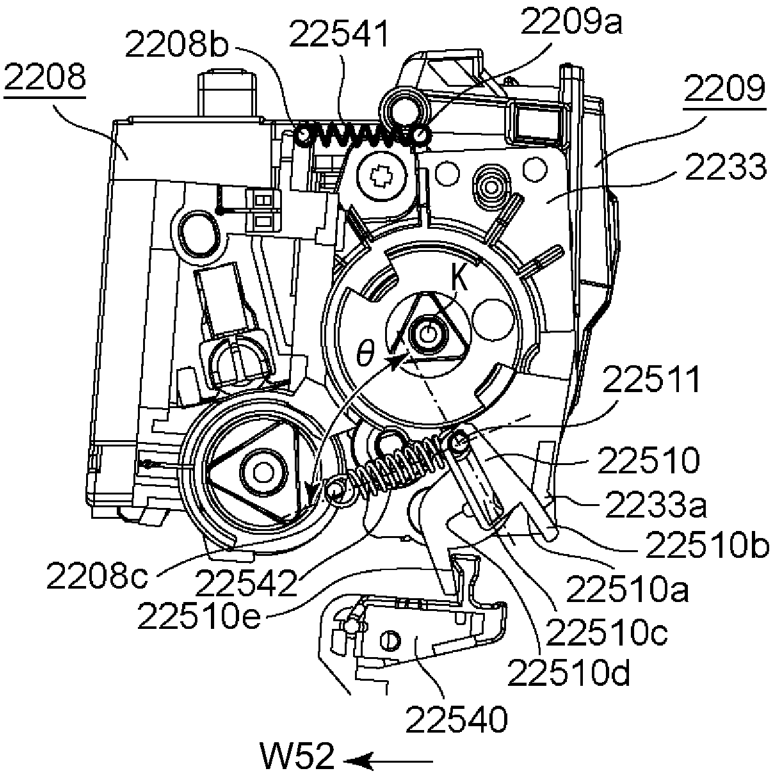
Figure 185:
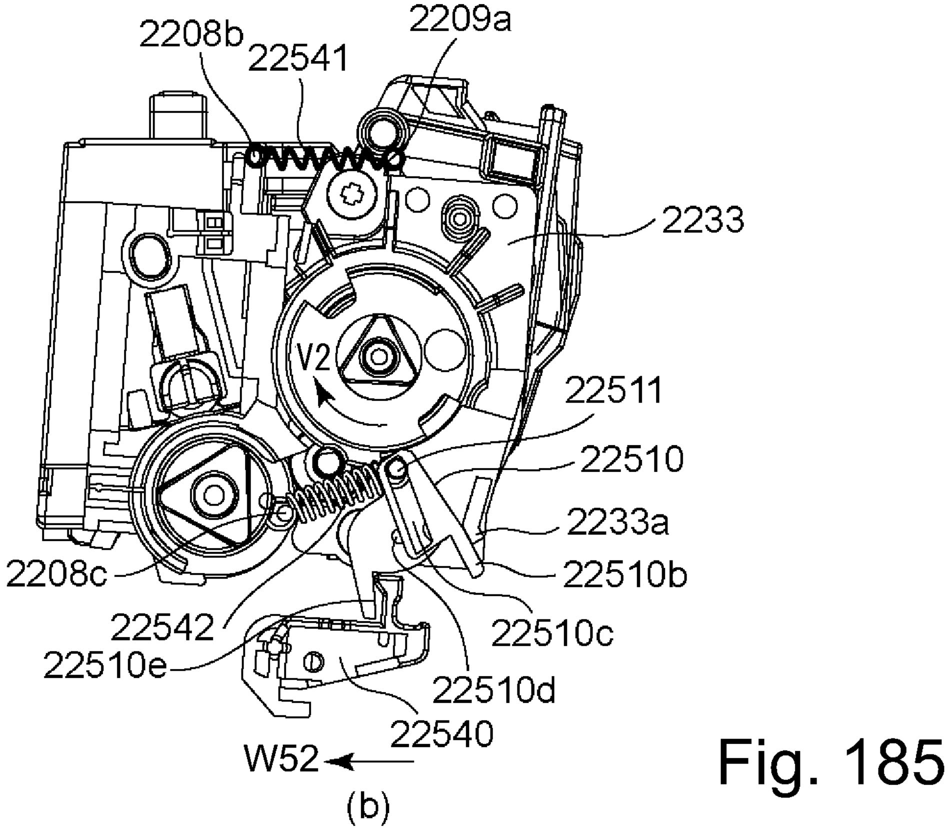

FIG. 185 is a sectional view of the process cartridge in the image forming apparatus main assembly.

Figure 186:
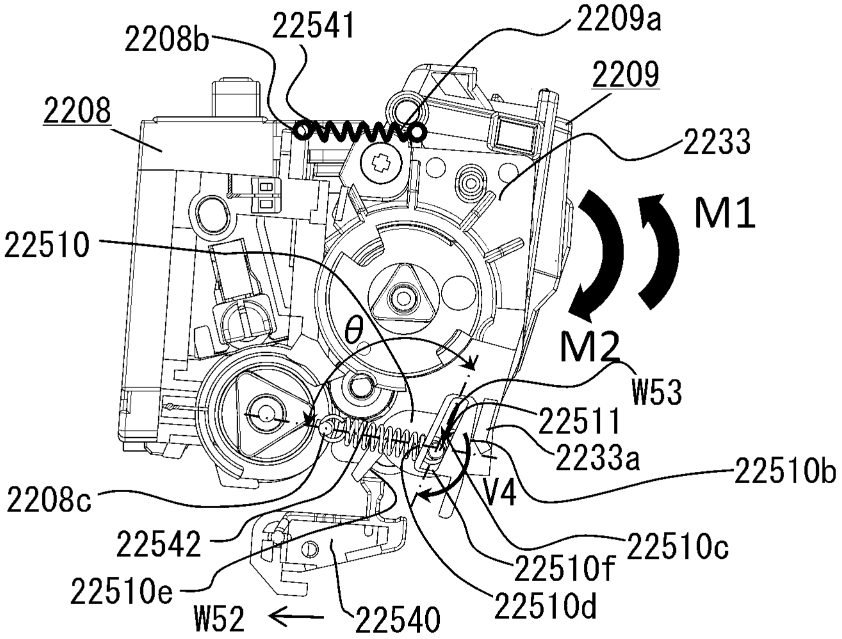
Figure 186:
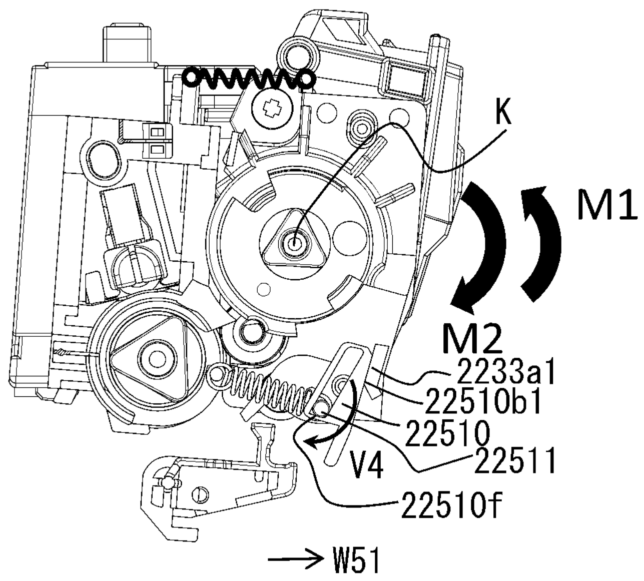

FIG. 186 is a sectional view of the process cartridge inside the image forming apparatus main assembly.

Figure 187:
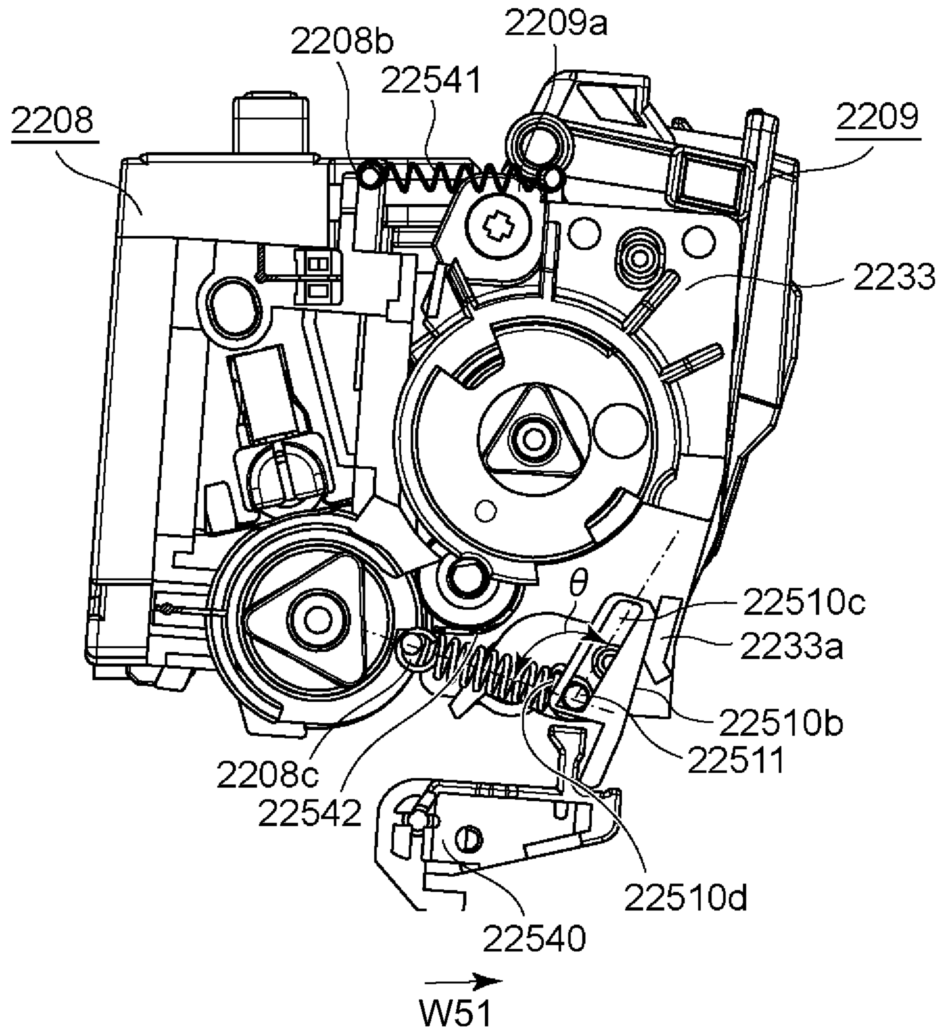

FIG. 187 is a cross-sectional view of the process cartridge inside the image forming apparatus main assembly.

Figure 188:
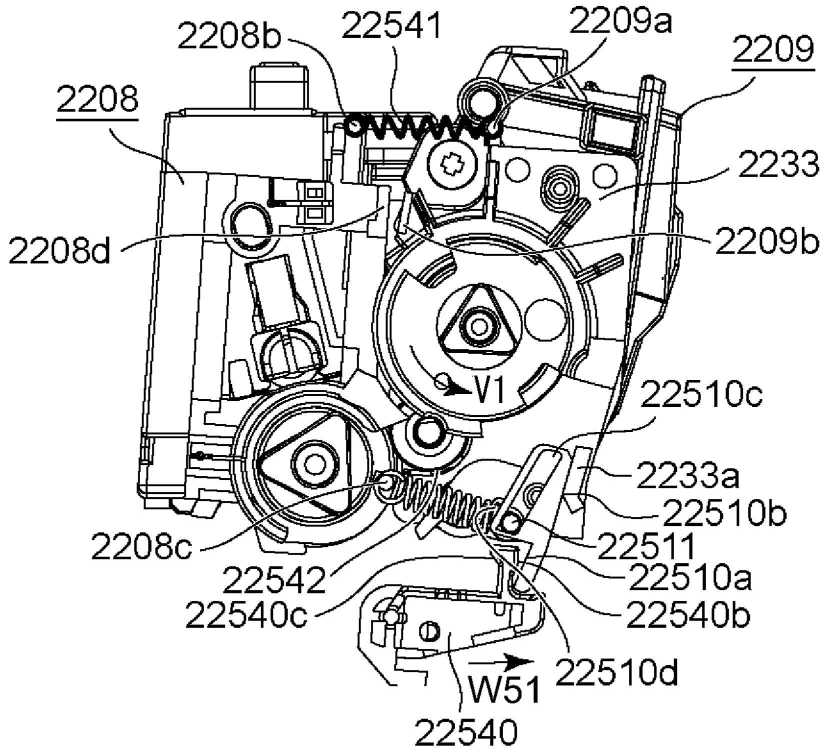
Figure 188:
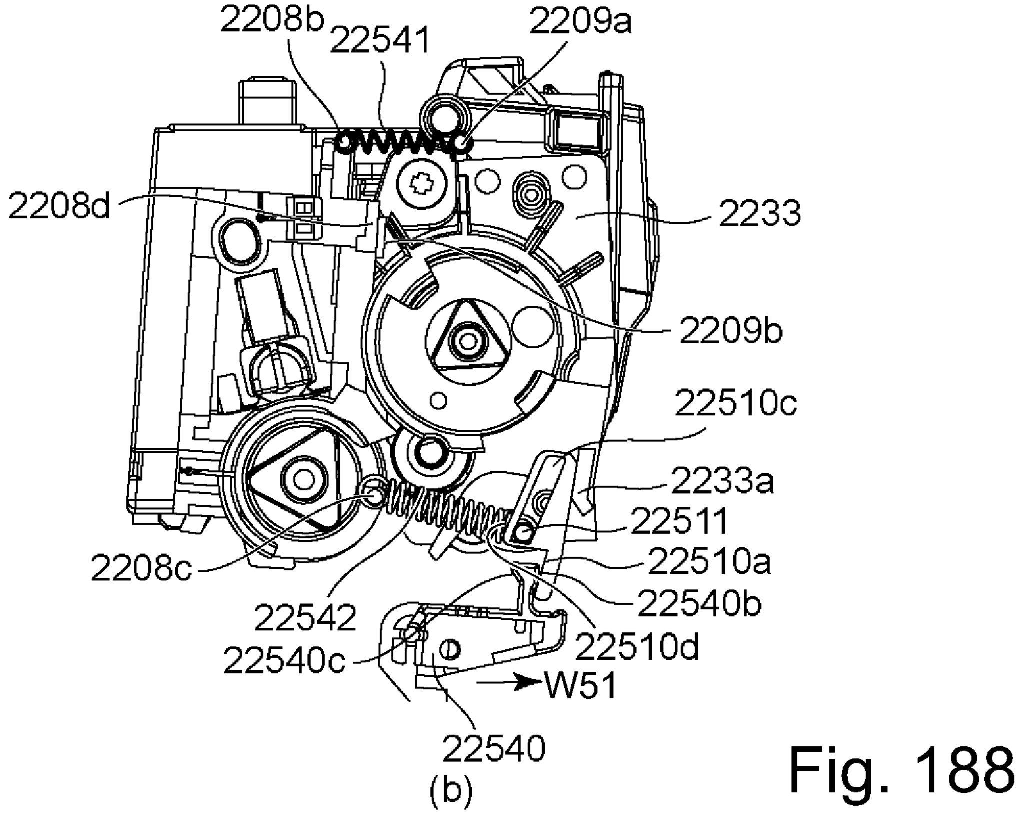

FIG. 188 is a sectional view of the process cartridge inside the image forming apparatus main assembly.

Figure 189:
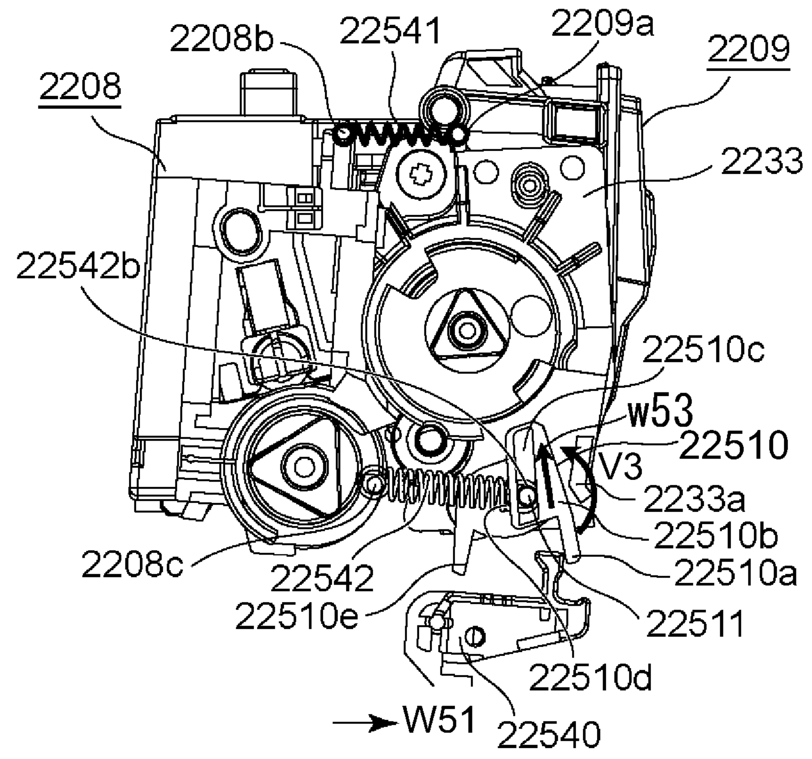
Figure 189:
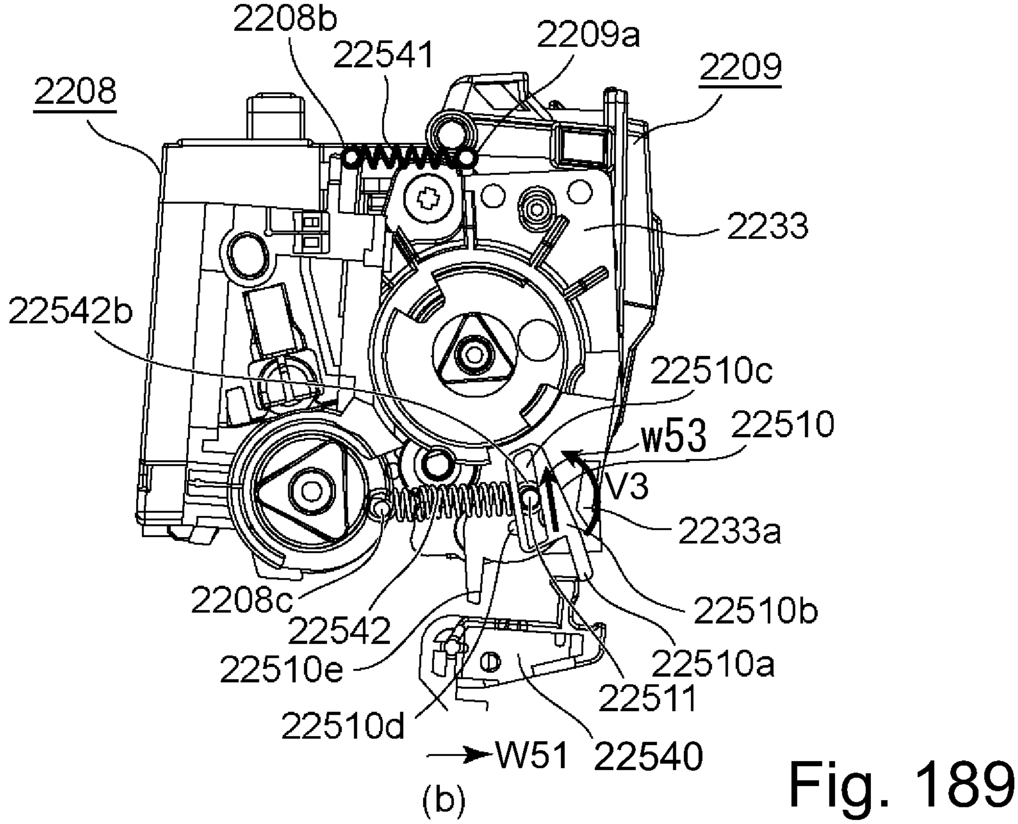

FIG. 189 is a sectional view of the process cartridge inside the image forming apparatus main assembly.

Figure 190:
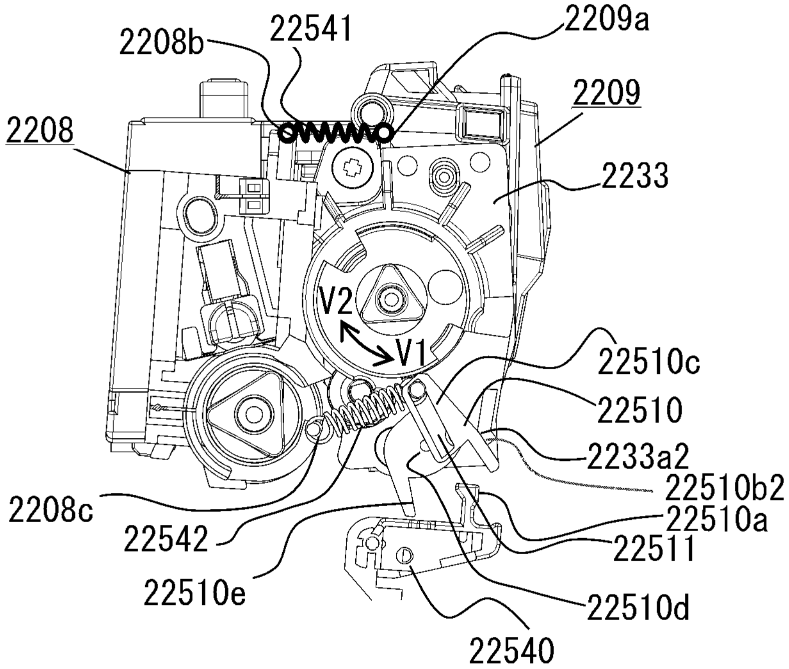
Figure 190:
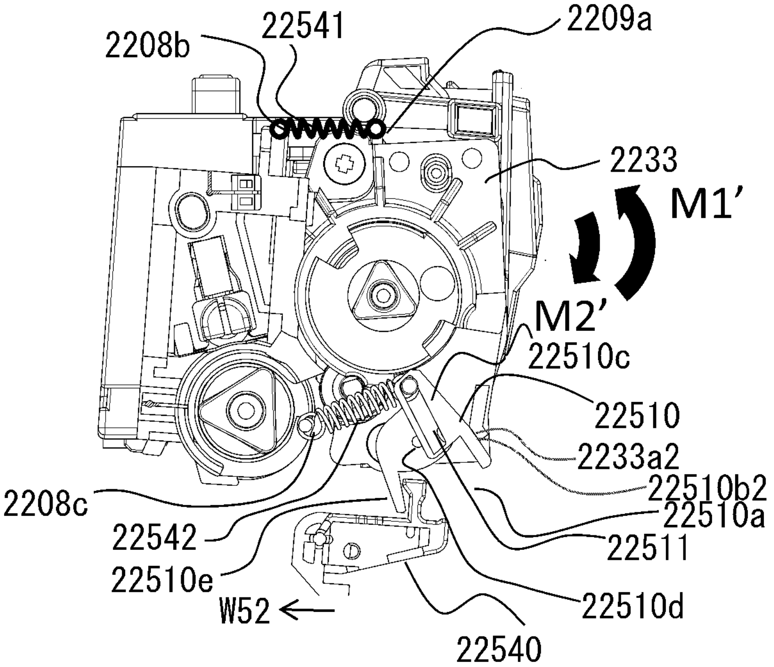

FIG. 190 is a sectional view of the process cartridge inside the image forming apparatus main assembly.

Figure 191:
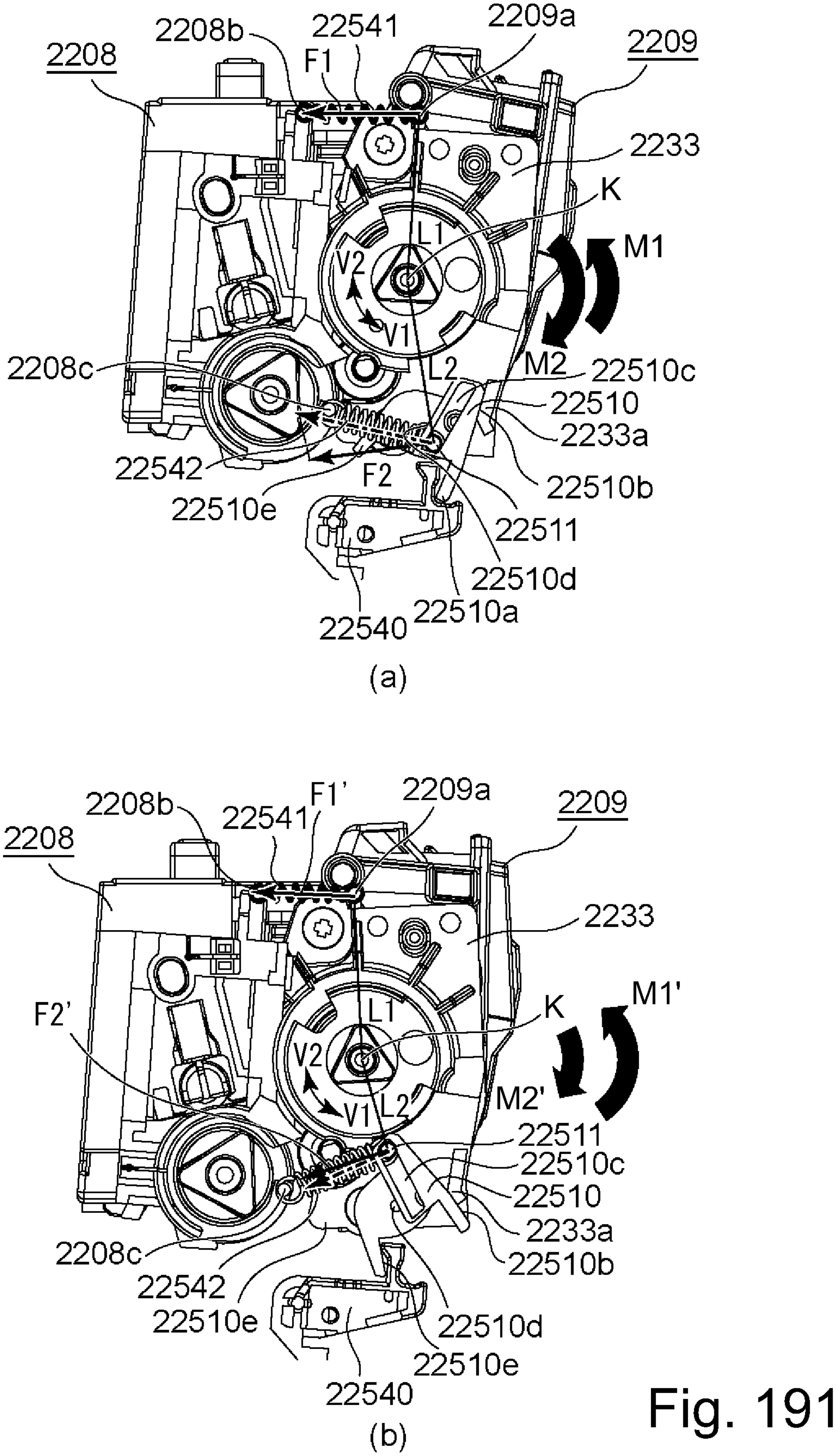

FIG. 191 is a sectional view of the process cartridge inside the image forming apparatus main assembly.

Figure 192:
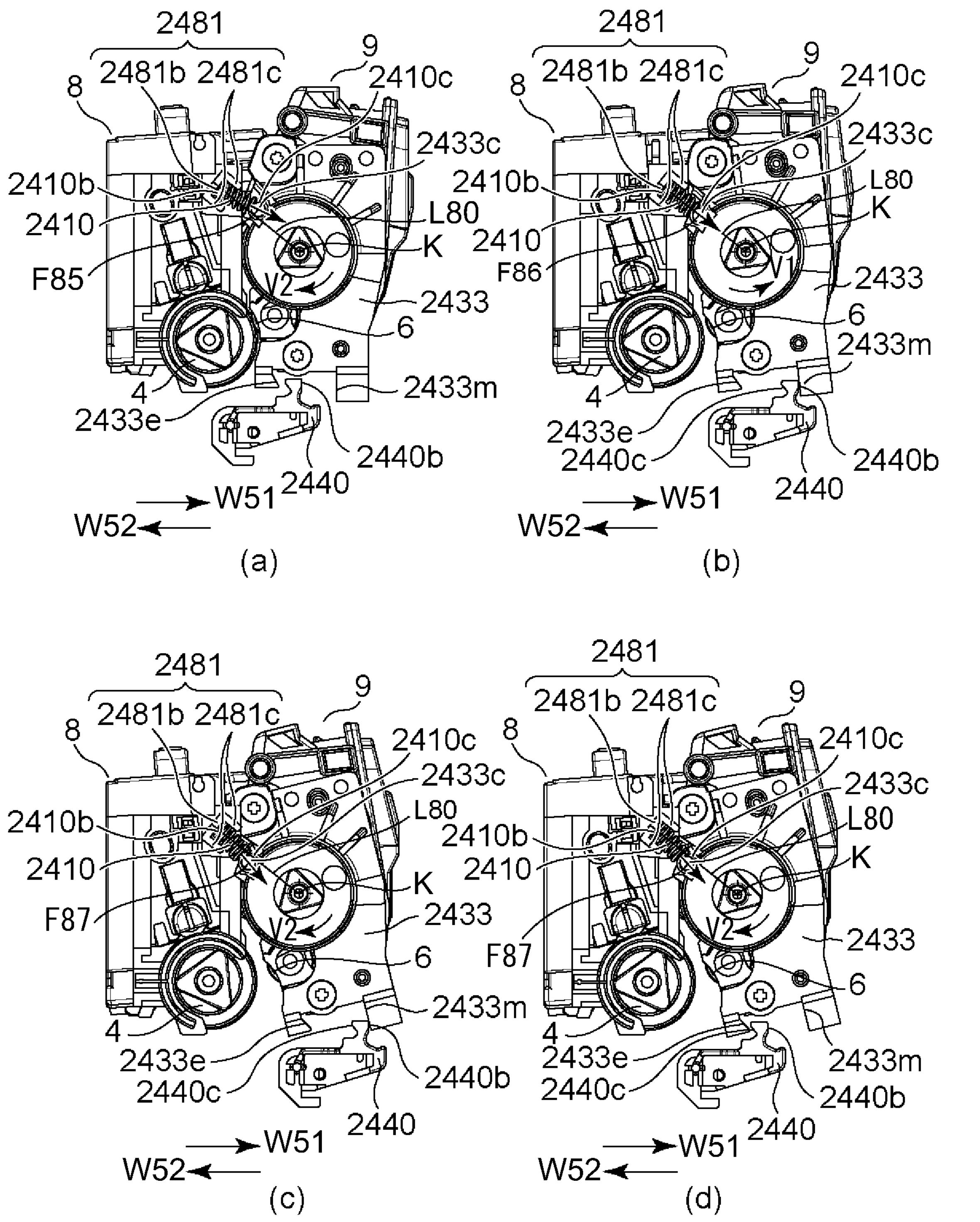

FIG. 192 is a sectional view of the process cartridge inside the image forming apparatus main assembly.

Figure 193:
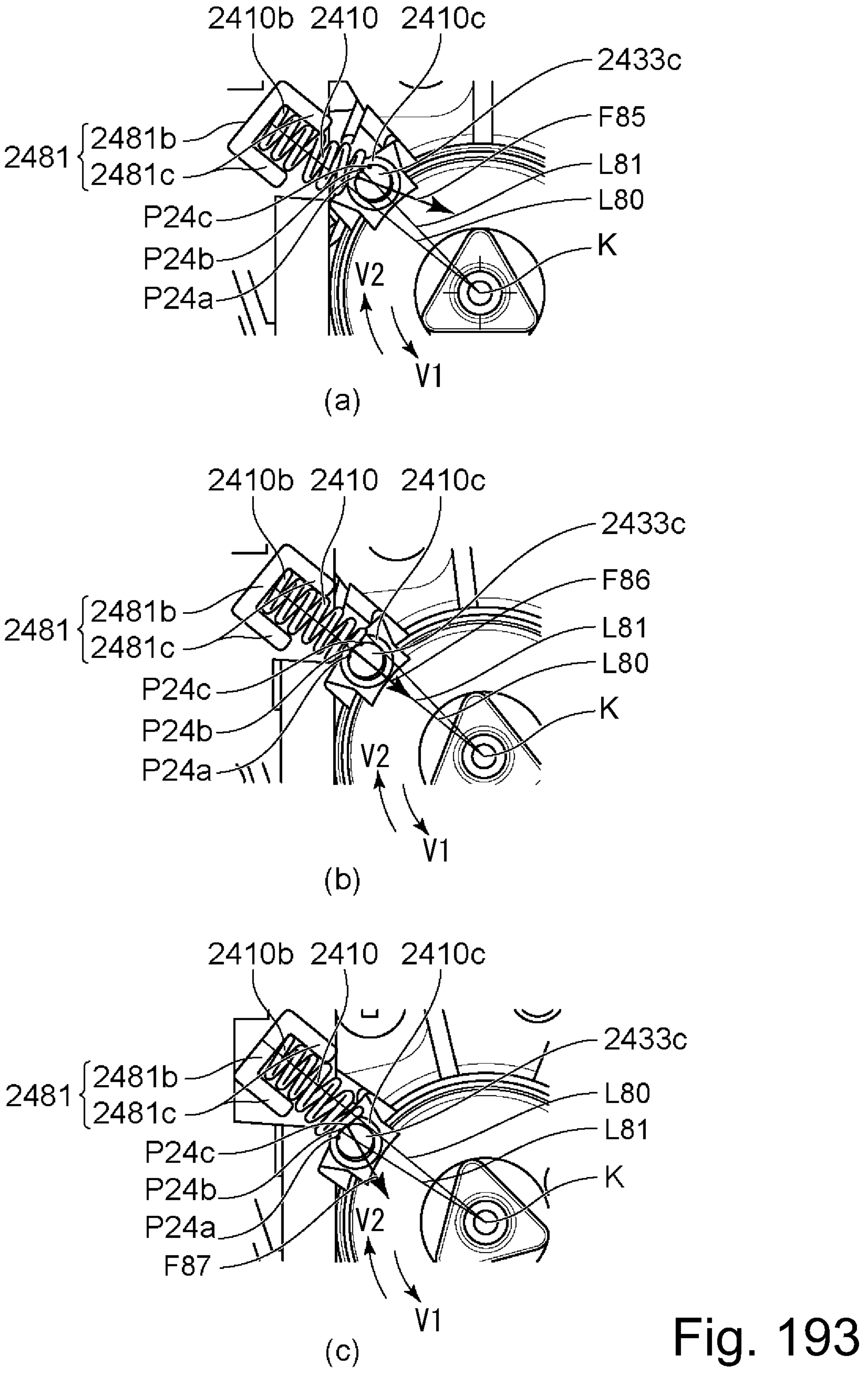

FIG. 193 is an illustration of an operation of an urging member.

Figure 194:
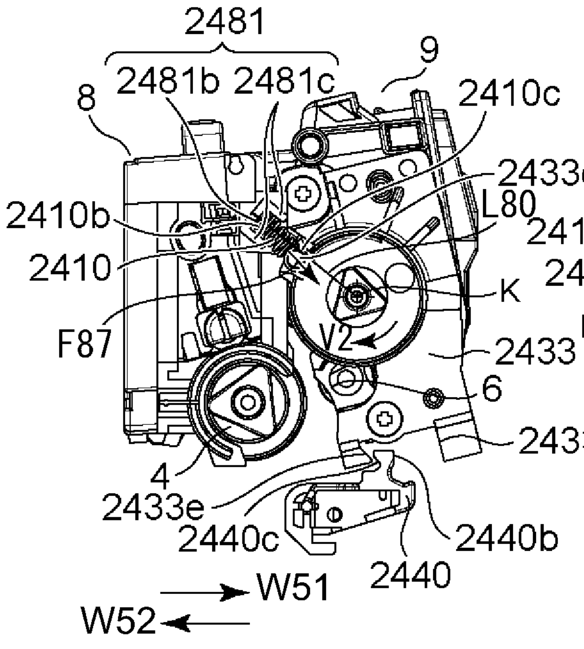
Figure 194:
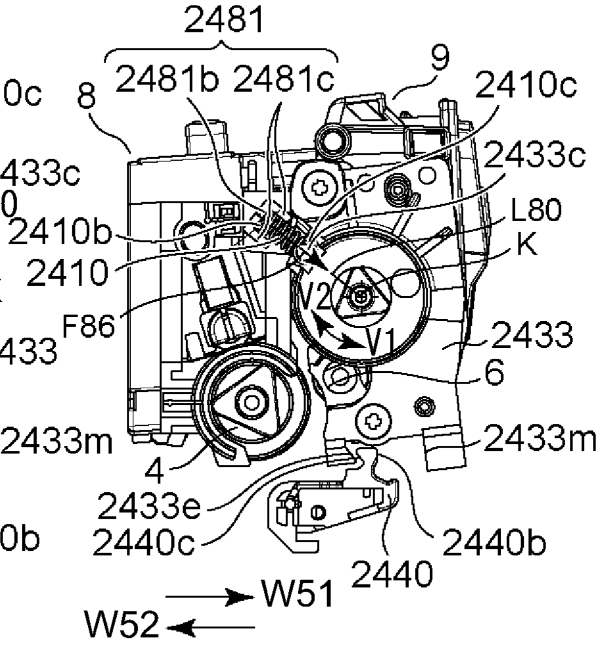
Figure 194:
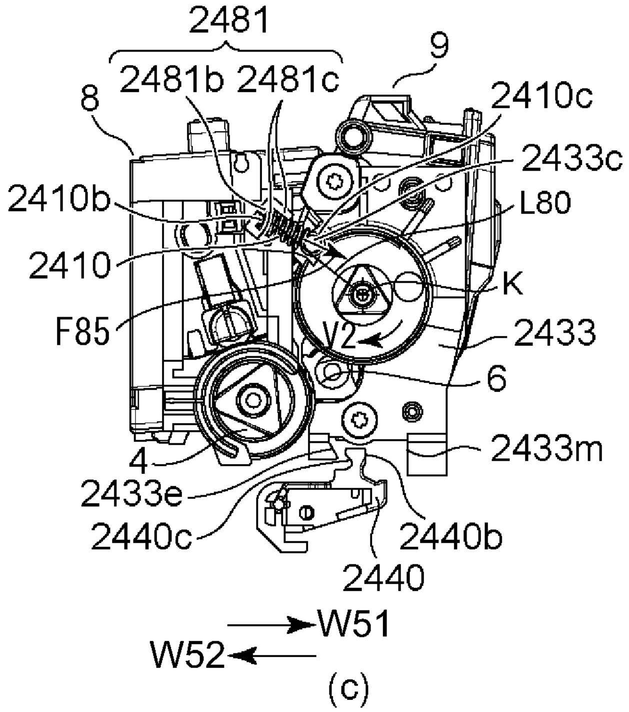

FIG. 194 is a sectional view of a process cartridge inside an image forming apparatus main assembly.

Figure 195:
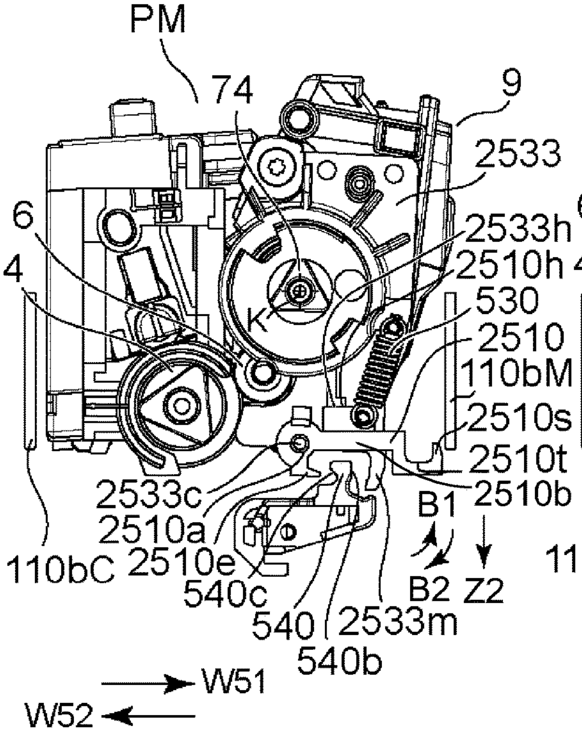
Figure 195:
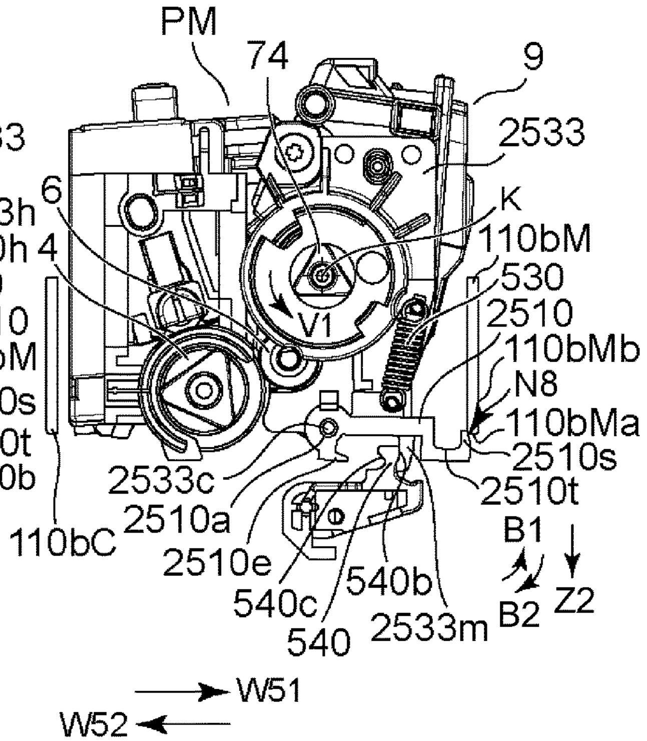
Figure 195:
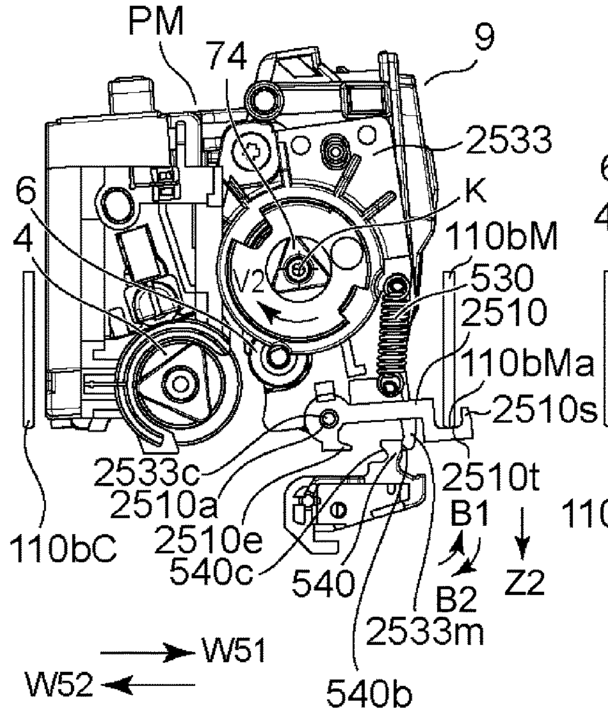
Figure 195:
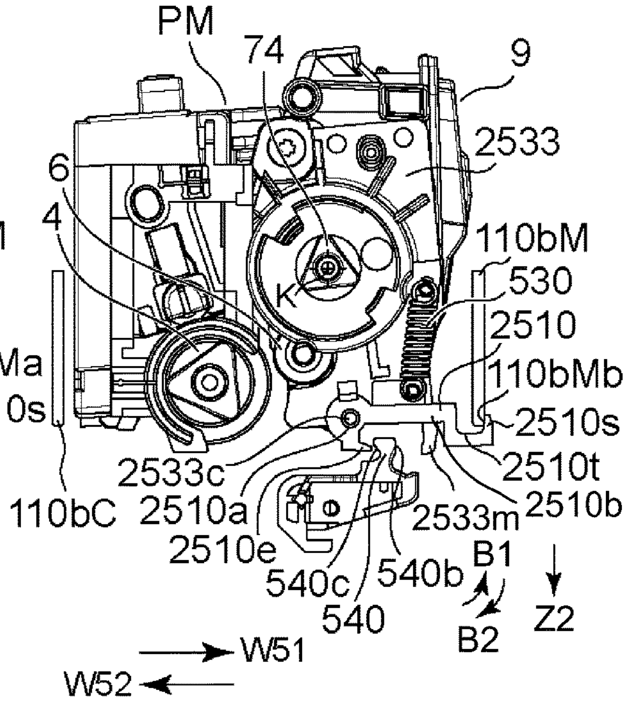

FIG. 195 is a sectional view of a process cartridge inside an image forming apparatus main assembly.

Figure 196:
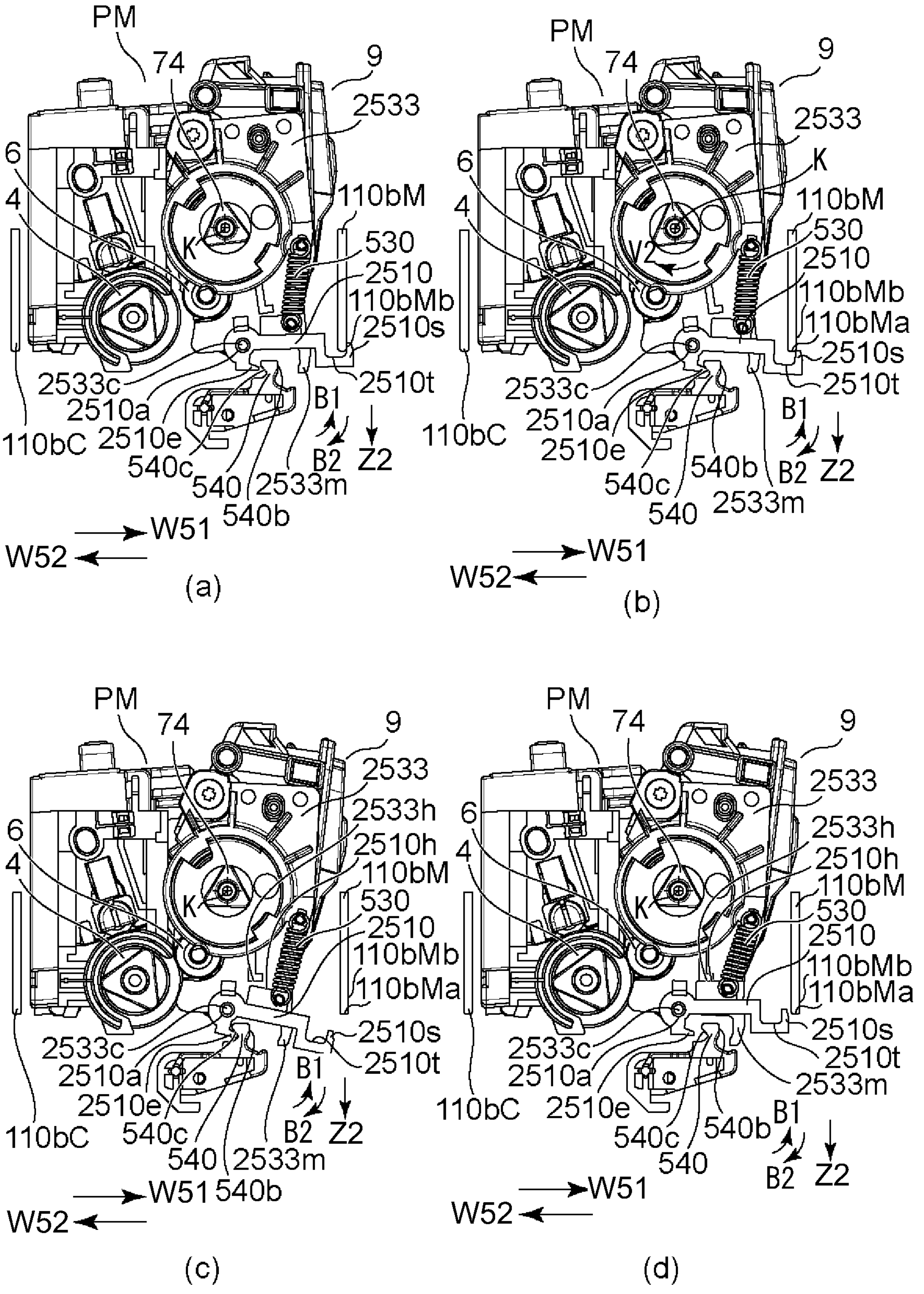

FIG. 196 is a sectional view of the process cartridge inside the image forming apparatus main assembly.

Figure 197:
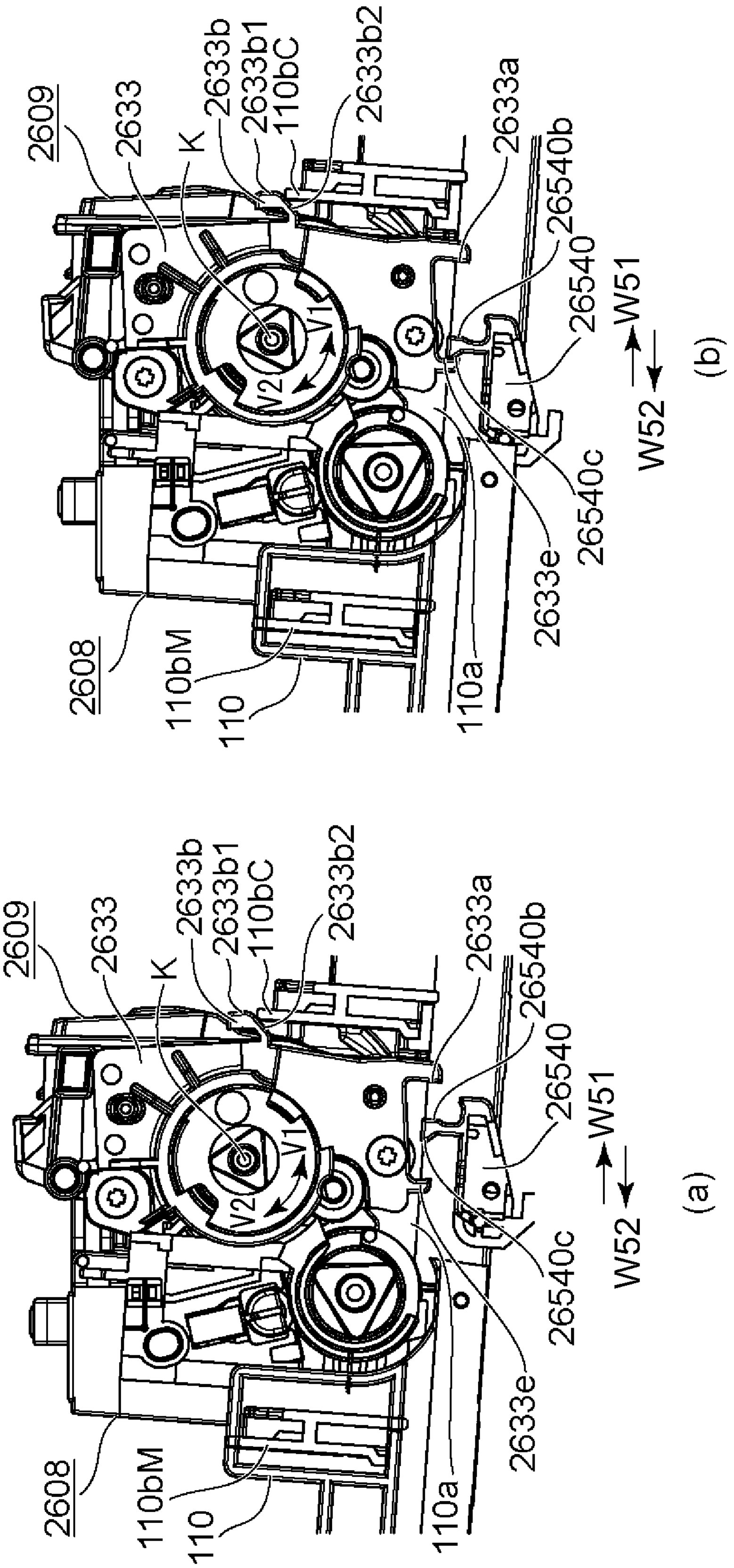

FIG. 197 is a sectional view of a process cartridge inside an image forming apparatus main assembly.

Figure 198:
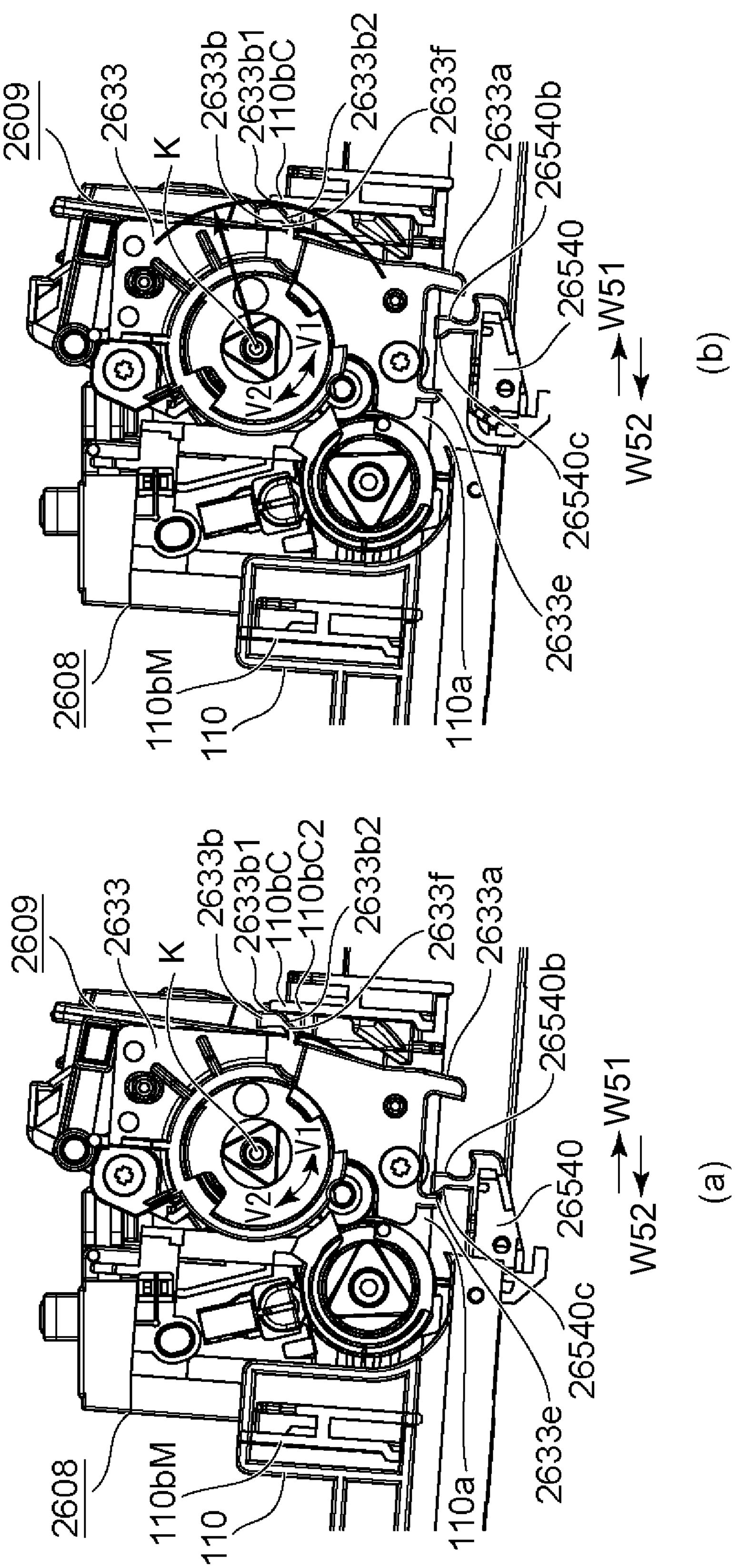

FIG. 198 is a cross-sectional view of the process cartridge inside the image forming apparatus main assembly.

Figure 199:
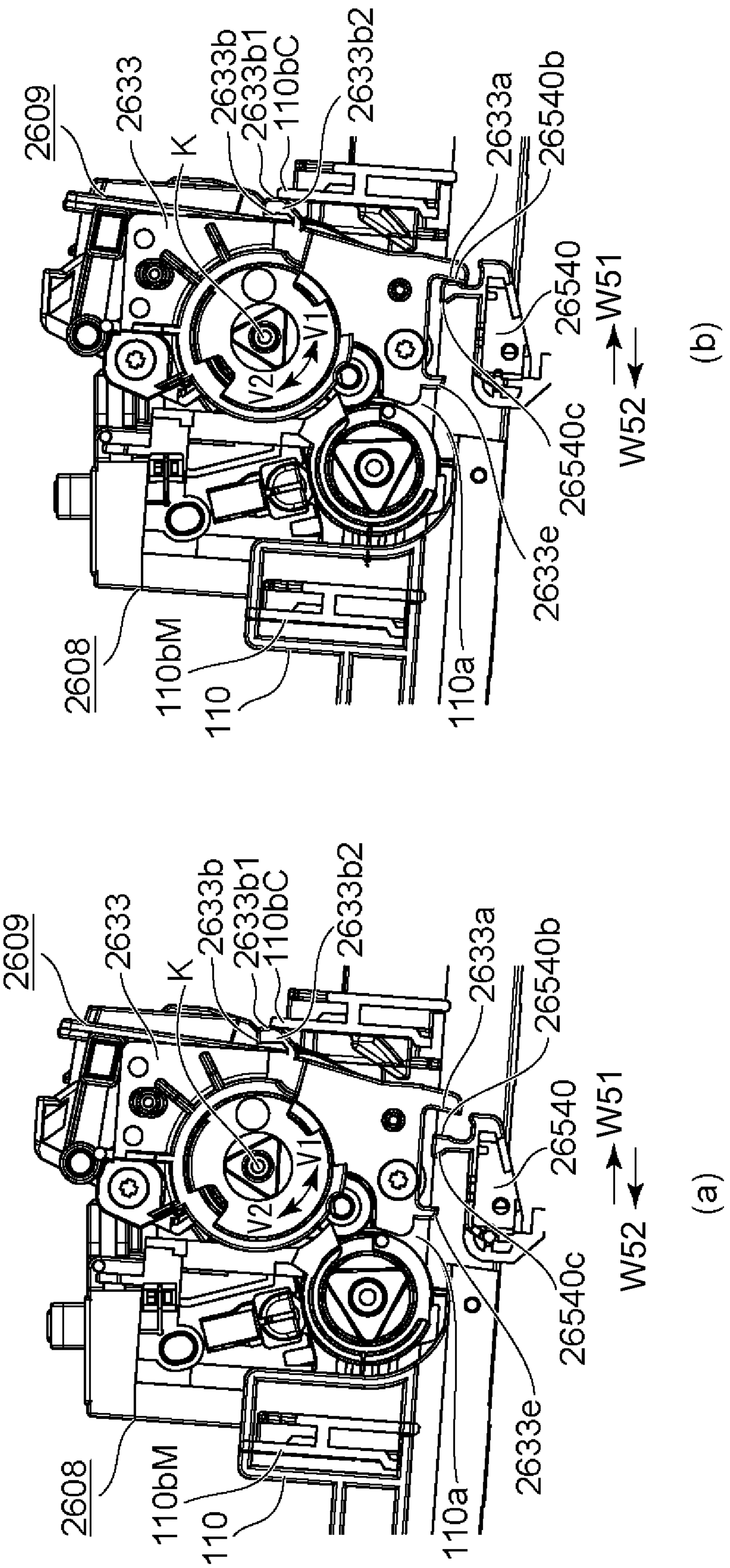

FIG. 199 is a cross-sectional view of the process cartridge inside the image forming apparatus main assembly.

Figure 200:
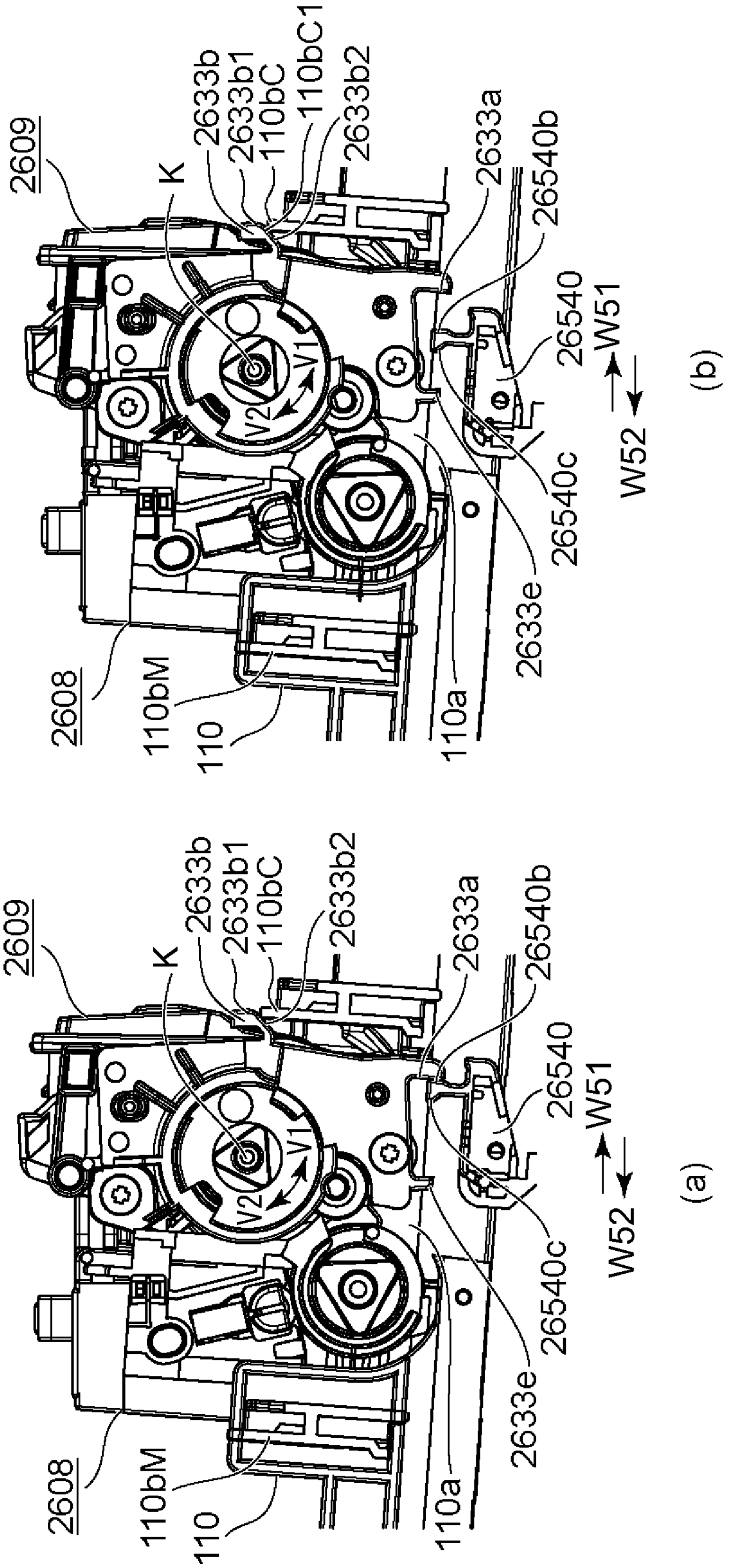

FIG. 200 is a sectional view of the process cartridge inside the image forming apparatus main assembly.

Figure 201:
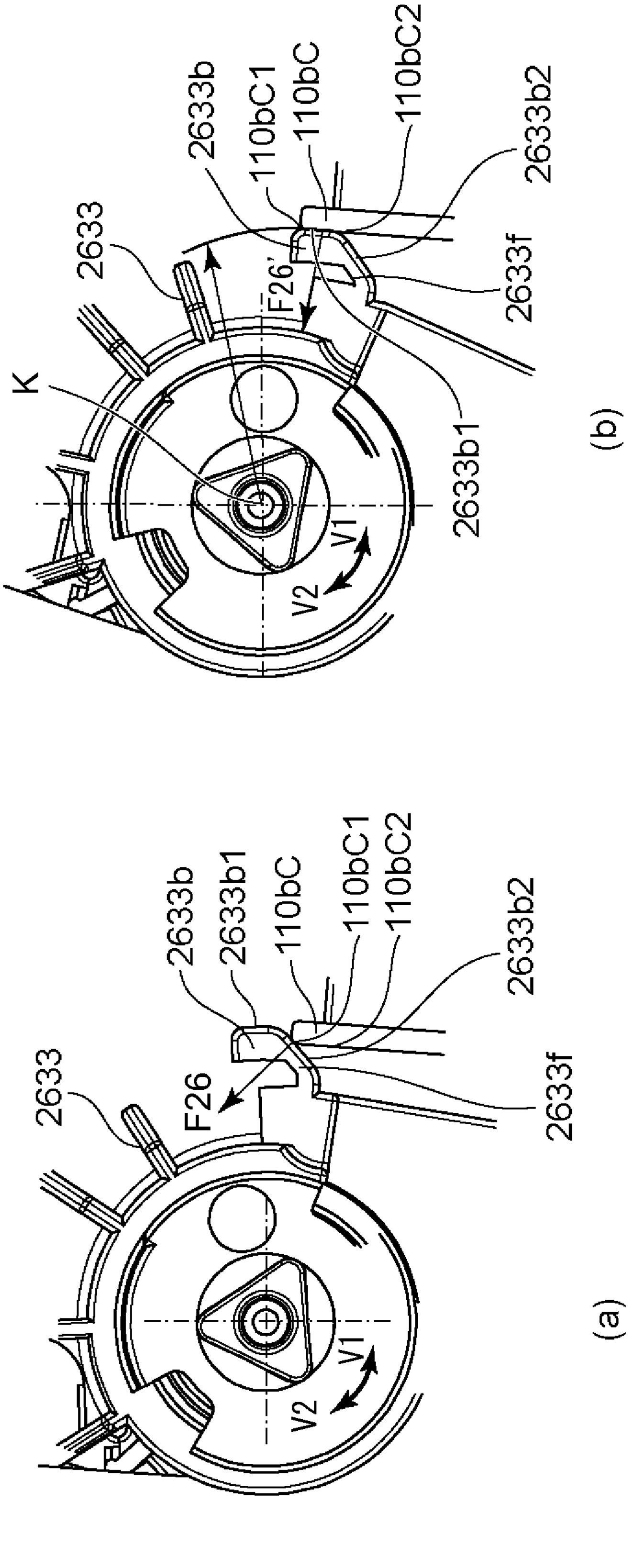

FIG. 201 is an illustration of an operation of a holding member.

Figure 202:
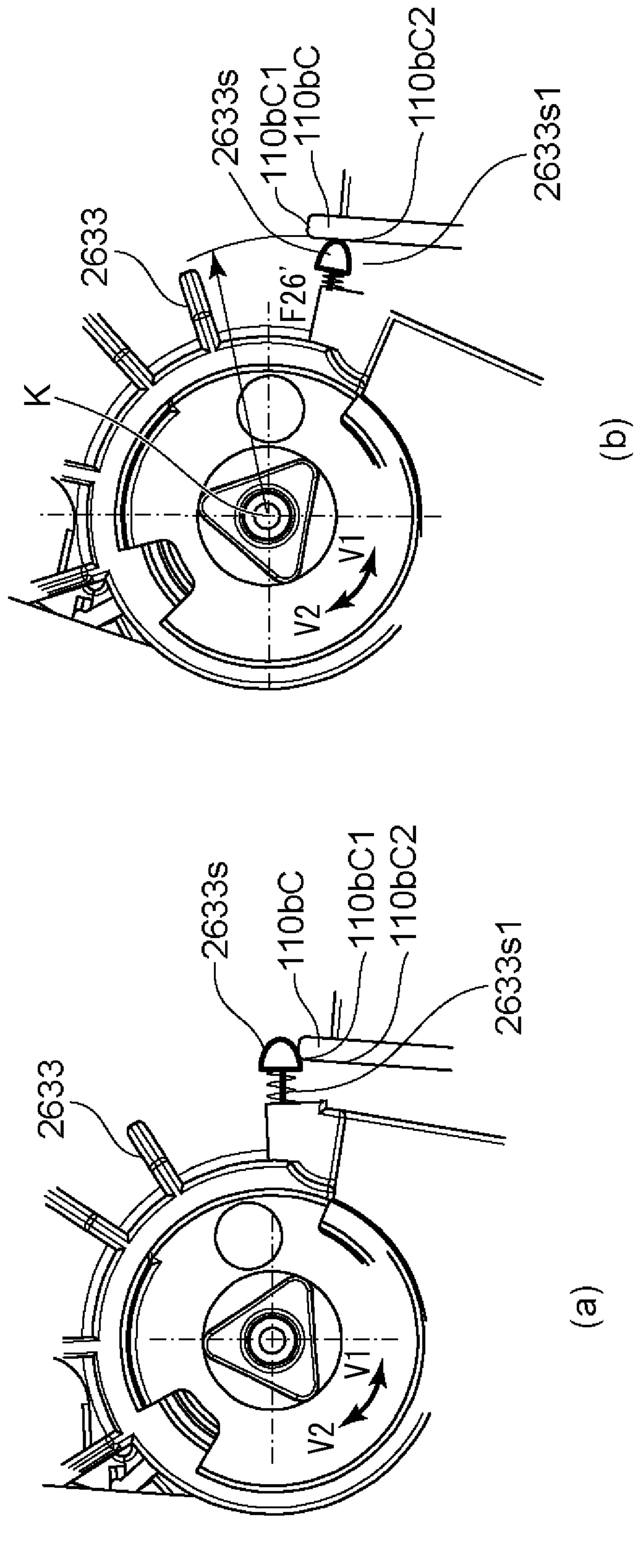

FIG. 202 is an illustration of the operation of the holding member.

Figure 203:
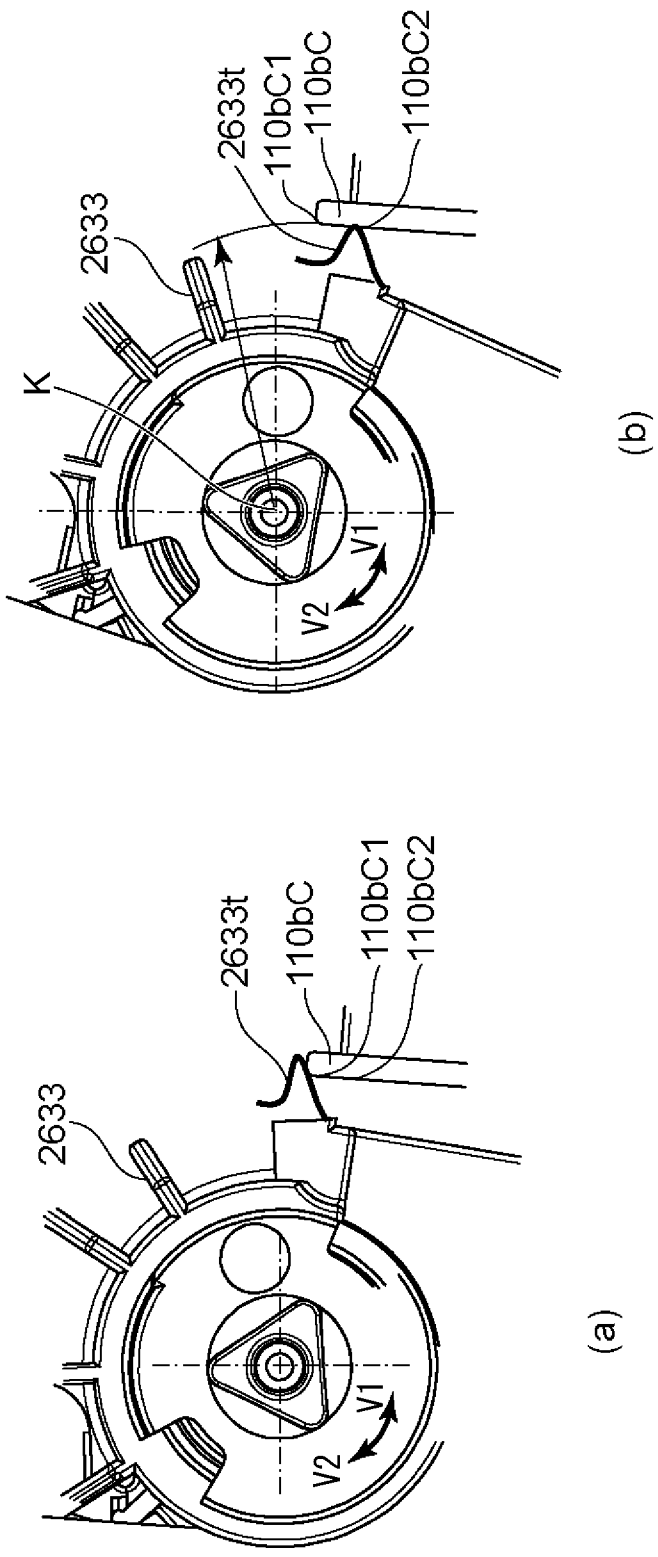

FIG. 203 is an illustration showing the operation of the holding member.

Figure 204:
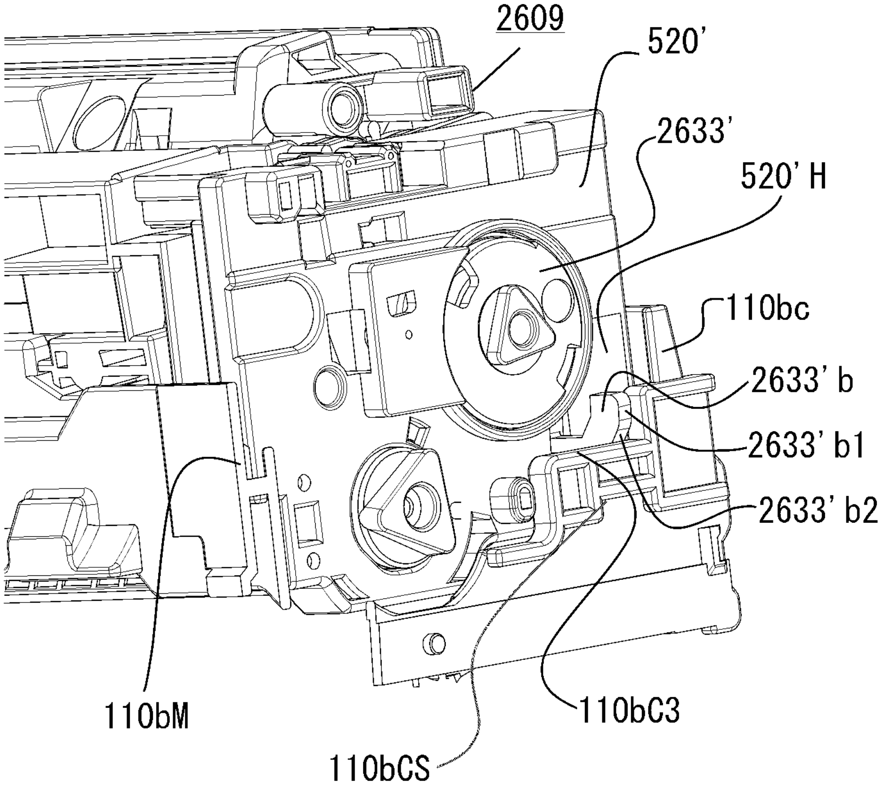

FIG. 204 is a partial perspective view of the process cartridge and a tray.

Figure 205:
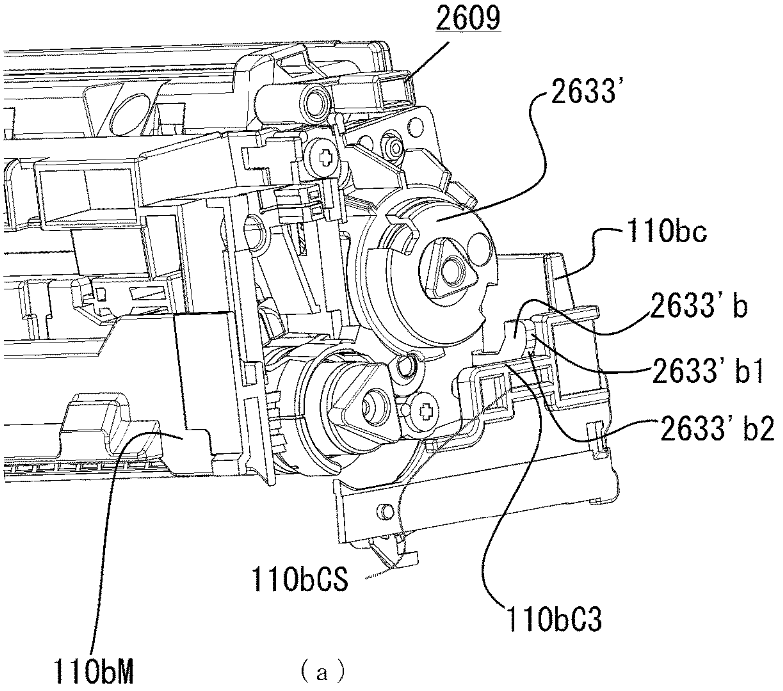
Figure 205:
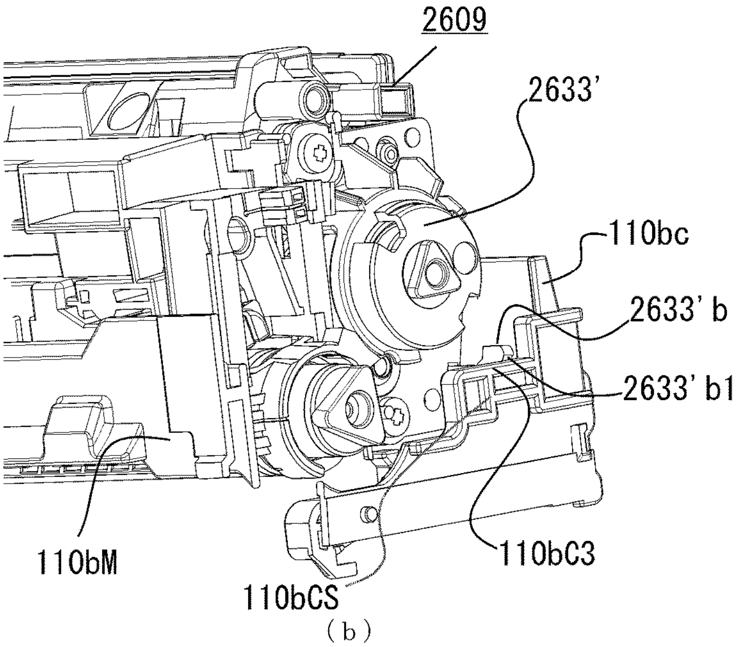
Figure 205:
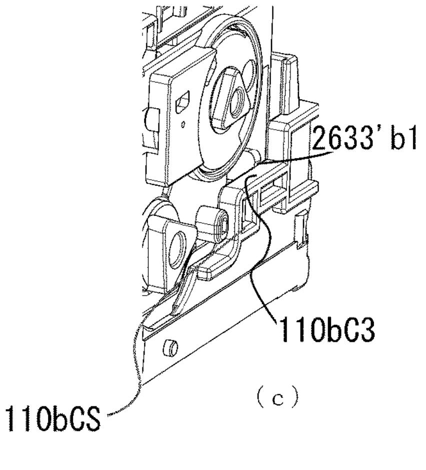

FIG. 205 is a partial perspective view of the process cartridge and the tray.

Figure 206:
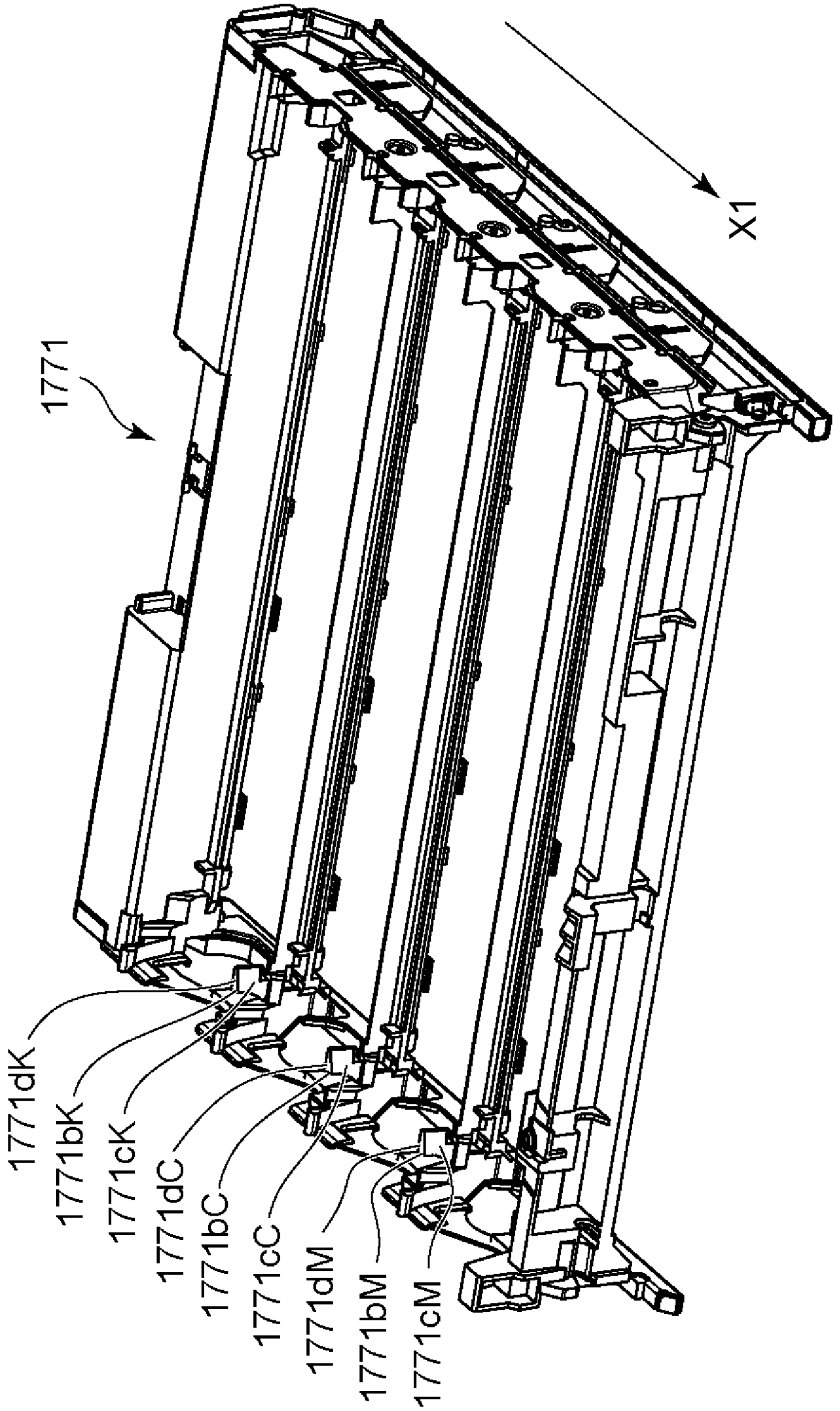

FIG. 206 is a perspective view of the tray.

Figure 207:
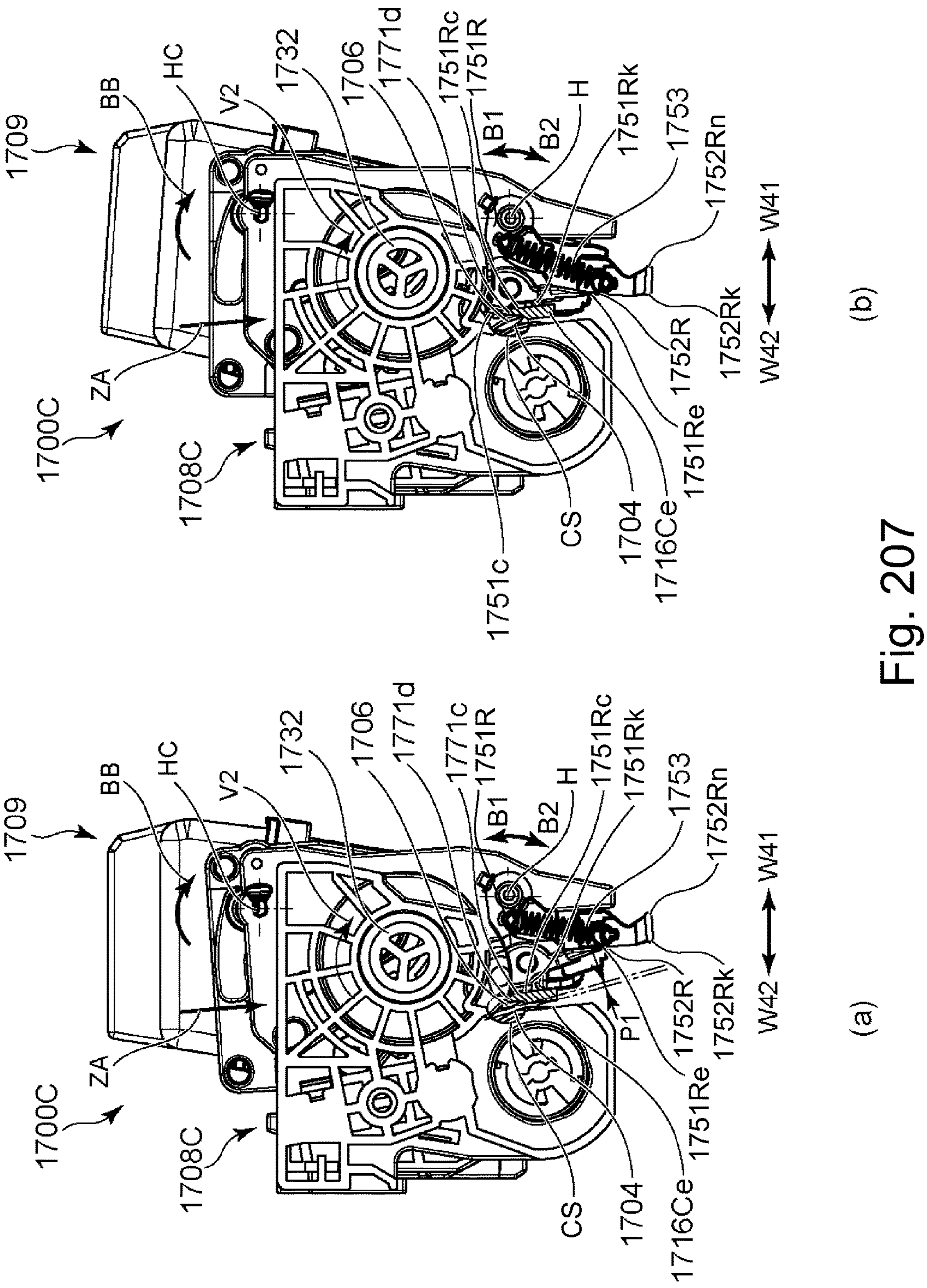

FIG. 207 is a sectional view of the process cartridge.

Figure 208:
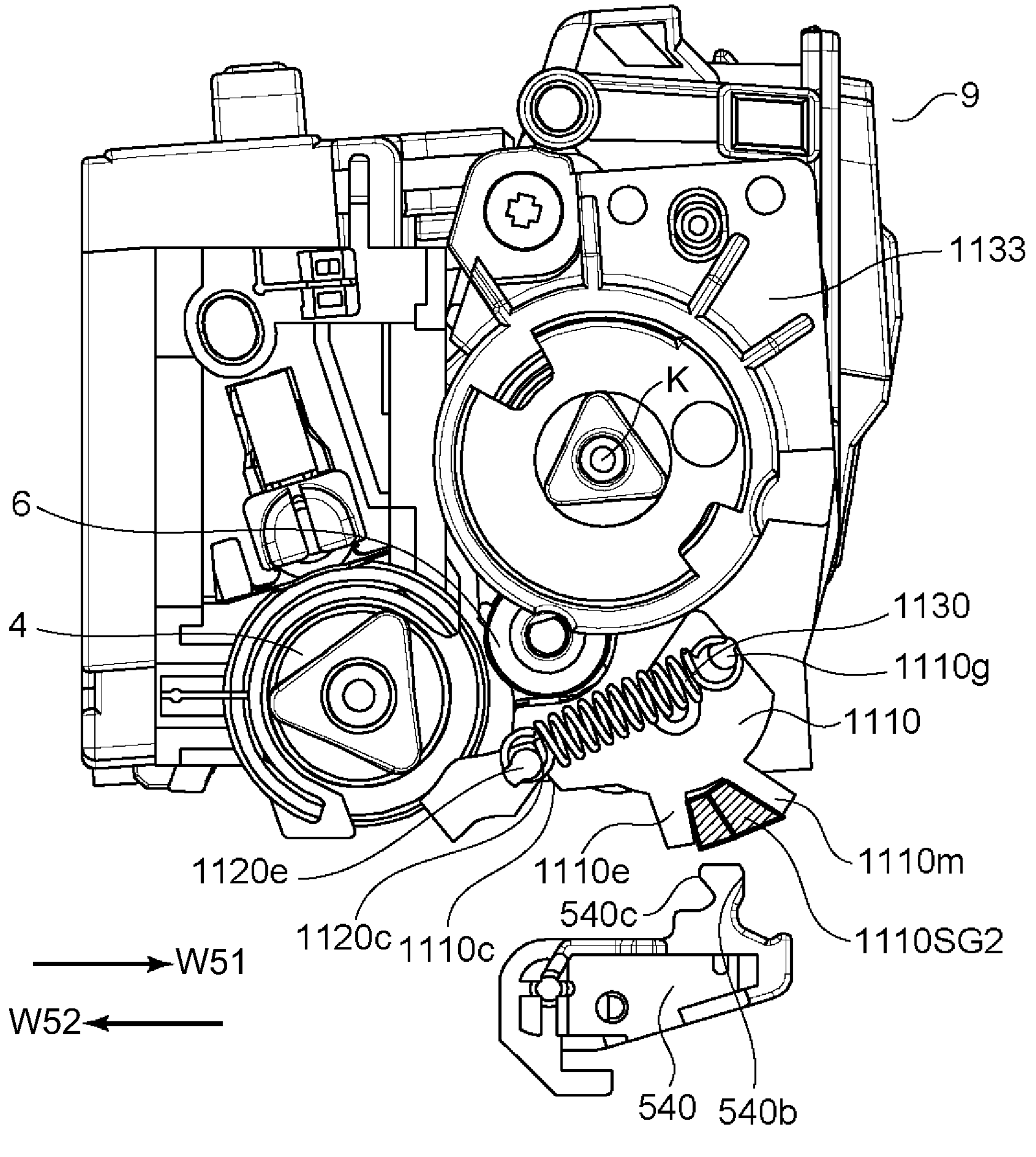

FIG. 208 is a cross-sectional view of a process cartridge inside an image forming apparatus main assembly.

Figure 209:
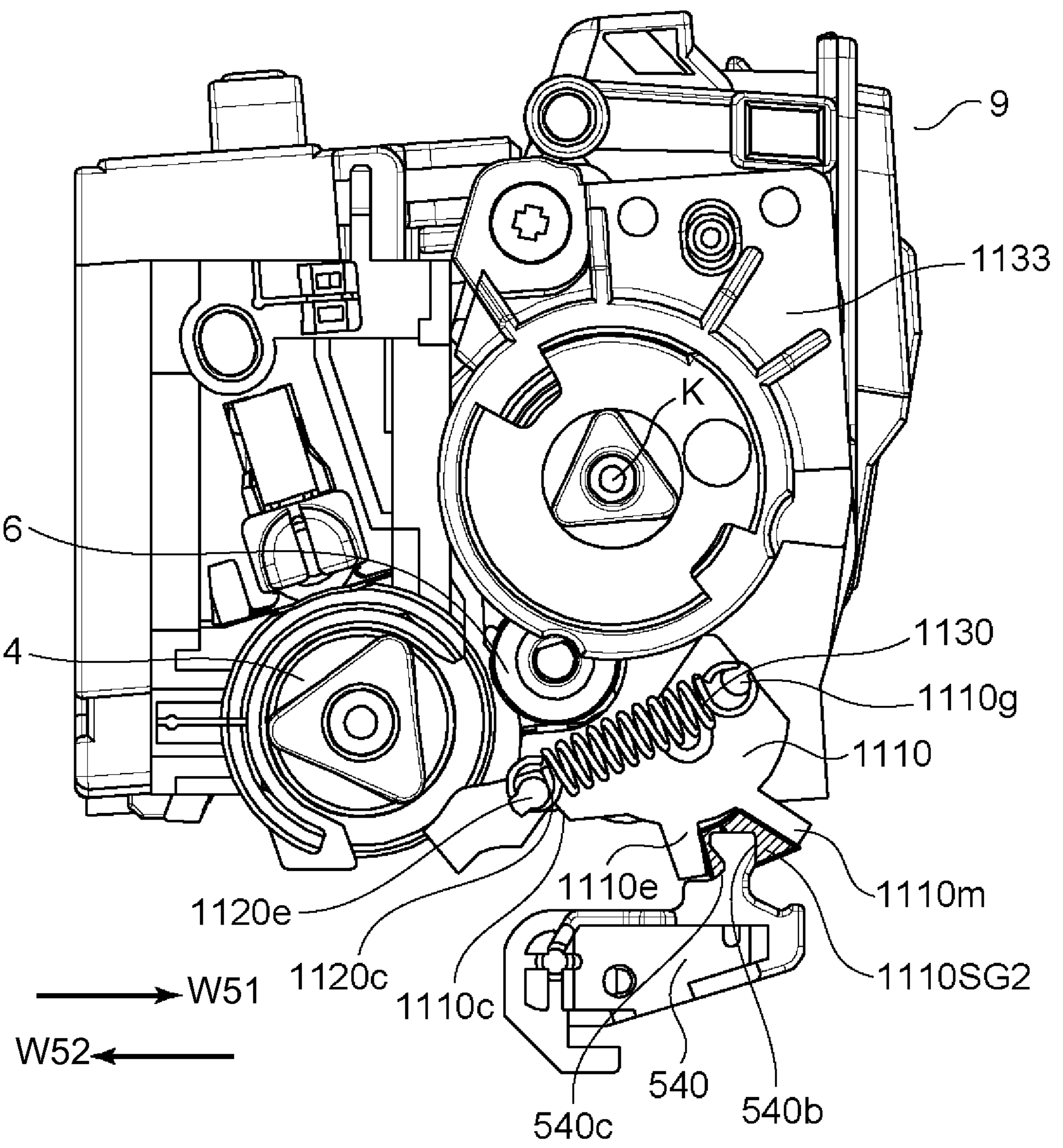

FIG. 209 is a cross-sectional view of a process cartridge inside an image forming apparatus main assembly.

Figure 210:
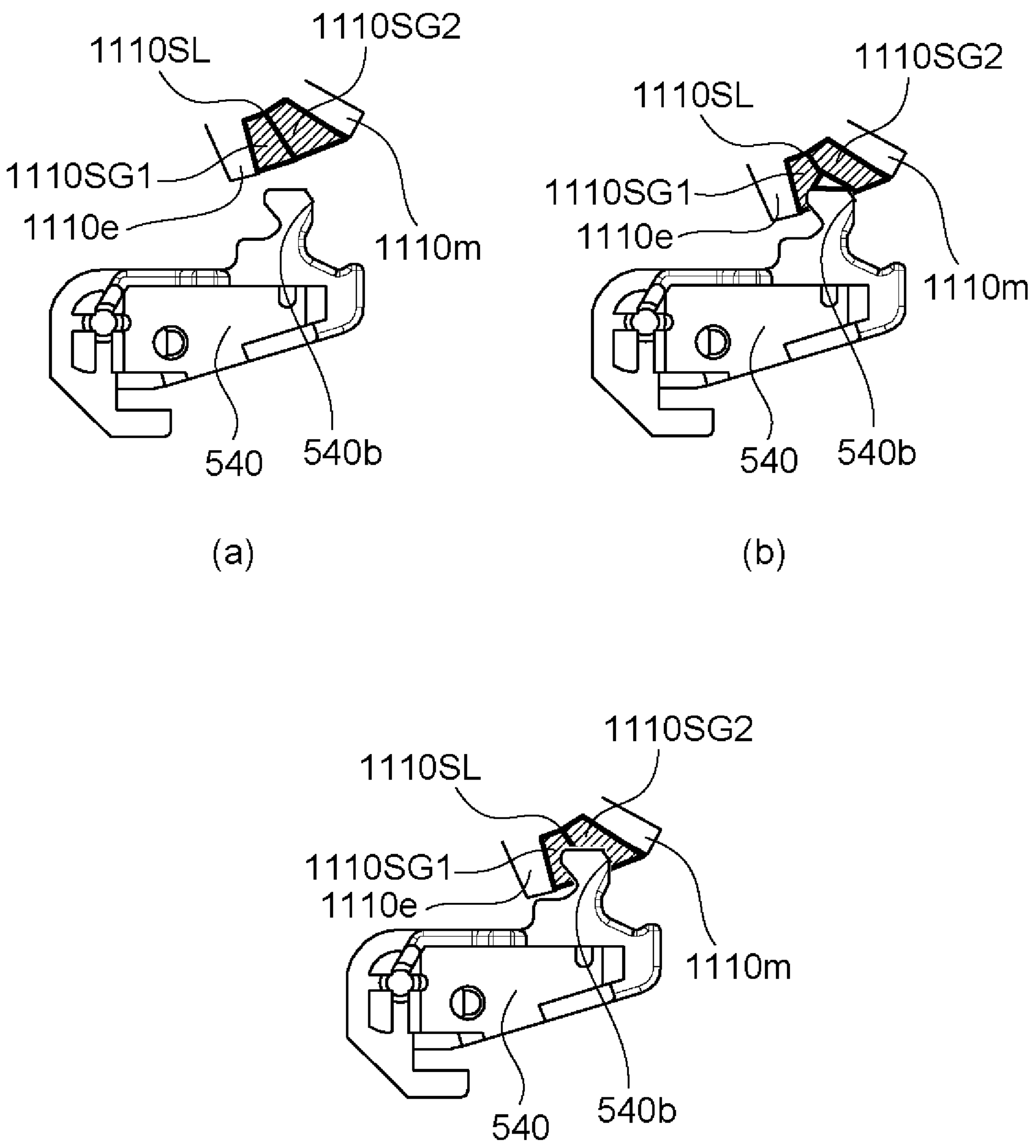

FIG. 210 is an illustration showing a relationship between a force receiving portion of the process cartridge and a separation control member.

Figure 211:
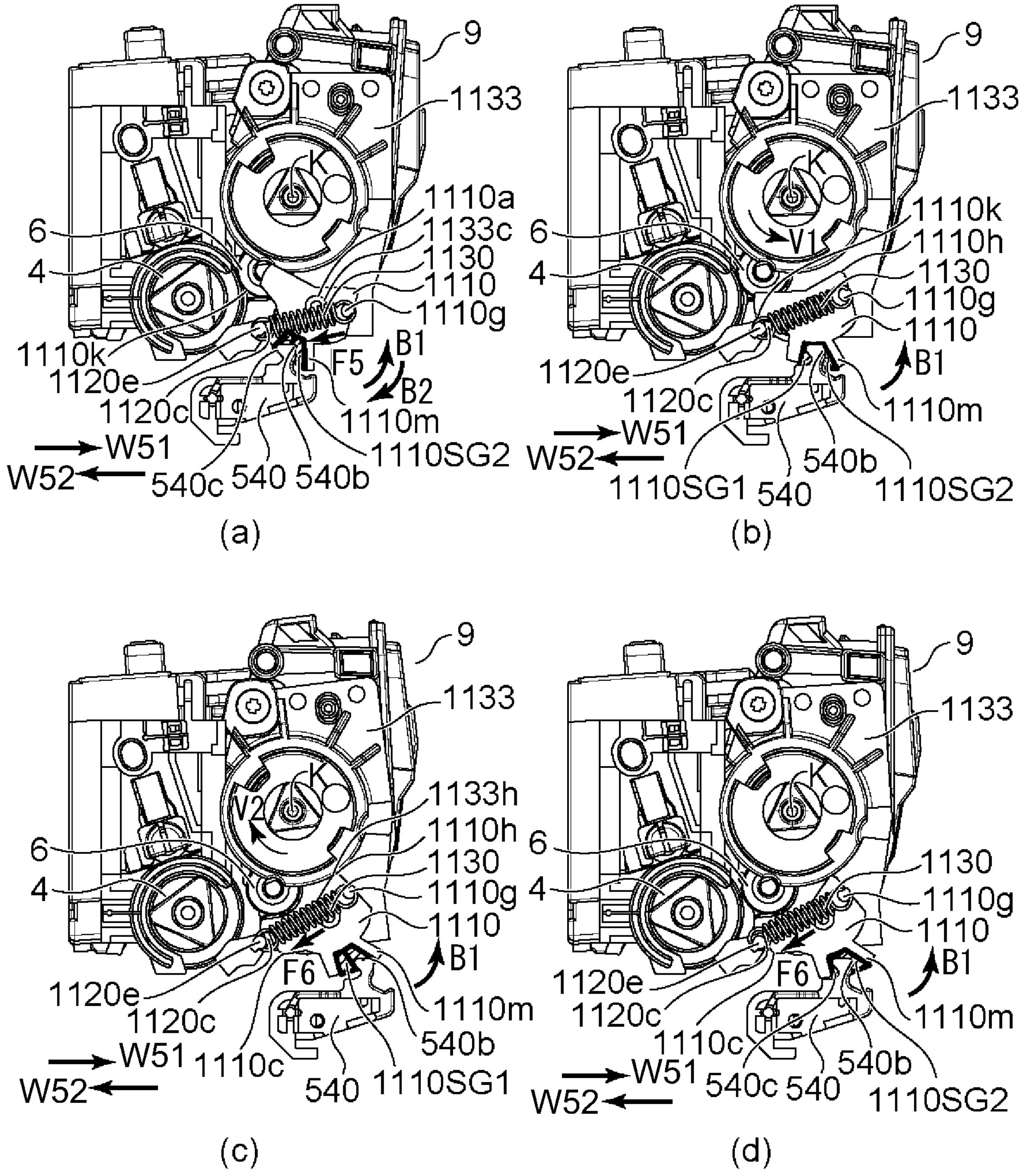

FIG. 211 is a sectional view of the process cartridge in the image forming apparatus main assembly.

Figure 212:
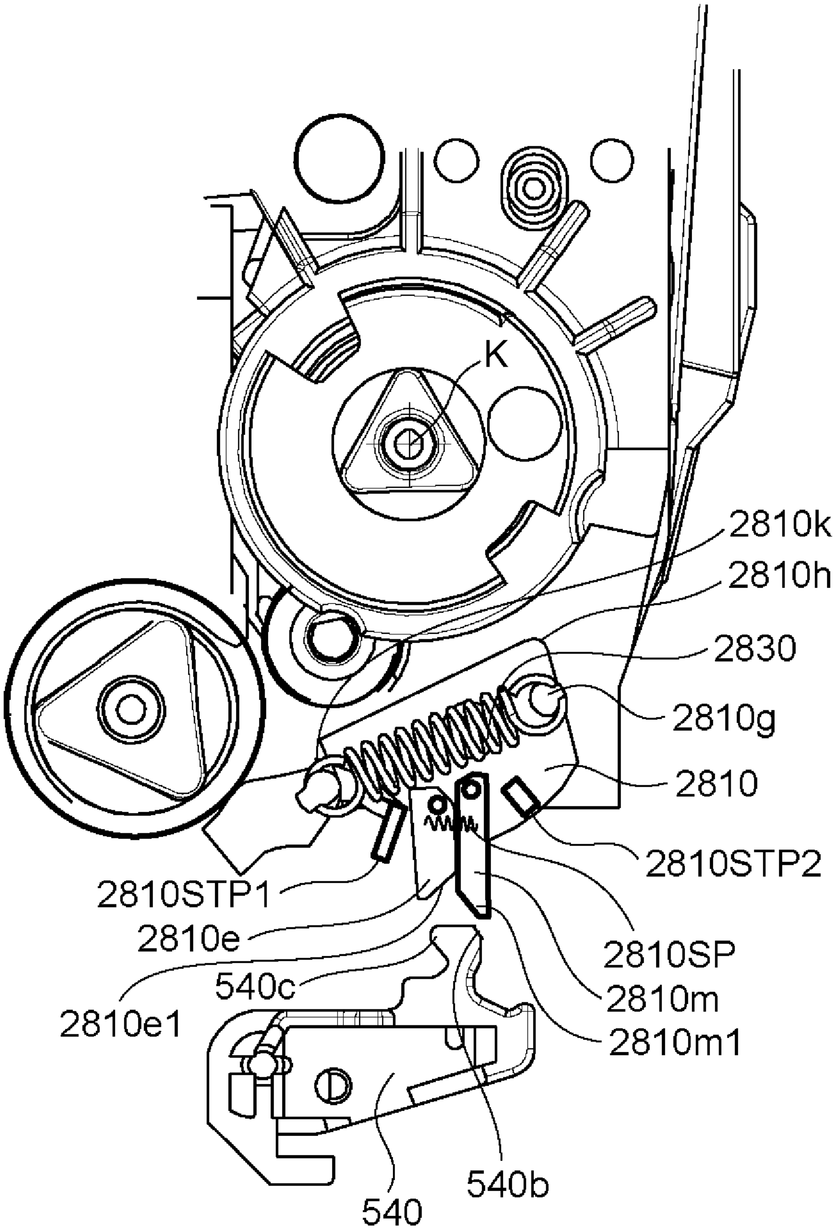

FIG. 212 is an illustration showing a relationship between the force receiving portion of the process cartridge and the separation control member.

Figure 213:
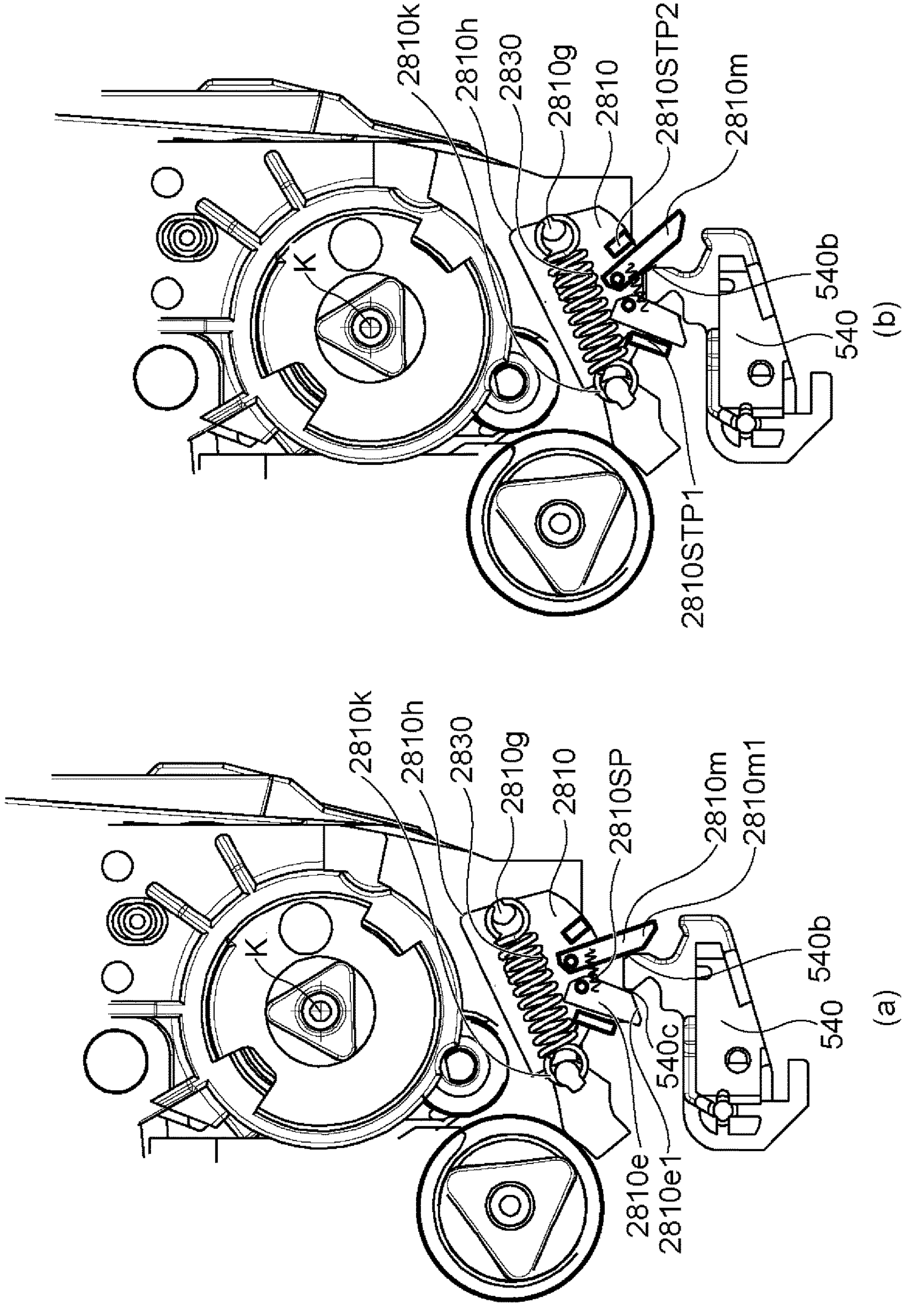

FIG. 213 is an illustration showing the relationship between the force receiving portion of the process cartridge and the separation control member.

Figure 214:
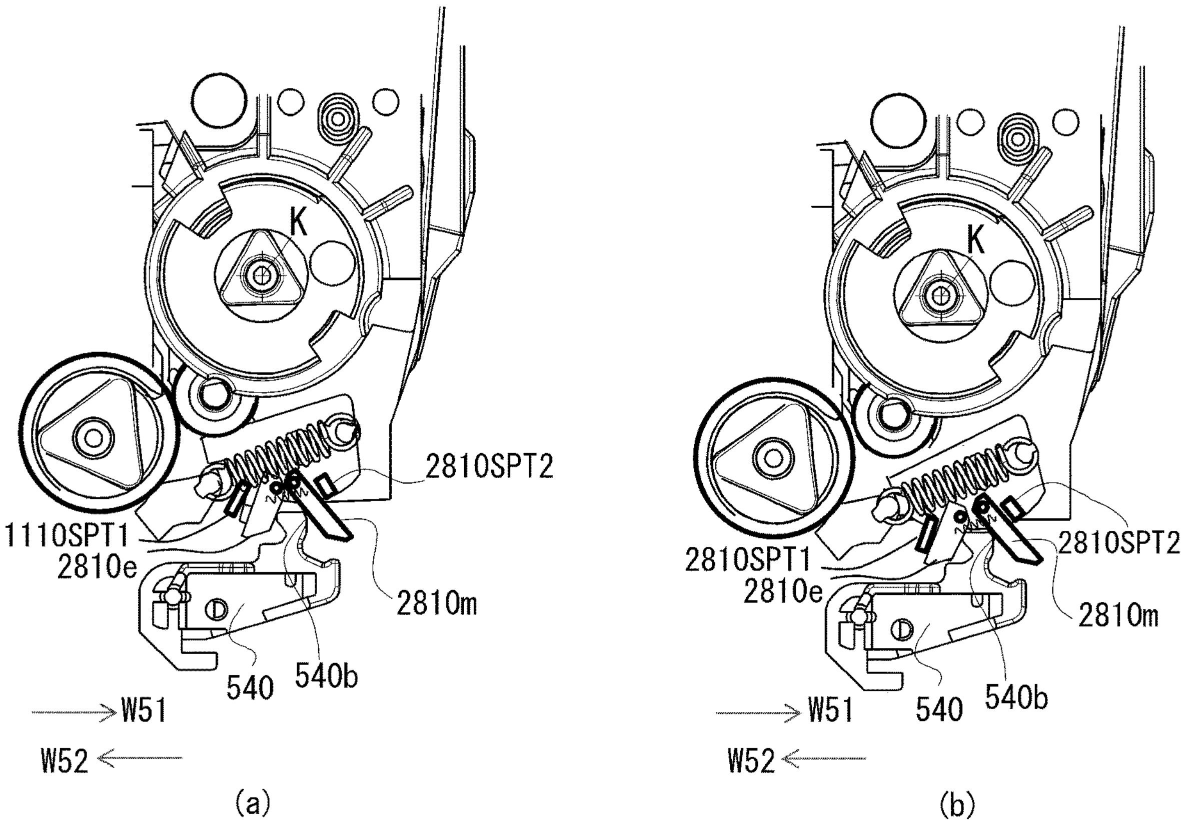

FIG. 214 is an illustration showing the relationship between the force receiving portion of the process cartridge and the separation control member.

Figure 215:
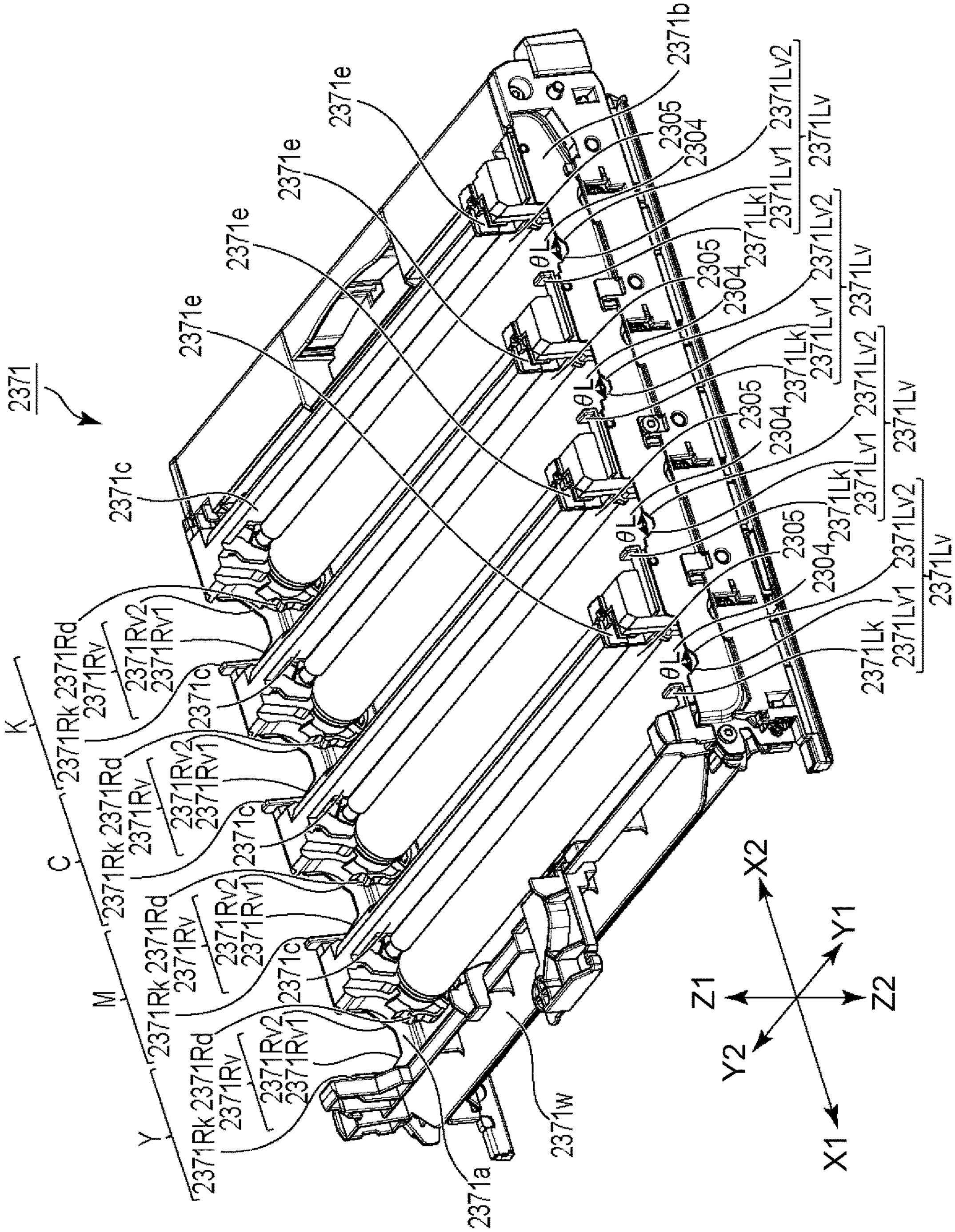

FIG. 215 is a perspective view of a tray.

Figure 216:
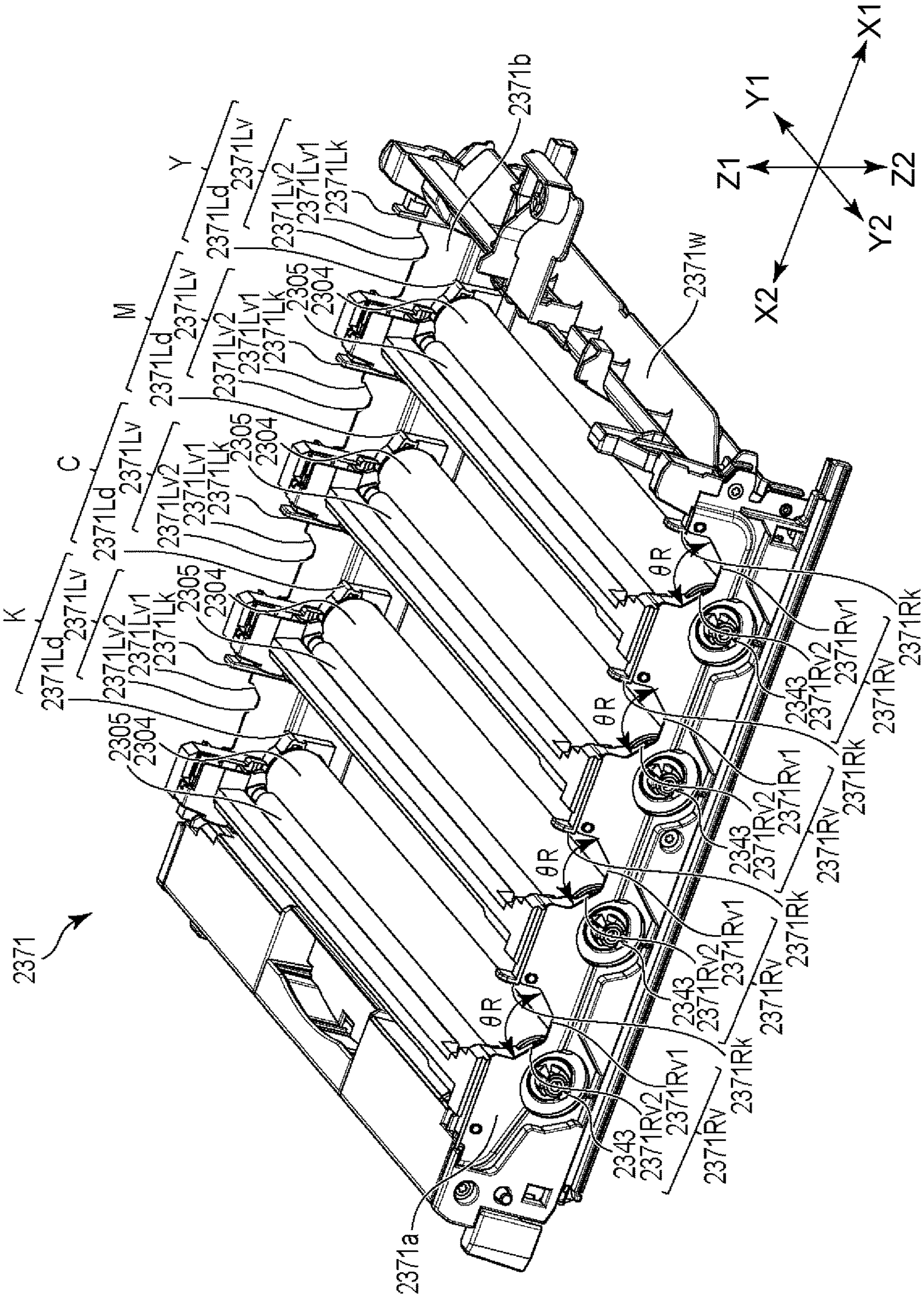

FIG. 216 is a perspective view of the tray.

Figure 217:
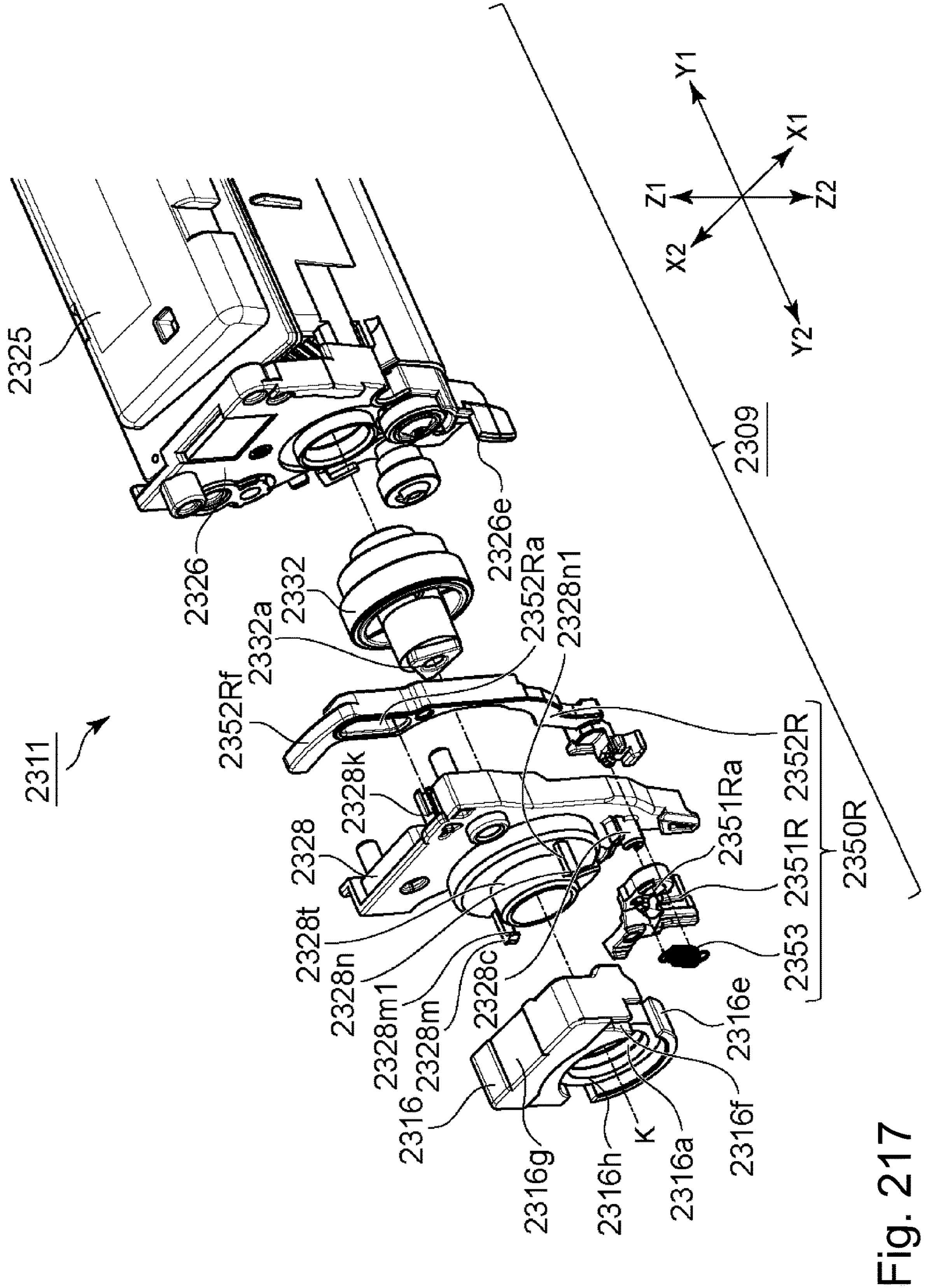

FIG. 217 is an exploded perspective view of a process cartridge.

Figure 218:
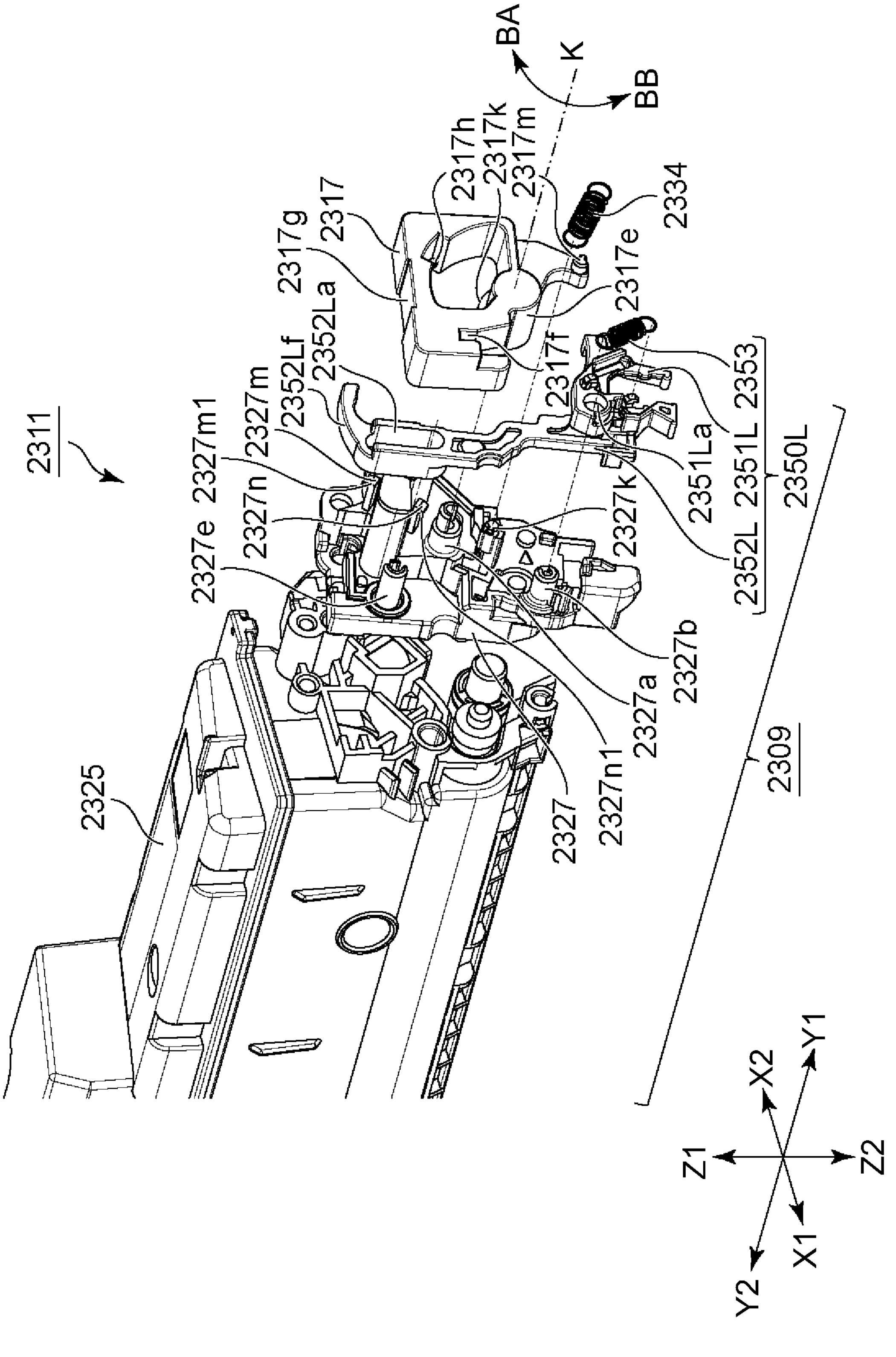

FIG. 218 is an exploded perspective view of the process cartridge.

Figure 219:
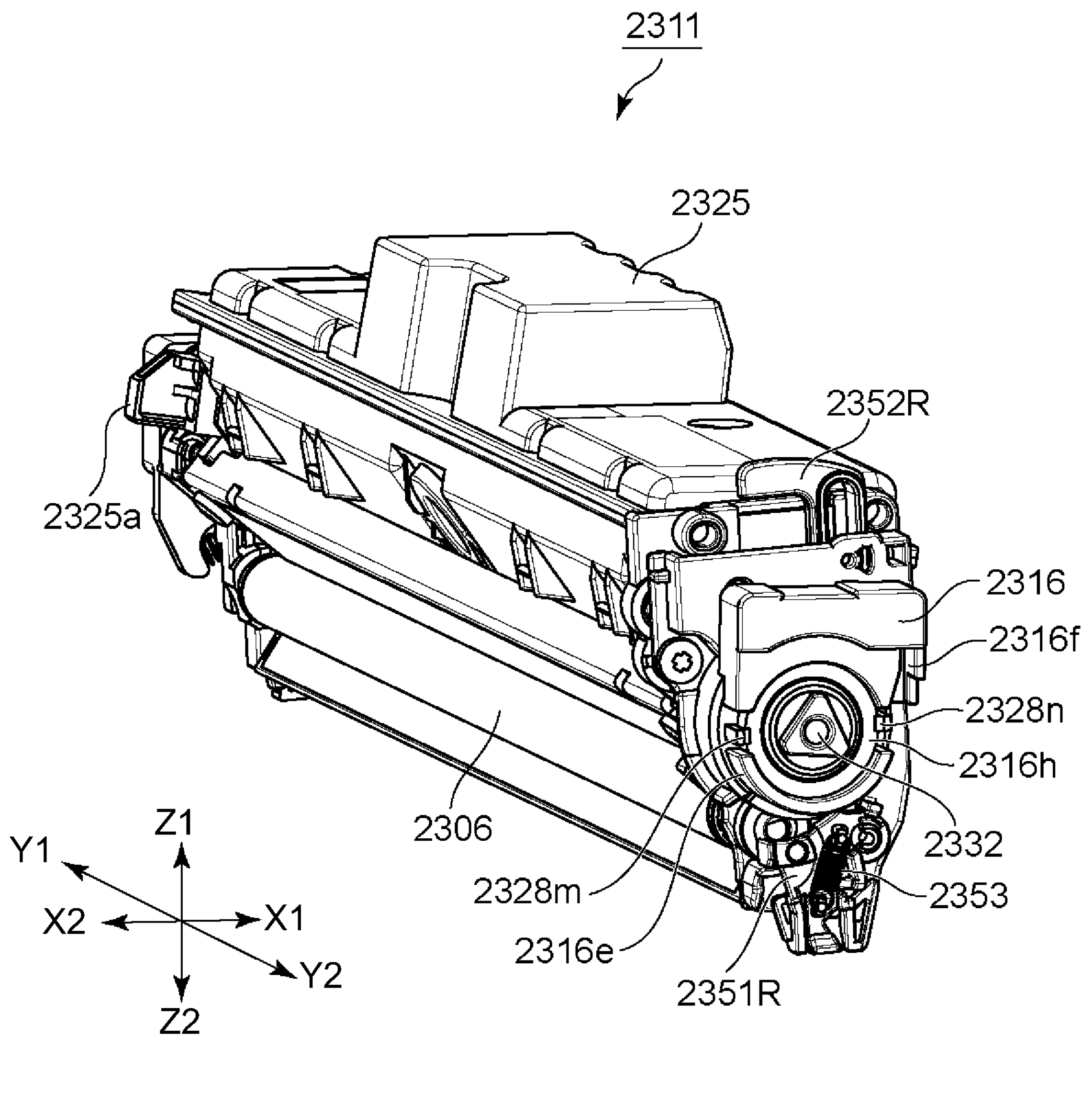

FIG. 219 is a perspective view of the process cartridge.

Figure 220:
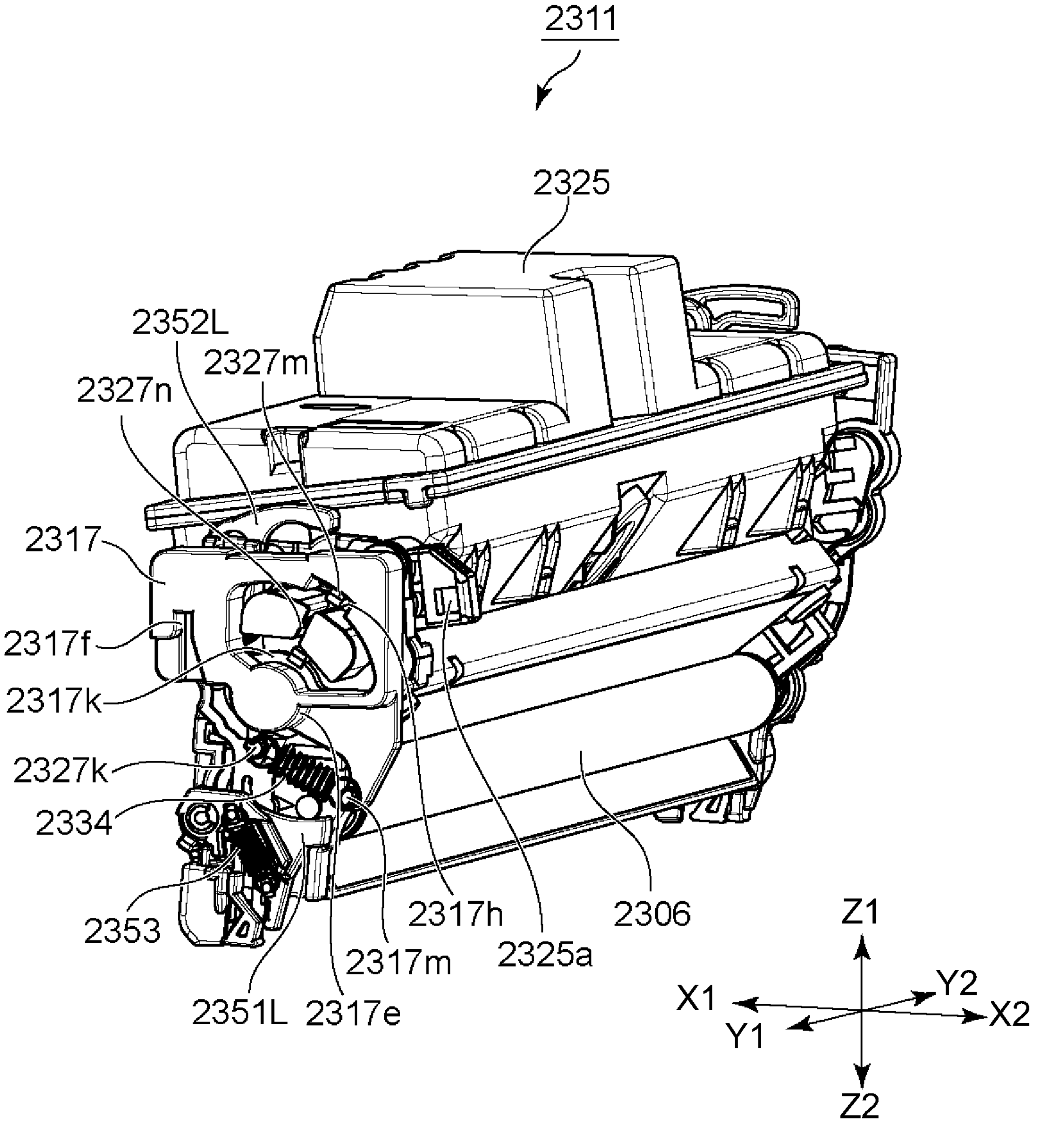

FIG. 220 is a perspective view of the process cartridge.

Figure 221:
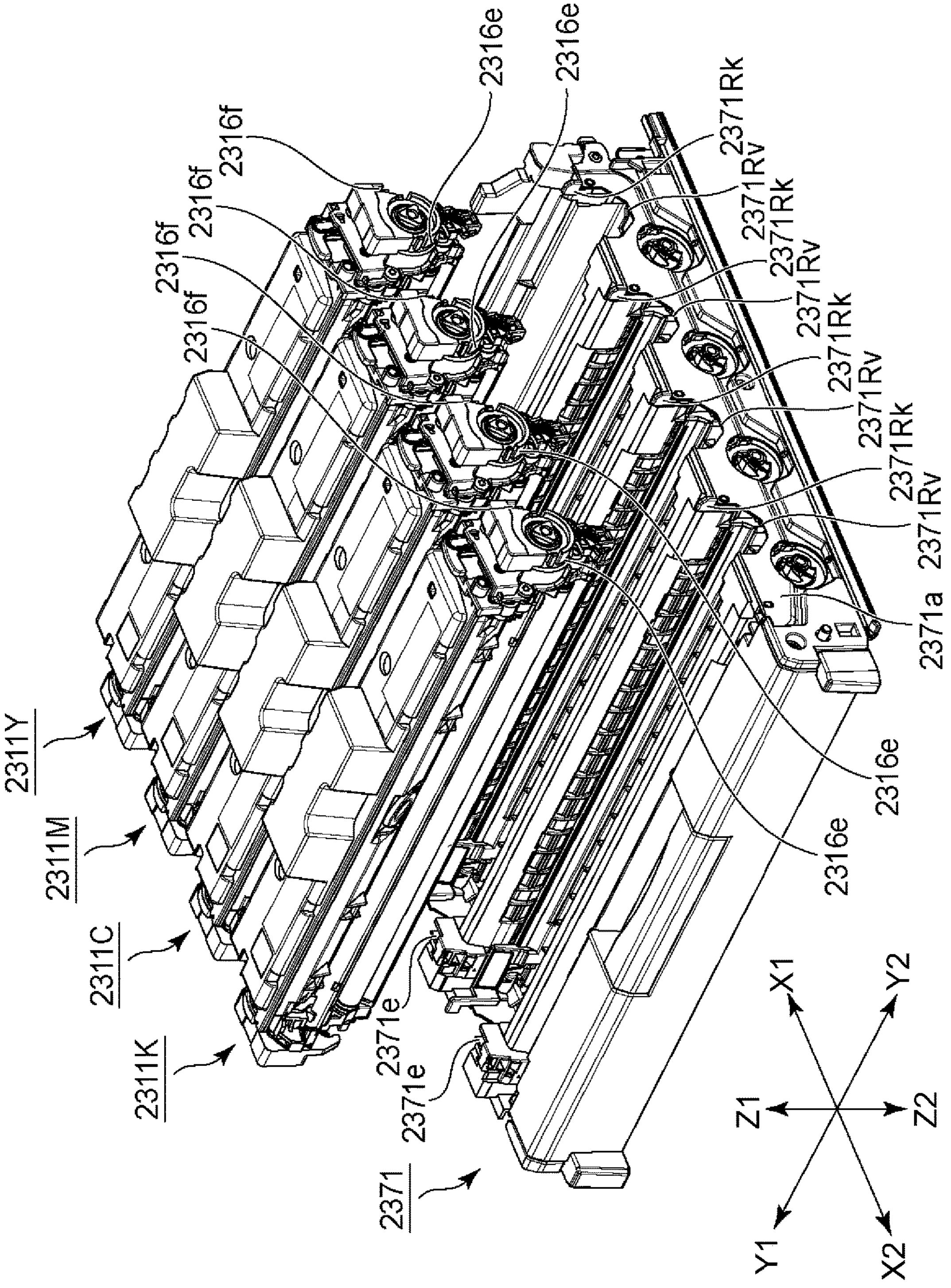

FIG. 221 is an illustration of an operation of mounting the developing cartridge on the tray.

Figure 222:
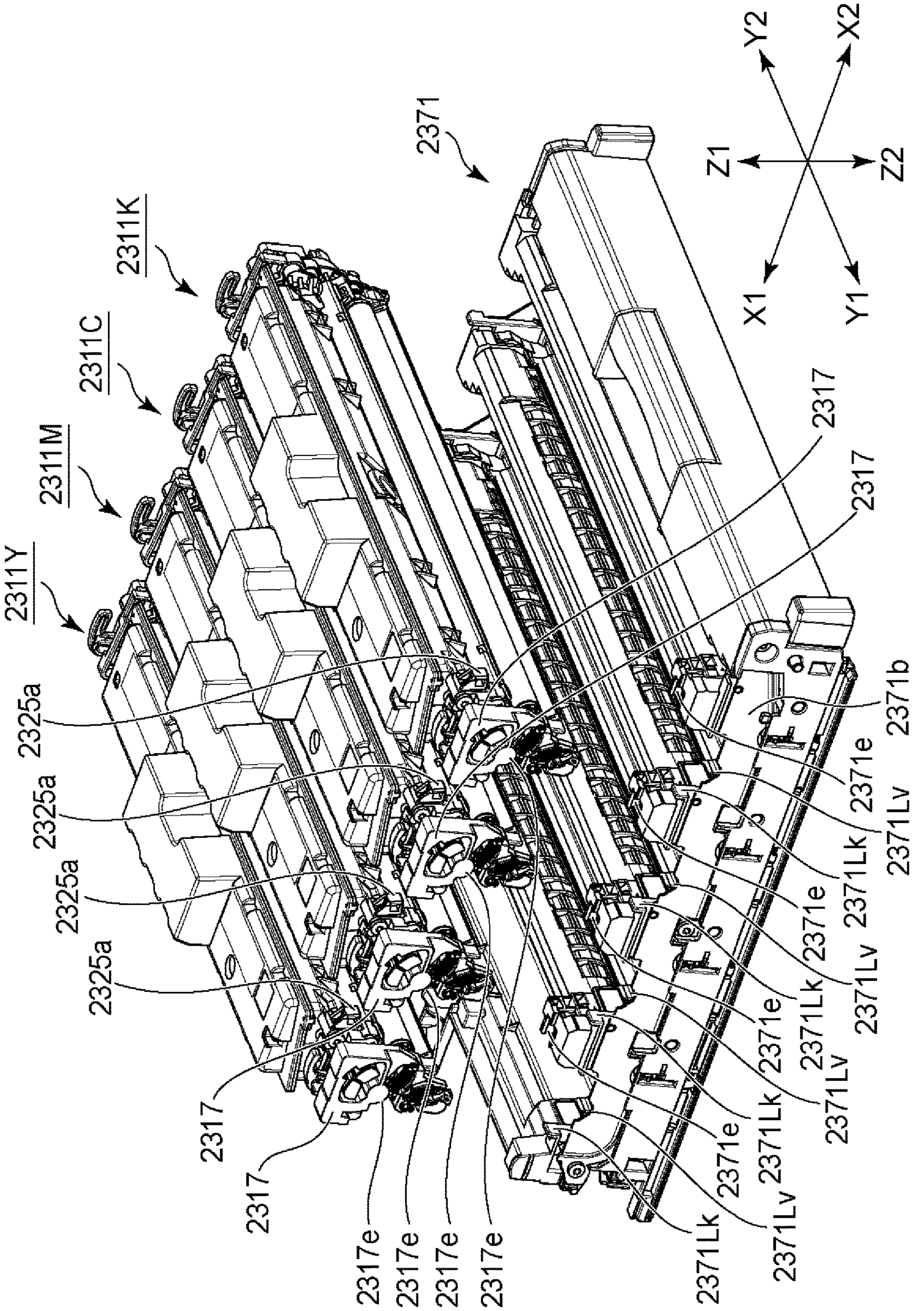

FIG. 222 is an illustration of an operation of mounting the developing cartridge on the tray.

Figure 223:
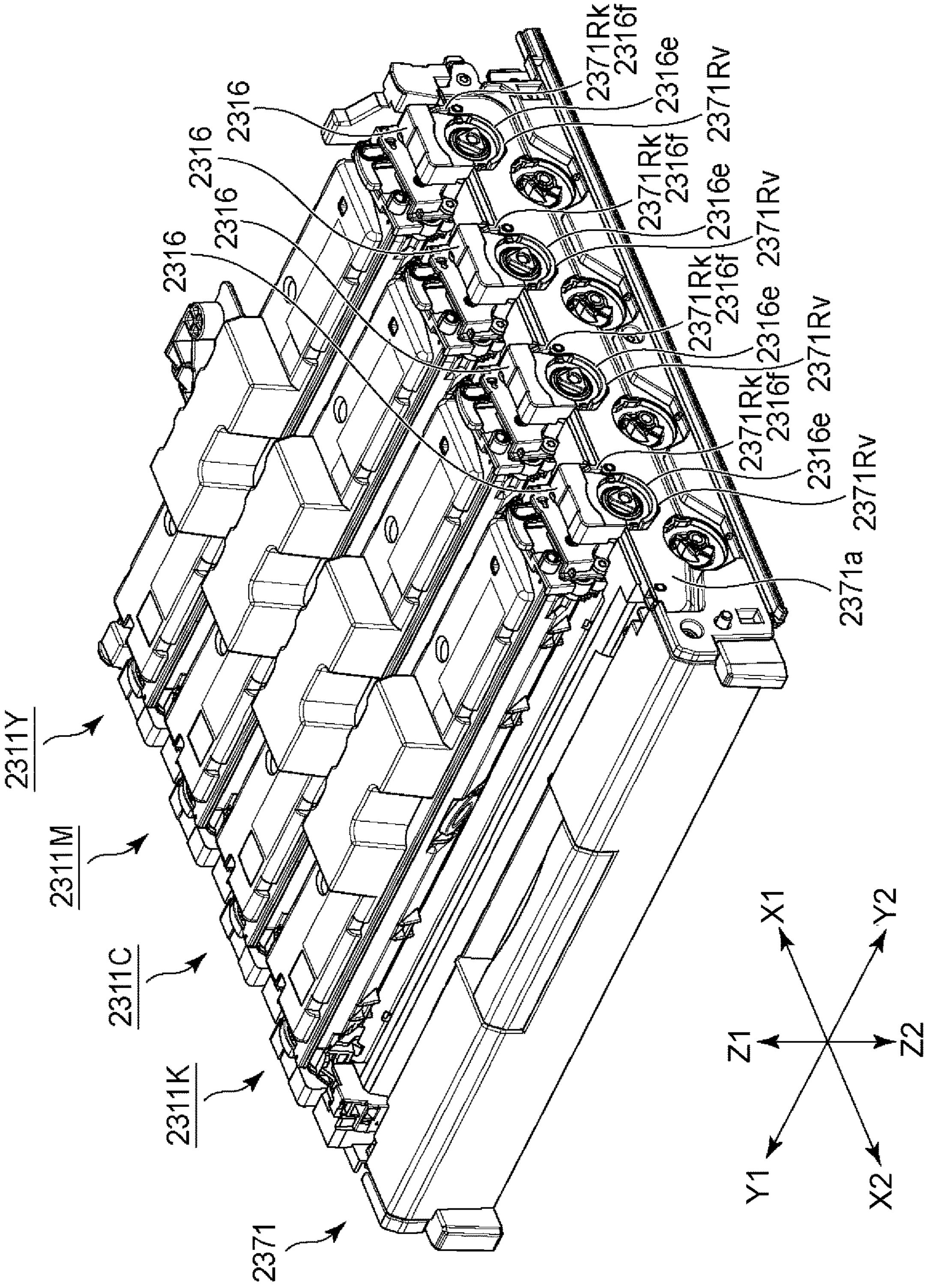

FIG. 223 is a perspective view of the tray on which the developing cartridge is mounted.

Figure 224:
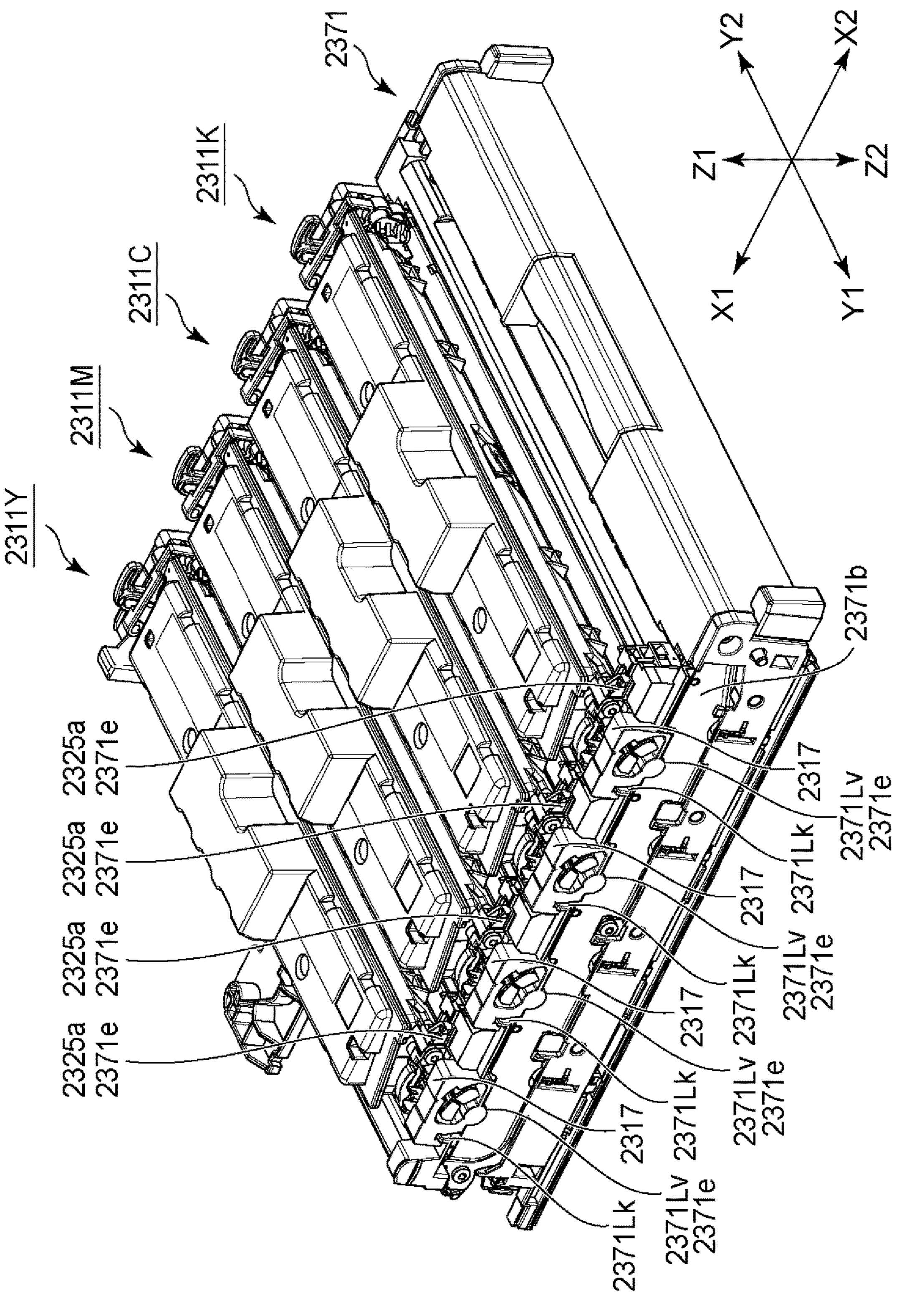

FIG. 224 is a perspective view of the tray on which the developing cartridge is mounted.

Figure 225:
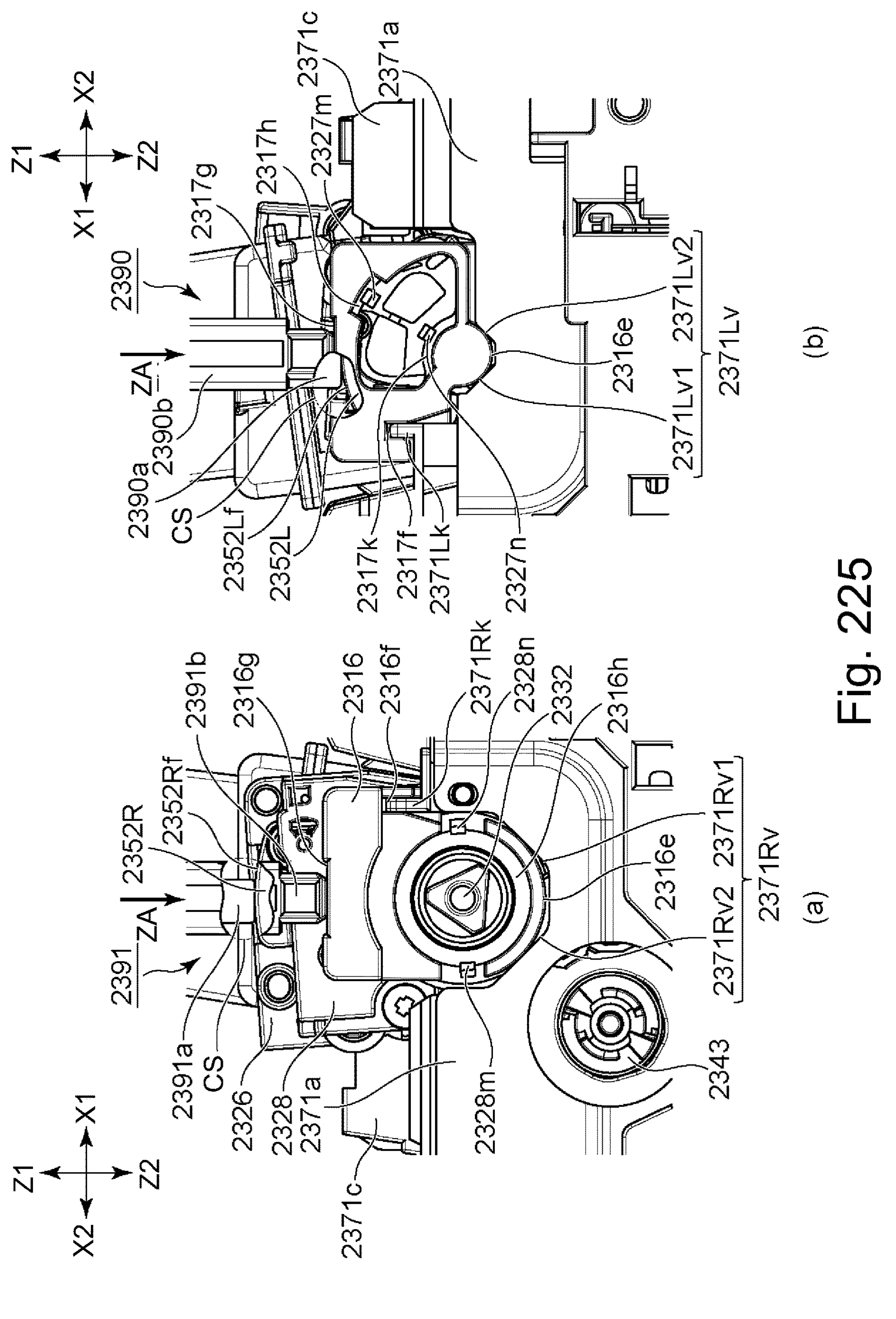

FIG. 225 is a side view of the tray and the developing cartridge in the image forming apparatus main assembly.

Figure 226:
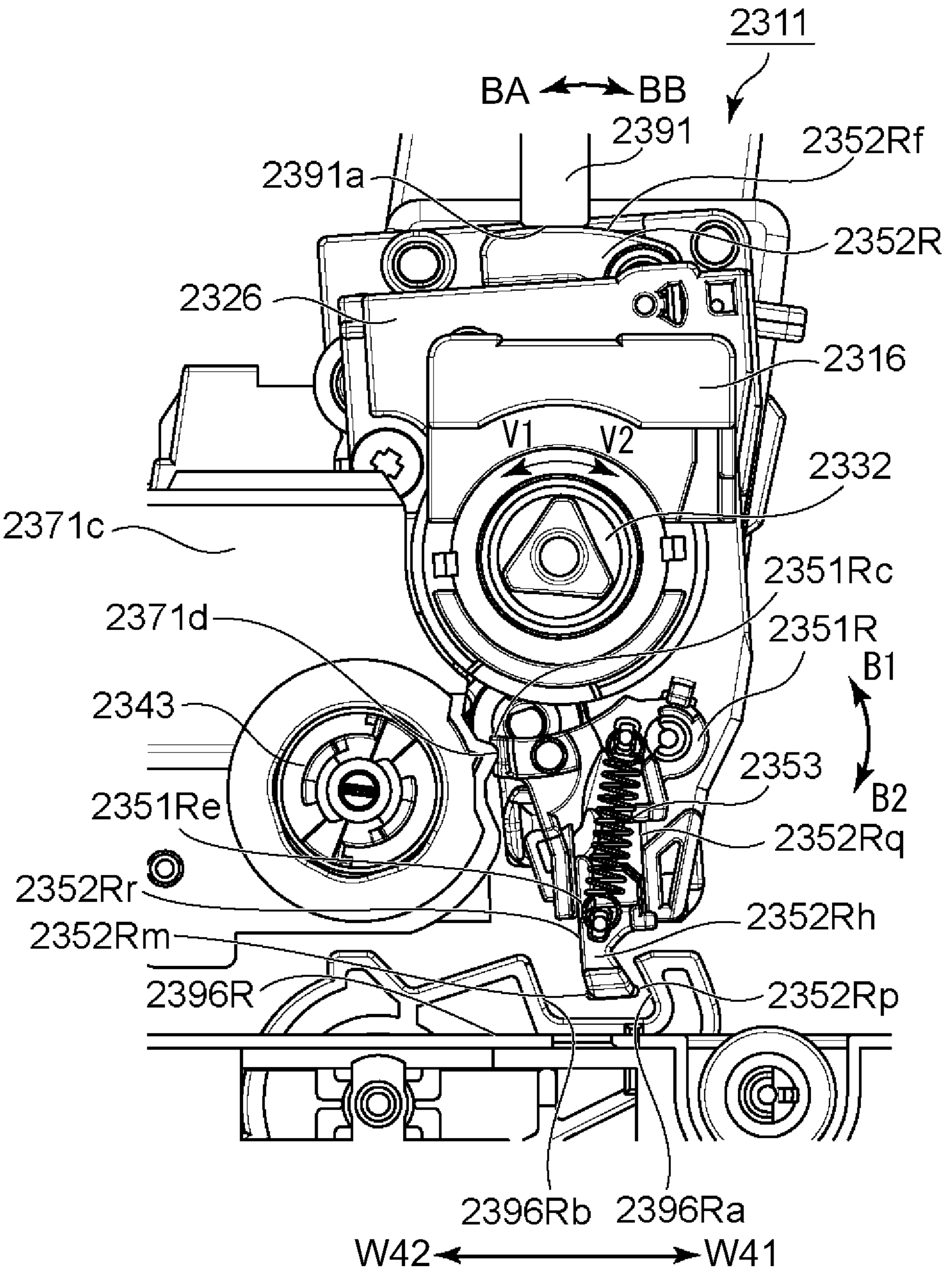

FIG. 226 is a side view of the developing cartridge in the image forming apparatus main assembly.

Figure 227:
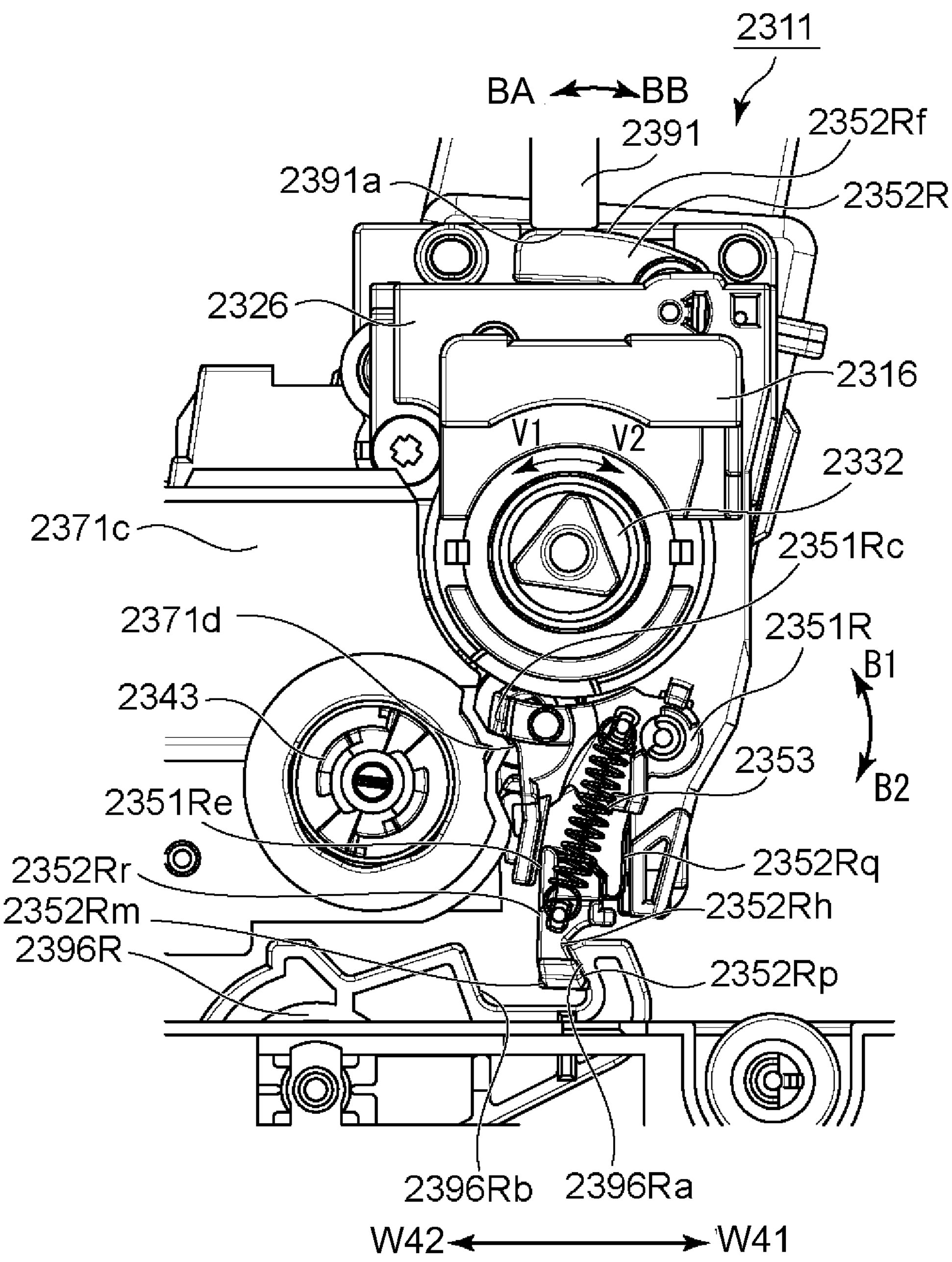

FIG. 227 is a side view of the developing cartridge in the image forming apparatus main assembly.

Figure 228:
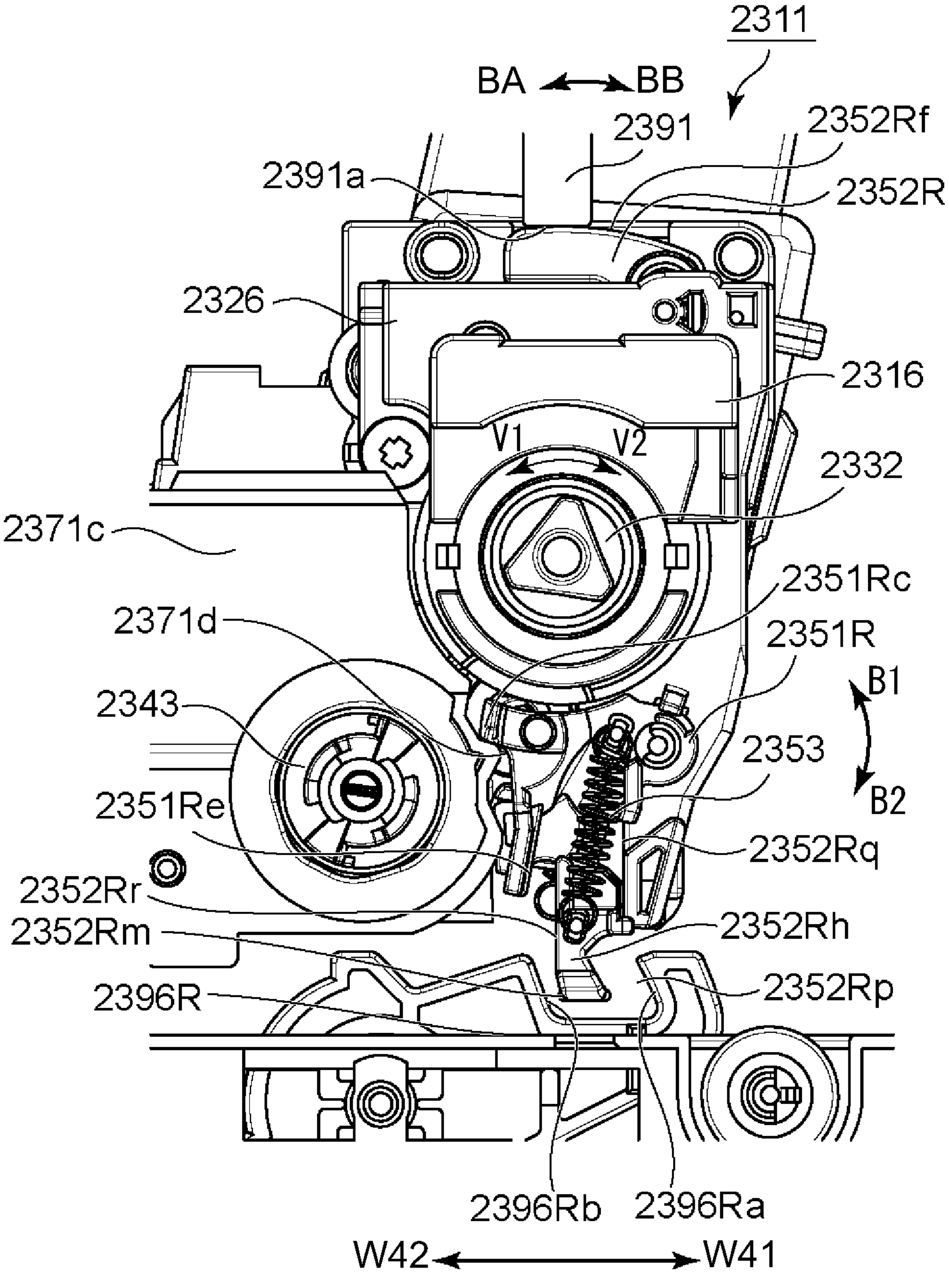

FIG. 228 is a side view of the developing cartridge in the image forming apparatus main assembly.

Figure 229:
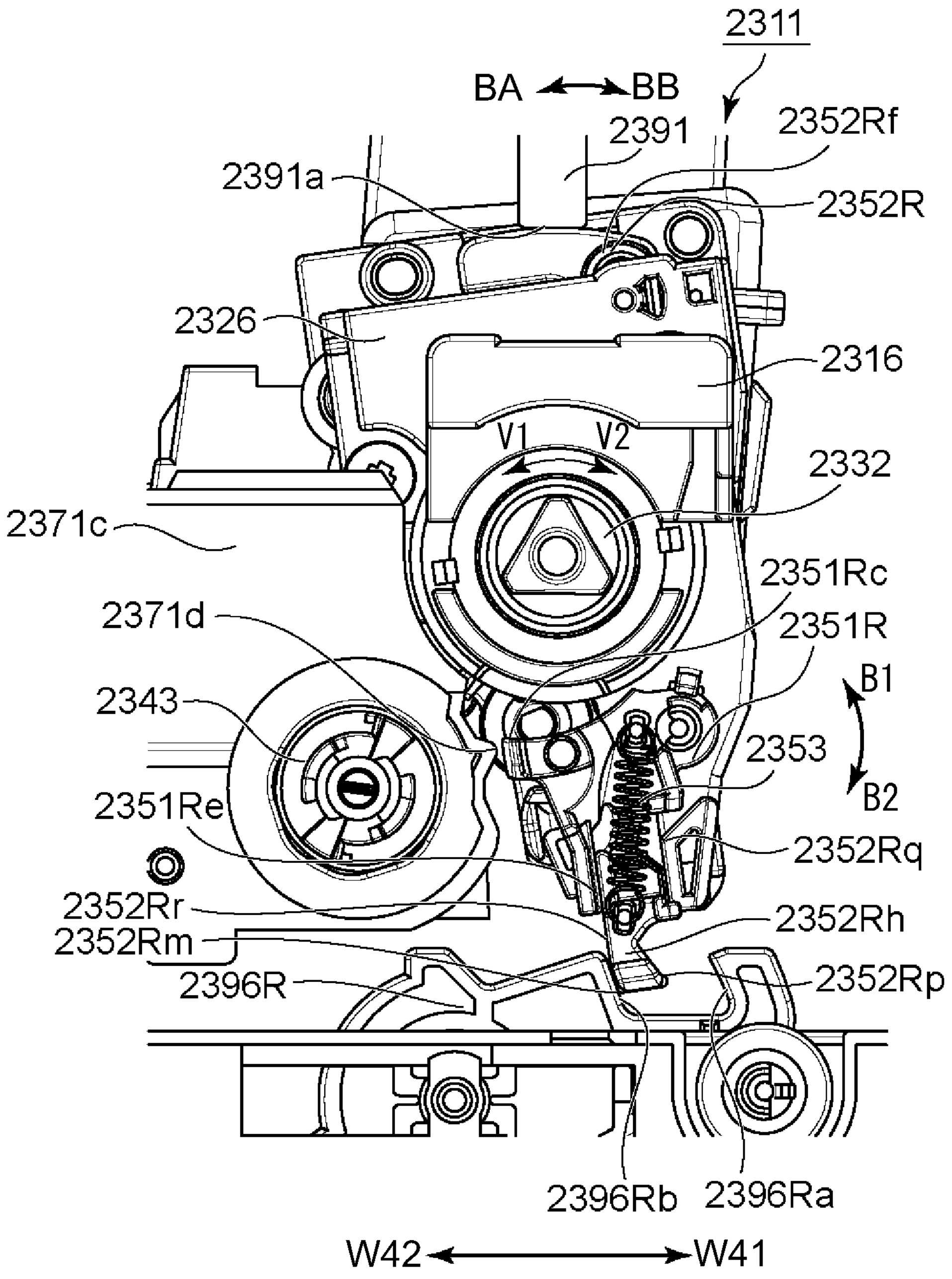

FIG. 229 is a side view of the developing cartridge in the image forming apparatus main assembly.

Figure 230:
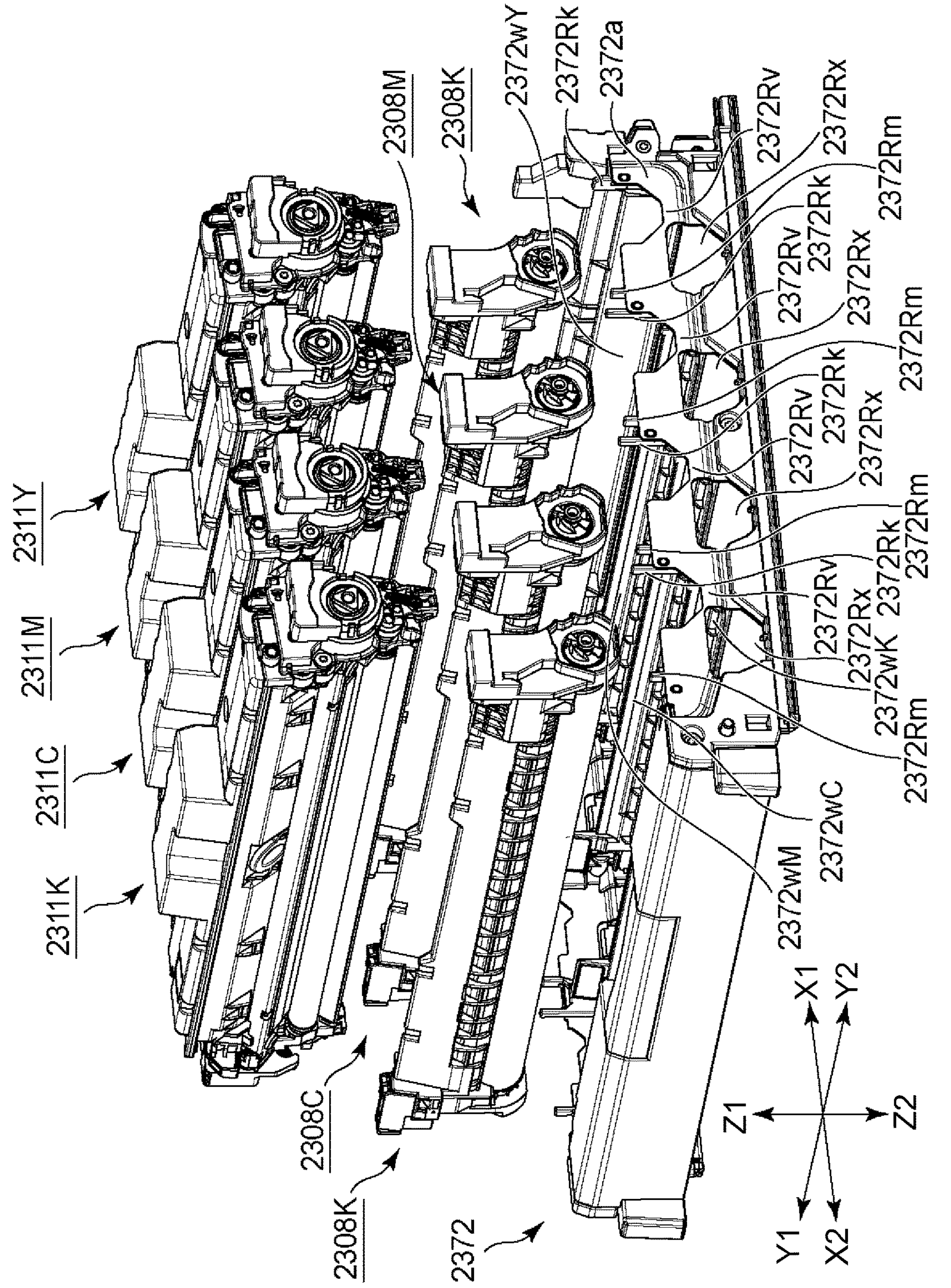

FIG. 230 is an illustration of an operation of mounting a drum cartridge and the developing cartridge on the tray.

Figure 231:
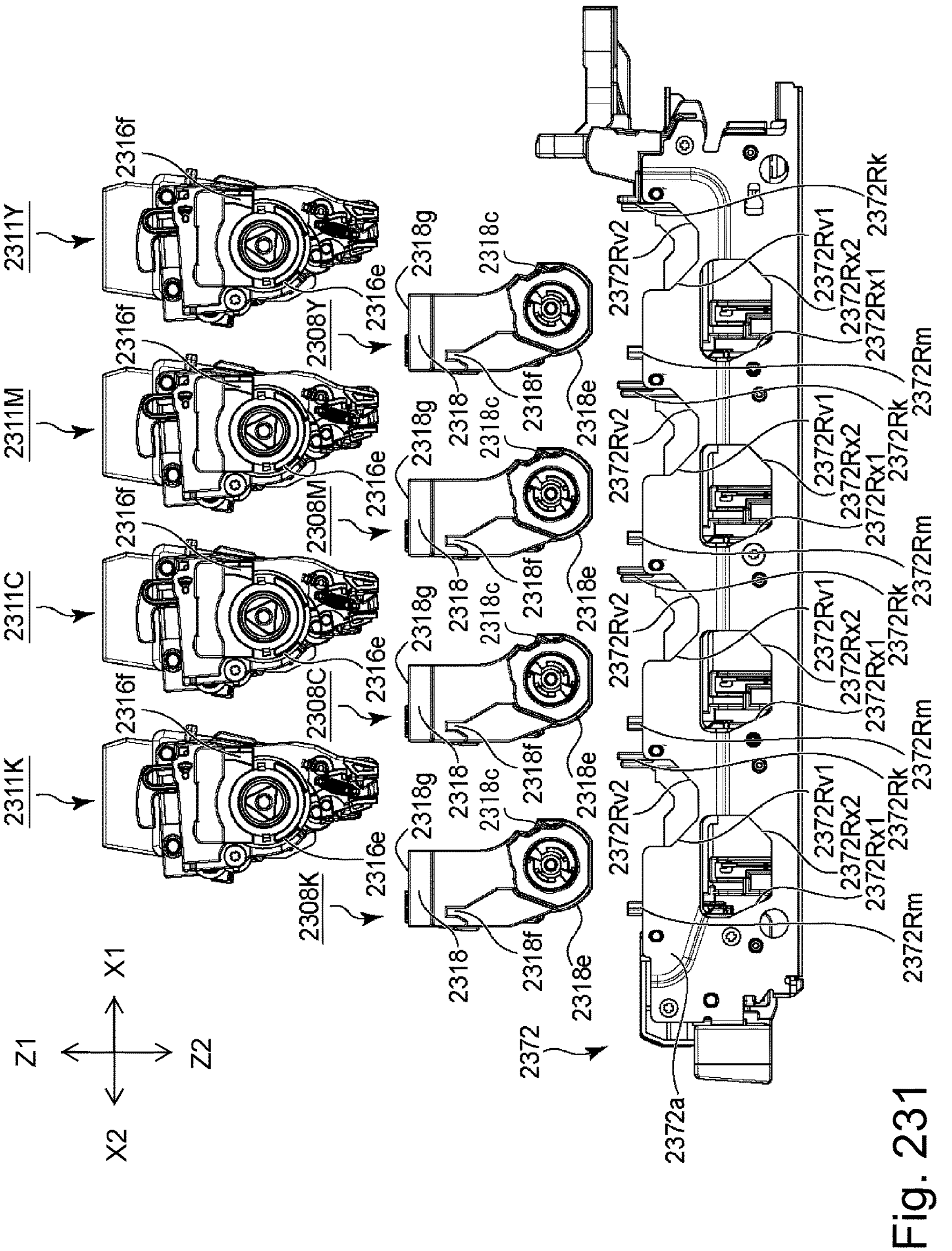

FIG. 231 is an illustration of an operation of mounting the drum cartridge and the developing cartridge on the tray.

Figure 232:
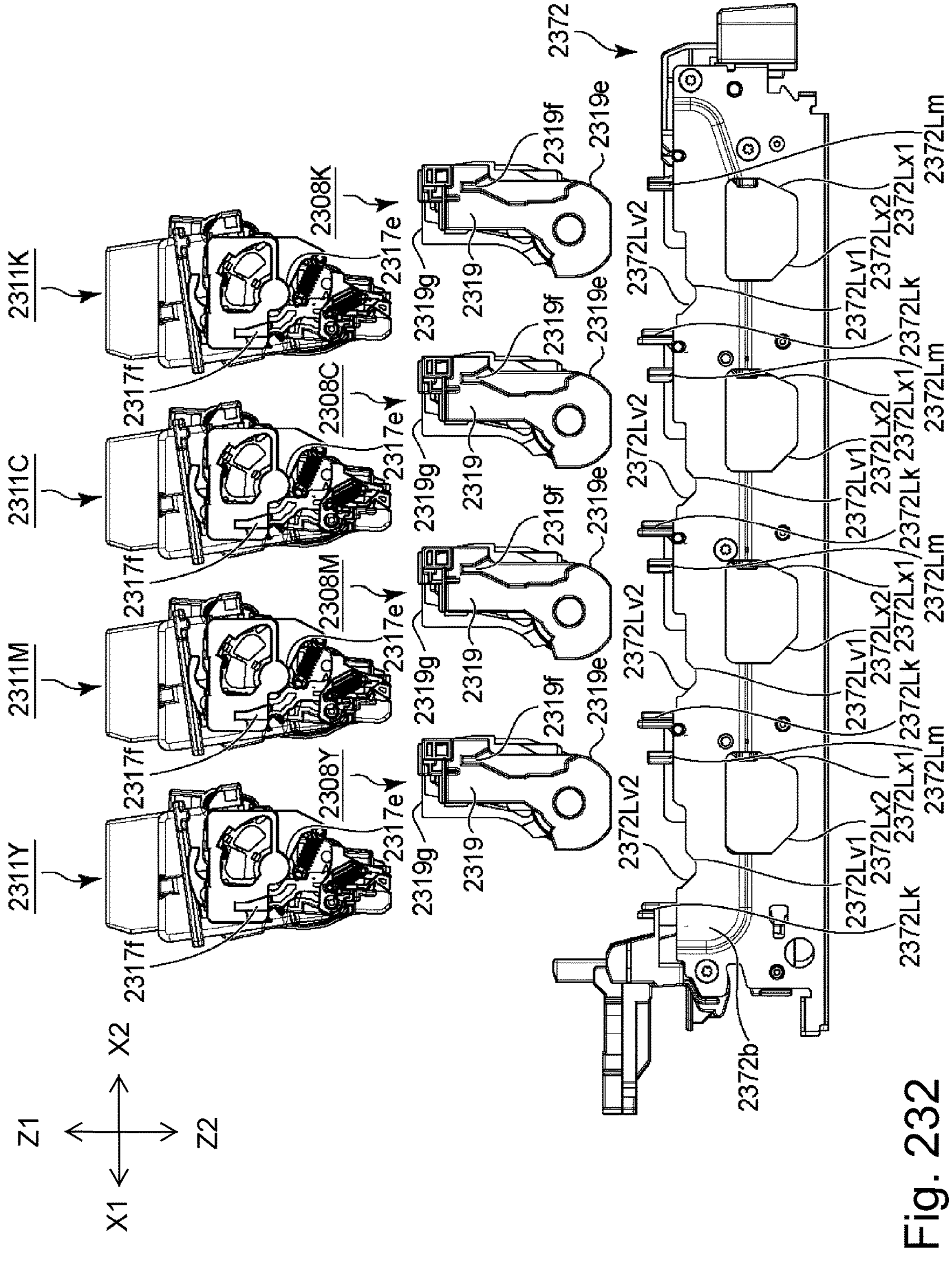

FIG. 232 is an illustration showing an operation of mounting the drum cartridge and the developing cartridge on the tray.

Figure 233:
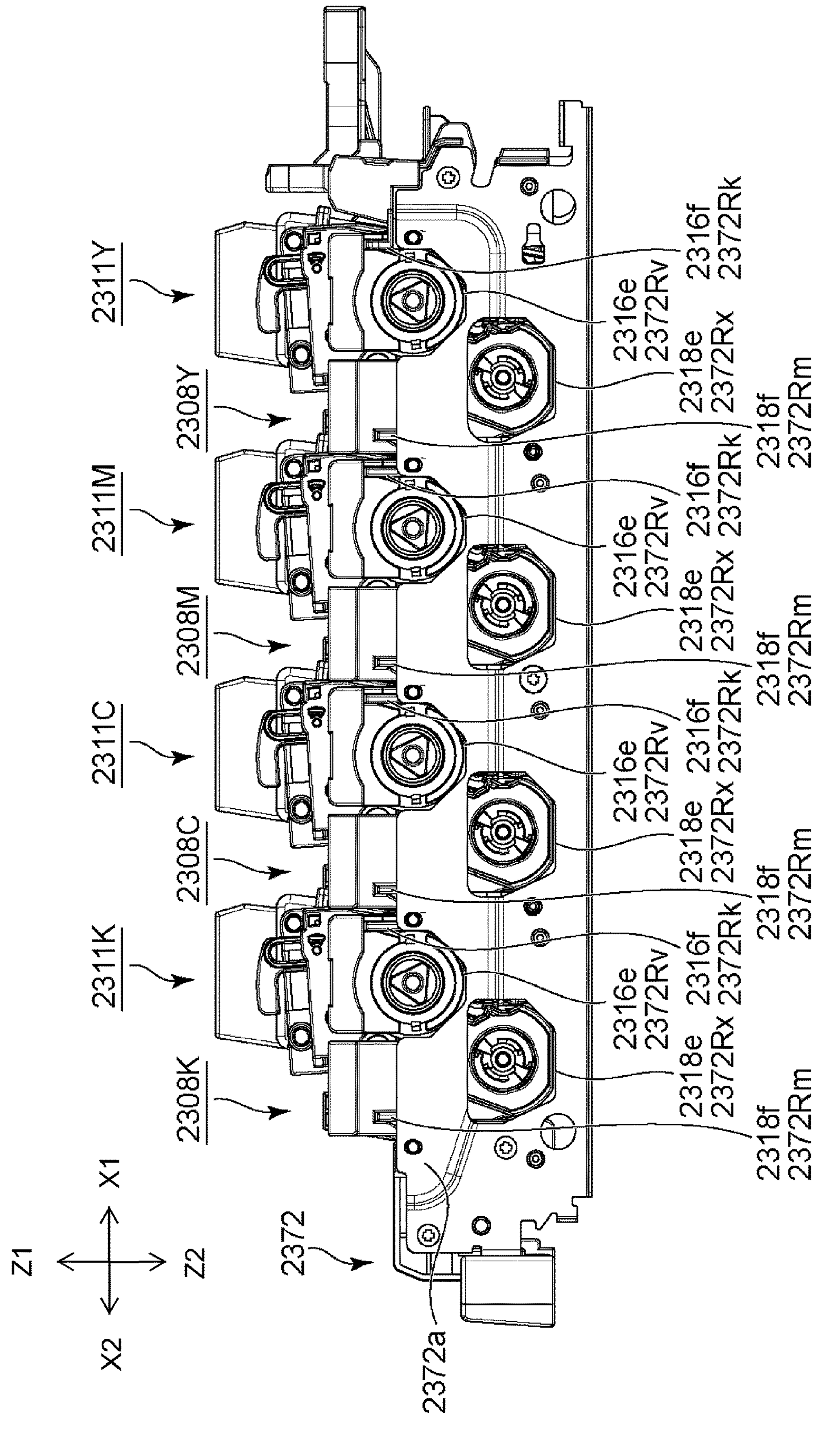

FIG. 233 is a side view of the tray on which the drum cartridge and the developing cartridge are mounted.

Figure 234:
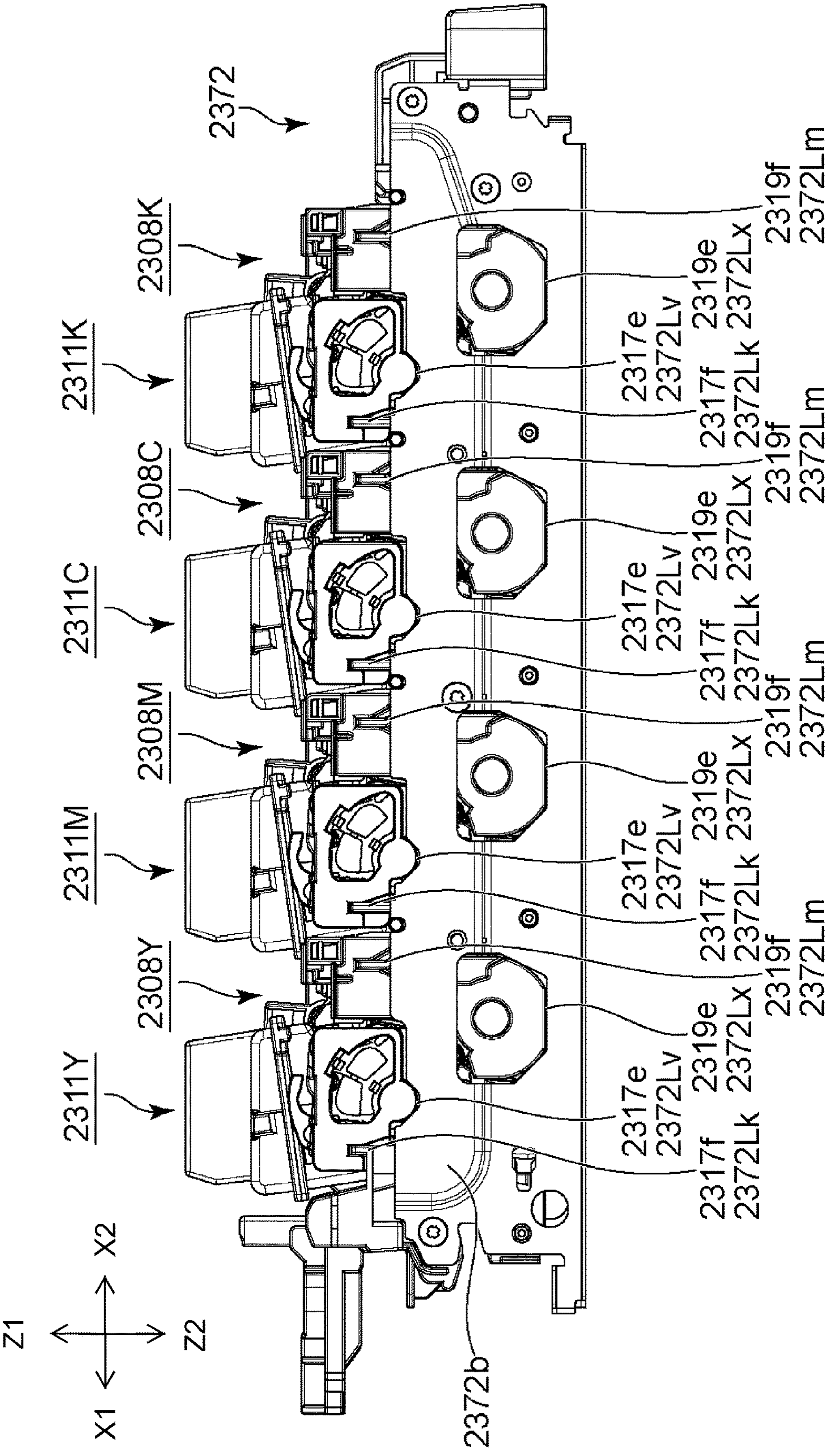

FIG. 234 is a side view of a tray on which the drum cartridge and the developing cartridge are mounted.

Figure 235:
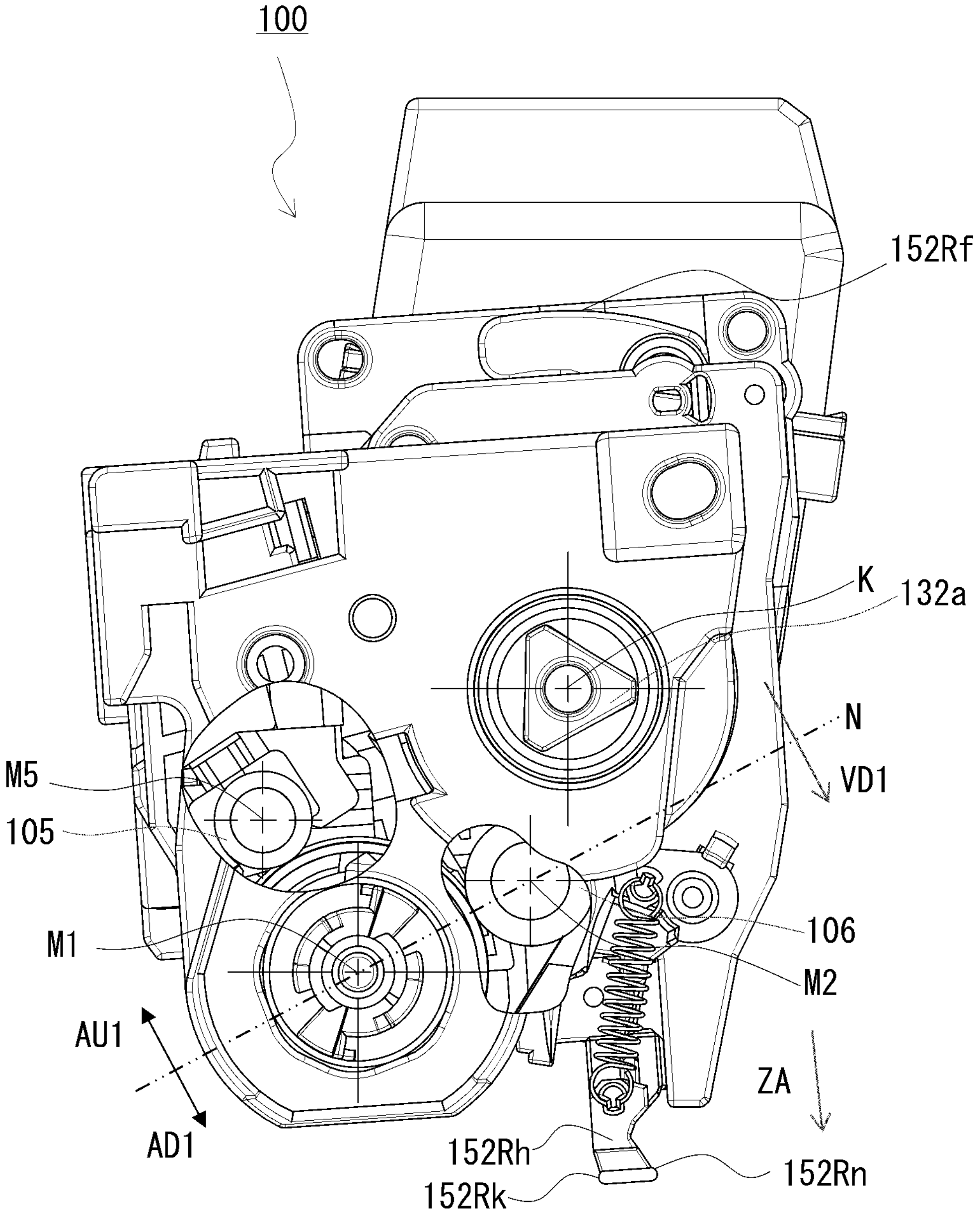

FIG. 235 is a side view (partial sectional view) of the process cartridge.

Figure 236:
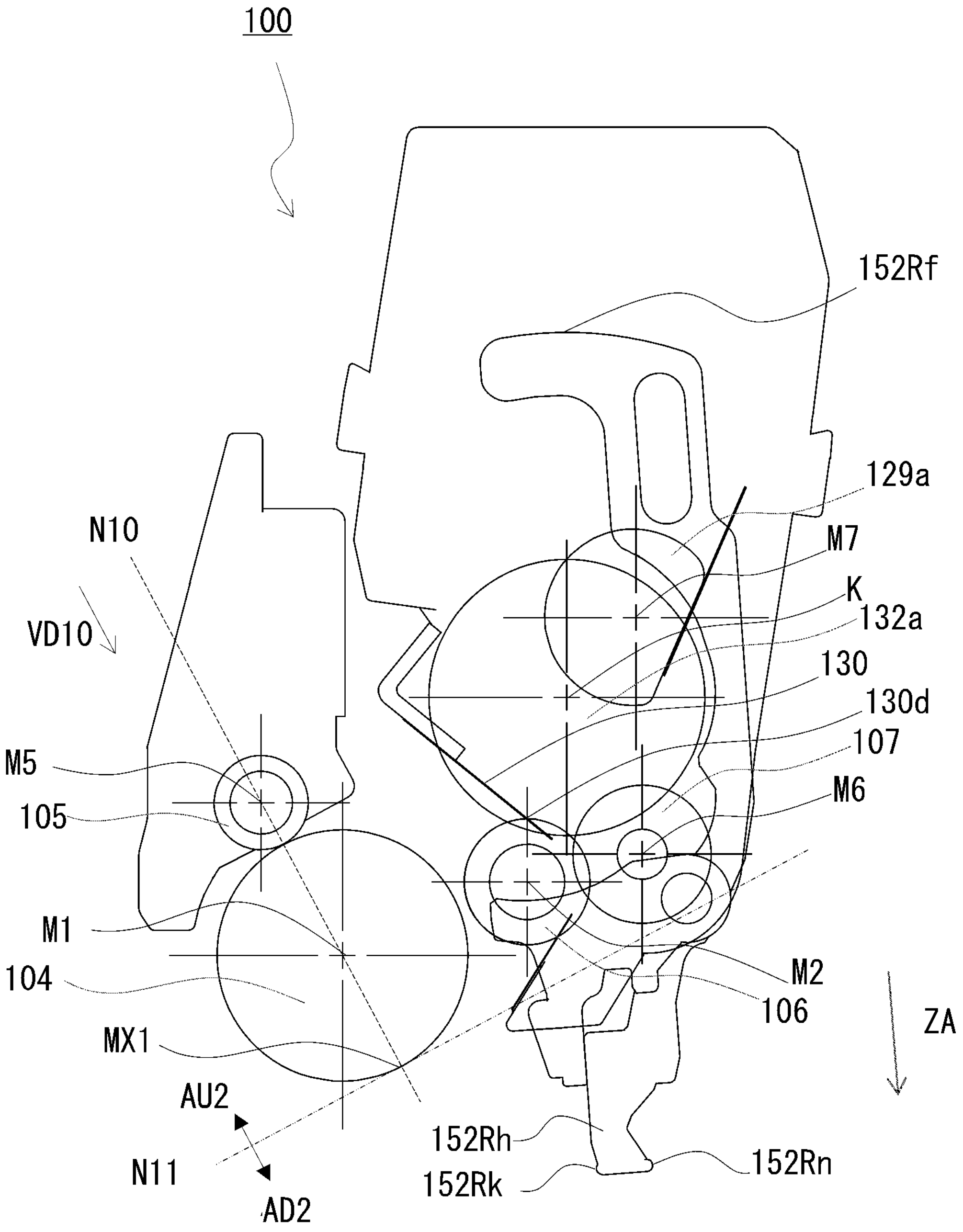

FIG. 236 is a schematic sectional view of the process cartridge.

Figure 237:
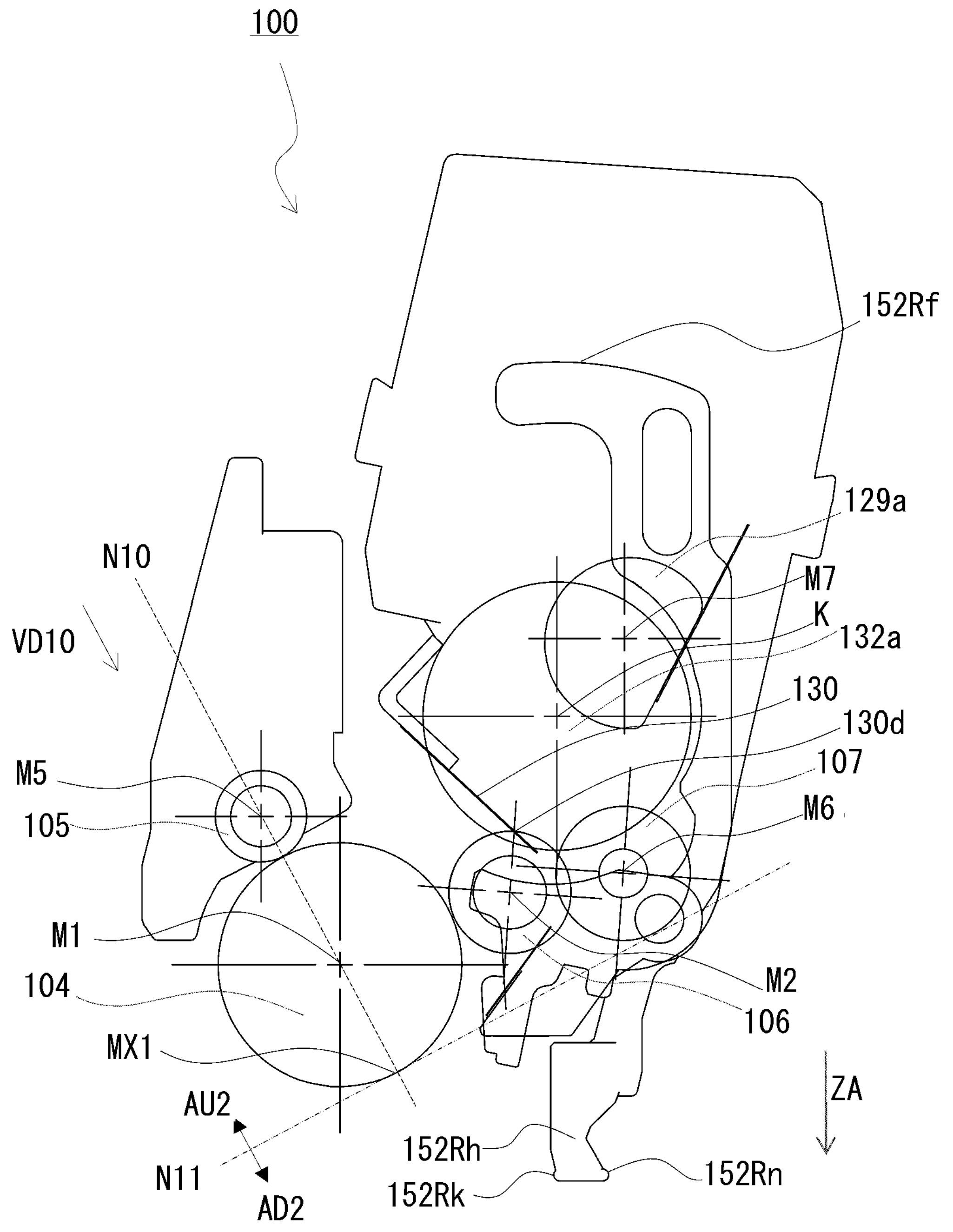

FIG. 237 is a schematic sectional view of the process cartridge.

Figure 238:
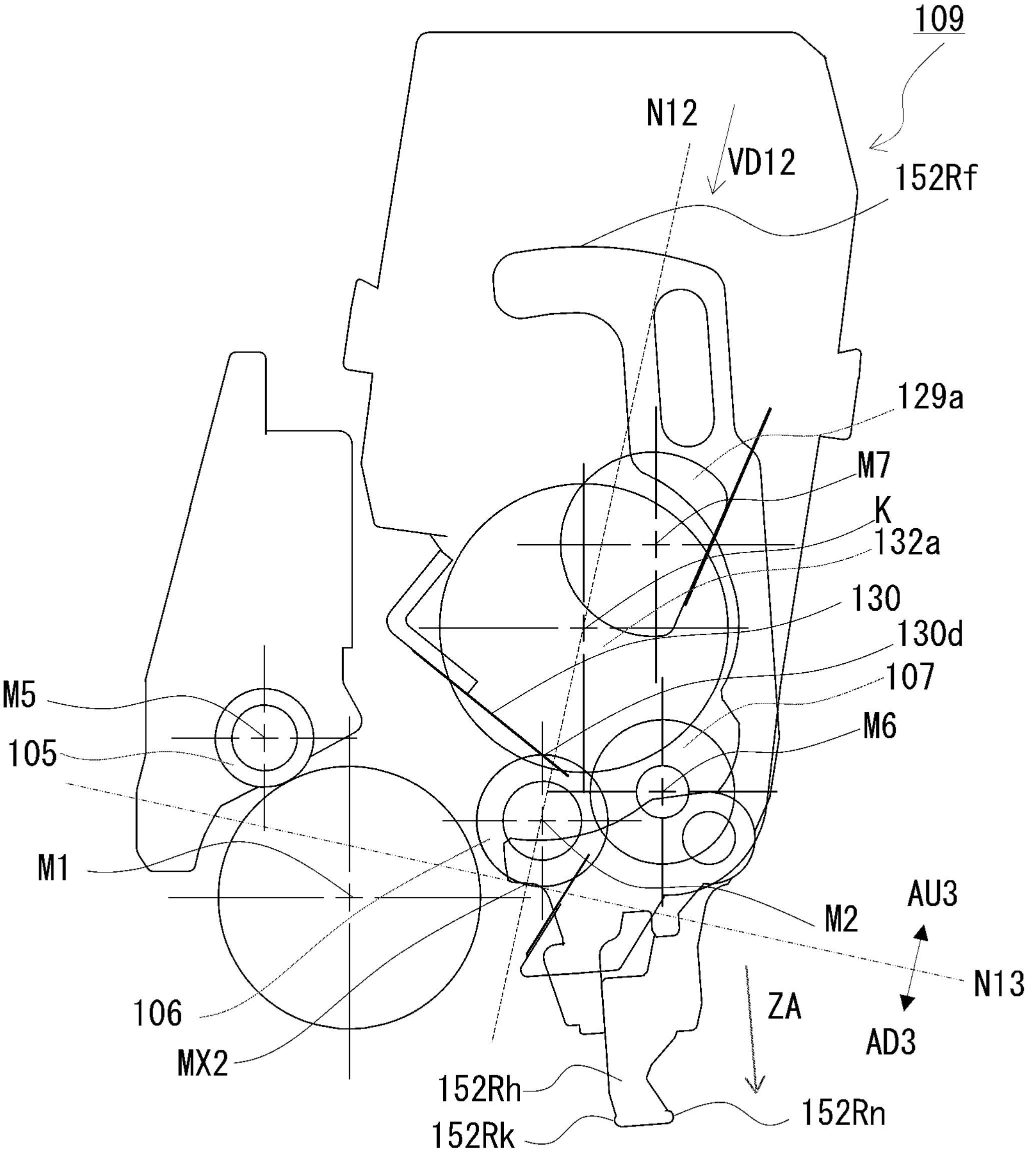

FIG. 238 is a schematic sectional view of the process cartridge.

Figure 239:
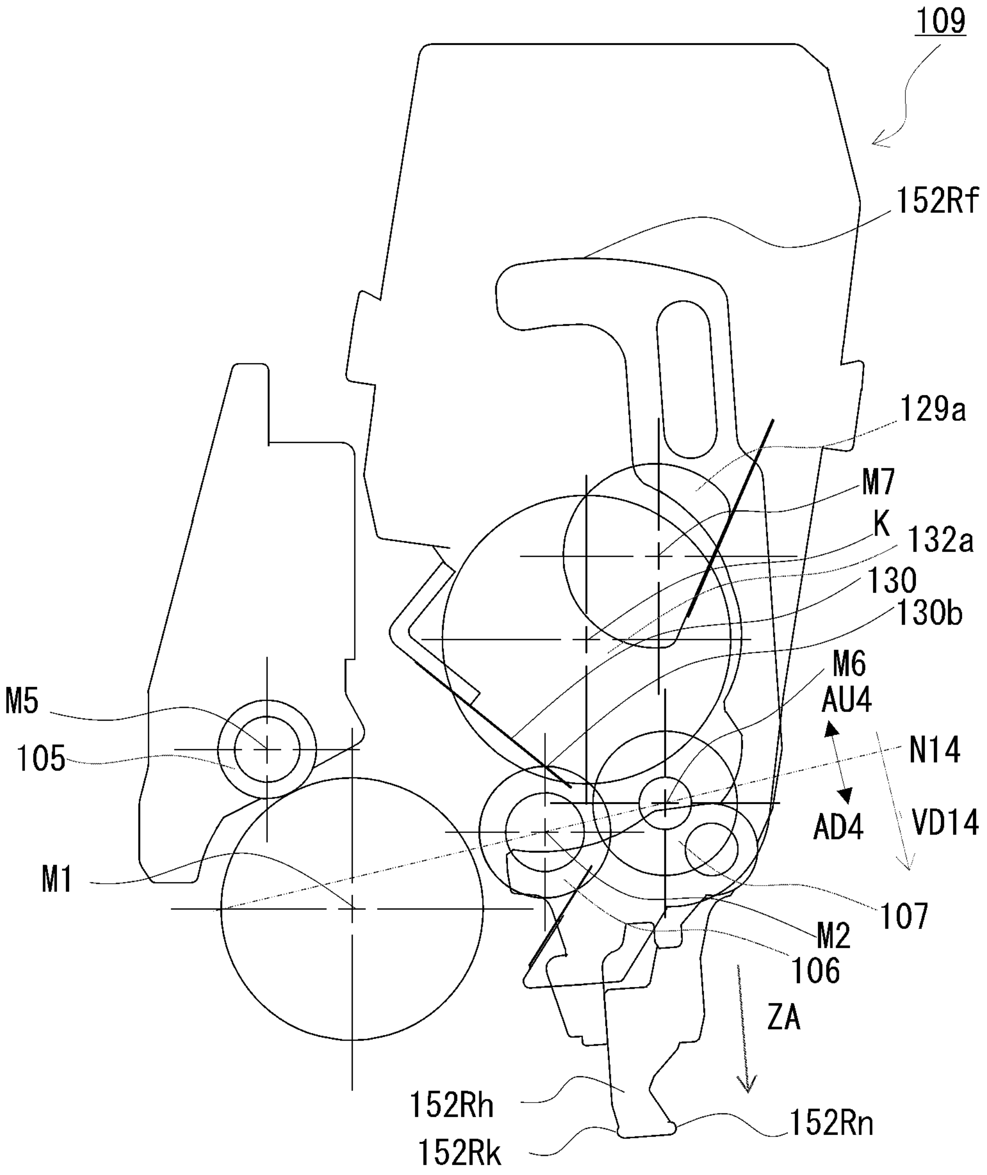

FIG. 239 is a schematic sectional view of the process cartridge.

Figure 240:
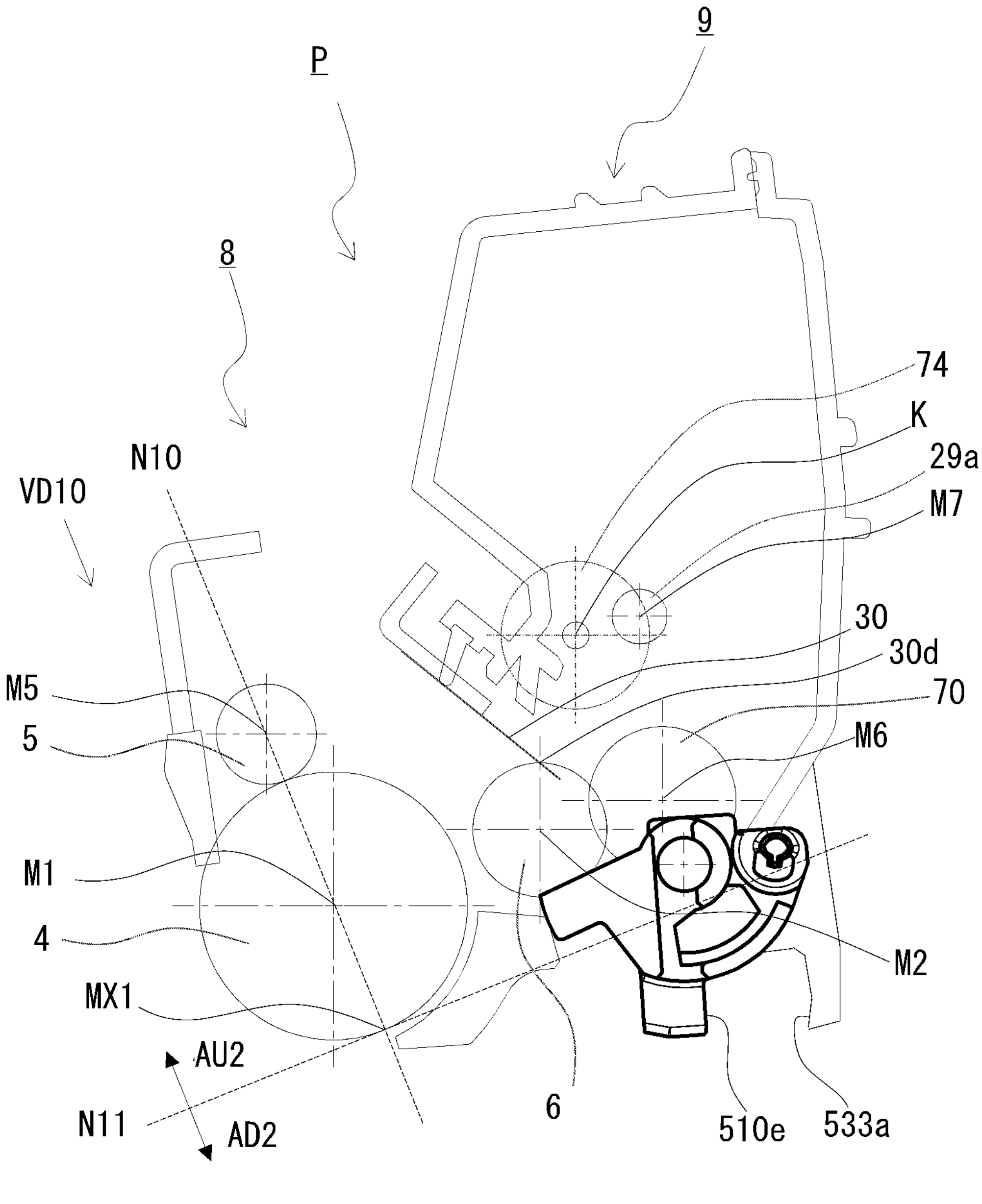

FIG. 240 is a schematic sectional view of the process cartridge.

Figure 241:
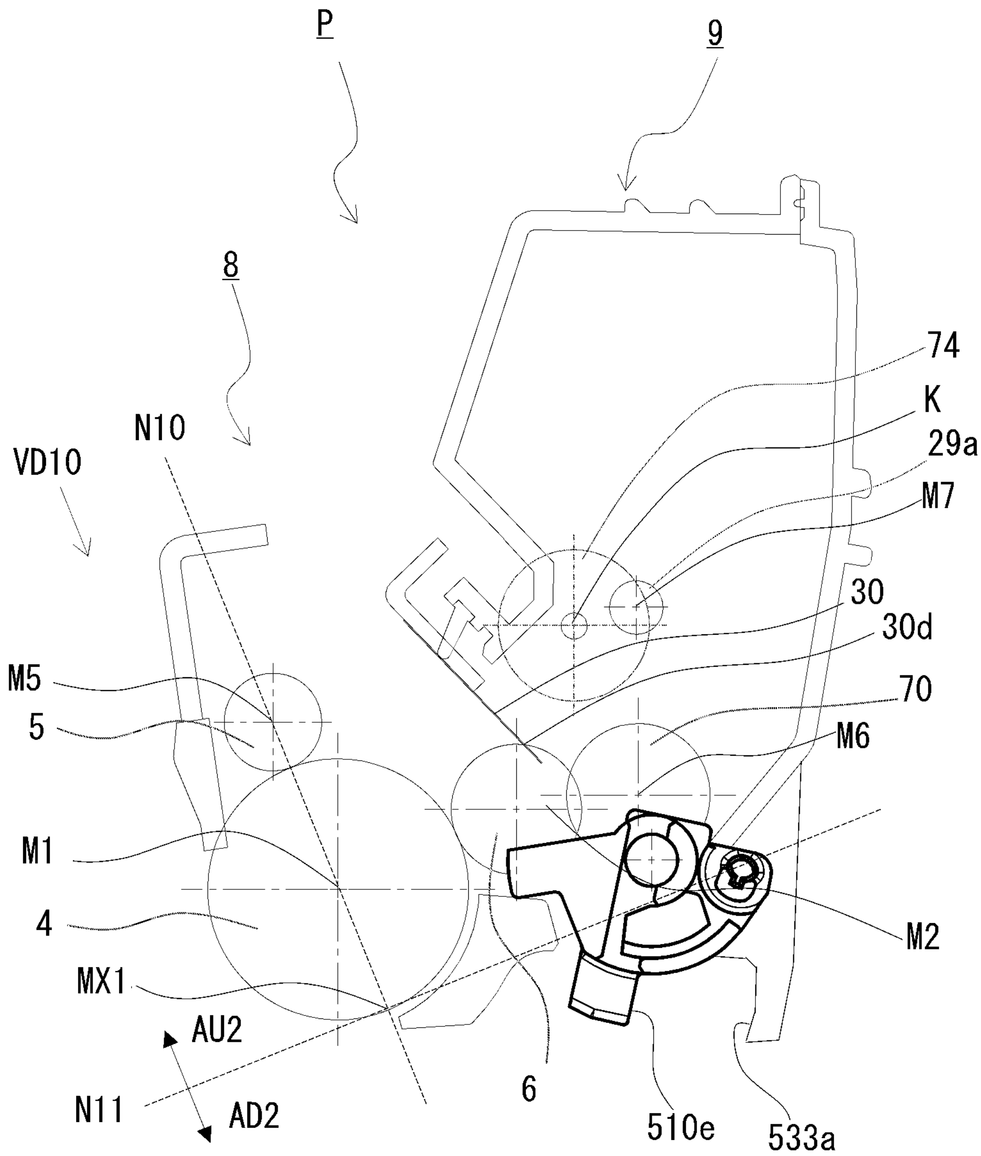

FIG. 241 is a schematic sectional view of the process cartridge.

Figure 242:
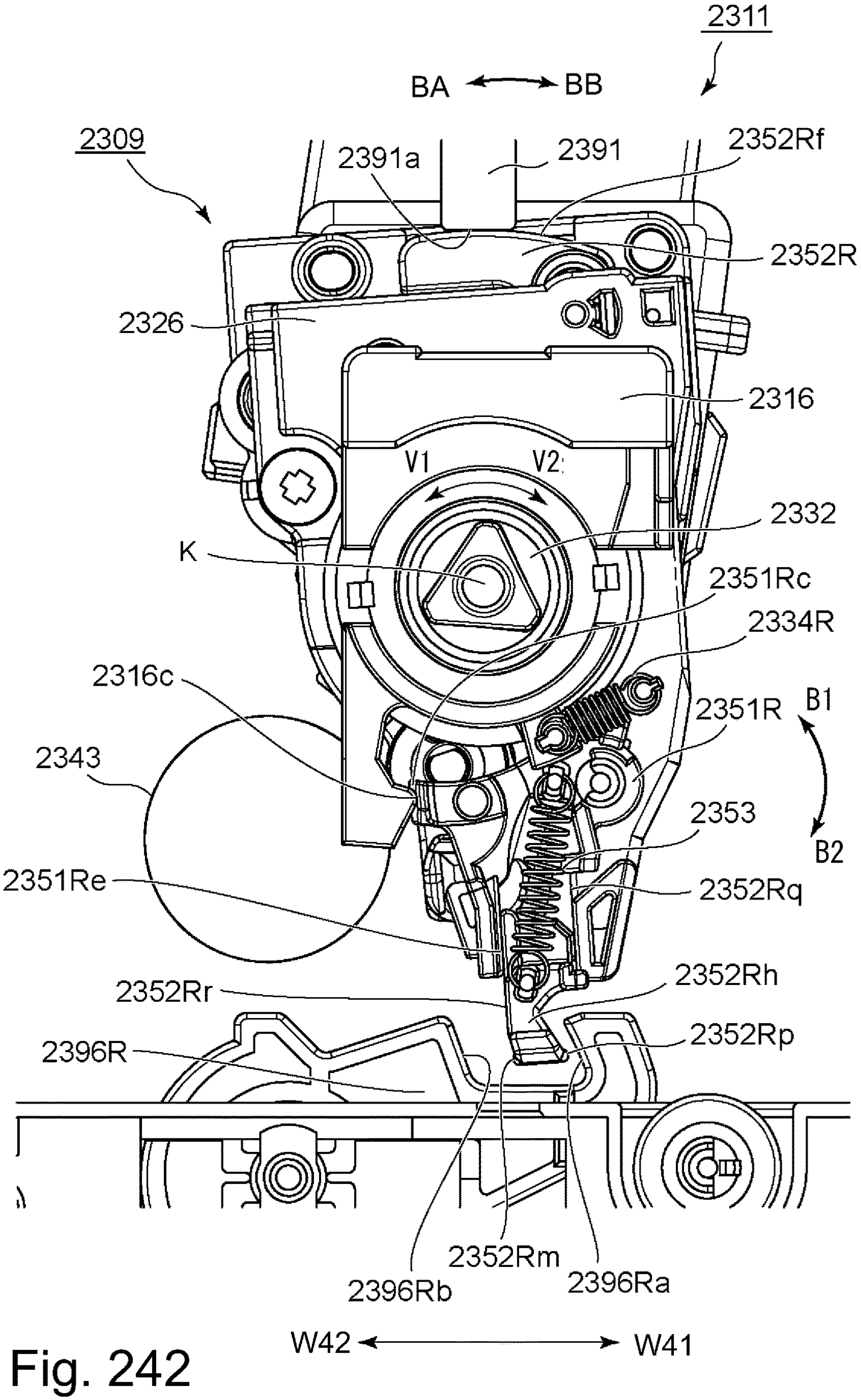

FIG. 242 is a side view of the developing cartridge in the image forming apparatus main assembly.

Figure 243:
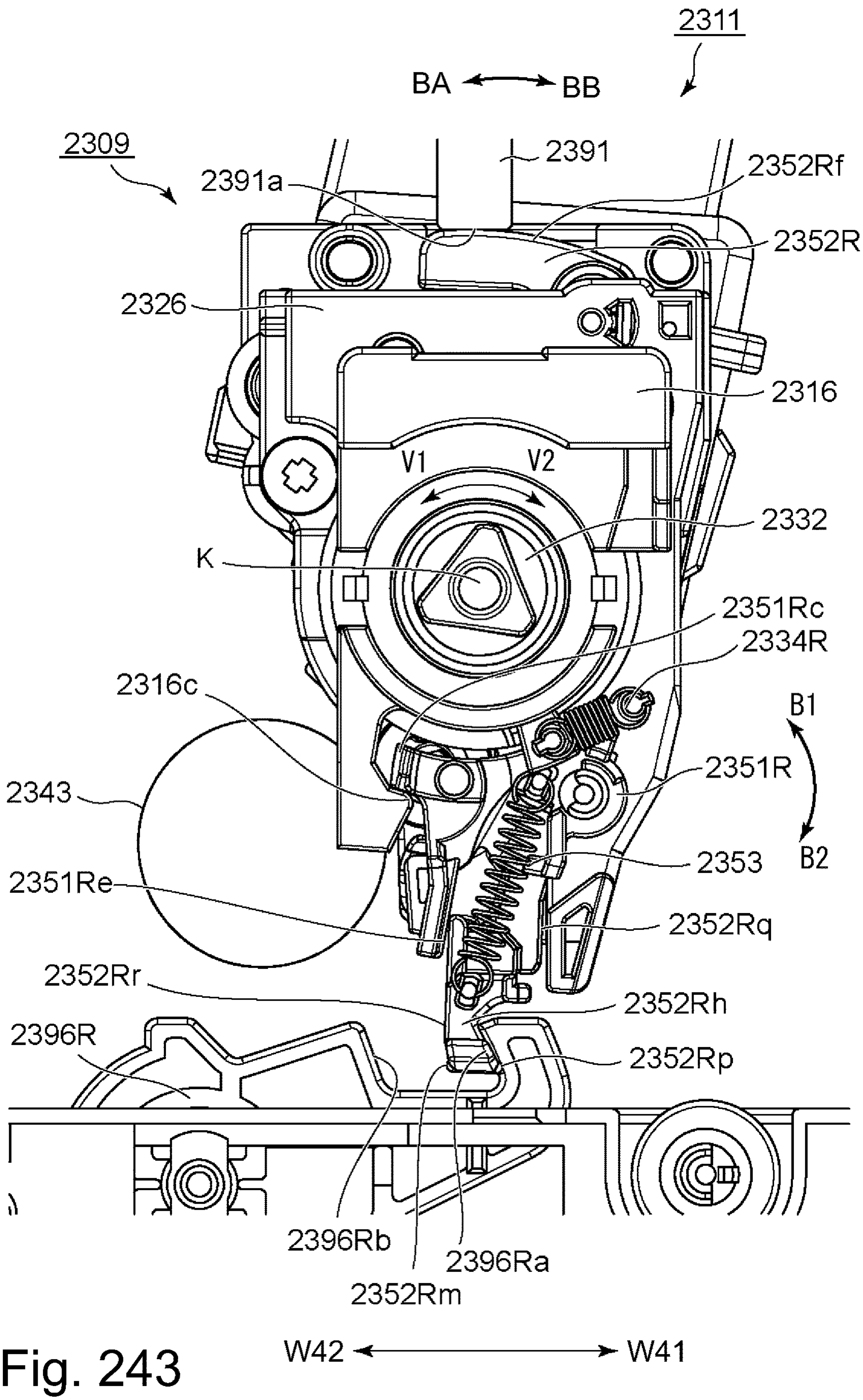

FIG. 243 is a side view of the developing cartridge in the image forming apparatus main assembly.

Figure 244:
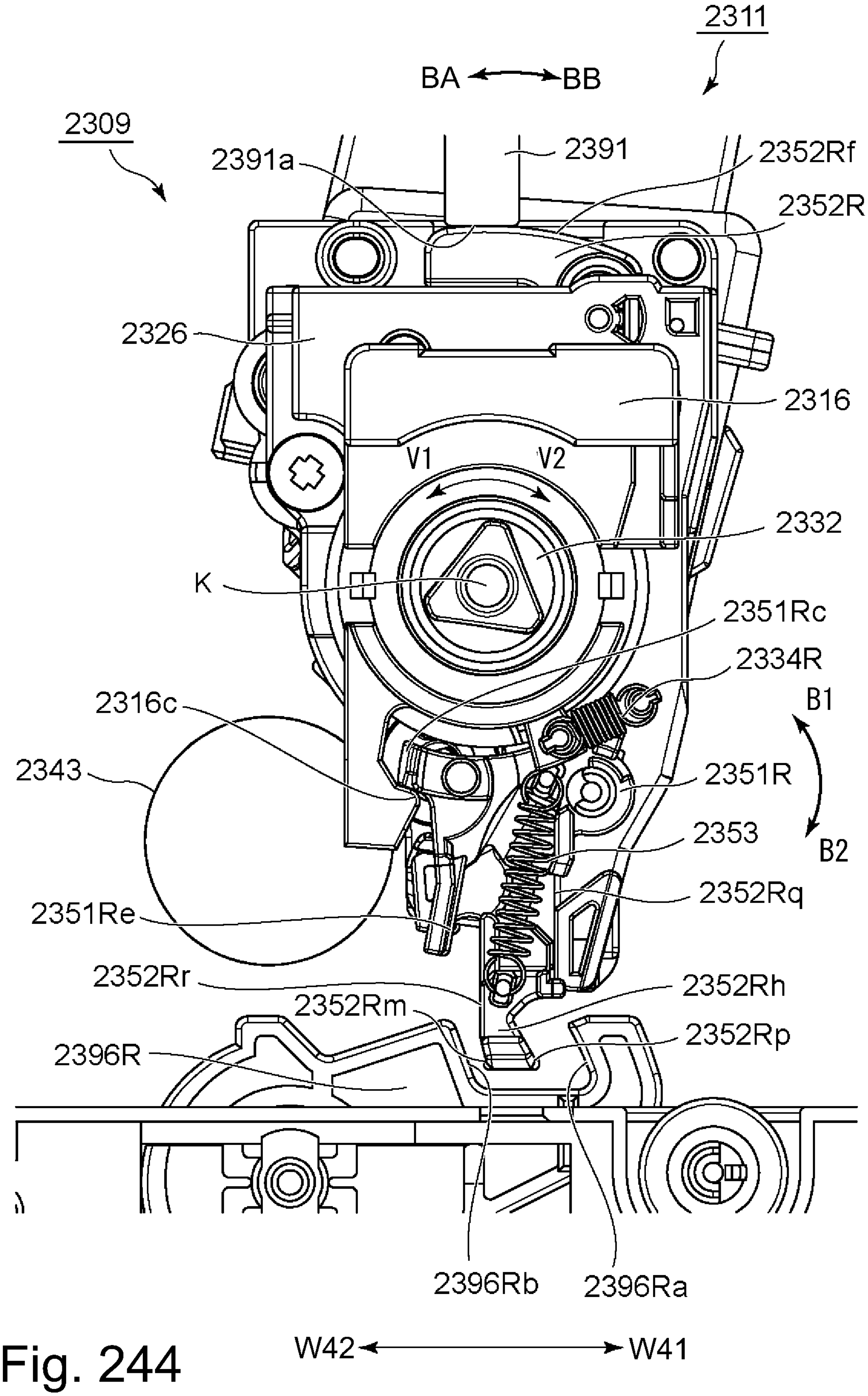

FIG. 244 is a side view of the developing cartridge in the image forming apparatus main assembly.

Figure 245:
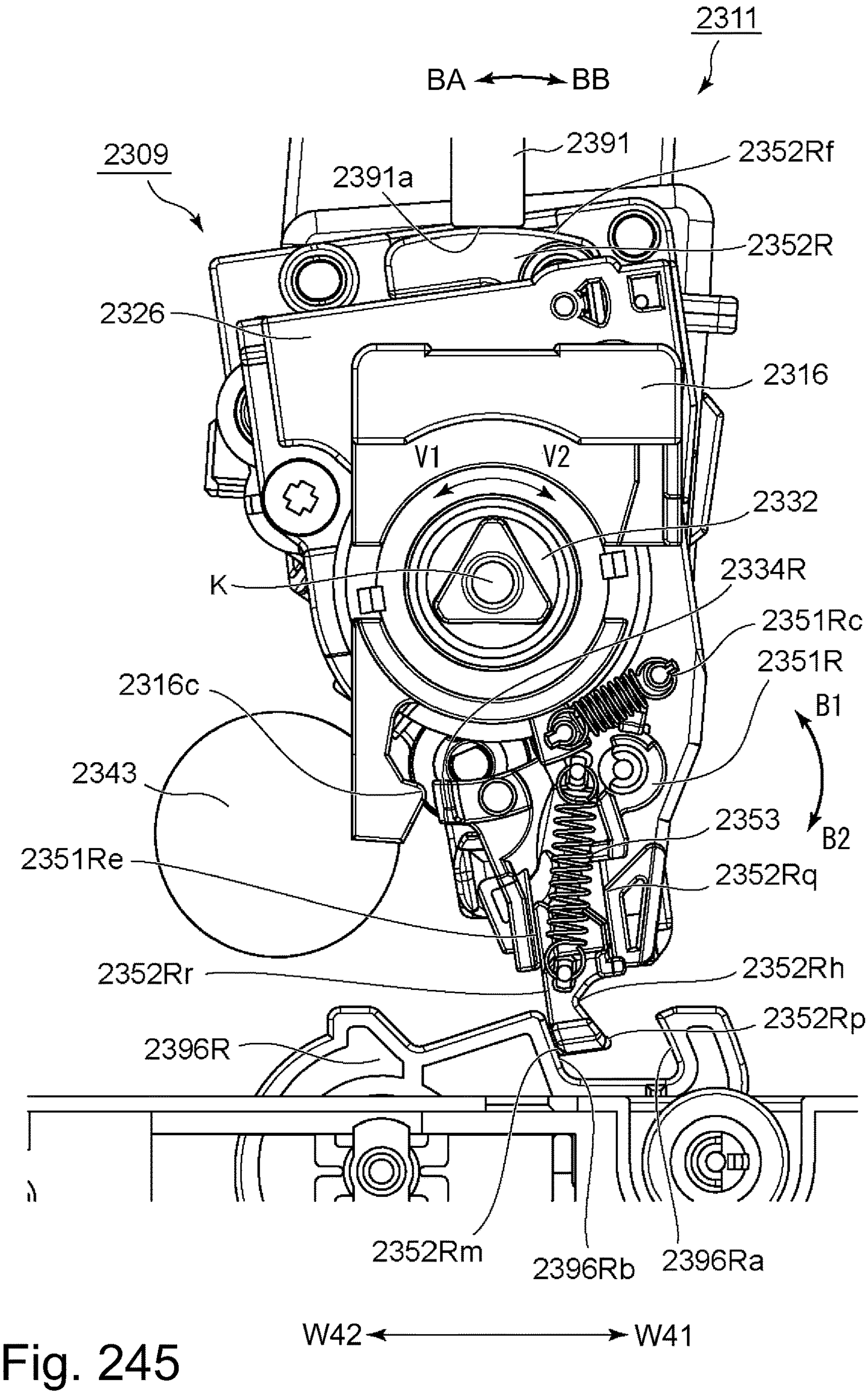

FIG. 245 is a side view of the developing cartridge in the image forming apparatus main assembly.

DESCRIPTION OF THE EMBODIMENTS

In the following, examples in this disclosure will be described. The structures disclosed in the following examples, namely the functions, materials, shapes of parts, and their relative arrangements are examples of the structures related to the scope of claims, and it is not intended to limit the present invention to the structure disclosed in the examples. In addition, the problem solved by the structure disclosed in the following examples or the function or effect provided by the disclosed structure is not intended to limit the scope of claims.

Embodiment 1

In the following, Embodiment 1 will be described in conjunction with the accompanying drawings. In the following embodiment, a laser beam printer which four process cartridges (cartridges) can be mounted to and dismounted from is illustrated as an image forming apparatus. The number of process cartridges mounted in the image forming apparatus is not limited to this example. It may be selected as appropriate if necessary.

[Outline of Structure of Image Forming Apparatus]

Figure 2:
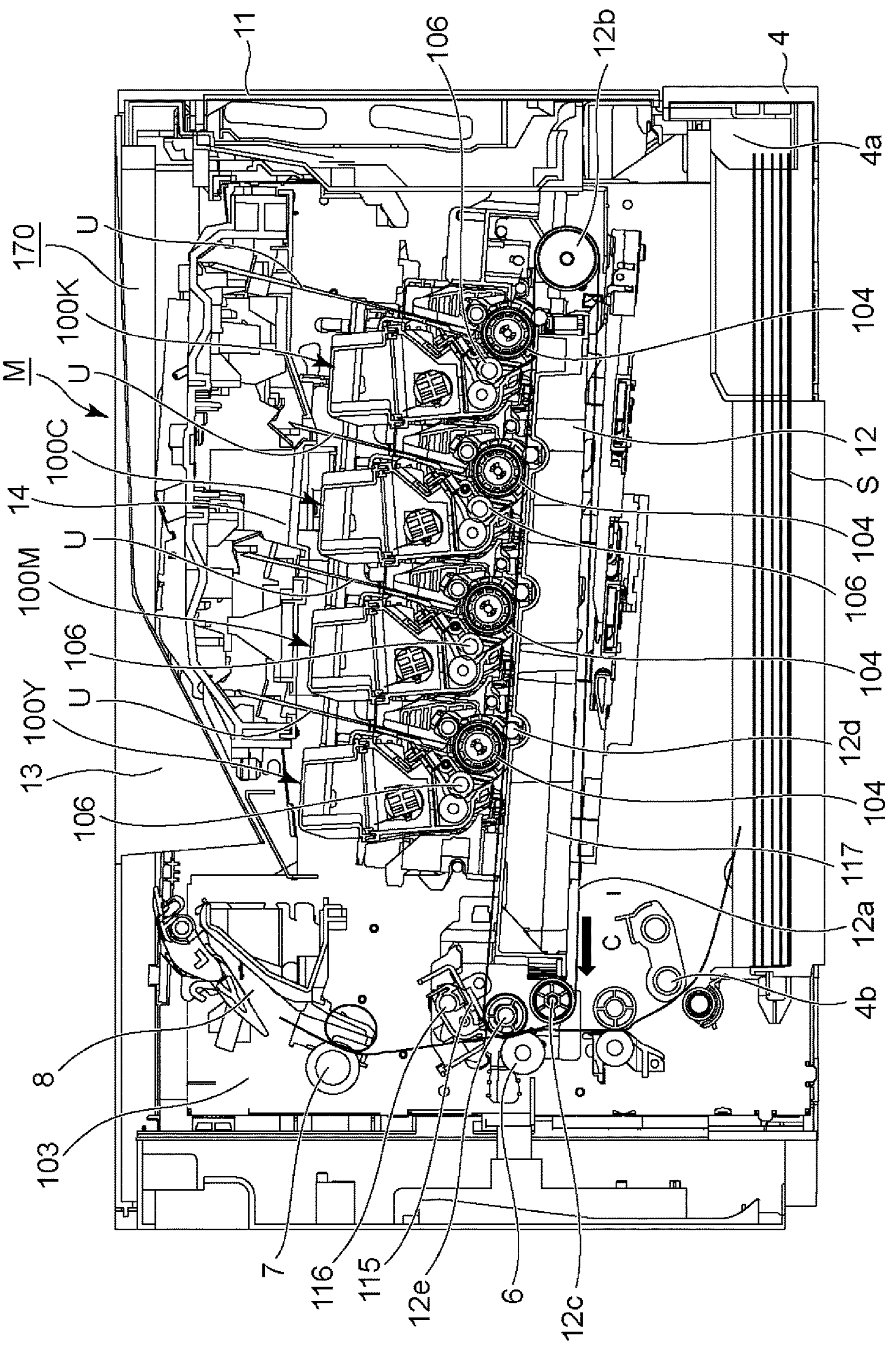
FIG. 2 is a sectional view of an image forming apparatus.
Figure 3:
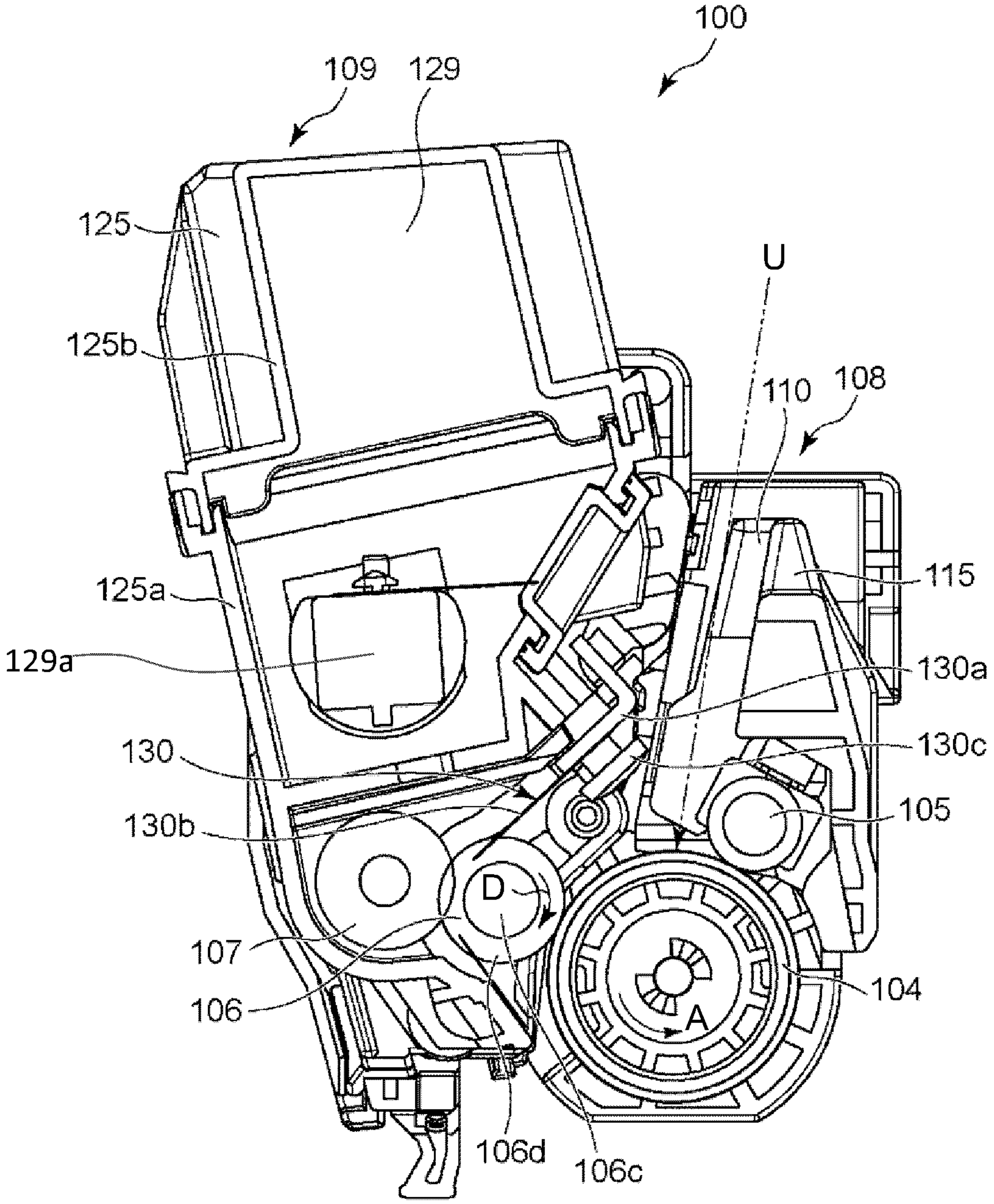
FIG. 3 is a sectional view of the process cartridge.

FIG. 2 is a schematic sectional view of the image forming apparatus M. FIG. 3 is a sectional view of the process cartridge 100. The image forming apparatus M is a four-color full-color laser printer using an electrophotographic process, and forms a color image on a recording material S. The image forming apparatus M is a process cartridge type, in which the process cartridge is dismountably mounted to the image forming apparatus main assembly (apparatus main assembly) 170 to form a color image on the recording material S.

Here, regarding the image forming apparatus M, a side where a front door 11 is provided is a front surface (front surface), and a side opposite to the front surface is a back surface (rear side). Further, a right side of the image forming apparatus M as viewed from the front is referred to as a drive-side, and a left side is referred to as a non-drive-side. In addition, as the image forming apparatus M is viewed from the front, a upper side is a upper surface part, and a lower side is a lower surface part. FIG. 2 is a sectional view of the image forming apparatus M as viewed from the non-drive-side; the front side of the sheet of the drawing is the non-drive-side of the image forming apparatus M; the right side of the sheet of the drawing is the front side; and the rear side of the sheet of the drawing is the drive-side of the image forming apparatus.

The drive-side of the process cartridge 100 is the side on which the drum coupling member (photosensitive member coupling member) which will be described hereinafter is provided with respect to an axial direction of the photosensitive drum (the axial direction of the rotation axis of the photosensitive drum). In addition, the drive-side of the process cartridge 100 is the side on which a development coupling portion 132*a*, which will be described hereinafter, is provided with respect to the axis direction of the developing roller (development member) (the axial direction of the rotation axis of the developing roller). The axial direction of the photosensitive drum and the axial direction of the developing roller are parallel with each other, and the longitudinal direction of the process cartridge 100 is also parallel to these directions.

The image forming apparatus main assembly 170 is provided with four process cartridges 100 (100Y, 100M, 100C, 100K), i.e. A first process cartridge 100Y, a second process cartridge 100M, a third process cartridge 100C, and a fourth process cartridge 100K. It is arranged substantially horizontally.

Each of the first to fourth process cartridges 100 (100Y, 100M, 100C, 100K) have the same electrophotographic process mechanisms, but the colors of the developers (hereinafter referred to as toner) are different from each other. Rotational driving forces are transmitted to the first to fourth process cartridges 100 (100Y, 100M, 100C, 100K) from the drive output portion (details will be described hereinafter) of the image forming apparatus main assembly 170, respectively. Further, bias voltages (charging bias, development bias, and so on) are supplied from the image forming apparatus main assembly 170 to the first to fourth process cartridges 100 (100Y, 100M, 100C, 100K), respectively.

As shown in FIG. 3, each of the first to fourth process cartridges 100 (100Y, 100M, 100C, 100K) of this embodiment includes a drum unit 108 having a photosensitive drum 104 and a charging means as a process means acting on the photosensitive drum 104. Here, the drum unit may have a cleaning means as well as the charging means as the process means. Further, each of the first to fourth process cartridges 100 (100Y, 100M, 100C, 100K) includes a developing unit 109 having developing means for developing an electrostatic latent image on the photosensitive drum 104. The layout of the electrophotographic image forming apparatus in which a plurality of photosensitive drums are arranged substantially in line in this manner is sometimes called an in-line layout or a tandem layout.

In each of the first to fourth process cartridges 100, the drum unit 108 and the developing unit 109 are coupled with each other. A more specific structure of the process cartridge will be described hereinafter.

The first process cartridge 100Y contains yellow (Y) toner in a developing container 125, and forms a yellow toner image on the surface of the photosensitive drum 104. The second process cartridge 100M contains magenta (M) toner in a developing container 125, and forms a magenta toner image on the surface of the photosensitive drum 104. The third process cartridge 100C contains cyan (C) toner in a developing container 125, and forms a cyan toner image on the surface of the photosensitive drum 104. The fourth process cartridge 100K contains black (K) toner in a developing container 125, and forms a black toner image on the surface of the photosensitive drum 104.

Figure 1:
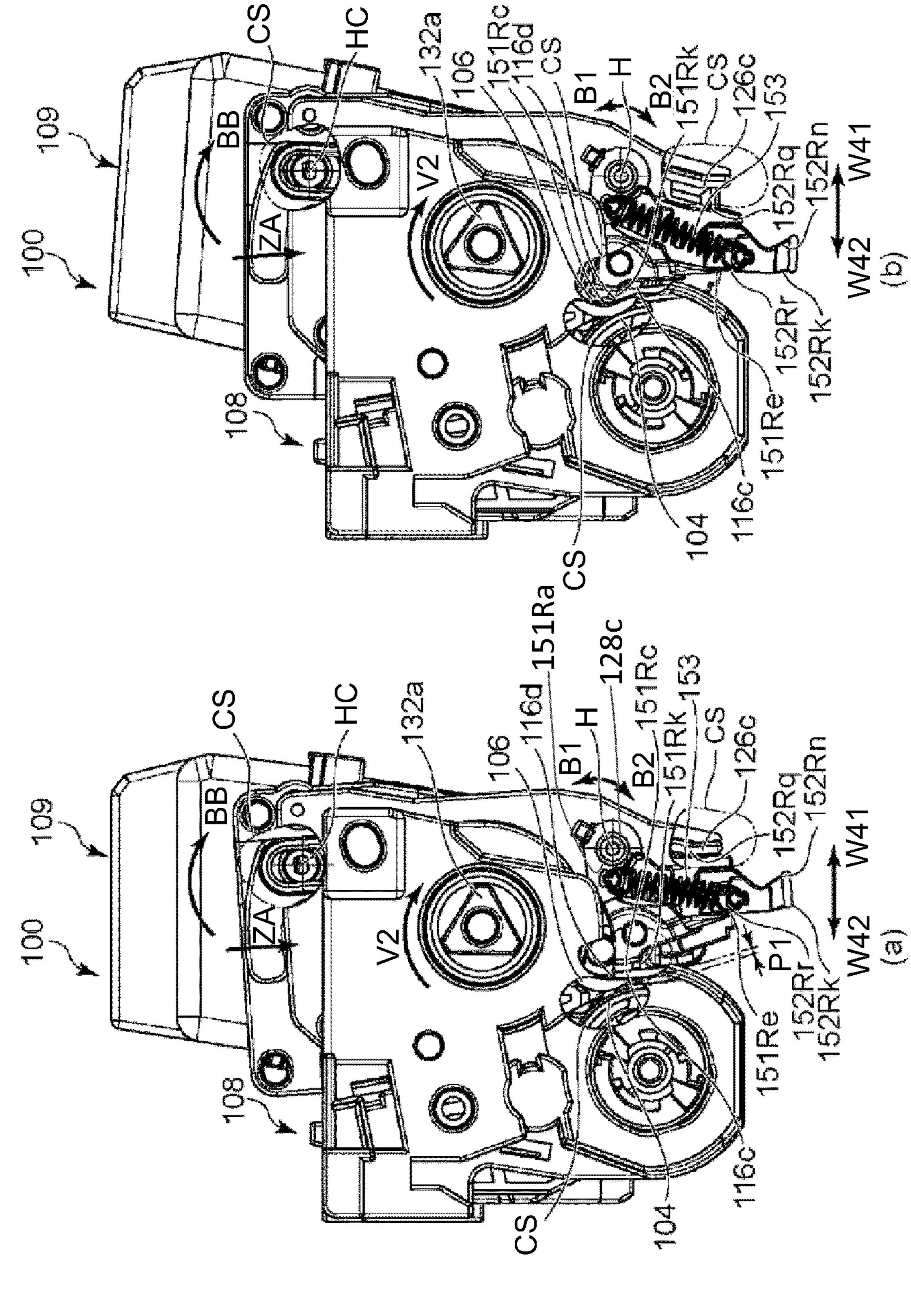
FIG. 1 is a side view of a process cartridge.

As shown in FIG. 1, a laser scanner unit 14 as an exposure means is provided above the first to fourth process cartridges 100 (100Y, 100M, 100C, 100K). The laser scanner unit 14 outputs the laser beam U in accordance with image information. Then, the laser beam U passes through a exposure window 110 of the process cartridge 100 to scan and expose the surface of the photosensitive drum 104.

An intermediary transfer unit 12 as a transfer member is provided below the first to fourth process cartridges 100 (100Y, 100M, 100C, 100K). The intermediary transfer unit 12 includes a drive roller 12*e*, a turn roller 12*c*, and a tension roller 12*b*, and a flexible transfer belt 12*a* extended around them. The lower surface of the photosensitive drum of each of the first to fourth process cartridges 100 (100Y, 100M, 100C, 100K) is in contact with the upper surface of the transfer belt 12*a*. The contact portion between them is a primary transfer portion. Inside the transfer belt 12*a*, a primary transfer roller 12*d* is provided so as to oppose the photosensitive drum 104. A secondary transfer roller 6 is contacted with the turn roller 12*c* by way of the transfer belt 12*a*. The contact portion between the transfer belt 12*a* and the secondary transfer roller 6 is a secondary transfer portion.

A feeding unit 4 is provided below the intermediary transfer unit 12. The feeding unit 4 includes a sheet feed tray 4*a* on which the recording material S is loaded and accommodated, and a sheet feed roller 4*b*.

A fixing device 7 and a sheet discharging device 8 are provided on the upper left side of the image forming apparatus main assembly 170 in FIG. 2. The upper surface of the image forming apparatus main assembly 170 is a sheet discharge tray 13. The recording material S is heated and pressed by fixing means provided in the fixing device 7, so that the toner image is fixed and discharged to the sheet discharge tray 13.

[Image Forming Operation]

The operation for forming a full-color image is as follows. The photosensitive drum 104 of each of the first to fourth process cartridges 100 (100Y, 100M, 100C, 100K) is rotationally driven at a predetermined speed (in the direction of arrow A in FIG. 3). The transfer belt 12*a* is also rotationally driven in a forward direction (direction of an arrow C in FIG. 2) codirectionally, at the peripheries, with the rotation of the photosensitive drum at a speed corresponding to the speed of the photosensitive drum 104.

The laser scanner unit 14 is also driven. In synchronism with the drive of the laser scanner unit 14, the charging roller 105 uniformly charges the surface of the photosensitive drum 104 to a predetermined polarity and potential in each process cartridge. The laser scanner unit 14 scans and exposes the surface of each photosensitive drum 104 with laser beam U in accordance with the image signals of each color. By this, an electrostatic latent image corresponding to the image signal of the corresponding color is formed on the surface of each photosensitive drum 104. The formed electrostatic latent image is developed by a developing roller 106 that is rotationally driven at a predetermined speed. By the electrophotographic image forming process operation described above, a yellow toner image corresponding to a yellow component of the full-color image is formed on the photosensitive drum 104 of the first process cartridge 100Y. Then, the toner image is primary-transferred onto the transfer belt 12*a*.

Similarly, a magenta color toner image corresponding to a magenta component of the full color image is formed on the photosensitive drum 104 of the second process cartridge 100M. Then, the toner image is primary-transferred and superimposed on the yellow toner image already transferred on the transfer belt 12*a*. Similarly, a cyan toner image corresponding to a cyan component of the full-color image is formed on the photosensitive drum 104 of the third process cartridge 100C. Then, the toner image is primary-transferred and superimposed on the yellow-colored and magenta-colored toner images already transferred on the transfer belt 12*a*. Similarly, a black toner image corresponding to a black component of the full-color image is formed on the photosensitive drum 104 of the fourth process cartridge 100K. Then, the toner image is primary-transferred and superimposed on the yellow, magenta, and cyan toner images already transferred on the transfer belt 12*a*. In this manner, an unfixed four-color full-color toner image of yellow, magenta, cyan, and black is formed on the transfer belt 12*a*.

On the other hand, the recording material S is separated and fed one by one at a predetermined control timing. The recording material S is introduced into the secondary transfer portion, which is a contact portion between the secondary transfer roller 6 and the transfer belt 12*a*, at a predetermined control timing. By this, in the process of transporting the recording material S toward the secondary transfer unit, the four-color superimposed toner image on the transfer belt 12*a* is sequentially and collectively transferred onto the surface of the recording material S. Thereafter, the recording material S is fed to the fixing device 7 to fix the toner image on the recording material S, and then is discharged onto the sheet discharge tray 13.

[Outline of Process Cartridge Mounting/Dismounting Structure]

Figure 4:
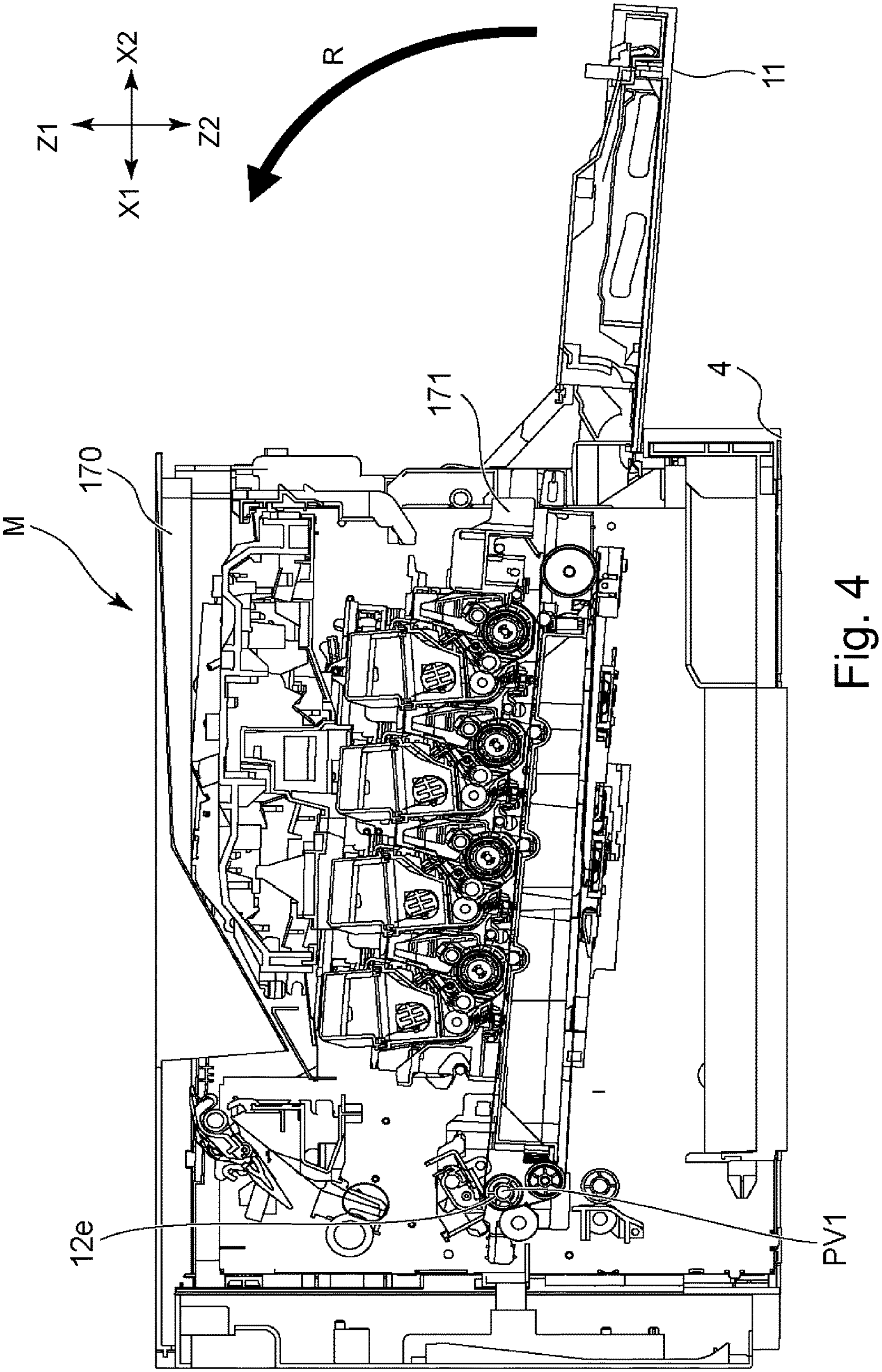
FIG. 4 is a sectional view of the image forming apparatus.
Figure 5:
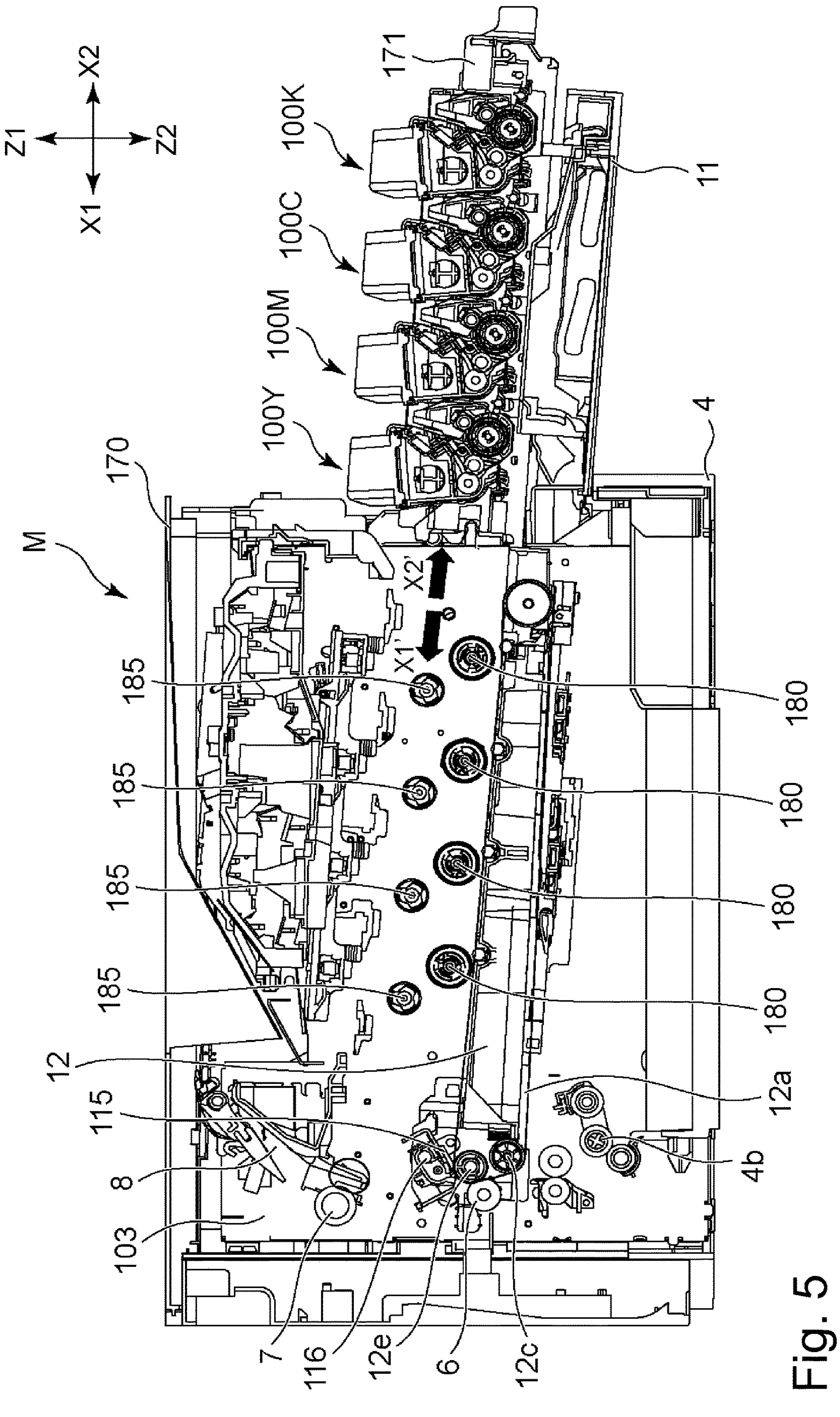
FIG. 5 is a sectional view of the image forming apparatus.
Figure 6:
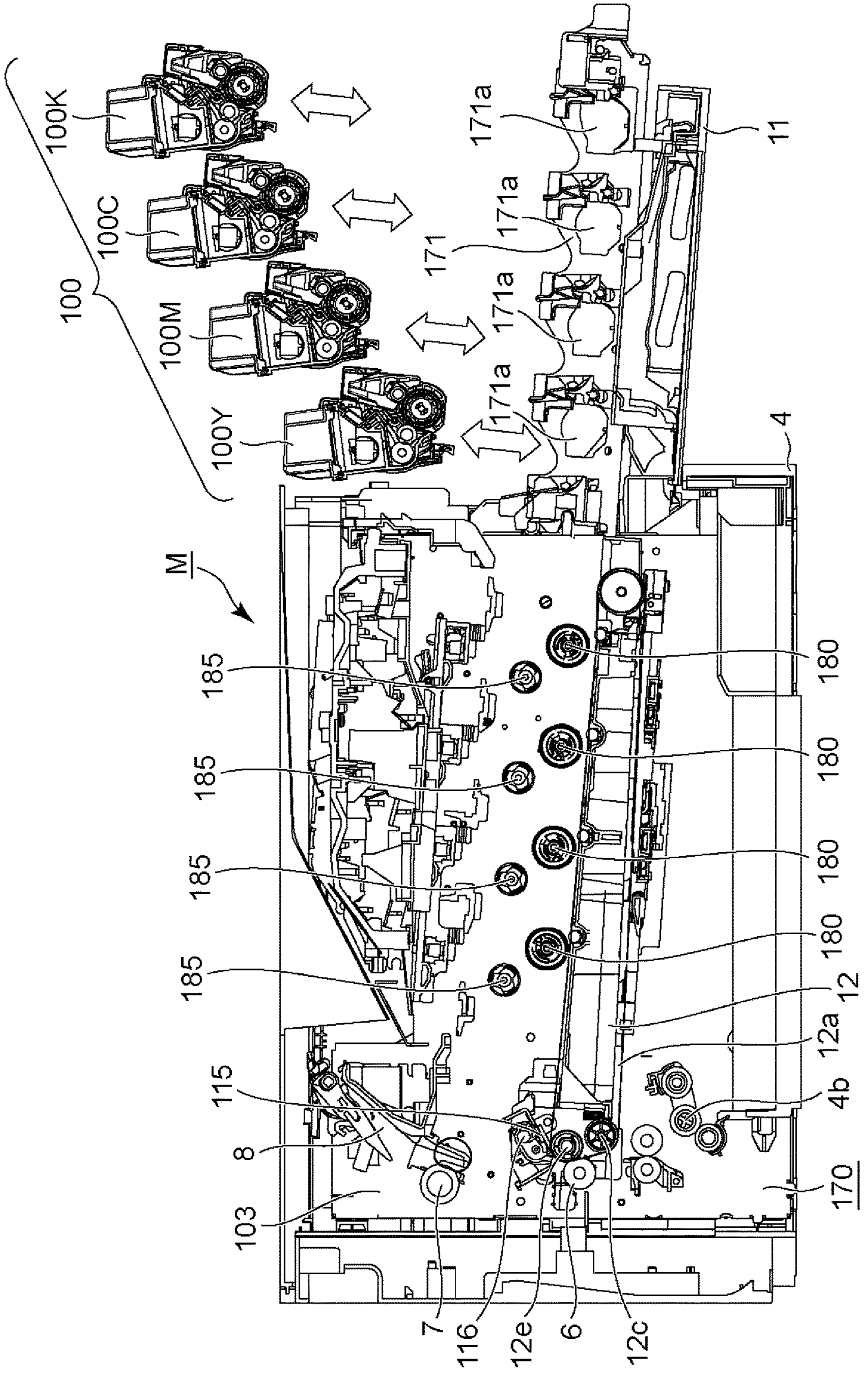
FIG. 6 is a sectional view of the image forming apparatus.
Figure 7:
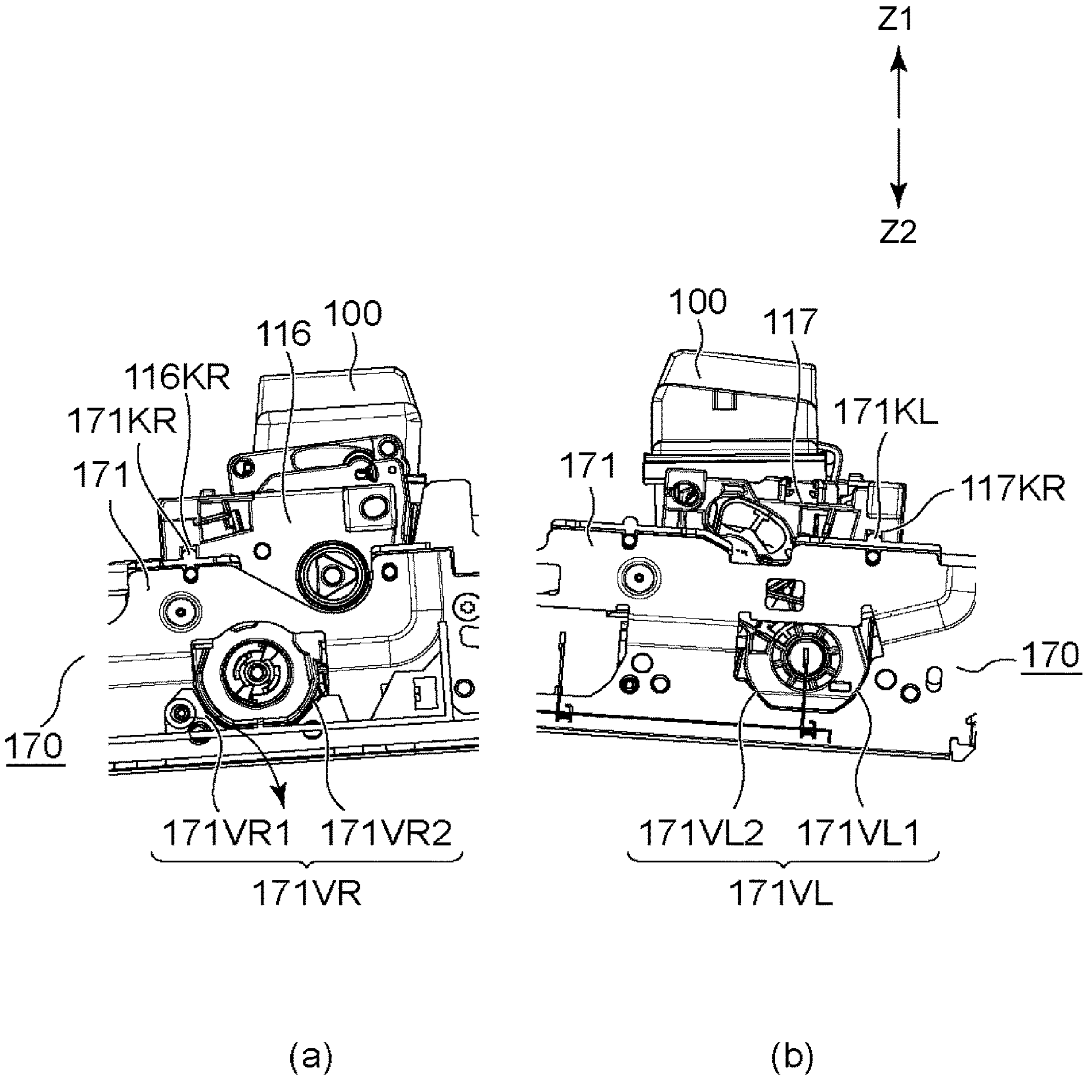
FIG. 7 is a partially enlarged view of a tray.

Referring to FIGS. 1 and 4 to 7, the tray (hereinafter referred to as a tray) 171 which supports the process cartridge will be described in more detail. FIG. 4 is a sectional view of the image forming apparatus M in which the tray 171 is inside the image forming apparatus main assembly 170 with the front door 11 open. FIG. 5 is a sectional view of the image forming apparatus M in a state where the tray 171 is outside the image forming apparatus main assembly 170 with the front door 11 open and the process cartridge 100 mounted on the tray. FIG. 6 is a sectional view of the image forming apparatus M in a state where the tray 171 is outside the image forming apparatus main assembly 170 with the front door 11 open and the process cartridge 100 is not mounted on the tray. Part (a) of FIG. 7 is a partial detailed view of the tray 171 as viewed from the drive-side in the state of FIG. 4. Part (b) of FIG. 7 is a partial detailed view of the tray 171 as viewed from the non-drive-side in the state of FIG. 4.

As shown in FIGS. 4 and 5, the tray 171 is movable in a direction indicated by an arrow (pushing direction) and the direction indicated by an arrow X2 (pulling direction) with respect to the image forming apparatus main assembly 170. That is, the tray 171 is provided so as to be retractable and insertable relative to the image forming apparatus main assembly 170, and the tray 171 is structured to be movable in a substantially horizontal direction in a state where the image forming apparatus main assembly 170 is installed on a horizontal surface. Here, the state in which the tray 171 is outside the image forming apparatus main assembly 170 (the state shown in FIG. 5) is referred to as an outside position. Further, a state in which the tray is inside the image forming apparatus main assembly 170 with the front door 11 open and the photosensitive drum 104 and the transfer belt 12*a* being separated from each other (state in FIG. 4) is referred to as an inner position.

Further, the tray 171 includes a mounting portion 171*a* in which the process cartridge 100 can be dismountably mounted as shown in FIG. 6 in the outer position. Then, each process cartridge 100 mounted on the mounting portion 171*a* in the outer position of the tray 171 is supported on the tray 171 by a drive-side cartridge cover member 116 and a non-drive-side cartridge cover member 117 as shown in FIG. 7. The process cartridge moves into the image forming apparatus main assembly 170 by the movement of the tray 171 in a state of being mounted in the mounting portion 171*a*. At this time, during this movement, the transfer belt 12*a* and the photosensitive drum 104 are spaced with a gap. Therefore, the tray 171 can move the process cartridge 100 into the image forming apparatus main assembly 170 without the photosensitive drum 04 contacting the transfer belt 12*a* (details will be described hereinafter).

As described above, the tray 171 is capable of moving the plurality of process cartridges 100 collectively to a position where image formation is possible inside the image forming apparatus main assembly 170, and is collectively moved to the outside of the image forming apparatus main assembly 170.

[Positioning of Process Cartridge]

More specifically, referring to FIG. 7, the positioning of the process cartridge 100 with respect to the image forming apparatus main assembly 170 will be described. As shown in FIG. 7, the tray 171 is provided with positioning portions 171VR and 171VL for holding the cartridge 100, respectively. The positioning portion 171VR has straight portions 171VR1 and 171VR2, respectively. The center of the photosensitive drum is determined by arc portions 116VR1 and 116VR2 of the cartridge cover member 116 shown in FIG. 7 contacting to the straight portions 171VR1 and 171VR2. Further, the tray 171 shown in FIG. 7 is provided with a rotational direction position setting projection 171KR. The attitude of the process cartridge 100 is determined with respect to the apparatus main assembly 170 by the projection fitting in the rotational direction position setting recess 116KR of the cartridge cover member 116 shown in FIG. 7.

The positioning portion 171VL and the rotational direction position setting projection 171KL are arranged at positions (non-drive-side) opposing each other across the intermediary transfer belt 12*a* in the longitudinal direction of the process cartridge 100 from the positioning portion 171VR. That is, on the non-drive-side as well, the position of the process cartridge is determined by engaging the arc portions 117VL1 and 117VL2 of the cartridge cover member 117 with the positioning portion 171VL and the rotational direction position setting recess 117KL with the rotational direction position setting projection 171KL. By doing so, the position of the process cartridge 100 with respect to the tray 171 is correctly determined.

As shown in FIG. 5, the process cartridge 100 integral with the tray 171 is moved in the direction of the arrow X1 and inserted to the position shown in FIG. 4. Then, by closing the front door 11 in the direction of the arrow R, the process carriage 100 is pressed by a cartridge pressing mechanism (not shown) described hereinafter, and is fixed to the image forming apparatus main assembly 170 together with the tray 171. Further, the transfer belt 12*a* comes into contact with the photosensitive member 4 in interrelation with the operation of the cartridge pressing mechanism. In this state, an image can be formed (FIG. 2).

In this embodiment, the positioning portion 171VR and the positioning portion 171V also function as reinforcements for maintaining stiffness in a pull-out operation of the tray 171, and for this reason, a sheet metal is used, but the present invention is not limited to this example.

[Cartridge Pressing Mechanism]

Figure 8:
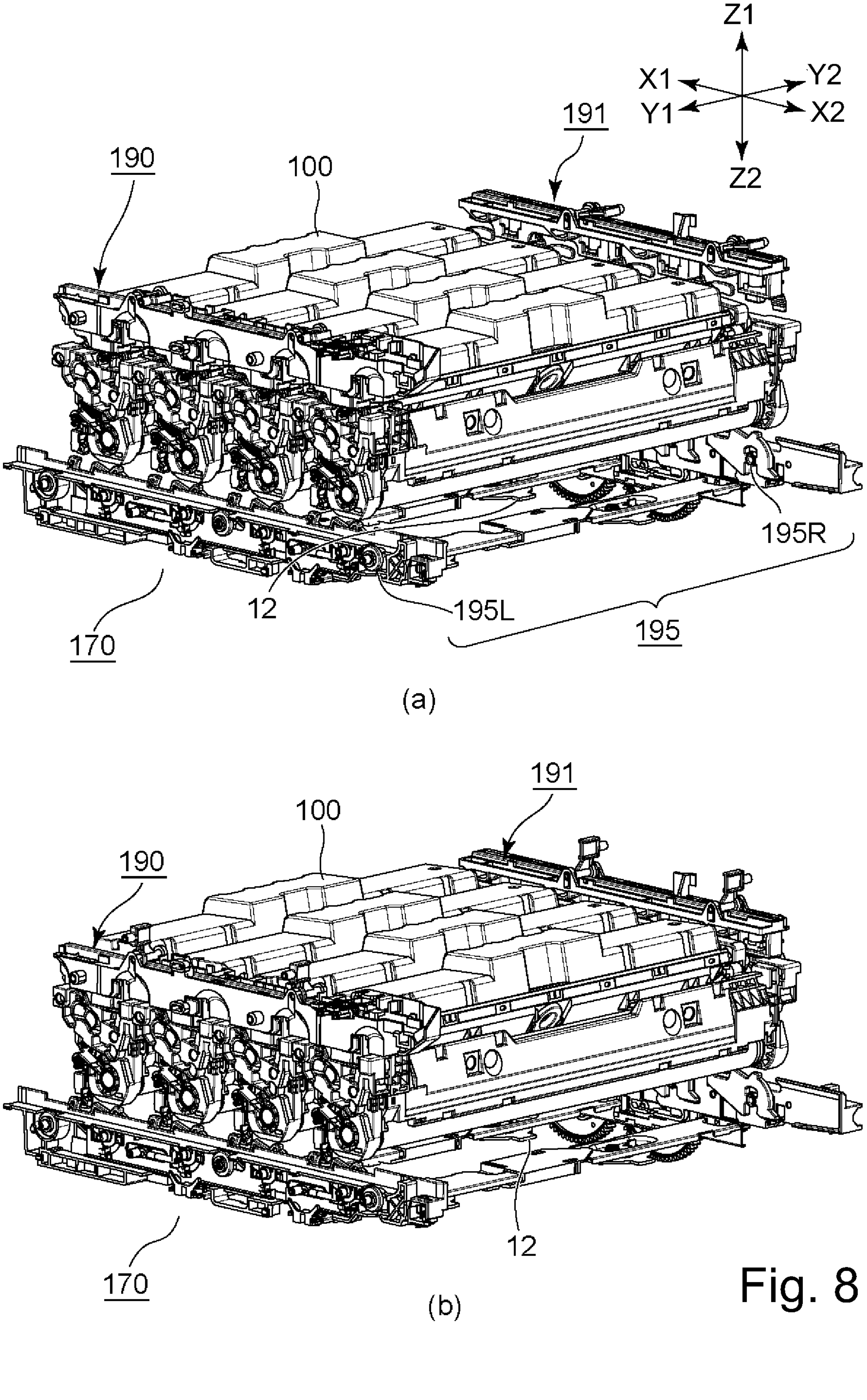
FIG. 8 is a perspective view of a storing element pressing unit and a cartridge pressing unit.

Next, the details of the cartridge pressing mechanism will be described with reference to part (a) of FIG. 8. Part (a) of FIG. 8 shows only the process cartridge 100, the tray 171 and cartridge pressing mechanisms 190 and 191 and the intermediary transfer unit 12 in the state of FIG. 4. Part (b) of FIG. 8 shows only the process cartridge 100, the tray 171 and the cartridge pressing mechanisms and 191 and the intermediary transfer unit 12 in the state of FIG. 2.

Here, the process cartridge 100 receives a driving force during image formation, and further receives a reaction force from the primary transfer roller 12*d* (FIG. 2) in the direction of arrow Z1. Therefore, it is necessary to press the process cartridge in the Z2 direction in order to maintain a stable attitude during the image forming operation to prevent the process cartridge from separating from the positioning portions 171VR and 171VL.

In order to achieve these, in this embodiment, the image forming apparatus main assembly 170 is provided with cartridge pressing mechanisms (190, 191). In the cartridge pressing mechanism (190, 191), a storing element pressing unit 190 works for the non-drive-side, and a cartridge pressing unit 191 works for the drive-side. This will be described in more detail below.

By closing the front door 11 shown in FIG. 4, the storing element pressing unit 190 and the cartridge pressing unit 191 shown in FIG. 8 lowers in the direction of arrow Z2. The storing element pressing unit 190 mainly comprises a main assembly side electric contact (not shown) contactable to the electric contact of the storing element (not shown) provided in the process cartridge 100. By interrelating with the front door 11 by a link mechanism (not shown), the storing element 140 and the electric contact on the main assembly side can be brought into and out of contact with each other. That is, the contacts are brought into contact with each other by closing the front door 11, and the contacts are disconnected by opening the front door 11.

By doing so, when the process cartridge 100 moves inside the image forming apparatus main assembly together with the tray 171, the electric contacts are not rubbed, and the contacts are retracted from the insertion/removal locus of the process cartridge 100, by which the tray 171 can be inserted/removed without hindering by them. The storing element pressing unit 190 also function to press the process cartridge 100 against the positioning portion 171VR described above. Further, similarly to the storing element pressing unit 190, the cartridge pressing unit 191 also lowers in the direction of arrow Z2 in interrelation with the operation of closing the front door 11 and function to press the process cartridge 100 against the positioning portion 171VL described above. Further, although the details will be described hereinafter, the cartridge pressing mechanism (190, 191) also functions to push down movable members 152L and 152R of the process cartridge 100 which will be described hereinafter.

[Drive Transmission Mechanism]

Figure 9:
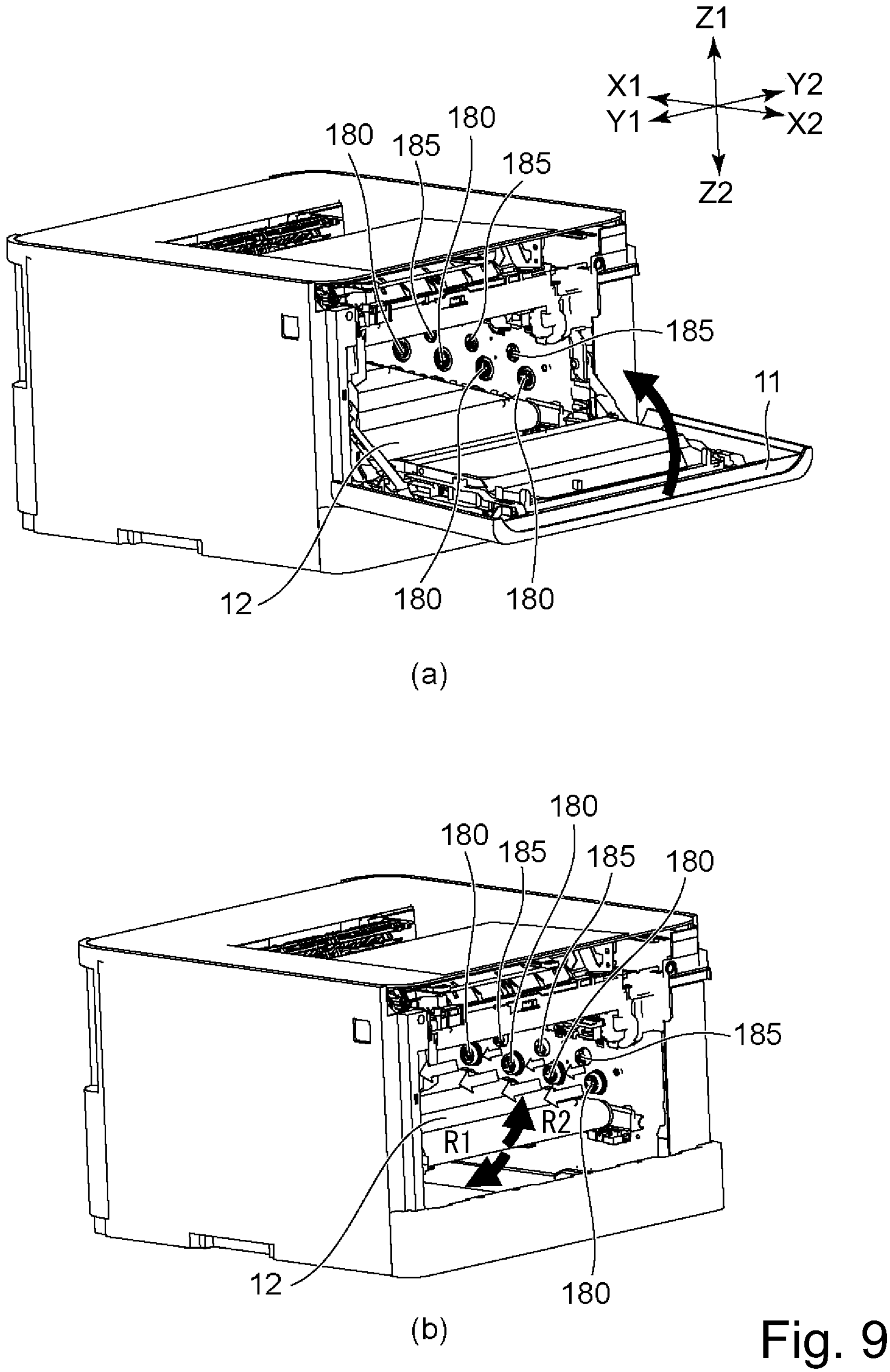
FIG. 9 is a perspective view of the image forming apparatus.
Figure 10:
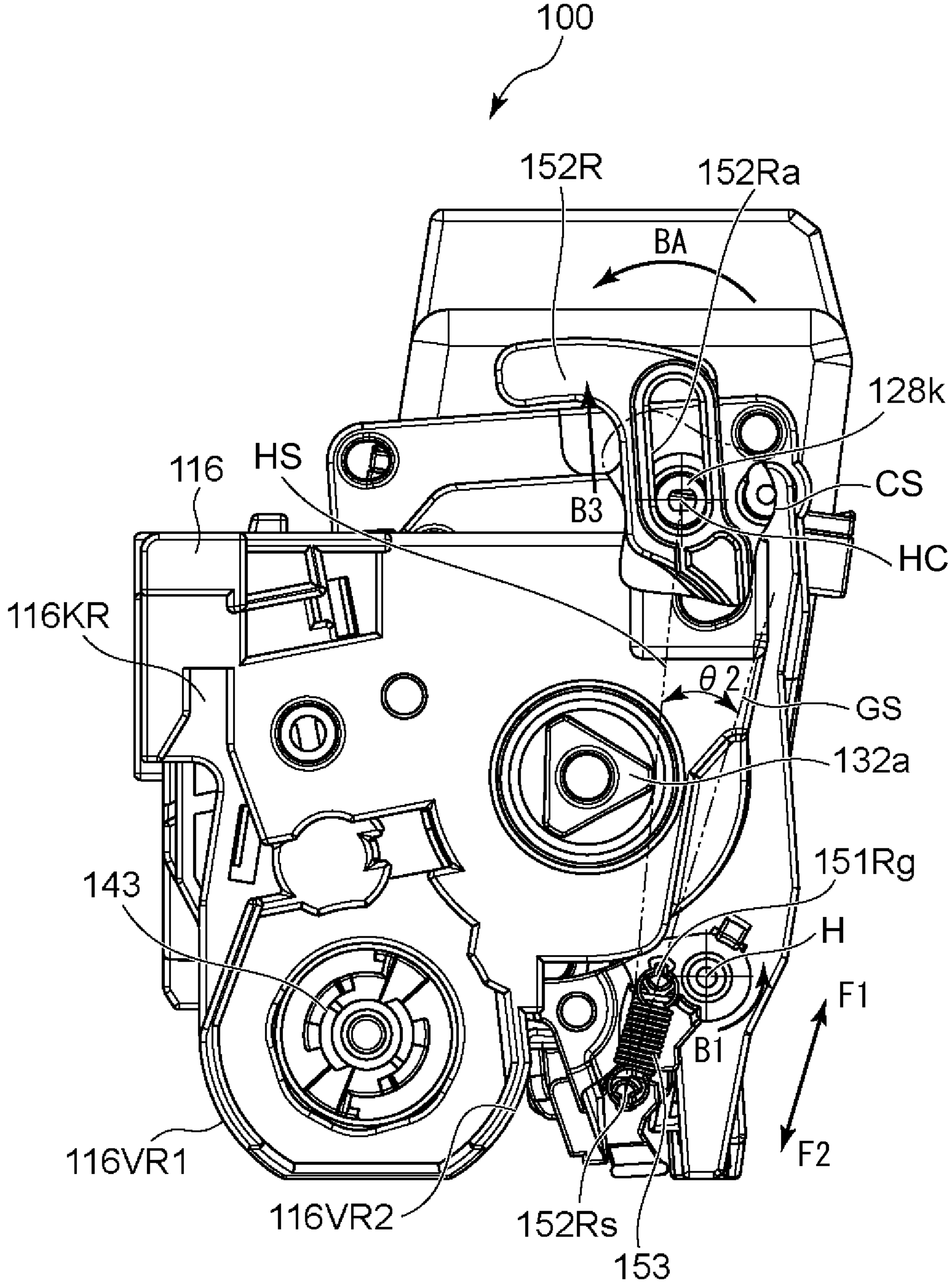
FIG. 10 is a side view (partial sectional view) of the process cartridge.

Next, referring to FIGS. 9 and 10 (for convenience, the tray 171 is omitted), the drive transmission mechanism of the main assembly in this embodiment will be described. Part (a) of FIG. 9 is a perspective view in which the process cartridge 100 and the tray 171 are omitted in the state of FIG. 4 or FIG. 5. Part (b) of FIG. 9 is a perspective view in which the process cartridge 100, the front door 11 and the tray 171 are omitted in the state of FIG. 1. FIG. 10 is a side view of the process cartridge 100 as viewed from the drive-side.

As shown in FIG. 10, the process cartridge in this embodiment has a development coupling portion (rotational driving force receiving portion) 132*a* and a drum coupling member (photosensitive member coupling member) 143. By closing the front door 11 (state of part (b) of FIG. 9, the main assembly side drum drive coupling 180 and the main assembly side development drive coupling 185 for transmitting the driving forces to the process cartridge 100 project in the arrow Y1 direction by a link mechanism (not shown). Further, by opening the front door 11 (state of part (a) of FIG. 9, the drum drive coupling 180 and a development drive coupling 185 are retracted in the direction of arrow Y2. By retracting each coupling from the insertion/removal locus of the process cartridge (X1 direction, X2 direction), the insertion/removal of the tray 171 is not hindered.

By closing the front door 11 and starting to drive the image forming apparatus main assembly 170, the drum drive coupling 180 described above engages with the drum coupling member 143. Further, the development drive coupling 185 on the main assembly side engages with the development coupling portion 132*a* to transmit the drive to the process cartridge 100. The drive transmission to the process cartridge 100 is not limitedly effected at two places as described above, and a mechanism for inputting the drive only to the drum coupling to transmit the drive to the developing roller may be provided.

[Intermediary Transfer Unit Structure]

Next, referring to FIG. 9, the intermediary transfer unit 12 of the image forming apparatus main assembly in this embodiment will be described. In this embodiment, the intermediary transfer unit 12 is raised in the direction of arrow R2 by a link mechanism (not shown) by closing the front door 11 to the position at the time of image formation (the position where the photosensitive drum 104 and the intermediary transfer belt 12*a* are in contact with each other). Further, by opening the front door 11, the intermediary transfer unit 12 lowers in the direction of arrow R1, and the photosensitive drum 2 and the intermediary transfer belt 12*a* are spaced from each other. That is, in the state where the process cartridge 100 is set on the tray 171, the photosensitive drum 104 and the intermediary transfer belt 12*a* are brought into and out of contact with each other by the opening and closing operations of the front door 11.

The contact/separation operation uses rising and lowering of the intermediary transfer unit with a rotational locus around the center point PV1 shown in FIG. 4. The intermediary transfer belt 12*a* is driven by receiving a force from a gear (not shown) arranged coaxially with the center PV1. Therefore, by setting the above-mentioned position PV1 as the rotation center, the intermediary transfer unit 12 can be raised and lowered without moving the gear center. By doing so, it is unnecessary to move the center of the gear, and the position of the gear can be maintained with high accuracy.

With the above-described structure, when the process cartridge 100 is set in the tray 171 and the tray 11 is inserted or removed, the photosensitive drum 104 does not slide on the intermediary transfer belt 12*a*, and therefore, image deterioration which may otherwise be caused by the damaged photosensitive drum 104 and/or the charge memory.

[Development Separation Control Unit]

Figure 11:
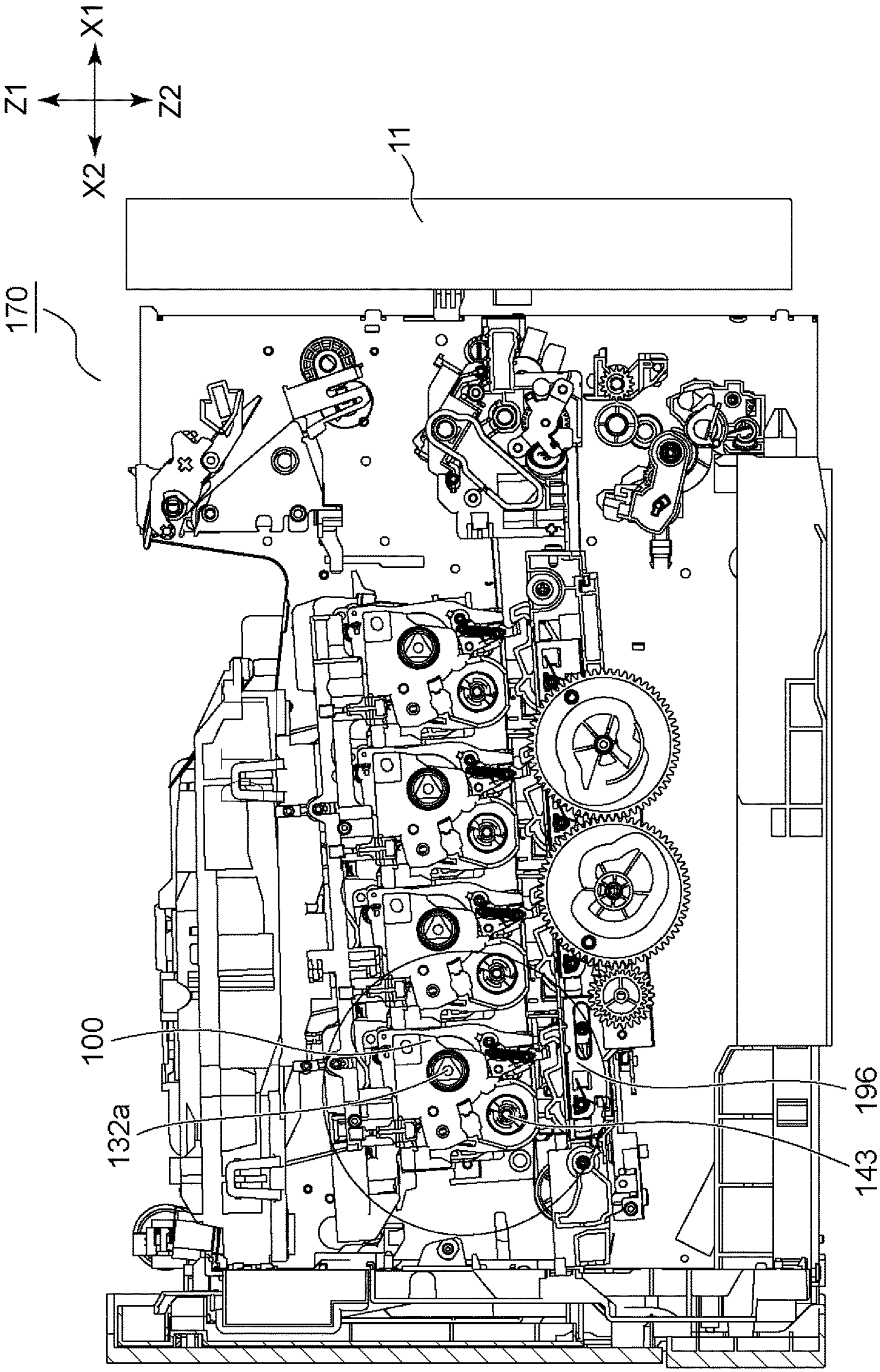
FIG. 11 is a sectional view of the image forming apparatus.
Figure 12:
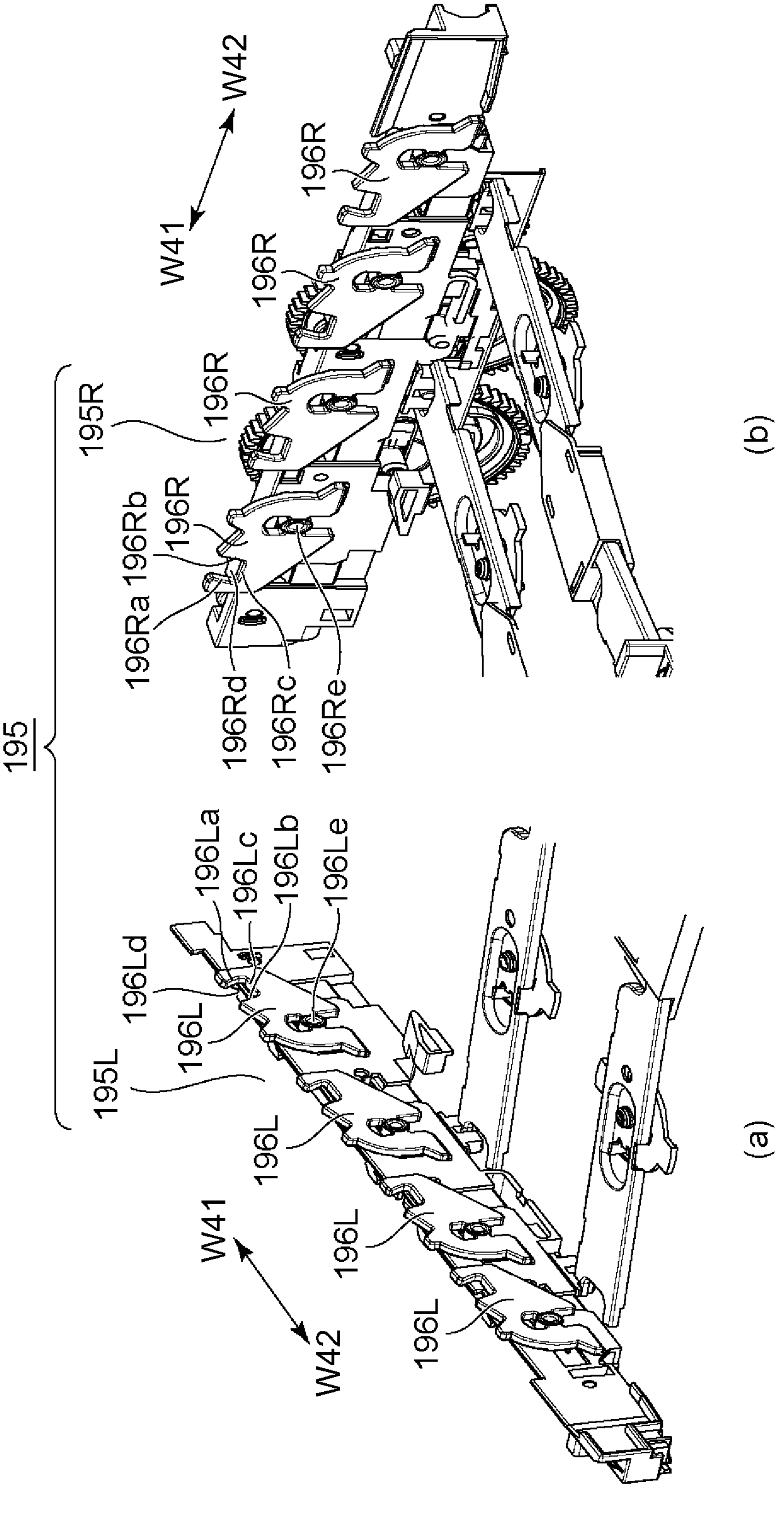
FIG. 12 is a perspective view of a development separation control unit.

Next, referring to FIGS. 8, 11, and 12, a spacing mechanism of the image forming apparatus main assembly in this embodiment will be described. FIG. 11 is a sectional view of the image forming apparatus M taken at a drive-side end portion of the process cartridge 100. FIG. 12 is a perspective view of the development separation control unit as viewed obliquely from the top. In this embodiment, a development separation control unit 195 controls spacing and contact operations of the developing unit 109 with respect to the photosensitive drum 104 by engaging with a portion of the developing unit 109. The development separation control unit 195 is disposed below the image forming apparatus main assembly 170 as shown in FIG. 8.

Specifically, the development separation control unit 195 is arranged below the development coupling portion 132*a* and the drum coupling member 143 in the vertical direction (downward in the arrow Z2 direction). Further, the development separation control unit 195 is arranged adjacent each of opposite ends, in the longitudinal direction (Y1, Y2 direction) of the photosensitive drum, of the intermediary transfer belt 12. That is, the development separation control unit 195 includes a development separation control unit 195R on the drive-side and a development separation control unit 195L on the non-drive-side. By arranging the development separation control unit 195 in dead space of the image forming apparatus main assembly as described above, the main assembly can be downsized.

The development separation control unit 195R includes four separation control members (force applying members) 196R corresponding to the process cartridge 100 (100Y, 100M, 100C, 100K). The four separation control members have substantially the same shape. The development separation control unit 195R is always fixed to the image forming apparatus main assembly. However, the separation control member 196R is structured to be movable in the W41 and W42 directions by a control mechanism (not shown). The directions W41 and W42 are substantially parallel to an arrangement direction of the process cartridges set in the image forming apparatus main assembly 170. The detailed structure will be described hereinafter.

The development separation control unit 195L has four separation control members (force applying members) 196L corresponding to the process cartridge 100 (100Y, 100M, 100C, 100K). The four separation control members have substantially the same shape. The development separation control unit 195L is always fixed to the image forming apparatus main assembly. However, the separation control member 196L is structured to be movable in the W41 and W42 directions by a control mechanism (not shown). The detailed structure will be described hereinafter.

Further, in order for the development separation control unit 195 to engage with a portion of the developing unit 109 and control the separation/contact operation of the developing unit 109, it is necessary that a portion of a development control unit 196 and a portion of the developing unit are overlapped in the vertical direction (Z1, Z2 direction). Therefore, after the process cartridge 100 is inserted in the X1 direction, a portion of the developing unit (movable member 152 in the case of this embodiment) is required to project in the vertical direction (Z1, Z2 direction) as described above (details will be described hereinafter). When a development separation control unit 195 itself is raised in the same manner as the above-mentioned intermediary transfer unit 12 for the purpose of such engagement, there are problems such as an increase in the operating force of the interrelated front door 11 and complication of the drive train.

It is in consideration of these problems, this embodiment employs a method in which the development separation control unit 195 is fixed to the image forming apparatus main assembly 170, and a portion (movable member 152) of the developing unit 109 is projected downward (Z2) in the image forming apparatus main assembly 170. Further, as for the mechanism for projecting the movable member 152, the mechanisms of the storing element pressing unit 190 and the cartridge pressing unit 191 described above are used as they are, and therefore, there is no problem as described above and no problem of increase in the cost of the apparatus main assembly can be suppressed.

The unit of the development separation control unit 195 as a whole is fixed to the image forming apparatus main assembly 170. However, in order to engage with the movable member 152 to operate so that the developing unit 109 is spaced (spaced position, retracted position) and contacted (contact position) relative to the photosensitive drum 104, a portion of the development separation control unit 195 has a movable structure. Details will be described hereinafter.

[Overall Structure of Process Cartridge]

Figure 13:
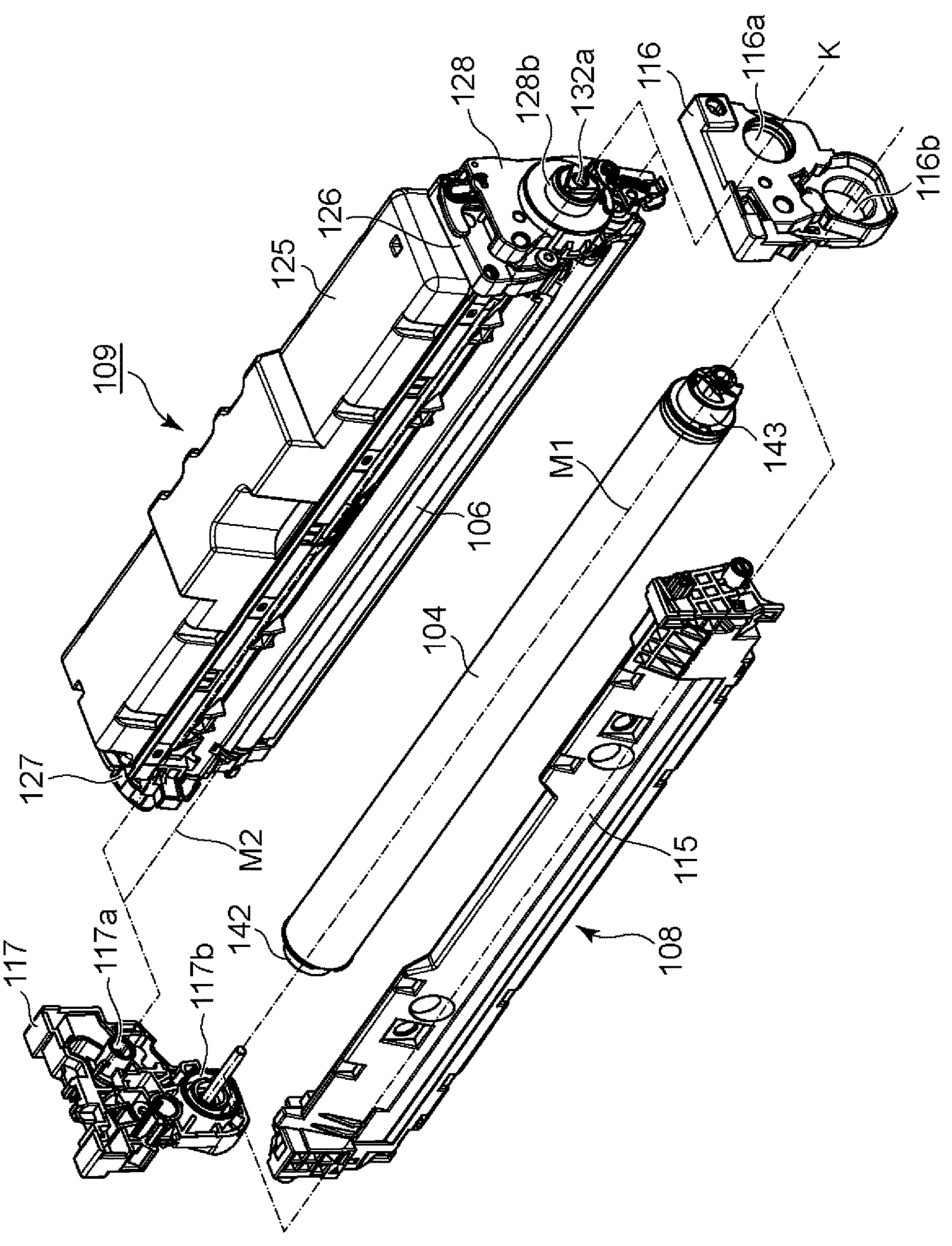
FIG. 13 is an exploded perspective view of the process cartridge.
Figure 14:
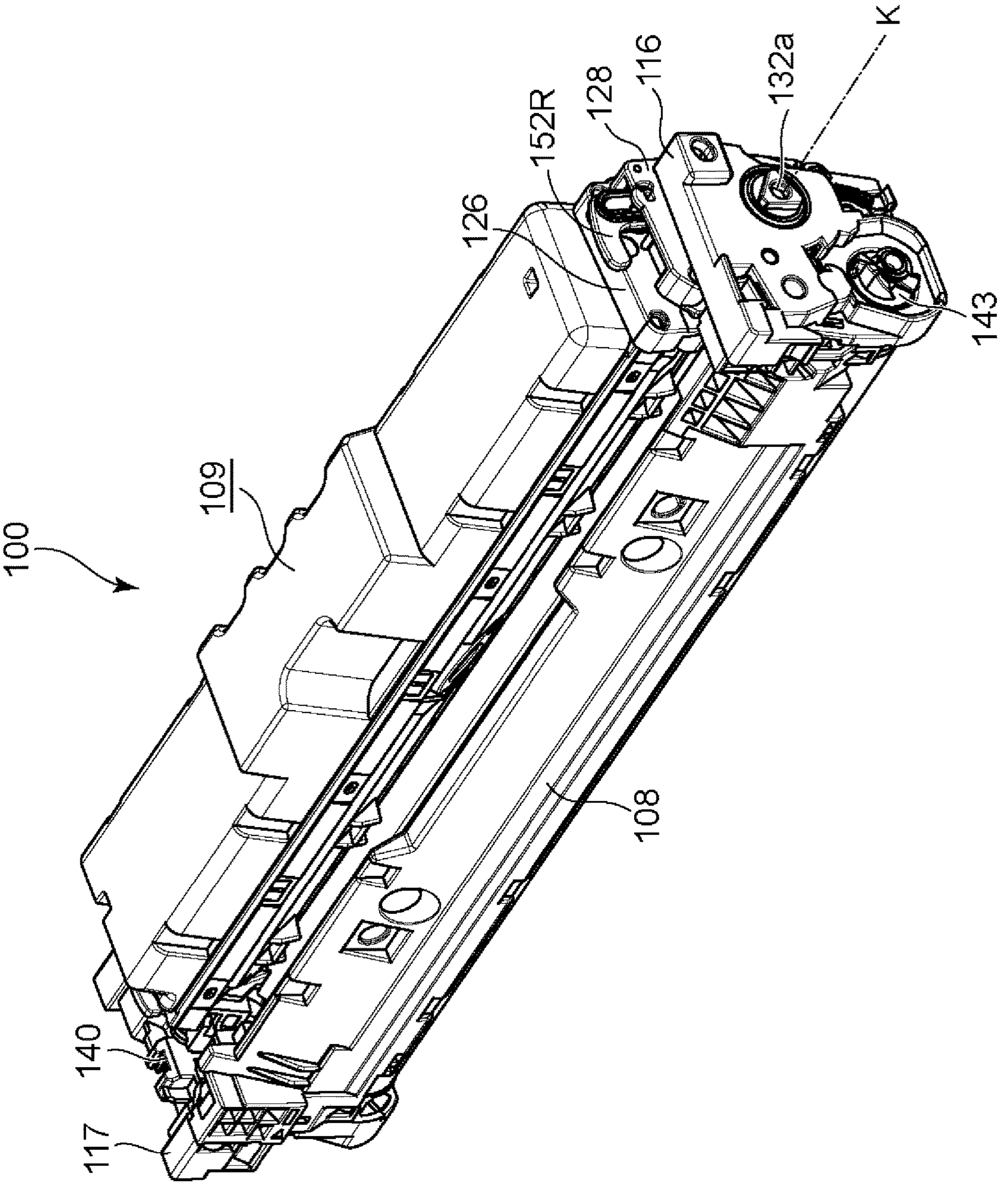
FIG. 14 is a perspective view of the process cartridge.

Referring to FIGS. 3, 13 and 14T, the structure of the process cartridge will be described. FIG. 13 is an assembly perspective view of the process cartridge 100 as viewed from the drive-side, which is one end side in the axial direction of the photosensitive drum 104. FIG. 14 is a perspective view of the process cartridge 100 as viewed from the drive-side.

In this embodiment, the first to fourth process cartridges 100 (100Y, 100M, 100C, 100K) may differ in the color of the contained toner, the toner filling amount, and the control by the image forming apparatus main assembly 170. However, although these four process cartridges may be different in dimensions and the like, they have the same basic structures and functions, and can perform the same functions. Therefore, one process cartridge 100 will be described as a representative in the following.

The process cartridge 100 includes the photosensitive drum (photosensitive member) 104 and the process means for acting on the photosensitive drum 104, respectively. Here, the process means includes the charging roller 105 as the charging means (charging member) for charging the photosensitive drum 104, and a developing means (development member as the developing roller 106 for developing the latent image formed on the photosensitive drum 104 by depositing toner onto the photosensitive drum 104. The developing roller 106 carries the toner on the surface thereof. The process cartridge 100 may be provided further with a cleaning blade, a brush, or the like which contacts with the photosensitive drum 104, as the cleaning means (cleaning member) for removing residual toner remaining on the surface of the photosensitive drum 104. Further, as a further process means, as the discharging means for removing electric charge from the surface of the photosensitive drum 104, the light guide member such as a light guide or a lens for irradiating the photosensitive drum 104 with light, a light source, or the like may be provided. The process cartridge 100 is divided into a drum unit (first unit) 108 (108Y, 108M, 108C, 108K) and the developing unit (second unit) 109 (109Y, 109M, 109C, 109K).

[Drum Unit Structure]

As shown in FIGS. 3 and 13, the drum unit 108 includes the photosensitive drum 104, the charging roller 105, a first drum frame portion 115, a drive-side cartridge cover member 116 and a non-drive-side cartridge cover member 117 as the second drum frame mounted to the first drum frame portion 115. The photosensitive drum 104 is rotatably supported about the rotation axis (rotation center) M1 by the drive-side cartridge cover member 116 and the non-drive-side cartridge cover member 117 provided at both ends in the longitudinal direction of the process cartridge 100. The drum frame (first frame) in which the first drum frame portion 115, the drive-side cartridge cover member 116 and the non-drive-side cartridge cover member as the second drum frame portion 117 constitutes the drum frame (first frame or second frame) rotatably supporting the photosensitive drum 104.

The drive-side cartridge cover member 116 and the non-drive-side cartridge cover member 117 will be described hereinafter. As shown in FIGS. 13 and 14, a coupling member 143 for transmitting a driving force to the photosensitive drum 104 is provided on one end side of the photosensitive drum 104 in the longitudinal direction. As described above, the coupling member 143 engages with the main assembly side drum drive coupling (see FIG. 9) as a drum drive output portion of the image forming apparatus main assembly 170. Then, the driving force of the driving motor (not shown) of the image forming apparatus main assembly 170 is transmitted to the photosensitive drum 104 to rotate it in a direction of arrow A. Further, the photosensitive drum 104 is provided with a drum flange 142 on the other end side in the longitudinal direction. The charging roller 105 is supported by the drum frame 115 in contact with the photosensitive drum 104 and is driven thereby to rotate. The rotation axis M1 is parallel to the longitudinal direction of the process cartridge 100 and the longitudinal direction of the drum unit 108.

[Structure of Developing Unit]

As shown in FIGS. 3 and 13, the developing unit 109 includes the developing roller 106, a toner feeding roller (developer agent supply member) 107, a developing blade 130, the developing container 125, and so on. The developing container 125 includes a lower frame 125*a* and a lid member 125*b*. The lower frame 125*a* and a lid member 125*b* are connected by ultrasonic welding or the like. The developing container 125, which is the second frame, has a toner accommodating portion 129 for accommodating toner to be supplied to the developing roller 106. A drive-side bearing 126 and a non-drive-side bearing are mounted and fixed to respective ends of the developing container 125 in the longitudinal direction. The developing container 125 rotatably supports the developing roller 106, a toner feeding roller 107, and a stirring member 129*a* by way of the drive-side bearing and the non-drive-side bearing 127, and holds the developing blade 130. In this manner, the developing container 125, the drive-side bearing 126, and the non-drive-side bearing 127 constitute the developing frame (second frame) that rotatably supports the developing roller 106 about the rotation axis (rotation center) M2.

The stirring member 129*a* rotates to stir the toner in the toner accommodating portion 129. The toner feeding roller (developer material supply member) 107 contacts the developing roller 106, supplies toner to the surface of the developing roller 106, and also strips the toner off the surface of the developing roller 106. The developing blade 130 is formed by mounting an elastic member 130*b*, which is a sheet-like metal including a thickness of about 0.1 mm, to a supporting member 130*a*, which is a metal material including an L-shaped cross-section, by welding or the like. The developing blade 130 regulates the toner layer thickness (thickness of the toner layer) on the peripheral surface of the developing roller 106 to form a toner layer having a predetermined thickness between the elastic member 130*b* and the developing roller 106. The developing blade 130 is mounted to the developing container 125 with fixing screws 130*c* at two positions in one end side and the other end side in the longitudinal direction. The developing roller 106 comprises a metal core metal 106*c* and a rubber portion 106*d*.

Further, as shown in FIGS. 13 and 14, the development coupling portion 132*a* for transmitting the driving force to the developing unit 109 is provided on one end side of the developing unit in the longitudinal direction. The development coupling portion 132*a* engages with the development drive coupling 185 (see FIG. 9) on the main assembly side as a development drive output portion of the image forming apparatus main assembly 170 to receive the driving force, thereby to rotate the drive motor (not shown) of the image forming apparatus main assembly 170. The driving force received by the development coupling portion 132*a* is transmitted by a driving train (not shown) provided in the developing unit 109, so that the developing roller 106 can be rotated in the direction of arrow D in FIG. 3. A development cover member 128 which supports and covers a development coupling portion 132*a* and a driving train (not shown) is provided on one end side of the developing unit 109 in the longitudinal direction. An outer diameter of the developing roller 106 is selected to be smaller than the outer diameter of the photosensitive drum 104. The outer diameter of the photosensitive drum 104 in this embodiment is in the range of Φ18 to Φ22 (mm), and the outer diameter of the developing roller 106 is in the range of Φ8 to Φ14 (mm). By selecting the outer diameters in this way, efficient arrangement is accomplished. The rotation axis M2 is parallel to the longitudinal direction of the process cartridge 100 and to the longitudinal direction of the developing unit 109.

[Assembly of Drum Unit and Developing Unit]

Referring to FIG. 13, the assembly of the drum unit 108 and the developing unit 109 will be described. The drum unit 108 and the developing unit 109 are connected by a drive-side cartridge cover member 116 and a non-drive-side cartridge cover member 117 provided at opposite ends in the longitudinal direction of the process cartridge 100. The drive-side cartridge cover member 116 provided on one end side of the process cartridge 100 in the longitudinal direction is provided with a developing unit supporting hole 116*a* for swinging (moving) of the developing unit 109. Similarly, the non-drive-side cartridge cover member 117 provided on the other end side of the process cartridge 100 in the longitudinal direction is provided with a developing unit supporting hole 117*a* for swingably supporting the developing unit 109. Further, the drive-side cartridge cover member 116 and the non-drive-side cartridge cover member 117 are provided with drum supporting holes 116*b* and 117*b* for rotatably supporting the photosensitive drum 104. Here, on one end side, the outer diameter portion of a cylindrical portion 128*b* of the development cover member 128 is fitted into the developing unit supporting hole 116*a* of the drive-side cartridge cover member 116. On the other end side, the outer diameter portion of the cylindrical portion (not shown) of the non-drive-side bearing 127 is fitted into the developing unit supporting hole 117*a* of the non-drive-side cartridge cover member 117. Further, the opposite ends of the photosensitive drum 104 in the longitudinal direction are fitted into the drum supporting holes 116*b* of the drive-side cartridge cover member 116 and drum supporting holes 117*b* of the non-drive-side cartridge cover member 117. The drive-side cartridge cover member 116 and the non-drive-side cartridge cover member are fixed to the drum unit 108 with screws or adhesives (not shown). By this, the developing unit 109 is rotatably supported by the drive-side cartridge cover member 116 and the non-drive-side cartridge cover member 117 with respect to the drum unit 108 (photosensitive drum 104). In such a structure, the developing roller 106 can be positioned at a place for acting on the photosensitive drum 104 during image formation.

FIG. 14 shows a state in which the drum unit 108 and the developing unit 109 are assembled by the above-described steps and integrated into the process cartridge 100.

The axis connecting the center of the developing unit supporting hole 116*a* of the drive-side cartridge cover member 116 and the center of the developing unit supporting hole 117*a* of the non-drive-side cartridge cover member 117 is called a swing axis (rotation axis, rotation center) K. Here, the cylindrical portion 128*b* of the development cover member on one end side is coaxial with the development coupling portion 132*a*. That is, the rotation axis of the development coupling portion 132*a* is coaxial with the swing axis K. In other words, the swing axis K is also the rotation axis K of the development coupling portion 132*a*. Further, the developing unit 109 is supported rotatably about the swing shaft K. In a state where the drum unit 108 and the developing unit 109 are assembled and integrated as the process cartridge 100, the rotation axis M1, the rotation axis M2, and the swing axis K are substantially parallel to each other. Further, in this state, the rotation axis M1, the rotation axis M2, and the swing axis K are substantially parallel to the longitudinal direction of the process cartridge 100, respectively.

[Structure of Separation/Contact Mechanism 150]

Figure 15:
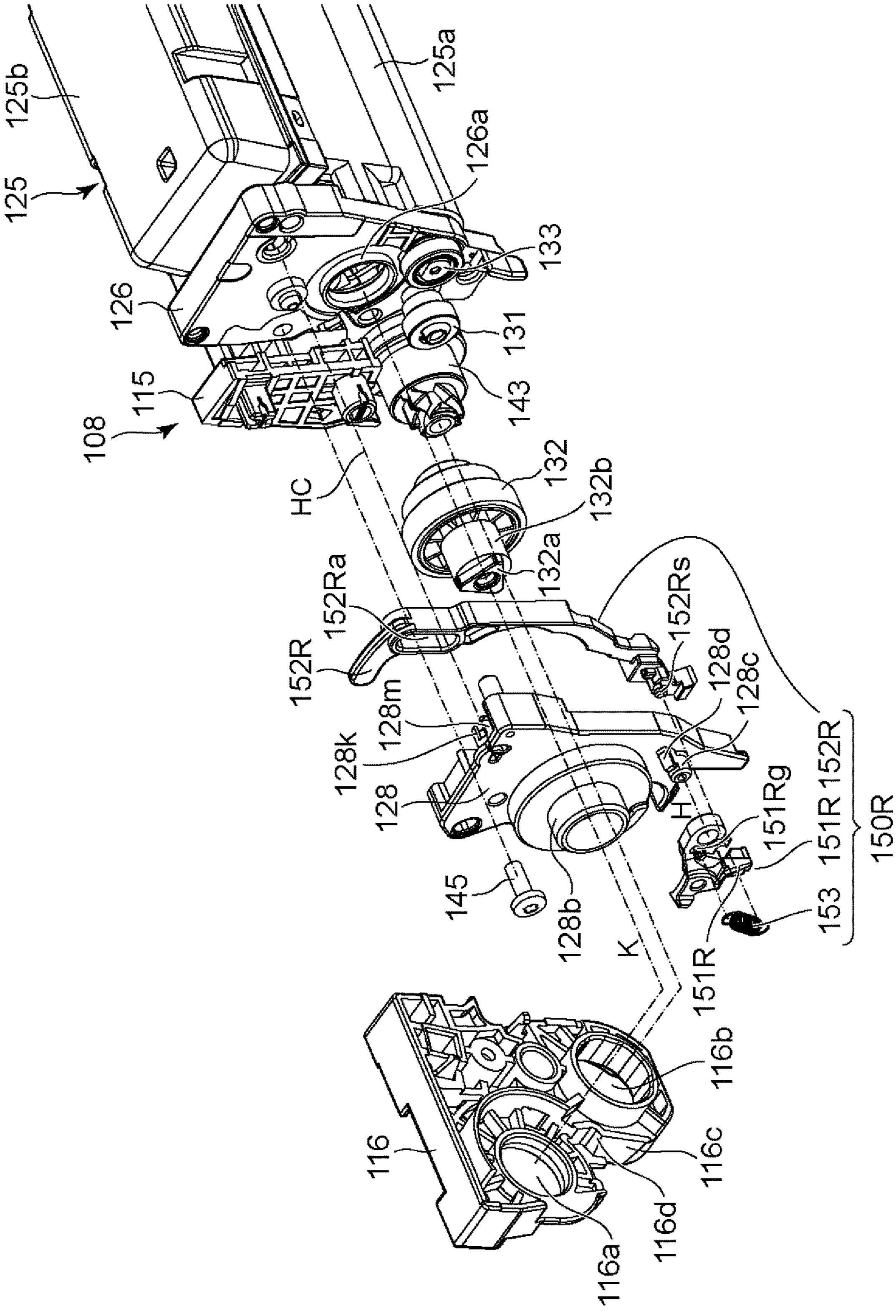
FIG. 15 is an exploded perspective view of the process cartridge.
Figure 16:
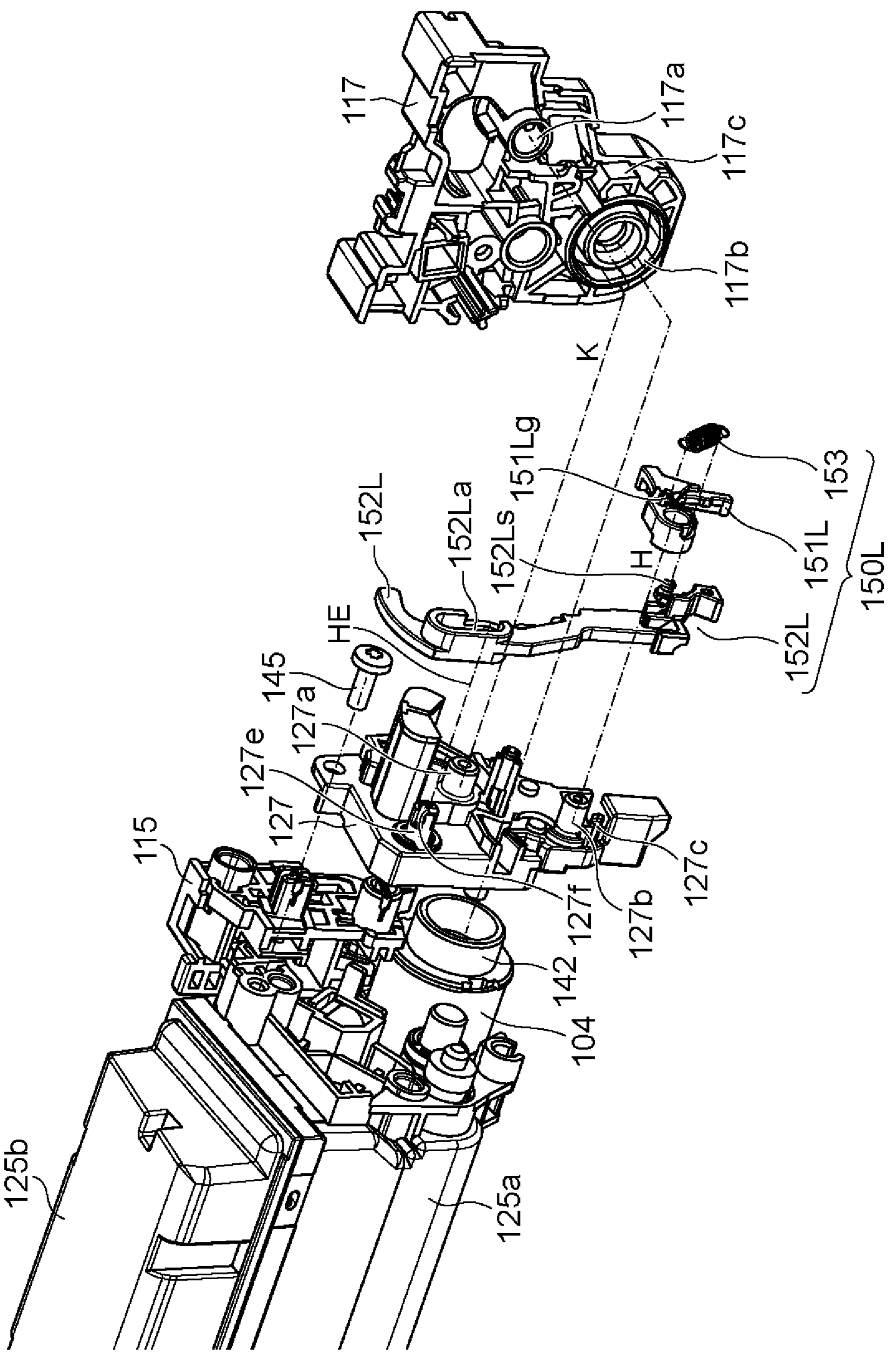
FIG. 16 is an exploded perspective view of the process cartridge.

The structure in which the photosensitive drum 104 of the process cartridge 100 and the developing roller 106 of the developing unit 109 are spaced (separated) and contacted with each other in this embodiment will be described in detail. The process cartridge is provided with a separation/contact mechanism 150R on the drive-side and a separation/contact mechanism 150L on the non-drive-side. FIG. 15 shows an assembly perspective view of the drive-side of the developing unit 109 including the separation/contact mechanism 150R. FIG. 16 shows an assembly perspective view of the developing unit including the separation/contact mechanism 150L on the non-drive-side. Regarding the separation/contact mechanism, the details of the separation/contact mechanism 150R on the drive-side will first be described, and then the separation/contact mechanism 150L on the non-drive-side will be described. The separation/contact mechanism has almost the same functions on the drive-side and the non-drive-side, and therefore, R is added to the reference numeral of each member on the drive-side. For the non-drive-side, the reference numeral of each member is the same as that of the drive-side, and L is added.

The separation/contact mechanism 150R includes a spacer R (spacer 151R) which is a restriction member (holding member), a movable member 152R which is a pressing member (force applying member), and a tension spring 153. The separation/contact mechanism 150L includes a spacer L (spacer 151L) which is a restricting member, a movable member 152L which is a pressing member (force applying member), and a tension spring 153.

[Detailed Description of Spacer 151R]

Figure 17:
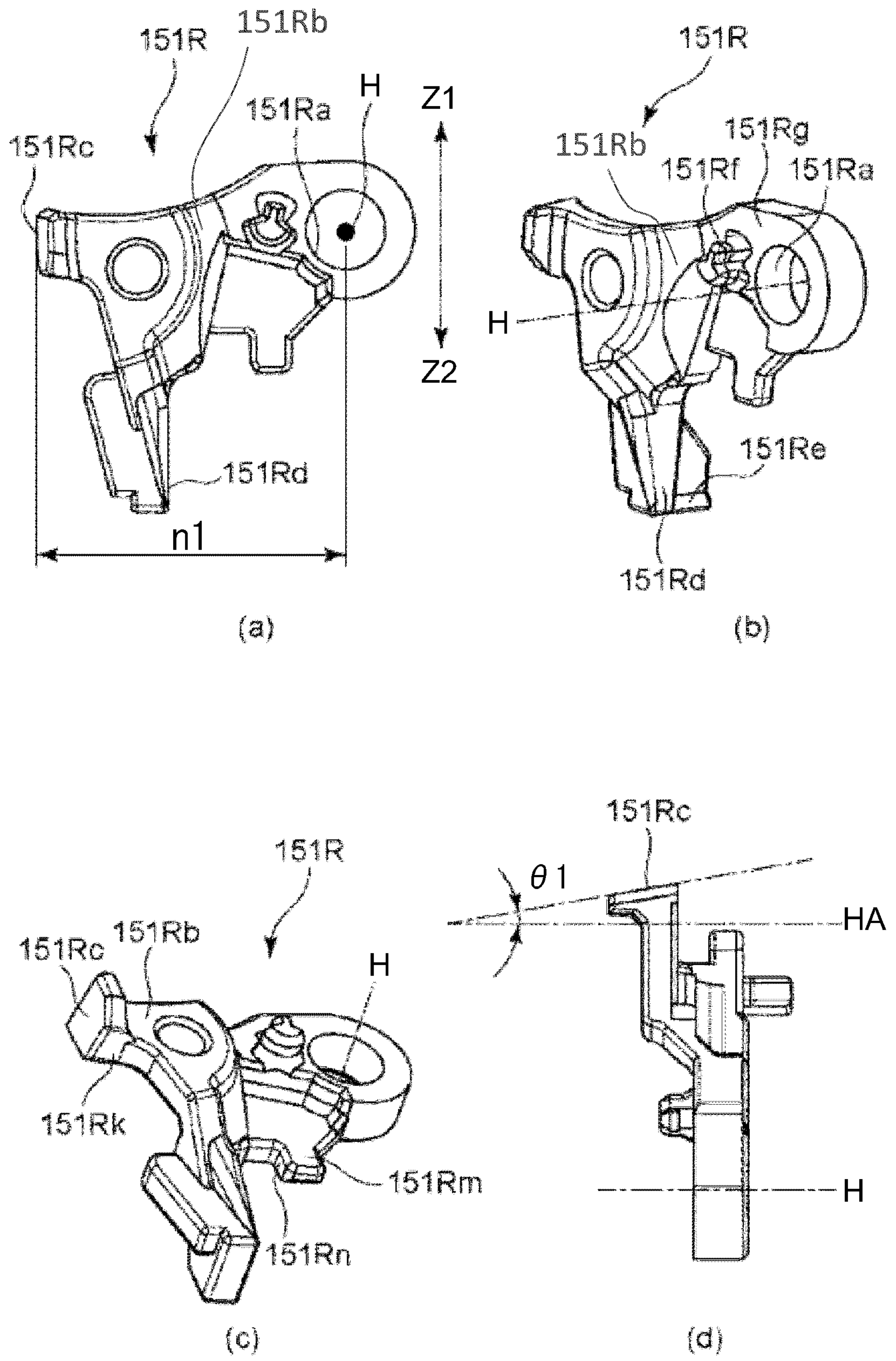
FIG. 17 illustrates a spacer.

Here, the spacer (holding member) 151R will be described in detail with reference to FIG. 17. Part (a) of FIG. 17 is a front view of the process cartridge 100 of the spacer 151R per se as viewed from the drive-side longitudinal direction. Part (b) of FIG. 17 and part (c) of FIG. 17 are perspective views of the spacer 151R, and part (d) of FIG. 17 is a view of the spacer 151R as viewed in the direction of arrow Z2 in part (a) of FIG. 17 (vertically upward in the image forming state). The spacer 151R includes an annular supported portion 151Ra, and includes a separation holding portion (holding portion) 151Rb projecting from the supported portion 151Ra in the radial direction of the supported portion 151Ra. The free end of the separation holding portion 151Rb includes a contact surface (contact portion) 151Rc having an arc shape centered on the swing axis H of the spacer 151R and having an inclination of an angle θ1 with respect to the line HA substantially parallel to the swing axis H. The angle θ1 is selected so as to satisfy the following inequality (1):

$$0° \leq \theta 1 \leq 45° \quad (1)$$

The separation holding portion (holding portion) 151Rb is a portion which connects the supported portion 151Ra and the contact surface 151Rc, and is sandwiched between the drum unit 108 and the developing unit 109 and has sufficient rigidity to maintain the spaced position.

Further, the spacer 151R has a restricted surface (restricted portion) 151Rk adjacent to the contact surface 151Rc. Further, the spacer 151R has a restricted surface (restricted portion) 151Rd projecting in the Z2 direction beyond the supported portion 151Ra, and has an arc shape pressed surface (at-contact pressed portion) 151Re projecting from the restricted surface 151Rd in the swing axis H direction of the supported portion 151Ra. Further, the spacer 151R includes a main body portion 151Rf connected to the supported portion 151Ra, and the main body portion 151Rf includes a spring-hooked portion 151Rg projecting in the swing axis H direction of the supported portion 151Ra. Further, the main body portion 151Rf has a rotation prevention portion 151Rm projecting in the Z2 direction, and the rotation prevention surface 151Rn is provided in a direction of opposing the pressed surface 151Re.

[Detailed Description of Movable Member R]

Figure 18:
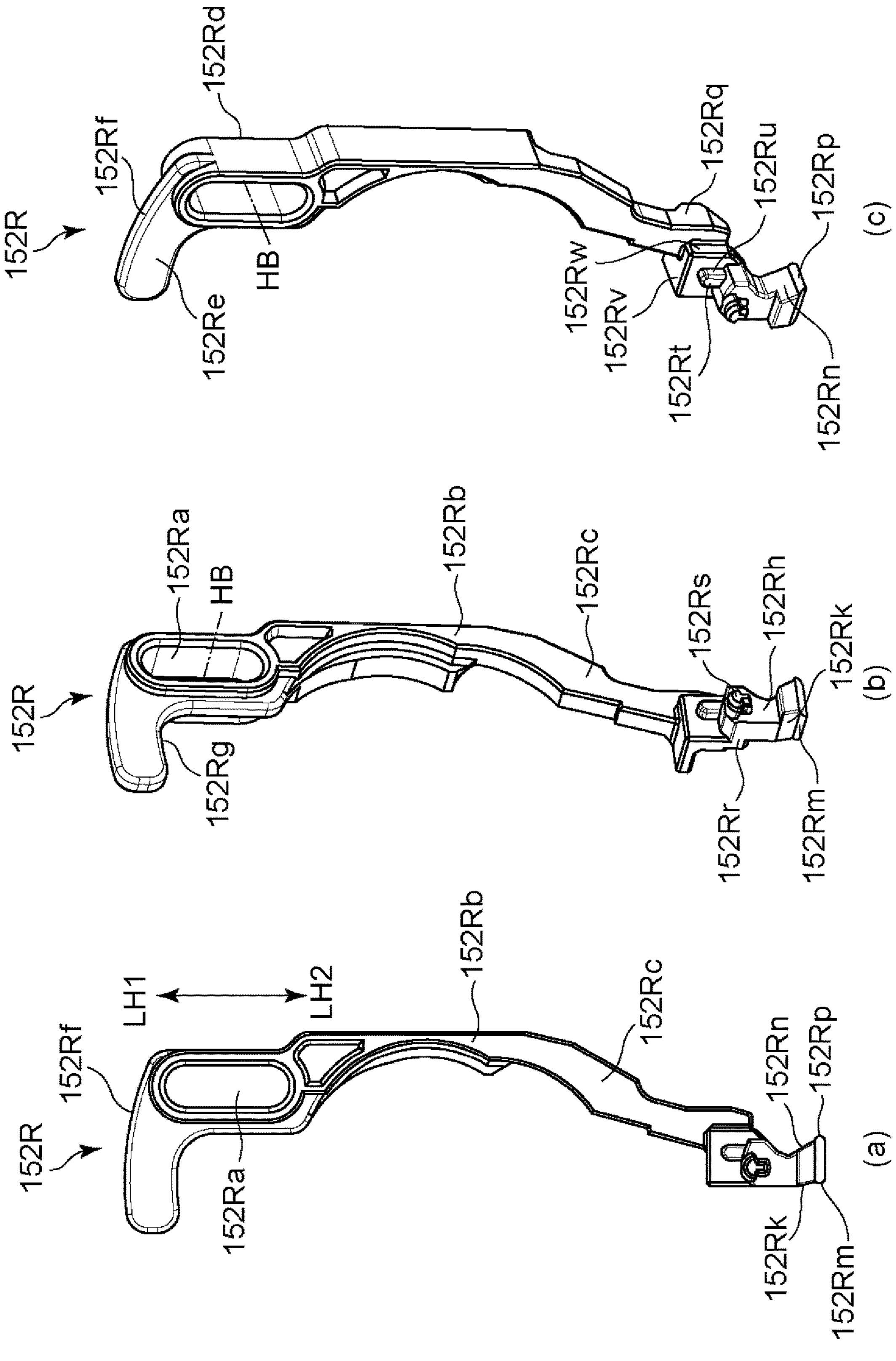
FIG. 18 is an illustration of a movable member.

Here, the movable member 152R will be described in detail with reference to FIG. 18. Part (a) of FIG. 18 is a front view of the movable member 152R as viewed in the longitudinal direction of the process cartridge 100, and FIGS. 18B and 18C are perspective views of the movable member 152R per se.

The movable member 152R has an oblong-shaped oblong supported portion 152Ra. Here, the longitudinal direction of the oblong shape of the oblong supported portion 152Ra is indicated by an arrow LH, the upper portion is indicated by an arrow LH1, and the lower portion is referred to as an arrow LH2. Further, the direction in which the oblong round supported portion 152Ra is formed is indicated by HB. The movable member 152R has a projecting portion (force receiving portion) 152Rh formed on the downstream side in the arrow LH2 direction of the oblong supported portion 152Ra. The oblong supported portion 152Ra and the projecting portion 152Rh are connected by a main body portion 152Rb. On the other hand, the movable member 152R includes a pressed portion 152Re projecting in the direction of the arrow LH1 direction and the direction substantially perpendicular to the direction of arrow LH1, an arc-shaped pressed surface 152Rf (moving force receiving portion, operating force receiving portion) on the downstream side in the arrow LH1 direction, and a pressing-restricting surface 152Rg on the upstream side. Further, the movable member 152R has a first restricted surface (first restricted portion) 152Ry extending from the main body portion 152Rb toward the upstream side in the arrow LH2 direction with respect to the projecting portion 152. Further, the movable member 152R has a second restricted surface 152Rw adjacent to the first restricted surface 152Rv and substantially parallel to the developing frame pressing surface (developing frame pressing portion, second frame pressing portion) 152Rq.

The projecting portion 152Rh includes a first force receiving portion (retracting force receiving portion, separating force receiving portion) 152Rk and a second force receiving portion (contact force receiving portion) 152Rn) arranged at the end in the arrow LH2 direction and in a direction substantially perpendicular to the arrow LH2 direction. The first force receiving portion 152Rk and the second force receiving portion 152Rn includes an arc shape first force receiving surface (retracting force receiving surface and the separating force receiving surface) 152Rm and a second force receiving surface (contact force receiving surface 152Rp) extending in the HB direction. Further, the projecting portion 152Rh has a spring-hooked portion 152Rs projecting in the HL direction and a locking portion 152Rt, and the locking portion 152Rt has a locking surface 152Ru opposing in the same direction as the second force receiving surface 152Rp.

Further, the movable member 152R is a part of the main body portion 152Rb, is arranged on the upstream side in the arrow LH2 direction with respect to the second force receiving portion 152Rn, and has a developing frame pressing surface 152Rq facing the same direction as the second force receiving surface 152Rp. Further, the movable member 152R has a spacer pressing surface (pressing portion) 152Rr which is perpendicular to the first restricted surface 152Rv and is arranged to oppose the developing frame pressing surface 152Rq.

When the process cartridge 100 is mounted on the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembly of Separation/Contact Mechanism 150R]

Figure 19:
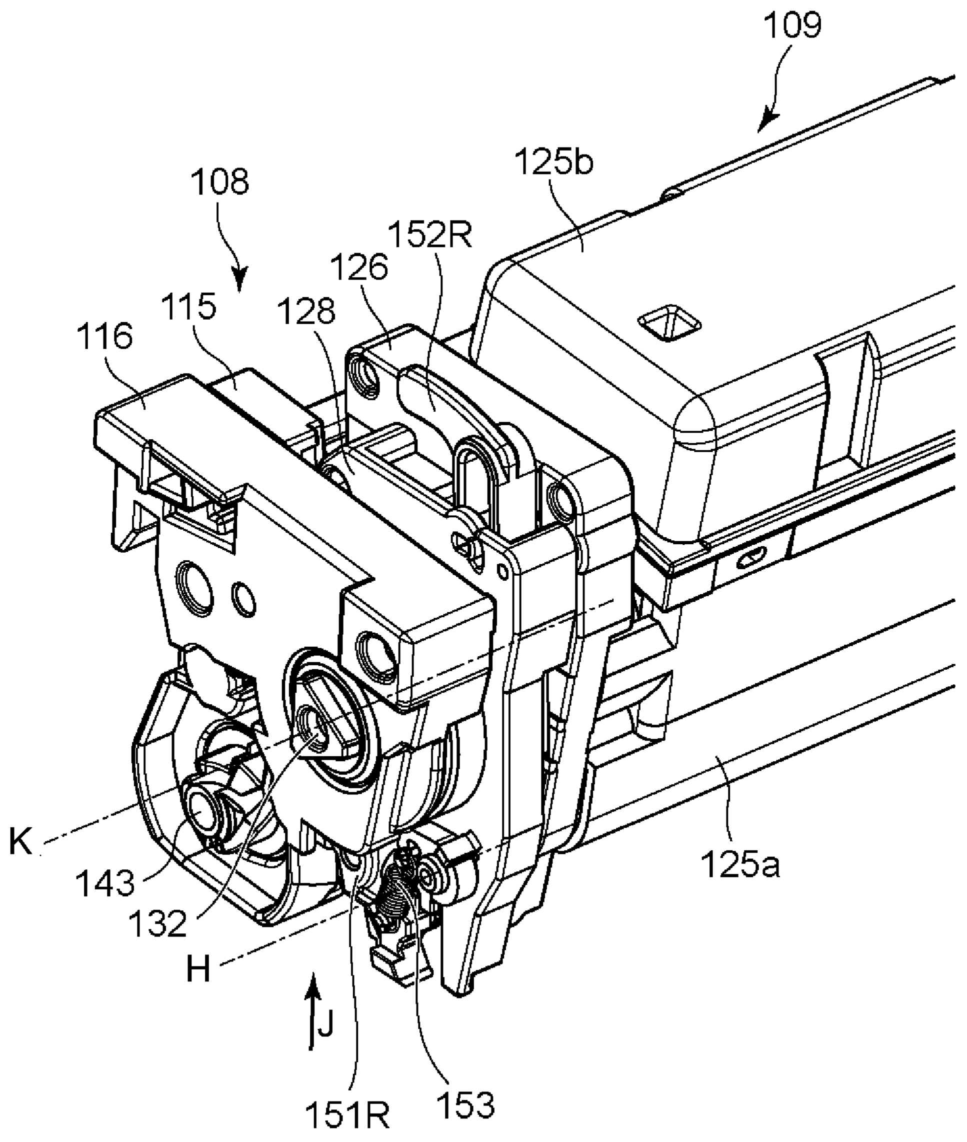
FIG. 19 is a perspective view of the process cartridge.

Referring to FIGS. 10, 15 to 19, the assembly of the separation/contact mechanism 150R will be described. FIG. 19 is a perspective view of the process cartridge 100 after assembling the spacer 151R as viewed from the drive-side.

As described above, as shown in FIG. 15, in the developing unit 109, the outer diameter portion of the cylindrical portion 128*b* of the development cover member 128 is fitted into a developing unit supporting hole portion 116*a* of the drive-side cartridge cover member 116. By this, the developing unit 109 is supported rotatably about the swing axis K relative to the photosensitive drum 104. Further, the development cover member is provided with a cylindrical first supporting portion 128*c* and a second supporting portion 128*k* projecting in the direction of the swing axis K.

The outer diameter of the first supporting portion 128*c* fits with an inner diameter of the supported portion 151Ra of the spacer 151R, and rotatably supports the spacer 151R. Here, a swing center of the spacer 151R assembled to the development cover member 128 is defined as the swing axis H. The development cover member 128 is provided with a first retaining portion 128*d* which projects in the direction of the swing axis H. As shown in FIG. 15, the movement of the spacer 151R assembled to the development cover member 128 in the swing axis H direction is restricted by the contact of the first retaining portion 128*d* to the spacer 151R.

Further, the outer diameter of the second supporting portion 128*k* fits with an inner wall of the oblong supported portion 152Ra of the movable member 152R, and supports the movable member 152R so as to be rotatable and movable in the length direction of the oblong direction. Here, the swing center of the movable member 152R assembled to the development cover member 128 is referred to as a movable member swing axis HC. As shown in FIG. 15, the movement of the movable member 152R assembled to the development cover member 128 in the movable member swing axis HC direction is restricted by the contact of a second retaining portion 128*m* to the spacer 151R.

FIG. 10 is a sectional view in which a portion of the drive-side cartridge cover member 116 and a portion of the development cover member 128 are omitted in a sectional line CS so that the fitting portion between the oblong supported portion 151Ra of the movable member 152R and the cylindrical portion 128*b* of the development cover member 128 can be seen. The separation/contact mechanism 150R includes the tension spring 153 provided with a spacer portion urging portion (holding portion urging portion) which urges the spacer 151R to rotate in the direction of arrow B1 in the drawing about the swing shaft H, and provided with a force receiving portion urging portion (projecting portion urging portion) for urging the movable member 152R is in the B3 direction indicated by an arrow. The tension spring 153 is a coil spring which is an elastic member. The arrow B3 direction is a direction substantially parallel to the long circle extending longitudinal direction LH2 (see FIG. 18) of the oblong round supported portion 152Ra of the movable member 152R. The tension spring 153 is engaged with and connected with the spring-hooked portion 151Rg provided on the spacer 151R and the spring-hooked portion 152Rs provided on the movable member 152R, and is assembled between them. The tension spring 153 applies a force to the spring-hooked portion 151Rg of the spacer 151R in the direction of arrow F2 in FIG. 10 to apply an urging force to rotate the spacer 151R in the direction of arrow B1. Further, the tension spring 153 applies a force to the spring-hooked portion 152Rs of the movable member 152R in the direction of the arrow F1 to move the movable member 152R in the direction of the arrow B3 (direction toward the accommodating position (reference position, stand-by position)).

The line GS is a line connecting the spring-hooked portion 151Rg of the spacer 151R and a spring-hooked portion 152Rs of the force holding member 152R, and the line HS is a line connecting the spring-hooked portion 152Rs of the movable member 152R and the movable member swinging axis HC. An angle θ2 formed by the line GS and the line HS is selected so as to satisfy the following inequality (2) with the clockwise direction centered on the spring-hooked portion 152Rs of the movable member 152R as positive. By this, the movable member 152R is urged to rotate in the direction of arrow BA with the movable member swing axis HC as the center of rotation.

$$0° \leq \theta 2 \leq 90° \quad (2)$$

As shown in FIG. 15, in the development drive input gear (development coupling member) 132 provided with the development coupling portion 132*a*, an inner diameter portion of the cylindrical portion 128*b* of the development cover member 128 and an outer circumference of a cylindrical portion 32*b* of the development drive input gear 132 are fitted, and in addition, a support portion 126*a* of the drive-side bearing 126 and the cylindrical portion (not shown) of the development drive input gear 132 are fitted. By this, the development drive input gear 132 is rotatably supported around the rotation axis K. The developing roller gear 131 is fixed to the drive-side end of the developing roller 106, and a toner feeding roller gear 133 is fixed to the drive-side end of the toner feeding roller (developer supply member) 107. The development drive input gear (development coupling member) 132 is provided with a gear portion on an outer peripheral surface of the cylinder, and this gear portion meshes with the developing roller gear 131, the toner feeding roller gear 133, and other gears to transmit the received rotational driving force to these gears.

In this embodiment, the arrangement of the spacer 151R and the movable member 152R in the direction of the swing axis K will be described. As shown in FIG. 15, in the direction of the swing axis K, the spacer 151R is provided on the side where the drive-side cartridge cover member 116 is disposed (outside in the longitudinal direction) with respect to with the development cover member 128, and the movable member 152R is provided on the side (inside in the longitudinal direction) where the development drive input gear 132 is disposed. However, the positional arrangement is not limited to this example, and the positions of the spacer 151R and the movable member 152R may be interchanged, or the spacer 151R and the movable member 152R may be arranged on one side with respect to the development cover member 128 in the swing axis K direction. Further, the arrangement order of the spacer 151R and the movable member 152R may be exchanged.

The development cover member 128 is fixed to the developing container 125 by way of the drive-side bearing 126 to form the developing unit 109. As shown in FIG. 15, the fixing method in this embodiment uses a fixing screw 145 and an adhesive (not shown), but the fixing method is not limited to this example, and welding such as welding by heating or pouring and hardening of resin may be used.

Figure 20:
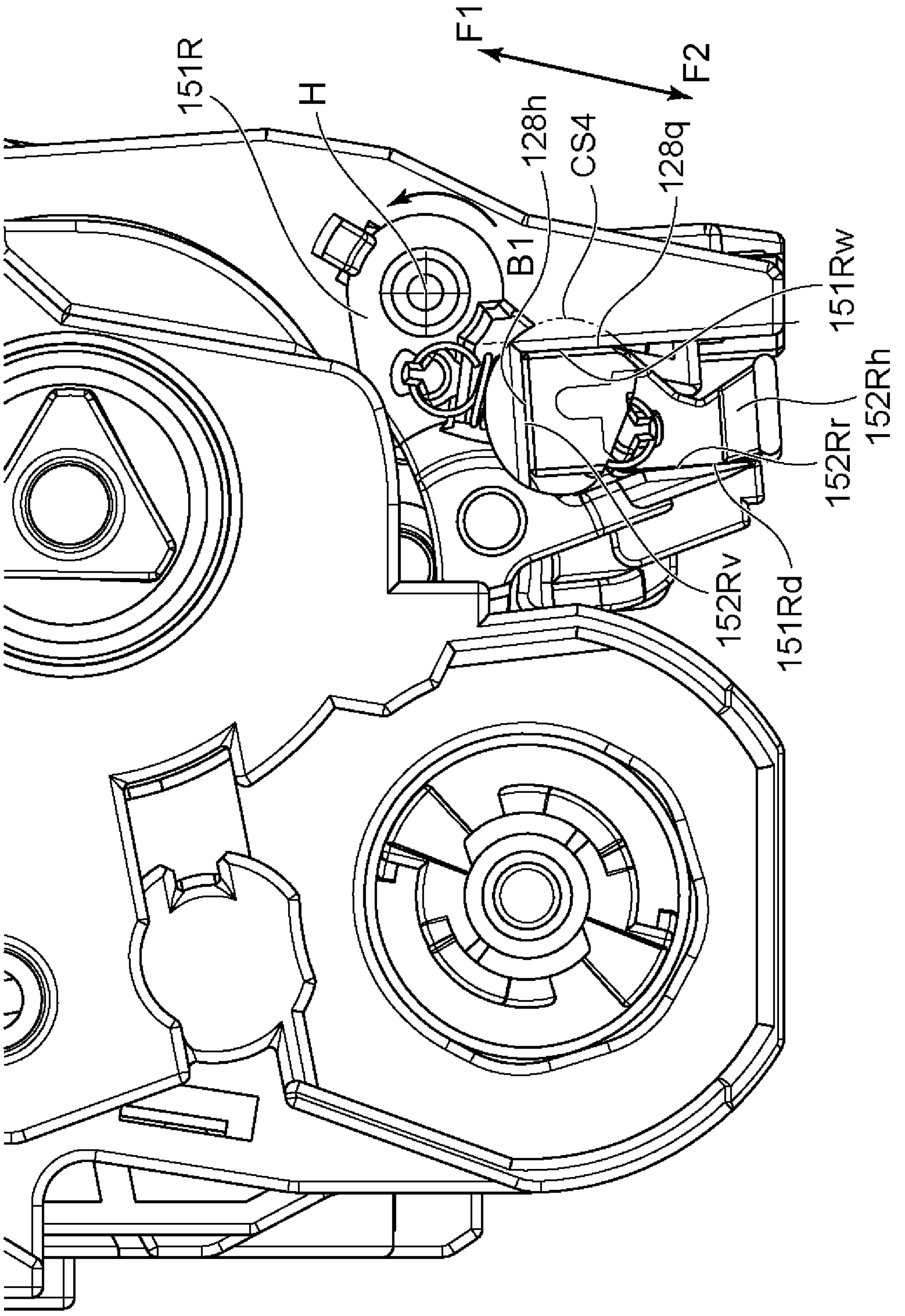
FIG. 20 is a partially enlarged view of a side surface of the process cartridge.

Here, FIG. 20 is a sectional view in which a periphery of the separation holding portion 151R in FIG. 10 is enlarged, and a part of the tension spring 153 and the spacer 151R is partially omitted on the partial sectional line CS4 for the sake of better illustration. In the movable member 152R, the first restricted surface 152Rv of the movable member 152R comes into contact with a first restricted surface 128*h* of the development cover member 128 by the urging force of the tension spring 153 in the F1 direction in the drawing. Further, the second restricted surface 152Rw of the movable member 152R comes into contact with a second restricted surface 128*q* of the development cover member 128 and is positioned. This position is referred to as a accommodated position for the movable member 152R and the projecting portion 152Rh. The accommodated position can also be referred to as a reference position or a stand-by position. Further, the spacer 151R is rotated in the B1 direction about the swing axis H by the urging force of the tension spring 153 in the F2 direction, and the restricted surface 151Rd of the spacer 151R is brought into contact with the spacer pressing surface 152Rr of the movable member 152R to stop the rotation. This position is referred to as a separation holding position (restriction position, first position) of the spacer 151R.

Figure 21:
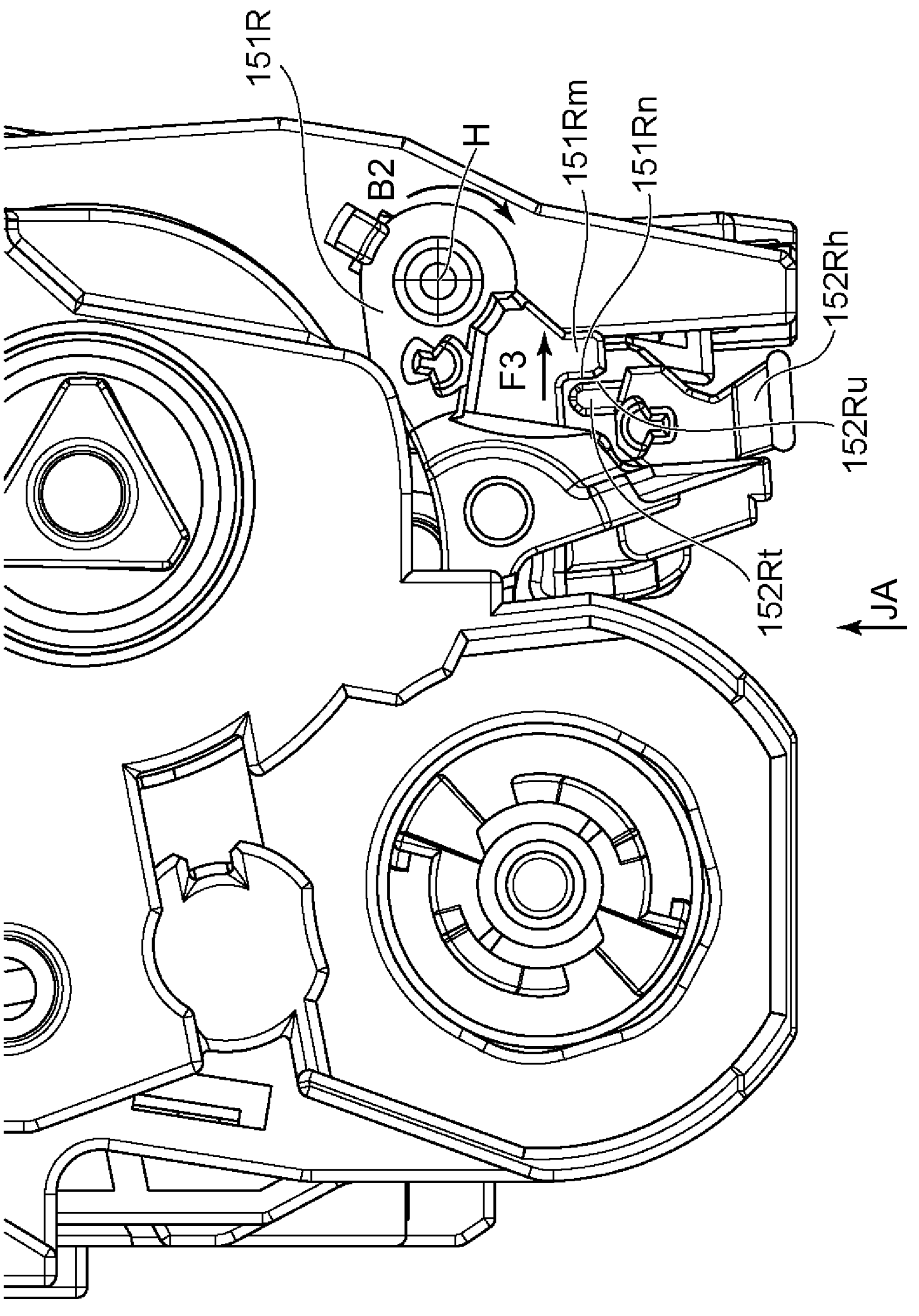
FIG. 21 is a partially enlarged view of the side surface of the process cartridge.

Further, FIG. 21 is an illustration in which the periphery of the separation holding portion 151R in FIG. 10 is enlarged, and the tension spring 153 is omitted for better illustration. Here, the case will be considered in which the process cartridge 100 including the separation/contact mechanism 150R of this embodiment is dropped in the JA direction in FIG. 21 when the process cartridge 100 is transported. At this time, the spacer 151R receives a force tending to rotate in the direction of arrow B2 due to its weight around the separation holding swing shaft H. When the spacer 151R starts to rotate in the B2 direction for this reason, the rotation prevention surface 151Rn of the spacer 151R comes into contact with the locking surface 152Ru of the movable member 152R, and the spacer 151R receives a force in the F3 direction in the drawing so as to suppress the rotation in the B2 direction. By this, it is possible to prevent the spacer 151R from rotating in the B2 direction during transportation, and it is possible to prevent the separation state between the photosensitive drum 104 and the developing unit 109 from being broken.

In this embodiment, the tension spring 153 is used as the urging means for urging the spacer 151R to the separation holding position and the movable member 152R to the accommodated position, but the urging means is not limited to this example. For example, a torsion coil spring, a leaf spring, or the like may be used as an urging means to urge the movable member 152R to the accommodated position and the spacer 151R to the separation holding position. Further, the material of the urging means may be metal, a mold, or the like, if it has elasticity and can urge the spacer 151R and the movable member 152R.

As described above, the developing unit 109 provided with the separation/contact mechanism 150R is integrally coupled with the drum unit 108 by the drive-side cartridge cover member 116 as described above (state in FIG. 19).

Figure 22:
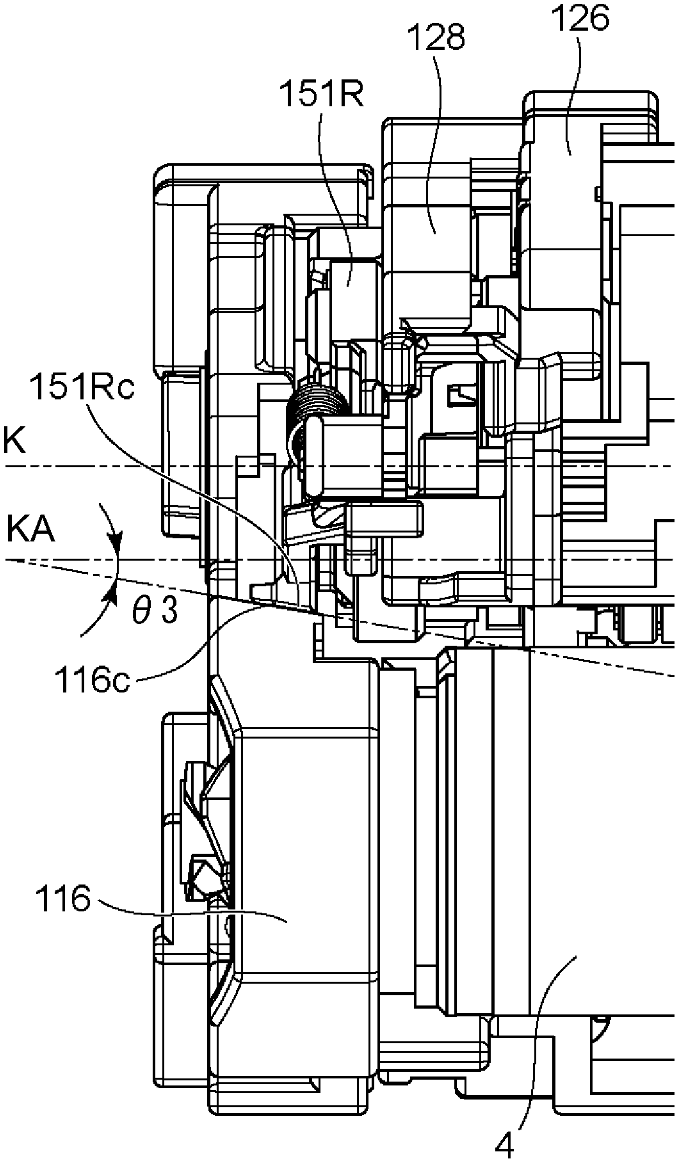
FIG. 22 is a bottom view of a drive-side of the process cartridge.

FIG. 22 is a view as seen in the direction of arrow J in FIG. 19. As shown in FIG. 15, the drive-side cartridge cover 116 of this embodiment has a contacted surface (contact portion) 116*c*. As shown in FIG. 22, the contacted surface 116*c* is formed with an inclination of an angle θ3 with respect to the swing axis K. The angle θ3 is preferably the same as the angle θ1 forming the contact surface 151Rc of the spacer 151R, but is not limited to such. Further, as shown in FIGS. 15 and 19, the contacted surface 116*c* is opposed to the contact surface 151Rc of the spacer 151R placed at the separation holding position when the drive-side cartridge cover member 116 is assembled to the developing unit 109 and the drum unit 108. Further, the contacted surface 116*c* contacts the contact surface 151Rc by the urging force of the development pressure spring 134 which will be described hereinafter. When the contacted surface 116Rc and the contact surface 151Rc are brought into contact with each other, the attitude of the developing unit 109 is determined so that the developing roller 106 of the developing unit 109 and the photosensitive drum 104 are separated by a gap P1. The state in which the developing roller 106 (developing member) is spaced from the photosensitive drum 104 by the gap P1 by the spacer 151R is referred to as a spaced position (retracted position) of the developing unit 109 (see part (a) of FIG. 1).

[Separation State and Contact State of Process Cartridge 100 (Drive-Side)]

Referring to FIG. 1, the spaced state and the contact state of the process cartridge 100 will be described in detail. FIG. 1 is a side view of the process cartridge 100 as viewed from the drive-side with the process cartridge 100 mounted inside the image forming apparatus main assembly 170. Part (a) of FIG. 1 shows a state in which the developing unit 109 is separated from the photosensitive drum 104. Part (b) of FIG. 1 shows a state in which the developing unit 109 is in contact with the photosensitive drum 104.

First, a state in which the spacer 151R is in the separation holding position (first position) and the developing unit 109 is in the separation position (retracted position) will be described. In this state, the supported portion 151Ra which is one end of the separation holding portion 151Rb contacts the first supporting portion 128*c* of the development cover member 128, and the contact portion 151Rc which is the other end contacts the contacted surface 116*c* of the drive-side cartridge cover member 116. Further, the first supporting portion 128*c* is pressed toward the supported portion 151Ra by the action of the development pressure spring 134, and the contact portion 151Rc is pressed toward the contacted surface 116*c*. Therefore, it can be said that this state is a state in which the drive-side cartridge cover member 116 positions the development cover member 128 by way of (sandwiching) the separation holding portion 151Rb of the spacer 151R and stably holds the development cover member 128. That is, it can be said that the drum unit 108 is positioned and stably hold it by the developing unit 109 by way of the spacer 151R.

From this state, the pressed portion 152Re of the movable member 152R is pushed in the ZA direction. By this, the movable member 152R and the projecting portion 152Rh move linearly from the stand-by position in the ZA direction (operating direction, predetermined direction) to reach the projecting position. The ZA direction is parallel to the rotation axis M2 of the developing roller 109 or the rotation axis M1 of the photosensitive drum 108. Therefore, the projecting portion 152Rh when in the projecting position is arranged downstream in the ZA direction from the projecting portion 152Rh when in the stand-by position. Therefore, the projecting portion 152Rh placed in the projecting position is located more remote from the swing axis K than the projecting portion 152Rh placed in the stand-by position. Further, the projecting portion 152Rh placed at the projecting position projects in the ZA direction from the drum frame and the developing frame (arranged downstream in the ZA direction). In this embodiment, as described above, the drum frame includes the first drum frame portion 115, the drive-side cartridge cover member 116, and the non-drive-side cartridge cover member 117, and the developing frame includes the developing container 125 and the drive-side bearing 126 and the non-drive-side bearing 127. The ZA direction is the direction crossing with the direction in which the four process cartridges 100 are arranged, the W41 direction, and the W42 direction.

It can be said that the attitude shown in FIG. 1 is also the attitude in which the rotation axis M1 of the photosensitive drum 104 is horizontal and the photosensitive drum 104 is arranged at the lower portion in the process cartridge 100 when the vertical direction in the Figure is the vertical direction. In this attitude, it can be said that the projecting portion 152Rh projects downward by projecting in the ZA direction.

Figure 26:
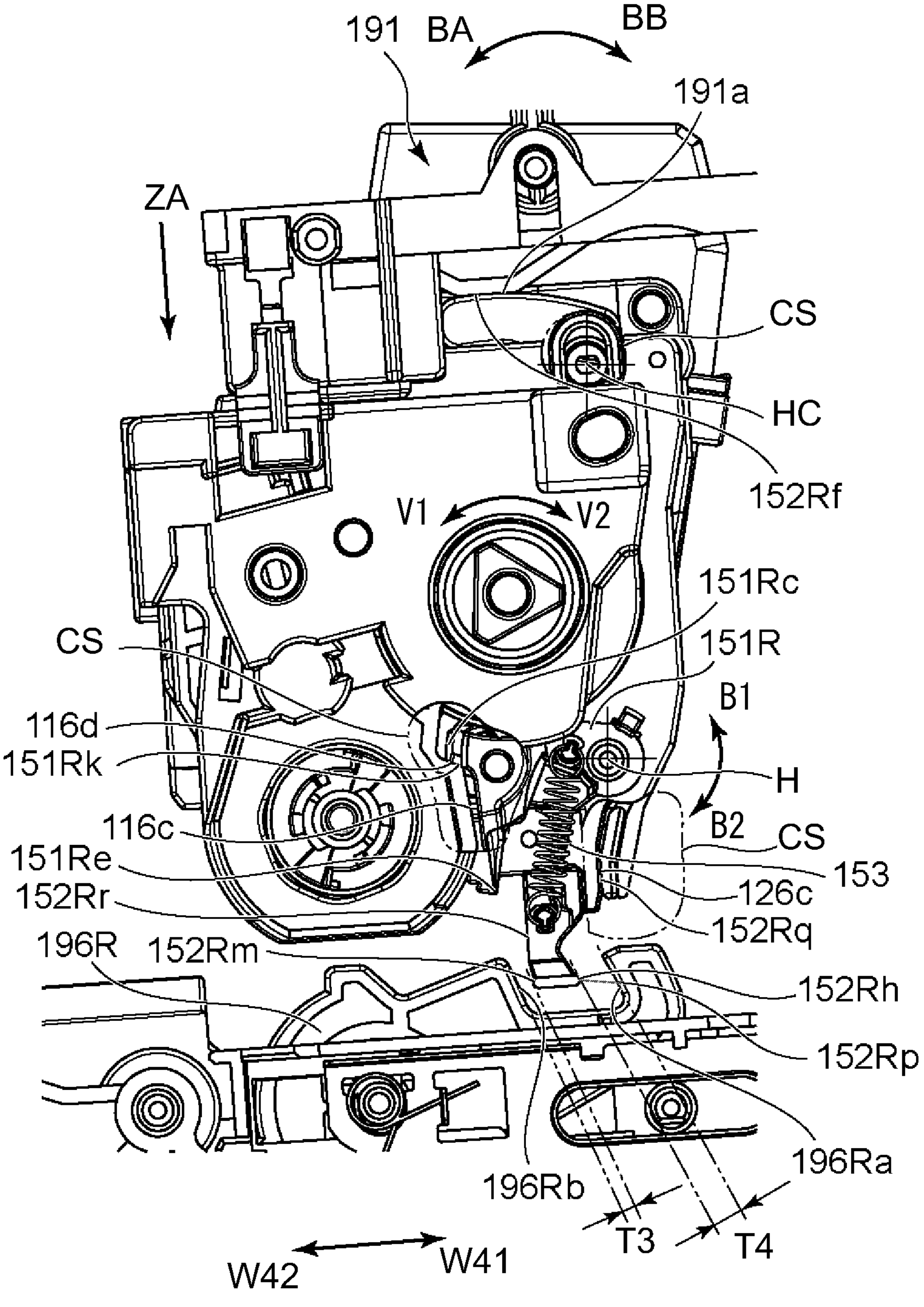
FIG. 26 is a side view of the process cartridge in the image forming apparatus main assembly.
Figure 38:
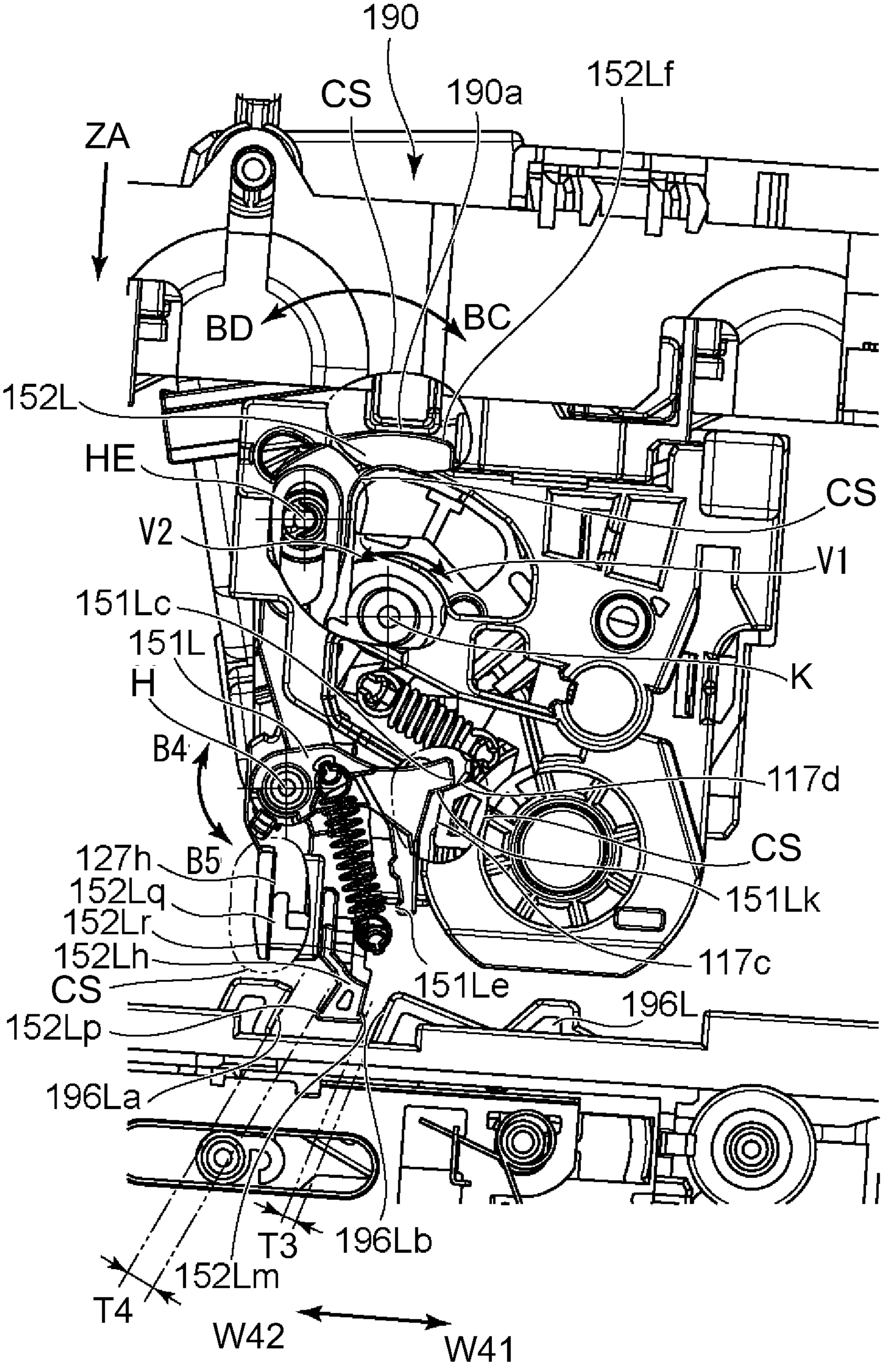
FIG. 38 is a side view (partial sectional view) of the process cartridge in the image forming apparatus main assembly.

Further, FIGS. 26 and 38 show the attitude of the process cartridge 100 in a state of being mounted in the image forming apparatus main assembly 170, and the vertical direction in the drawing is the vertical direction (Z1 direction, Z2 direction) when the image forming apparatus main assembly 170 is installed on a horizontal surface. The ZA direction vector in this attitude is a vector including at least a vertical component. Therefore, even in this attitude, it can be said that the projecting portion 152Rh projects downward by projecting in the ZA direction.

The movable member 152R can move in the ZA direction and the direction opposite thereto while maintaining the state that the spacer 151R is in the separation holding position (first position). Therefore, even when the movable member 152R and the projecting portion 152Rh are in the operating position, the spacer 151R is located in the separation holding position (first position). At this time, the pressed surface 151Re of the spacer 151R is in contact with the spacer pressing surface 152Rr of the movable member 152R by the tension spring 153 as described above. Therefore, when the second force receiving portion 152Rn is pressed in the direction of the arrow W42, the movable member 152R rotates in the direction of the arrow BB about the movable member swing axis HC, and the spacer pressing surface 152Rr presses the restricted portion 151Rd, by which the spacer 151R is rotated in the direction of arrow B2. When the spacer 151R rotates in the direction of arrow B2, the contact surface 151Rc separates from the contacted surface 116*c*, and the developing unit 109 can rotate in the direction of arrow V2 about the swing axis K from the separated position. That is, the developing unit 109 rotates in the V2 direction from the separated position, and the developing roller 106 of the developing unit 109 is brought into contact with the photosensitive drum 104. More specifically, the developing roller 109 includes a metal shaft (core metal), a rubber layer covering the metal shaft (core metal), and a roller mounted to the metal shaft at an axial end more than the rubber layer, and the surface of the rubber layer and the roller is contacted with the photosensitive drum 104. Since the rubber layer is deformed, the distance between the rotating axis M2 of the developing roller 109 and the rotating axis M1 of the photosensitive drum 104 can be accurately maintained by determining the distance between the rotating axis M2 of the developing roller 109 and the rotating axis M1 of the photosensitive drum 104.

Here, the position of the developing unit 109 in which the developing roller 106 and the photosensitive drum 104 are in contact with each other is referred to as a contact position (development position) (state of part (b) of FIG. 1. The contact position (development position) in which the developing roller 106 is in contact with the photosensitive drum 104 is not only the position where the surface of the developing roller 106 is in contact with the surface of the photosensitive drum 104, but the position where the toner carried on the surface of the photosensitive drum 104 can contact the surface of the photosensitive drum 104 when the developing roller 106 rotates is also included. That is, it can be said that the contact position is a developing position where the toner carried on the surface of the developing roller 106 can be transferred (deposited) to the surface of the photosensitive drum 104 when the developing roller 106 rotates. The position where the contact surface 151Rc of the spacer 151R is spaced from the contacted surface 116*c* is referred to as a separation release position (permitted position, second position). When the developing unit 109 is in contact position, the restriction surface 151Rk of the spacer 151R is in contact with the spacer restriction surface (spacer portion restriction portion) 116*d* of the drive-side cartridge cover 116. By this, the spacer 151R is constrained from moving to the separation holding position and is maintained at the separation release position.

Further, the drive-side bearing 126 has a first pressed surface (at-separation pressed portion) 126*c* which is a surface perpendicular to the swing axis K. The drive-side bearing is fixed to the developing unit 109. Therefore, when the developing unit 109 presses the first force receiving portion 152Rk of the movable member 152R in the direction of an arrow 41 when the developing unit 109 is in the contact position, the developing frame pressing surface 152Rq comes into contact with the first pressed surface 126*c*. By this, the developing unit 109 rotates about the swing axis K in the direction of the arrow V1 to move to the separated position (retracted position) (state of part (a) of FIG. 1. Here, when the developing unit 109 moves from the contact position to the separated position, the direction in which the first force receiving surface 126*c* moves is shown by arrows W41 in part (a) of FIG. 1 and part (b) of FIG. 1. Further, the direction opposite to the arrow W41 is the arrow W42, and the arrow W41 and the arrow W42 are substantially horizontal directions (X1, X2 directions). The second force receiving surface 152Rp of the movable member 152R assembled to the developing unit 109 as described above is placed on the upstream side of the first force receiving surface 126*c* of the drive-side bearing 126 in the direction of the arrow W41. Further, the first force receiving surface 126*c* and the pressed surface 151Re of the spacer 151R are arranged at positions where at least a portion of them overlap in the W1 and W2 directions. The detailed operation of the separation/contact mechanism 150R in the image forming apparatus main assembly 170 will be described below.

[Mounting of Process Cartridge 100 to Image Forming Apparatus Main Assembly 170 (Drive-Side)]

Next, referring to FIGS. 12, 23, and 24, engaging operation of 195 will be described between the separation/contact mechanism 150R of the process cartridge 100 and the development separation control unit 195 of the image forming apparatus main assembly 170 at the time when the process cartridge 100 is mounted on the image forming apparatus main assembly 170. For better illustration, these Figures are cross-sectional views in which a portion of the development cover member 128 and a portion of the drive-side cartridge cover member 116 are partially omitted along the partial cross-sectional lines CS1 and CS2, respectively.

Figure 23:
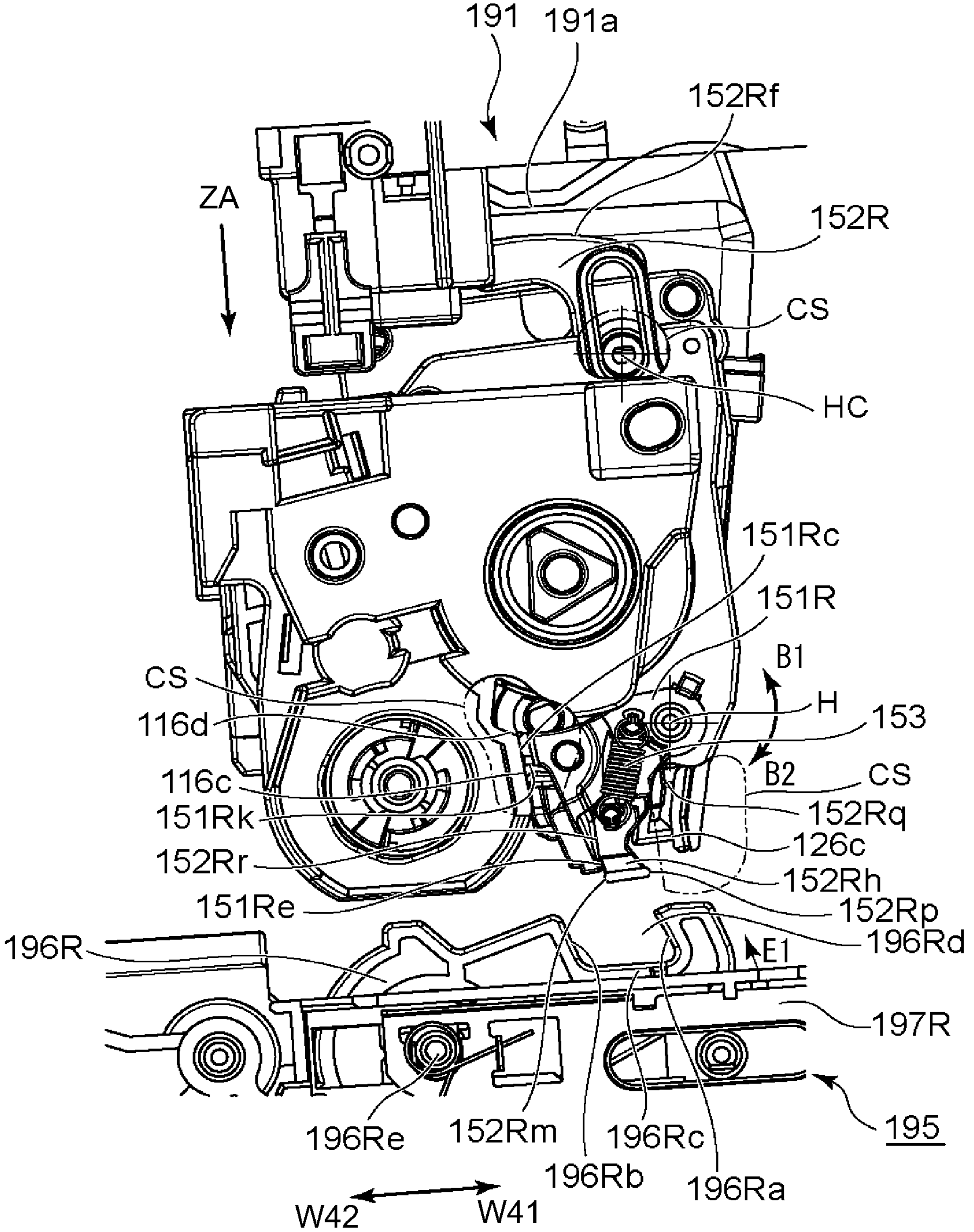
FIG. 23 is a side view of the process cartridge in the image forming apparatus main assembly.

FIG. 23 is a view as seen from the drive-side of the process cartridge 100 when the process cartridge 100 is mounted on the cartridge tray 171 (not shown) of the image forming apparatus M, and the cartridge tray 171 is inserted into the first mounting position. In this Figure, portions other than the process cartridge 100, the cartridge pressing unit 191 and the separation control member 196R are omitted.

As described above, the image forming apparatus main assembly 170 of this embodiment has separation control members 196R corresponding to respective process cartridge 100 as described above. The separation control member 196R is disposed on the lower surface side of the image forming apparatus main assembly 170 with respect to the spacer 151R when the process cartridge 100 is placed at a first inner position and a second inner position. The separation control member 196R includes a first force application surface (force applying portion, contact force applying portion) 196Ra and a second force application surface (retracting force applying portion, separating force applying portion) 196Rb which project toward the process cartridge 100 and face each other through the space 196Rd. The first force application surface 196Ra and the second force application surface 196Rb are connected with each other by a connecting portion 196Rc on the lower surface side of the image forming apparatus main assembly 170. Further, the separation control member 196R is rotatably supported by the control sheet metal 197 with the rotation center 196Re as the center of rotation. The separating member 196R is normally urged in the E1 direction by an urging member 196R. Further, by the control sheet metal 197 being structured to be movable in the W41 and W42 directions by a control mechanism (not shown), the separation control member 196R is structured to be movable in the W41 and W42 directions.

As described above, the cartridge pressing unit 191 lowers in the direction of arrow ZA in interrelation with the transition of the front door 11 of the image forming apparatus main assembly 170 from the open state to the closed state, and a first force applying portion 191*a* comes into contact with the pressed surface 152Rf of the movable member 152R. Thereafter, when the cartridge pressing unit 191 is lowered to a predetermined position which is the second mounting position, the projecting portion 152Rh of the movable member 152R moves in the ZA direction (operating direction, predetermined direction) and projects downward in the Z2 direction of the process cartridge 100 (state of FIG. 24). The ZA direction is a direction intersecting (orthogonally in this embodiment) the rotation axis M2 of the developing roller 109, the rotation axis M1 of the photosensitive drum 108 and the swing axis HC. This position is referred to as projecting positions of the movable member 152R and the projecting portion 152Rh. The projecting position can also be referred to as a force receiving position or an operating position. The projecting portion 152Rh projects more from the developing frame when it is in the projecting position than when it is in the stand-by position. When this operation is completed, as shown in FIG. 24, a gap T4 is formed between the first force application surface 196Ra of the separation control member 196R and the second force receiving surface 152Rp of the movable member 152R, and a gap T3 is formed between the second force application surface 196Rb and the first force receiving surface 152 Rm. Then, it is located at the second mounting position where the separation control member 196R does not act on the movable member 152R. It can be said that this position of the separation control member 196R is a home position. At this time, the second force receiving surface 152Rp of the movable member 152R and the first force application surface 196Ra of the separation control member 196R are arranged so as to partially overlap with each other in the W1 and W2 directions. Similarly, the first force receiving surface 152Rm of the movable member 152R and the second force application surface 196Rb of the separation control member 196R are arranged so as to partially overlap in the W1 and W2 directions.

[Contact Operation of Developing Unit (Drive-Side)]

Next, the contacting operation between the photosensitive drum 104 and the developing roller 106 by the separation/contact mechanism 150R will be described in detail referring to FIGS. 24 to 26. For better illustration, in these Figures, a portion of the development cover member 128, a portion of the drive-side cartridge cover member 116, and a portion of the drive-side bearing 126 are partly omitted along partial cross-sectional lines CS1, CS2, and CS3, respectively.

Figure 24:
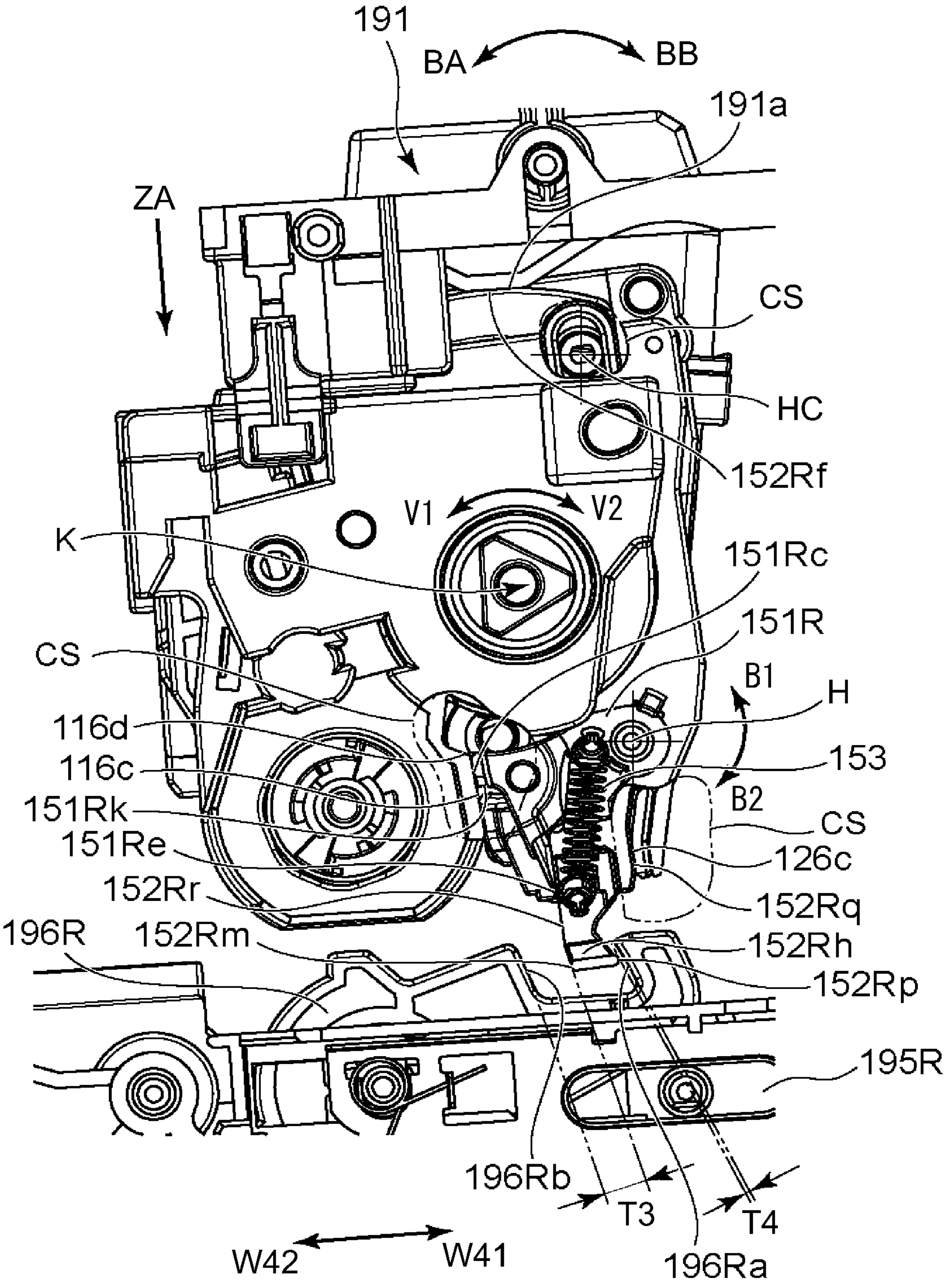
FIG. 24 is a side view of the process cartridge in the image forming apparatus main assembly.
Figure 25:
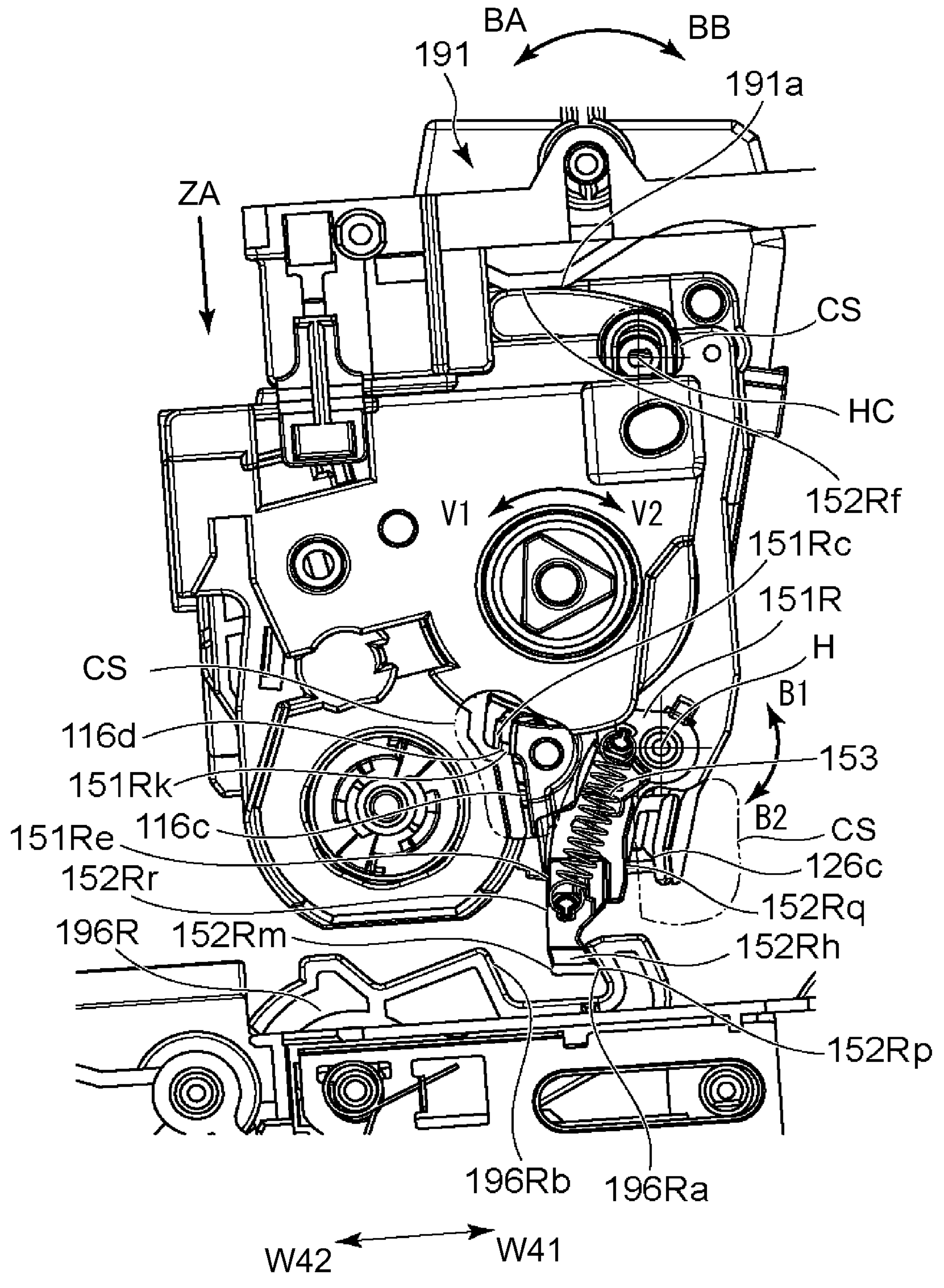
FIG. 25 is a side view of the process cartridge in the image forming apparatus main assembly.

In the structure of this embodiment, the development coupling 32 receives a driving force from the image forming apparatus main assembly 170 in the direction of arrow V2 in FIG. 24, so that the developing roller 106 rotates. That is, the developing unit 109 including the development coupling 32 receives torque (driving torque) in the arrow V2 direction about the swing axis K from the image forming apparatus main assembly 170. The case where the developing unit 109 shown in FIG. 24 is in the separated position and the spacer 151R is in the separation holding position will be described. In such a case, even if the developing unit receives this driving torque and the urging force of the development pressure spring which will be described hereinafter, the attitude of the developing unit 109 is maintained at the separated position because the contact surface 151Rc of the spacer 151R contacts the contacted surface 116*c* of the drive-side cartridge cover member 116.

The separation control member 196R of this embodiment is structured to be movable in the direction of arrow W42 in FIG. 24 from the home position. When the separation control member 196R moves in the W42 direction, the second force application surface 196Ra of the separation control member 196R and the second force receiving surface 152Rp of the second force receiving portion 152Rn of the movable member 152R come into contact with each other, so that the movable member 152R rotates in the BB direction with the swing axis HC as the center of rotation. The contact between the first force application surface 196Ra and the second force receiving surface 152Rp is not necessarily surface contact, and may be line contact or point contact. In this manner, the first force application surface 196Ra applies a contact force to the second force receiving surface 152Rp. The moving direction of the projecting portion 152Rh when the movable member 152R is rotated in the BB direction is referred to as a first direction. Further, as the movable member 152R rotates in the BB direction, the spacer 151R is rotated in the B2 direction while the spacer pressing surface 152Rr of the movable member 152R is in contact with the pressed surface 151Re of the spacer 151R. The spacer 151R is rotated by the movable member 152R to the separation release position (second position) where the contact surface 151Rc and the contacted surface 116*c* are separated from each other. Here, the position of the separation control member 196R for moving the spacer 151R to the separation release position (second position) shown in FIG. 25 is referred to as a first position.

When the spacer 151R is moved to the separation release position (second position) by the separation control member 196R in this manner, the developing unit 109 rotates in the V2 direction by the drive torque received from the image forming apparatus main assembly 170 and the development pressure spring (biased portion) 134 which will be described hereinafter. Then, the developing unit 109 moves to the contact position where the developing roller 106 and the photosensitive drum 104 contact each other (state in FIG. 25). At this time, the spacer 151R urged in the direction of arrow B1 by the tension spring 153 is maintained at the separation release position (second position) by the restricted surface 151Rk contacting to the spacer restriction surface 116*d* of the drive-side cartridge cover member 116.

After that, the separation control member 196R moves in the direction of W41 and returns to the home position. At this time, the movable member 152R is rotated in the BA direction by the tension spring 153, and the state is shifted such that the developing frame pressing surface 152Rq of the movable member 152R and the first pressing surface 126*c* of the drive-side bearing 126 are in contact with each other is reached (state shown in FIG. 26). At this time, it can be said that the movable member 152R and the projecting portion 152Rh are in the operating position.

By this, the above-mentioned gaps T3 and T4 are formed again, and are located at positions where the separation control member 196R does not act on the movable member 152R. The change from the state of FIG. 25 to the state of FIG. 26 is performed without delay.

As described above, in the structure of this embodiment, by the movement of the separation control member 196R from the home position to the first position, the force is applied to the movable member 152R, so as to rotate the movable member 152R and move the spacer 151R to the separation release position (second position) from the separation holding position (first position). This makes it possible for the developing unit to move from the separated position to the contacting position where the developing roller 9 and the photosensitive drum 104 are in contact with each other. That is, the contact force applied from the separation control member 196R is transmitted to the spacer 151R by way of the movable member 152R to move the spacer 151R from the separation holding position (first position) to the separation release position (second position), by which the developing unit 109 is moved from the spaced position (retracted position) to the contact position (developed position).

When the developing unit 109 is in the contact position (development position), it is urged in the V2 direction by the driving torque received from the image forming apparatus main assembly 170 and the development pressure spring 134, and the position of the developing unit relative to the drum unit 108 is determined by the roller 106 contacting to the photosensitive drum 104. Therefore, the photosensitive drum can be said to be a positioning portion (second positioning portion) which determines the position of the developing unit 109 at the developing position relative to the drum unit 108. Further, at this time, it can be said that the developing unit 109 is stably held by the drum unit 108. At this time, the spacer 151R in the separation release position is not directly contributable to the positioning of the developing unit 109. However, the spacer 151R does not prevent (permits) the developing roller 106 from contacting the photosensitive drum 104 and determining the position of the developing unit 109 relative to the drum unit 108 by moving from the separation holding position to the separation release position. That is, it can be said that the spacer 151R at the separation release position (second position) creates a situation in which the drum unit 108 can stably hold the developing unit 109 at the contact position (development position).

When the spacer 151R is in the separation release position (second position), the position of the developing unit 109 with respect to the drum unit 108 may be determined by way of the spacer 151R as long as the developing roller 106 is in contact with the photosensitive drum 104. In such a case, a surface different from the contact portion 151Rc of the spacer 151R may be brought into contact with the drive-side cartridge cover member 116, and the development cover member 128 may be positioned by the drive-side cartridge cover member 116 by way of the spacer 151R (sandwiched), for example. The position of the separation control member 196R in FIG. 26 is the same as that in FIG. 24.

Further, when the front door 11 of the image forming apparatus main assembly 170 shifts from the closed state to the open state in this state, the first force applying portion 191*a* rises in the direction opposite to the arrow ZA direction. Along with this operation, the movable member 152R moves in the direction opposite to the arrow ZA direction by the action of the urging member 153. However, the spacer 151R still maintains the separation release position, and the developing unit 109 also maintains the developing position.

[Separation Operation of Developing Unit (Drive-Side)]

Figure 27:
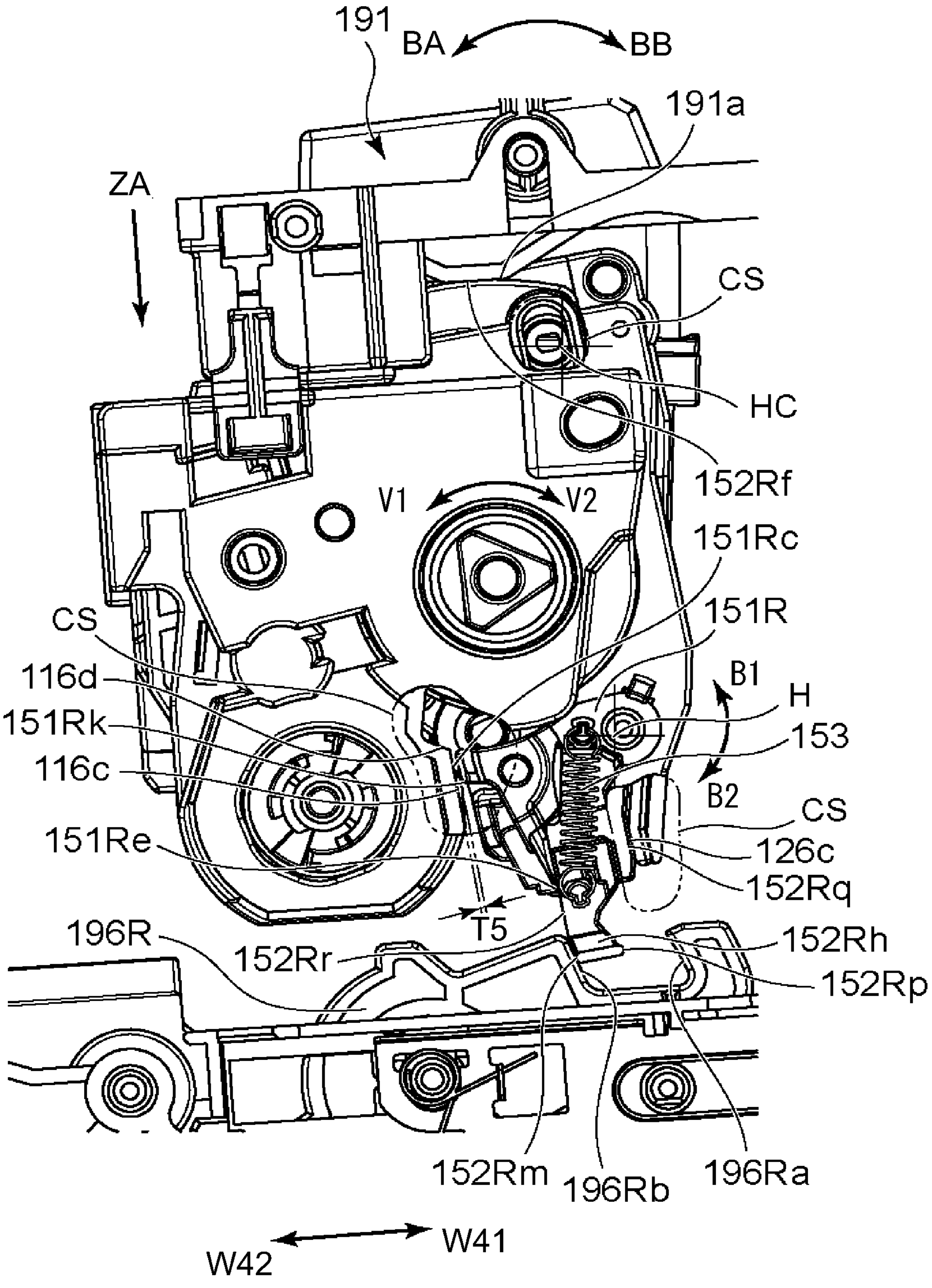
FIG. 27 is a side view of the process cartridge in the image forming apparatus main assembly.

Next, referring to FIGS. 26 and 27, the description will be made as to the operation of moving the developing unit 109 from the contact position to the spaced position by the separation/contact mechanism 150R. For better illustration, these Figures are cross-sectional views in which a portion of the development cover member 128, a portion of the drive-side cartridge cover member 116, and a portion of the drive-side bearing 126 are partially omitted in the partial cross-sectional line CS, respectively.

As described above, in the state shown in FIG. 26, it can be said that the movable member 152R and the projecting portion 152Rh are in the operating position. The separation control member 196R in this embodiment is structured to be movable from the home position in the direction of arrow W41 in FIG. 26. When the separation control member 196R moves in the W41 direction, the second force application surface 196Rb and the first force receiving surface 152Rm of the first force receiving portion 152Rk of the movable member 152R come into contact with each other, and the movable member 152R rotates in the direction of arrow BA about the swing axis HC for the movable member. The contact between the second force application surface 196Rb and the first force receiving surface 152Rm is not necessarily surface contact, but may be line contact or point contact. In this manner, the second force application surface 196Rb applies a separating force (retracting force) to the first force receiving surface 152Rm. The moving direction of the projecting portion 152Rh at the time when the movable member 152R is rotated in the BA direction is referred to as a second direction. Then, by the developing frame pressing surface 152Rq of the movable member 152R being brought into contact with the first pressed surface 126*c* of the drive-side bearing 126, the developing unit 109 rotates from the contact position in the direction of the arrow V1 about the swing axis K (State of FIG. 27). Here, the pressed surface 152Rf of the movable member 152R forms an arc shape, and the center of the arc is disposed so as to be aligned with the swing axis K. By doing so, when the developing unit 109 moves from the contact position to the spaced position, the force received by the pressed surface 152Rf of the movable member 152R from the cartridge pressing unit 191 is directed in the direction of the swing axis K. Therefore, the rotation of the developing unit 109 in the arrow V1 direction is not hindered. In the spacer 151R, the restricted surface 151Rk of the spacer 151R and the spacer restriction surface 116*d* of the drive-side cartridge cover member 116 are separated, and the spacer 151R rotates in the direction of arrow B1 (direction from the separation release position to the separation holding position) by the urging force of the tension spring 153. By this, the spacer 151R rotates until the pressed surface 151Re contacts spacer pressing surface 152Rr of the movable member 152R, and by this contacting, it shifts to the separation holding position (first position). When the developing unit 109 is moved from the contact position to the separation position by the separation control member 196R and the spacer 151R is at the separation holding position (first position), A gap T5 is formed between the contact surface 151Rc and the contacted surface 116Rc as shown in FIG. 27. Here, the position shown in FIG. 27 in which the developing unit 109 is rotated from the contact position toward the separation position, and the spacer 151R can move to the separation holding position is referred to as a second position of the separation control member 196R.

Thereafter, the separation control member 196R moves in the direction of the arrow W42 and returns from the second position to the home position. Then, while the spacer 151R is maintained in the separation holding position, the developing unit 109 is rotated in the arrow V2 direction by the driving torque received from the image forming apparatus main assembly 170 and the development pressure spring 134 described hereinafter, and the contact surface 151Rc contacts the contacted surface 116*c*. That is, the developing unit 109 is in a state where the separated position is maintained by the spacer 151R, and the developing roller 106 and the photosensitive drum 104 are spaced by the gap P1 (states in FIG. 24 and part (a) of FIG. 1. That is, the developing unit 109 is constrained by the spacer 151R from moving to the contact position against the driving torque received from the image forming apparatus main assembly 170 and the urging force in the arrow V2 direction due to the urging of the development pressure spring 134, and the developing unit 109 is maintained in a separated position. At this time, it can be said that the developing unit 109 is stably held in a separated position (retracted position) by the drum unit 108. By this, the above-mentioned gaps T3 and T4 are formed again, and are located at positions where the separation control member 196R does not act on the movable member 152R (state shown in FIG. 24). The transition from the state of FIG. 27 to the state of FIG. 24 is executed without a delay.

As described above, in this embodiment, the spacer 151R moves from the separation release position to the separation holding position by moving the separation control member 196R from the home position to the second position. Then, by the separation control member 196R returning from the second position to the home position, the developing unit 109 becomes in a state of maintaining the separation position by the spacer 151R. In this manner, the separation force applied from the separation control member 196R is transmitted to the first pressed surface 126*c* of the drive-side bearing (portion of the development frame) 126 by way of the movable member 152R, so that the developing unit is moved from the contact position to the separation position (retracted position), and the spacer 151R is moved from the separation release position to the separation holding position.

In the state that the developing unit 109 is in the separated position (retracted position), the position of the developing unit 109 with respect to the drum unit 108 is determined by being urged in the V2 direction by the driving torque received from the image forming apparatus main assembly 170 and the development pressure spring 134 in the state that the supported portion 151Ra is in contact with the first supported portion 128*c*, and the contact portion 151Rc is in contact with the contacted surface 116*c*, as described above. Therefore, the contacted surface 116*c* can be said to be a positioning portion (first positioning portion) for positioning the developing unit 109 at the separated position (retracted position). At this time, it can be said that the developing unit 109 is stably held by the drum unit 108. Further, it can be said that the spacer 151R at the separation holding position (first position) establishes a situation in which the drum unit 108 can stably hold the developing unit at the separation position (retracted position).

Further, when the front door 11 of the image forming apparatus main assembly 170 shifts from the closed state to the open state in this state, the first force applying portion 191*a* rises in the direction opposite to the arrow ZA direction. Along with this, the movable member 152R moves in the direction opposite to the arrow ZA direction by the action of the urging member 153. However, the spacer 151R still maintains the separation holding position, and the developing unit 109 also maintains the separation position.

[Detailed Description of Spacer L]

Figure 28:
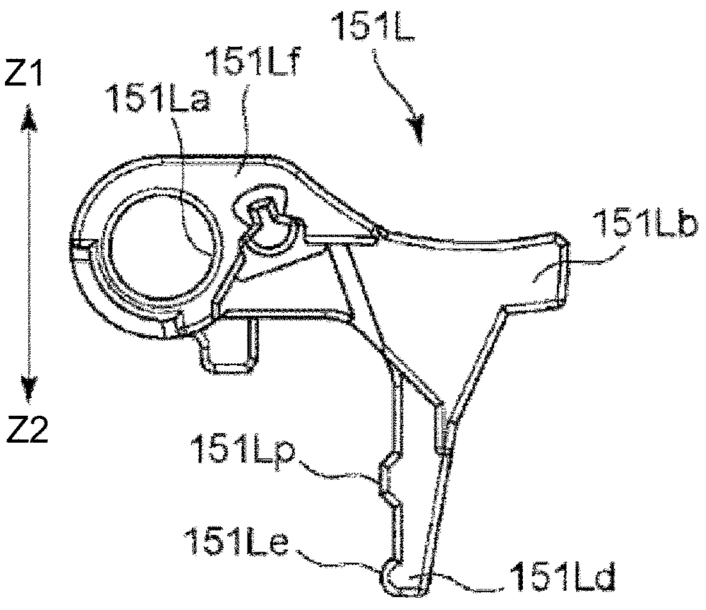
FIG. 28 is an illustration of a spacer.
Figure 28:
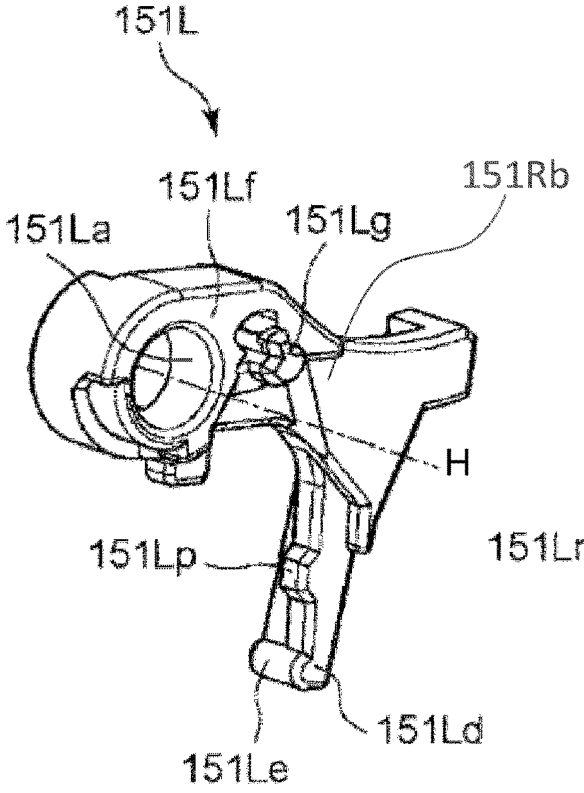
Figure 28:
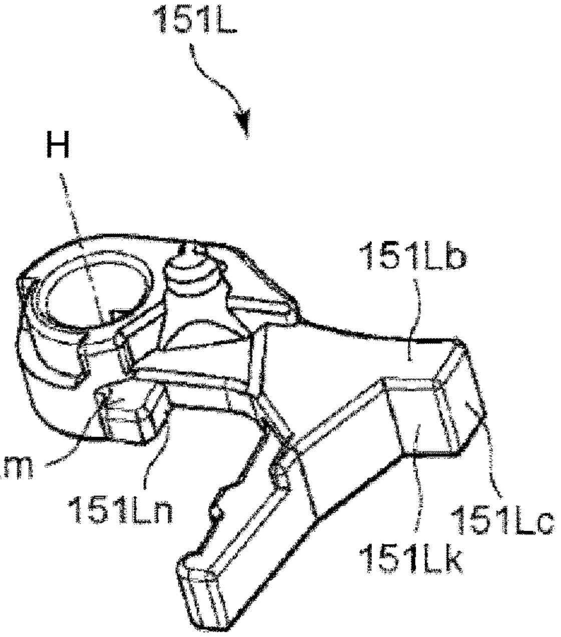

Here, the spacer 151L will be described in detail referring to FIG. 28. Part (a) of FIG. 28 is a front view of the spacer 151L of as viewed in the longitudinal direction of the drive-side of the process cartridge 100, and part (b) of FIG. 28 and part (c) of FIG. 28 are perspective views of the spacer 151L per se. The spacer 151L is provided with the annular supported portion 151La, and is provided with a separation holding portion (holding portion) 151Lb projecting from the supported portion 151La in the radial direction of the supported portion 151La. The free end of the separation holding portion 151Lb has an arc-shaped contact surface (contact portion) 151Lc centered on the swing shaft H of the spacer 151L. The swing shaft H of the spacer 151L is the same as the swing shaft H of the spacer 151R.

The separation holding portion (holding portion) 151Lb is a portion which connects the supported portion 151La and the contact surface 151Lc with each other, and is sandwiched between the drum unit 108 and the developing unit 109 and has sufficient rigidity to maintain the separating position.

Further, the spacer 151L has a restricted surface (restricted portion) 151Lk adjacent to the contact surface 151Lc. Further, the spacer 151L has a restricted portion 151Ld projecting in the Z2 direction from the supported portion 151La, and has an arc-shaped pressed portion 151Le (at-contact pressed portion) projecting from the restricted portion 151Ld in the direction of the swing axis H of the supported portion 151La.

Further, the spacer 151L has a main body portion 151Lf connected to the supported portion 151La, and the main body portion 151Lf is provided with a spring-hooked portion 151Lg projecting in the swing axis H direction of the supported portion 151La. Further, the main body portion 151Lf has a rotation prevention portion 151*m* projecting in the Z2 direction, and a rotation prevention surface 151Ln is provided in a direction opposing the pressed portion 151Le.

[Detailed Description of Movable Member L]

Figure 29:
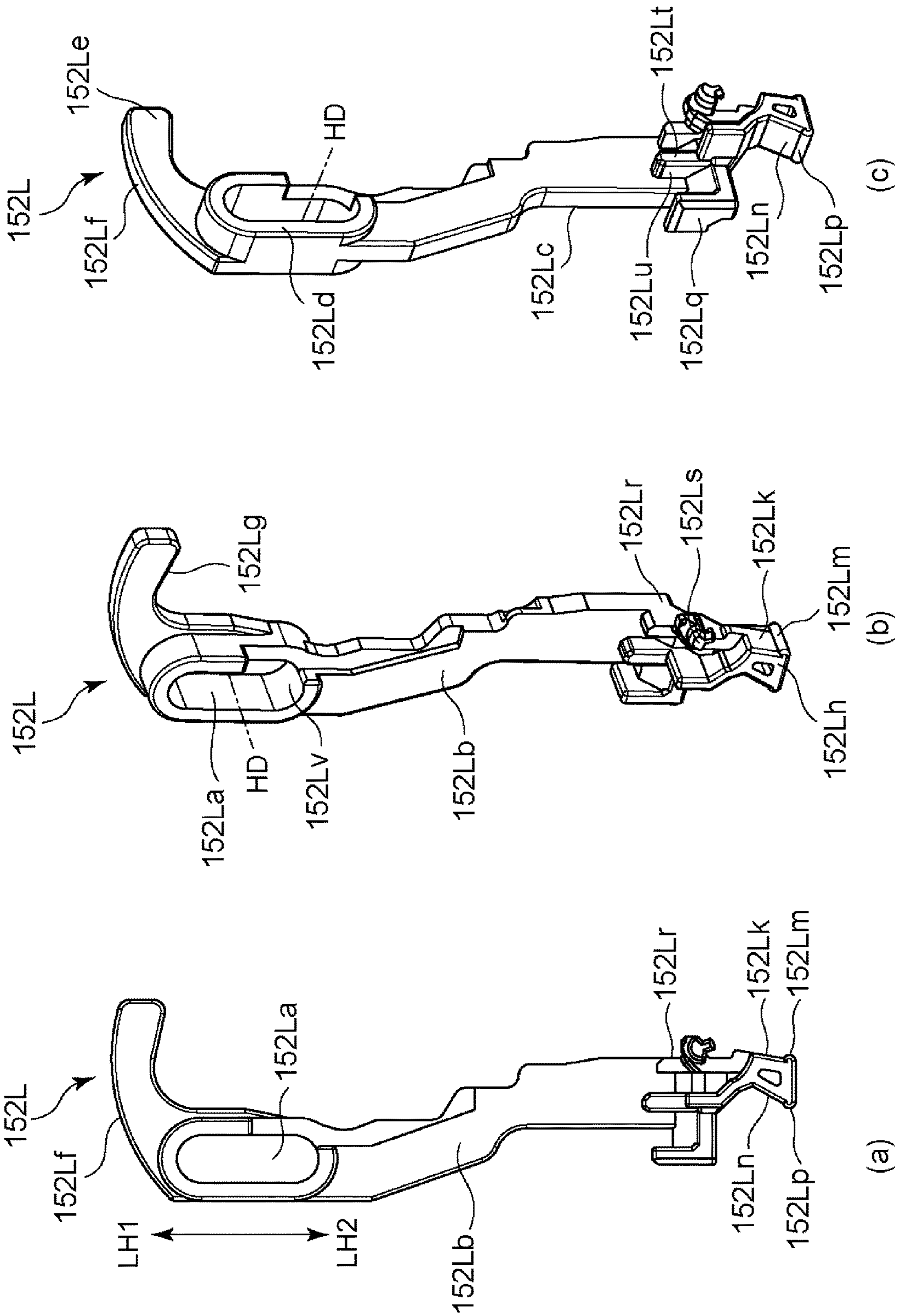
FIG. 29 is an illustration of a movable member.

Here, referring to FIG. 29, the movable member 152L will be described in detail. Part (a) of FIG. 29 is a front view of the movable member 152L per se as viewed from the longitudinal direction of the process cartridge 100, and part (b) of FIG. 29 and part (c) of FIG. 29 are perspective views of the movable member 152L.

The movable member 152L is provided with the oblong supported portion 152La. Here, the longitudinal direction of the oblong shape of the oblong supported portion 152La is referred to as an arrow LH, the upward direction is referred to as an arrow LH1, and the downward direction is referred to as an arrow LH2. Further, the direction in which the oblong supported portion 152La is formed is defined as HD. The movable member 152L is provided with the projecting portion (force receiving portion) 152Lh formed on the downstream side, in the arrow LH2 direction, of the oblong supported portion 152La. The oblong supported portion 152La and the projecting portion 152Lh are connected with each other by the main body portion 152Lb. On the other hand, the movable member 152L is provided with a pressed portion 152Le projecting in the direction substantially perpendicular to the direction of arrow LH1, and an arc-shaped pressed surface (moving force receiving portion, operating force receiving portion) 152Lf at a position downstream in the arrow LH1 direction, a push-restricting surface 152Lg on the upstream side. Further, the movable member 152L has a first restricted surface (first restricted portion) 152Lv which is a portion of the oblong supported portion 152La and which is located on the downstream side in the arrow LH2 direction.

The projecting portion 152Lh is a first force receiving portion (retracting force receiving portion, separating force receiving portion) 152Lk and a second force receiving portion (contact force receiving portion) 152Ln which are provided opposed to each other in a direction substantially perpendicular to the arrow LH2 direction, at the end in the arrow LH2 direction. The first force receiving portion 152Lk and the second force receiving portion 152Ln are provided with a first force receiving surface (retracting force receiving surface, a separating force receiving surface) 152Lm and a second force receiving surface (contact force receiving surface) 152L Page which extend in the HD direction and which have arc shapes, respectively. Further, the projecting portion 152Lh is provided with a spring-hooked portion 152Ls projecting in the HB direction and a locking portion 152Lt, and the locking portion 152Lt is provided with a locking surface 152Lu facing in the same direction as the second force receiving surface 152Lp.

Further, the movable member 152L is a part of the main body portion 152Lb, is disposed on the upstream side in the arrow LH2 direction from the second force receiving portion 152Ln, and has a developing frame pressing surface (developing frame pressing portion, at-separation pressing portion) 152Lq facing in the same direction as the second force receiving surface 152Lp. Further, the movable member 152L is a part of the main body portion 152Lb and is disposed on the upstream side in the arrow LH2 direction from the first force receiving portion 152Lk, and has a spacer pressing surface (spacer portion pressing portion, at-contact pressing portion) 152Lr facing in the same direction as the first force receiving surface 152Lm.

When the process cartridge 100 is mounted on the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembly of Separation/Contact Mechanism 150L]

Figure 30:
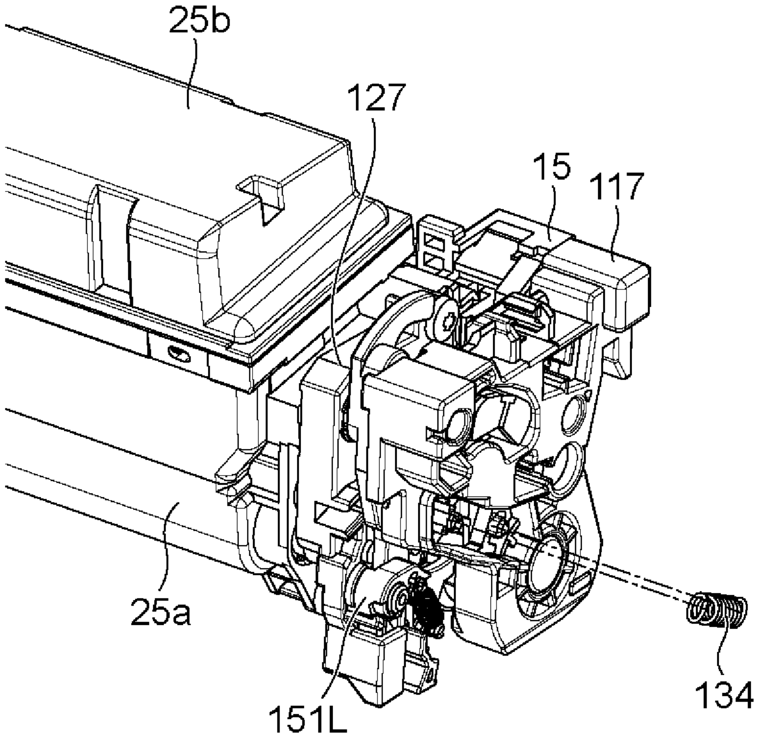
FIG. 30 is a perspective view of the process cartridge.
Figure 30:
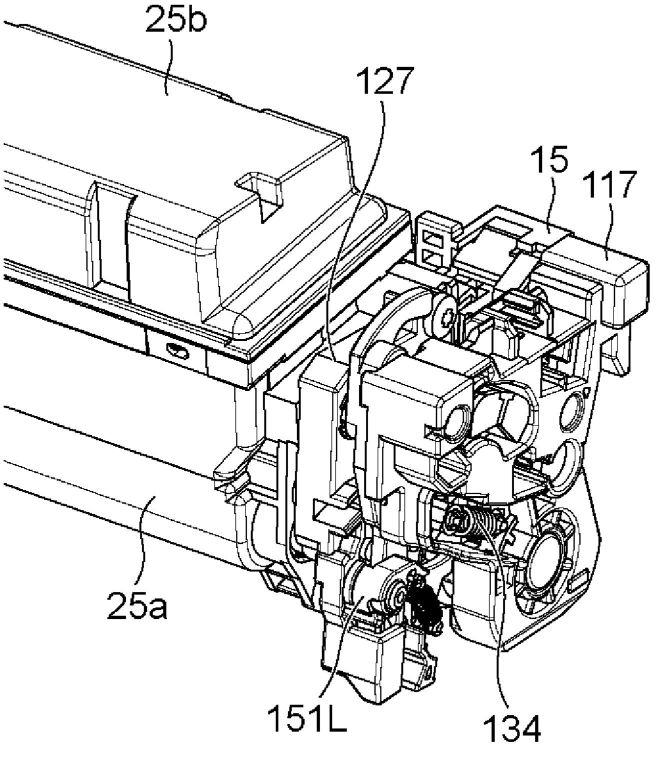

Next, referring to FIGS. 16 and 29 to 35 the assembling of the separation mechanism will be described. FIG. 30 is a perspective view of the process cartridge 100 after the spacer 151L is assembled thereto as viewed from the drive-side. As described above, as shown in FIG. 16, the developing unit 109 is supported so as to rotatable relative to the photosensitive drum 104 about the swing axis K by fitting the outer diameter portion of the cylindrical portion 127*a* into the developing unit supporting hole portion 117*a*. Further, the non-drive-side bearing 127 is provided with a first cylindrical support portion 127*b* and a second cylindrical support portion 127*e* projecting in the direction of the swing axis K.

The outer diameter of the first supporting portion 127*b* fits with the inner diameter of the supported portion 151La of the spacer 151L, and the spacer 151L is rotatably supported. Here, the swing axis of the spacer 151L assembled to the non-drive-side bearing 127 is the swing axis H. The non-drive-side bearing 127 is provided with a first retaining portion 127*c* projecting in the direction of the swing axis H. As shown in FIG. 16, the movement of the spacer 151L assembled to the non-drive-side bearing 127 in the swing axis H direction is restricted by the contact of the first retaining portion 127*c* with the spacer 151L.

Further, the outer diameter of the second supporting portion 127*e* fits with the inner wall of the oblong supported portion 152La of the movable member 152L, and supports the movable member 152L so as to be rotatable and movable in the oblong direction. Here, the swing axis of the movable member 152L assembled to the non-drive-side bearing 127 is referred to as the movable member swing axis HC. As shown in FIG. 16, the movement of the movable member 152L assembled to the non-drive-side bearing 127 in the movable member swing axis HE direction is restricted by the contact of the second retaining portion 127*f* with the spacer 151L.

Figure 31:
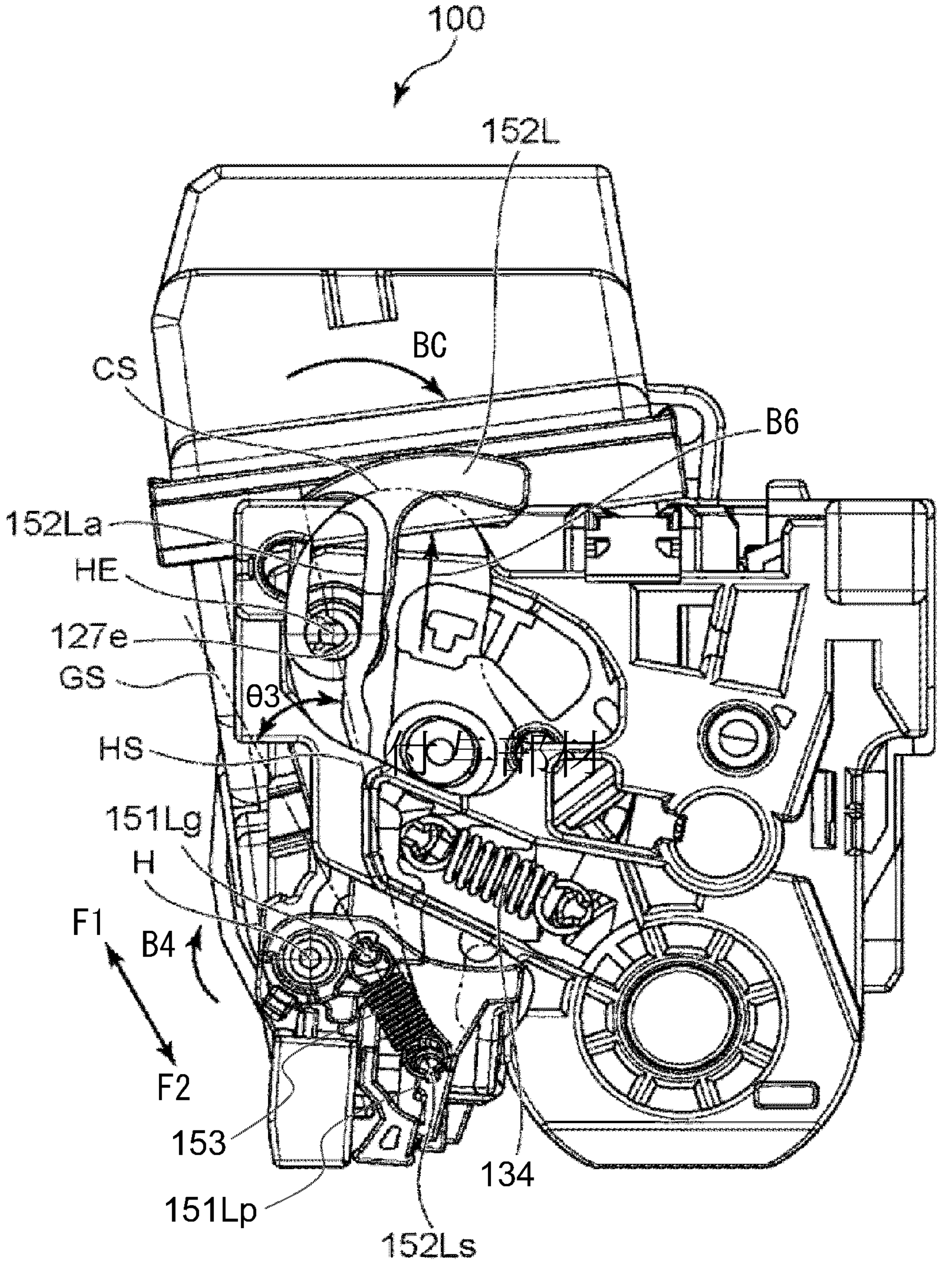
FIG. 31 is a side view (partial sectional view) of the process cartridge.

FIG. 31 is a view of the process cartridge 100 after assembling the spacer 151L as viewed in the developing unit swing axis H direction. It is a cross-sectional view in which a portion of the non-drive-side cartridge cover member 117 is partially omitted by the partial cross-sectional line CS so that the fitting portion between the oblong supported portion 151La of the movable member 152L and the cylindrical portion 127*e* of the non-drive-side bearing 127 can be seen. Here, the separation/contact mechanism 150L is provided with a tension spring 153 as an urging member (holding portion urging member) a spacer portion urging portion (holding portion urging portion) which urges the spacer 151L to rotate in the direction of the arrow B1 about the swing axis H, and provided with a force receiving portion urging portion (projecting portion urging portion) urging the movable member 152L in the B3 direction indicated by the arrow. The tension spring 153 is a coil spring and an elastic member. The arrow B3 direction is a direction substantially parallel to the longitudinal direction LH2 (FIG. 29) of the oblong supported portion 152La of the movable member 152L. The tension spring 153 is engaged and connected to the spring-hooked portion 151Lg provided on the spacer 151L and the spring-hooked portion 152Ls provided on the movable member 152L, and is assembled between them. The tension spring 153 applies a force to the spring-hooked portion 151Lg of the spacer 151L in the direction of arrow F2 in FIG. 31 to impart an urging force to rotate the spacer 151L in the direction of arrow B1. Further, the tension spring applies a force to the spring-hooked portion 152Ls of the movable member 152L in the direction of the arrow F1 to move the movable member 152L in the direction of the arrow B3 (direction toward the accommodating position (reference position, stand-by position).

A line GS connects the spring-hooked portion 151Lg of the spacer 151L and the spring-hooked portion 152Ls of the force holding member 152L, and a line HS connects the spring-hooked portion 152Ls of the movable member 152L and the movable member swinging axis HE. Then, an angle θ3 formed by the line GS and the line HS is set so as to satisfy the following equation (3) with the counterclockwise direction being positive about the spring-hooked portion 152Ls of the movable member 152L. By this, the movable member 152L is urged to rotate in the BA direction in the drawing with the movable member swinging axis HE as the center of rotation.

$$0^\circ \leq \theta 3 \leq 90^\circ \quad (3)$$

As shown in FIG. 29, the spacer 151L and the movable member 152L are mounted to the spacer on the side (longitudinal outside) of the non-drive side bearing 127 on which the non-driving cartridge cover member 117 is arranged in the direction of the swing axis K. However, the positions to be arranged are not limited to this example, and they may be arranged on the developing container 125 side (inside in the longitudinal direction) of the non-drive-side bearing 127, respectively, and the spacer 151L and the movable member 152L may be arranged with the non-drive-side bearing interposed therebetween. Further, the order of the arrangement of the spacer 151L and the movable member 152L may be exchanged.

The non-drive-side bearing 127 is fixed to the developing container 125 to form the developing unit 109. As shown in FIG. 16, the fixing method in this embodiment is fixed by a fixing screw 145 and an adhesive (not shown), but the fixing method is not limited to this, and welding such as welding by heating or pouring and hardening of resin may be used.

Figure 32:
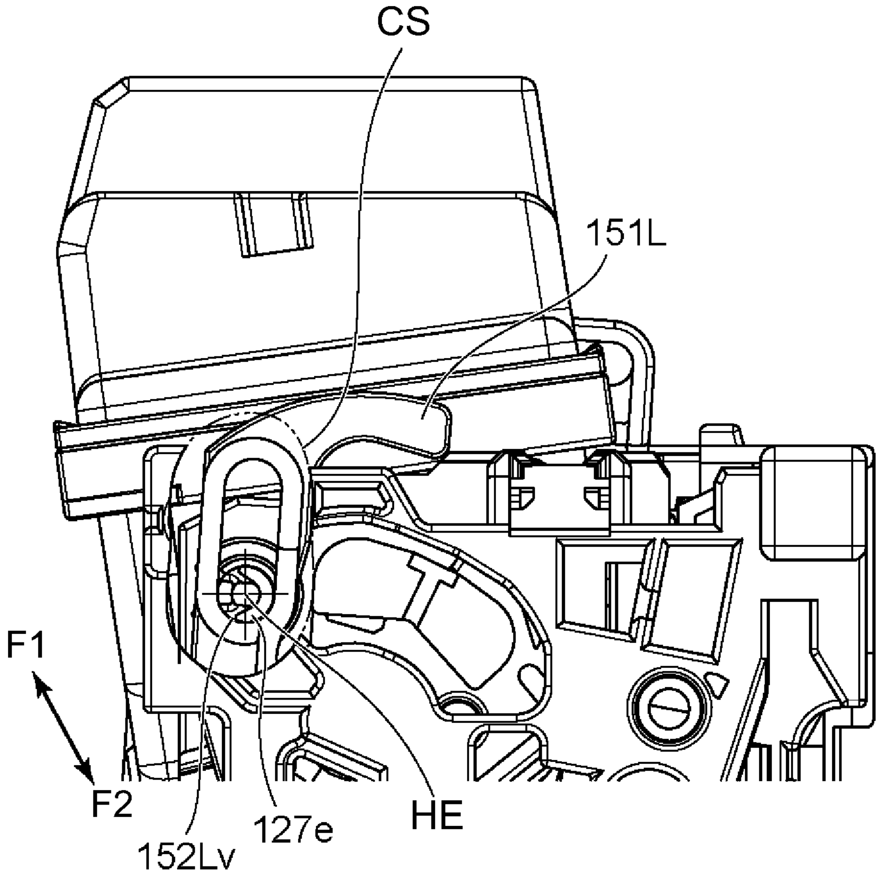
FIG. 32 is a partially enlarged view of the side surface of the process cartridge.
Figure 32:
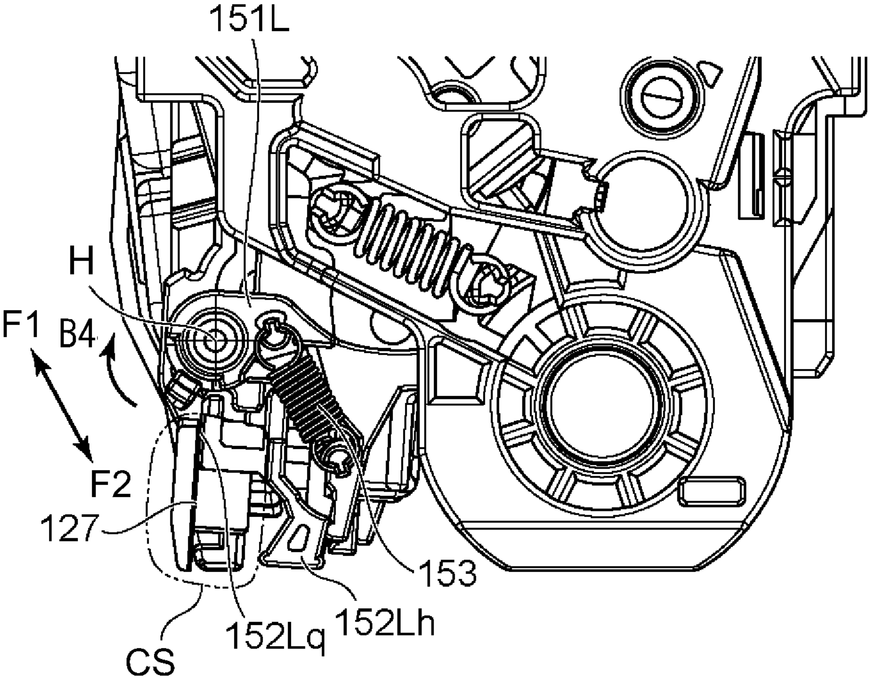

Here, part (a) of FIG. 32 and part (b) of FIG. 32 are enlarged cross-sectional views of the movable member rocking axis HE and the distance holding portion 151L of the movable member 152L in FIG. 31 for better illustration. Further, part (a) of FIG. 32 and part (b) of FIG. 32 are cross-sectional views in which the non-drive-side cartridge cover member 117, the tension spring 153, and the spacer 151L are partially omitted by the partial cross-sectional line CS. In the movable member 152L, the first restricted surface 152Lv of the movable member 152L is brought into contact with the second supporting portion 127*e* of the non-drive-side bearing 127 by the urging force of the tension spring 153 in the arrow F1 direction. Further, as shown in part (b) of FIG. 32, the developing frame pressing surface 152Lq of the movable member 152L is brought into contact with the pressed surface 127*h* of the non-drive-side bearing 127 and is thereby positioned. This position is referred to as a accommodated position of the movable member 152L. The accommodated position can also be referred to as a reference position or a stand-by position. Further, the spacer 151L is rotated in the direction of the arrow B4 about the swing axis H by the urging force of the tension spring 153 in the arrow F2 direction, and the contact surface 151Lp of the spacer 151L is positioned by contacting to the spacer pressing surface 152Lr of the movable member 152L. This position is referred to as a separation holding position (restriction position) of the spacer 151L. When the movable member 152L moves to the projecting position which will be described hereinafter, the pressed portion 151Le of the spacer 151L contacts the spacer pressing surface 152Lr of the movable member 152L, so that the movable member 152L can be positioned at the separation holding position.

Figure 33:
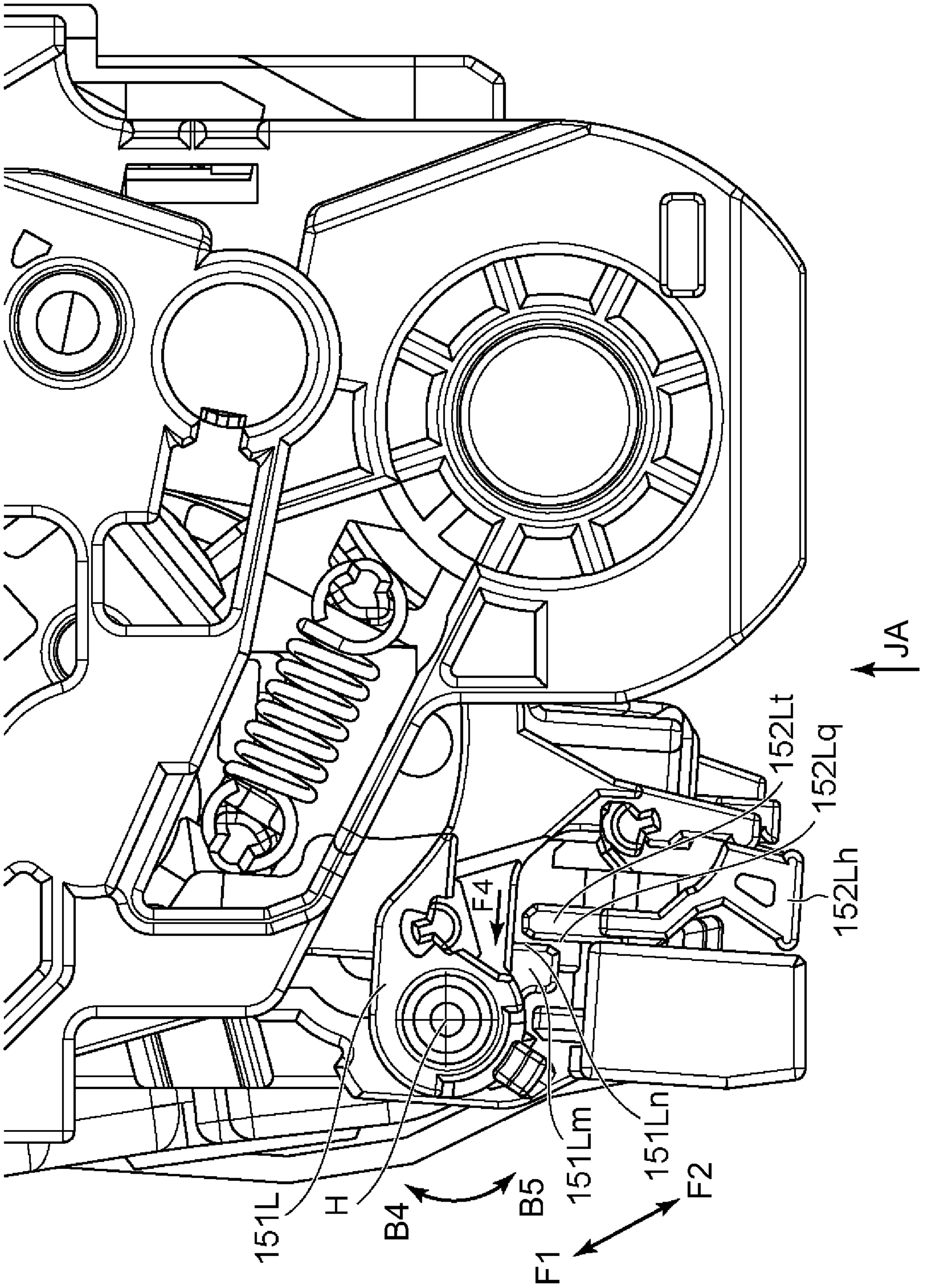
FIG. 33 is a partially enlarged view of the side surface of the process cartridge.

Further, FIG. 33 is an illustration in which the periphery of the separation holding portion 151L in FIG. 31 is enlarged, and the tension spring 153 is omitted, for better illustration. Here, a case is considered in which the process cartridge 100 including the separation/contact mechanism 150L drops in the direction of an arrow JA in FIG. 33 when the process cartridge 100 is transported. At this time, the spacer 151L receives a force of rotating in the direction of arrow B2 due to its own weight about the separation holding swing axis H. When the spacer 151L starts to rotate in the arrow B2 direction for this reason, the rotation prevention surface 151Ln of the spacer 151L comes into contact with the locking surface 152Lu of the movable member 152L, and the spacer 151L receives a force in the arrow F4 direction so as to suppress the rotation in the arrow B2 direction. By this, it is possible to constrain the spacer 151L from rotating in the arrow B2 direction during transportation, and it is possible to prevent impairment of the spaced state between the photosensitive drum 104 and the developing unit 109.

In this embodiment, the tension spring 153 is mentioned as an urging means for urging the spacer 151L to the separation holding position and the movable member 152L to the accommodated position, but the urging means is not limited to this example. For example, a torsion coil spring, a leaf spring, or the like may be used as an urging means to urge the movable member 152L to the accommodated position and the spacer 151L to the separation holding position. Further, the material of the urging means may be metal, a mold, or the like, which has elasticity and can urge the spacer 151L and the movable member 152L.

As described above, the developing unit 109 provided with the separation/contact mechanism 150L is integrally coupled with the drum unit 108 by the non-drive-side cartridge cover member 117 as described above (state of FIG. 30). As shown in FIG. 16, the non-drive-side cartridge cover 117 of this embodiment has the contact surface (contact portion) 117*c*. The contacted surface 117*c* is substantially parallel to the swing axis K. Further, as shown in FIGS. 16 and 30, the contacted surface 117*c* opposes the surface 151Lc of the spacer 151L located at the separation holding position when the non-drive-side cartridge cover member 117 is assembled to the developing unit 109 and the drum unit 108. Here, the process cartridge 100 has a development pressure spring 134 as a developing unit urging member (a second unit urging member) for urging the developing unit 109 from the spaced position toward the contact position to bring the developing roller 106 into contact with the photosensitive drum 104. The development pressure spring 134 is a coil spring assembled between the spring-hooked portion 117*e* of the non-drive-side cartridge cover member 117 and the spring-hooked portion 127*k* of the non-drive-side bearing 127, and is an elastic member. The urging force of the development pressing spring 134 brings the contact surface 151Lc of the spacer 151L into contact with the contacted surface 117*c* of the non-drive-side cartridge cover member 117. Then, when the contacted surface 117*cc* and the contact surface 151Lc come into contact with each other, the attitude of the developing unit 109 is determined with a gap P1 between the developing roller 106 of the developing unit 109 and the photosensitive drum 104. The state in which the developing roller 106 is spaced from the photosensitive drum 104 by the gap P1 by the spacer 151L in this manner is referred to as a separating position (retracted position) of the developing unit 109 (part (a) of FIG. 35.

[Separation State and Contact State of Process Cartridge 100 (Non-Drive-Side)]

Figure 34:
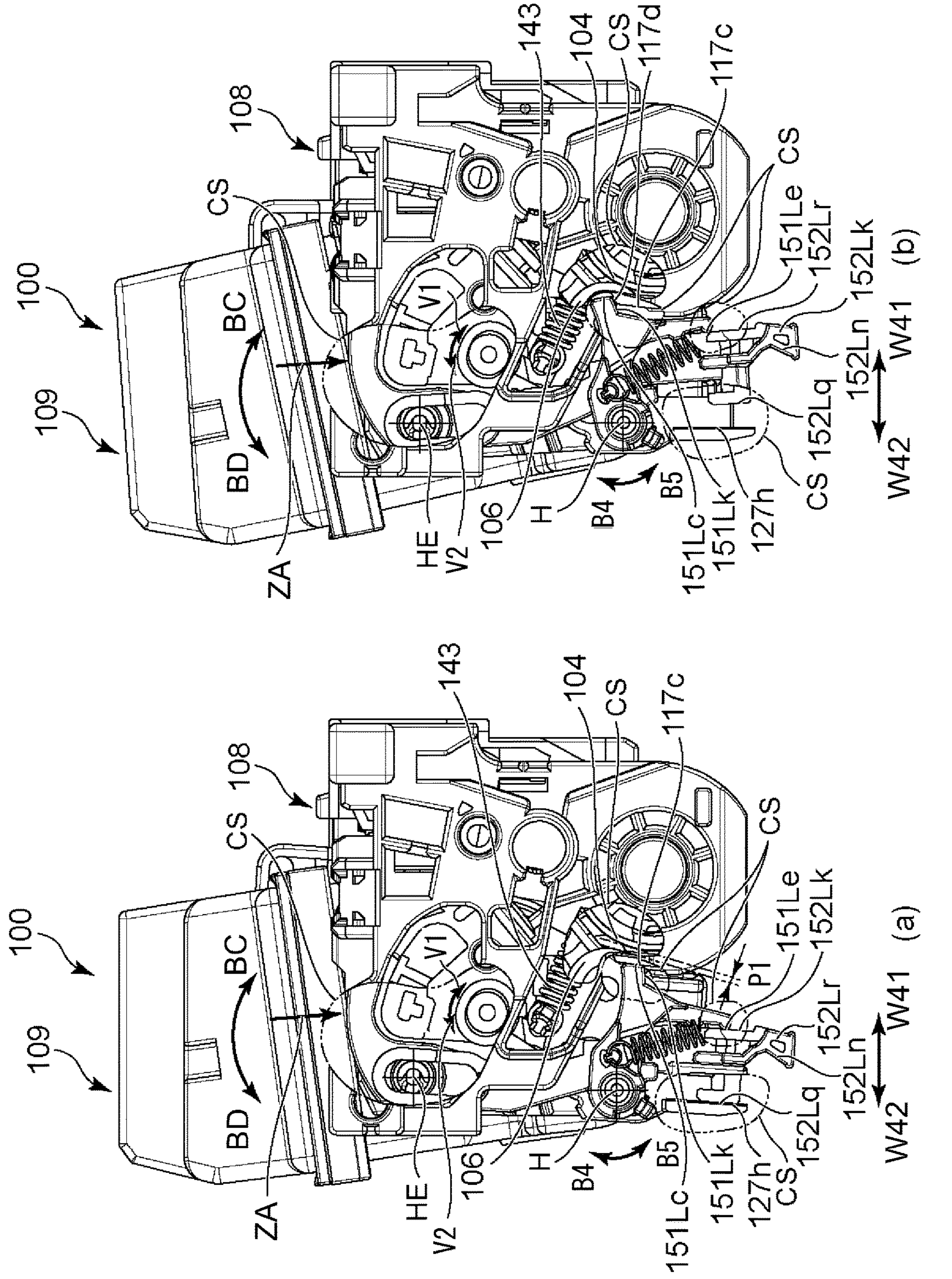
FIG. 34 is a side view (partial sectional view) of the process cartridge.

Here, referring to FIG. 34, the separated state and the contact state of the process cartridge 100 will be described in detail. FIG. 34 is a side view of the process cartridge 100 as viewed from the non-drive-side with the process cartridge 100 mounted inside the image forming apparatus main assembly 170. Part (a) of FIG. 34 shows a state in which the developing unit is separated from the photosensitive drum 104. Part (b) of FIG. 34 shows a state in which the developing unit 109 is in contact with the photosensitive drum 104.

First, the description will be made as to the state in which the spacer 151L is located at the separation holding position (first position) and the developing unit 109 is placed at the separation position (retracted position) will be described. In this state, the supported portion 151La, which is one end of the separation holding portion 151Lb, is in contact with the first supporting portion 127*b* of the non-drive-side bearing 127, and the contact portion 151Lc, which is the other end, is in contact with the contacted surface 117*c* of the non-drive-side cartridge cover 117. Further, the first supporting portion 127*b* is pressed toward the supported portion 151La by the action of the development pressure spring 134, and the contact portion 151Lc is pressed toward the contacted surface 117*c*. Therefore, in this state, the non-drive-side cartridge cover member 117 (which constitutes a portion of the drum unit 108) determines the position of the non-drive-side bearing 127 (which constitutes a portion of the developing unit 109) by way of the separation holding portion 151Lb of the spacer 151L.

From this state, the pressed portion 152Le of the movable member 152L is pushed in the direction of arrow ZA. By this, the movable member 152L and the projecting portion 152Lh move linearly from the stand-by position in the ZA direction (operating direction) to reach the projecting position. The ZA direction is a direction which intersects (orthogonally in this embodiment) the rotation axis M2 of the developing roller 109, the rotation axis M1 of the photosensitive drum 108, and the swing axis HE. Therefore, the projecting portion 152Lh at the time when it is in the projecting position is placed downstream in the ZA direction from the projecting portion 152Lh when it is in the stand-by position. Therefore, the projecting portion 152Lh when it is in the projecting position is placed more remote from the swing axis K than the projecting portion 152Lh when it is in the stand-by position. Further, the projecting portion 152Lh when it is at the projecting position projects in the ZA direction beyond the drum frame and the developing frame (placed downstream in the ZA direction). In this embodiment, the drum frame includes the first drum frame portion 115, the drive-side cartridge cover member 116, and the non-drive-side cartridge cover member 117, and the developing frame includes the developing container 125, the drive-side bearing 126, and the non-drive-side bearing 127. The projecting position can also be referred to as a force receiving position or an operating position.

The movable member 152L is movable in the ZA direction and the opposite direction while maintaining the state in which the spacer 151L is in the separation holding position (first position). Therefore, also when the movable member 152L and the projecting portion 152Lh are in the operating positions, the spacer 151L is in the separation holding position (first position). The pressed portion 151Le of the spacer 151L is in contact with the spacer pressing surface 152Lr of the movable member 152L by the tension spring 153 as described above. Therefore, when the second force receiving portion 152Ln (second force receiving surface 152Lp) is pressed in the direction of the arrow W42, the movable member 152L rotates in the direction of the arrow BD about the movable member swing axis HE, so that the spacer pressing surface 152Lr urges the pressed portion 151Le, the spacer 151L is rotated in the direction of arrow B5. When the spacer 151L rotates in the direction of arrow B5, the contact surface 151Lc separates from the contacted surface 117*c*, and the developing unit 109 becomes rotatable in the direction of arrow V2 about the swing axis K from the spaced position. That is, the developing unit 109 rotates in the V2 direction from the spaced position, and the developing roller 106 of the developing unit comes into contact with the photosensitive drum 104. Here, the position of the developing unit 109 in which the developing roller 106 and the photosensitive drum 104 contact with each other is referred to as a contact position (development position) (state in part (b) of FIG. 34. The position where the contact surface 151Lc of the spacer 151L is separated from the contacted surface 117*c* is referred to as a separation release position (permission position, second position). When the developing unit 109 is placed at the contact position, the restriction surface 151Lk of the spacer 151L contacts the spacer restriction surface (spacer portion restriction portion) 117*d* of the drive-side cartridge cover 116, so that the spacer 151L is maintained at the separation release position.

Further, the non-drive-side bearing 127 of this embodiment is provided with a pressed surface (pressed portion at the time of separation) 127*h* which is a surface perpendicular to the swing axis K. The non-drive-side bearing 127 is fixed to the developing unit 109. Therefore, when the first force receiving portion 152Lk (first force receiving surface 152Lm) of the movable member 152L is urged in the direction of the arrow 41 while the developing unit 109 is in the contact position, the developing frame pressing surface 152Lq comes into contact with the pressed surface 127*h*. By this, the developing unit 109 rotates about the swing axis K in the direction of the arrow V1 to move to the separated position (state of part (a) of FIG. 34. Here, when the developing unit 109 moves from the contact position to the separated position, the direction in which the pressed surface 127*h* moves is indicated by an arrow W41 in part (a) of FIG. 34 and part (b) of FIG. 34. Further, the direction opposite to the arrow W41 is the arrow W42, and the arrow W41 and the arrow W42 are substantially horizontal directions (X1, X2 directions). The second force receiving surface 152Lp of the movable member 152L assembled to the developing unit 109 as described above is placed on the upstream side of the pressed surface 127*h* of the non-drive-side bearing 127 in the direction of the arrow W41. Further, the pressed surface 127*h* and the pressed portion 151Le of the spacer 151L are placed at positions where at least parts of them overlap in the W1 and W2 directions. The operation of the separation/contact mechanism 150L in the image forming apparatus main assembly 170 will be described hereinafter.

[Mounting of Process Cartridge 100 to Image Forming Apparatus Main Assembly 170 (Non-Drive-Side)]

Figure 35:
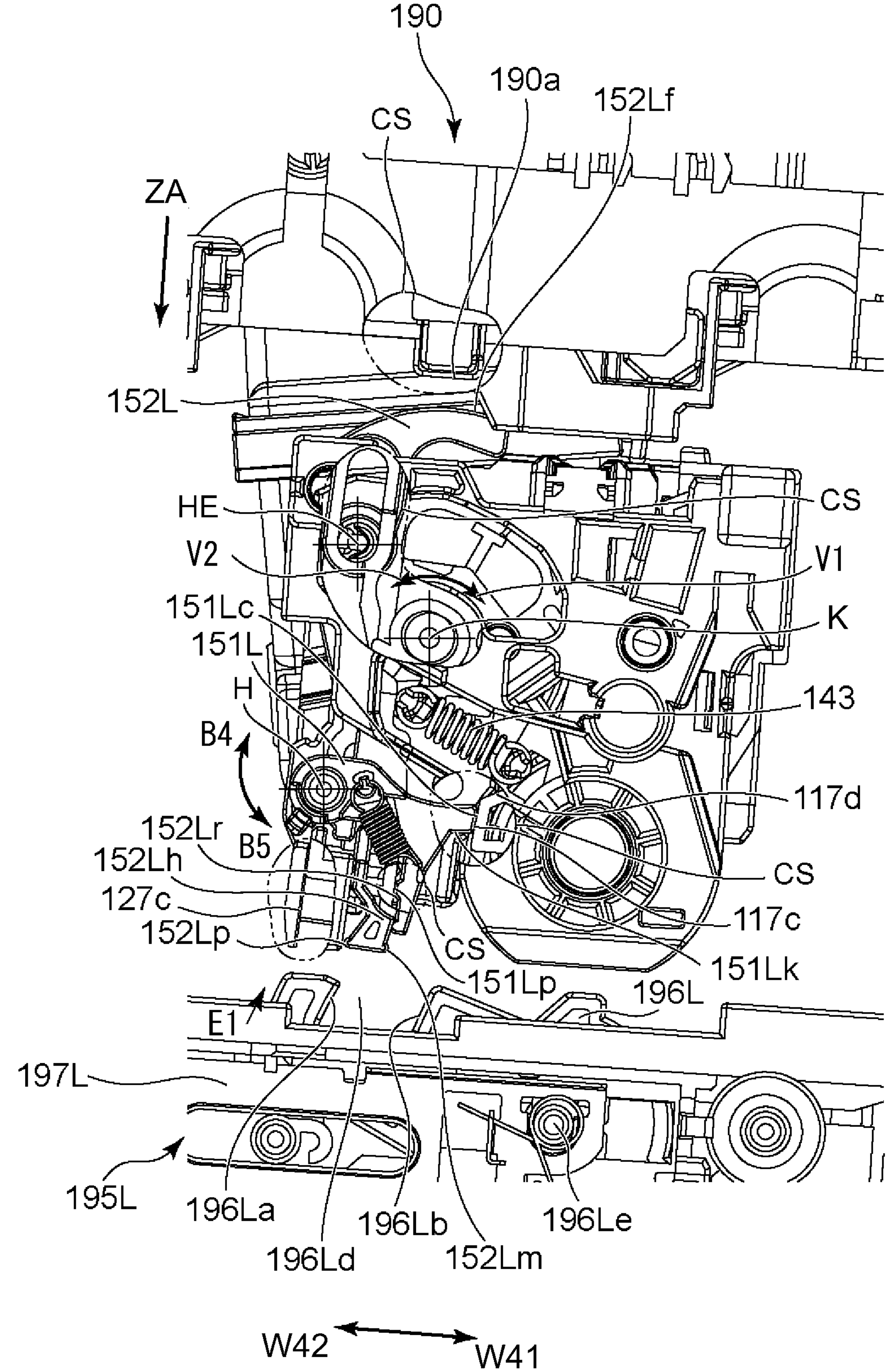
FIG. 35 is a side view (partial sectional view) of the process cartridge in the image forming apparatus main assembly.

Next, referring to FIGS. 35 and 36, the description will be made as to the engaging operation between the separation/contact mechanism 150L of the process cartridge 100 and the development separation control unit 196L of the image forming apparatus main assembly 170 when the process cartridge 100 is mounted in the image forming apparatus main assembly 170. These Figures are cross-sectional views in which a part of the development cover member 128 and a part of the non-drive-side cartridge cover member are omitted by the partial cross-sectional line CS, respectively, for better illustration. FIG. 35 is a view as seen from the drive-side of the process cartridge 100 when the process cartridge 100 is mounted on the cartridge tray 171 (not shown) of the image forming apparatus M and the cartridge tray 171 is inserted to the first mounting position. In FIG. 35, portions other than the process cartridge 100, the cartridge pressing unit 190, and the separation control member 196L are omitted.

As described above, the image forming apparatus main assembly 170 of this embodiment is provided with a separation control member 196L corresponding to each process cartridge 100 as described above. The separation control member 196L is disposed on the lower surface side of the image forming apparatus main assembly 170 with respect to the spacer 151L when the process cartridge 100 is placed at the first inner position and the second inner position. The separation control member 196L has the first force application surface (force applying portion) 196La and the second force application surface (retracting force applying portion) 196Lb which project toward the process cartridge 100 and face each other across the space 196Rd. The first force application surface 196Ra and the second force application surface 196Rb are connected by a connecting portion 196Rc on the lower surface side of the image forming apparatus main assembly 170. Further, the separation control member 196R is supported by the control sheet metal 197 so as to be rotatable about the rotation center 196Re. The separating member 196R is normally urged in the E1 direction by the urging spring. Further, the control sheet metal 197 is structured to be movable in the W41 and W42 directions by a control mechanism (not shown), so that the separation control member 196R is movable in the W41 and W42 directions.

The cartridge pressing unit 191 lowers in the direction of arrow ZA in interrelation with the transition of the front door 11 of the image forming apparatus main assembly 170 from the open state to the closed state, as described above, and the first force applying portion 191*a* is brought into contact with the pressed surface 152Lf of the movable member 152L. Thereafter, when the cartridge pressing unit 191 is lowered to a predetermined position which is the second mounting position, the portion 152Lh of the movable member 152L moves to a projecting position where it projects downward of the process cartridge 100 in the Z2 direction (state in FIG. 36). When this operation is completed, the gap T4 is formed between the first force application surface 196La of the separation control member 196L and the second force receiving surface 152Lp of the movable member 152L, and the gap T3 is formed between the second force application surface 196Lb and the first force receiving surface 152Lm, as shown in FIG. 36. Then, it is placed at the second mounting position where the separation control member 196L does not act on the movable member 152L. This position of the separation control member 196L is referred to as a home position. At this time, the second force receiving surface 152Lp of the movable member 152L and the first force application surface 196La of the separation control member 196L are arranged so as to partially overlap in the W1 and W2 directions. Similarly, the first force receiving surface 152Lm of the movable member 152L and the second force application surface 196Lb of the separation control member 196L are arranged so as to partially overlap in the W1 and W2 directions.

[Contact Operation of Developing Unit (Non-Drive-Side)]

Next, referring to FIGS. 36 to 38, the description will be made as to the operation in which the photosensitive drum 104 and the developing roller 106 are brought into contact with each other by the separation/contact mechanism 150L. For better illustration, a part of the development cover member 128, a part of the non-drive-side cartridge cover member 117, and a part of the non-drive-side bearing 127 are omitted by the partial cross-sectional line CS, respectively in the sectional view.

As described above, the development coupling 32 receives a driving force from the image forming apparatus main assembly 170 in the direction of arrow V2 in FIG. 24, and the developing roller 106 rotates. That is, the developing unit 109 including the development coupling 32 receives the driving torque in the arrow V2 direction about the swing axis K from the image forming apparatus main assembly 170. Further, the developing unit 109 also receives an urging force in the arrow V2 direction due to the urging force of the development pressure spring 134 described above. As shown in FIG. 36, a state in which the developing unit 109 is in the separated position and the spacer 151L is in the separation holding position (first position) will be described. In this state, even if the developing unit 109 receives this driving torque and the urging force of the development pressure spring 134, the contact surface 151Lc of the spacer 151L contacts the contacted surface 117*c* of the non-drive-side cartridge cover member 117. Therefore, the attitude of the developing unit 109 is maintained in the separated position.

Figure 36:
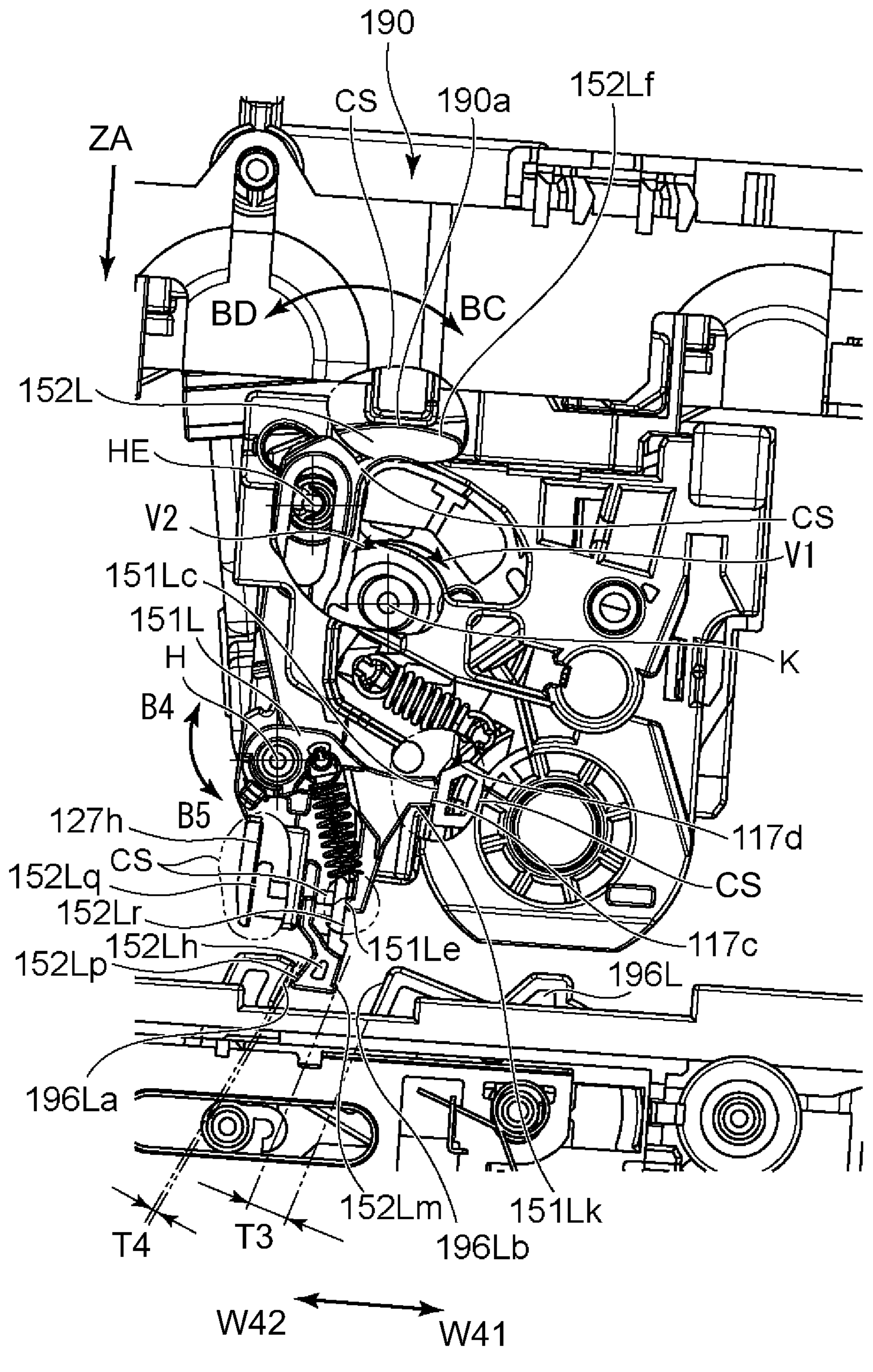
FIG. 36 is a side view (partial sectional view) of the process cartridge in the image forming apparatus main assembly.
Figure 37:
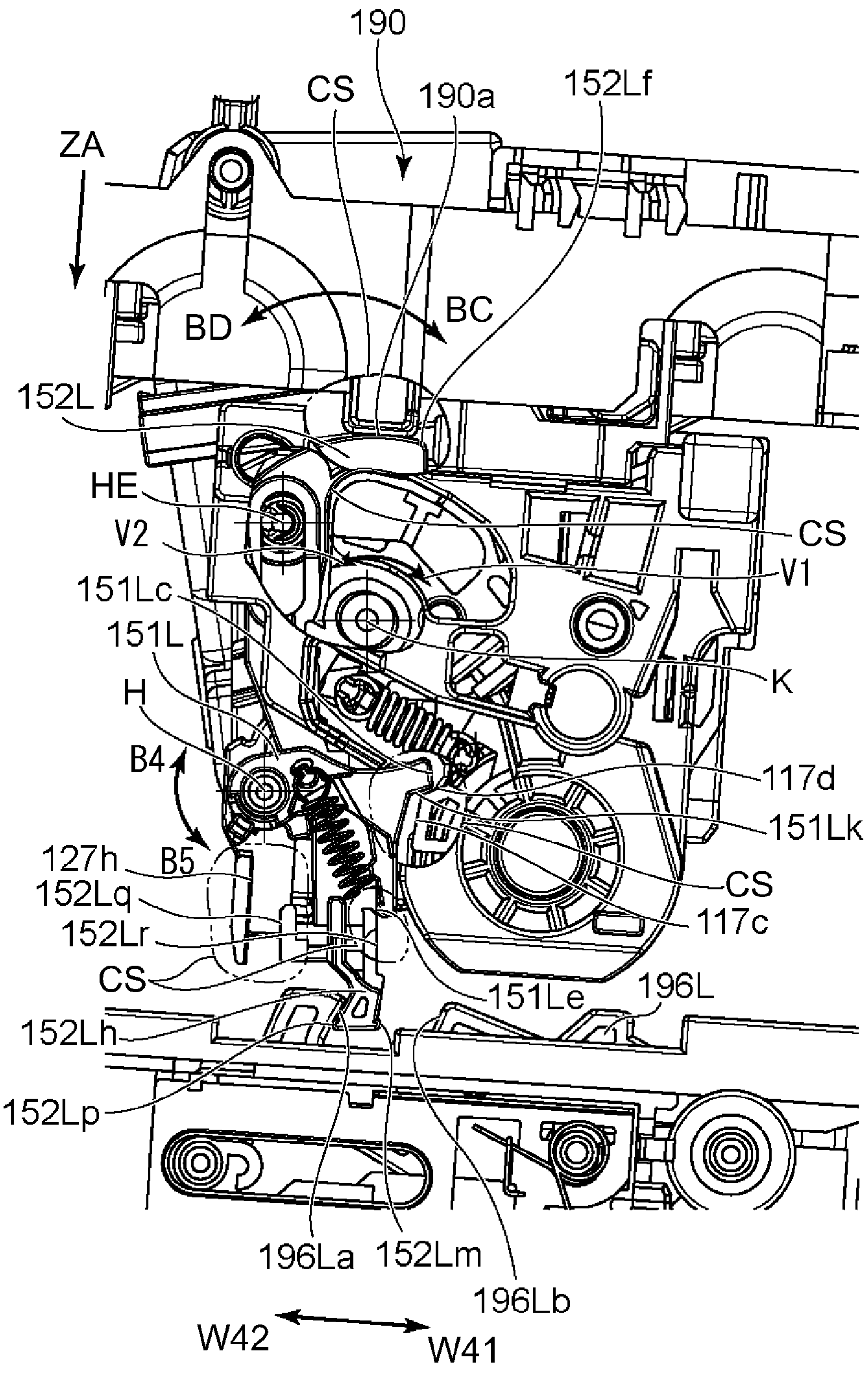
FIG. 37 is a side view (partial sectional view) of the process cartridge in the image forming apparatus main assembly.

The separation control member 196L of this embodiment is structured to be movable from the home position in the direction of arrow W41 in FIG. 36. When the separation control member 196L moves in the W41 direction, the first force application surface 196La of the separation control member 196L and the second force receiving surface 152Lp of the second force receiving portion 152Ln of the movable member 152L come into contact with each other, and the movable member 152L rotates in the BD direction about the swing axis HD. The contact between the first force application surface 196La and the second force receiving surface 152Lp is not necessarily surface contact, and may be line contact or point contact. In this manner, the first force application surface 196La applies a contact force to the second force receiving surface 152Lp by moving in the W41 direction. The moving direction of the projecting portion 152Lh when the movable member 152L is rotated in the BD direction is referred to as the first direction. Further, as the movable member 152L rotates, while the spacer pressing surface 152Lr of the movable member 152L is in contact with the pressed portion 151Le of the spacer 151L, the spacer 151L is rotated in the B5 direction. Then, the spacer 151L is rotated by the movable member 152L to the separation release position (second position) where the contact surface 151Lc and the contacted surface 117*c* are spaced from each other. Here, the position of the separation control member 196L for moving the spacer 151L to the separation release position (second position) shown in FIG. 37 is referred to as a first position.

When the spacer 151L is moved to the separation release position by the separation control member 196L in this manner, the developing unit 109 rotates in the V2 direction by the driving torque received from the image forming apparatus main assembly 170 and the urging force of the development pressure spring 134. By this, the developing unit 109 moves to the contact position where the developing roller 106 and the photosensitive drum 104 contact each other (state in FIG. 37). At this time, the spacer 151L urged in the direction of arrow B4 by the tension spring 153 is maintained at the separation release position (second position) by the contact of the restricted surface 151Lk with the spacer restriction surface 117*d* of the non-drive-side cartridge cover member 117. Thereafter, the separation control member 196L moves in the direction of W42 and returns to the home position. At this time, the movable member 152L is rotated in the BC direction by the tension spring 153, to establish the state in which the developing frame pressing surface 152Lq of the movable member 152L and the pressed surface 127*h* of the non-drive-side bearing 127 are in contact with each other (state of FIG. 38). At this time, it can be said that the movable member 152L and the projecting portion 152Lh are in the operating positions.

By this, the above-mentioned gaps T3 and T4 are formed again, and the separation control member 196L is placed at the position where it does not act on the movable member 152L. The transition from the state of FIG. 37 to the state of FIG. 38 is performed without a delay. The position of the separation control member 196L in FIG. 38 is the same as that in FIG. 36.

Further, in the above description, it is assumed that the second force receiving surface 152Lp is subjected to the contact force from the first force application surface 196La. In this regard, the contact force is a force applied from the first force application surface 196La moving in the W41 direction, and this is a force applied to the process cartridge 100 to move it in a direction (contact direction, approaching direction, or V2 direction) in which the developing roller 106 comes closer and contacts to the photosensitive drum 104. Therefore, it is sufficient if the developing unit 109 moves from the retracted position to the developing position triggered by receiving the contact force, and it is not necessary that the process cartridge continues to receive the contact force until the developing unit 109 reaches the developing position. As described above, it is unnecessary that when the developing unit shifts from the retracted position to the developing position by the contact force, the developing roller 106 and the photosensitive drum 104 are in contact with each other at the developing position.

As described above, in the structure of this embodiment, the separation control member 196L moves from the home position to the first position to apply a contact force to the movable member 152L, rotate the movable member 152L, and hold the spacer 151L in the separation holding position. It can be moved from the (first position) to the separation release position (second position). By doing so, it is possible for the developing unit 109 to move from the separated position to the contacting position where the developing roller 9 and the photosensitive drum 104 come into contact with each other. That is, it can be said that the contact force applied from the separation control member 196L is transmitted to the spacer 151L by way of the movable member 152L, so that the developing unit 109 moves from the separated position (retract position) to the contact position (development position).

In the state that the developing unit 109 is in the contact position (development position), the position of the developing unit 109 relative to the drum unit 108 is determined by the developing unit 109 being urged in the V2 direction by the driving torque received from the image forming apparatus main assembly 170 and the development pressure spring 134 by which the developing roller 106 is in contact with the photosensitive drum 104. Therefore, the photosensitive drum 104 can be said to be a positioning portion (second positioning portion) for positioning the developing roller 6 of the developing unit 109 at the developing position. At this time, it can be said that the developing unit 109 is stably held by the drum unit 108. At this time, the spacer 151L in the separation release position is not directly contributable to the positioning of the developing unit 109. However, it can be said that the spacer 151L creates the situation in which the drum unit 108 can stably hold the developing unit 109 at the contact position (development position) by moving from the separation holding position to the separation release position.

Further, when the front door 11 of the image forming apparatus main assembly 170 shifts from the closed state to the open state in this state, the first force applying portion 190*a* rises in the direction opposite to the arrow ZA direction. Along with this, the movable member 152R moves in the direction opposite to the arrow ZA direction by the action of the urging member 153. However, the spacer 151R still maintains the separation release position, and the developing unit 109 also maintains the developing position.

[Separation Operation of Developing Unit (Non-Drive-Side)]

Figure 39:
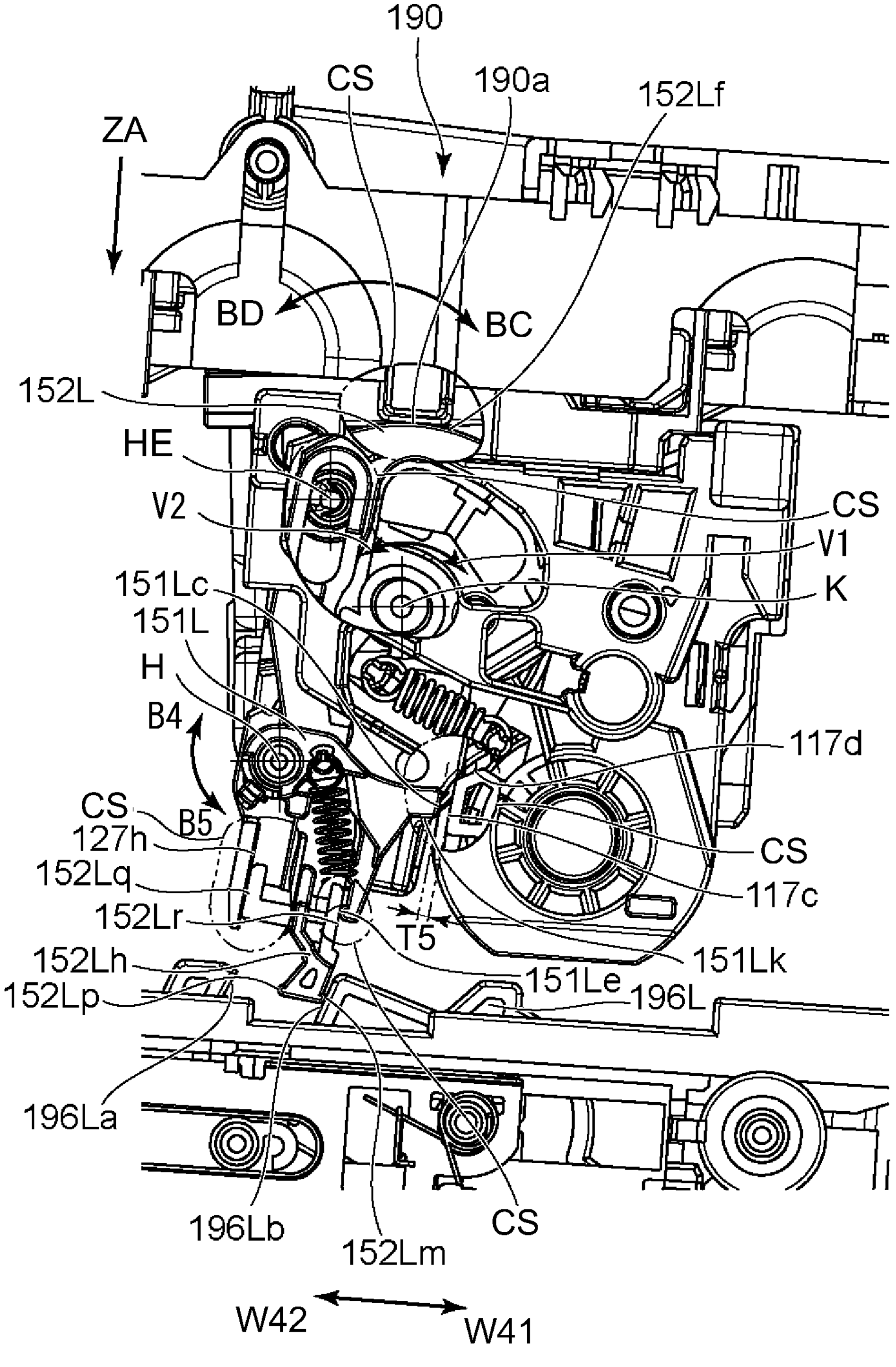
FIG. 39 is a side view (partial sectional view) of the process cartridge in the image forming apparatus main assembly.

Referring to FIGS. 38 and 39, the operation of moving the developing unit 109 from the contact position to the separation position will be described in detail. FIG. 39 is a cross-section in which a part of the development cover member 128, a part of the non-drive-side cartridge cover member 117, and a part of the non-drive-side bearing are partially omitted by the partial cross-section line CS, respectively.

As described above, in the state shown in FIG. 38, it can be said that the movable member 152L and the projecting portion 152Lh are in the operating position. The separation control member 196L in this embodiment is structured to be movable from the home position in the direction of arrow W42 in FIG. 38. When the separation control member 196L moves in the W42 direction, the second force application surface 196Lb and the first force receiving surface 152Lm of the first force receiving portion 152Lk of the movable member 152L are brought into contact with each other, and the movable member swings 152L about the swing axis HD in the direction of arrow BC. The contact between the second force application surface 196Lb and the first force receiving surface 152Lm is not necessarily surface contact, and may be line contact or point contact. In this manner, the second force application surface 196Lb applies a separating force (retracting force) to the first force receiving surface 152Lm. The moving direction of the projecting portion 152Lh when the movable member 152L is rotated in the BC direction is referred to as a second direction. Since the developing frame pressing surface 152Lq of the movable member 152L is in contact with the pressed surface 127*h* of the non-drive-side bearing 127, the developing unit 109 rotates from the contact position in the arrow V1 direction about the swing axis K (state in FIG. 39). At this time, the pressed surface 152Lf of the movable member 152L has an arc shape, and the center of the arc is positioned so as to be the same as the swing axis K.

By this, when the developing unit 109 moves from the contact position to the separating position, the force received by the pressed surface 152Lf of the movable member 152L from the cartridge pressing unit 191 is directed in the swing axis K direction. Therefore, the developing unit 109 can be operated so as not to hinder the rotation in the arrow V1 direction. In the spacer 151L, the restricted surface 151Lk of the spacer 151L and the spacer restriction surface 117*d* of the non-drive-side cartridge cover member 117 are separated from each other, and the spacer 151L rotates in the arrow B4 direction (the direction from the separation release position to the separation holding position) by the urging force of the tension spring 153. By this, the spacer 151L rotates until the pressed portion 151Le contacts to the spacer pressing surface 152LR of the movable member 152L, and by the contacting, it shifts to the separation holding position (first position).

When the developing unit 109 is moved from the contact position to the separation position by the separation control member 196L, and the spacer 151L is located at the separation holding position, a gap T5 is formed between the contact surface 151Lc and the contacted surface 117*c* as shown in FIG. 39. Here, the position where the developing unit 109 is rotated from the contact position toward the separation position, and the spacer 151L can move to the separation holding position is referred to as a second position of the separation control member 196L.

Thereafter, the separation control member 196L moves in the direction of the arrow W41 and returns from the second position to the home position. Then, while the spacer 151L is maintained in the separation holding position, the developing unit 109 rotates in the arrow V2 direction by the driving torque received from the image forming apparatus main assembly and the urging force of the development pressure spring 134, so that the contact surface 151Lc is brought into contact with the contacted surface 117*c*. That is, the developing unit 109 becomes in the state that the separated position is maintained by the spacer 151L, and the developing roller 106 and the photosensitive drum 104 are spaced from each other by the gap P1 (states in FIG. 36 and part (a) of FIG. 34. By this, the above-mentioned gaps T3 and T4 are formed again, and the state is reached in which the separation control member 196L does not act on the movable member 152L (state in FIG. 36). The transition from the state of FIG. 39 to the state of FIG. 36 is executed without a delay.

Further, in the above-described example, the first force receiving surface 152Lm receives a separation force (retracting force) from the second force application surface 196Lb. In this regard, the separation force is a force applied from the second force application surface 196Lb which moves in the W42 direction, and is for moving the developing roller 106 in the direction away from the photosensitive drum 104 (separation direction, retracting direction, or V1 direction). This is the force applied to the process cartridge 100. Therefore, it suffices if the developing unit 109 moves from the developing position to the retracted position triggered by receiving the separating force as a trigger, and the process cartridge 100 does not necessarily continues receiving the separating force until the developing unit 109 reaches the retracting position.

As described above, in the structure of this embodiment, by the separation control member 196L moving from the home position to the second position, the spacer 151L moves from the separation release position to the separation holding position. Then, the separation control member 196L returning from the second position to the home position, the developing unit 109 becomes in a state of maintaining the separation position by the spacer 151L. That is, the developing unit 109 is constrained by the spacer 151L from moving to the contact position against the driving torque received from the image forming apparatus main assembly 170 and the urging force in the arrow V2 direction by the urging of the development pressure spring 134, and therefore is maintained in a separated position.

In this manner, the separation force applied from the separation control member 196L is transmitted to the pressed surface 127*h* of the non-drive-side bearing (a part of the developing frame) 127 by way of the movable member 152L, so that the developing unit 109 is moved from the contact position to the separation position (retracted position), and the spacer 151R is moved from the separation release position to the separation holding position.

With the developing unit 109 in the separated position (retracted position), the position of the developing unit 109 with respect to the drum unit 108 is determined by the urging in the V2 direction by the driving torque received from the image forming apparatus main assembly 170 and the development pressure spring 134, the contacting of the supported portion 151La to the first supporting portion 127*b* as described above, and the contacting of the contact portion 151Lc to the contacted surface 117*c*. Therefore, the contacted surface 117*c* can be said to be a positioning portion (first positioning portion) for positioning the developing unit 109 at the separated position (retracted position) of the photosensitive drum 104. At this time, it can be said that the developing unit 109 is stably held by the drum unit 108. Further, it can be said that the spacer 151L at the separation holding position (first position) creates a state in which the drum unit 108 can stably hold the developing unit at the separation position (retracted position).

Further, when the front door 11 of the image forming apparatus main assembly 170 shifts from the closed state to the open state in this state, the first force applying portion 190*a* rises in the direction opposite to the arrow ZA direction. Along with this, the movable member 152L moves in the direction opposite to the arrow ZA direction by the action of the urging member 153. However, the spacer 151L still maintains the separation holding position, and the developing unit 109 also maintains the separation position. So far, the operation of the separation mechanism located on the drive-side of the process cartridge 100 and the operation of the separation mechanism located on the non-drive-side have been described separately, but in this embodiment, they operate in interrelation with each other. That is, when the developing unit 109 is positioned at the separated position by the spacer 151R, the developing unit 109 is positioned at the separated position by the spacer 151L at substantially the same time, and the same is true at the contact position. Specifically, the movements of the separation control member 196R and the separation control member 196L described in FIGS. 23 to 27 and FIGS. 35 to 39 are integrally moved by a connecting mechanism (not shown). By this, the timing at which the spacer 151R located on the drive-side is placed at the separation holding position and the timing at which the spacer 151L located on the non-drive-side is placed at the separation holding position are substantially simultaneous. Further, the timing at which the spacer 151R is placed at the separation release position and the timing at which the spacer 151L is placed at the separation release position are substantially the same. Note that these timings may be different between the drive-side and the non-drive-side, but in order to shorten the time from the start of the print job by the user until the printed matter is discharged, it is desirable that at least the timing at which it is positioned at the separation release position is the same. In this embodiment, the swing axis H of the spacer 151R and the spacer 151L are coaxial, but the present invention is not limited to this example, and it will suffice if the timings of the spacers 151R and the spacers 151L may be substantially the same as those at the separation release position as described above. Similarly, the movable member swing axis HC of the movable member 152R and the movable member swinging axis HE of the movable member 152L are not coaxial, but the present invention is not limited to such an example, and it is sufficient that the timings of being located at the separation release positions are substantially the same as described above.

In order to perform the above-mentioned contact operation and separation operation, the width of the projecting portion 152Rh of the movable member 152R or the distance between the first force receiving surface 152Rm and the first force receiving surface 152Rp measured in the W41 direction or the W42 direction is determined is preferably 10 mm or less, and more preferably 6 mm or less. With such a dimensional relationship, it is possible to perform an appropriate contact operation and separation operation. The same applies to the movable member 152L on the non-drive-side.

As described above, in this embodiment, the drive-side and the non-drive-side have similar separation/contact mechanisms 150R and 150L, and they operate substantially at the same time. By this, even when the process cartridge 100 is twisted or deformed in the longitudinal direction, the amount of separation between the photosensitive drum 104 and the developing roller 9 can be controlled at both ends in the longitudinal direction. Therefore, it is possible to suppress variations in the amount of separation along the longitudinal direction.

Further, according to this embodiment, by moving the separation control member 196R (196L) between the home position, the first position, and the second position in one direction (arrows W41 and W42 directions), it is possible to control the contact state and the separation state between the developing roller 106 and the photosensitive the drum 104. Therefore, the developing roller 106 can be contacted with the photosensitive drum 104 only when the image is formed, and the developing roller 4 can be maintained in the spaced state from the photosensitive drum 104 when the image is not formed. Therefore, even if the apparatus is unoperated left for a long time without forming an image, the developing roller 106 and the photosensitive drum 104 are prevented from being deformed, and a stable image formation can be formed.

Further, according to this embodiment, the movable member 152R (152L) which acts on the spacer 151R (151L) to rotationally move can be positioned at the accommodated position by the urging force of the tension spring 153 or the like. Therefore, when the process cartridge 100 is outside of the image forming apparatus main assembly 170, the process cartridge 100 can be downsized as a single unit without projecting from the outermost shape of the process cartridge 100.

Similarly, the movable member 152R (152L) can be positioned at the accommodated position by the urging force of the tension spring 153 or the like. Therefore, when the process cartridge is mounted on the image forming apparatus main assembly 170, the process cartridge 100 can be mounted by moving only in one direction. Therefore, it is not necessary to move the process cartridge 100 (tray 171) both in the upward and downward directions. For this reason, the image forming apparatus main assembly 170 does not require an extra space, and the main assembly can be downsized.

In addition, according to this embodiment, when the separation control member 196R (196L) is located at the home position, the separation control member 196R (196L) is free of load thereto from the process cartridge 100. Therefore, the rigidity required for the mechanism for operating the separation control member 196R (196L) and the separation control member 196R (196L) can be reduced, and the size thereof can be reduced. Further, the load on the sliding portion of the mechanism for operating the separation control member 196R (196L) is also reduced, and therefore, wearing of the sliding portion and generation of abnormal noise can be suppressed.

Further, according to this embodiment, the developing unit 109 can maintain the separated position only by the spacer 151R (151L) of the process cartridge 100. Therefore, the total component tolerance can be eased and the spacing amount can be minimized by reducing the number of portions which may cause variations in the spacing amount between the developing roller 106 and the photosensitive drum 104. Since the amount of separation can be reduced, when the process cartridge 100 is placed in the image forming apparatus main assembly 170, the occupying space of the developing unit 109 at the time when the developing unit 109 is moved between the contact position and the separated position becomes smaller, and therefore, the image forming apparatus can be downsized. In addition, since the space of the developer accommodating portion 29 of the developing unit 109 in which the movement between the contact position and the separation position occurs can be increased, a downsized and large-capacity process cartridge 100 can be placed in the image forming apparatus main assembly 170.

Further, according to this embodiment, the movable member 152R (152L) is located at the accommodated position when the process cartridge 100 is mounted, and the developing unit can maintain the spaced position by the spacer 151R (151L) of the process cartridge 100. Therefore, when the process cartridge 100 is mounted in the image forming apparatus main assembly 170, the mounting of the process cartridge 100 can be completed by moving only in one direction. Therefore, it is not necessary to move the process cartridge (tray 171) both in the upward and downward directions. In addition, the image forming apparatus main assembly does not require an extra space, and the main assembly can be downsized. Further, since the spacing amount can be reduced, when the process cartridge 100 is arranged in the image forming apparatus main assembly 170, the occupying zone of the developing unit 109 at the time when the developing unit 109 moves between the contact position and the separated position can be reduced, so that the image forming apparatus can be downsized. In addition, since the space of the developer accommodating portion 29 of the developing unit 109 which moves between the contact position and the separated position can be increased, the downsized and large-capacity process cartridge 100 can be placed in the image forming apparatus main assembly 170.

In this embodiment, the structure is such that the developing unit 109 is moved in the arrow V2 direction (direction of movement from the separated position to the development position) by the driving torque of the development coupling portion 132*a* received from the image forming apparatus main assembly 170 and the urging force of the development pressure spring 134. However, as a structure for urging the developing unit in the V2 direction, it is also possible to utilize the gravity applied to the developing unit 109. That is, the structure may be such that the gravity applied to the developing unit 109 is produce a moment which rotates the developing unit 109 in the V2 direction. In the case of employing such an urging structure in the V2 direction by its own weight, the urging structure using the development pressure spring 134 may not be provided, or may be used in combination with the urging structure using the development pressure spring 134.

[Details of Arrangement of Separation/Contact Mechanisms 150R and 150L]

Figure 40:
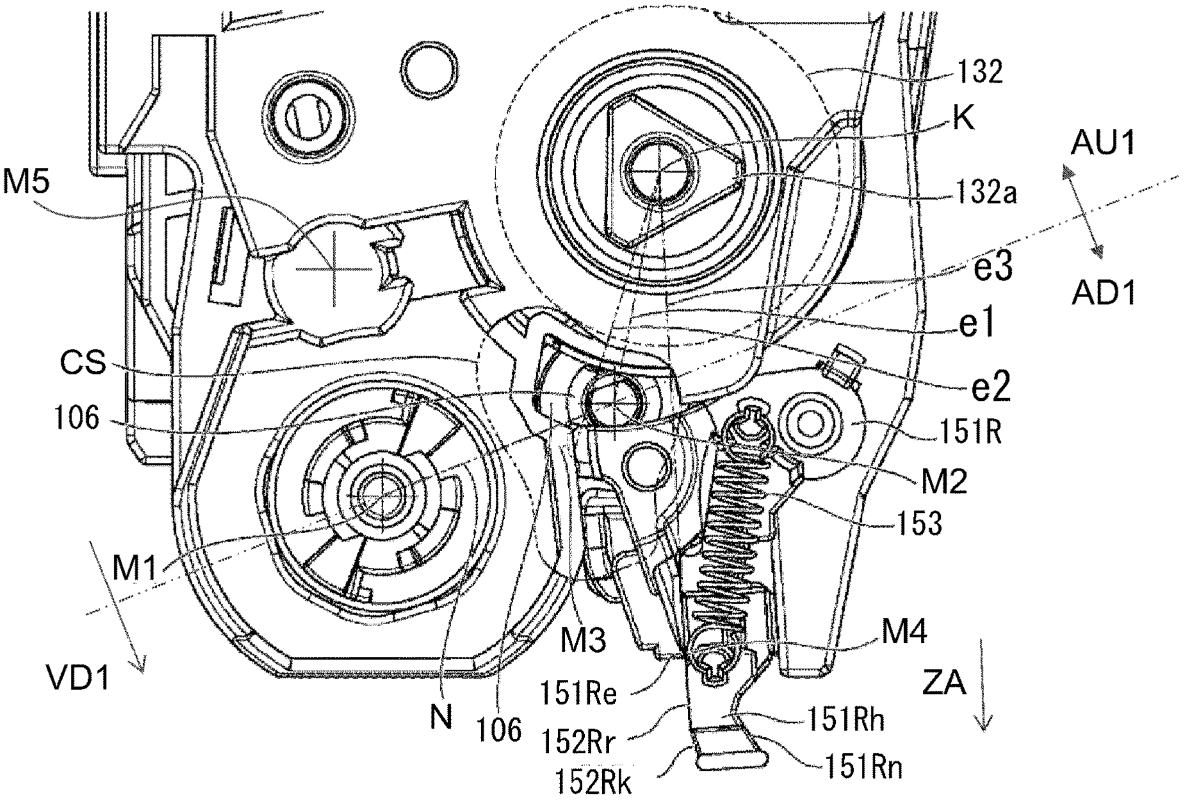
FIG. 40 is a partially enlarged view of the side surface of the process cartridge.
Figure 41:
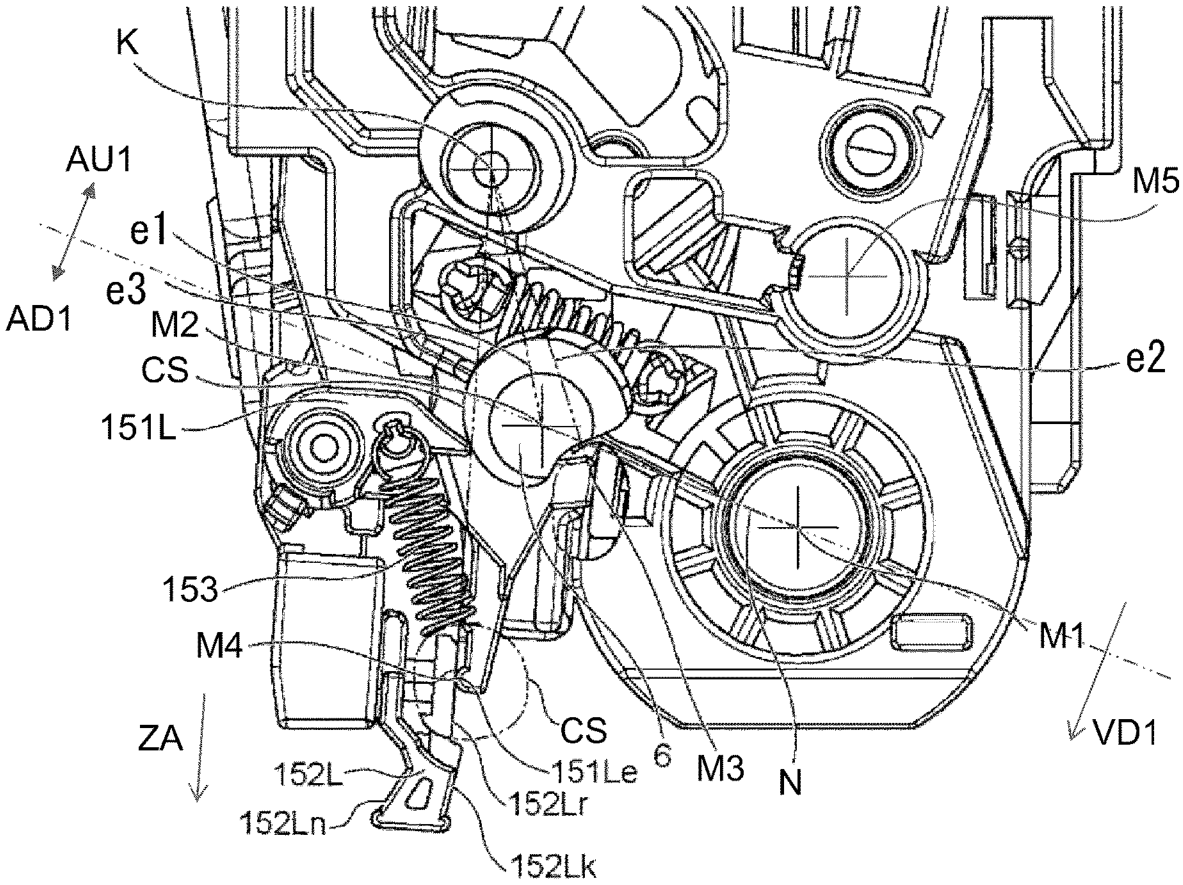
FIG. 41 is a partially enlarged view of the side surface of the process cartridge.

Subsequently, referring to FIGS. 40 and 41, the arrangement of the separation/contact mechanisms 150R and 150L in this embodiment will be described in detail. FIG. 40 is an enlarged view of the periphery of the spacer 151R as the process cartridge 100 is viewed from the drive-side along the swing axis K (photosensitive drum axis direction) of the developing unit 109. In addition, for better illustration, it is a sectional view in which a portion of the development cover member 128 and a portion of the drive-side cartridge cover member 116 are partially omitted by the partial cross-sectional line CS. FIG. 41 is an enlarged view of the periphery of the spacer 151R as the process cartridge 100 is viewed from the non-drive-side along the swing axis K (photosensitive drum axis direction) of the developing unit 109. In addition, for better illustration, it is a sectional view in which a portion of the development cover member 128 and a portion of the drive-side cartridge cover member 116 are partially omitted by the partial cross-sectional line CS.

Regarding the arrangement of the spacer and the movable member, which will be described below, there is no distinction between the drive-side and the non-drive-side except for the part which will be described in detail hereinafter, and the description of the non-drive-side (FIG. 41) is omitted, because the non-drive-side has a similar structure.

As shown in FIG. 40, a straight line passing through the rotation axis M1 of the photosensitive drum 104 (point M1 in FIG. 40) and the rotation axis M2 of the developing roller 106 (point M2 in FIG. 40) is line N. In addition, the contact region between the contact surface 151Rc of the spacer 151R and the contacted surface 116*c* of the drive-side cartridge cover member 116 is M3, and the contact region between the pressed surface 151Re of the spacer 151R and the spacer pressing surface 152Rr of the movable member 152R is M4. Further, the distance between the swing axis K and the point M2 of the developing unit 109 is distance e1, the distance between the swing axis K and the region M3 is distance e2, and the distance between the swing axis K and the point M4 is distance e3.

In the structure of this embodiment, when the developing unit 109 is in the separated position and the movable member 152R (152L) is in the projecting position, the positional relationship is as follows, as the developing unit 109 is viewed along the swing axis K (or the rotation axis M1 or the rotation axis M2). That is, as viewed along the swing axis K as shown in FIG. 40, at least a part of the contact region M3 is disposed in an region AD1 which is opposite to an region AU1 in which the center (swing axis K) of the development coupling portion 132*a* exists, when the region is divided with the line N as a boundary. In other words, the contact surface 151Rc of the spacer 151R is placed such that the distance e2 is longer than the distance e1. Further, as shown in FIG. 40, when the region is divided with the line N as a boundary, at least a portion of the projecting portion 152Rh is placed in the region AD1 opposite to the region AU1 in which the center of the development coupling portion 132*a* (swing axis K) exist, as viewed along the swing axis K. The vertical direction in the attitude shown in FIG. 40 (FIG. 41), is the vertical direction in the actual attitude at the time when it is mounted to the image forming apparatus main assembly 170. This attitude can be said to be an attitude in which the rotation axis M1 of the photosensitive drum 104 is horizontal and the photosensitive drum 104 is placed at the lower portion in the process cartridge 100. In such an attitude, the region AD1 corresponds to the lower portion of the process cartridge 100, and is also the region including the lower portion of the process cartridge 100.

By arranging the spacer 151R and the contact surface 151Rc in this manner, it is possible to suppress variations in the attitudes of the separation positions of the developing unit 109, even when the positions of the contact surface 151Rc vary due to component tolerances and the like. That is, the influence of the variation of the contact surface 151Rc on the spacing amount (gap) P1 (see part (a) of FIG. 1 between the developing roller 106 and the photosensitive drum 104 can be minimized, and the developing roller 106 and the photosensitive drum 104 can be spaced from each other with high precision. Further, it is not necessary to provide an extra space for retraction when the developing unit 109 is moved for the spacing, which leads to the of the downsizing of image forming apparatus main assembly 170.

Further, the first force receiving portion 152Rk (152Lk) and the second force receiving portion 152Rn (152Ln), which are the force receiving portions of the movable member 152R (152L), are disposed on the opposite side of the side including the rotation center (rotation axis) of the development coupling portion 132*a* with respect to line N and. That is, at least a portion of each of the force receiving portions 152Rk (152Lk) and 152Rn (152Ln) is arranged in the region AD1 opposite to the region AU1 in which the rotation center (rotation axis) K of the development coupling 132*a* is placed.

As described above, the projecting portion (force receiving portion) 152Rh (152Lh) is disposed at the end portion in the longitudinal direction. Further, as shown in FIG. 15 (FIG. 16), a cylindrical portion 128*b* (127*a*), which is a support portion of the developing unit 109, is disposed at the end portion in the longitudinal direction. Therefore, the force receiving portion 152Rh (152Lh) including the first force receiving portion 152Rk (152Lk) and the second force receiving portion 152Rn (152Ln) is disposed on the opposite side of the side including the cylindrical portion 128*b* (127*a*) (that is, the swing axis K) of the developing unit 109 with respect to the line N, so that the functional portions can be arranged efficiently. That is, it leads to downsizing of the process cartridge 100 and the image forming apparatus M. More specifically, when the region is divided by the straight line N as viewed in the direction along the rotation axis M2, the structure such as the cylindrical portion 128*b* (127*a*) for movably (relative to the developing unit 109) supporting the drum unit 108 is placed in the region AU1 where the swing axis K is placed. Therefore, at least a portion of each of the force receiving portions 152Rk (152Lk) and 152Rn (152Ln) is arranged in the region AD1 in which the development coupling portion 132*a* is not arranged in the region AU1 in which the swing axis K is arranged. It is possible to obtain an efficient layout that avoids interference between the members. This is contributable to downsizing of the process cartridge 100 and the image forming apparatus M.

In addition, the force receiving portion 152Rh (152Lh) is disposed at the end portion on the drive-side in the longitudinal direction. Further, as shown in FIG. 15, a development drive input gear 132 (or a development coupling portion 132*a*) which receives a drive from the image forming apparatus main assembly 170 and drives the developing roller 106 is provided at the end (with respect to the longitudinal direction) portion on the drive-side. As shown in FIG. 40, the first force receiving portion 152Rk and the second force receiving portion 152Rn of the movable member is placed on the side opposite from the side in which the rotation center K of the development drive input gear 132 (development coupling portion 132*a*) shown by the broken line, with respect to extension line of the line N With this arrangement, the functional portions can be efficiently arranged. That is, it leads to downsizing of the process cartridge and the image forming apparatus M. More specifically, when the region is divided by a straight line N as viewed in the direction along the rotation axis M2, in the region AU1 where the development coupling portion 132*a* exist, the driving member for driving a member included in the developing unit 109, such as the developing roller 106 such as a development drive input gear 132 is provided. Therefore, at least a portion of the force receiving portion 152Rh is better disposed in the region AD1 in which the development coupling portion 132*a* is not placed than in the region AU1 in which the development coupling portion 132*a* is placed, from the standpoint of an efficient layout to avoid interference between the members. This is contributable to downsizing of the process cartridge and the image forming apparatus M.

In the above description, the region AU1 and the region AD1 are defined as regions where the swing axis K or the development coupling portion 132*a* is placed and the region where it is not placed, when the region is divided by the straight line N, as viewed in the direction along the rotation axis M2. However, it is possible to use another definition. For example, the regions AU1 and AD1 may be the region where the charging roller 105 or rotation axis (center of rotation) M5 thereof is provided and the region where it is not provided, when the region is divided by the straight line N, as viewed in the direction along the rotation axis M2. Further, FIG. 236 is a schematic cross-sectional view of the process cartridge 100 in the separated state as viewed in the direction along the rotation axis M2. Referring to FIGS. 3 and 236, as a further definition, when the region is divided by a straight line N as viewed in the direction along the rotation axis M2, the regions AU1 and AD1 may be defined as the region in which the developing blade 130, the proximity point 130*d*, or the stirring member 129*a* and the rotation axis M7 of the stirring member 129*a*, or the pressed surface 152Rf are provided, and the reason in which it is not provided. The proximity point 130*d* is the position closest to the surface of the developing roller 106 of the developing blade 130.

In a general electrophotographic cartridge, particularly a cartridge usable with an in-line layout image forming apparatus, it is relatively difficult to arrange other members of the cartridge in the region AD1. Further, if at least a portion of each of the force receiving portions 152Rk (152Lk) and 152Rn (152Ln) is placed in the region AD1, the apparatus main assembly 170 also has the following advantage. That is, the separation control member 196R (196L) of the apparatus main assembly 170 is placed on the lower side of the cartridge and moves in the substantially horizontal direction (W41 and W42 directions, and the arrangement direction of the photosensitive drum 104 or the cartridge 100, in this embodiment) to urge the force receiving portion 152Rh (152Lh). With such a structure, the separation control member 196R (196L) and driving mechanism therefor can be formed in a relatively simple structure or a compact structure. This is particularly remarkable in the in-line layout image forming devices. As described above, arranging at least a portion of each of the force receiving portions 152Rk (152Lk) and 152Rn (152Ln) in the region AD1 can be expected to contribute to the downsizing and cost reduction of the apparatus main assembly 170.

Further, the contact portion between the spacer 151R and the movable member 152R is placed such that the distance e3 is longer than the distance e1. By this, the spacer 151R and the drive-side cartridge cover member 116 can be contacted with each other with a lighter force. That is, the developing roller 106 and the photosensitive drum 104 can be stably spaced from each other.

The arrangement of the separation/contact mechanisms 150R and L described above has been described referring to FIGS. 40 and 41 showing the process cartridge 100 in the separation state, but as is apparent in the other Figures, the same relationship applies in the process cartridge 100 in the contact state. FIG. 235 is a side view (partial cross-sectional view) of the process cartridge 100 in the contact state as viewed in the direction along the rotation axis M2. The arrangement of the force receiving portions 152Rk (152Lk) and 152Rn (152Ln) is the same as that described above.

Further, the direction perpendicular to the straight line N is VD1. On the drive-side, the movable member 152R and the force receiving portions 152Rk and 152Rn move between the stand-by position and the operating position by moving in the ZA direction and the opposite direction thereto relative to the drum frame and the developing frame. By the movement in the ZA direction and the opposite direction, the movable member 152R and the force receiving portions 152Rk and 152Rn are moved at least in the VD1 direction. That is, the movable member 152R and the force receiving portions 152Rk and 152Rn are moved at least in the VD1 direction between the stand-by position and the operating position. According to this structure, when the movable member 152R is in the operating position, the developing unit 109 can be moved between the developing position and the retracted position by receiving a force from the separation control member 196R at each of the force receiving portions 152Rk and 152Rn. When the movable member 152R is in the stand-by position, the movable member 152R and the force receiving portions 152Rk and 152Rn interfere with the separation control member 196R so that it can be avoided that the process cartridge 100 cannot be inserted or removed from the apparatus main assembly 170. The same applies to the structure on the non-drive-side.

Further, when the movable member 152R is in the operating position, the projecting portion 152Rh provided with the respective force receiving portions 152Rk and 152Rn is disposed at a position such that they are projected from the developing unit 109 in at least the VD1 direction. Therefore, it is possible to arrange the projecting portion 152Rh in the space 196Rd between the first force application surface 196Ra and the second force application surface 196Rb of the separation control member 196R. The same applies to the structure on the non-drive-side.

[Details of Arrangement of Separation Contact Mechanisms 150R and 150L (Part 2)]

Referring to FIGS. 236 and 237, a concept similar to the concept of placing at least a portion of each of the force receiving portions 152Rk (152Lk) and 152Rn (152Ln) in the region AD1 as described above will be described.

FIGS. 236 and 237 are schematic cross-sectional views of the process cartridge 100 as viewed from the drive-side along the rotation axis M1, the rotation axis K, or the rotation axis M2 of the developing unit 109, FIG. 236 shows a separated state, and FIG. 237 shows a contact state. Regarding the arrangement of the spacer 151 and the movable member 152 described below, there is no difference between the drive-side and the non-drive-side, that is, both are common, and the contact state and the separation state are almost common, and therefore, only the separated state on the drive-side will be described referring to FIG. 236, and the description on the non-drive-side and the description on the contact state will be omitted.

The rotation axis of the toner feeding roller (developer supply member) 107 is the rotation axis (rotation center) M6. Further, the process cartridge 100 is provided with a stirring member 108 for rotating and stirring the developer contained in the developing unit 109, and the rotation axis thereof is the rotation axis (rotation center) M7.

In FIG. 236, the one, which is farther from the rotation axis M5, of the intersections of the straight line N10 connecting the rotation axis M1 and the rotation axis M5 and the surface of the photosensitive drum 104 is the intersection MX1. The tangent line to the surface of the photosensitive drum 104 passing through the intersection MX1 is a tangent line (predetermined tangent line) N11. The region is divided by the tangent line N11 as a boundary, and a region containing the rotation axis M1, the charging roller 105, the rotation axis M5, the developing roller 106, the rotation axis M2, the development coupling portion 132*a*, the rotation axis K, the developing blade 130, the proximity point 130*d*, and the toner feeding roller 107, the rotating axis M6, the stirring member 129*a*, the rotating axis M7, or the pressed surface 152Rf is an region AU2, and the region not containing it is an region (predetermined region) AD2. Further, the regions AU2 and AD2 may be defined in another way as follows. That is, assuming that the direction parallel to the direction from the rotation axis M5 to the rotation axis M1 and orientating the same is a VD10 direction, the most downstream portion of the photosensitive drum 104 in the VD10 direction is the intersection MX1. Then, with respect to the direction VD10, the region on the upstream side of the most downstream portion MX1 is the region AU2, and the region on the downstream side is the region (predetermined region) AD2. Regardless of the expression, the defined regions AU2 are the same, and the regions AD2 are the same.

Then, at least parts of each force receiving portion 152Rk and 152Rn are arranged in the region AD2. As described above, arranging at least parts of each of the force receiving portions 152Rk and 152Rn in the region AD2 can be expected to contribute to the downsizing and cost reduction of the process cartridge 100 and the apparatus main assembly 170. This is for the same reason as in the case that at least a part of each of the force receiving portions 152Rk and 152Rn is arranged in the region AD1. The same applies to the structure on the non-drive-side.

Further, the movable member 152R and the force receiving portions 152Rk and 152Rn are displaced at least in the VD10 direction by moving in the ZA direction and the opposite direction. That is, the movable member 152R and the force receiving portions 152Rk and 152Rn are displaced at least in the VD10 direction between the stand-by position and the operating position. According to this structure, when the movable member 152R is in the operating position, the developing unit 109 can be moved between the developing position and the retracting position by receiving a force from the separation control member 196R at each of the force receiving portions 152Rk and 152Rn. When the movable member 152R is in the stand-by position, it can be avoided that the movable member 152R and the force receiving portions 152Rk and 152Rn interfere with the separation control member 196R so that the process cartridge 100 cannot be inserted or removed from the apparatus main assembly 170. The same applies to the structure on the non-drive-side.

Further, the projecting portion 152Rh provided with the respective force receiving portions 152Rk and 152Rn is disposed at a position such that it is projected from the developing unit 109 in at least the VD10 direction, when the movable member 152R is in the operating position. Therefore, it is possible to dispose the projecting portion 152Rh in the space 196Rd between the first force application surface 196Ra and the second force application surface 196Rb of the separation control member 196R. The same applies to the structure on the non-drive-side.

[Details of Arrangement of Separation/Contact Mechanisms 150R and 150L (Part 3)]

A concept similar to the concept of arranging at least a portion of each of the force receiving portions 152Rk (152Lk) and 152Rn (152Ln) in the region AD1 as described above will be described referring to FIG. 238.

FIG. 238 is a schematic sectional view of the process cartridge 100 in the separated state as viewed from the drive-side along the rotation axis M1, the rotation axis K, or the rotation axis M2 of the developing unit 109. Regarding the arrangement of the spacer 151 and the movable member 152 described below, there is no difference between the drive-side and the non-drive-side, and both are common, and the contact state and the separated state are substantially the common. Therefore, only the separated state on the drive-side will be described referring to FIG. 238, and the description on the non-drive-side and the description in the contact state will be omitted.

In FIG. 238, of the intersection of the straight line N12 connecting the rotation axis K and the rotation axis M2 and the surface of the developing roller 106, the one farther from the rotation axis K, is defined as the intersection MX2. The tangent line to the surface of the developing roller 106 passing through the intersection MX2 is a tangent line (predetermined tangent line) N13. The region is divided with the tangent line N13 as a boundary, and the part in which the development coupling portion 132*a*, the rotation axis K, the rotation axis M2, the charging roller 105, the rotation axis M5, the developing blade 130, the proximity point 130*d*, the toner feeding roller 107, the rotation axis M6, the stirring member 129*a*, the rotation axis M7, or the pressed surface 152Rf exists is a region AU3, and the region it does not exist is a region (predetermined region) AD3. Further, the regions AU3 and AD3 may be defined in another way as follows. That is, the direction parallel to the direction from the rotation axis K to the rotation axis M2 and orientating the same is a VD12 direction, the most downstream portion of the developing roller 106 in the VD12 direction is the intersection MX2. Then, in the VD12 direction, the region on the upstream side of the most downstream portion MX2 is the region AU3, and the region on the downstream side is the region (predetermined) AD3. The regions AU3 and AD3 defined in any of the above expressions are the same, respectively.

Then, at least a part of each force receiving portion 152Rk and 152Rn is arranged in the region AD3. As described above, arranging at least a part of each of the force receiving portions 152Rk and 152Rn in the region AD3 can be expected to contribute to the downsizing and cost reduction of the process cartridge 100 and the apparatus main assembly 170. This is for the same reason as when at least a part of each of the force receiving portions 152Rk and 152Rn is arranged in the region AD1. The same applies to the structure on the non-drive-side.

Further, the movable member 152R and the force receiving portions 152Rk and 152Rn are displaced at least in the VD12 direction by moving in the ZA direction and the opposite direction thereto. That is, the movable member 152R and the force receiving portions 152Rk and 152Rn are displaced at least in the VD12 direction to move between the stand-by position and the operating position. According to this structure, when the movable member 152R is in the operating position, the developing unit 109 can be moved between the developing position and the retracting position by receiving a force from the separation control member 196R at each of the force receiving portions 152Rk and 152Rn. When the movable member 152R is in the stand-by position, it can be avoided that the movable member 152R and the force receiving portions 152Rk and 152Rn interfere with the separation control member 196R with the result that the process cartridge 100 cannot be inserted or removed from the apparatus main assembly 170. The same applies to the structure on the non-drive-side.

Further, the projecting portion 152Rh provided with the respective force receiving portions 152Rk and 152Rn is disposed at a position such that it is projected from the developing unit 109 in at least the VD12 direction, when the movable member 152R is in the operating position. Therefore, it is possible to place the projecting portion 152Rh in the space 196Rd between the first force application surface 196Ra and the second force application surface 196Rb of the separation control member 196R. The same applies to the structure on the non-drive-side.

[Details of Arrangement of Separation/Contact Mechanisms 150R and 150L (Part 4)]

A concept similar to the concept of placing at least a part of each of the force receiving portions 152Rk (152Lk) and 152Rn (152Ln) in the region AD1 as described above will be described referring to FIG. 239.

FIG. 239 is a schematic cross-sectional view of the process cartridge 100 in the separated state as viewed from the drive-side along the rotation axis M1, the rotation axis K, or the rotation axis M2 of the developing unit 109. Regarding the arrangement of the spacer 151 and the movable member 152 described below, there is no distinction between the drive-side and the non-drive-side, and both are common, and the contact state and the separated state are substantially common, and therefore, in the following description, only the separated state on the drive-side will be described referring to FIG. 239, and the description on the non-drive-side and the description in the contact state will be omitted. In FIG. 239, of the intersection of the straight line N14 connecting the rotation axis M2 and the rotation axis M6 and the surface of the developing roller 106, the one which is more remote from the rotation axis K, is the intersection MX2. The tangent line to the surface of the developing roller 106 passing through the intersection MX2 is a tangent line (predetermined tangent line) N14. When the region is divided by the tangent line N14 as the boundary, the region in which the development coupling portion 132*a*, the rotation axis K, the charging roller 105, the rotation axis M5, the developing blade 130, the proximity point 130*d*, the stirring member 129*a*, the rotation axis M7, or the pressed surface exists is the region AU4, and the region in which it does not exist is the region (predetermined region) AD4.

At least a portion of each force receiving portion 152Rk and 152Rn is arranged in the region AD4. As described above, arranging at least a part of each of the force receiving portions 152Rk and 152Rn in the region AD4 can be expected to contribute to the downsizing and cost reduction of the process cartridge 100 and the apparatus main assembly 170. This is for the same reason as when at least a part of each of the force receiving portions 152Rk and 152Rn is arranged in the region AD1. The same applies to the structure on the non-drive-side.

Further, the movable member 152R and the force receiving portions 152Rk and 152Rn are displaced at least in the VD14 direction perpendicular to the straight line N14 by the movement in the ZA direction and the opposite direction. That is, the movable member 152R and the force receiving portions 152Rk and 152Rn are displaced at least in the VD14 direction to move between the stand-by position and the operating position. According to this structure, when the movable member 152R is in the operating position, the developing unit 109 can be moved between the developing position and the retracted position by receiving a force from the separation control member 196R at each of the force receiving portions 152Rk and 152Rn. When the movable member 152R is in the stand-by position, it can be avoided the movable member 152R and the force receiving portions 152Rk and 152Rn interfere with the separation control member 196R with the result that the process cartridge cannot be inserted or removed from the apparatus main assembly 170. The same applies to the structure on the non-drive-side.

Further, when the movable member 152R is in the operating position, the projecting portions 152Rh provided on the respective force receiving portions 152Rk and 152Rn are disposed at positions such that they are projected from the developing unit 109 in at least the VD14 direction. Therefore, it is possible to arrange the projecting portion 152Rh in the space 196Rd between the first force application surface 196Ra and the second force application surface 196Rb of the separation control member 196R. The same applies to the structure on the non-drive-side.

The arrangement relationship of each force receiving portion described above has the same relationship in all the examples described below.

[Holding Mechanism]

In the above-described embodiment, the structure for the drum unit 108 to stably hold the developing unit 109 at the retracted position and the developing position is a holding member holding the spacer 151R capable of taking the first position and the second position or a holding portion holding the separation holding portion 151Rb which is a part thereof. However, it is also possible to deem the structure of this embodiment as follows. That is, as a holding mechanism in which the drum unit 108 stably holds the developing unit 109 at the retracted position and the developing position, at least the spacer 151R, it is possible to raise the first supporting portion 128*c* of the development cover member 128, and the contacted surface 116*c* of the drive-side cartridge cover member 116 and the development pressure spring 134. In such a case, it can be said that the holding mechanism is in the first state when the spacer 151R is in the first position and the developing unit 109 is in the retracted position, and the holding mechanism is in the second position when the spacer 151R is in the second position and the developing unit 109 is in the developing position.

Embodiment 2

Next, referring to FIGS. 42 to 46, the Embodiment 2 will be described. In this embodiment, structures and operations different from those in the above-described embodiment will be described, and members including the same structures and functions will be assigned the same reference numbers, and the description thereof will be omitted. In an Embodiment 1, the separation/contact mechanism 150R and the separation/contact mechanism 150L are provided as the separation/contact mechanism on the drive-side and the non-drive-side, respectively. On the other hand, in the embodiment, a structure in which the separation/contact mechanism is provided only on one side of the process cartridge will be described.

Figure 42:
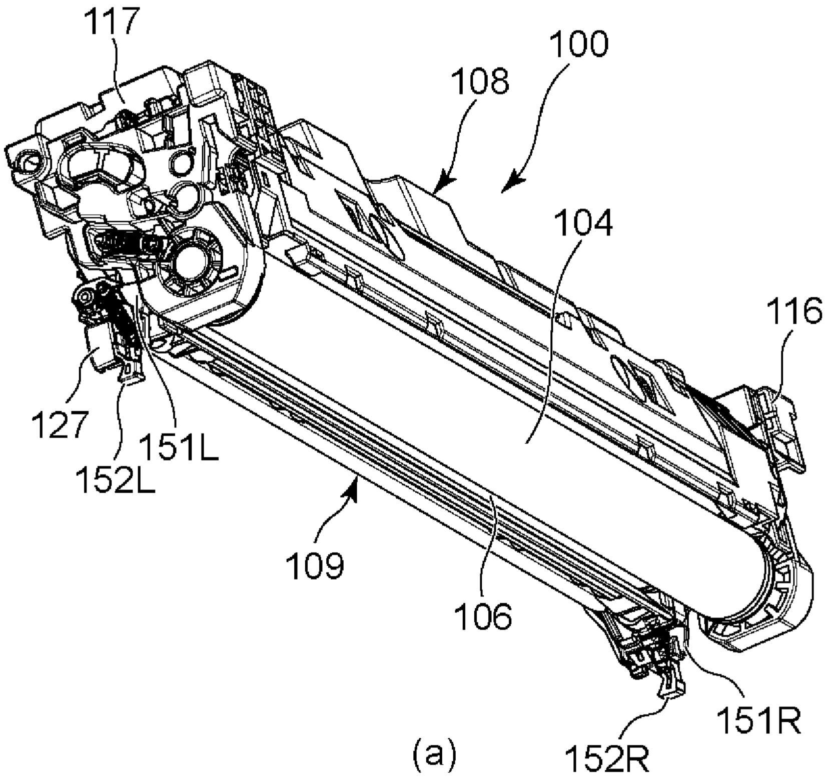
FIG. 42 is a perspective view of a process cartridge and a schematic view illustrating an amount of spacing of a developing roller from a photosensitive drum.
Figure 42:
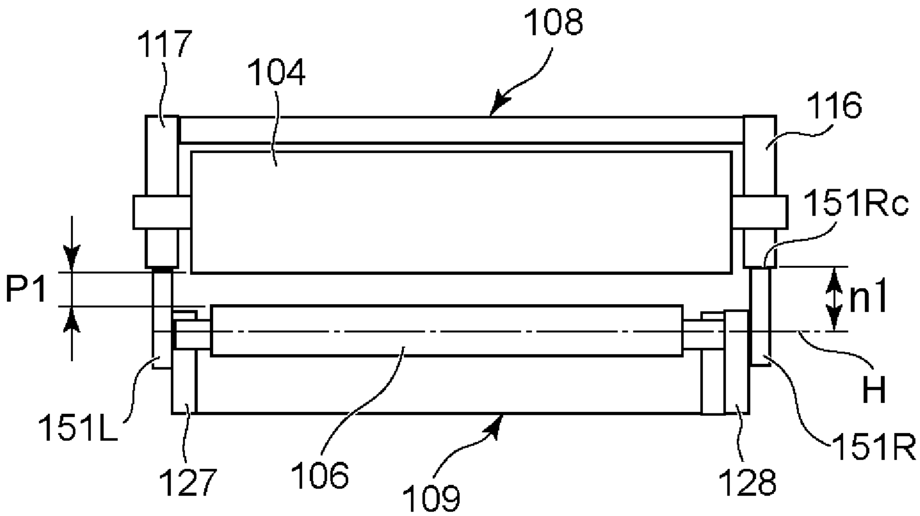

FIGS. 42 to 46 are illustrations showing a state when the developing unit 109 is in the separated position and the movable member of the separation/contact mechanism is in the projecting position. Part (a) of FIG. 42 is a perspective view of the process cartridge 100 of the Embodiment 1 as viewed from below on the drive-side. Part (b) of FIG. 42 is a schematic view illustrating the amount of spacing of the developing roller 106 from the photosensitive drum 104 of the process cartridge 100 of Embodiment 1.

As shown in FIG. 42, the spacing amount P1 of the Embodiment 1 is set to be the same amount on the drive-side and the non-drive-side. The spacing amount P1 can be changed by changing the distance n1 from the swing axis H of the spacer 151 to the contact surface 151Rc. In this embodiment shown below, the spacing amount is changed with the same structure.

Figure 43:
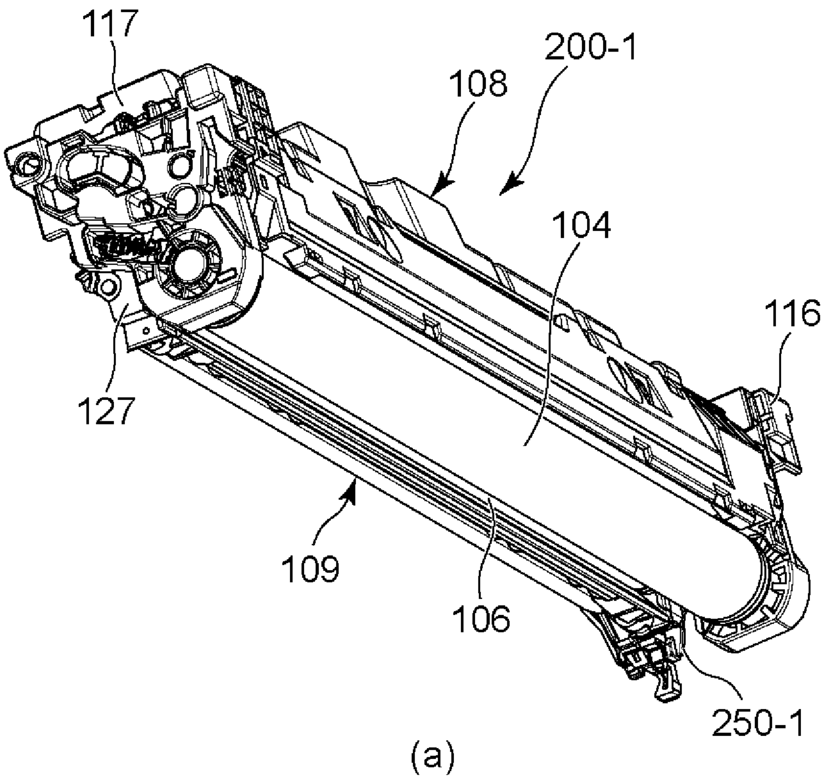
FIG. 43 is a perspective view of the process cartridge and a schematic view illustrating the amount of spacing of the developing roller from the photosensitive drum.
Figure 43:
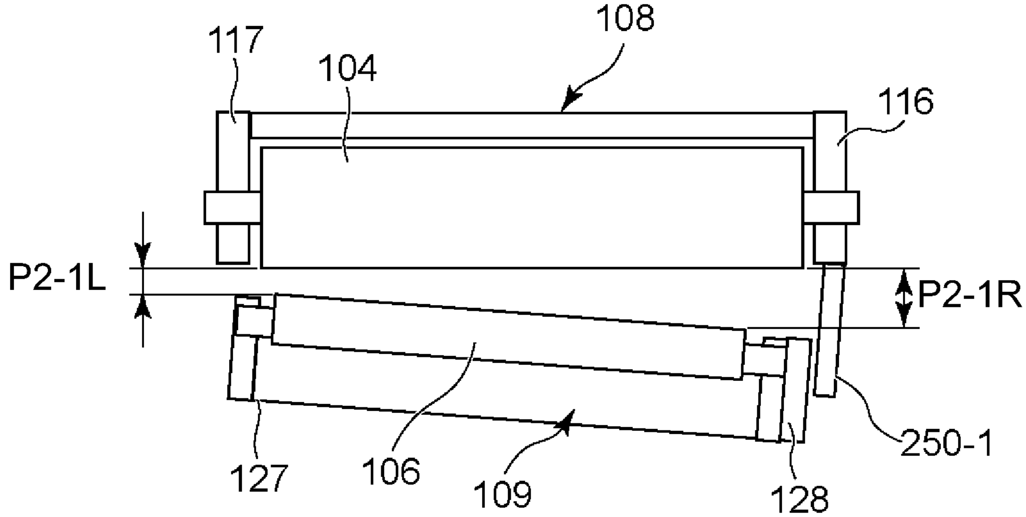

In the embodiment shown in FIG. 43 of this embodiment, the separation/contact mechanism 250-1 of the process cartridge 200-1 is arranged only on the drive-side, and the separation/contact mechanism is not provided on the non-drive-side. Part (a) of FIG. 43 is a perspective view of the process cartridge 200-1 as viewed from below on the drive-side. Part (b) of FIG. 43 is a schematic view illustrating the amount of spacing of the developing roller 106 from the photosensitive drum 104 of the process cartridge 200-1.

As shown in FIG. 43, since the separation/contact mechanism 250-1 is arranged only on the drive-side, the spacing amount P2-1L on the non-drive-side is smaller than the amount P2-1R on the drive-side because of the influence of the development pressure spring (not shown in FIG. 43, see 134 in FIG. 34). Here, the spacing amount P2-1R on the drive-side is selected so as to be larger than the spacing amount P1 (see part (b) of FIG. 42) in Embodiment 1 so that the spacing amount P2-1L on the non-drive-side does not become 0, that is, the developing roller 106 and the photosensitive drum 104 do not contact each other on the non-drive-side.

By doing so, the same effect as in Example 1 can be provided. In addition, since there is no separation/contact mechanism on the non-drive-side, the process cartridge and the image forming apparatus main assembly can be downsized and the cost can be reduced accordingly.

Figure 44:
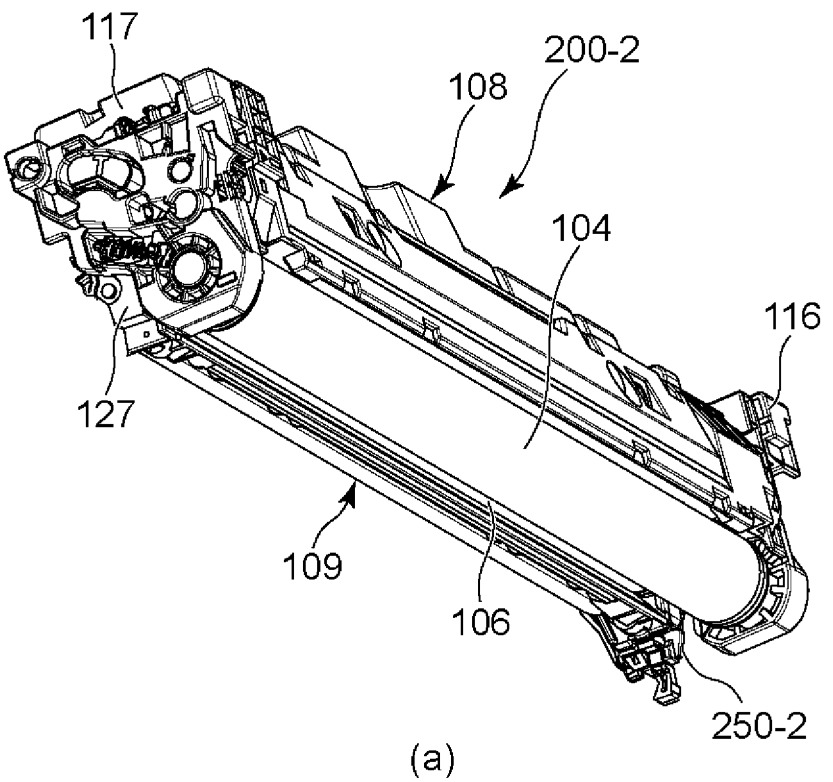
FIG. 44 is a perspective view of the process cartridge and a schematic view illustrating the amount of spacing of the developing roller from the photosensitive drum.
Figure 44:
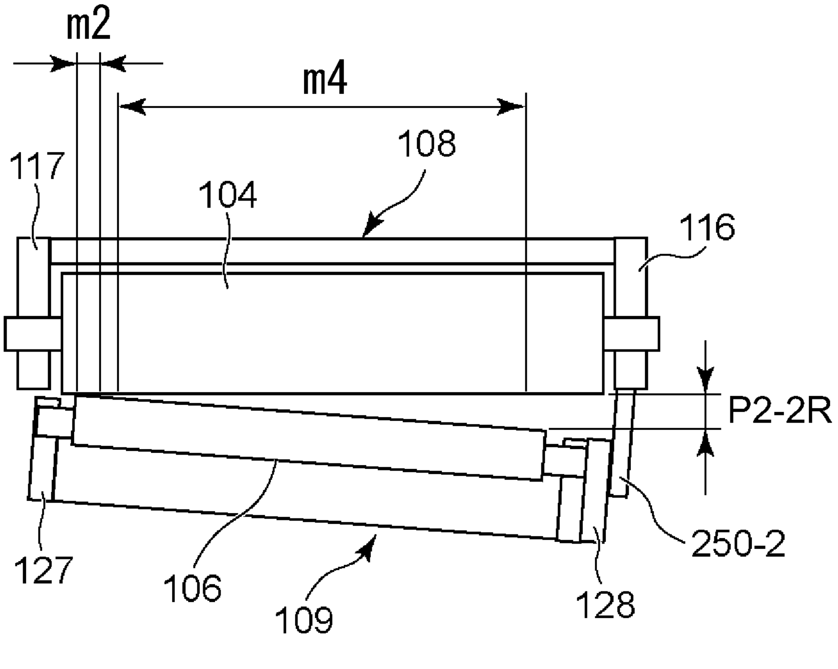

FIG. 44 shows another example 1 of this embodiment. In this example, the separation/contact mechanism 250-2 of the process cartridge 200-2 is provided only on the drive-side, and there is not provided separation/contact mechanism on the non-drive-side. In this example, when the developing unit 109 is in a separated position, the end of the developing roller 106 on the non-drive-side is in contact with the photosensitive drum 104. Part (a) of FIG. 44 is a perspective view of the process cartridge 200-2 as viewed from below on the drive-side. Part (b) of FIG. 44 is a schematic view illustrating the amount of spacing of the developing roller 106 from the photosensitive drum 104 of the process cartridge 200-2.

As contrasted to the example shown in FIG. 43, in the example of FIG. 44, the spacing amount P2-2R on the drive-side is selected so as to be equal to or smaller than the spacing amount P1 of Embodiment 1. In this case, the developing roller 106 and the photosensitive drum are in contact with each other on the non-drive-side due to the urging force of the development pressure spring (not shown in FIG. 43, see 134 in FIG. 34). However, if the contact range m2 on the non-drive-side is set out of the range of the image forming region m4, the image is not affected adversely. Nevertheless, if the effect on the image is so small that it can be ignored, or in the case of the usage in which the affect, if any, on the image can be ignored, the contact range m2 is not necessarily set out of the image forming range m4. That is, in such a case, the contact range m2 may be set within the image forming range m4.

As described above, in this example, by reducing the spacing amount as compared with the embodiment shown in FIG. 43, it is possible to the downsizing of the image forming apparatus as described in the Embodiment 1. In addition, since there is no separation/contact mechanism on the non-drive-side, the process cartridge and the image forming apparatus main assembly can be downsized and the cost can be reduced.

Figure 45:
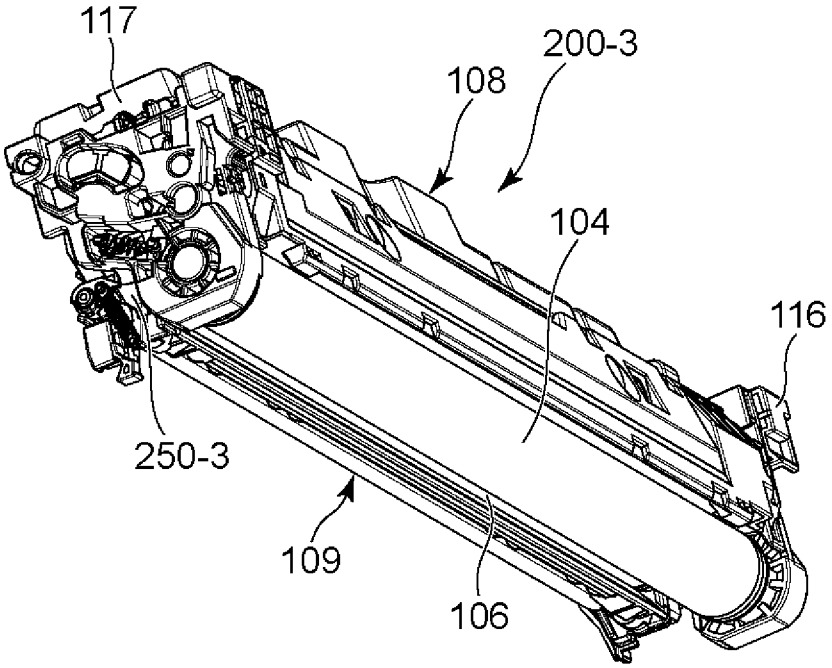
FIG. 45 is a perspective view of the process cartridge and a schematic view illustrating the amount of spacing of the developing roller from the photosensitive drum.
Figure 45:
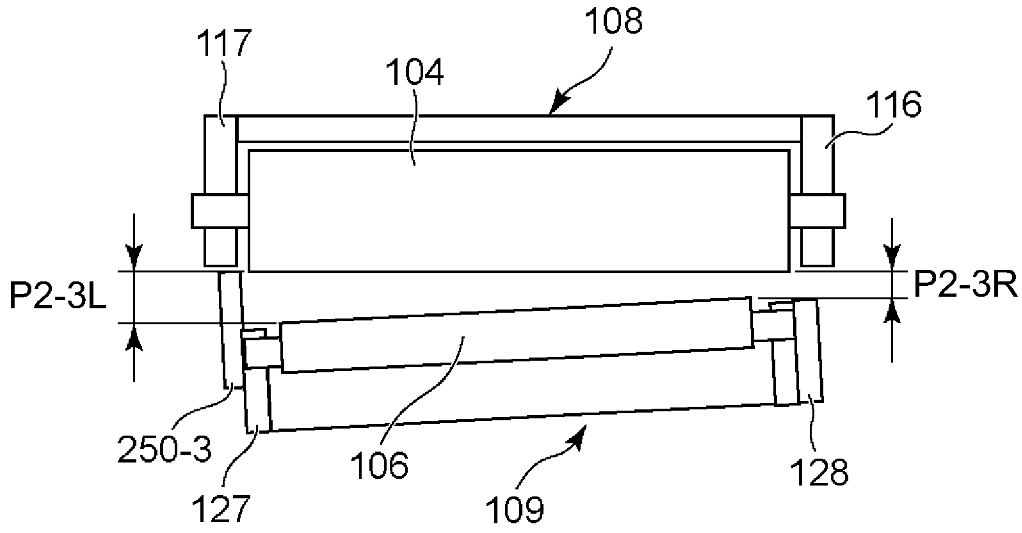

FIG. 45 shows another example 2 of this embodiment. In this embodiment, the separation/contact mechanism 250-1 of the process cartridge 200-3 is provided only on the non-drive-side, and there is no separation/contact mechanism on the drive-side. Part (a) of FIG. 45 is a perspective view of the process cartridge 200-3 as viewed from below on the non-drive-side. Part (b) of FIG. 45 is a schematic view illustrating the amount of spacing of the developing roller 106 from the photosensitive drum 104 of the process cartridge 200-3.

As shown in FIG. 45, since the separation/contact mechanism 250-3 is provided only on the non-drive-side, the spacing amount P2-3R on the drive-side is smaller than the spacing amount P2-3L on the non-drive-side by the influence of the drive input gear (not shown in FIG. 45, see 132*a* in FIG. 1). Here, the spacing amount P2-3L on the non-drive-side is selected so as to be large than the spacing amount P1 in Embodiment 1 so that the spacing amount P2-3R on the drive-side does not become 0, that is, the developing roller 106 and the photosensitive drum 104 do not contact each other on the drive-side.

By doing so, the same effect as in Example 1 can be provided. In addition, since there is no separation/contact mechanism on the drive-side, the process cartridge and the image forming apparatus main assembly can be downsized and the cost can be reduced.

Figure 46:
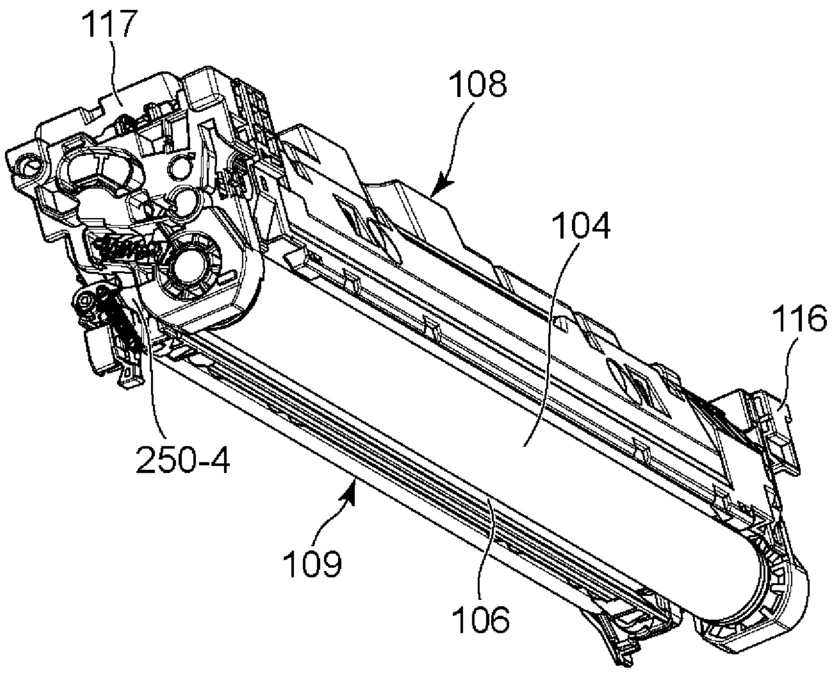
FIG. 46 is a perspective view of the process cartridge and a schematic view illustrating the amount of spacing of the developing roller from the photosensitive drum.
Figure 46:
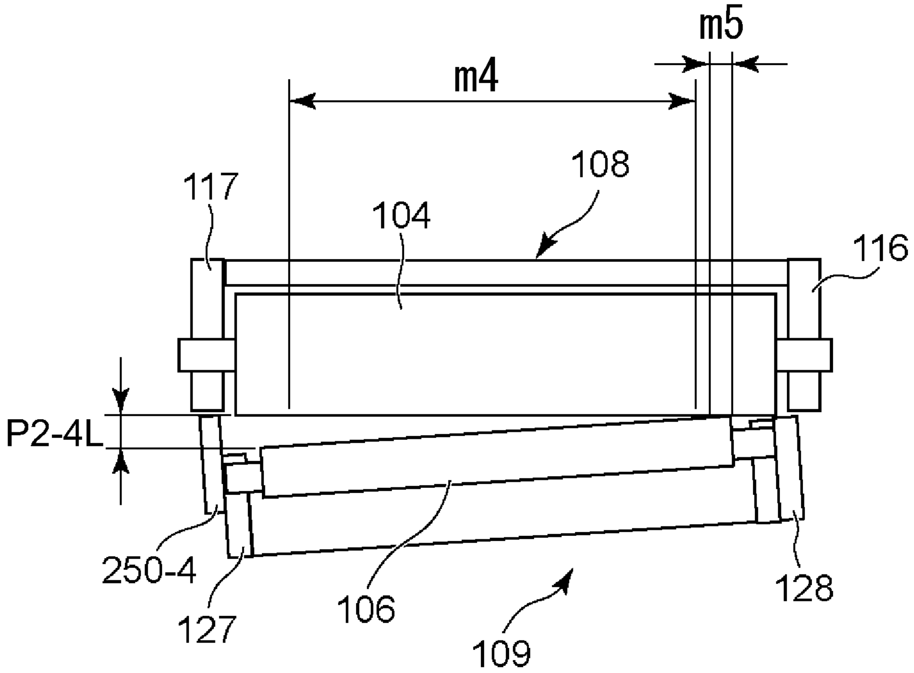

FIG. 46 shows further example 3 of this embodiment. In this embodiment, the separation/contact mechanism 250-4 of the process cartridge 200-4 is provided only on the non-drive-side, and no separation/contact mechanism is provided the drive-side. Further, when the developing unit 109 is in a separated position, the end portion of the developing roller 106 on the drive-side and the photosensitive drum 104 are provided. Part (a) of FIG. 46 is a perspective view of the process cartridge 200-4 as viewed from below on the drive-side. Part (b) of FIG. 46 is a schematic view illustrating the amount of spacing of the developing roller 106 from the photosensitive drum 104 of the process cartridge 200-4.

Unlike the example of FIG. 45, in the example of FIG. 46, the spacing amount P2-4L on the non-drive-side is selected so as to be equal to or smaller than the spacing amount P1 of the Embodiment 1. In this case, due to the influence of the drive input gear (not shown in FIG. 46, 132*a* in FIG. 1), the developing roller 106 and the photosensitive drum 104 contact each other on the drive-side. However, if the contact range m5 on the drive-side is set within a range which does not fall within the image forming region m4, the image is not affected. The amount of separation at the drive-side and the non-drive-side can be arbitrarily set within a range that does not affect the image.

As described above, by reducing the spacing amount as compared with the example of FIG. 45, it is possible to downsize the image forming apparatus as described in the Embodiment 1, and also to reduce the cost of the process cartridge.

In the four examples described above in this embodiment, the amount of spacing at the drive-side and the non-drive-side can be arbitrarily set within a range which does not affect the image.

Embodiment 3

Next, referring to FIGS. 47 to 55, Embodiment 3 of the present invention will be described.

In this embodiment, structures and operations different from those of the above-described embodiment will be mainly described, and description of similar structures and operations will be omitted. For the structure corresponding to that in the above-described embodiments, the same reference numerals and characters are assigned, or the reference numerals in the first part is changed while the reference numerals and characters in the second part are the same. In this embodiment, the structure and operation of the movable member are mainly different from those in the Embodiment 1. The spacer 351L has the similar structure as the spacer 151L.

[Structure of Movable Member]

Figure 47:
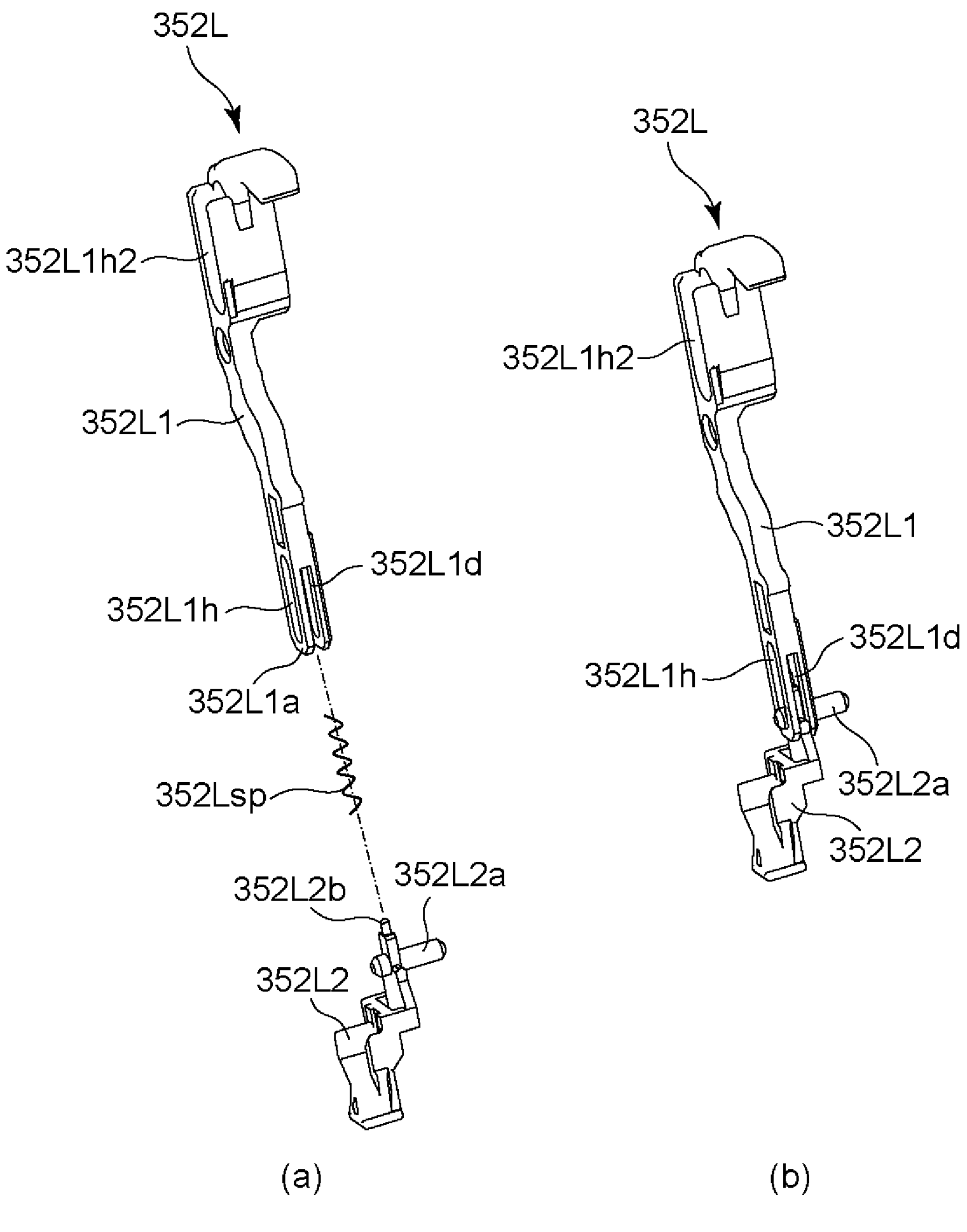
FIG. 47 is an illustration of a movable member.

First, the structure of the movable member will be described by taking the non-drive-side as an example. FIG. 47 is an illustration of disassembly and assembly of the movable member 352L on the non-drive-side. In Embodiment 3, the movable member corresponding to the movable member 152L in the Embodiment 1 is divided into two parts and they are connected together. Specifically, as shown in FIG. 47, the movable member 352L is divided into two parts, namely, an upper movable member 352L1 and a lower movable member 352L2. A shaft 352L2*a* is provided on the lower movable member 352L2. Further, as shown in part (a) of FIG. 48, the lower movable member 352L2 is provided with a projecting portion 352Lh capable of projecting from the developing unit in the ZA direction, and the projecting portion 352Lh includes a first force receiving portion (retracting force receiving portion, separating force receiving portion) 352Lk and a second force receiving portion (contact force receiving portion) 352Ln. The upper movable member 352L1 has an opening portion 352L1*d* in a surface opposing the lower movable member 352L2. In addition, the upper movable member 352L1 has an at-separation pressing portion 352L1*q* for pressing the non-drive-side bearing 327.

Further, the upper movable member 352L1 is provided with a pair of oblong round holes 352L1*h* with an open portion 352L1*d* interposed therebetween. The lower movable member 352L2 is provided with a spring holding portion 352L2*b*. One end of the compression spring 352Lsp is fitted to the spring holding portion 352L2*b*, the other end is inserted from the opening portion 352L1*d* to be supported by the holding portion (not shown) at the back thereof, and then shafts 352L2*a* are inserted into the respective oblong round holes 352L1*h*. At that time, the free end portion 352L1*a* is assembled while being expanded, and therefore, a plastic material is preferable for the element 352L. In the case that the 352L is made of a hard material, the shafts 352L2*a* and 352L2 may be formed separately. For example, the shaft 352L2*a* may be finally press-fitted into the shaft 352L2 for the assembling.

By doing so, the upper movable member 352L1 and the lower movable member 352L2 are connected with each other by the oblong round hole 352L1*h* and the pair of shafts 352L2*a*, and the upper movable member 352L1 is urged away from the lower movable member 352L2 by the compression spring 352Lsp. Further, the lower movable member 352L2 is rotatably structured about the shaft 352L2*a* relative to the upper movable member 352L1. In addition, it is structured to be relatively movable in the direction along the oblong round hole 352L1*h*2 relative to the upper movable member 352L1.

[Description of Operation of Movable Member]

Next, referring to part (a) of FIG. 48 to part (d) of FIG. 48, the operation of the movable member 352L will be described. As described in the Embodiment 1, after the process cartridge 300 is completely inserted into the image forming apparatus main assembly 170, the movable member 352L is pressed by the cartridge pressing unit 190 in interrelation with the operation of closing the front door 11. The operation of the movable member 352L at that time will be described.

Figure 48:
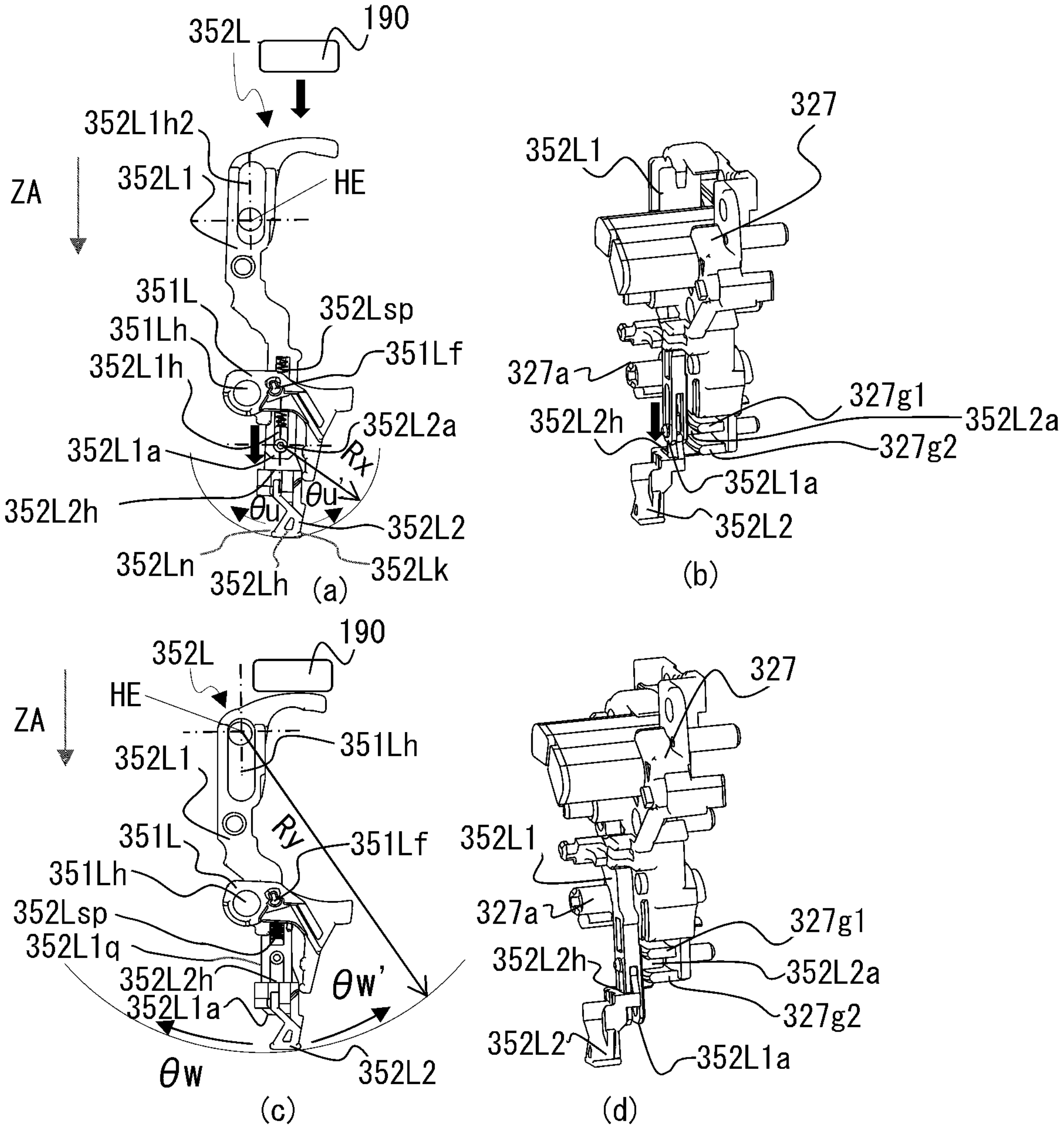
FIG. 48 is an illustration showing a relationship between a movable member, a spacer, and a non-drive-side bearing.

Part (a) of FIG. 48 and part (b) of FIG. 48 show a state in which the movable member 352L is not urged by the cartridge pressing mechanism 190 (free state), and part (c) of FIG. 48 and part (d) of FIG. 48 show a state (locked state) in which the movable member 352L is urged by the cartridge pressing mechanism 190.

First, referring to part (a) of FIG. 48 and part (b) of FIG. 48, the description will be made as to a state in which the movable member 352L is not urged by the cartridge pressing mechanism 190 (free state). As shown in part (b) of FIG. 48, a groove is formed between the arcuate guide ribs 327*g*1 and 327*g*2 extending arcuately about the swing axis HE of the non-drive-side bearing 327, and the shaft 352L2*a* fits in the groove.

The upper movable member 352L1 is movable in the longitudinal direction and the ZA direction of the oblong round hole and swingable around the axis HE, by fitting the oblong round hole 352L1*h*2 into the axis HE of the bearing 327. As described above, the lower movable member 352L2 can swing about the shaft portion 352L2*a* relative to the upper movable member 352L1. The cartridge pressing mechanism 190 urging the upper movable member 352L1, the upper movable member 352L1 can approach to the lower movable member 352L2.

With the above structure, in the state where the movable member 352L is not urged by the cartridge pressing mechanism 190 (free state) a, the lower movable member 352L2 can swing in the directions of arrows θu and θu' with a radius Rx about the shaft portion 352L2*a* as the center of rotation, as shown in part (a) of FIG. 48. Therefore, even if the first force receiving portion (retracting force receiving portion, the separating force receiving portion) 352Lk and the second force receiving portion (contact force receiving portion) 352Ln of the lower movable member 352L2 receive the force to swing in the directions of arrows θu and θu', the force urging the non-drive-side bearing 327 of the upper movable member 352L1 is not transmitted to the at-separation pressing portion 352L1*q*.

Figure 57:
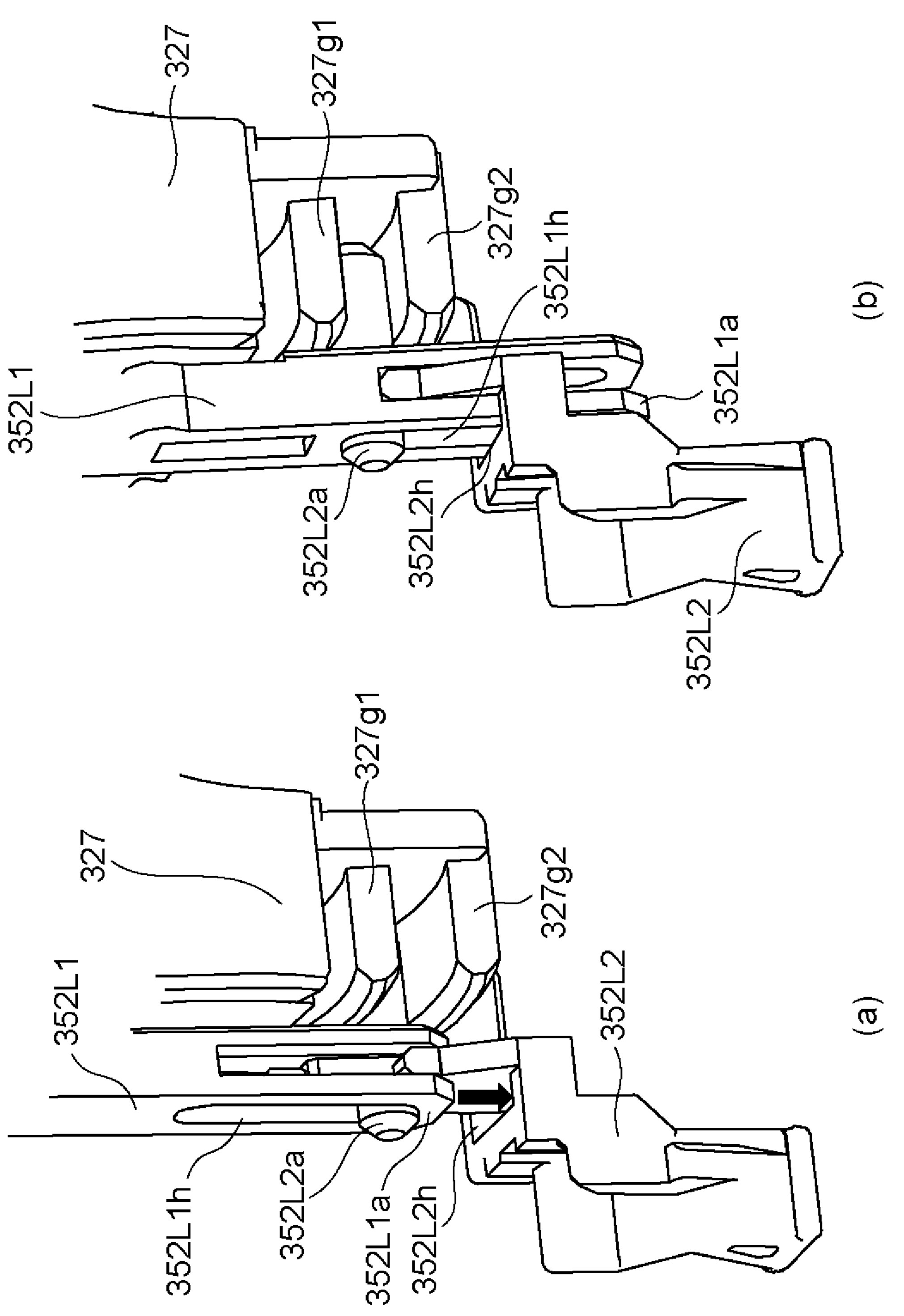
FIG. 57 is an illustration showing the relationship between the movable member and the non-drive-side bearing.

Next, referring to part (c) of FIG. 48 and part (d) of FIG. 48, the operation of the movable member 352L in the state of being urged by the cartridge pressing mechanism 190 (locked state) will be described. By pushing down the upper movable member 352L1 by the cartridge pressing mechanism 190, the upper movable member 352L1 moves toward the lower movable member 352L2 against the urging force of the spring 352Lsp, and as shown in part (c) of FIG. 48, part (d) of FIG. 48 and FIG. 57, the engaging portion (square shaft portion) 352L1*a* is fitted into the engaged portion (square hole portion) 352L2*h*, and the upper movable member 352L1 and the lower movable member 352L2 are made integral. That is, the lower movable member 352L2 becomes in a state in which the swinging around the shaft portion 352L2*a* relative to the upper movable member 352L1 is restricted. In this state, as shown in part (c) of FIG. 48, the integrated movable member 352L can swing in the directions of arrows θw and θw with the turning radius Ry shown in part (c) of FIG. 48, while the shaft 352L2*a* moves about the movable member swinging axis HE along the formed groove formed between the arcuate guide ribs 327*g*1 and 327*g*2 shown in part (d) of FIG. 48. Although the details will be described hereinafter, in the state of being pushed by the cartridge pressing mechanism 190, the movable member 352L can make the same movement as the movable member 152L in Embodiment 1.

Further, in a state where it is not urged by the pressing mechanism 190, the lower movable member 352L2 can swing with a turning radius Rx (see part (a) of FIG. 48 smaller than the turning radius Ry described above.

The spacer (holding member) 351L is urged to rotate clockwise to the portion 351Lf by the urging member 153

(not shown for simplicity in this embodiment) by the same structure as that of the Embodiment 1.

[Mounting of Process Cartridge to Image Forming Apparatus Main Assembly]

Figure 49:
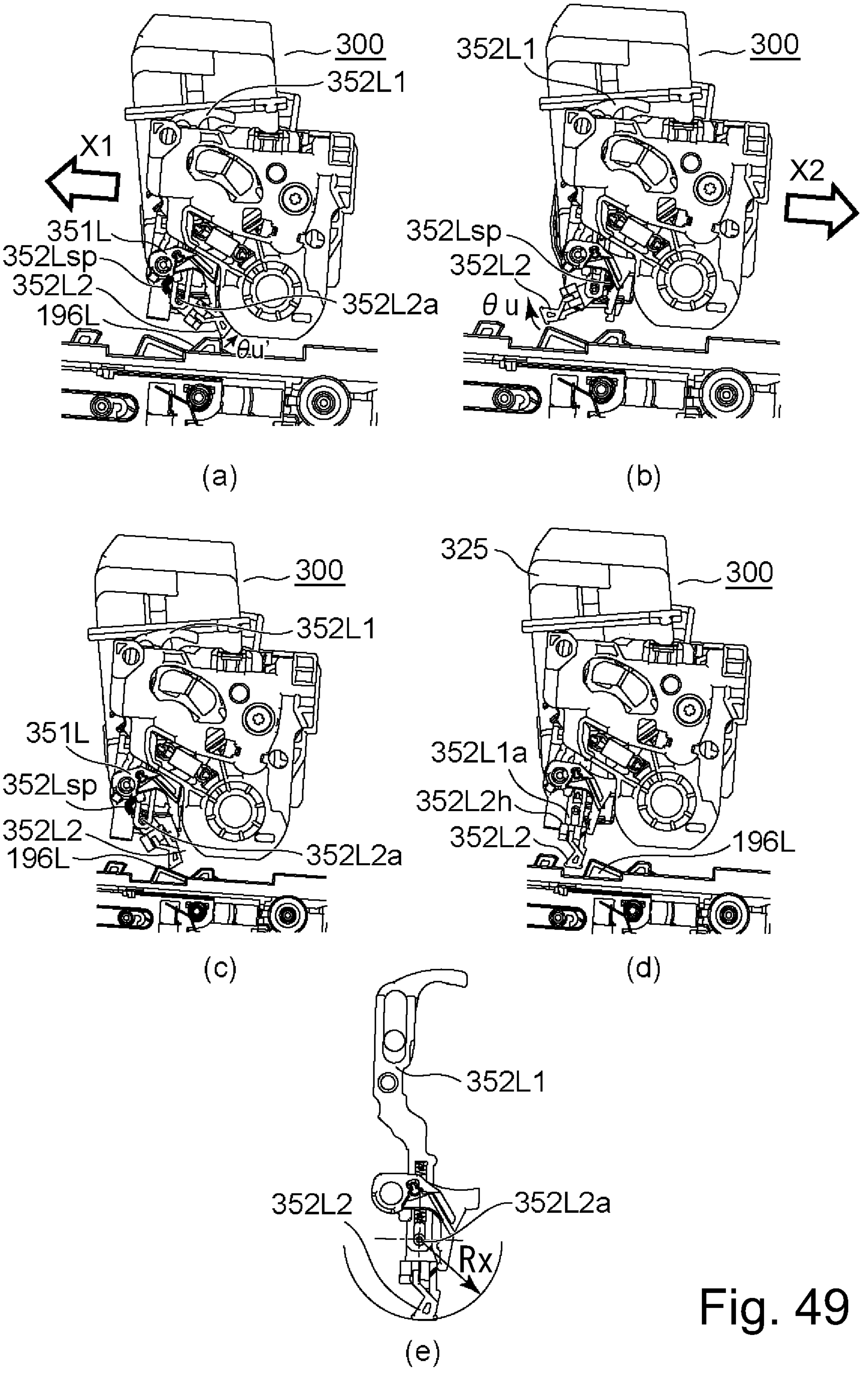
FIG. 49 is a side view of the process cartridge in the main assembly of the image forming apparatus and a view illustrating the relationship between the movable member and the spacer.

Next, referring to part (a) of FIG. 49 to part (d) of FIG. 49, the operation of the movable member 352L when the process cartridge is inserted in the Embodiment 3 will be described. Part (a) of FIG. 49 shows a state in which the process cartridge 300 is being inserted into the image forming apparatus main assembly 170. Part (b) of FIG. 49 shows a state in which the process cartridge 300 is being taken out of the image forming apparatus main assembly 170. Part (c) of FIG. 49 shows a state immediately after the process cartridge 300 is completely inserted into the image forming apparatus main assembly 170.

As described above, in the state where the upper movable member 352L1 is not pushed (free state), the lower movable member 352L2 can swing around the shaft portion 352L2*a* as shown in part (e) of FIG. 49. In this embodiment, the lower movable member 352L2 is in the same position as the constantly projecting position (see FIG. 35) of the movable member in the Embodiment 1. Therefore, when the process cartridge 300 mounted on the cartridge tray 171 (not shown) is inserted into the image forming apparatus main assembly 170 in the direction of the arrow X1 as in the Embodiment 1, the separation control member 196L and the lower movable member 352L2 interfere with each other.

However, because of the above-described structure, as shown in part (a) of FIG. 49, it can be avoided that the lower movable member 352L2 swings in the direction of arrow θu about the shaft portion 352L2*a* as the center of rotation, with the result that the separation control member 196L and the lower movable member 352L2 interfere with each other, thus preventing it from being inserted into the main assembly 170.

At this time, the lower movable member 352L2 presses the spacer 351L by swinging in the direction of the arrow θu to move the spacer 351L from the separation holding position to the separation release position, so that the developing unit 109 moves to the developing position (contact position). However, after that, when the power of the image forming apparatus main assembly 170 is turned on, the separation control member 196L reciprocates in the W42 direction and the W41 direction, and therefore, the developing unit 109 returns to the separating position (retracted position) again when the preparation for the image formation preparation is completed.

Figure 50:
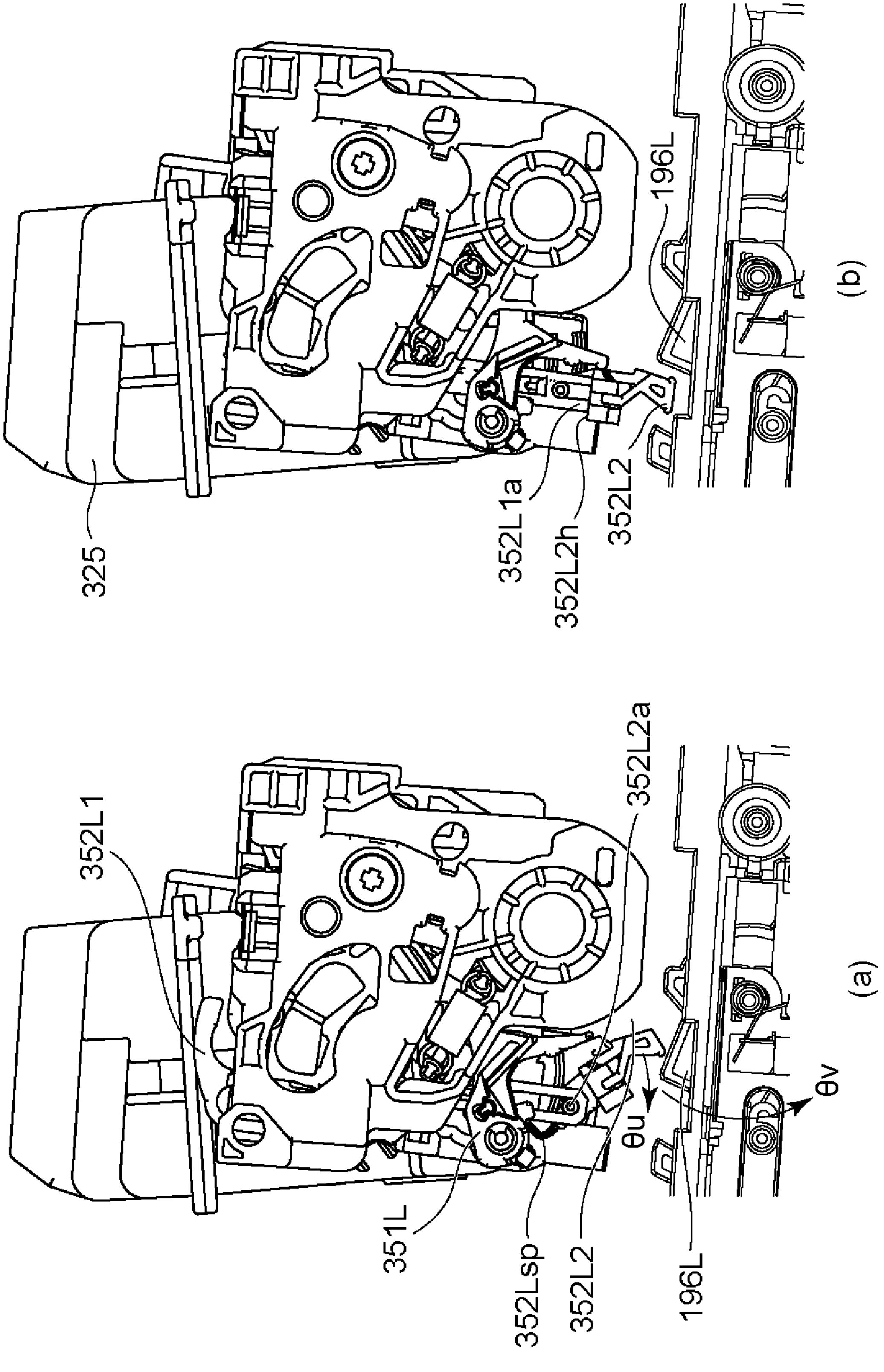
FIG. 50 is a side view of the process cartridge in the image forming apparatus main assembly.
Figure 51:
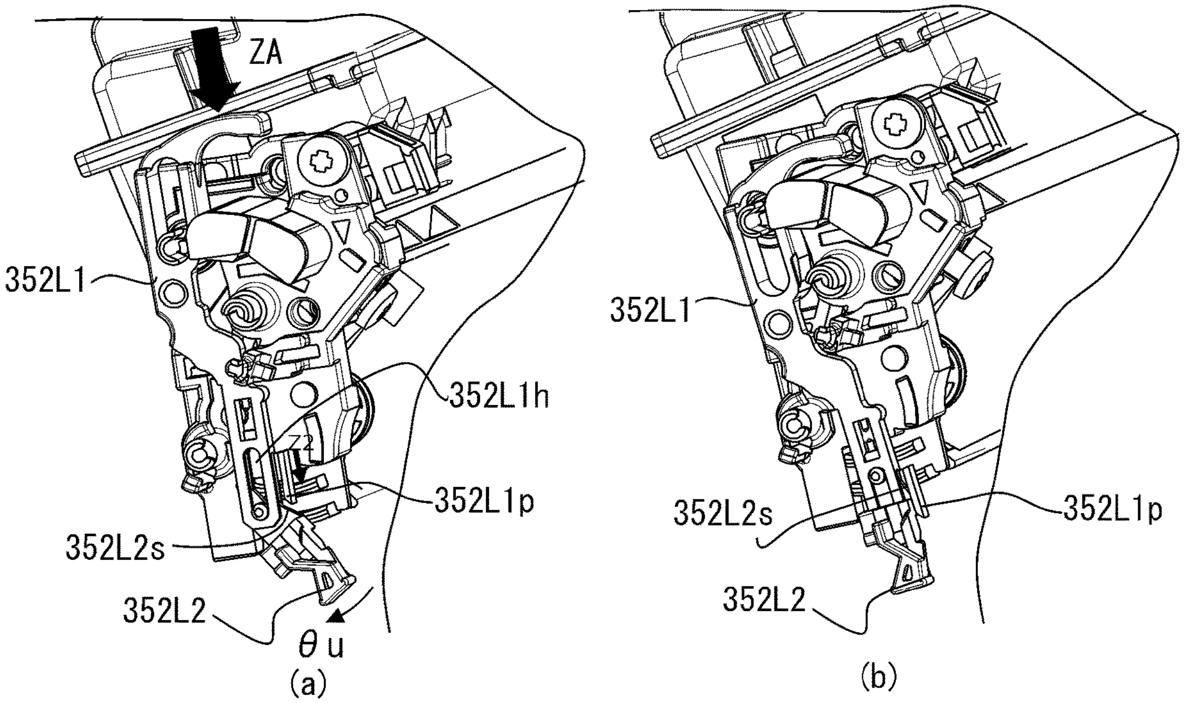
FIG. 51 is a partial perspective view of the process cartridge in the image forming apparatus main assembly.

Further, as shown in part (a) of FIG. 50, the lower movable member 352L2 comes into contact with the separation control member 196L in a state where the cartridge tray 171 is completely inserted into the apparatus main assembly 170, with the result that the state shown in part (b) of FIG. 50 is not reached and it stops at a position partway. Referring to FIGS. 50 and 51, a method for surely avoiding such a state will be described.

First, as shown in part (a) of FIG. 51, the upper movable member 352L1 is provided with a projection 352L1*p* functioning as a rotation assisting portion. Further, the lower movable member 352L2 is provided with a slope 352L2*s*. When the upper movable member 352L1 descends, the projection 352L1*p* comes into contact with the slope 352L2*s* to rotate the lower movable member 352L2 in the direction of the arrow θu. By doing so, as shown in part (a) of FIG. 50, the lower movable member 352L2 rotates in the direction of arrow θu, and while pushing down the separation control member 196L in the direction of arrow θu, it rotates to the position shown in part (b) of FIG. 50.

Figure 52:
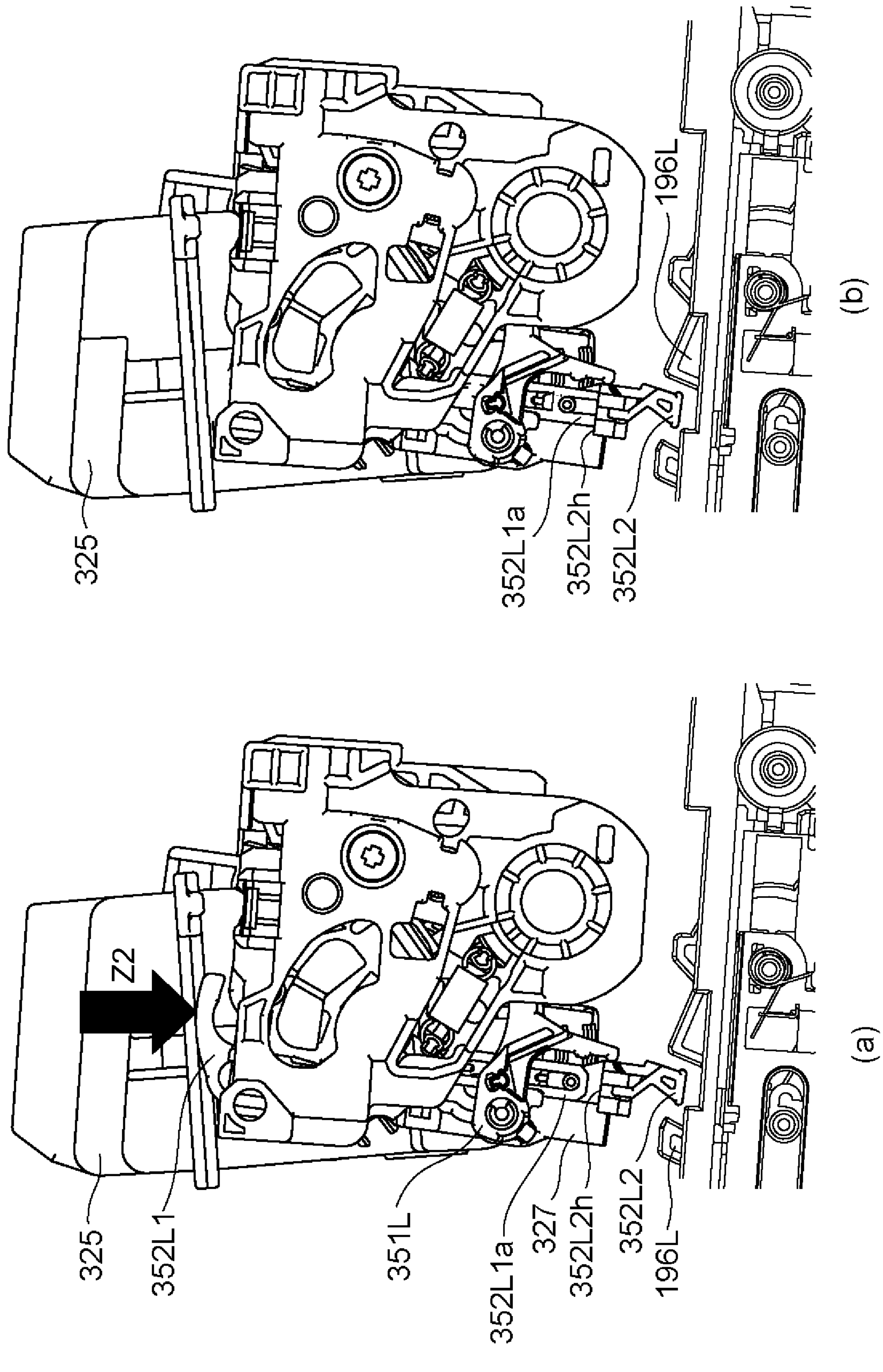
FIG. 52 is a side view of the process cartridge in the image forming apparatus main assembly.

Next, when the process cartridge 300 is inserted into the image forming apparatus main assembly 170 and the front door 11 is closed, the movable member 352L is pushed down in the direction of ZA by the cartridge pressing mechanism 190 (FIG. 37 and the like) as described in the foregoing by the arrow shown in part (a) of FIG. 52. Then, as shown in part (b) of FIG. 52, the engaging portion (square shaft portion) 352L1*a* fits into the engaged portion (square hole portion) 352L2*h*. That is, the upper movable member 352L1 and the lower movable member 352L2 are made integral, and play the substantially same role as the movable member 152L of the Embodiment 1.

[Dismounting of Process Cartridge from Image Forming Apparatus Main Assembly]

On the contrary, as shown in part (b) of FIG. 49, when the process cartridge 300 is taken out of the main assembly of the image forming apparatus in the direction of the arrow X2, the separation control member 196L and the lower movable member 352L2 interfere with each other.

However, as described above, since the movable member 352L1 is in a free state, when receiving the force by the first force receiving portion (retracting force receiving portion, the spacing force receiving portion) 352 Lk, the lower movable member 352L2 rotates about the shaft portion 352L2*a* as the center of rotation in the direction of arrow θu. However, the force received by the first force receiving portion (retracting force receiving portion, separating force receiving portion) 352Lk is not transmitted to the at-separation pressing portion 352L1*q* which presses the non-drive-side bearing 327 of the developing unit 109 of the upper movable member 352L1. That is, the movable member 352L1 cannot move the developing unit 109. This state is the transmission disabled state in which the transmission of the pressing force does not occur. Therefore, it is possible to prevent occurrence of the state that the separation control member 196L and the lower movable member 352L2 interfere with each other with the result of incapability of removing the it from the apparatus main assembly 170. In this embodiment, the process cartridge is usable with the color image forming apparatus. Therefore, there are four process cartridges and four separation control members. And, depending on the station, the operation shown in FIG. 49 may be repeated four times at the maximum.

Figure 56:
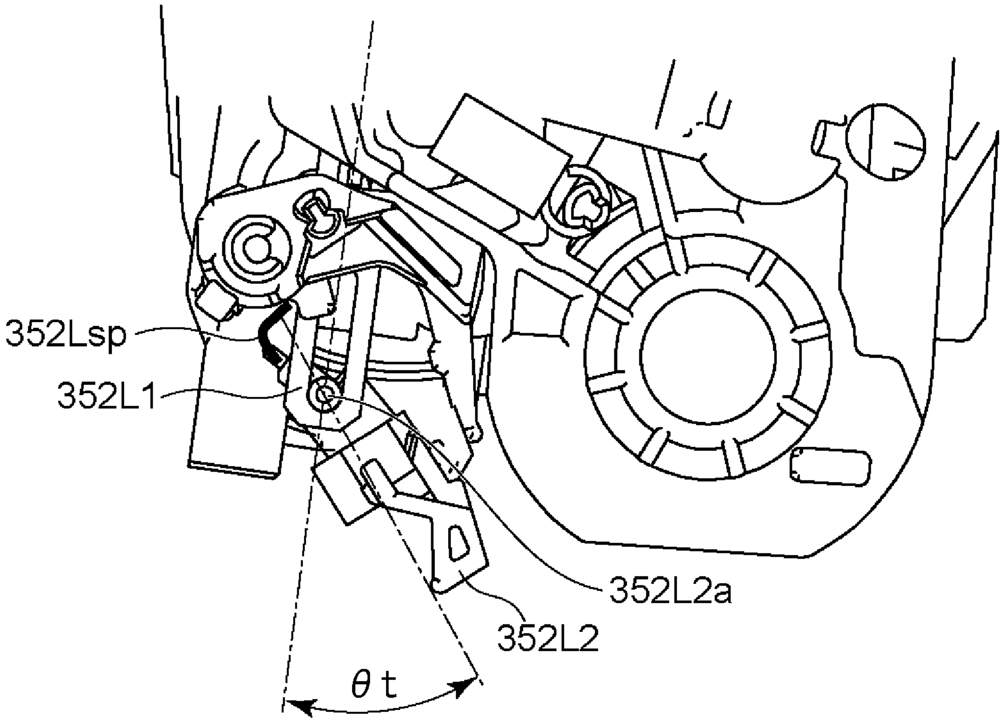
FIG. 56 is a partially enlarged view of a side surface of the process cartridge.

The lower movable member 352L2 is structured to return from the position shown in part (c) of FIG. 49, for example, to the neutral position shown in part (d) of FIG. 49 (the position in which the upper movable member 352L1 shown in FIG. 56 and the lower movable member 352L2 form an angle θt (=0°) by the restoring force of the compression spring 352Lsp.

[Contact/Separation Operations of Developing Unit]

Figure 53:
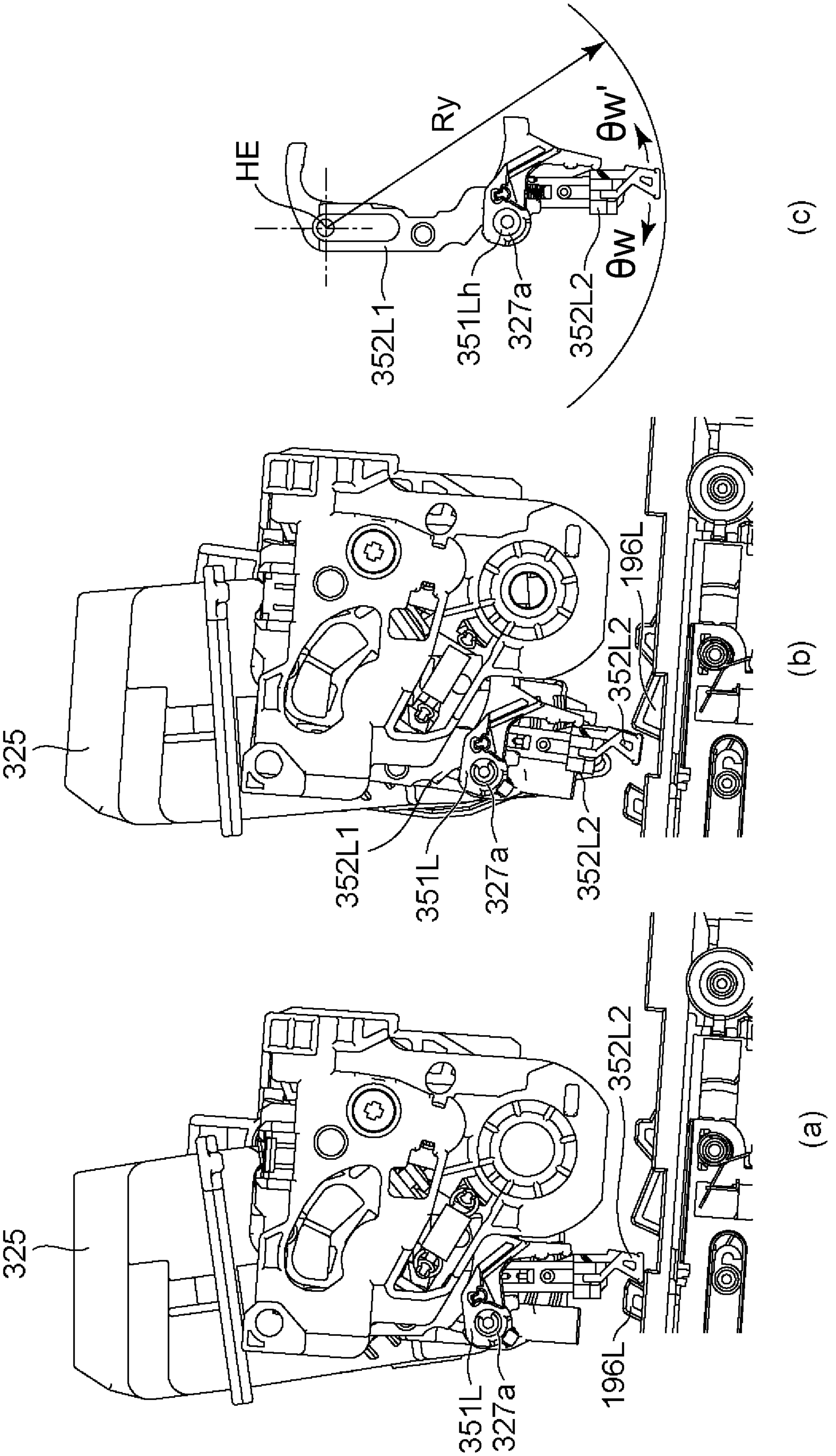
FIG. 53 is a side view of the process cartridge in the main assembly of the image forming apparatus and a view illustrating the relationship between the movable member and the spacer.

Part (a) of FIG. 53 shows the moment of contact between the developing roller 106 and the photosensitive drum 104, part (b) of FIG. 53 shows the separating operation of the developing unit 109, and part (c) of FIG. 53 shows the details of the movable member 352. The movable member 352L is in a locked state and can play substantially the same role as the movable member 152L shown in the Embodiment 1. Therefore, the movable member 352L receives the force from the separation control member 196L and acts on the spacer 351L to release the separation. The member to be contacted with the spacer 351L may either be the upper movable member 352L1 or the lower movable member 352L2. That is, the at-contact pressing portion which presses the spacer 351L upon the contact operation may be provided on at least one of the upper movable member 352L1 and the lower movable member 352L2. Further, in the separating operation, a force is received from the separation control member 196L, and the at-separation pressing portion 352L1*q* of the upper movable member 352L1 integrated with the lower movable member 352L2 is brought into contact with the shaft portion 327*a*, so that the entire developing frame 325 swings. This state is a transmission state in which the force received by the first force receiving portion 352Lk can be transmitted to the at-separation pressing portion 352L1*q*, to move the non-drive-side bearing 237 so as to move the developing unit 109 from the developing position to the retracted position. And, the spacer 351L moves through the same operation as in the Embodiment 1 to maintain the separated state.

[Structure of Drive-Side Separation/Contact Mechanism]

Figure 54:
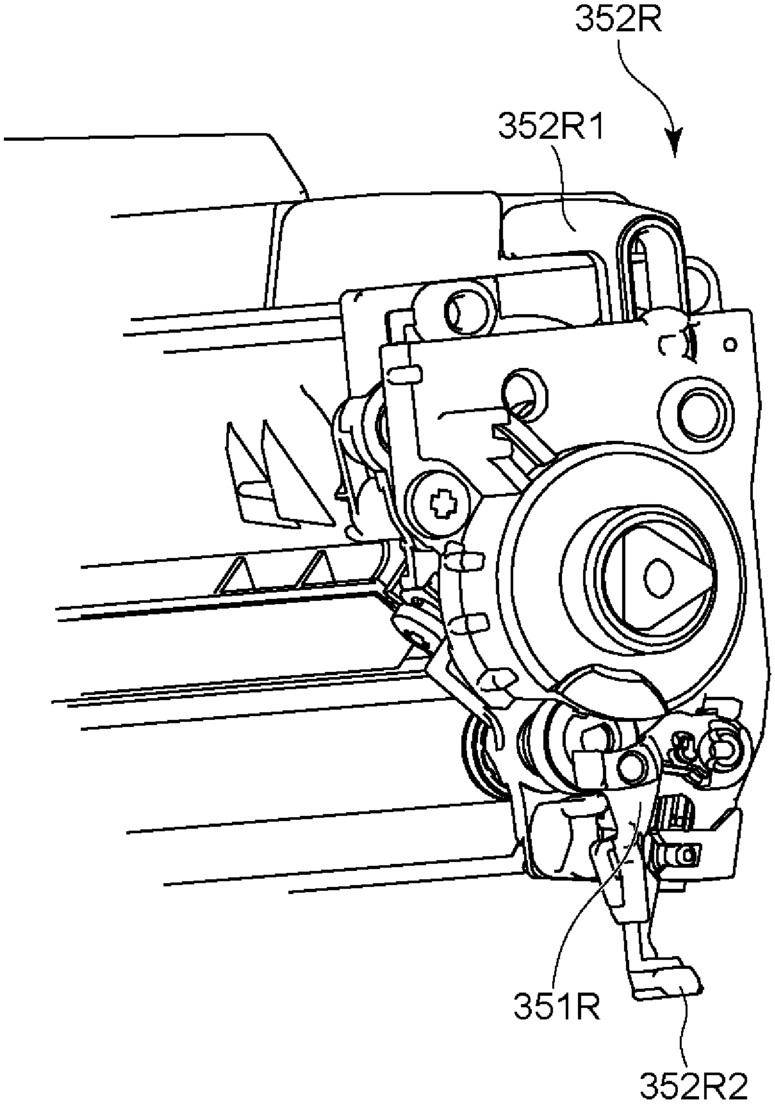
FIG. 54 is a perspective view of the developing unit.

FIG. 54 is an external view illustrating the structure of the drive-side of the developing unit portion of the process cartridge 300. In this embodiment, the structure has been described using the separation/contact mechanism on the non-drive-side, but since the structure on the drive-side is analogous, and therefore detailed description is omitted. The movable member 352R on the drive-side is a member corresponding to the movable member 152R in the Embodiment 1, and has a structure in which the upper movable member 352R1 and the lower movable member 352R2 are connected with each other in the same manner as with the movable member 352L on the non-drive-side.

[Driving Side and Non-Drive-Side Separation/Contact Mechanisms]

Figure 55:
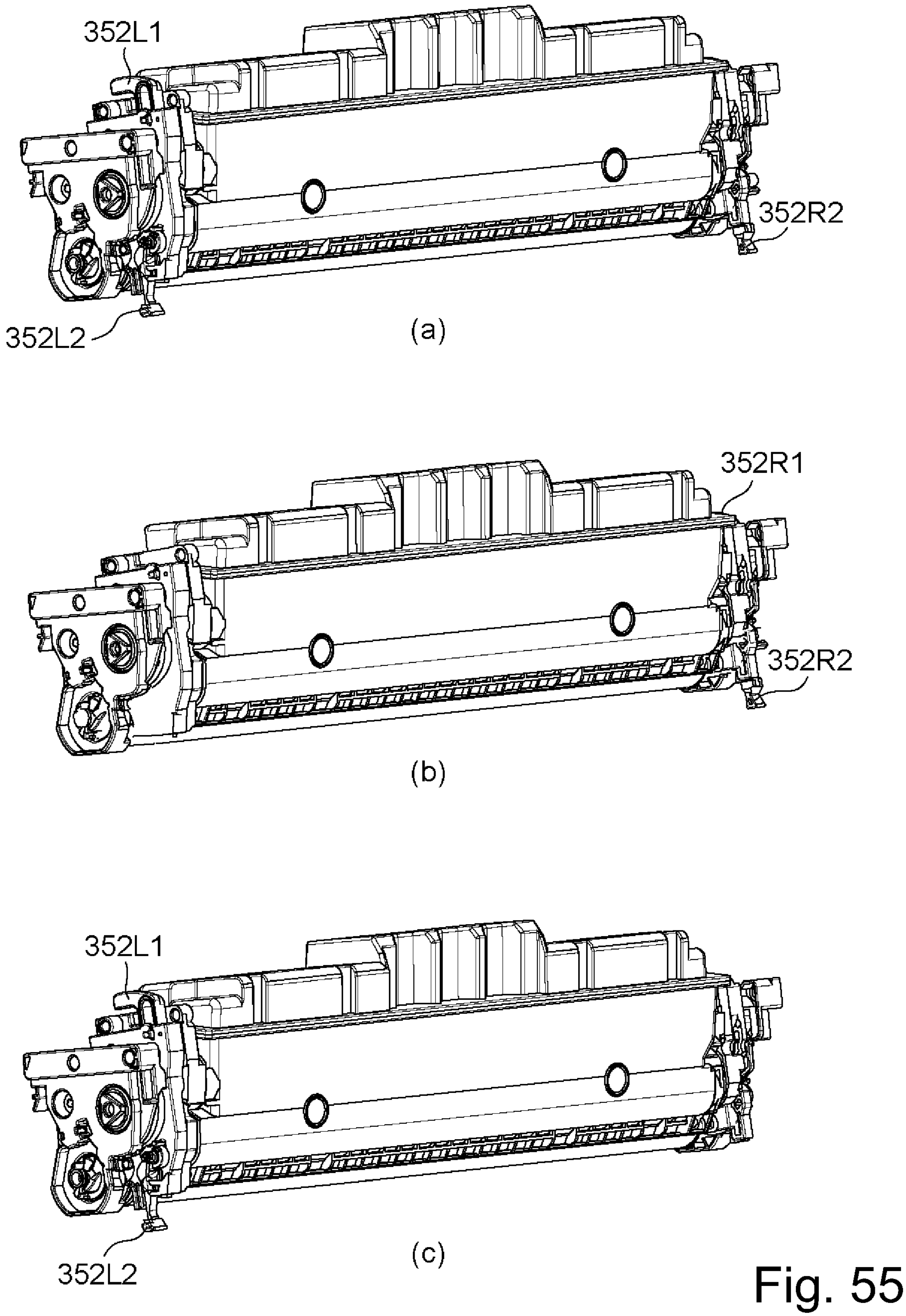
FIG. 55 is a perspective view of the process cartridge.

FIG. 55 is a perspective view of the process cartridge 300 as viewed from the developer side. In this embodiment, as shown in part (a) of FIG. 55, the movable member 352L is provided on the non-drive-side, and the movable member 352R is provided on the drive-side. As another example, as shown in part (b) of FIG. 55, the movable member 352L may be provided only on the non-drive-side. Further, as shown in part (c) of FIG. 55, the movable member 352R may be provided only on the drive-side.

According to the structure of this embodiment described above, the same effect as that in the Embodiment 1 can be provided.

Further, in this embodiment, the lower movable member 352L2 including the first force receiving portion (retracting force receiving portion, the separating force receiving portion) 352Lk and the second force receiving portion (contact force receiving portion) 352Ln is movable relative to the upper movable member 352L1 and other portions of the process cartridge 300. In this embodiment, by this movement, the first force receiving portion 352Lk and the second force receiving portion 352Ln are displaced in the ZA direction, by which it is displaced at least in the direction VD1 (FIG. 40, and so on), the direction VD10 (FIG. 236, and so on), and the direction VD12 (FIG. 238), and in direction VD14 (FIG. 239). Then, the movable member 352L2 can be switched between a movable state (free state) and a state fixed to the upper movable member 352L1 (locked state), depending on the position of the upper movable member 352L1. By this, it can be avoided that when the process cartridge 300 is inserted into or removed from the apparatus main assembly 170, the lower movable member 352L2 and the apparatus main assembly 170, particularly the separation control member 196L, interfere with each other with the result of incapability of insertion and removal of the process cartridge.

Embodiment 4

Next, referring to FIG. 58 to FIG. 66, Embodiment 4 will be described.

In this embodiment, structures and operations different from those of the above-described embodiment will be mainly described, and description of similar structures and operations will be omitted. For the structure corresponding to that in the above-described embodiments, the same reference numerals and characters are assigned, or the reference numerals in the first part is changed while the reference numerals and characters in the second part are the same. The spacer 651L has the same structure as the spacer 151L.

[Structure of Movable Member]

Figure 58:
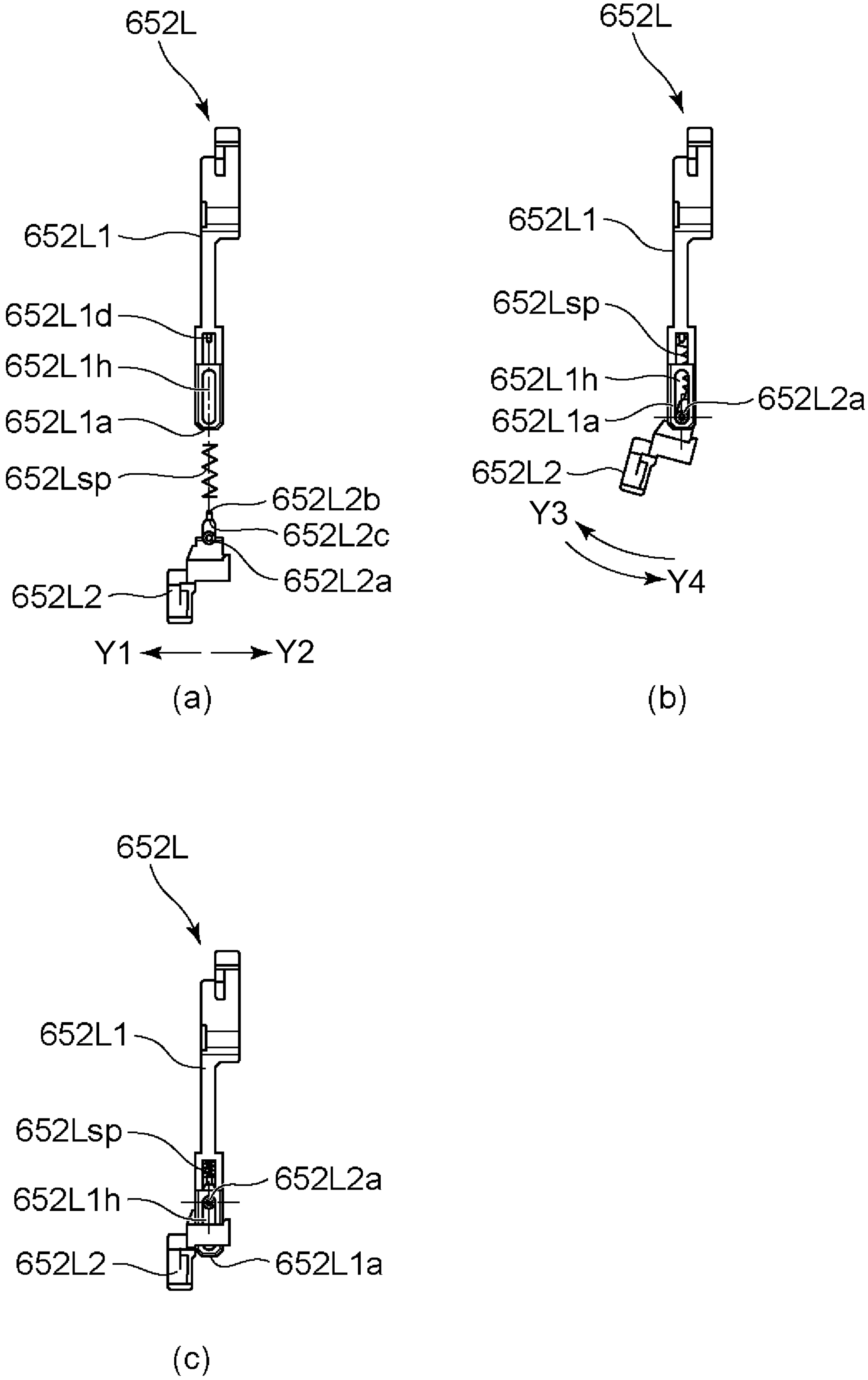
FIG. 58 is an illustration of a movable member.
Figure 62:
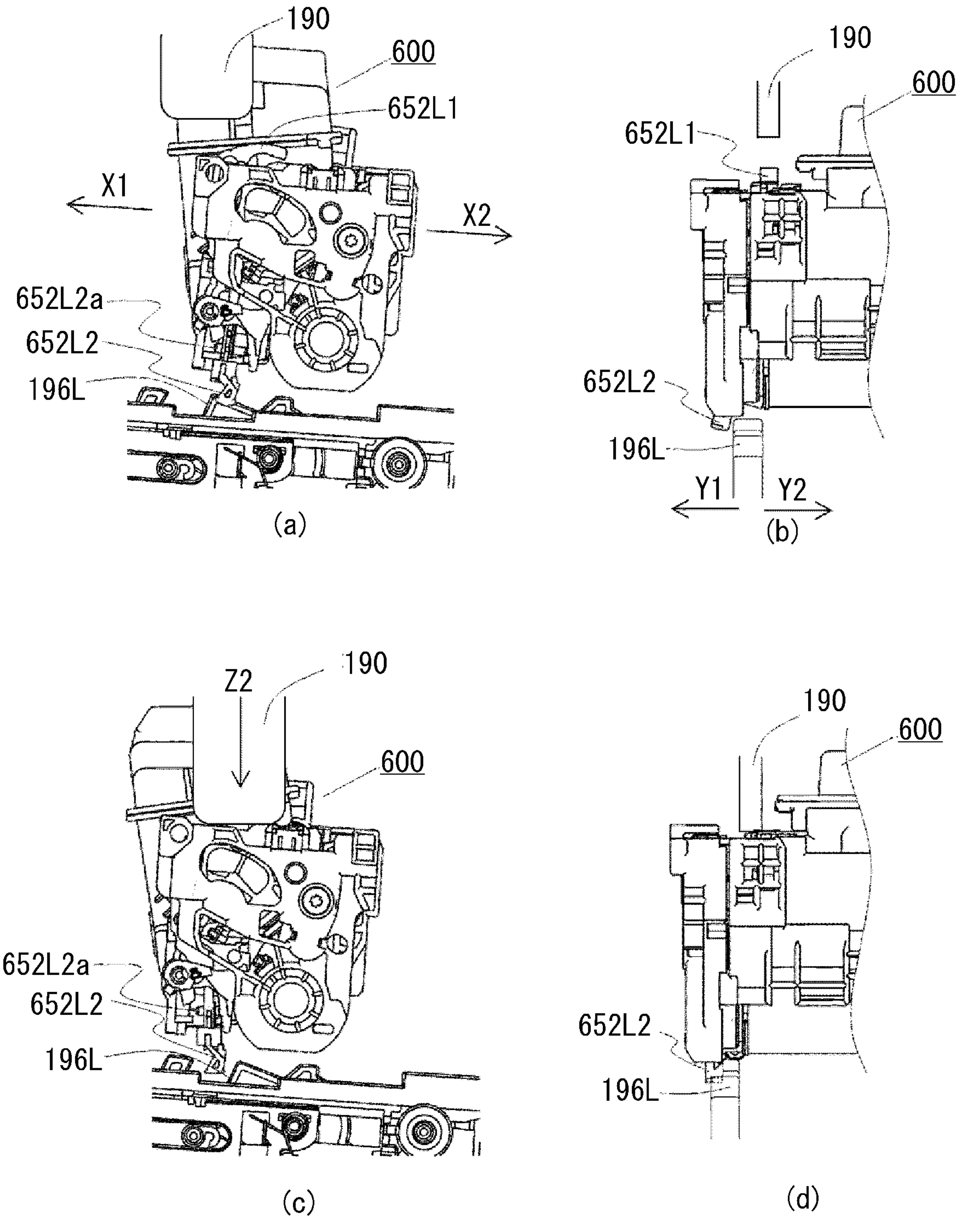
FIG. 62 is an illustration of the operation of the movable member.

First, the structure of the movable member will be described by taking the non-drive-side as an example. FIG. 58 is an illustration of disassembly and assembly of the movable member 652L on the non-drive-side which will be described in Embodiment 6. In Embodiment 6, as shown in FIG. 62, the movable member corresponding to the movable member 152L in the Embodiment 1 avoids the interference with the separation control member 196L in the longitudinal direction (Y1, Y2), in the process of inserting and removing the process cartridge 600 into the image forming apparatus main assembly 170. The directions Y1 and Y2 are parallel to the rotation axis M1 of the photosensitive drum 104 and the rotation axis M2 of the developing roller 106 of the Embodiment 1. The insertion/removal of the movable member while avoiding the separation control member 196L will be described hereinafter.

As shown in FIG. 58, the specific structure of the movable member 652L is a two-divided structure of an upper movable member 652L1 and a lower movable member 652L2. Part (a) of FIG. 58 shows a state before assembling the upper movable member 652L1 and the lower movable member 652L2. Part (b) of FIG. 58 and part (c) of FIG. 58 show the state after the upper movable member 652L1 and the lower movable member 652L2 are assembled. In the upper movable member 652L1, a pair of oblong round holes 652L1*h* are provided so as to oppose each other in the X1 and X2 directions, at the position overlapping with the lower movable member 652L2 in the direction of inserting and removing the process cartridge relative to the image forming apparatus main assembly (X1, X2 directions, FIG. 62). The lower movable member 652L2 is provided with the shaft 652L2*a*. Further, as shown in part (a) of FIG. 48, the lower movable member 652L2 is provided with a projecting portion 652Lh capable of projecting from the developing unit in the ZA direction, and the projecting portion 652Lh includes a first force receiving portion (retracting force receiving portion, separating force receiving portion) 652Lk and a second force receiving portion (contact force receiving portion) 652Ln. A compression spring 652Lsp is provided between the upper movable member 652L1 and the lower movable member 652L2. One end of the compression spring 652Lsp is supported by the upper holding portion 652L1*d* of the upper movable member 652L1, the other end is seated on the seating surface 652L2*c* of the lower holding portion 652L2*b*, and then the shaft 652L2*a* is engaged with the oblong round hole 652L1*h*.

When assembling the movable member 652L in this manner so that the shaft 652L2*a* fits into the oblong round hole 652L1*h*, the free end portion 652L1*a* of the upper movable member 652L1 is expanded and assembled, so that it is preferably made of a plastic material. In the case that the movable member 652L is made of a hard material, the shaft 652L2*a* and the lower movable member 652L2 may be formed separately. For example, the shaft 652L2*a* may be finally press-fitted into the lower movable member 652L2.

Figure 59:
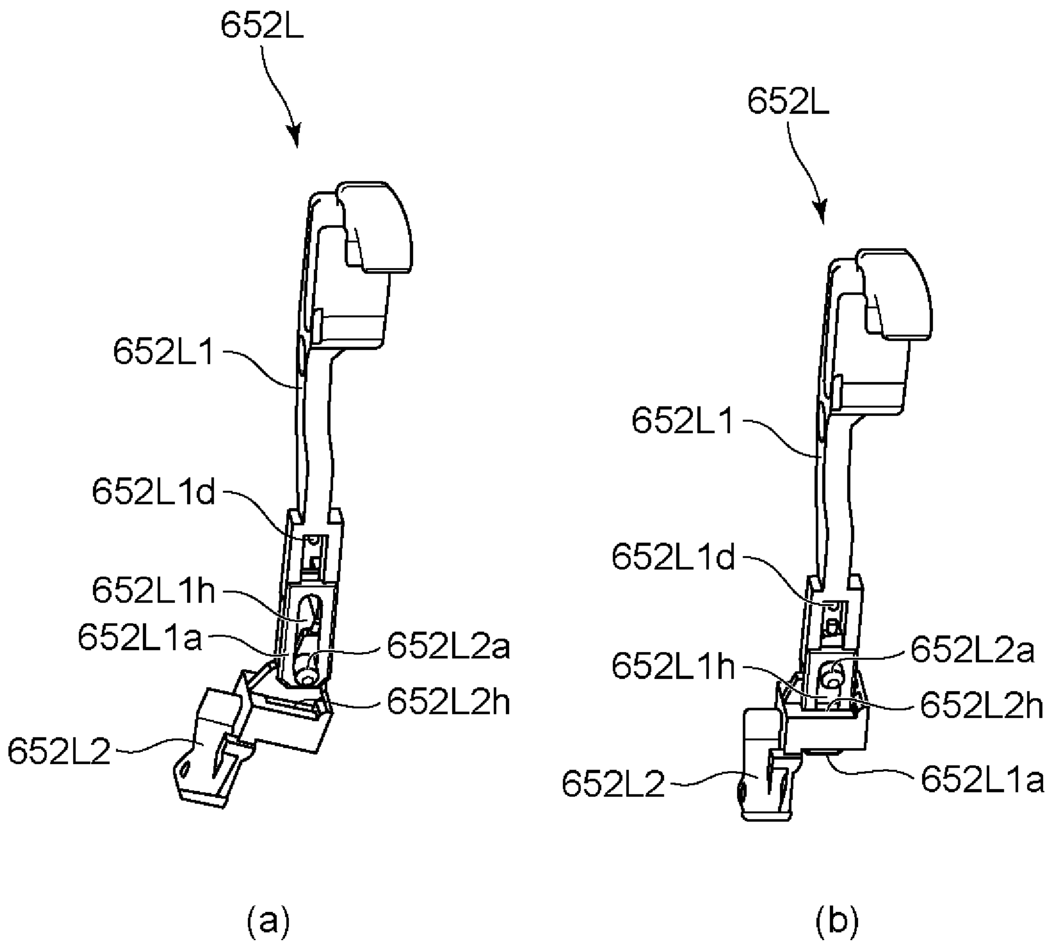
FIG. 59 is an illustration of a movable member.

FIG. 59 is a perspective view of the upper movable member 652L1 and the lower movable member 652L2 of a two-divided structure (compression spring 652Lsp is not shown).

The upper movable member 652L1 and the lower movable member 652L2 of the assembled movable member 652L can take the following two states. One of them is a state in which the shaft 652L2*a* of the lower movable member 652L2 is located at a position away from the upper holding portion 652L1*d* relative to the center of the oblong round hole 652L1*h* of the upper holding portion 652L1*d*, as shown in part (b) of FIG. 58 and part (a) of FIG. 59. The other is in a state where the shaft 652L2*a* of the lower movable member 652L2 is located close to the upper holding portion 652L1*d* relative to the center of the oblong round hole 652L1*h* of the upper holding portion 652L1*d* as shown in part (c) of FIG. 58 and part (b) of FIG. 59.

In a state where the shaft 652L2*a* shown in part (b) of FIG. 58 and part (a) of FIG. 59 is located away from the upper holding portion 652L1*d* relative to the center of the oblong round hole 652L1*h*, the lower movable member 652L2 supports only the shaft 652L2*a* and can swing in the directions of arrows Y3 and Y4 about the shaft 652L2*a* (free state), with respect to the upper movable member 652L1. In this free state, the lower movable member 652L2 supports only the shaft 652L2*a* and is kept swingable with respect to the upper movable member 652L1 by the force of the compression spring 652Lsp provided between the upper holding portion 652L1*d* of the upper movable member 652L1 and the seating surface 652L2*c* of the lower holding portion 652L2*b*.

In a state where the shaft 652L2*a* shown in part (c) of FIG. 58 and part (b) of FIG. 59 is located close to the upper holding portion 652L1*d* relative to the center of the oblong round hole 652L1*h*, the free end portion 652L1*a* of the upper movable member 652L1 is in the square hole portion 652L2*h*, so that the lower movable member 652L2 is restricted from swinging about the shaft 652L2*a* (locked state). This locked state is the state when the upper movable member 652L1 which will be described hereinafter is pressed by the image forming apparatus main assembly, and the upper movable member 652L1 is integral with the lower movable member 652L2.

[Description of Operation of Movable Member]

Figure 60:
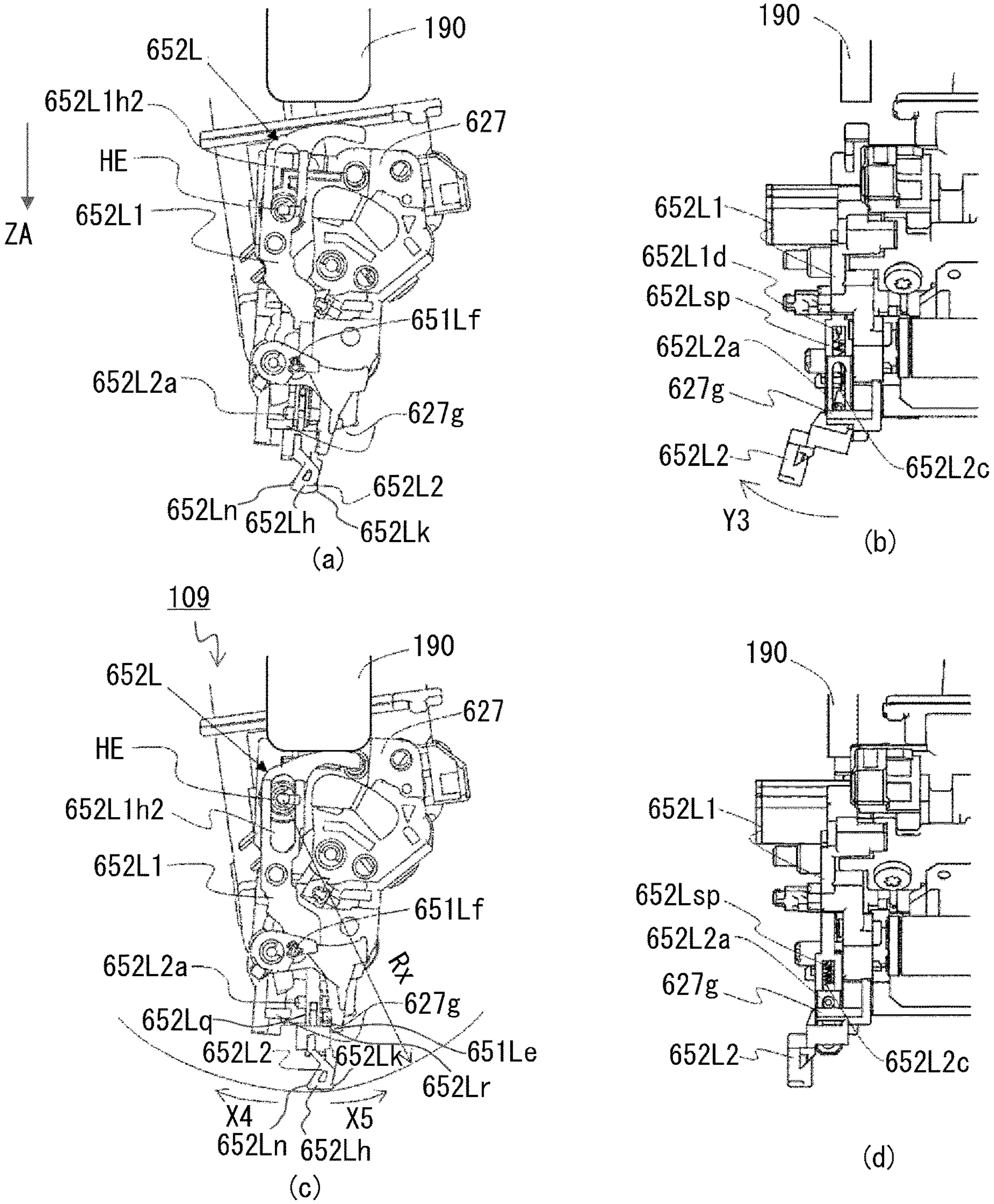
FIG. 60 is an illustration of operation of the movable member.
Figure 61:
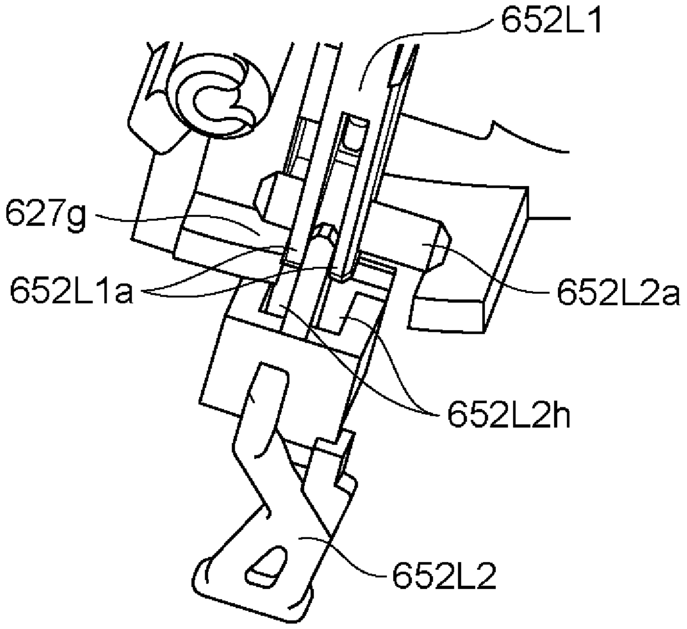
FIG. 61 is an illustration of the operation of the movable member.
Figure 61:
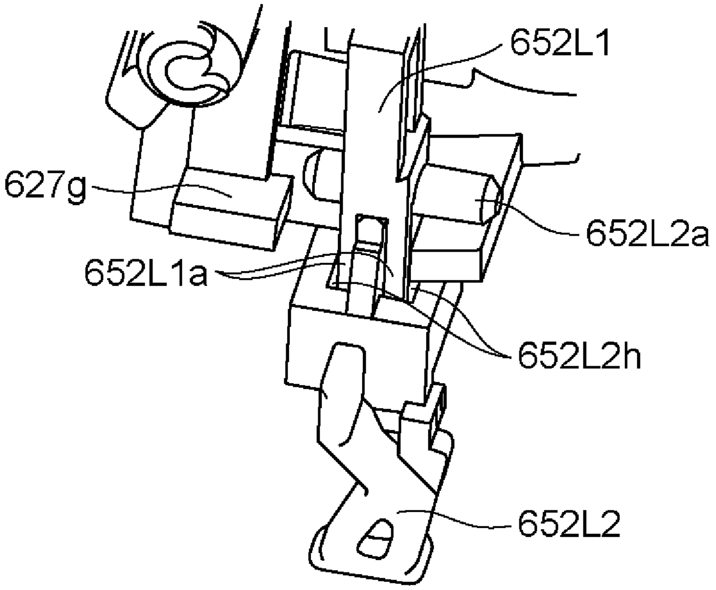

Next, the operation of the movable member 652L will be described referring to part (a) of FIG. 60 to part (d) of FIG. 60. As described in the Embodiment 1, after the process cartridge 600 is completely inserted into the image forming apparatus main assembly 170, the movable member 652L is urged by the cartridge pressing unit 190 in interrelation with the operation of closing the front door 11. The operation of the movable member 652L at that time will be described. Part (a) of FIG. 60 and part (b) of FIG. 61 are in the free state as described referring to part (b) of FIG. 58 and part (a) of FIG. 59, in which the movable member 652L is not urged by the cartridge pressing mechanism in the image forming apparatus main assembly. Part (c) of FIG. 60, Figure (d) and part (b) of FIG. 61 are in the locked state shown in part (c) of FIG. 58 and part (b) of FIG. 59, in which the movable member 652L is pushed by the mechanism 190 in the image forming apparatus main assembly.

Referring to part (a) of FIG. 60 and part (b) of FIG. 60 first, a state in which the imparting member 652L is not pressed by the cartridge pressing mechanism 190 (free state) will be described. In the process cartridge 600, the upper movable member 652L1 can move in the longitudinal direction and the ZA direction of the oblong round hole and can swing around the swing shaft HE by the oblong round hole 652L1*h*2 fitting around the swinging shaft HE of the bearing 627. At this time, the lower movable member 652L2 is in a state where it can swing about the shaft portion 652L2*a* relative to the upper movable member 652L1 as described above.

Figure 63:
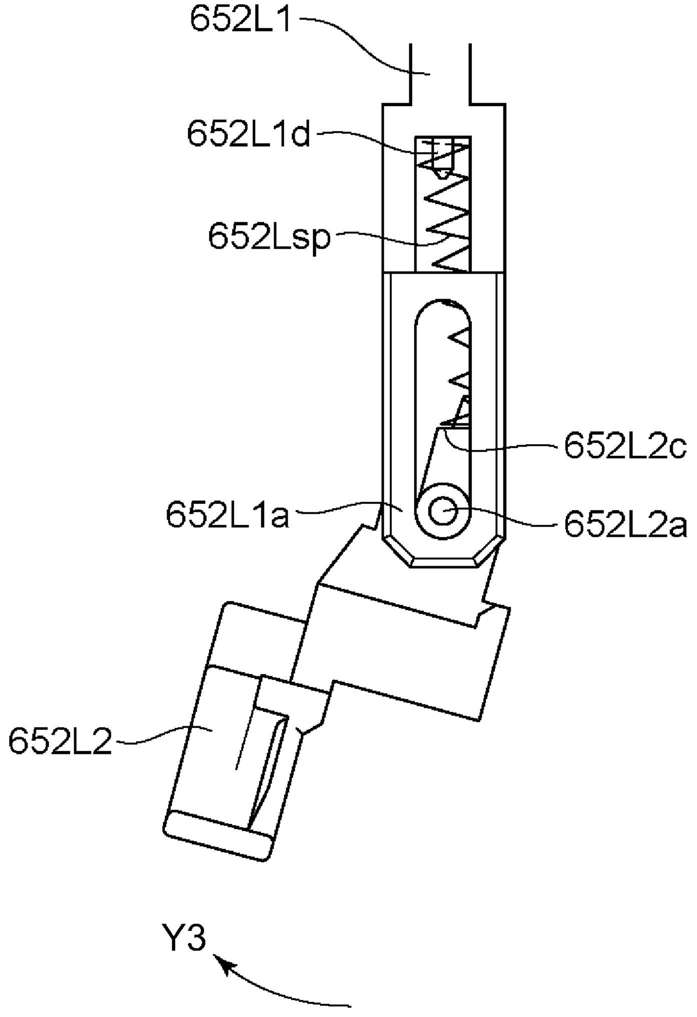
FIG. 63 is an illustration of the operation of the movable member.

In this swingable state (free state), the lower movable member 652L2 avoids engagement with the separation control member 196L which engages with the movable member described in the Embodiment 1 when it is inserted into and removed from the image forming apparatus main assembly as will be described hereinafter. For example, as shown in FIG. 63 in which the seating surface 652L2*c* portion shown in part (b) of FIG. 60 and part (b) of FIG. 60 is enlarged, the lower movable member 652L2 receives the urging force of the compression spring 652Lsp by which the state of having swung relative to the upper movable member 652L1 in the Y3 direction is maintained to effect the avoidance. To accomplish this, the seating surface 652L2*c* of the lower movable member 652L2 faces the upper holding portion 652L1*d* of the upper movable member 652L1 in a state where the lower movable member 652L2 swings in the Y3 direction. By this, the swung state is maintained by the moment acting on the lower movable member 652L2 about the shaft portion 652L2*a* in the Y3 direction so that the seating surface 652L2*c* faces the upper holding portion 652L1*d* by the elastic force of the compression spring 652Lsp provided between the upper movable member 652L1 and the lower movable member 652L2.

Next, referring to part (c) of FIG. 60 and part (d) of FIG. 60, the operation of the movable member 652L in a state of being urged by the cartridge pressing mechanism 190 (locked state) will be described.

By pushing down the cartridge pressing mechanism 190, the upper movable member 652L1 moves toward the lower movable member 652L2 against the spring 652Lsp. The lower movable member 652L2 is urged in the direction in which the cartridge pressing mechanism is urged down by the shaft 652L2*a* coming into contact with the arcuate guide rib 627*g* of the bearing 627. Then, as shown in part (c) of FIG. 60 part (d) of FIG. 60 and part (b) of FIG. 61, the free end portion 652L1*a* of the upper movable member 652L1 which has moved toward the lower movable member 652L2 enters the square hole portion 652L2*h*, by which the movable member 652L2 swings around the shaft 652L2*a*, and the upper movable member 652L1 and the lower movable member 652L2 are integrated as described above. In this state, as shown in part (c) of FIG. 60, the integrated movable member 652L swings in the X4 direction and the X5 direction with the turning radius Rx about the movable member swinging axis HE as the center of rotation. In this state, when a force is received by the first force receiving portion (retracting force receiving portion, separating force receiving portion) 652Lk, the movable member 652L rotates in the X4 direction so that the at-separation pressing portion 652Lq urges the arcuate guide rib 627*g* which is the at-separation urged portion of the bearing 627. By this, the developing unit 109 can be moved in the direction from the development position to the retracted position. In this state, when a force is received by the second force receiving portion (contact force receiving portion) 652Ln, the movable member 652L rotates in the X5 direction, and the at-contact pressing portion 652Lr urges the at-contact urging portion 621Le of the spacer 651L. By this, the spacer 651L can be moved from the restriction position (first position) to the permission position (second position). When the movable member 652L is locked in this manner, it is in a transmittable state in which the forces received by the first force receiving portion (retracting force receiving portion, separating force receiving portion) 652Lk and the second force receiving portion (contact force receiving portion) 652Ln can be transmitted to the at-separation urging portion 652Lq and the at-contact urging portion and the at-contact pressing portion 652Lr.

Although the details will be described hereinafter, in the state of being urged by the cartridge pressing mechanism 190, the movable member 652L can make the same movement as the movable member 152L in the Embodiment 1. The spacer (holding member) 651L is urged to rotate clockwise by the urging member 153 (not shown for simplicity in this embodiment) on the 651Lf portion in the same structure as in the Embodiment 1.

[Mounting of Process Cartridge to Image Forming Apparatus Main Assembly]

Next, referring to part (a) of FIG. 62 to part (d) of FIG. 62, the operation of the movable member 652L at the time of inserting the process cartridge in the Embodiment 6 will be described. Part (a) of FIG. 62 is an illustration showing a state in the process of inserting and removing the process cartridge 600 into the image forming apparatus main assembly 170, as viewed in the longitudinal direction. Part (b) of FIG. 62 is an illustration showing a state in which the process cartridge 600 is being inserted and removed from the image forming apparatus main assembly 170, is viewed in the inserting direction. Part (c) of FIG. 62 is a view illustrating a state in which the process cartridge 600 is inserted into the image forming apparatus main assembly 170 and the front door 11 is closed, as viewed in the longitudinal direction. Part (d) of FIG. 62 is a view illustrating a state in which the process cartridge 600 is inserted into the image forming apparatus main assembly 170 and the front door 11 is closed, as viewed in the inserting direction. As described above, in the state where the upper movable member 652L1 is not pushed (free state), the lower movable member 652L2 can swing around the shaft portion 652L2*a* as shown in part (b) of FIG. 58.

As shown in part (a) of FIG. 62 and part (b) of FIG. 62, when the cartridge tray 171 (not shown) loaded with the process cartridge 600 is inserted into the image forming apparatus main assembly 170 in the direction of arrow X1 or taken out in the direction of arrow X2, it is inserted and removed in a state that the portion on the free end side of the lower movable member 652L2 with respect to the control member 196L is in the retraction state in the longitudinal direction (Y1 direction). This is because the lower movable member 652L2 is held in the state shown in part (b) of FIG. 58 and part (a) of FIG. 59 by the action of the compression spring 652Lsp.

Figure 64:
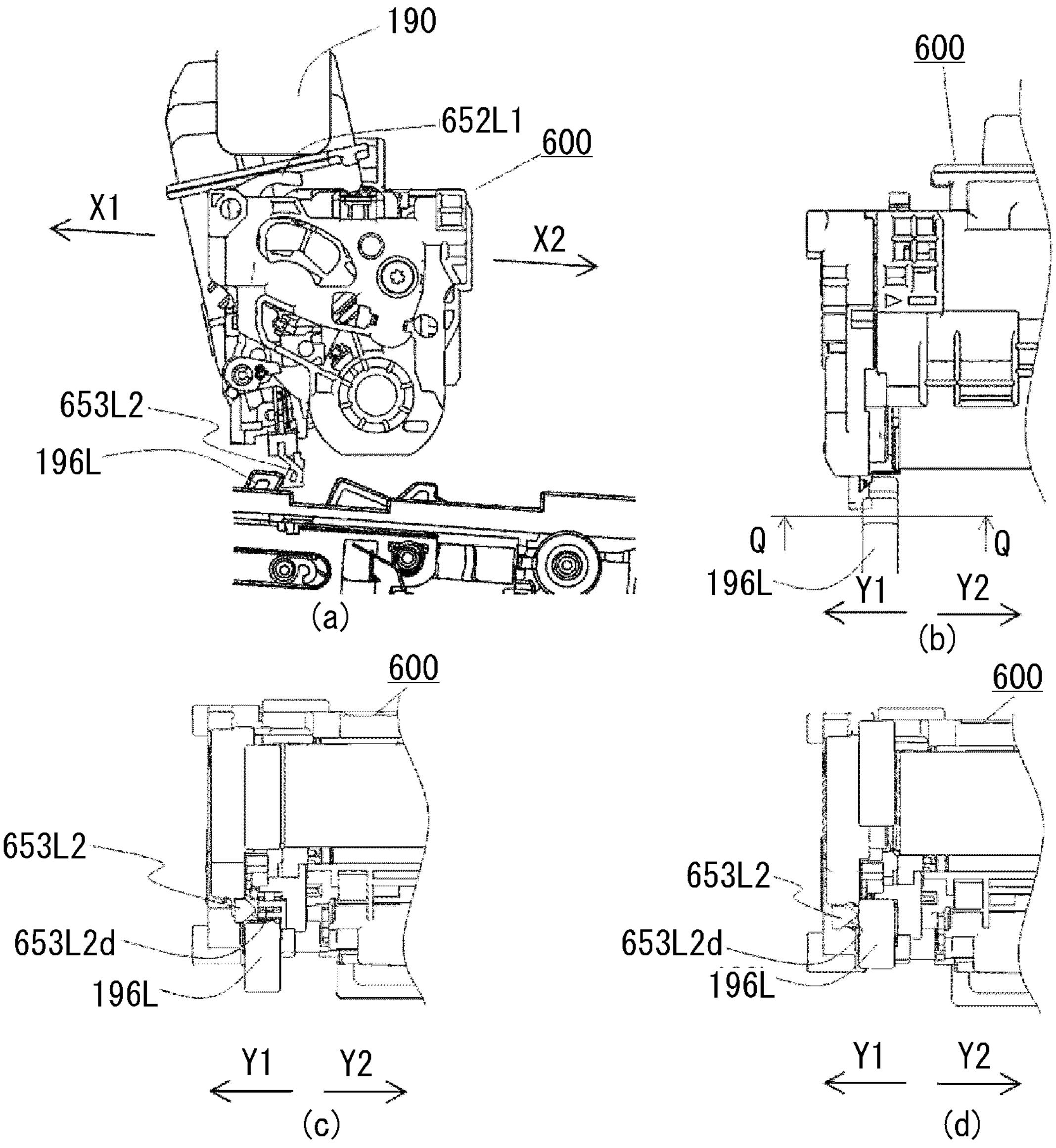
FIG. 64 is an illustration of the operation of the movable member.

However, it is not always necessary that the portion of the lower movable member 652L2 on the free end side is held in a state of being retracted in the longitudinal direction (Y1 direction). Another structure is shown in FIG. 64. Part (a) of FIG. 64 is an illustration showing a state in the process of inserting and removing the process cartridge 600 relative to the image forming apparatus main assembly 170 in the longitudinal direction. Part (b) of FIG. 64 is an illustration showing a state in which the process cartridge 600 is being inserted and removed from the image forming apparatus main assembly 170 in the inserting direction. Part (c) of FIG. 64 is a cross-sectional view taken along the line Q-Q of part (b) of FIG. 64. Part (d) of FIG. 64 is a Q-Q cross-sectional view of a state in which the process cartridge 600 is further inserted in the X1 direction from the state of part (c) of FIG. 64. In an alternative structure shown in FIG. 64, the slope 653L2*d* of the lower movable member 653L2 is brought into contact with the separation control member 196L, thereby to cause to change the state from the state in which the lower movable member 196L and the lower movable member 653L2 are overlapped with each other is viewed in the Y1 and Y2 directions by the force in the insertion/removal directions (X1 and X2 directions) as shown in part (c) of FIG. 64 to the state in which the portion on the free end side of the lower movable member 652L2 is retracted in the longitudinal direction (Y1 direction), by the lower movable member 653L2 is brought into contact with the separation control member 196L shown in part (d) of FIG. 64 in this manner, when the process cartridge 600 is inserted into and removed from the image forming apparatus main assembly 170, the movable member 652L is in a free state.

In this embodiment, the process cartridge usable with the color image forming apparatus is described. Therefore, there are four process cartridges and four separation control members. Therefore, depending on the station, the operation shown in FIG. 62 may be repeated four times at the maximum.

Next, as shown in part (c) of FIG. 62 and part (d) of FIG. 62, when the process cartridge 600 is inserted into the image forming apparatus main assembly 170 and the front door 11 is closed, the movable member 652L is lower by the cartridge pressing mechanism 190 as described above in the direction of arrow Z2. By this, the lower movable member 652L2, which has been swingable, cannot swing relative to the upper movable member 652L1, so that these are integrated (interlocked state). The movable member in this state performs substantially the same functions as the movable member 152 in the Embodiment 1.

[Structure of Drive-Side Separation/Contact Mechanism]

Figure 65:
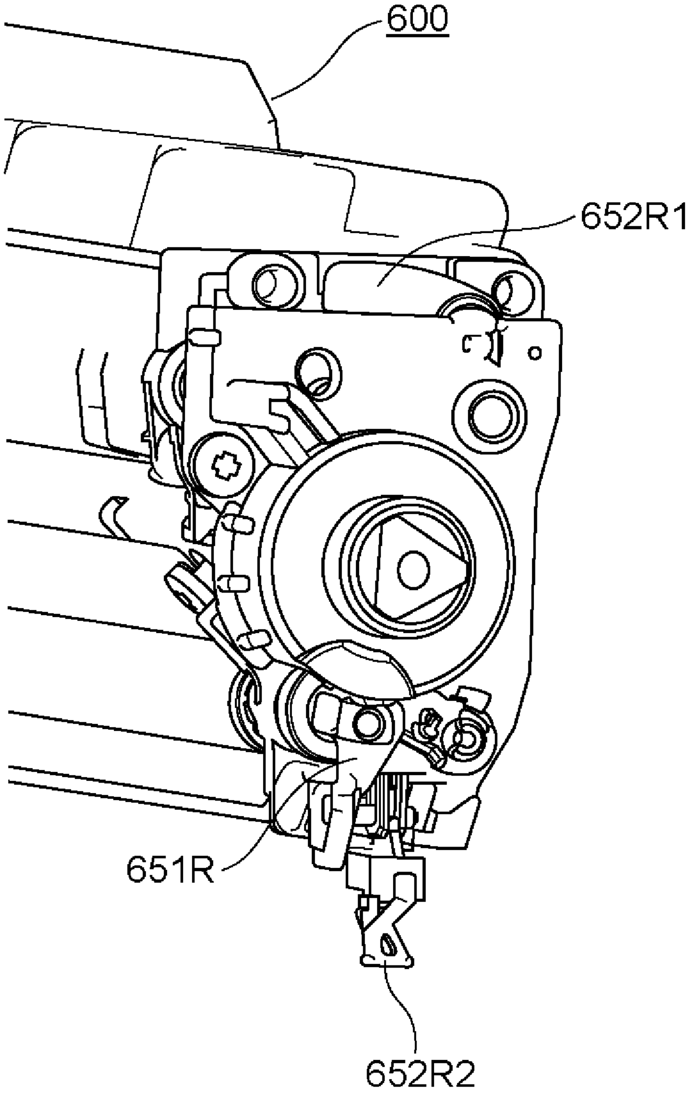
FIG. 65 is a perspective view of a developing unit portion of the process cartridge.
Figure 66:
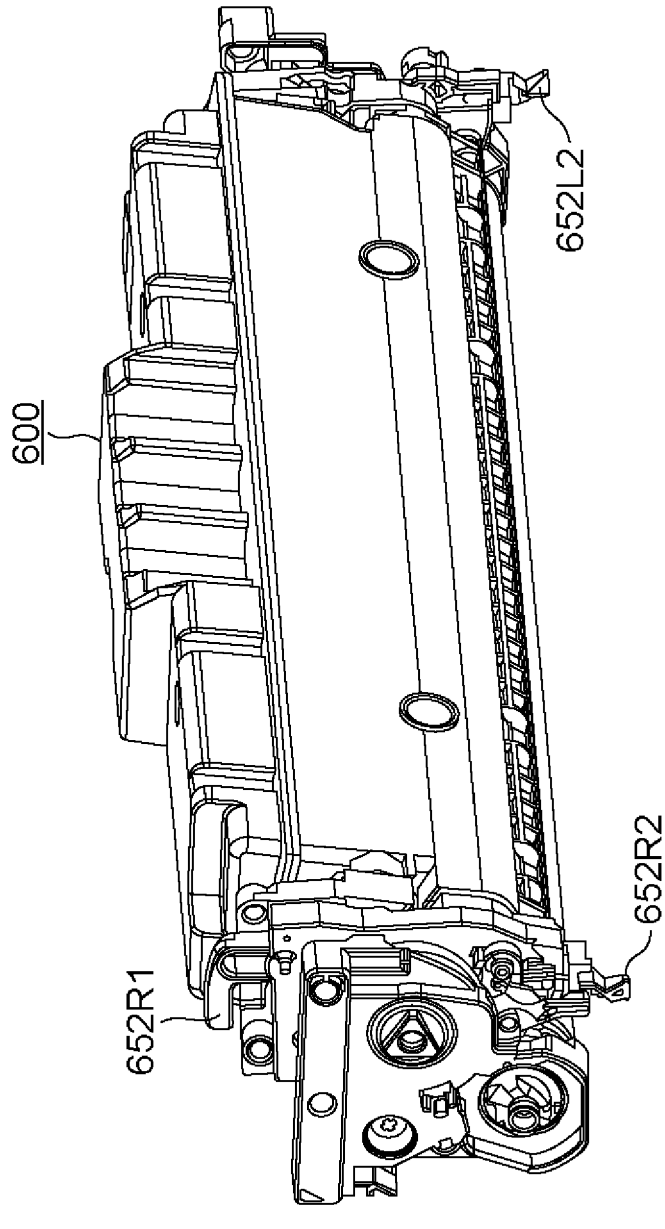
FIG. 66 is a perspective view of the process cartridge.

FIG. 65 is an external view illustrating the structure of the drive-side of the developing unit portion of the process cartridge 600. FIG. 66 is a perspective view of the process cartridge 600. In this embodiment, the structure has been described using the separation/contact mechanism on the non-drive-side, but since the structure on the drive-side is similar thereto, detailed description thereof is omitted. The movable member 652R on the drive-side is a member corresponding to the movable member 152R in the Embodiment 1, and has a structure in which the upper movable member 652R1 and the lower movable member 652R2 are connected in the same manner as the movable member 652L on the non-drive-side.

[Driving Side, Non-Drive-Side Separation/Contact Mechanism]

In this embodiment, the movable member 652L is provided in on the non-drive-side, and the movable member 652R is Provided on the drive-side. As another example, the movable member 652L may be provided only on the non-drive-side. Furthermore, the movable member 652R may be provided only on the drive-side.

According to the structure of this embodiment described above, the same effects the gap that as those of the Embodiment 1 can be provided.

Further, in this embodiment, the lower movable member 652L2 provided with the first force receiving portion (retracting force receiving portion, separating force receiving portion) 652Lk and the second force receiving portion (contact force receiving portion) 652Ln is made movable relative to, the upper movable member 652L1 and other portions of the process cartridge 600. In this embodiment, by the movement, the first force receiving portion 652Lk and the second force receiving portion 652Ln is displaced at least in the Y1 direction (the direction parallel to the rotation axis M1 and the rotation axis M2 of the Embodiment 1). Then, the lower portion movable member 652L2 can be switched between a movable state (free state) and a state fixed to the upper movable member 652L1 (locked state) depending on the position of the upper movable member 652L1. By this, it can be avoided that when the process cartridge 600 is inserted or removed into the apparatus main assembly 170, the lower movable member 652L2 and the apparatus main assembly 170, particularly the separation control member 196L, interfere with each other with the result of incapability of insertion or removal.

Embodiment 5

Next, referring to FIGS. 67 to 72, Embodiment 5 of the present invention will be described.

In this embodiment, structures and operations different from those of the above-described embodiment will be mainly described, and description of similar structures and operations will be omitted. For the structure corresponding to that in the above-described embodiments, the same reference numerals and characters are assigned, or the reference numerals in the first part is changed while the reference numerals and characters in the second part are the same.

In this embodiment, a structure will be described in which the movable member 452 of the separation/contact mechanism of the process cartridge 400 operates in the developing unit 109 without moving from the accommodated position to the projecting position. The movable member does not move from the accommodated position to the projecting position, but performs the same action by moving the developing unit 109 or the process cartridge 400 up and down. When the image forming apparatus main assembly 170 is installed on a horizontal surface, the vertical directions are the Z1 direction and the Z2 direction.

[Structure of Process Cartridge 400]

The process cartridge 400 includes a separation/contact mechanism 450R on the drive-side and a separation/contact mechanism 450L on the non-drive-side. Regarding the separation/contact mechanism, the details of the separation/contact mechanism 450R on the drive-side will first be described, and then the separation/contact mechanism 450L on the non-drive-side will be described. Further, the separation/contact mechanism has almost the same function on the drive-side and the non-drive-side, and therefore, R is added to the end of the code of each member on the drive-side. For the non-drive-side, the reference numerals and characters of each member are the same as that of the drive-side, but L is added at the end.

Figure 67:
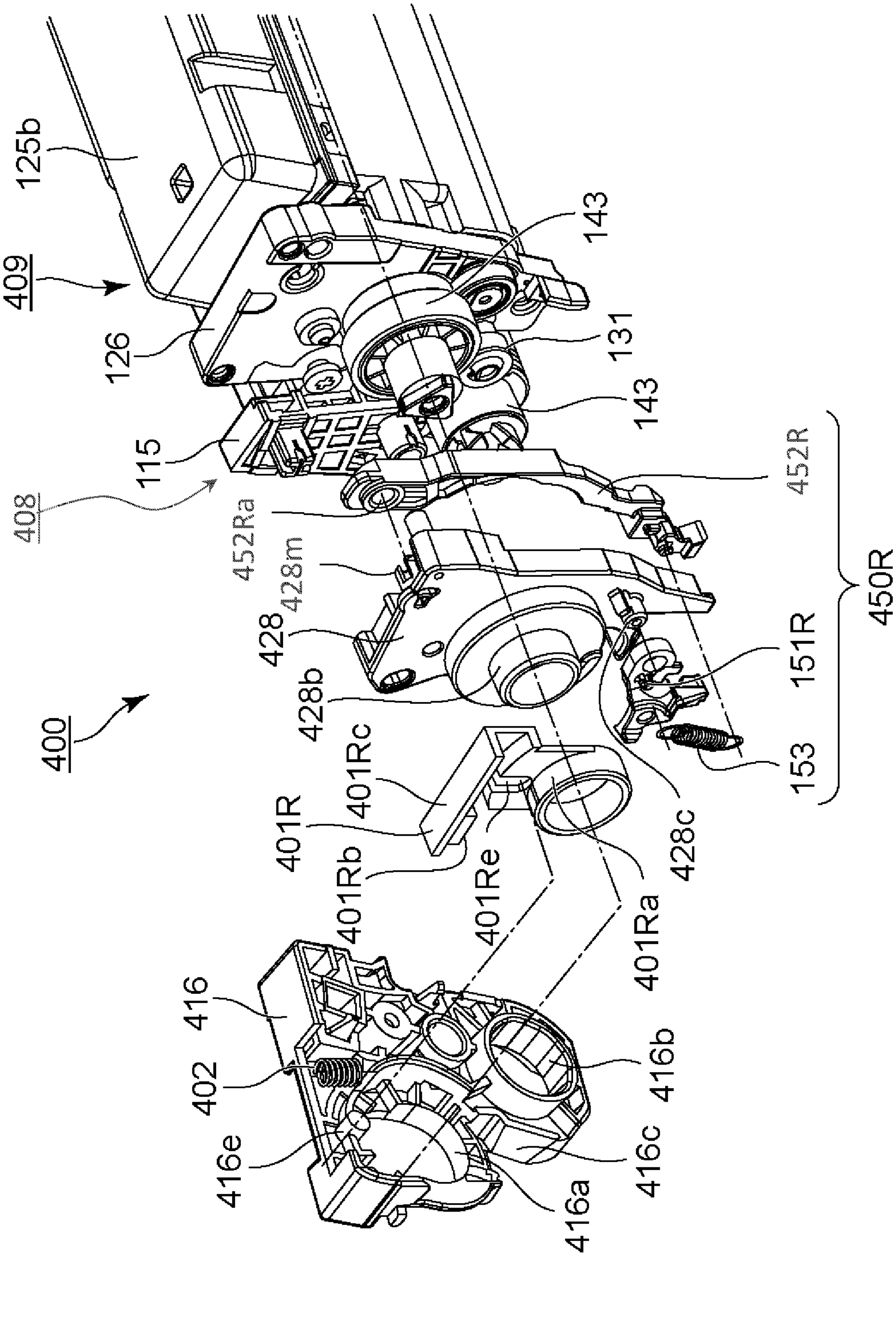
FIG. 67 is an exploded perspective view of a process cartridge.
Figure 69:
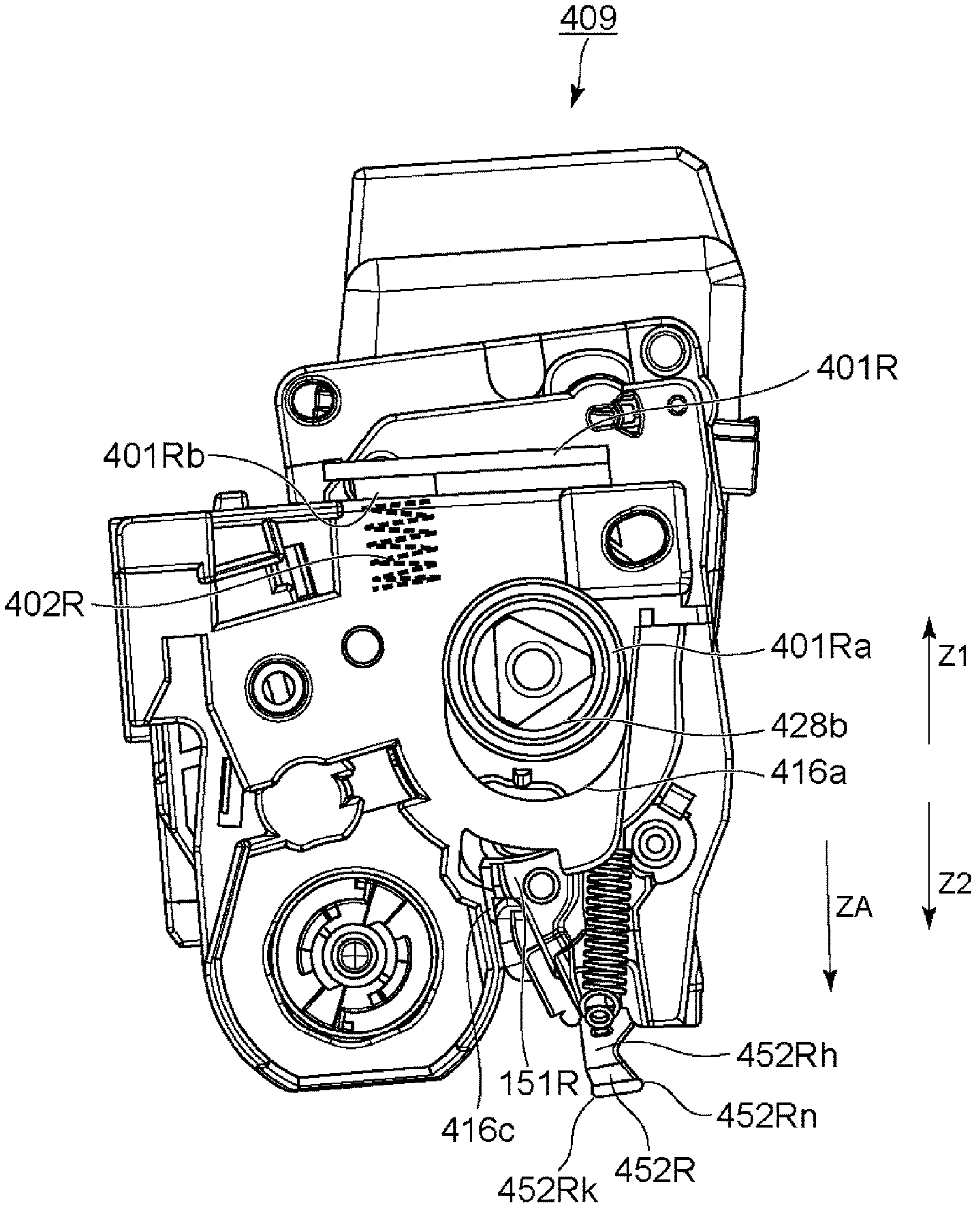
FIG. 69 is a side view of the process cartridge.

FIG. 67 is an assembly perspective view of the drive-side of the process cartridge 400 including the separation/contact mechanism 450R. The separation/contact mechanism 450R has a spacer 151R which is a restricting member (holding member), a movable member 452R which is a urging member, and a tension spring 153. The movable member 452R is provided with a support receiving portion 452Ra which is a round through hole. Further, as shown in FIG. 69, the movable member 452R is provided with a projecting portion 452Rh capable of projecting from the developing unit in the ZA direction, and the projecting portion 452Rh includes a first force receiving portion (retracting force receiving portion, separating force receiving portion) 452Rk, and a second force receiving portion (contact force receiving portion) 452Rn. The movable member 452R is swingably mounted to the second retaining portion 428*m* of the development cover member 428.

The development supporting member 401R is mounted to the end surface of the development cover member 428. The developing supporting member 401R is provided with a supporting cylinder 410Ra, a supporting spring receiving portion 401*b*, and a positioning receiving portion 401Rc. The development supporting member 401R is mounted so that the inner surface of the supporting cylinder 401Ra is fitted with the cylindrical portion 428*b* of the development cover member 428. Further, the outer surface of the supporting cylinder 401Ra is supported movably in the ZA direction by the developing unit supporting hole 416*a* of the drive-side cartridge cover member 416 forming a portion of the drum frame of the drum unit 408. Further, the development supporting member 401R is provided with a slide guide 401Re. The slide guide 401Re is positioned in the proper attitude by engaging with the guide projection 416*e* provided on the drive-side cartridge cover member 416 and restricting the movement so as to be movable in the groove direction. The slide guide 401Re in the form of a groove parallel to the ZA direction in which the developing unit 409, which will be described hereinafter, moves up and down. The support method will be described hereinafter.

One end of the development supporting spring 402 is mounted to the drive-side cartridge cover member 416. The other end side of the development supporting spring 402 is placed at a position in contact with the supporting spring receiving portion 401Rb of the assembled development supporting member 401R. By this, the development supporting spring 402 applies a force to the drive-side cartridge cover member 416 to lift the development supporting member 401R in the direction opposite to the ZA direction.

Figure 68:
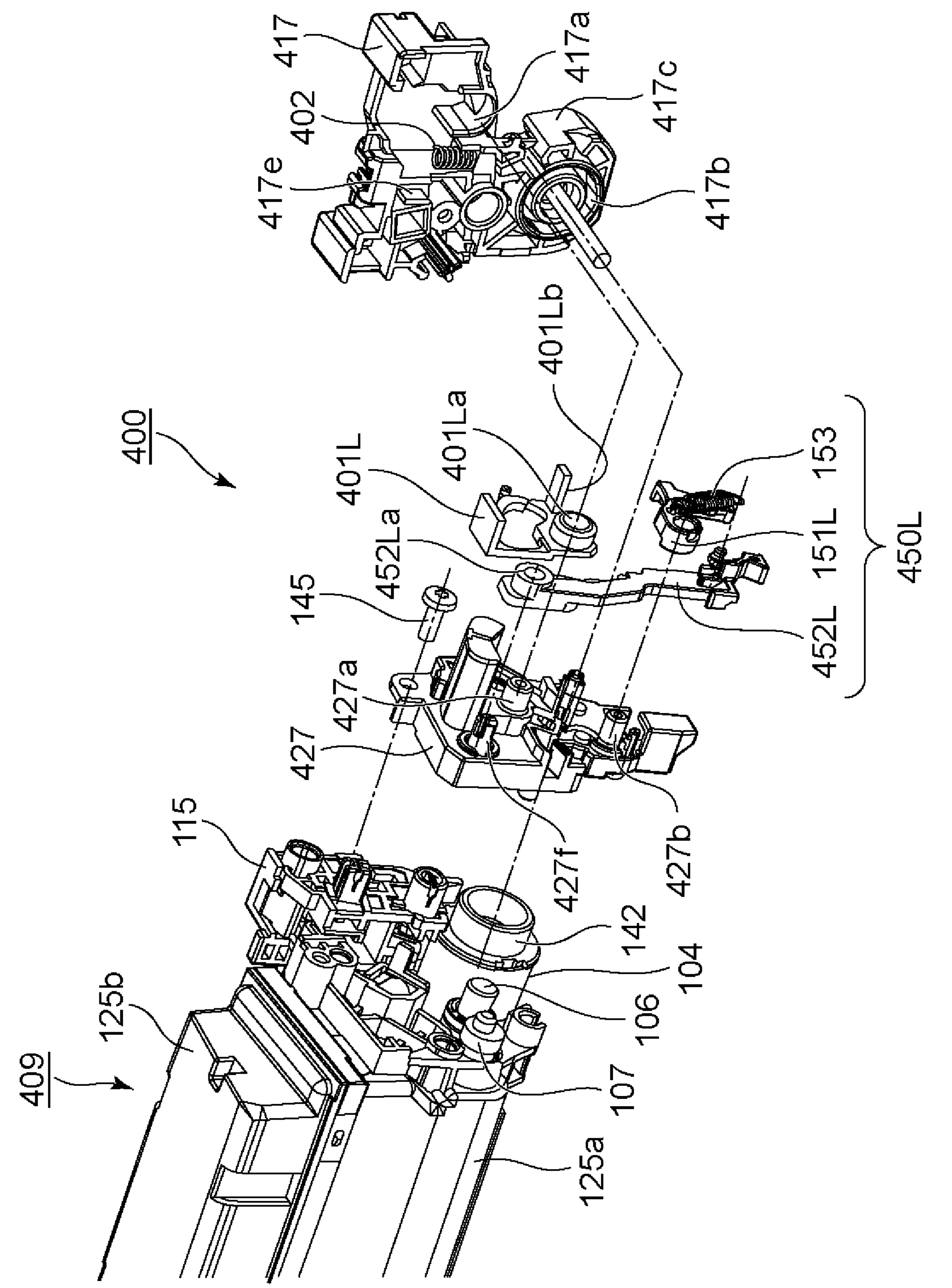
FIG. 68 is an exploded perspective view of the process cartridge.

FIG. 68 shows an assembly perspective view of the non-drive-side of the process cartridge including the separation/contact mechanism 450L. The assembled state of the separation/contact mechanism 450L will be described.

Figure 70:
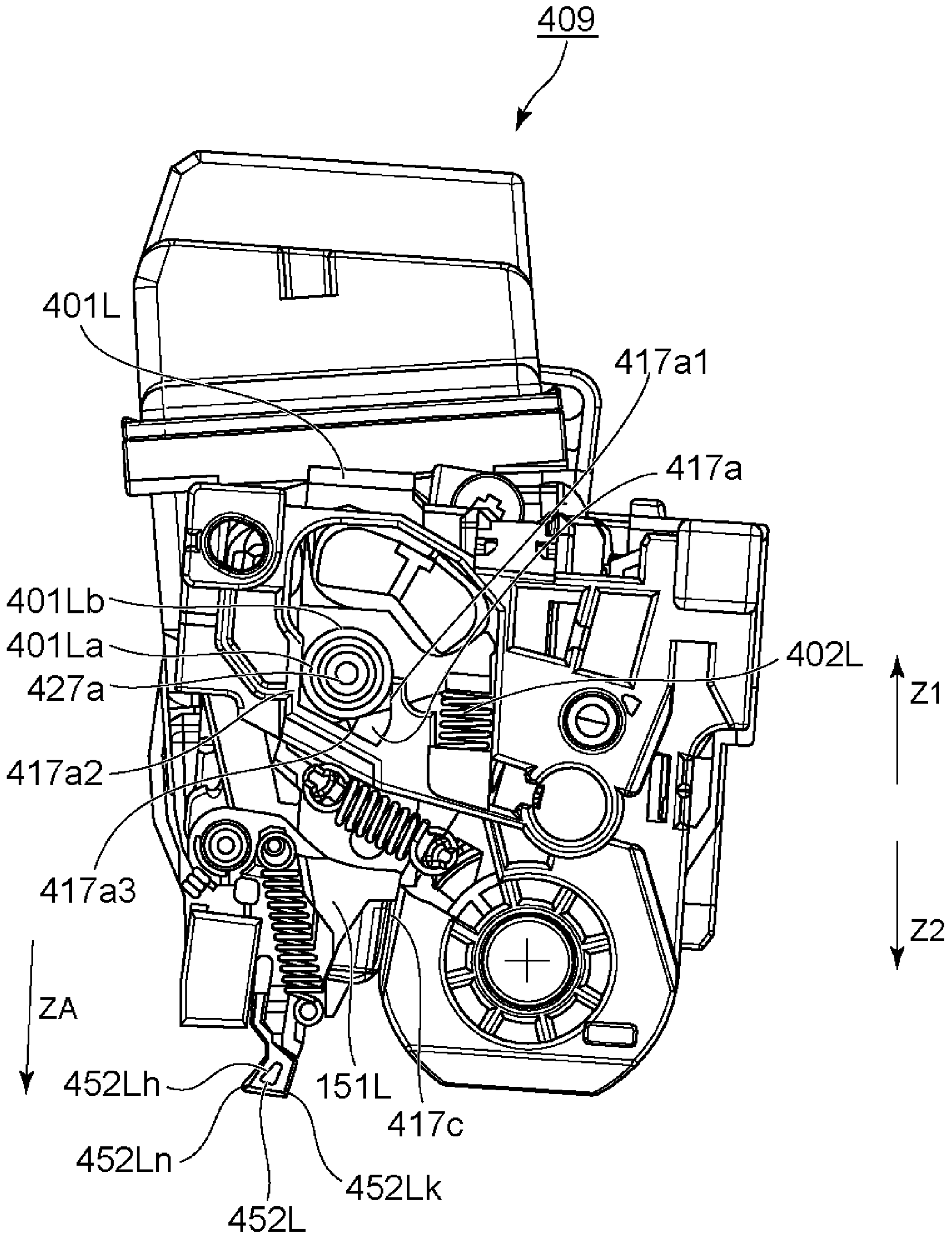
FIG. 70 is a side view of the process cartridge.

The non-drive-side bearing member 427 is fixed to the developing frame 125 and rotatably supports the developing roller 106 and the toner feeding roller 107. The non-drive-side bearing member 427 includes a support cylindrical portion 427*a* for supporting the development supporting member 401L, a support portion 427*b* for supporting the spacer 151L, and a support portion 427*f* for supporting the movable member 452L. Further, as shown in FIG. 70, the movable member 452R includes a projecting portion 452Lh capable of projecting from the developing unit in the ZA direction, and the projecting portion 452Rh includes a first force receiving portion (retracting force receiving portion, separating force receiving portion) 452 Lk, a second force receiving portion (contact force receiving portion) 452Ln is provided.

The development supporting member 401L is supported by fitting the oblong round hole 401Lb into the support cylindrical portion 427*a* of the non-drive-side bearing member 427. This oblong round hole is provided in the support portion 401Lb on the non-drive-side in order to allow a deviation due to a manufacturing error between the drive-side and the non-drive-side of the portion supporting the developing unit 409.

The development supporting member 401L is provided with a cylindrical portion 401La so as to cover the oblong round hole 401Lb. The cylindrical portion 401La is supported by the developing unit supporting hole 417*a* of the non-drive-side cartridge cover member 417.

Further, the development supporting member 401L is provided with a guide projection 401Le. The guide projection 401Le is fitted with the groove-shaped slide guide 417*e* provided on the non-drive-side cartridge cover member 417, and the movement is restricted so as to be movable in the longitudinal direction (ZA direction) of the groove, so as to be positioned in the proper attitude. The slide guide 417*e* includes a groove parallel to the ZA direction in which the developing unit 409, which will be described hereinafter, moves up and down. The support method will be described hereinafter.

The development supporting member 401L obtains a force by the development supporting spring to lift the cartridge cover member 417 on the non-drive-side in the direction of arrow Z1 which is upward.

FIG. 69 is side view of the process cartridge 400 as viewed from the drive-side, and FIG. 70 shows a side view of the process cartridge 400 as viewed from the non-drive-side.

Referring to FIG. 69, the mechanism on the drive-side in the assemblage completed state will be described.

In the developing unit 409, the supporting cylinder 401Ra of the development supporting member 401R is supported by the developing unit supporting hole 416*a* of the drive-side cartridge cover member 416. The developing unit supporting hole 416*a* is an oblong round hole oblong in the direction of arrow ZA. By this, the development supporting member 401R can move in the developing unit supporting hole 416*a* in the ZA direction and the opposite direction. The development supporting spring 402 is shown by a broken line as a perspective view. The development supporting spring 402 pushes up the supporting spring receiving portion 401*b* of the development supporting member 401R in the direction opposite to the ZA direction. Since the development supporting member 401R supporting the developing unit 409 is pushed up in the direction opposite to the ZA direction, the developing unit 409 is lifted in the drive-side cartridge cover member 416 in the direction opposite to the ZA direction.

In this Figure, the photosensitive member drum and the developing roller are spaced from each other in the state that the process cartridge 400 is outside the apparatus main assembly 170. Similar to the other embodiments, the spacer 151R contacts with the contact surface 416*c* of the drive-side cartridge cover member 416 to prevent the developing unit 109 from approaching to the photosensitive member drum.

Referring to FIG. 70, the mechanism on the non-drive-side in the assemblage completed state will be described. A supporting cylinder 401La of the development supporting member 401L is supported by the developing unit supporting hole 417*a* of the non-drive-side cartridge cover member 417. The developing unit supporting hole 417*a* movably supports the supporting cylinder 402La by two surfaces 417*a*1 and 417*a*2 parallel to the ZA direction which is the same direction in which the oblong round hole the supporting hole 416*a* on the drive-side extends. Further, the movement amount of the development supporting member 401L is restricted by the lower restriction surface 417*a*3. The non-drive-side cartridge cover member 417 movably supports the developing supporting member 410L in the ZA direction and the opposite direction by the developing unit supporting hole 417*a*.

The development supporting spring 402L is pushed up the supporting spring receiving portion 401Lb of the development supporting member 401L in the direction opposite to ZA direction. Since the development supporting member 401L supporting the developing unit 409 is pushed up in the opposite direction in the ZA direction, the developing unit 409 is lifted in the non-drive-side cartridge cover member 417 in the direction opposite to the ZA direction.

[Operation when Process Cartridge is Mounted to Main Assembly of Apparatus]

Figure 71:
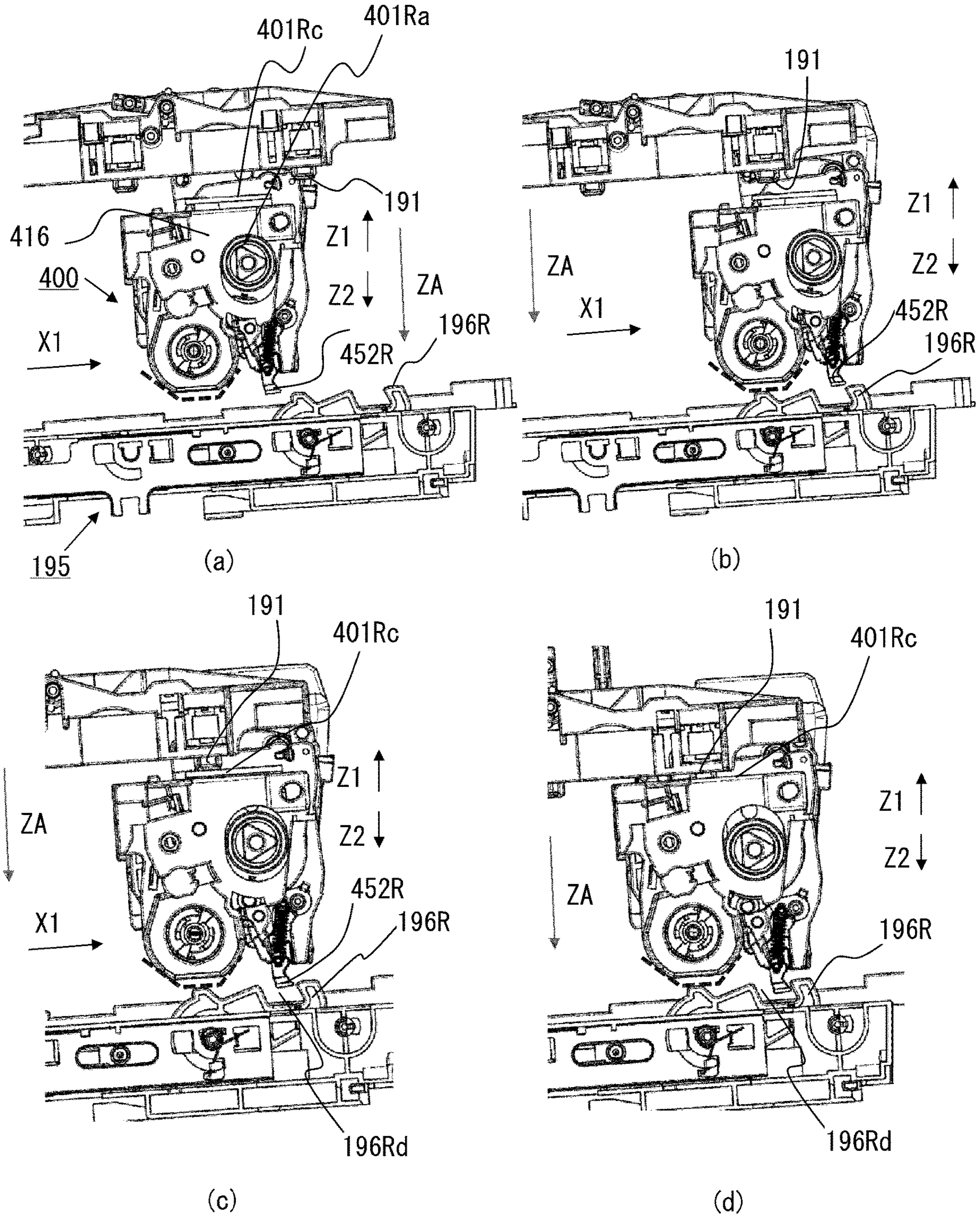
FIG. 71 is a side view of the process cartridge in the image forming apparatus main assembly.

Next, referring to FIG. 71, the operation when the process cartridge 400 is mounted on the apparatus main assembly will be described. FIG. 71 is a side view of the process cartridge 400 and the portions of the apparatus main assembly 170 related to mounting as viewed from the drive-side. Part (a) of FIG. 71 shows the process cartridge 400 which is being mounted while moving in the direction of the arrow X1 between the pressing mechanism 191 of the apparatus main assembly 170 on the upper side and the development separation control unit 195 on the lower side. The operation mechanism of the pressing mechanism 191 (the mechanism that moves in the Z1 and Z2 directions in interrelation with the opening and closing of the front door 11) is the same as that of the Embodiment 1, and therefore, detailed description thereof will be omitted. The movable member 452R is in a state of having been advanced to the front of the separation control member 196R. The process cartridge 400 moves while kept carried on the tray 171 shown in FIG. 5, but for simplification of the drawing, the entire tray 171 is not illustrated, and only the portion supporting the drive-side cartridge cover member 416 is shown by broken lines.

Part (b) of FIG. 71 shows a state in which the process cartridge 400 advances in the X1 direction and the movable member 452R is above the separation control member 196. In the steps from part (a) of FIG. 71 to part (b) of FIG. 71, the movable member 452R has been lifted together with the developing unit in the direction of arrow Z1 and is in the accommodated position (stand-by position), so that it does not interfere with the separation control member 196R.

Part (c) of FIG. 71 shows a state in which the process cartridge 400 has advanced to the mounting position relative to the image forming apparatus main assembly 170 in the X1 direction. It shows the state in which the pressing mechanism 191 starts to push the pressed portion 401Rc of the developing supporting member 401 in the direction of arrow Z2. When the development supporting member 401 is pushed in at least the Z2 direction by the pressing mechanism 191, the entire developing unit 409 moves in the ZA direction (predetermined direction), and the movable member 452R also moves in the ZA direction (predetermined direction) to the projecting position (operating position) inside the space 196Rd of the separation control member 196. At this time, the development supporting spring 402 having been described referring to FIG. 69 is compressed by the force from the pressing mechanism 191. Then, the developing supporting member 401 moves in the ZA direction along the oblong round hole of the developing unit supporting hole 416*a*. The ZA direction is a direction perpendicular to the X1 direction.

Part (d) of FIG. 71 shows a state after the pressing mechanism 191 is further moved from the state of part (c) of FIG. 71 in the direction of arrow Z2. The pressing mechanism 191 presses the positioning receiving portion 410Rc of the developing supporting member 401 in the direction of arrow Z2 and pushes it down. By this, the entire developing unit 409 is pushed down in the direction of arrow ZA, and the movable member 452R enters the space 196Rd of the separation control member 196. In this state, the mounting of the process cartridge 400 to the apparatus main assembly 170 is completed.

At this time, the spring force of the developing supporting spring 402 in the direction opposite to the ZA direction is set to be lower than the pressing force of the pressing mechanism 191. Further, it is desirable that the developing supporting spring 402 is placed so as to expand and contract in the ZA direction, but if the spring force is selected appropriately, it may be placed so as to expand and contract in another direction including the ZA direction component.

The operation when the process cartridge 400 is removed from the apparatus main assembly 170 is the reverse of the above-mentioned operation when the process cartridge 400 is mounted, and therefore, the description thereof will be omitted.

[Contact Operation and Separation Operation of Developing Unit]

Figure 72:
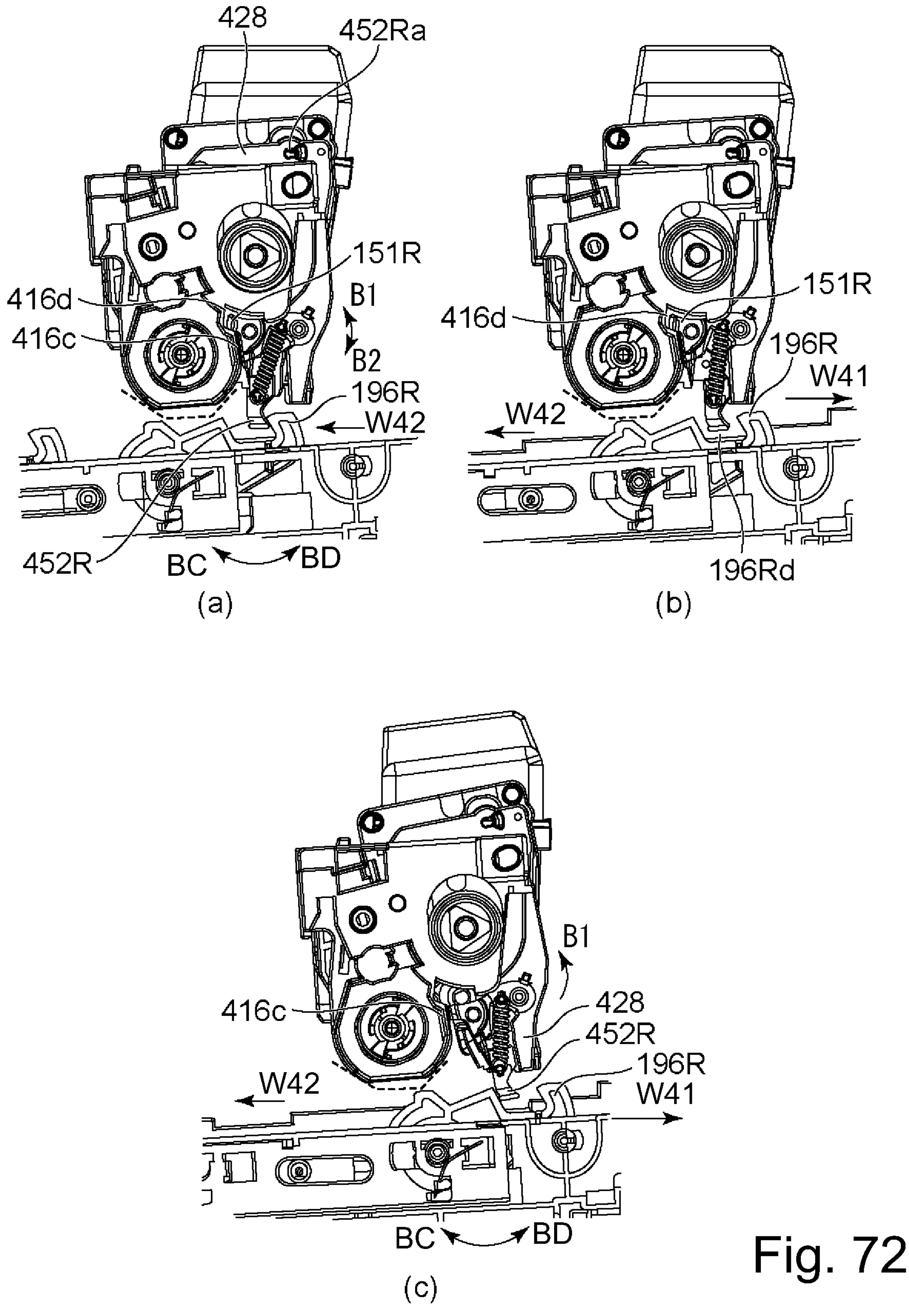
FIG. 72 is a side view of the process cartridge in the image forming apparatus main assembly.

Referring to FIG. 72, the operation in which the developing unit 109 of the mounted process cartridge 400 contacts and separates from the photosensitive member drum will be described.

FIG. 72 is a side view seen from the drive-side, and the pressing mechanism 191 shown in FIG. 71 is not shown. Part (a) of FIG. 72 is an illustration of an operation for bringing the developing unit 109 into contact with the photosensitive member drum. When the separation control member 196R moves in the direction of the arrow W42, the movable member 452R is pushed and moves. At this time, the movable member 452R swings in the direction of arrow BC about the support receiving portion 452Ra which is a round hole. The spacer 151R is pushed by the movable member 452R and swings in the direction of arrow B2. The spacer 151R moves from the contact surface 416*c* and enters the second restriction surface 416*d* to disable the distance restriction between the photosensitive member drum and the developing unit 109 to bring the developing unit 409 into contact state.

Part (b) of FIG. 72 is an illustration in which the developing unit 109 is maintained in contact with the photosensitive member drum. The separation control member 196R which has moved in the W42 direction in part (a) of FIG. 72 returns to the W41 direction again. Since the space 196Rd is wide enough such that the separation control member 196R and the movable member 452R do not come into contact with each other. The movable member 452R maintains the above-described contact state.

Part (c) of FIG. 72 is an illustration of an operation when the developing unit 109 is separated again. When the separation control member 196R further moves in the direction of W41 from the state of part (b) of FIG. 72, the separation control member 196R and the movable member 452R is brought into contact with each other. Then, the movable member 452R swings in the direction of the arrow BD and comes into contact with the development cover member 428. When the movable member 452R comes into contact with the development cover member and then is further rotated in the BD direction, the developing unit 109 swings to establish the spaced state. At this time, the movable member 452R and the spacer 151R are connected by a tension spring 153 and rotate in the direction of arrow B1. The rotated spacer 151R contacts to the contact surface 416*c* to restrict the developing unit 109 in the spaced state. Thereafter, when the separation control member 196R moves in the direction of W42 and returns to the position shown in part (d) of FIG. 71, the developing unit 109 maintains the spaced state without receiving the force of the separation control member 196R.

According to the structure of this embodiment described above, the same effect as that of an Embodiment 1 can be obtained.

Further, in this embodiment, the movable member 425 including the first force receiving portions 452Rk and 452Lk and the second force receiving portions 452Rn and 452Ln moves integrally with the developing unit 409 between the accommodated position (stand-by position) and the projecting position (operating position). By this movement, the first force receiving portions 452Rk and 452Lk are displaced at least in the directions VD1 (FIG. 40, and so on), the direction VD10 (FIG. 236, and so on), the direction VD12 (FIG. 238), and the direction VD14 (FIG. 239). With such a structure, it is possible to prevent the movable member 42 from interfering with the apparatus main assembly 170, particularly the separation control member 196L, when the process cartridge 400 is inserted into or removed from the apparatus main assembly 170.

Another Example of Embodiment 5

Using another structure shown in FIG. 73 to FIG. 78, the description will be made as to the example in which in the separation/contact mechanism of the process cartridge 430, the movable member, which is a pressing member, operates in the developing unit 109 without moving from the accommodated position (stand-by position) to the projecting position (operating position). The structure.

In the structure described here, when the process cartridge is mounted on the apparatus main assembly 170, the process cartridge 430 retracts in a direction perpendicular to the mounting direction and finally engages with the separation control member 196.

Figure 73:
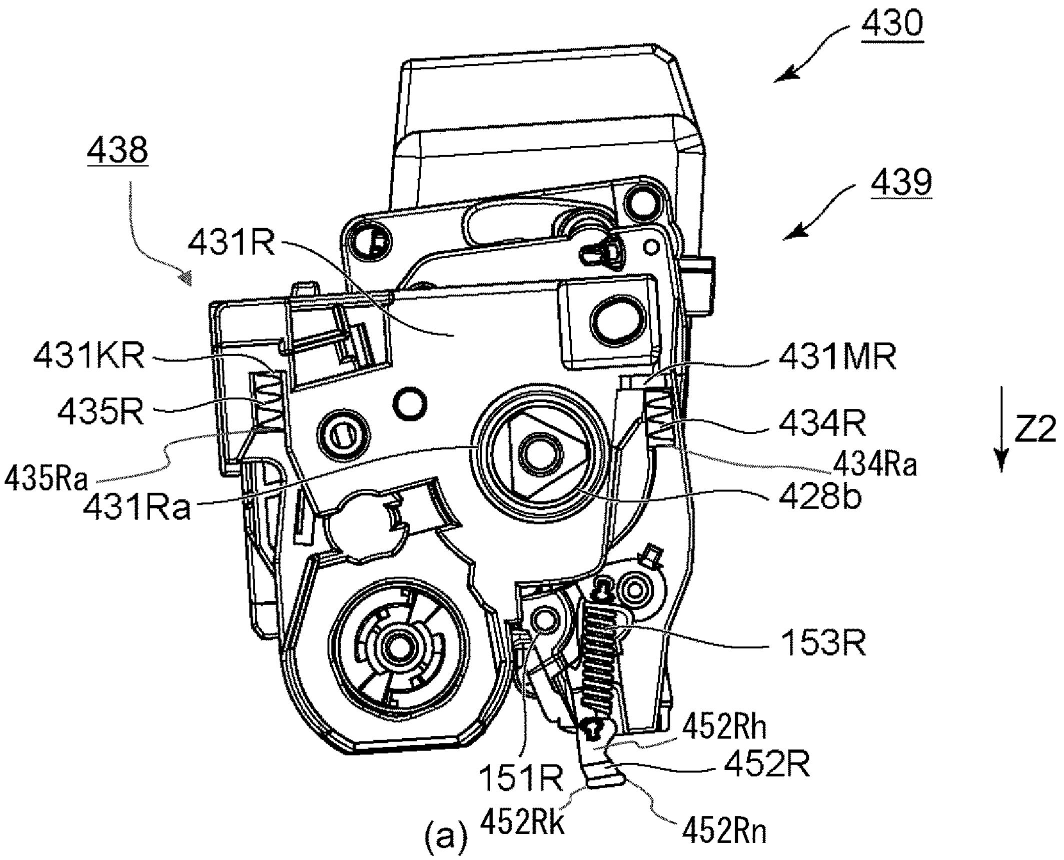
FIG. 73 is a side view of the process cartridge.
Figure 73:
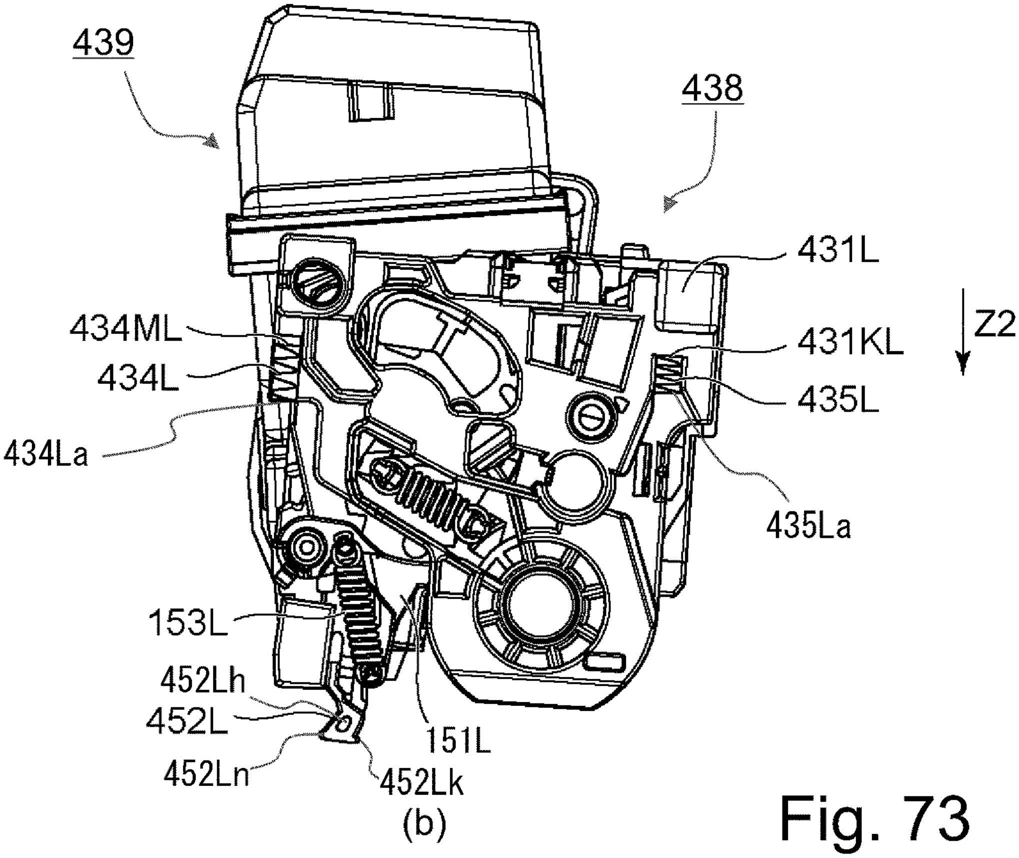

Referring to FIG. 73, a characteristic structure will be described. Part (a) of FIG. 73 shows a side view of the process cartridge 430 in this structure, as viewed from the drive-side. The support structure for the developing unit 439 is the same as that described with Embodiment 1. That is, the cylindrical portion 428*b* of the development cover member 428 is rotatably supported by the developing unit supporting hole 431Ra of the drive-side cartridge cover member 431R. Here, the developing unit supporting hole 431Ra has a cylindrical shape. Therefore, in the present alternative example, unlike the structure of the Embodiment 5, the developing unit 439 is unable to move in the Z2 direction relative to the drive-side cartridge cover member (drum frame) 431R and the drum unit 438, except for the movement due to play.

Compression coil springs (elastic members) are mounted to the drive-side cartridge cover member 431R at two locations. One of them is the first drive-side supporting spring 435R provided in the rotational direction position setting recess 431KR of the drive-side cartridge cover member 431R. The spring 435R has a free end portion 435Ra on the lower end side thereof. The other of them is a second drive-side supporting spring 434R mounted to the drive-side supporting spring attachment portion 431MR. The spring 434R has a free end portion 434Ra on the lower end side thereof.

Part (b) of FIG. 73 shows a side view of the process cartridge 430 as viewed from the non-drive-side. The cartridge cover member 431L on the non-drive-side rotatably supports the developing unit 409 as in FIG. 13 of the Embodiment 1. Compression coil springs (elastic members) are mounted to a non-drive-side cartridge cover member 431L at two locations. One of them is a first non-drive-side supporting spring 435L provided in the rotational direction position setting recess 431KL of the non-drive-side cartridge cover member 431L. The spring 435L has a free end portion 435La on the lower end side thereof. The other of them is a second non-drive-side supporting spring 434L mounted to the non-drive-side supporting spring mounting portion 431ML. The spring 434L has a free end portion 434La on the lower end side thereof.

These free end portions 434Ra, 435Ra, 434La, and 435La are supported portions which are supported in contact with the tray 171. Further, these free end portions 434Ra, 435Ra, 434La, and 435La are also supporting portions to support, so as to be movable in the Z2 direction, the drive-side cartridge cover member 431R and the non-drive-side cartridge cover member 431L which form a portion of the drum frame (first frame). Here, the developing unit 409 (or developing frame) (second frame) is supported by the drum frame. Therefore, it can be said that these free end portions 434Ra, 435Ra, 434La, and 435La support the developing unit 409 (or the developing frame) movably in the Z2 direction by way of the drum frame.

Figure 74:
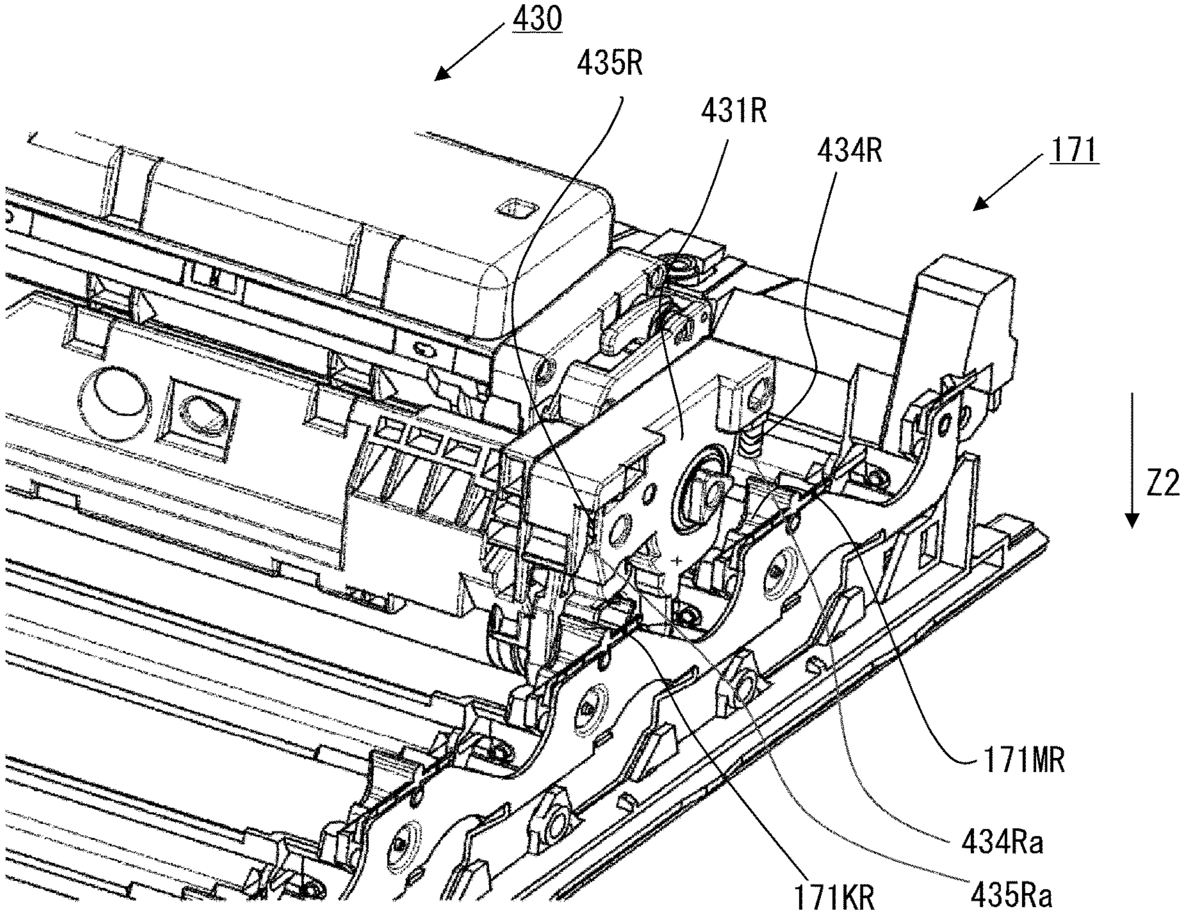
FIG. 74 is an illustration of mounting of the process cartridge onto a tray.

Next, referring to FIG. 74, the relative positions of the first drive-side supporting spring 435R and the second drive-side supporting spring 434R and the tray 171 when the process cartridge 430 is mounted on the tray 171 will be described. FIG. 74 shows the process cartridge 430 which is being moved in the direction of arrow Z2 in order to be mounted on the tray 171. In this state, the process cartridge 430 is still movable in the Z2 direction and is not positioned on the tray 171.

When the process cartridge 430 is further advanced in the Z2 direction, the first drive-side supporting spring 435R provided on the drive-side cartridge cover member 431R is brought into contact with and supported by the rotational direction position setting projection (first spring support portion) 171KR of the rotation of the tray 171 at the free end portion 435Ra thereof. Further, when the process cartridge is advanced in the Z2 direction, the free end portion 434Ra of the second drive-side supporting spring 434R brought into contact with and supported by the spring receiving portion (second spring support portion) 471MR of the tray 171.

On the other hand, also on the non-drive-side, the free end portion 435La of the first non-drive-side supporting spring 435L is brought into contact with and supported by the rotational direction position setting projection (third spring supporting portion) of the tray 17. Further, the free end portion 434La of the second non-drive-side supporting spring 434L is brought into contact with to and is supported by a spring receiving portion (fourth spring supporting portion) (not shown) of the tray 17.

[Operation Upon Mounting of Process Cartridge to Apparatus Main Assembly]

Next, referring to FIGS. 75 to 78, a process from the state in which the process cartridge 430 is placed on the tray 171 to the state in which it is positioned in the image forming apparatus main assembly 170 at the position where the image is formed will be described. FIG. 75 to FIG. 78 show side views as viewed from the drive-side. In these Figures, for the sake of simplicity, all but the relevant structures are not shown to illustrate the states. Since the non-drive-side has the same structure as the drive-side and operates in the same manner, the description thereof will be omitted.

Figure 75:
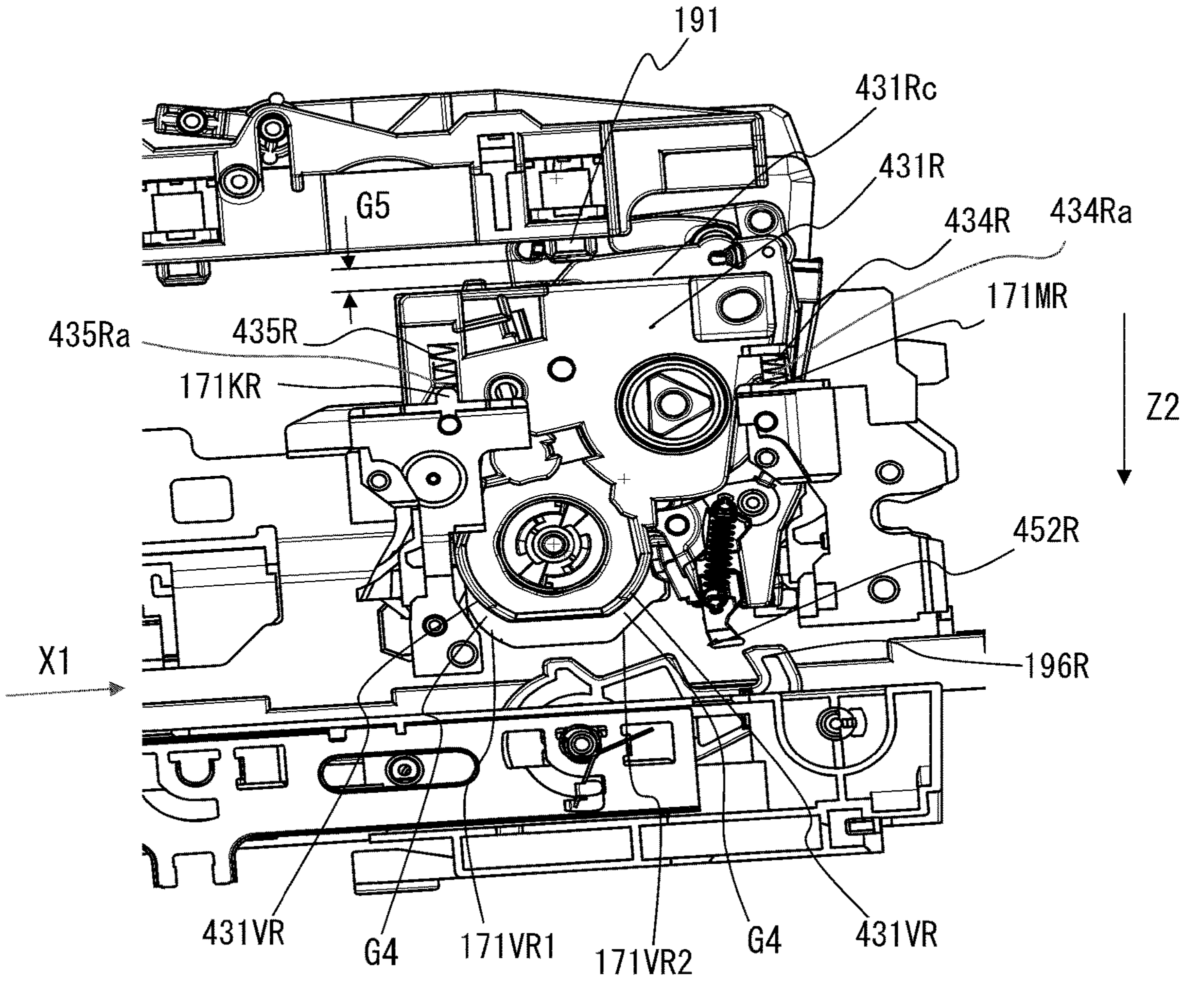
FIG. 75 is a side view of the process cartridge in the image forming apparatus main assembly.

FIG. 75 shows a state in which the process cartridge 430 placed on the tray 171 advances in the direction of arrow X1 together with the tray 171. As described referring to FIG. 74, the free end portion 435Ra of the first drive-side supporting spring 435R is in contact with the rotational direction position setting projection 171KR of the tray 171. Further, the free end portion 434Ra of the second drive-side supporting spring 434R is in contact with the spring receiving portion 471MR of the tray 171.

The first drive-side supporting spring 435R and the second drive-side supporting spring 434R are supported by the tray 171 to support the drum frame and the developing frame portion of the process cartridge 430 against the gravity. By this, the arc 431VR, which is a positioned portion provided on the drive-side cartridge cover member 431R of the process cartridge 430, is not in contact with the straight portions 171VR1 and 171VR2 which are the positioning portions of the tray 171, with the gap G4 maintained. That is, the process cartridge 430 is supported in the Z1 direction with respect to the positioning portion of the tray 171 by the first drive-side supporting spring 435R and the second drive-side supporting spring 434R. Therefore, when the process cartridge 430 moves to the arrow X1 by the tray 171 being inserted into the apparatus main assembly 170, the movable member 452R can pass through without colliding with the separation control member 196R. It can be said that the movable member 452R is in the accommodated position (stand-by position). At this time, the cartridge pressing mechanism 191 is in a state of standing by with the gap G5 relative to a top surface 431Rc of the drive-side cartridge cover member 431R.

Figure 76:
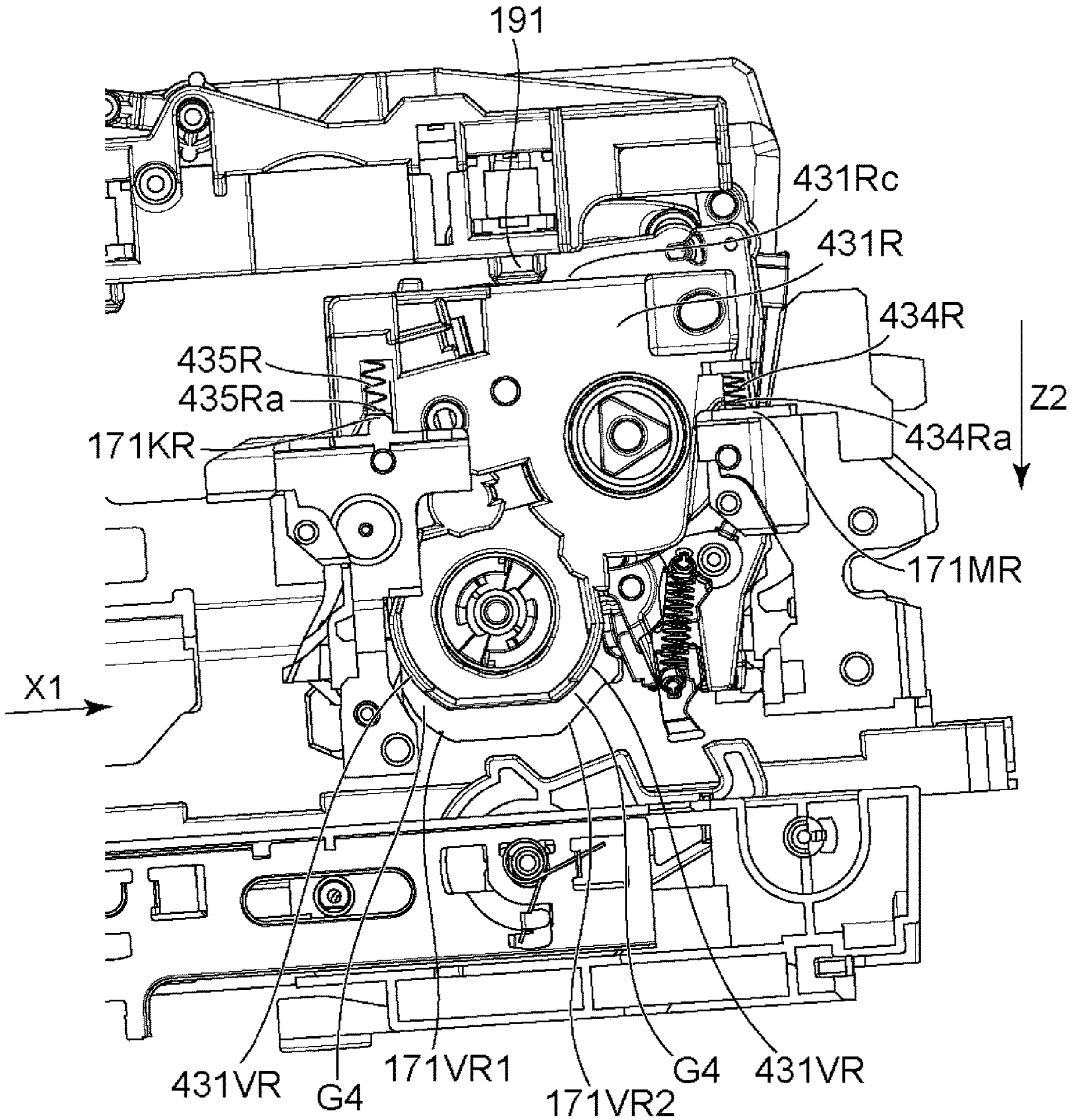
FIG. 76 is a side view of the process cartridge in the image forming apparatus main assembly.
Figure 77:
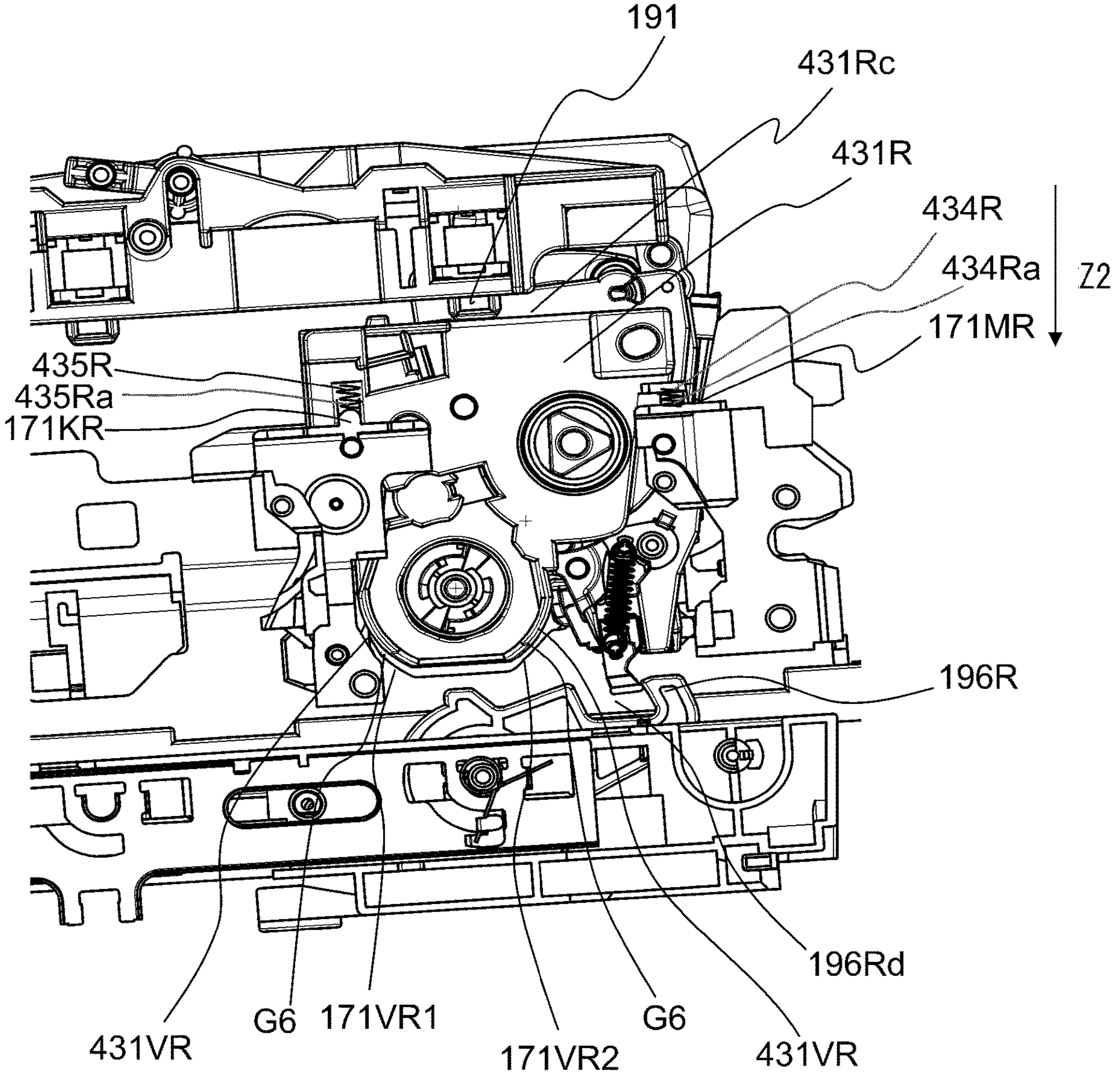
FIG. 77 is a side view of the process cartridge in the image forming apparatus main assembly.

FIG. 76 shows a state in which the cartridge pressing mechanism 191 moves in the direction of arrow Z2 in interrelation with closing the front door 11 and contacts the top surface 431Rc of the drive-side cartridge cover member 431R. The first drive-side supporting spring 435R and the second drive-side supporting spring 434R have not yet received a force from the cartridge pressing mechanism 191, and the process cartridge 430 has not yet moved. FIG. 77 shows a state in which the cartridge pressing mechanism 191 further moves in the direction of arrow Z2 and starts pushing the top surface 431Rc of the drive-side cartridge cover member 431R in the Z2 direction. The process cartridge 430 moves in the ZA direction, and the first drive-side supporting spring 435R and the second drive-side supporting spring 434R are compressed. The arc 431VR, which is the positioning portion of the process cartridge 430 with the tray 171, approaches, but does not come into contact with the straight portions 171VR1 and 171VR2 of the tray, with the gap G6 maintained. The movable member 452R enters the space 196Rd of the separation control member 196R because the process cartridge 430 moves in the ZA direction.

Figure 78:
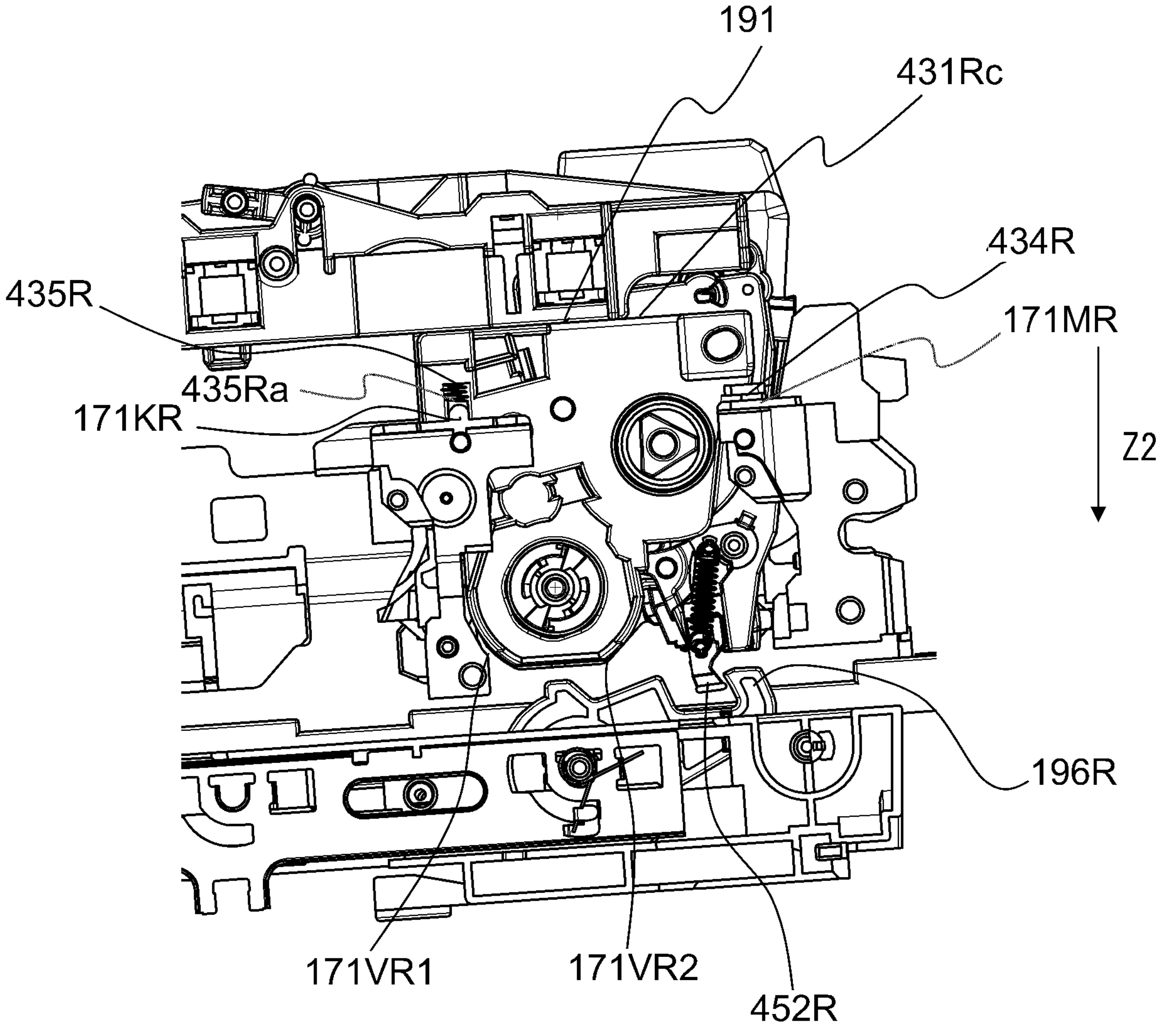
FIG. 78 is a side view of the process cartridge in the image forming apparatus main assembly.

FIG. 78 shows a state in which the cartridge pressing mechanism 191 is further moved in the direction of arrow Z2, and the process cartridge 430 is positioned on the tray 171.

By the movement of the cartridge pressing mechanism 191 in the Z2 direction, the process cartridge is moved in the ZA direction, and finally the arc 431VR comes into contact with the straight portions 171VR1 and 171VR2 of the tray 171. By this, the position of the process cartridge 430 is determined relative to relative to the tray 171 in the Z2 direction. The movable member 452R is inserted into the space 196Rd of the separation control member 196R to the final position by the movement of the process cartridge 430 in the Z2 direction. At this time, it can be said that the movable member 425R is in the projecting position (operating position). Therefore, by the movement of the separation control member 196R, the movable member 452R can be moved to switch between the contact state and the separation state of the process cartridge 430.

The ZA direction (the direction in which the movable member 425R moves from the stand-by position to the operating position) in which the process cartridge 430 is moved by being pressed by the cartridge pressing mechanism 191 moving in the arrow Z2 direction does not have to be parallel to the arrow Z2 direction. That is, it will suffice if the ZA direction includes at least a component in the direction perpendicular to the X1 direction.

The spring force (power) of the first drive-side supporting spring 435R and the second drive-side supporting spring 434R in the state that the arc 431VR is in contact with the straight portions 171VR1 and 171VR2 is selected to be smaller than the force of the cartridge pressing mechanism 191. Therefore, the process cartridge 430 can be reliably positioned relative to the tray 171.

After the mounting is completed, the operation is the same as that described referring to FIG. 72, and therefore, the description thereof will be omitted.

The operation when the process cartridge 430 is removed from the apparatus main assembly is the reverse of the above-mentioned operation when the process cartridge 430 is mounted, and thus the description thereof will be omitted.

According to the structure of the present alternative embodiment described above, the same effect as that of the Embodiment 1 can be provided.

Further, in this alternative example, the movable member 425 including the first force receiving portions 452Rk and 452Lk and the second force receiving portions 452Rn and 452Ln is moved between the (stand-by position) and the projecting position (operating position) integrally with the drum unit 438 and the developing unit 439 (drum frame and developing frame). By this movement, the first force receiving portions 452Rk and 452Lk and the second force receiving portions 452Rn and 452Ln are displaced at least in the direction VD1 (FIG. 40, and so on), the direction VD10 (FIG. 236, and so on), the direction VD12 (FIG. 238), and the direction VD14 (FIG. 239). With such a structure, it can be avoided that when the process cartridge 430 is inserted or removed into the apparatus main assembly 170, the movable member 42 interferes with the apparatus main assembly 170, particularly the separation control member 196L.

Embodiment 6

In this embodiment, the structures and operations different from those in the above-described embodiment will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same. In this embodiment, a structure will be described in which the movable member applies a force to the spacer in the process cartridge separation/contact mechanism without being pressed by a part of the main assembly side.

The structure of the separation/contact mechanism, the contact operation of the developing unit, the separation operation of the developing unit, and the mounting/dismounting of process cartridge relative to the image forming apparatus main assembly in this embodiment will be specifically described. Since the structures of other process cartridges are the same as those in the above-described embodiment, they are omitted here.

[Structure of Separation/Contact Mechanism]

Figure 79:
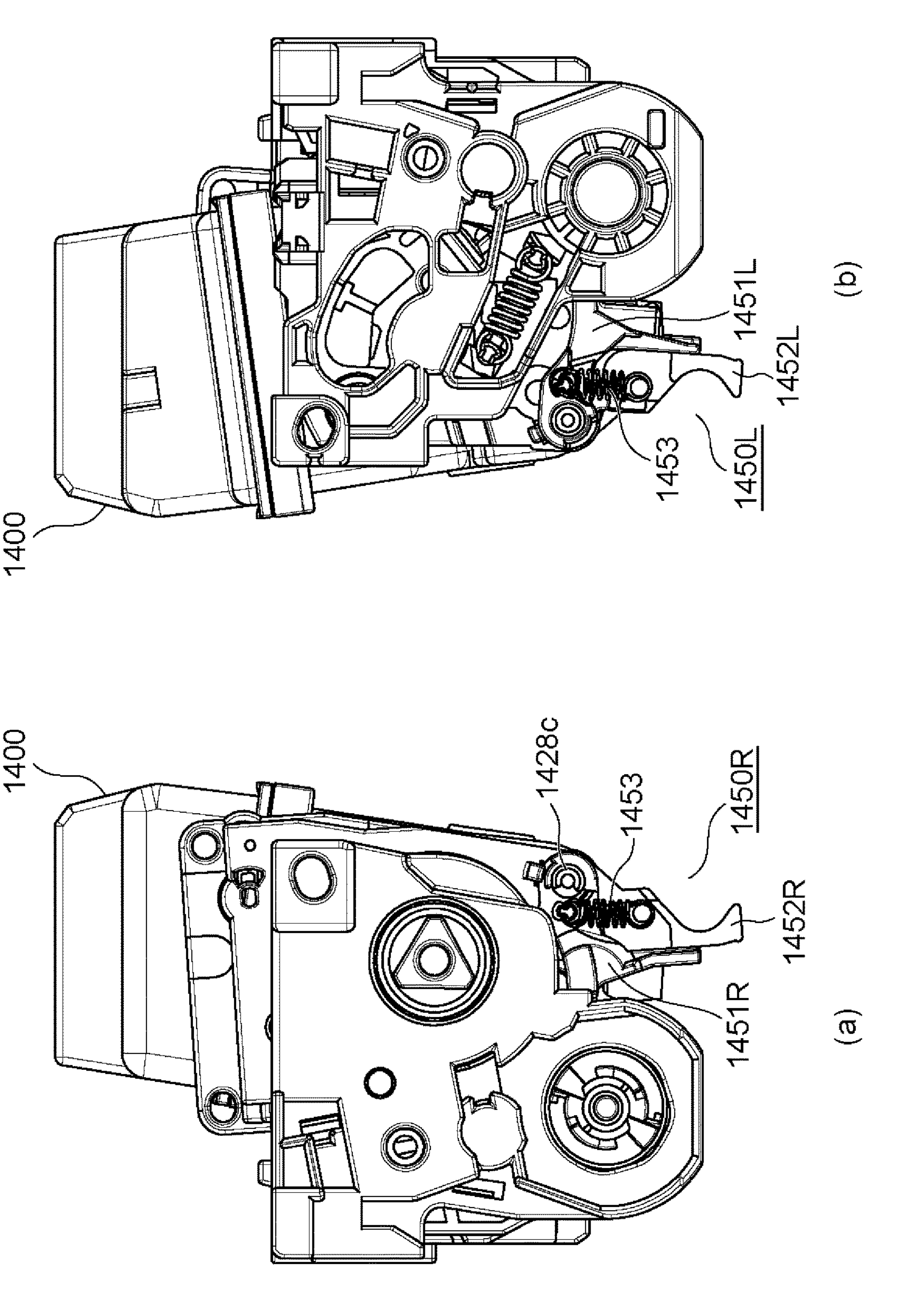
FIG. 79 is a side view of a process cartridge.
Figure 80:
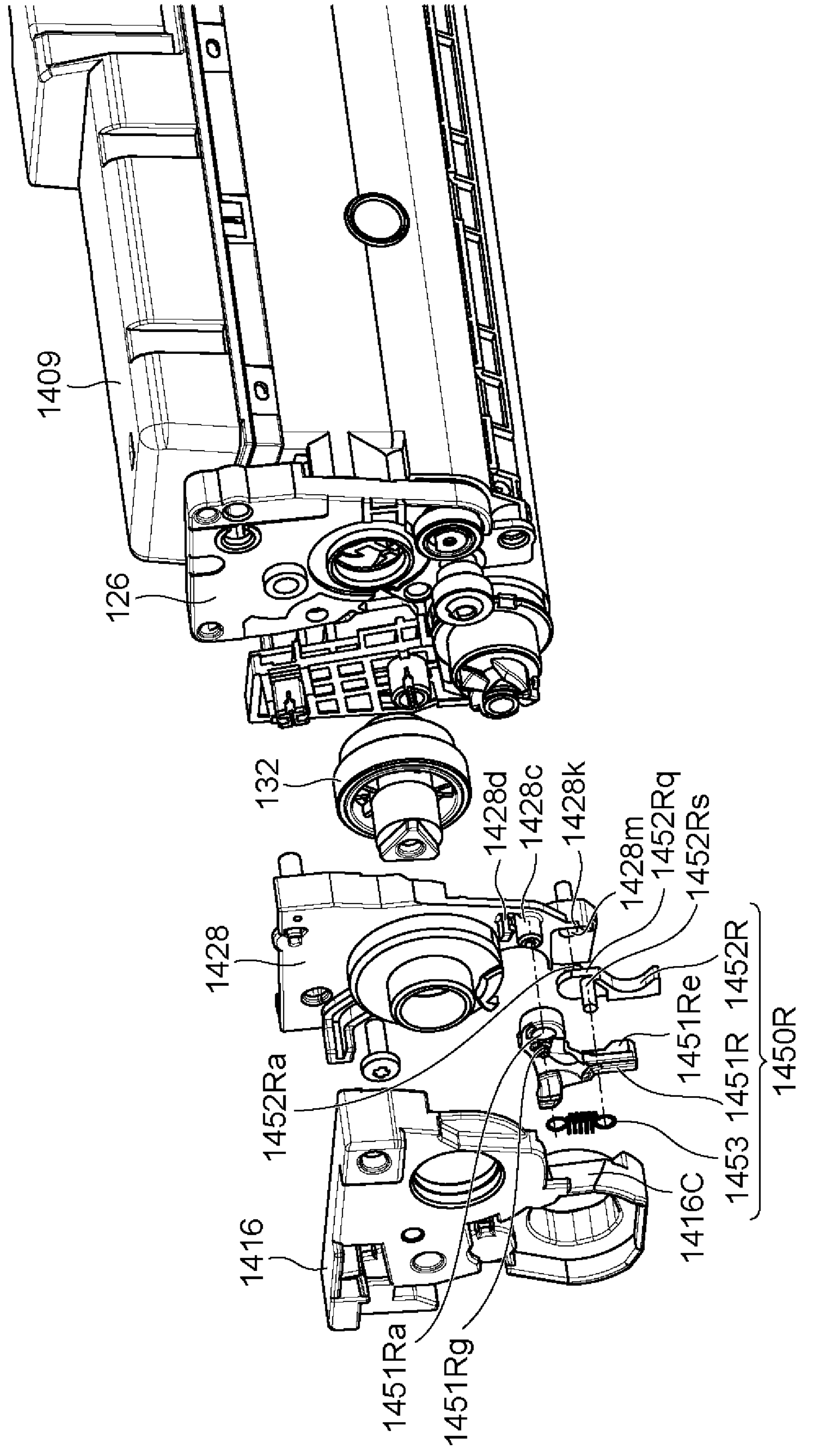
FIG. 80 is an exploded perspective view of the process cartridge.
Figure 81:
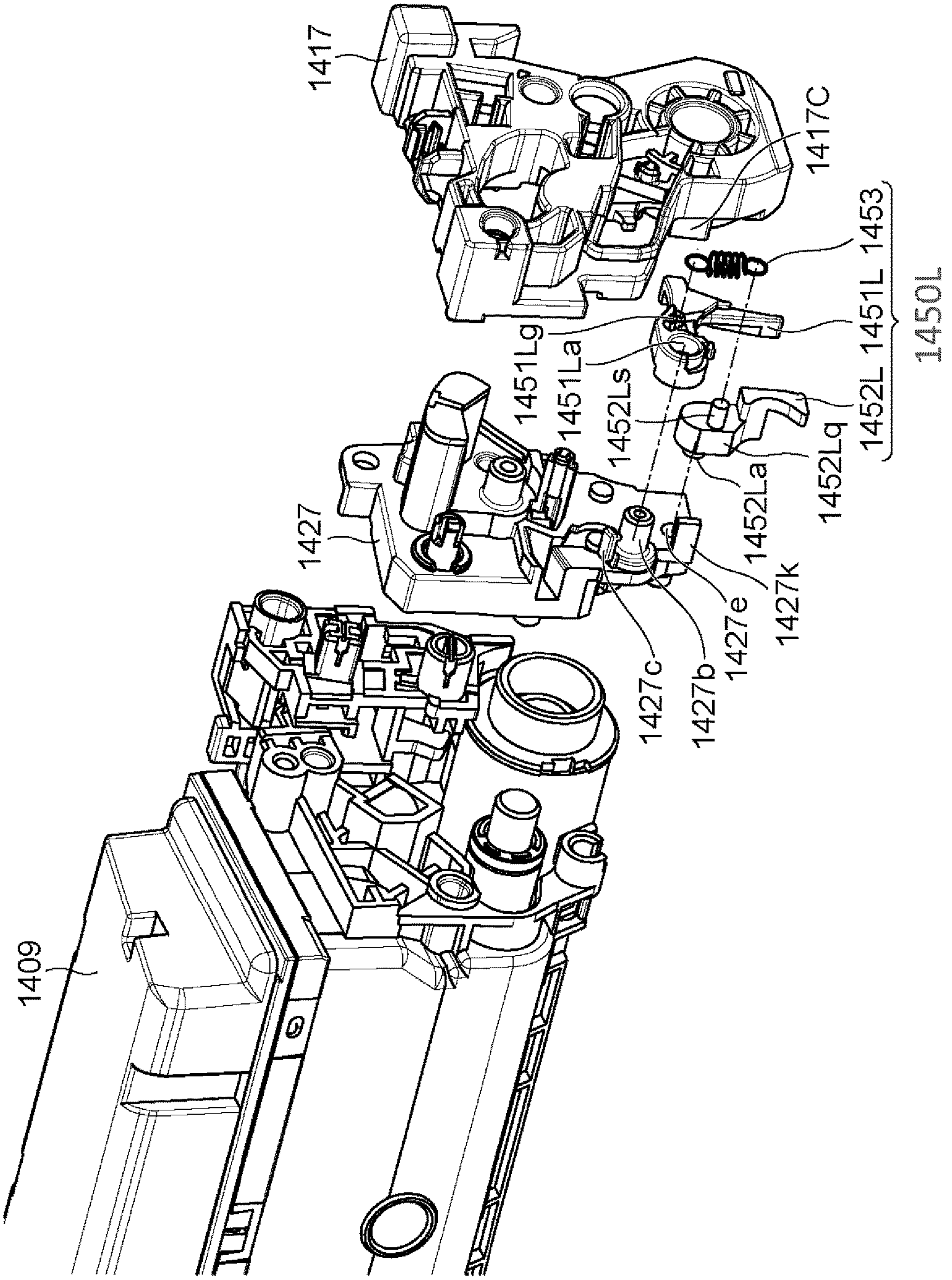
FIG. 81 is an exploded perspective view of the process cartridge.

The structure in which the photosensitive member drum 104 of the process cartridge 1400 and the developing roller 106 of the developing unit 1409 are brought into and out of contact with each other in this embodiment will be described in detail. The process cartridge has a separation/contact mechanism 1450R on the drive-side and a separation/contact mechanism 1450L on the non-drive-side (FIG. 79). FIG. 80 shows an assembly perspective view of the drive-side of the developing unit 1409 including the separation/contact mechanism 1450R. FIG. 81 shows an assembly perspective view of the developing unit 1409 including the separation/contact mechanism 550L on the non-drive-side. Here, the details of the separation/contact mechanism 1450R on the drive-side will be described. Since the separation/contact mechanism has almost the same functions as the drive-side and the non-drive-side, R is included in the reference sign for each member in the drive-side. For the non-drive-side, the reference sign of each member is the same as that of the drive-side, but L is included instead of R. Then, the structure and operation of the drive-side will be described as a representative, and the description of the structure and operation of the non-drive-side will be omitted.

The separation/contact mechanism 1450R has a spacer 1451R which is a restricting member (holding member), a movable member 1452R which is a pressing member, and a tension spring 1453.

The spacer 1451R has an annular supported portion 1451Ra, a contact surface (contacted portion) 1451Rc which contacts the contact surface (contact portion) 1416*c* of the cartridge cover 1416, and a spring-hooked portion 1451Rg which engages with the tension spring 1453, and a second pressed surface 1451Re which engages with the movable member 1452R. Further, it is rotatably supported by the first supporting portion 1428*c* of the development cover member 1428. Other structures are the same as those of an Embodiment 1 described above.

The movable member 1452R is rotatably held by engaging the support receiving portion 1452Ra of the movable member 1452R with the third support portion 1428*m* of the development cover member 1428. Further, the movable member 1452R has a first force receiving surface 1452Rm and a second force receiving surface 1452Rp which can be engaged with the separation control member 196R provided in the apparatus main assembly 170, the spring-hooked portion 1452Rs which engages with the tension spring 1453, and a second pressing surface 1452Rr that engages the spacer 1451R. The first force receiving surface 1452Rm and the second force receiving surface 1452Rp constitute the first force receiving portion (retracting force receiving portion, separating force receiving portion), and the second force receiving portion (force applying part) as in the Embodiment 1.

Figure 82:
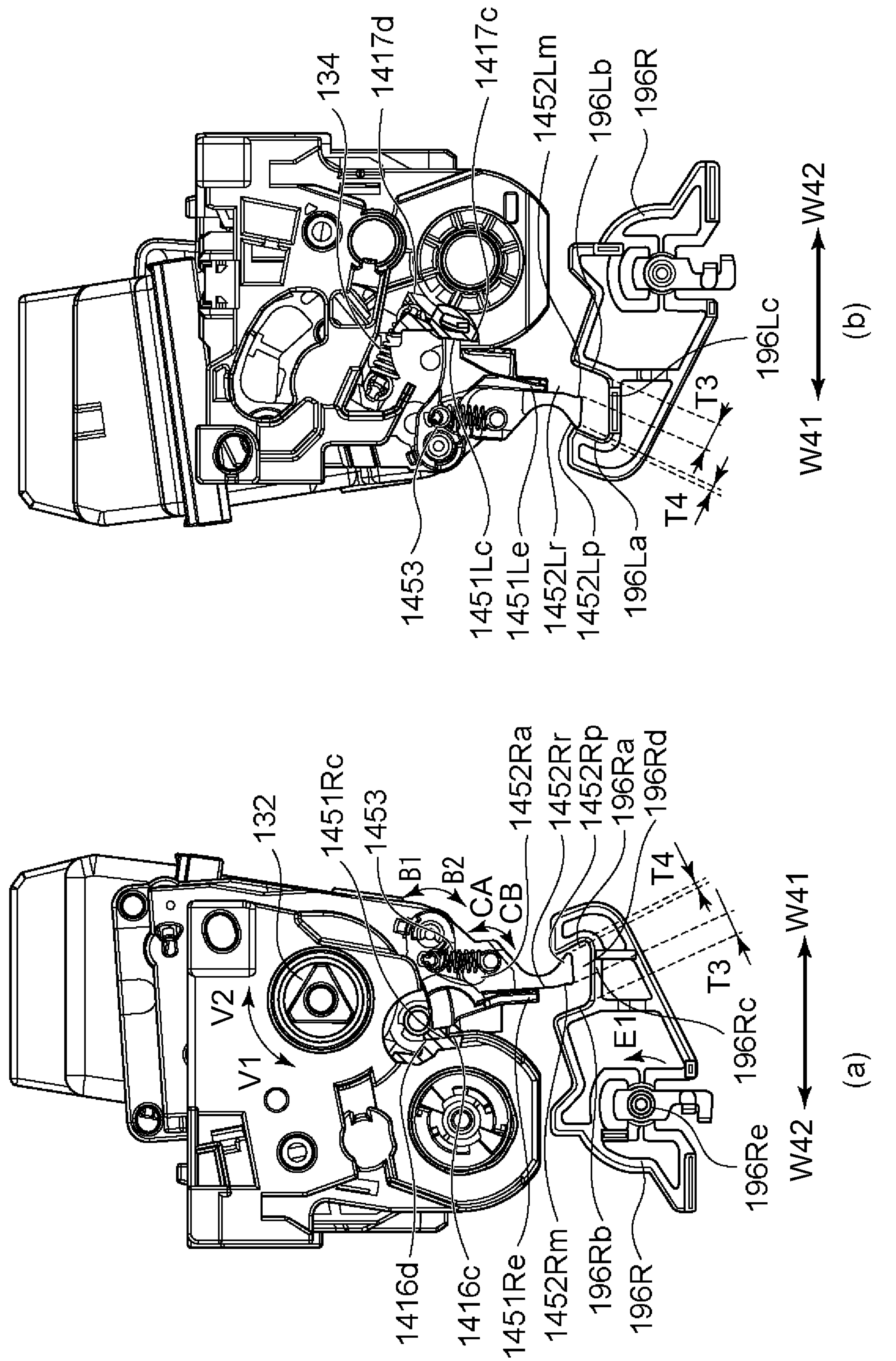
FIG. 82 is a side view of the process cartridge in the image forming apparatus main assembly.

Further, as shown in FIG. 82, the tension spring 1453 urges the spacer 1451R in the B1 direction with the first supporting portion 1428*c* of the development cover member 1428 as the center of rotation, as in an Embodiment 1 described above. Further, the movable member 1452R is urged in the CA direction with the third support portion 1428*m* of the development cover member 1428 as the center of rotation.

[Contact Operation of Developing Unit]

Next, referring to FIG. 82 to FIG. 85, the contacting operation between the photosensitive member drum 104 and the developing roller 106 by the separation/contact mechanism 1450R will be described in detail. For better illustration, these Figures are cross-sectional views in which the development cover member 1428 is partially omitted.

With the structure of this embodiment, a development input coupling 132 receives a driving force from the image forming apparatus main assembly 170 in the direction of arrow V2 in FIG. 82 to rotate the developing roller 106. That is, the developing unit 1409 including the development input coupling 132 receives the torque in the arrow V2 direction from the image forming apparatus main assembly 170. As shown in FIG. 82, in the case that the developing unit 1409 is in the separated position and the spacer 1451R is in the separation holding position (restriction position, first position), even if the developing unit 1409 receives this torque and the urging force of the development pressure spring 134 which will be described hereinafter, the contact surface 1451Rc of the spacer 1451R contacts the contacted surface 1416*c* of the drive-side cartridge cover member 1416, so that the attitude of the developing unit 1409 is maintained at a separated position.

Similar to the Embodiment 1 described above, in this embodiment, the image forming apparatus main assembly 170 has a separation control member 196R corresponding to each process cartridge 1400 as described above. The separation control member 196R is provided with a first force application surface 196Ra and a second force application surface 196Rb which project toward the process cartridge 1400 and face each other through the space 196Rd. The first force application surface 196Ra and the second force application surface 196Rb are connected with each other by way of the connecting portion 196Rc on the lower surface side of the image forming apparatus main assembly 170. Further, the separation control member 196R is rotatably supported by a control sheet metal (not shown) around the rotation center 196Re. The separation control member 196R is urged in the E1 direction by an urging spring (not shown), and the rotational direction is restricted by a holder (not shown). Further, since the control sheet metal (not shown) is structured to be movable in the W41 and W42 directions from the home position by a control mechanism (not shown), the separation control member 196R is structured to be movable in the W41 and W42 directions.

When the separation control member 196R moves in the W42 direction, the second force application surface 196Ra of the separation control member 196R and the second force receiving surface 1452Rp of the movable member 1452R come into contact with each other, so that the movable member 1452R rotates in the CB direction with the support receiving portion 1452Ra as the center of rotation. Further, as the movable member 1452R rotates, the spacer 1451R is rotated in the B2 direction while the second pressing surface 1452Rr of the movable member 1452R is in contact with the second pressed surface 1451Re of the spacer 1451R. Then, the spacer 1451R is rotated by the movable member 1452R to the separation release position (permission position, second position) where the contact surface 1451Rc and the contacted surface 1416*c* are separated, and becomes in the state shown in FIG. 83. Here, the position of the separation control member 196R for moving the spacer 1451R to the separation release position shown in FIG. 83 is referred to as a first position.

Figure 83:
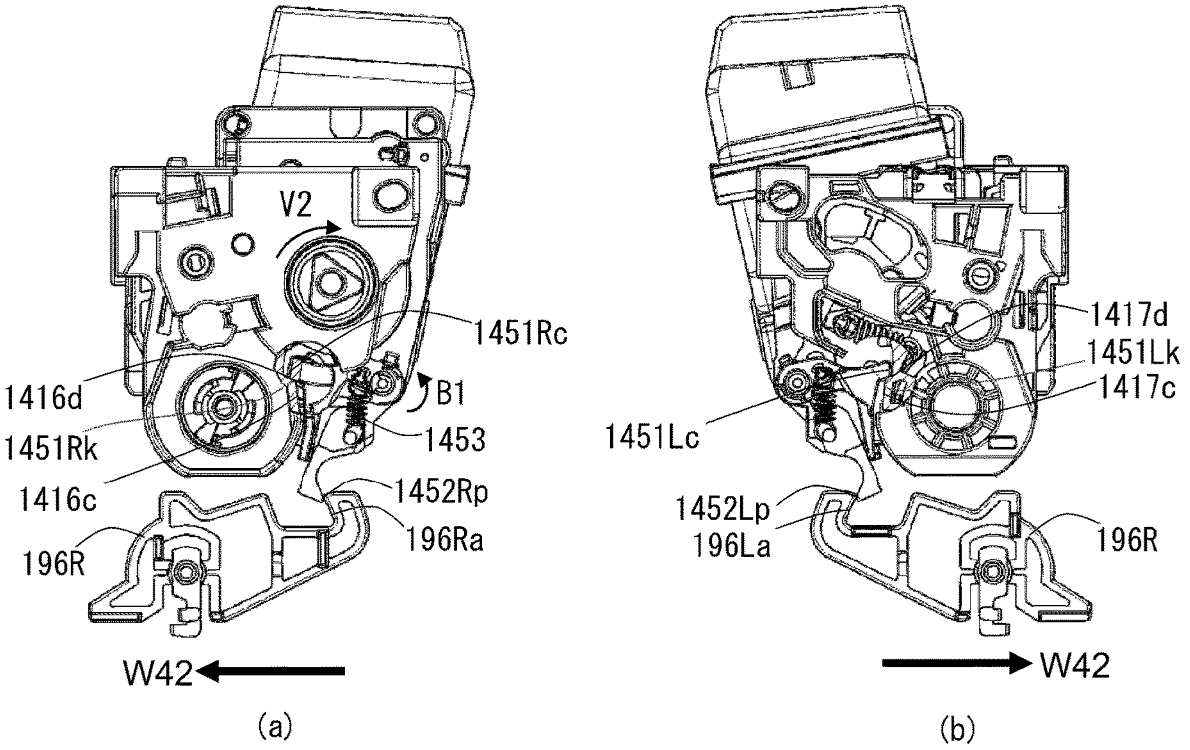
FIG. 83 is a side view of the process cartridge in the image forming apparatus main assembly.
Figure 84:
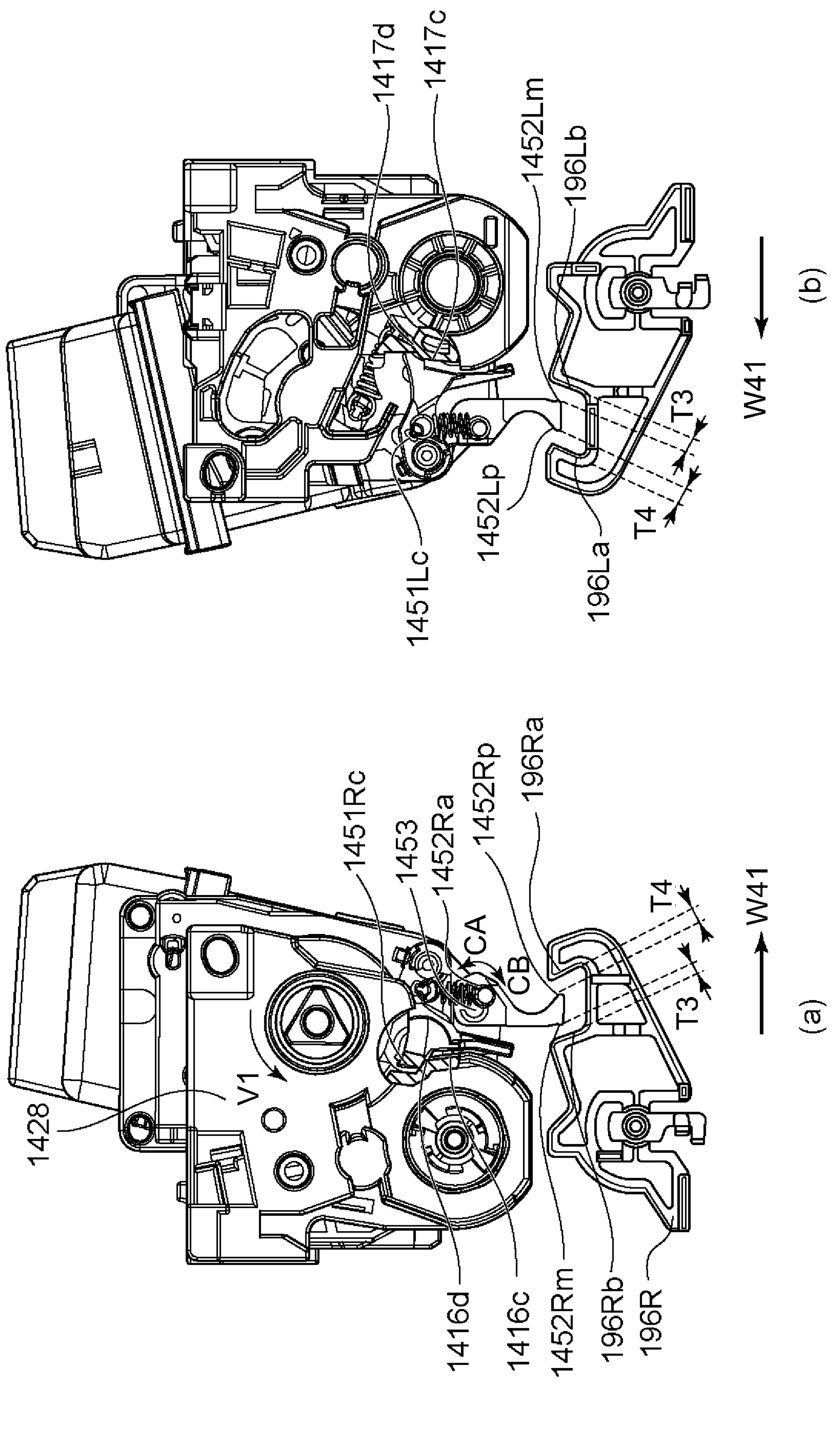
FIG. 84 is a side view of the process cartridge in the image forming apparatus main assembly.

When the spacer 1451R is moved to the separation release position by the separation control member 196R in this manner, the developing unit 1409 is rotated in the V2 direction by the torque received from the image forming apparatus main assembly 170 and the development pressure spring 134, to move to the contact position where the developing roller 106 and the photosensitive member drum 104 are in contact with each other (state in FIG. 83). At this time, the spacer 1451R urged in the direction of arrow B1 by the tension spring 1453 is maintained at the separation release position by the second restricted surface 1451Rk contacting the second restriction surface 1416*d* of the drive-side cartridge cover member 1416. Thereafter, the separation control member 196R moves in the direction of W41 and returns to the home position. At this time, the movable member 1452R is rotated in the CB direction by the tension spring 1453, and as shown in FIG. 84, the first pressing surface 1452Rq of the movable member 1452R and the first pressing surface 1428*k* of the development cover member 1428 become in contact with each other (See also FIG. 80).

By this, gaps T3 and T4 are provided, and the distance control member 196R is placed at a position where the movable member 1452R does not act. The transition from the state of FIG. 83 to the state of FIG. 84 is effected without a delay.

As described above, in the structure of this embodiment, by moving the separation control member 196R from the home position to the first position, the movable member 1452R can be rotated and the spacer 1451R can be moved from the separation holding position to the separation release position. This makes it possible for the developing unit 1409 to move from the separated position to the contacting position where the developing roller 106 and the photosensitive member drum 104 contact with each other. The position of the separation control member 196R in FIG. 84 is the same as that in FIG. 82.

[Separation Operation of Developing Unit]

Figure 85:
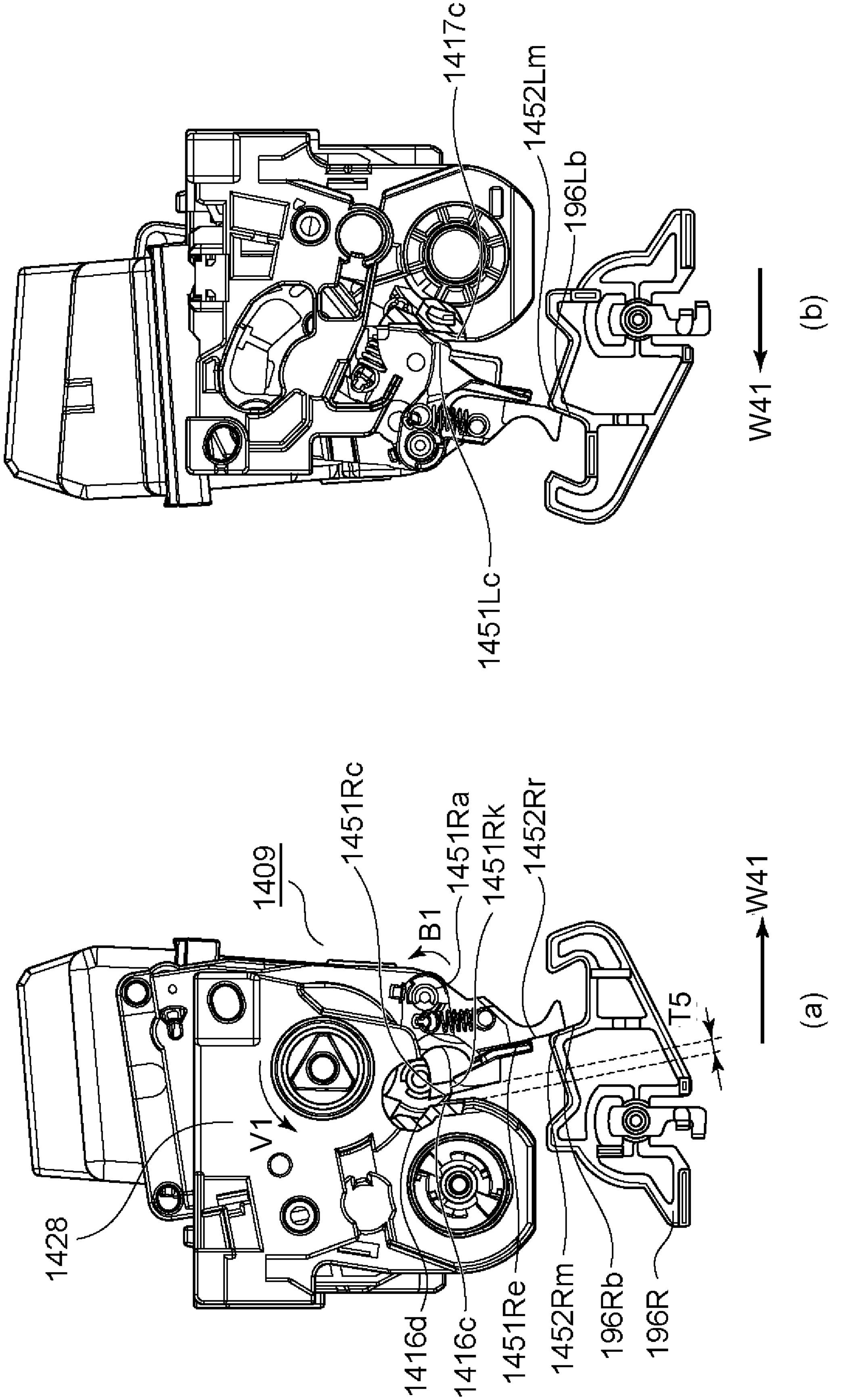
FIG. 85 is a side view of the process cartridge in the image forming apparatus main assembly.

Next, referring to FIGS. 84 and 85, the operation of moving the developing unit 1409 from the contact position to the separated position by the separation/contact mechanism 1450R will be described in detail. For better illustration, these Figures are cross-sectional views in which a part of the development cover member 1428 is partially omitted.

The separation control member 196R in this embodiment is structured to be movable from the home position in the direction of arrow W41 in FIG. 84. When the separation control member 196R moves in the W41 direction, the first force application surface 196Rb and the first force receiving surface 1452Rm of the movable member 1452R come into contact with each other, so that the movable member 1452R rotates in the CA direction with the support receiving portion 1452Ra as the rotation center. Then, by the contacting of the first pressing surface 1452Rq of the movable member 1452R to the a first pressing surface 1428*k* of the development cover member 1428, the developing unit 1409 rotates in the V1 direction from the contact position (state in FIG. 85).

In the spacer 1451R, the second restricted surface 1451Rk of the spacer 1451R and the second restriction surface 1416*d* of the drive-side cartridge cover member 1416 are separated from each other, and the spacer 1451R is rotated in the arrow B1 direction by the urging force of the tension spring 1453. By this, the spacer 1451R rotates until the second pressed surface 1451Re comes into contact with the second pressing surface 1452Rr of the movable member 1452R, and by the contact, the separation holding position is reached. When the developing unit 1409 is moved from the contact position to the separation position by the separation control member 196R and the spacer 1451R is located at the separation holding position, the gap T5 is formed between the contact surface 1451Rc and the contacted surface 1416*c* as shown in FIG. 85. Here, the position shown in FIG. 85 in which the developing unit 1409 is rotated from the contact position toward the separation position and the spacer 1451R can move to the separation holding position is referred to as a second position of the separation control member 196R.

Thereafter, when the separation control member 196R moves in the direction of the arrow W42 and returns from the second position to the home position, the developing unit 1409 rotates in the direction of arrow V2, and the contact surface 1451Rc and the contacted surface 1416*c* come into contact with each other by the torque received from the image forming apparatus main assembly 170 and the development pressure spring 134, while maintaining the separation holding position of the spacer 1451R. That is, the developing unit 1409 becomes in a state that the separated position is maintained by the spacer 1451R, and the developing roller 106 and the photosensitive member drum 104 are spaced from each other (states in FIGS. 82 and 79). By this, gaps T3 and T4 are formed, and it is placed at the positions where the separation control member 196R does not act on the movable member 1452R (state in FIG. 82). The transition from the state of FIG. 85 to the state of FIG. 82 is executed without a delay.

As described above, in this embodiment, the spacer 1451R moves from the separation release position to the separation holding position by movement of the separation control member 196R from the home position to the second position. Then, the separation control member 196R returns from the second position to the home position, the developing unit 1409 becomes in a state of maintaining the separation position by the spacer 1451R.

[Mounting/Dismounting of Process Cartridge Relative to Image Forming Apparatus Main Assembly]

Next, referring to FIGS. 86 to 101, the description will be made as to the engagement operation of the separation/contact mechanism 1450R of the process cartridge 1400 and the development separation control unit 196R of the image forming apparatus main assembly 170 when the process cartridge 1400 is mounted to and dismounted from the image forming apparatus main assembly 170. For the sake of explanation, these Figures are cross-sectional views in which the development cover member 1428 is partially omitted.

FIG. 86 to FIG. 89 are illustrations of the process cartridge 1400 in the process of inserting the cartridge tray 171 from the outside of the image forming apparatus main assembly 170 to the image forming position from the drive-side. Further, the parts except for the process cartridge 1400 and the separation control member 196R are omitted. FIG. 94 to FIG. 97 are illustrations of the process cartridge 1400 as viewed from the non-drive-side at the same time points as those in FIGS. 86 to 89.

Figure 90:
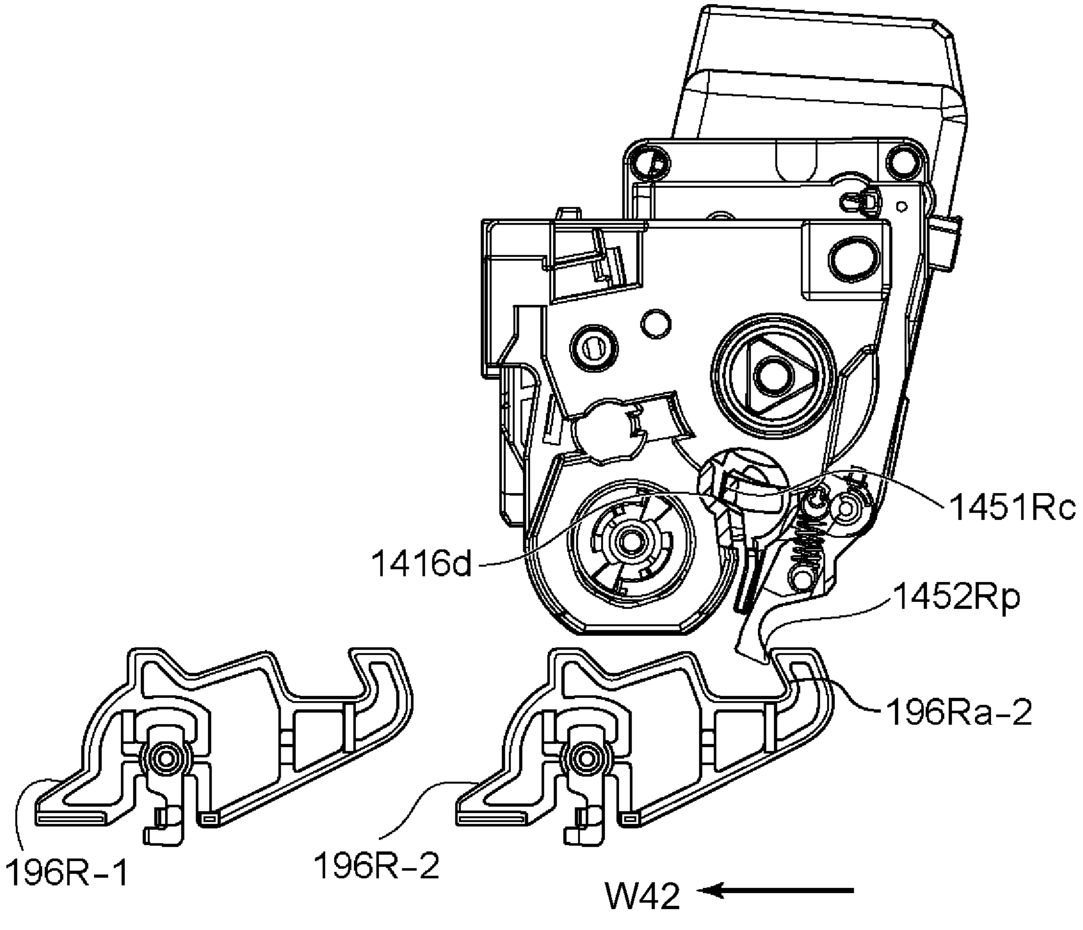
FIG. 90 is a side view of the process cartridge in the image forming apparatus main assembly.
Figure 91:
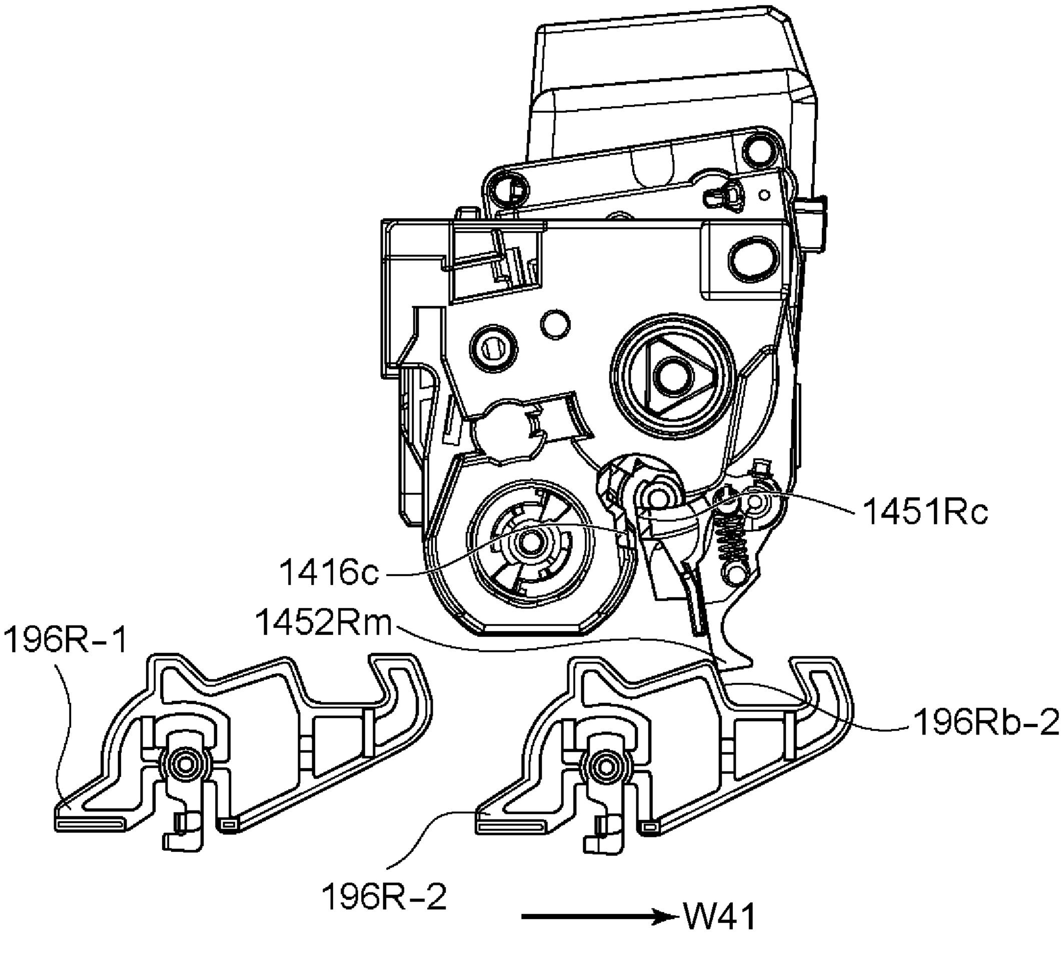
FIG. 91 is a side view of the process cartridge in the image forming apparatus main assembly.
Figure 92:
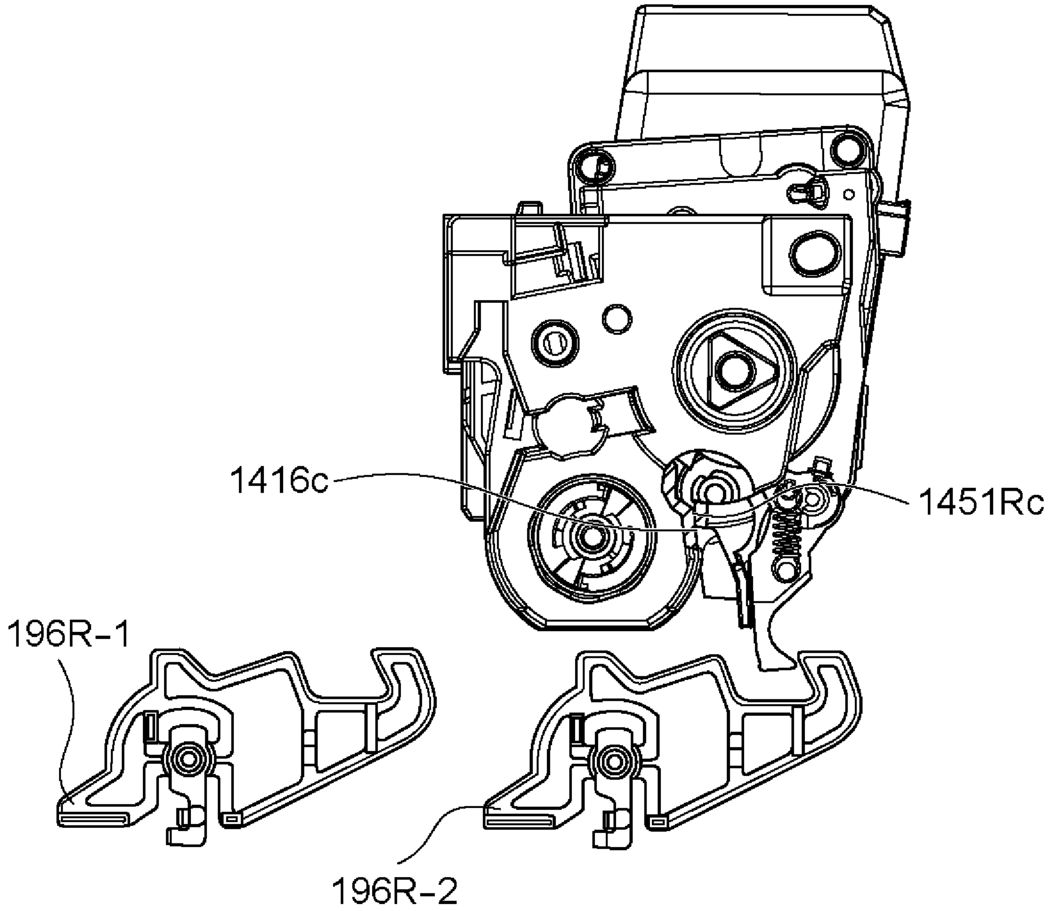
FIG. 92 is a side view of the process cartridge in the image forming apparatus main assembly.
Figure 93:
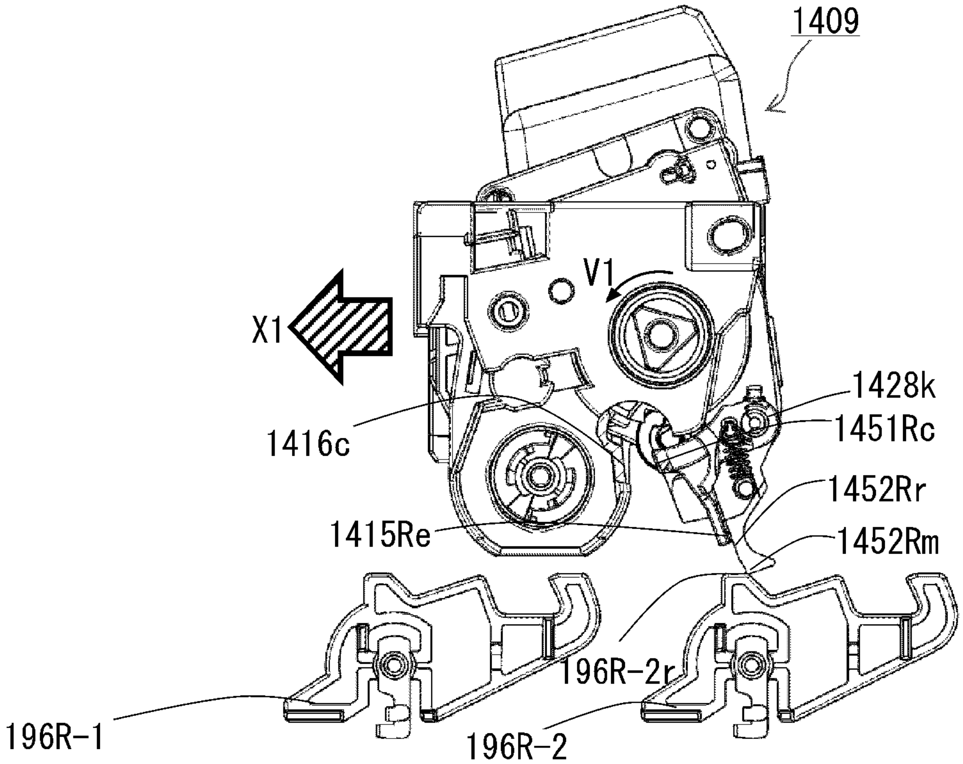
FIG. 93 is a side view of the process cartridge in the image forming apparatus main assembly.
Figure 94:
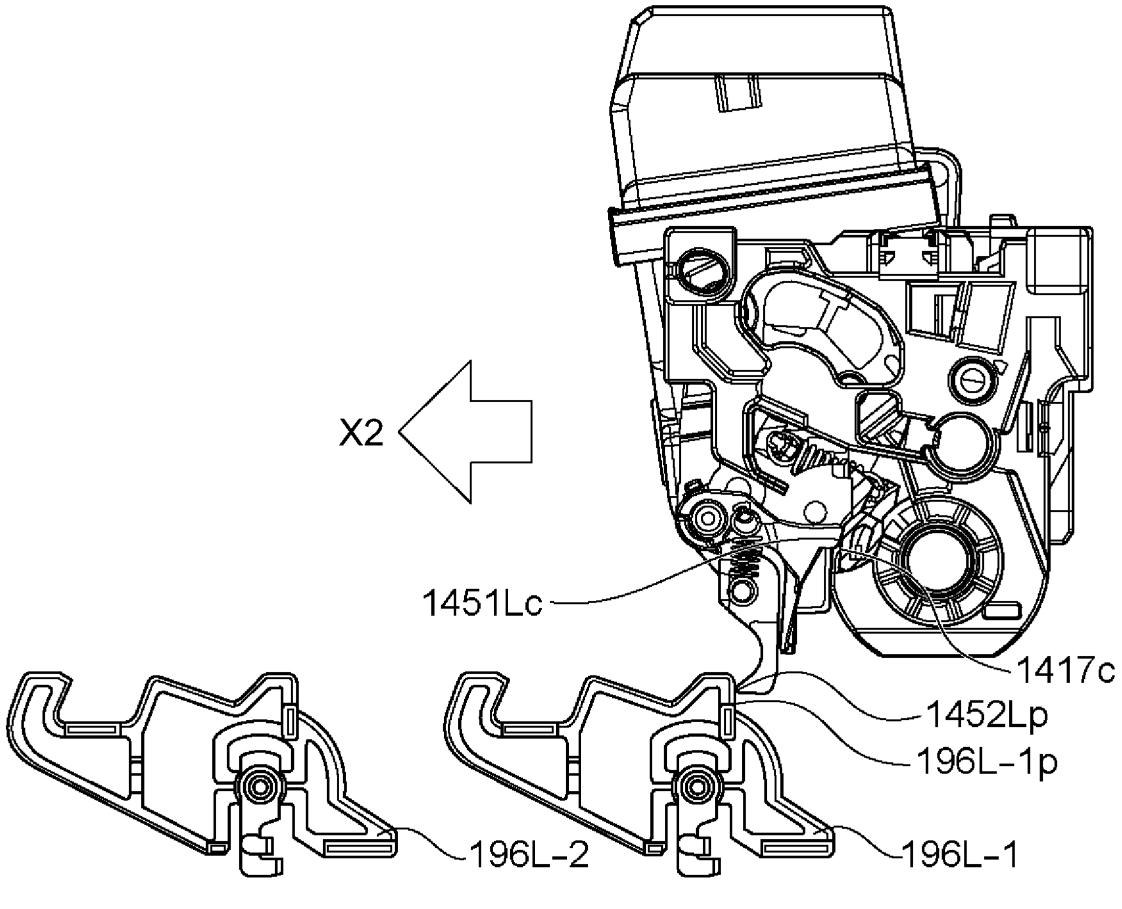
FIG. 94 is a side view of the process cartridge in the image forming apparatus main assembly.
Figure 95:
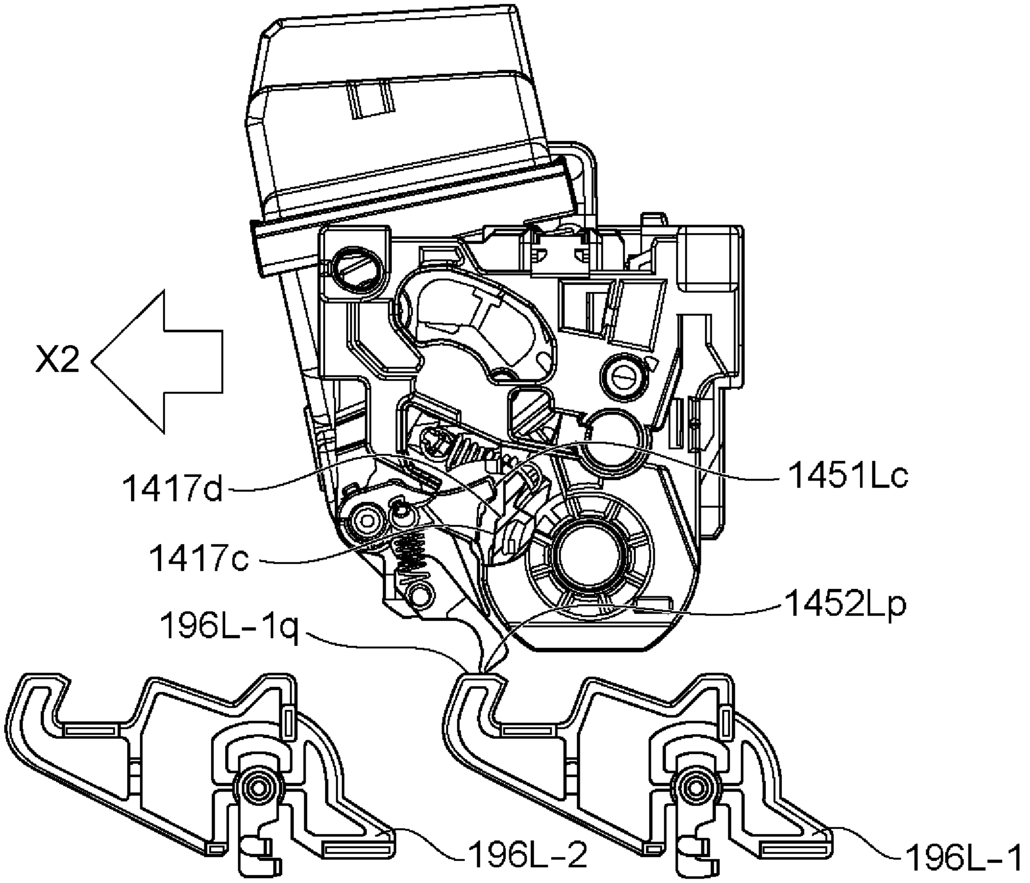
FIG. 95 is a side view of the process cartridge in the image forming apparatus main assembly.
Figure 96:
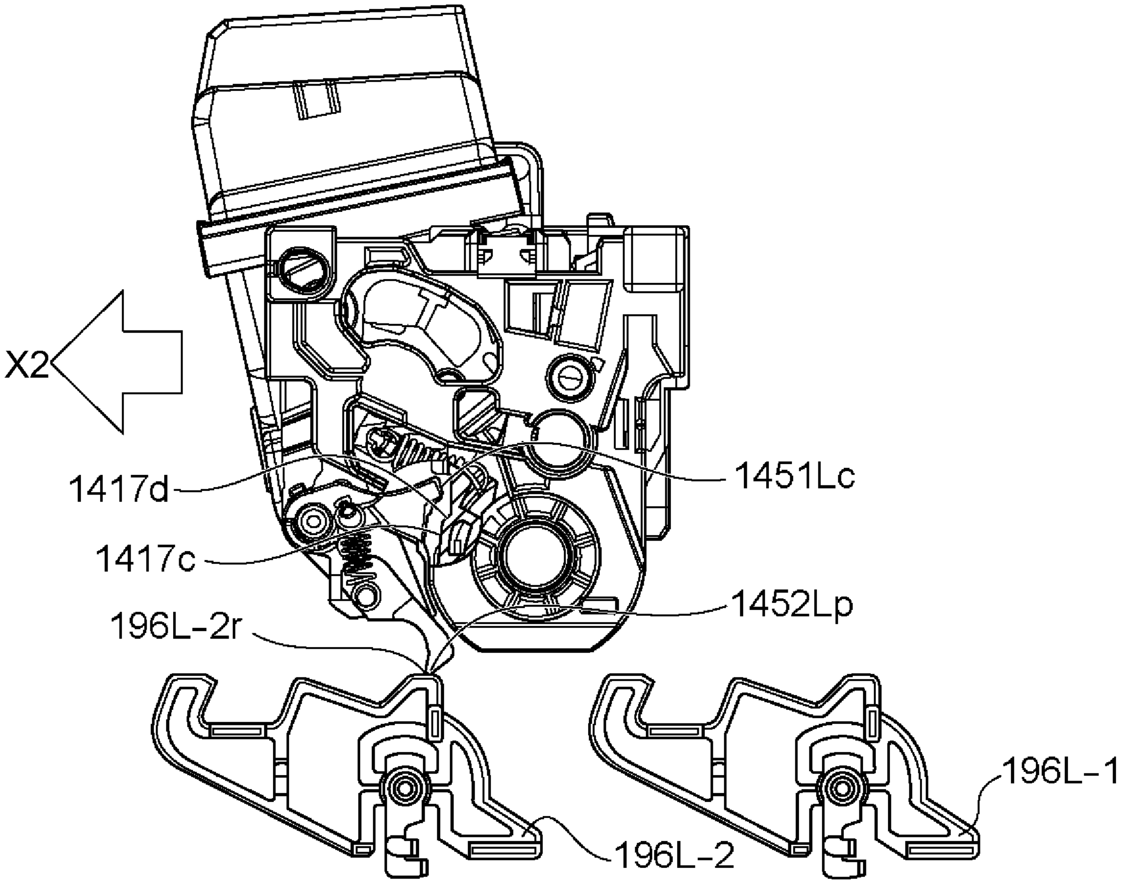
FIG. 96 is a side view of the process cartridge inside the image forming apparatus main assembly.
Figure 97:
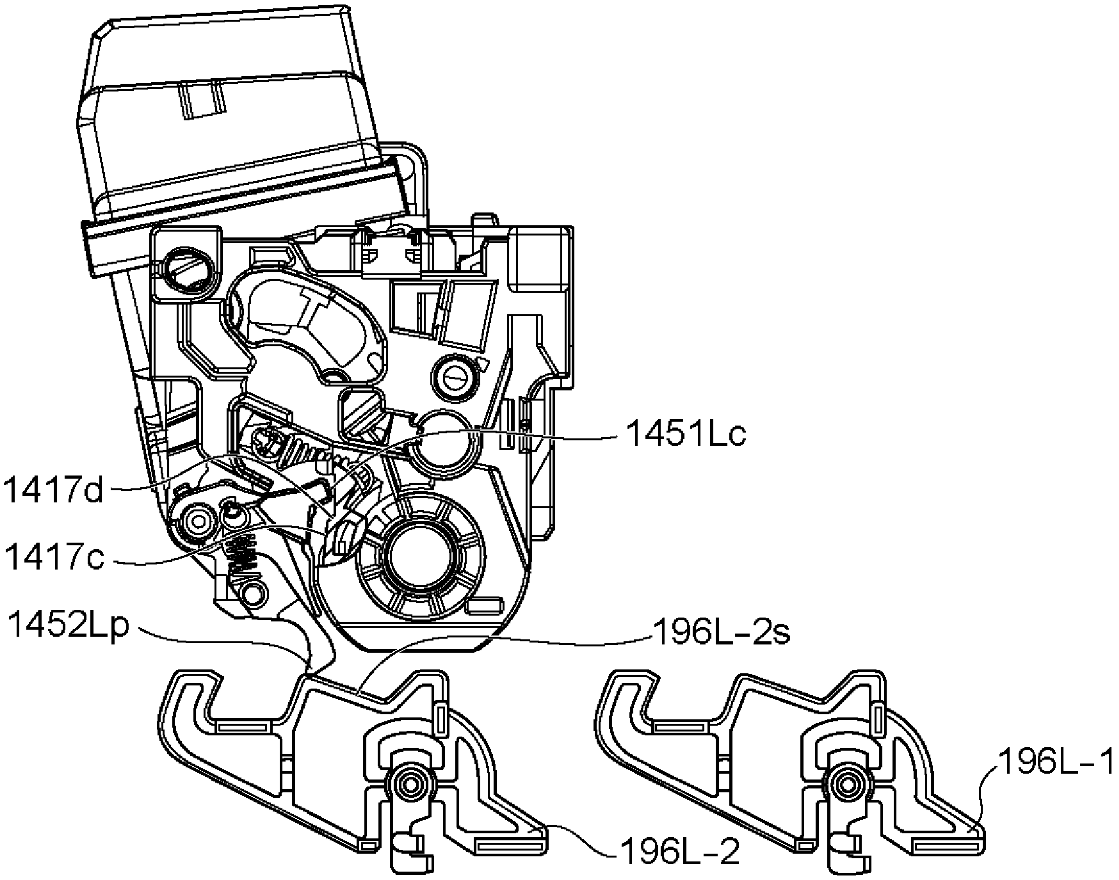
FIG. 97 is a side view of the process cartridge inside the image forming apparatus main assembly.
Figure 98:
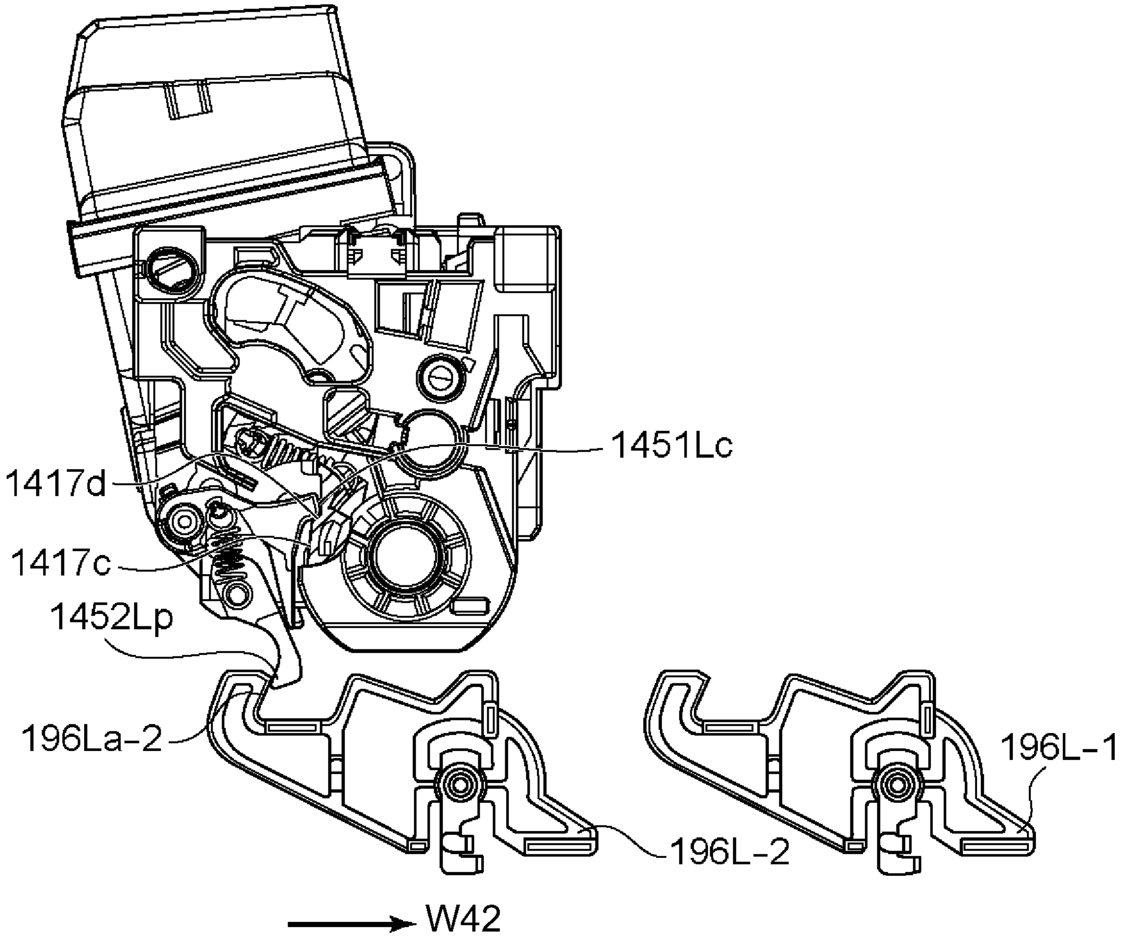
FIG. 98 is a side view of the process cartridge inside the image forming apparatus main assembly.
Figure 99:
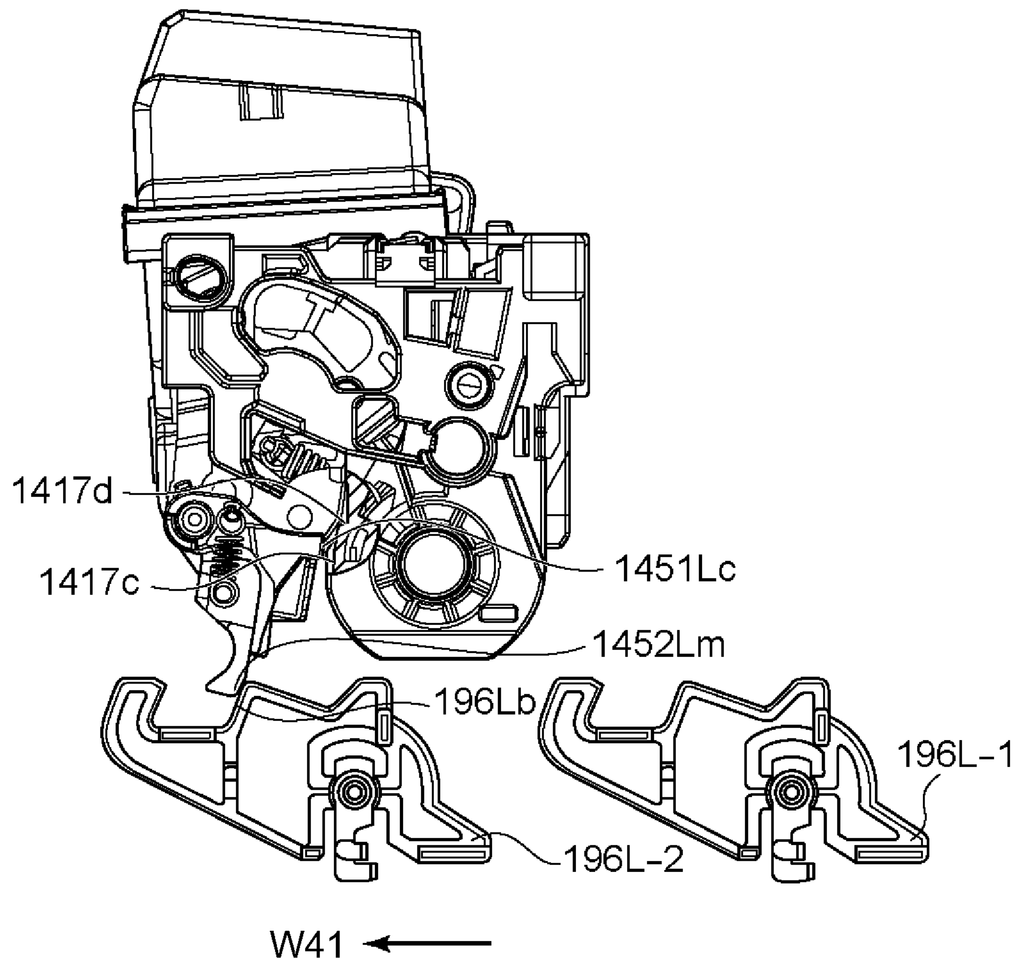
FIG. 99 is a side view of the process cartridge in the image forming apparatus main assembly.
Figure 100:
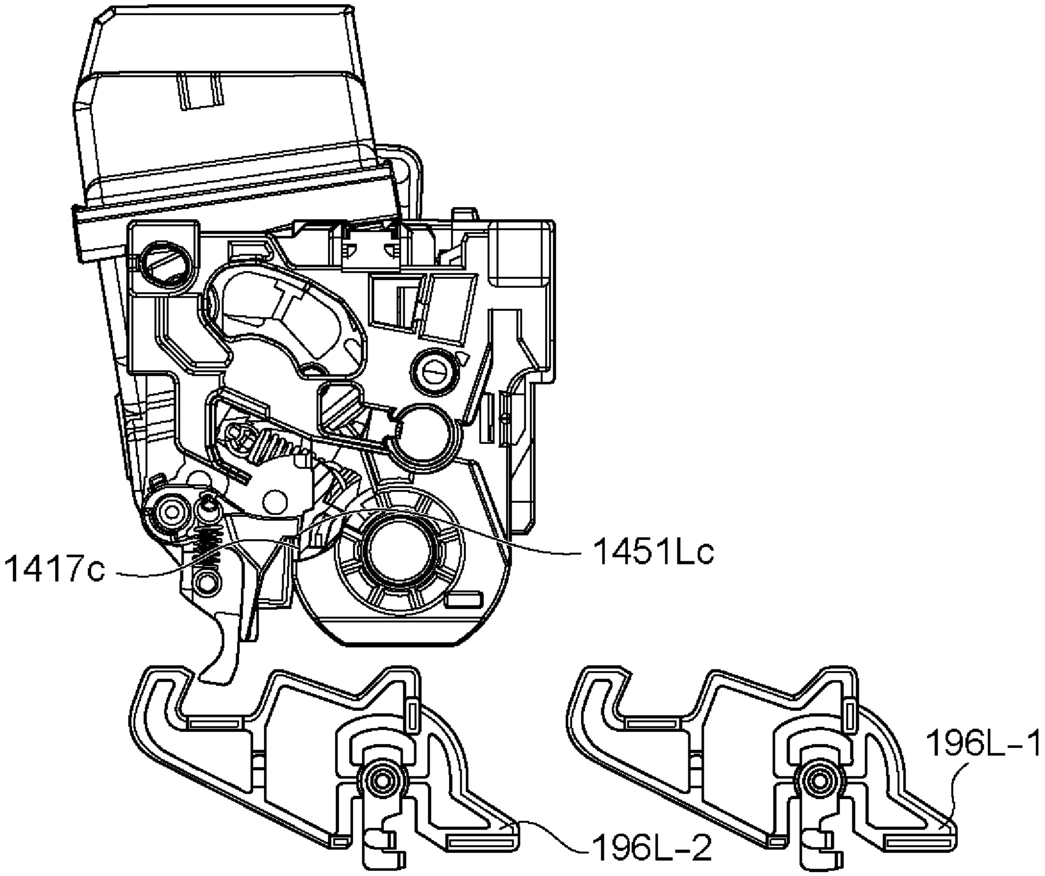
FIG. 100 is a side view of the process cartridge in the image forming apparatus main assembly.
Figure 101:
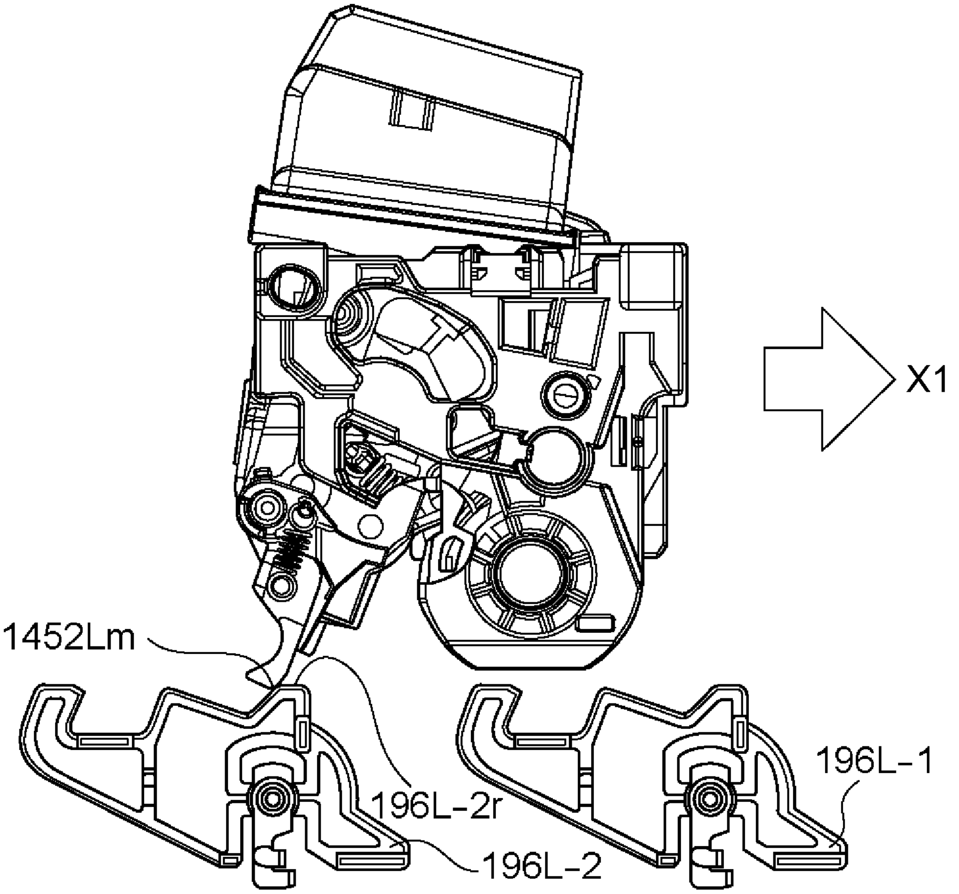
FIG. 101 is a side view of the process cartridge in the image forming apparatus main assembly.

FIGS. 90 to 92 are illustrations after the tray 171 is inserted until the process cartridge 1400 is separated and kept separated by the initial operation of the image forming apparatus described later. FIG. 93 is a view seen from the drive-side of the process cartridge 1400, omitting all but the process cartridge 1400 and the separation control member 196R in the process of pulling out the cartridge tray 171 from the image forming position to the outside of the image forming apparatus main assembly 170. FIGS. 98 to 101 are the views of the process cartridge 1400 as viewed from the non-drive-side at the same time point as that of in FIGS. 90 to 92.

Since the image forming apparatus main assembly 170 is equipped with a plurality of process cartridges 1400 to form an image, the corresponding numbers of the separation control members 196R are provided. Therefore, in this embodiment, for convenience, the separation control members 196R (196L) are distinguished by adding a numeral to the end of the separation control member 196R (196L).

Figure 86:
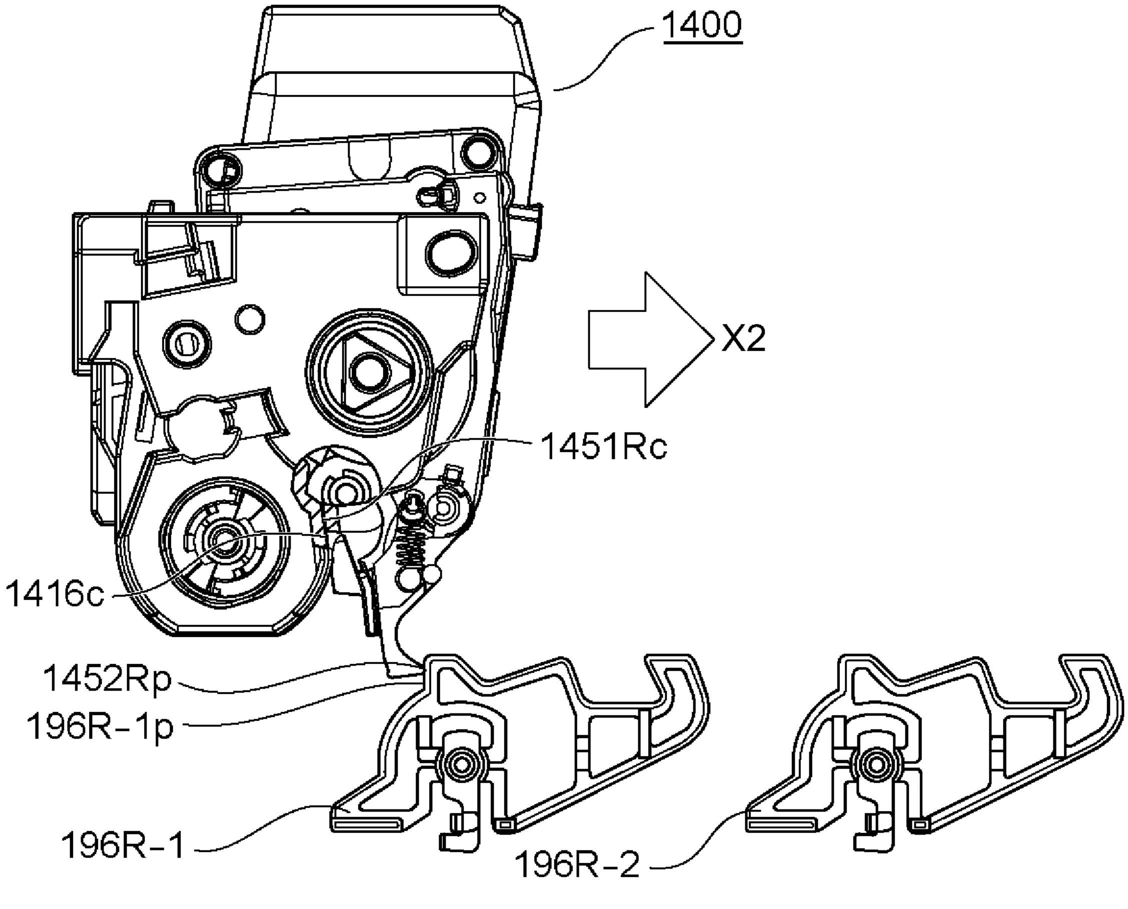
FIG. 86 is a side view of the process cartridge in the image forming apparatus main assembly.
Figure 87:
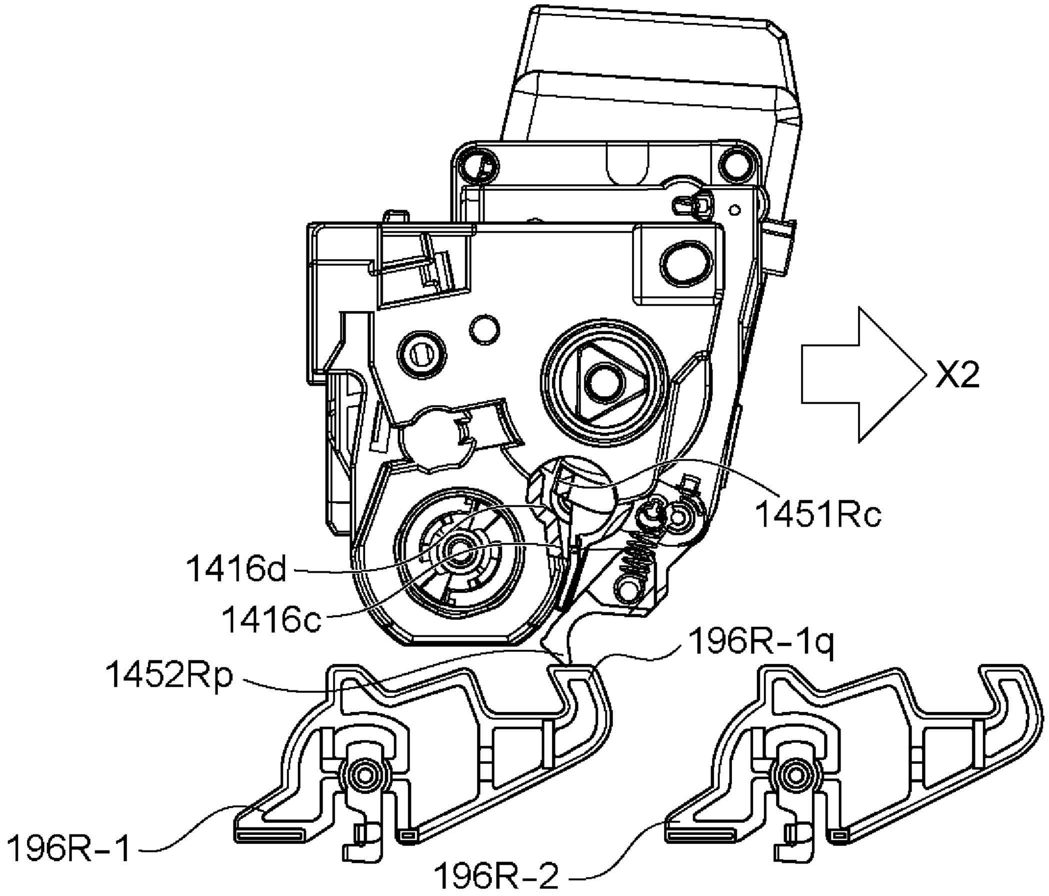
FIG. 87 is a side view of the process cartridge in the image forming apparatus main assembly.

When the process cartridge 1400 carried on the tray 171 (not shown) as shown in FIG. 86 is inserted in the direction of X2, which is the internal direction of the image forming apparatus main assembly 170, the second force receiving surface 1452Rp of the movable member 1452R comes into contact with the upstream side surface 196R-1*p* of a separation control member 196R-1 in the inserting direction. When the tray 171 is further inserted, as shown in FIG. 87, the cartridge insertion operation is performed while the second force receiving surface 1452Rp of the movable member 1452R is in contact with the upstream side surface 196R-1*q* of the separation control member in the inserting direction. Here, the force due to the tension spring 1453 is set to be weaker than the force due to the urging spring (not shown) that urges the separation control member 196R in the E1 direction, and when the movable member 1452R and the separation control member 196R come into contact with each other, the movable member 1452R rotates to escape. Further, the movable member 1452R and the spacer 1451R are structured to rotate in the B2 direction (the direction from the separation holding position to the separation release position) and the CB direction, which is larger than that in the state shown in FIG. 83.

Therefore, the second force receiving surface 1452Rp of the movable member 1452R rides on the upper surface 196R-1*q* of the separation control member 196R-1. Therefore, the movable member 1452R moves from the separation holding position to the separation release position, and the process cartridge 1400 shifts from the separated state to the contact state.

Figure 88:
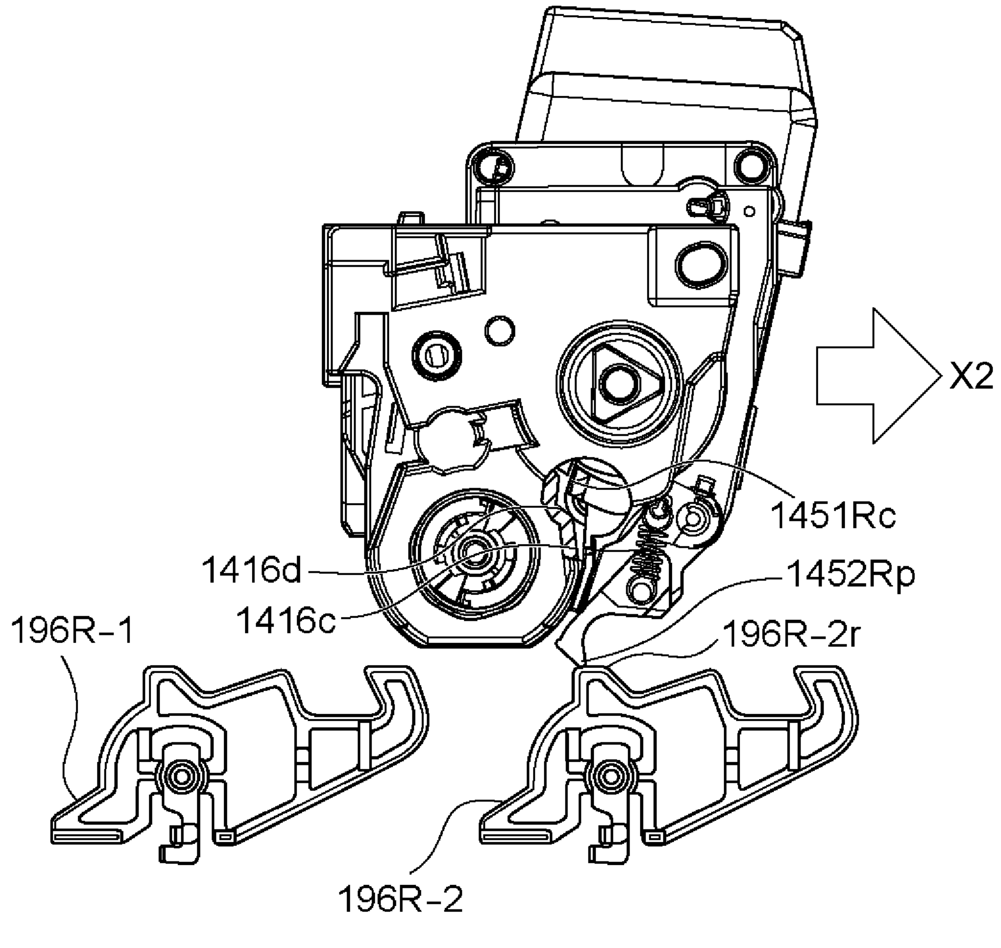
FIG. 88 is a side view of the process cartridge in the image forming apparatus main assembly.

When the tray 171 (not shown) is further inserted from this state, it comes into contact with the separation control member 196R-2 adjacent to the separation control member 196R-1 as shown in FIG. 88. Similarly to the separation control member 196R-1, the separation control member 196R-2 is inserted while being in contact with the upstream side surface 196R-1*p* and the upper surface 196R-2*q* in the inserting direction. At this time, the process cartridge 1400 is still in the contact state. The process cartridge 1400 is maintained in contact even after passing through the separation control member 196R-1. When it comes into contact with the upper surface 196R-2*q*, the movable member 1452R and the spacer 1451R rotate in the B2 direction (the direction from the separation holding position to the separation release position) and the CB direction more than before the contact with the upper surface, and therefore, it passes by 196R-2*q*. Therefore, after passing through the upper surface 196R-2*q*, the movable member 1452R and the spacer 1451R rotate slightly in the B1 direction and the CA direction while maintaining the contact state of the process cartridge 1400. The same applies when passing through the other two separation control members 196R-3 and 196R-4.

Figure 89:
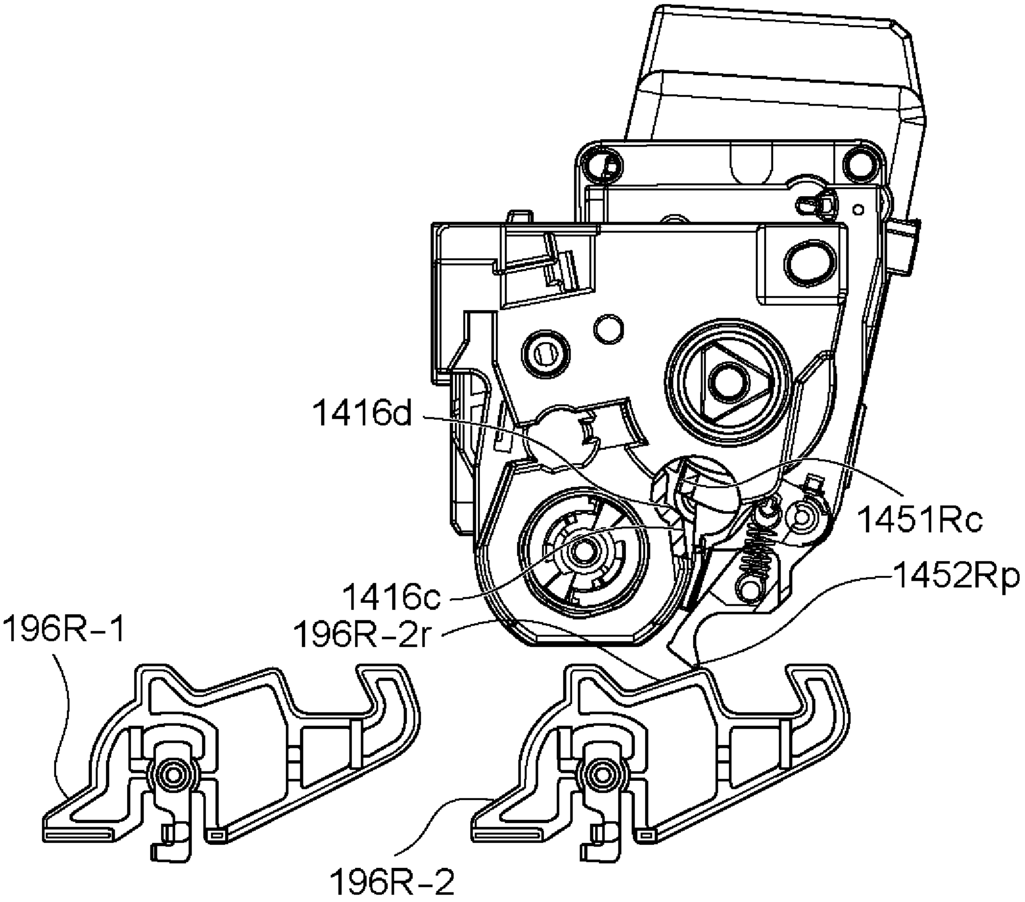
FIG. 89 is a side view of the process cartridge in the image forming apparatus main assembly.

FIG. 89 is an illustration in which the tray 171 (not shown) is inserted to a position where an image can be formed. In this state, the second force receiving surface 1452Rp of the movable member 1452R rides on the upper surface 196R-2*s* of the separation control member 196R.

With this state, the process cartridge 1400 cannot effect the contact operation and separation operation. However, the image forming apparatus main assembly 170 executes an initial operation after closing the front door and before performing image forming (printing on a recording material such as paper). In this initial operation, the separation control member 196R performs the above-mentioned contact operation and separation operation (operations in the W41 and W42 directions). At that time, by entering the contact operation (operation in the W42 direction) as shown in FIG. 90, the second force receiving surface 1452Rp of the movable member 1452R and the first force application surface 196Ra of the separation control member 196R come into contact with each other. Next, by performing the separation operation (operation in the W41 direction), as shown in FIG. 91, the second force application surface 196Rb of the separation control member 196R comes into contact with the first force receiving surface 1452Rm of the movable member 1452R, so that the process cartridge 1400 rotates in the direction indicated by V1 until the spacer 1451R comes into contact with the movable member 1452R.

When the separation control member 196R returns to the home position in this state, the process cartridge 1400 can be separated and kept separated as shown in FIG. 82, and the same image process operation as in the above-described embodiment is enabled.

Next, the description will be made as to the behavior of the process cartridge 1400 when the tray 171 (not shown) is pulled out from the image forming position to the outside of the image forming apparatus main assembly 170. When the process cartridge 1400 is pulled out in the direction X1 which is an outward direction of the image forming apparatus main assembly 170 as shown in FIG. 93, the first force receiving surface 1452Rm of the movable member 1452R contacts the separation control member 196R, and the surface 1452Rq of the movable member 1452R contact with the first pressing surface 1428*k* of the development cover member 1428, so that the developing unit 1409 rotates in the V1 direction. When the tray 171 is pulled out, it is further rotated in the V1 direction from the separated state shown in FIG. 85, and the state shown in FIG. 93 results. That is, the developing unit is structured such that the developing roller 106 is more remote away from the photosensitive member drum 104 than in the state shown in FIG. 85. At this time, the process cartridge 1400 is pulled out while the first force receiving surface 1452Rm of the movable member 1452R is in contact with the upper surface 196R-2*r* of the separation control member 196R. In this manner, when the process cartridge 1400 is pulled out from the image forming apparatus main assembly 170, the developing unit 1409 is pulled out while being separated. When the tray 171 (not shown) is pulled out to the outside of the image forming apparatus main assembly 170, the process cartridge 1400 becomes in the same state as the separated process cartridge 1400 shown in FIG. 82. In this manner, even if the developing unit 1409 rotates in the V1 direction by contacting the separation control member 196R, the process cartridge 1400 remains in the separated state.

In the foregoing description of this embodiment, only the drive-side has been dealt with. Since the non-drive-side has the same structure and operation as the drive-side, the description thereof will be omitted in this embodiment.

According to the structure of this embodiment described above, the same effect as that of Embodiment 1 can be obtained.

Further, in this embodiment, the movable member 1452R, the first force receiving surface 1452Rm constituting the first force receiving portion (retracting force receiving portion, separating force receiving portion), and the second force receiving surface 1452R Page constituting the second force receiving portion (contact force receiving portion) are made movable relative to the drum unit. In this embodiment, by this movement, the first force receiving surface 1452Rm and the second force receiving surface 1452Rp displaced at least the direction VD1 (FIG. 40, and so on), the direction VD10 (FIG. 236, and so on), the direction VD12 (FIG. 238), and the direction VD14 (FIG. 238). In particular, when the tray 171 is inserted into the image forming apparatus main assembly 170, the process cartridge 1400 is inserted, and the process cartridge 1400 is passed by the upper surface 196R-q of the separation control member 196R, the first force receiving surface 1452Rm and the second force receiving surface 1452Rp can be displaced in these directions, while maintaining the contact state of the developing unit. Further, when the tray is drawn out from the image forming apparatus main assembly 170 and the process cartridge 1400 is drawn out, the first force receiving surface 1452Rm and the second force receiving surface 1452Rp can be displaced in these directions while maintaining the separated state of the developing unit.

By this, when the process cartridge 1400 is inserted into or removed from the apparatus main assembly 170, it can be avoided that the movable member 1452R (particularly the first force receiving surface 1452Rm and the second force receiving surface 1452Rp) and the apparatus main assembly 170, particularly the separation control member 196L interfere with each other with the result of incapability of the insertion or the removal.

Embodiment 7

Next, referring to FIGS. 102 to 115, Embodiment 7 of the present invention will be described. In this embodiment, structures and operations different from those of the above-described embodiment will be mainly described, and description of similar structures and operations will be omitted. For the structure corresponding to that in the above-described embodiments, the same reference numerals and characters are assigned, or the reference numerals in the first part is changed while the reference numerals and characters in the second part are the same. In this embodiment, the structure will be described in which the movable member, which is a pressing member in the separation/contact mechanism of the process cartridge 1600, is projected from the accommodated position (stand-by position) to the operating position by the driving force transmitted by the drive transmission mechanism of the image forming apparatus main assembly 170.

The process cartridge 1600 includes a separation/contact mechanism 1650R on the drive-side and a separation/contact mechanism 1650L on the non-drive-side. Regarding the separation/contact mechanism, the details of the separation/contact mechanism 150R on the drive-side will first be described, and then the separation/contact mechanism 150L on the non-drive-side will be described. Further, since the separation/contact mechanism has almost the same function on the drive-side and the non-drive-side, R is added to the reference signs for the drive-side. For the non-drive-side, the reference sign of each member is the same as that of the drive-side but L is added.

Figure 102:
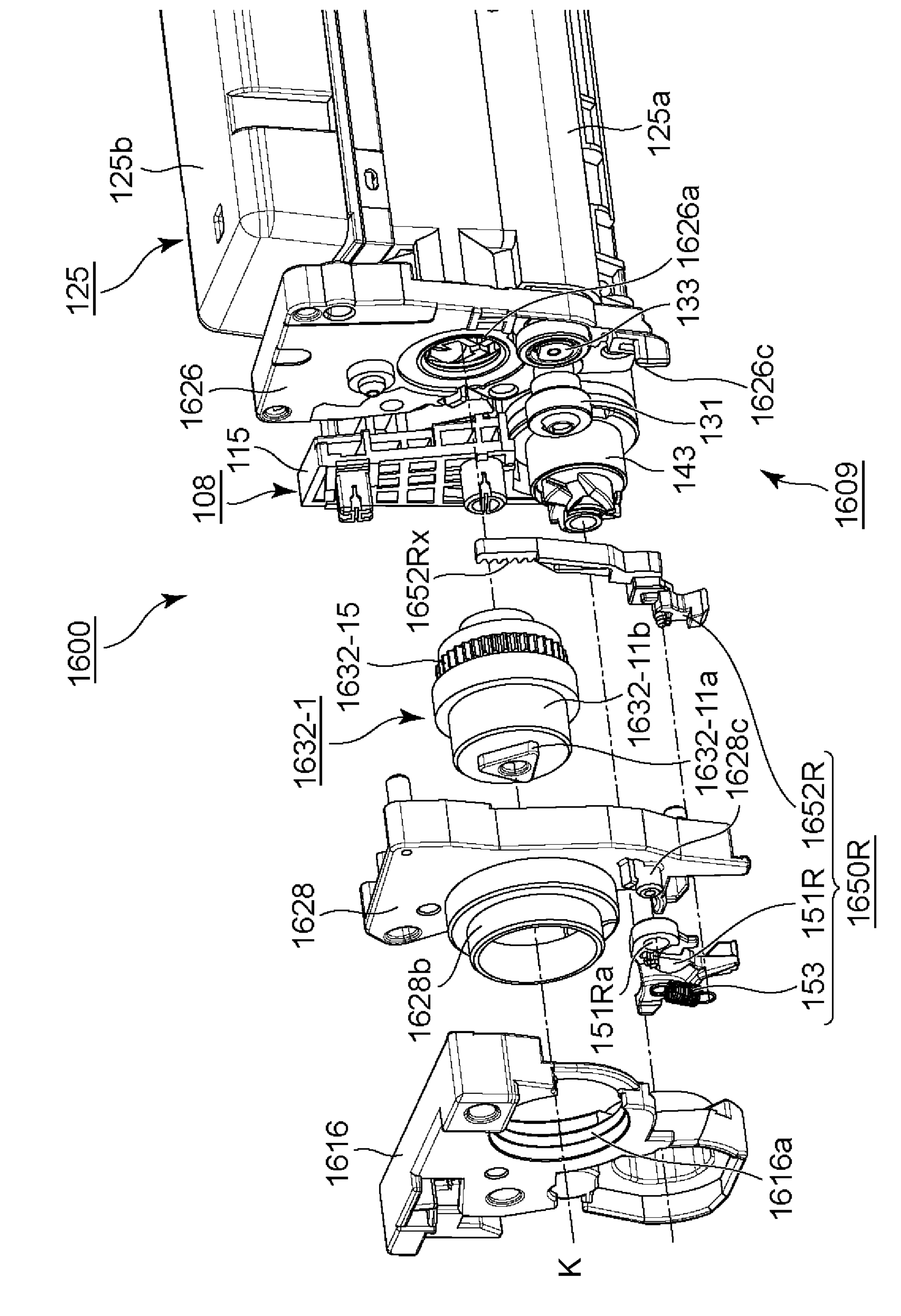
FIG. 102 is an exploded perspective view of a process cartridge.
Figure 106:
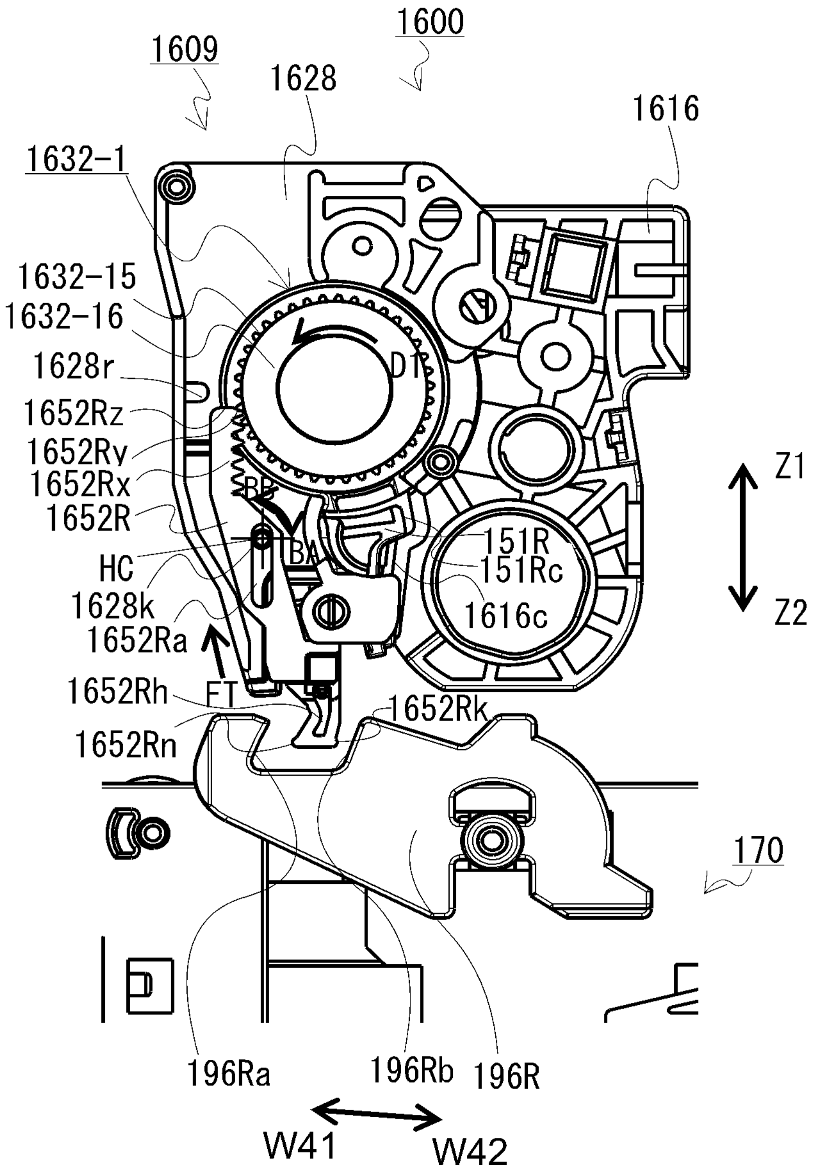
FIG. 106 is a sectional view of the process cartridge inside the image forming apparatus main assembly.
Figure 107:
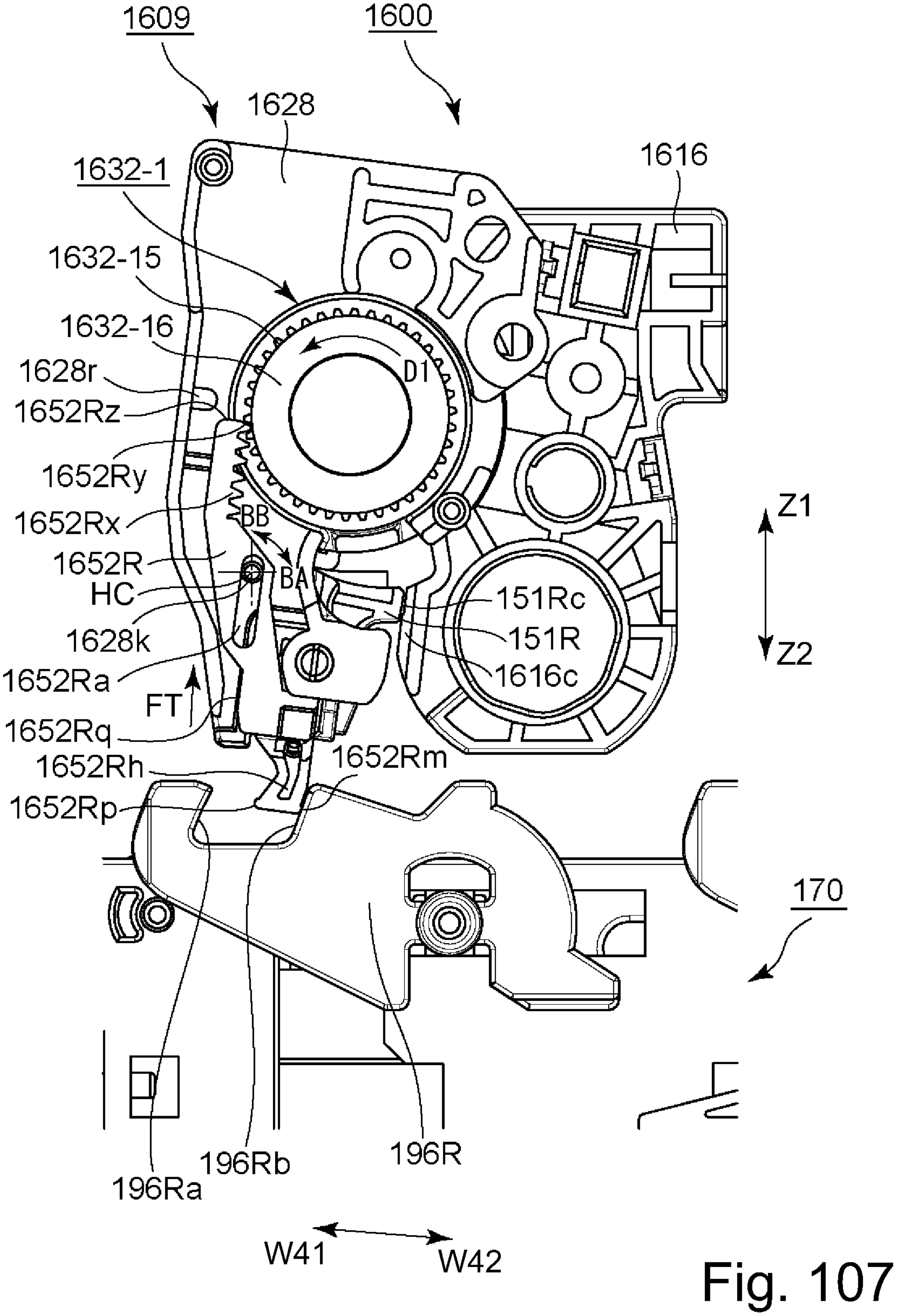
FIG. 107 is a sectional view of the process cartridge inside the image forming apparatus main assembly.

FIG. 102 shows an assembly perspective view of the drive-side of the developing unit 1609 including the separation/contact mechanism 1650R. The separation/contact mechanism 1650R includes a spacer 151R which is a restricting member, a movable member 1652R which is a pressing member, and a tension spring 153. Further, as shown in FIGS. 103 and 106, the movable member 1652R includes a first force receiving portion (retracting force receiving portion, separating force receiving portion) 1652Rk and a second force receiving portion (contact force receiving portion) 1652Rn, as in the Embodiment 1.

Figure 103:
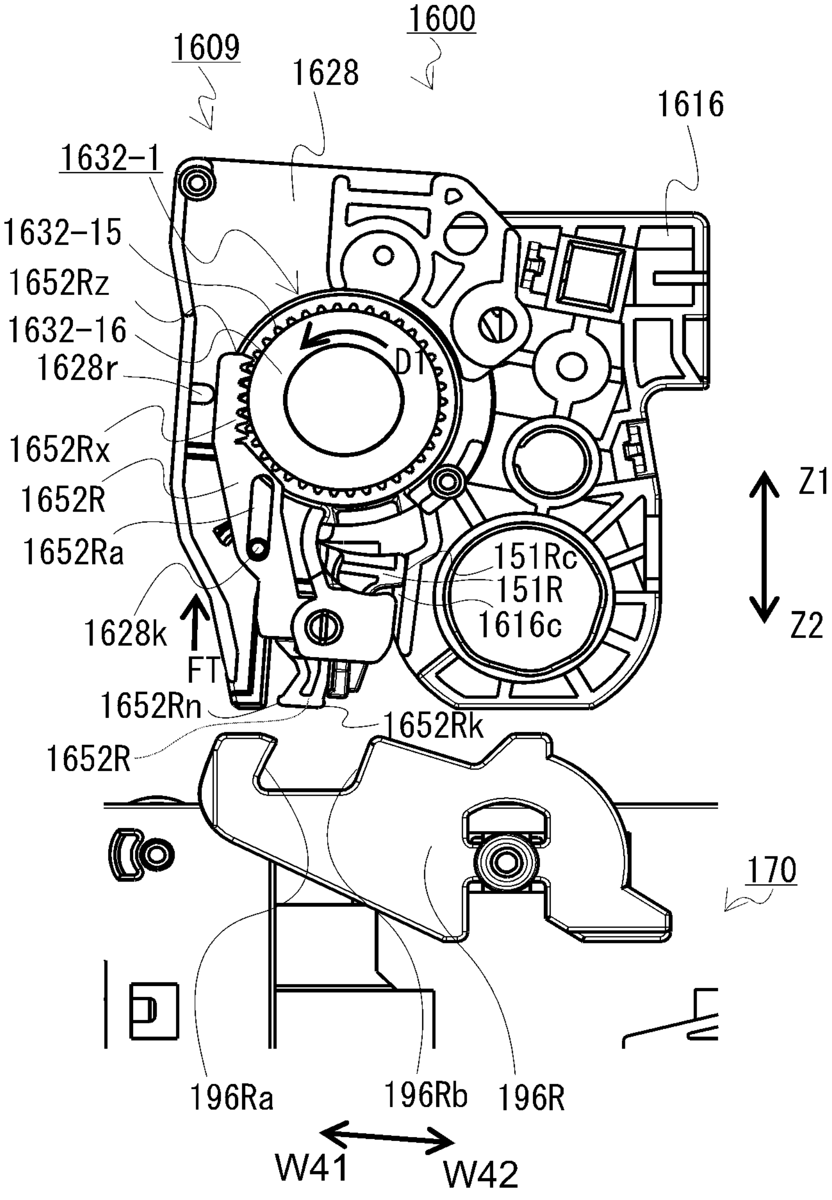
FIG. 103 is a sectional view of the process cartridge inside an image forming apparatus main assembly.

The movable member 1652R is provided with a rack portion 1652Rx, and the outer diameter of the second supporting portion 1628*k* of the development cover member 1628 and the inner wall of the oblong support receiving portion 1652Ra are engaged with each other, and the movable member 1652R is supported so as to be linearly movable and rotatable (FIG. 103). The rack portion 1652Rx engages with the gear portion 1632-15*b* of the movable member drive gear 1632-15, and is structured to be movable in interrelation with the rotation of the movable member drive gear 1632-15. The movable member drive gear 1632-15 is structured as a portion of the development drive input gear unit 1632-1. In the development drive input gear unit 1632-1, the inner diameter portion of the cylindrical portion 1628*b* of the development cover member 1628 and the outer diameter portion of the cylindrical portion 1632-11*b* of the development coupling gear 1632-11 are engaged with each other, and in addition, the supporting portion 1626*a* of the drive-side bearing 1626 and the cylindrical portion (not shown) of the transmission gear 1632-16 are engaged with each other, By which the driving force can be transmitted to various gears. Further, similarly to Embodiment 1, the first supporting portion 1628*c* of the development cover member 1628 is fitted with the inner diameter of a support receiving portion 151Ra of the spacer 151R, the spacer 151R is rotatably supported, and the movable member 1652R and the spacers 151R are urged by the tension spring 153 to each other In addition, the outer diameter of the cylindrical portion 1628*b* of the development cover member 1628 is fitted into the developing unit supporting hole 1616*a* of the drive-side cartridge cover member 1616, so that the developing unit 1609 is supported so as to be rotatable about the swing axis K.

Next, referring to FIGS. 103 to 107, the contacting and separating operations of the separation/contact mechanism on the drive-side in this embodiment will be described in detail.

Figure 104:
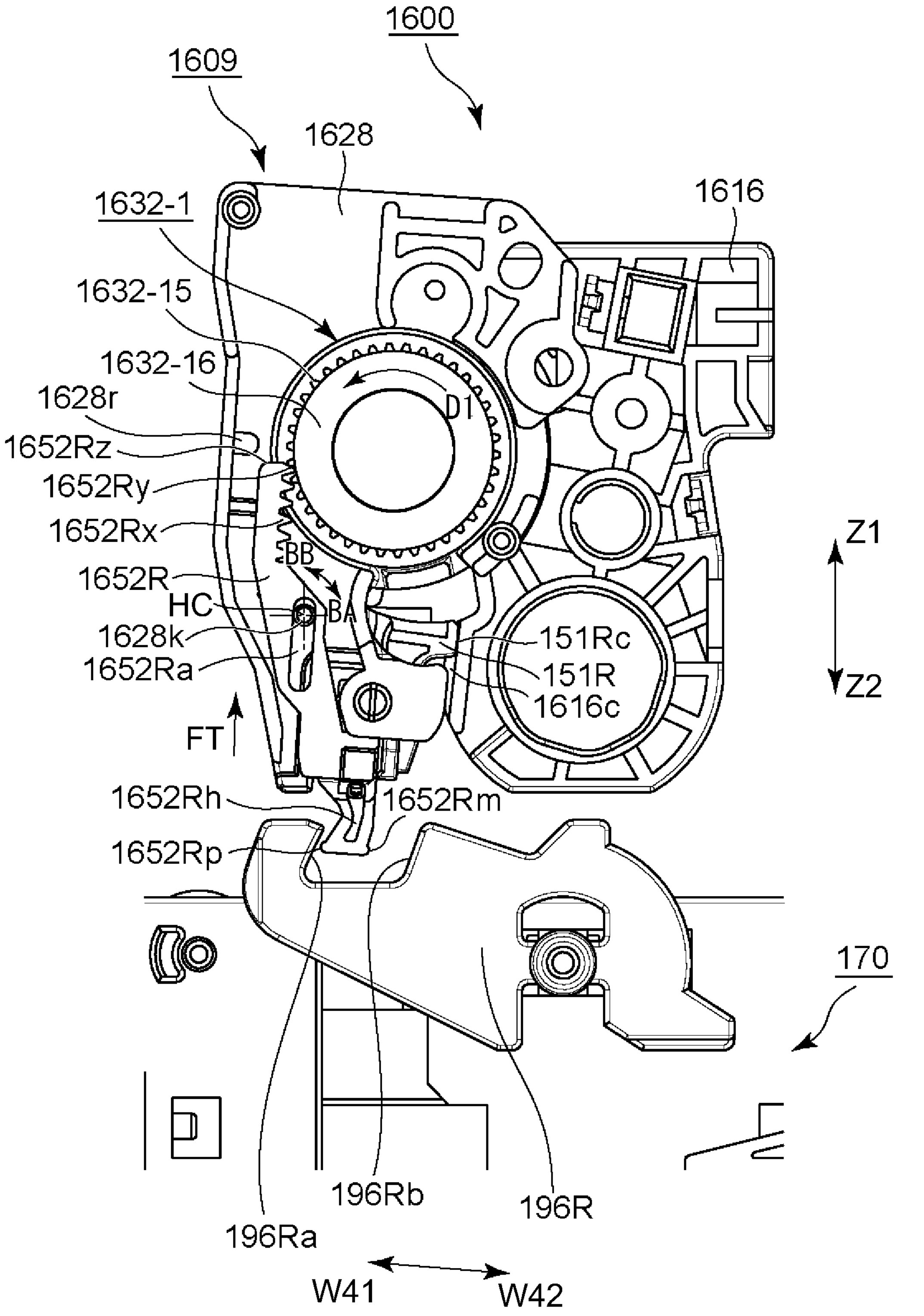
FIG. 104 is a sectional view of the process cartridge inside the image forming apparatus main assembly.

FIG. 103 is a view as seen from the non-drive-side of a process cartridge 1600, when the process cartridge 1600 is mounted on a cartridge tray (not shown) of the image forming apparatus main assembly 170 and the cartridge tray 1161 is inserted at the first mounting position, in which the members are omitted except for the drive-side cartridge cover member 1616, the development cover member 1628, and the development drive input gear unit 1632-1, the movable member 1652R, and the spacer 151R. In this state, the movable member 1652R is in the stand-by position. From this state, the development drive coupling 185 in the main assembly side moves in interrelation with the transition from the open state to the closed state of the front door 11 of the image forming apparatus main assembly 170 to engage with the development coupling (rotational drive force receiving portion) 1632-11, as in the Embodiment 1. Thereafter, when the development coupling 1632-11 is rotated by the driving force of the main assembly and the development drive input gear unit 1632-1 is rotated in the direction of the arrow D1, the movable member drive gear 1632-15 is rotated in the direction of the arrow D1 in interrelation therewith. At this time, the rack portion 1652Rx of the movable member 1652R meshes with the gear portion 1632-15*b* of the movable member drive gear 1632-15, and therefore, it projects downward in the arrow Z2 direction (state in FIG. 104). At this time, since the movable member 1652R is urged by the tension spring 153 substantially parallel to the arrow Z1 direction, the terminal portion 1652Ry of the rack portion 1652Rx and the gear portion 1632-15*b* of the movable member drive gear 1632-15 intermittently repeats the contact with each other, and by the internal mechanism of the development drive input gear unit 1632-1 which will be which will be described hereinafter, the movable member drive gear 1632-15 to stops rotating and the movable member 1652R stops at the projecting position (operating position). When this operation is completed, as shown in FIG. 104, the movable member 1652R is placed in the projected position (operating position) between the first force application surface 196Ra and the second force application surface 196Rb of the separation control member 196R the separation control member 196R. At this time, as in the Embodiment 1, there is a gap between the projecting portion 1652Rh and the first force application surface 196Ra and the second force application surface 196Rb. As described above, in this embodiment, by the development coupling 1632-11 receiving the driving force, the movable member 1652R moves in the Z2 direction (predetermined direction) and shifts from the stand-by position to the operating position.

Figure 105:
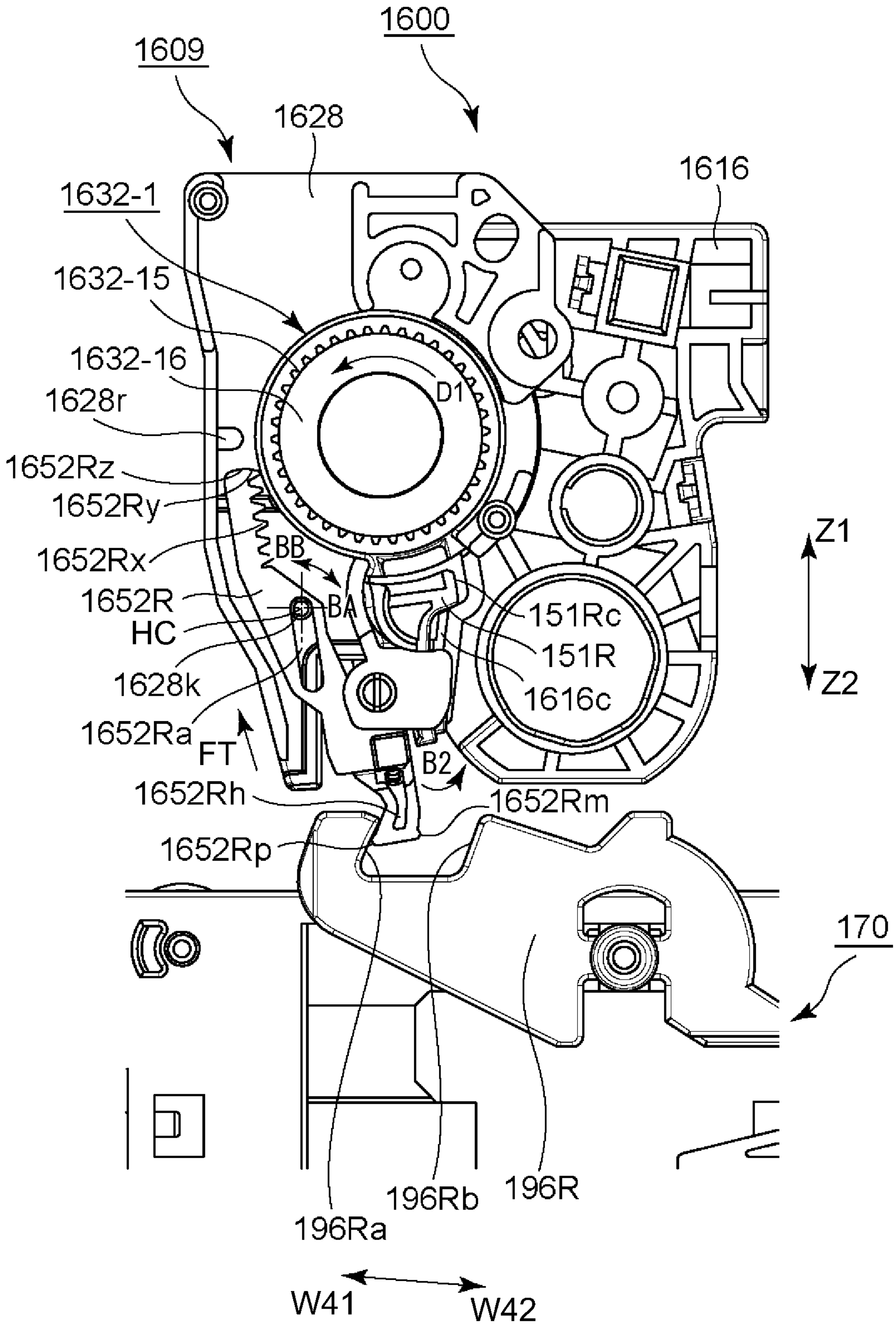
FIG. 105 is a sectional view of the process cartridge inside the image forming apparatus main assembly.

Next, referring to FIGS. 104 to 107, the operation of contact and the operation of separation between the photosensitive member drum 104 and the developing roller 106 by the separation/contact mechanism 1650R will be described. However, since the subsequent operations are the same as those described in the Embodiment 1, an operation different from that of the Embodiment 1 will be described. The separation/contact mechanism 1650R comprises the spacer 151R, the movable member 1652R, and the tension spring 153. As shown in FIG. 105, by the separation control member 196R moving from the home position to the first position, the movable member 1652R rotates in the direction of arrow BB about the second supporting portion 1628*k* of the development cover member 1628. At this time, the spacer 151R also rotates in the direction of arrow B2 in interrelation therewith, by which the developing unit 1609 moves to the contact position. Thereafter, as shown in FIG. 106, when the separation control member 196R moves in the W41 direction and returns to the home position, the movable member 1652R is rotated in the arrow BA direction by the urging member (not shown) to move the position not operated by the separation control member 196R, as in embodiment 1. As the urging member (not shown), a tension spring 153 may be used as in the Embodiment 1.

Next, when the separation control member 196R moves in the direction of W41 for the separation operation, the movable member 1652R further rotates in the direction of arrow BA from the state of FIG. 106, and the first pressing surface 1652Rq of the movable member 1652R is brought into contact with the first pressed surface 1626*c* of the drive-side bearing 1626, by which the developing unit 109 rotates from the contact position to the separated position. At this time, the rack portion 1652Rx comes into contact with and meshes with the gear portion 1632-15*b* of the movable member drive gear 1632-15 (state in FIG. 107). Thereafter, when the separation control member 196R moves in the direction of the arrow W42 and returns from the second position to the home position, the separation holding surface 151Rc of the spacer 151R and the contact surface 1616*c* are brought into contact with each other, so that the developing roller 106 and the photosensitive member drum 104 are spaced from each other (state shown in FIG. 104).

Figure 108:
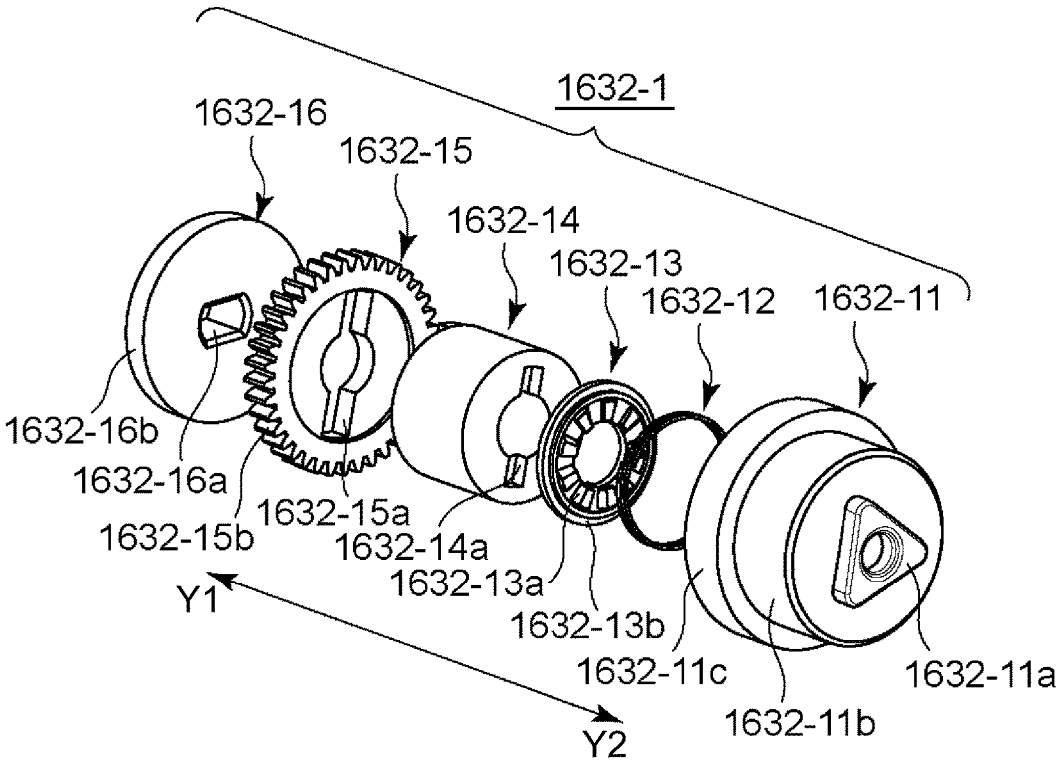
FIG. 108 is an exploded perspective view of a development drive input gear unit.
Figure 108:
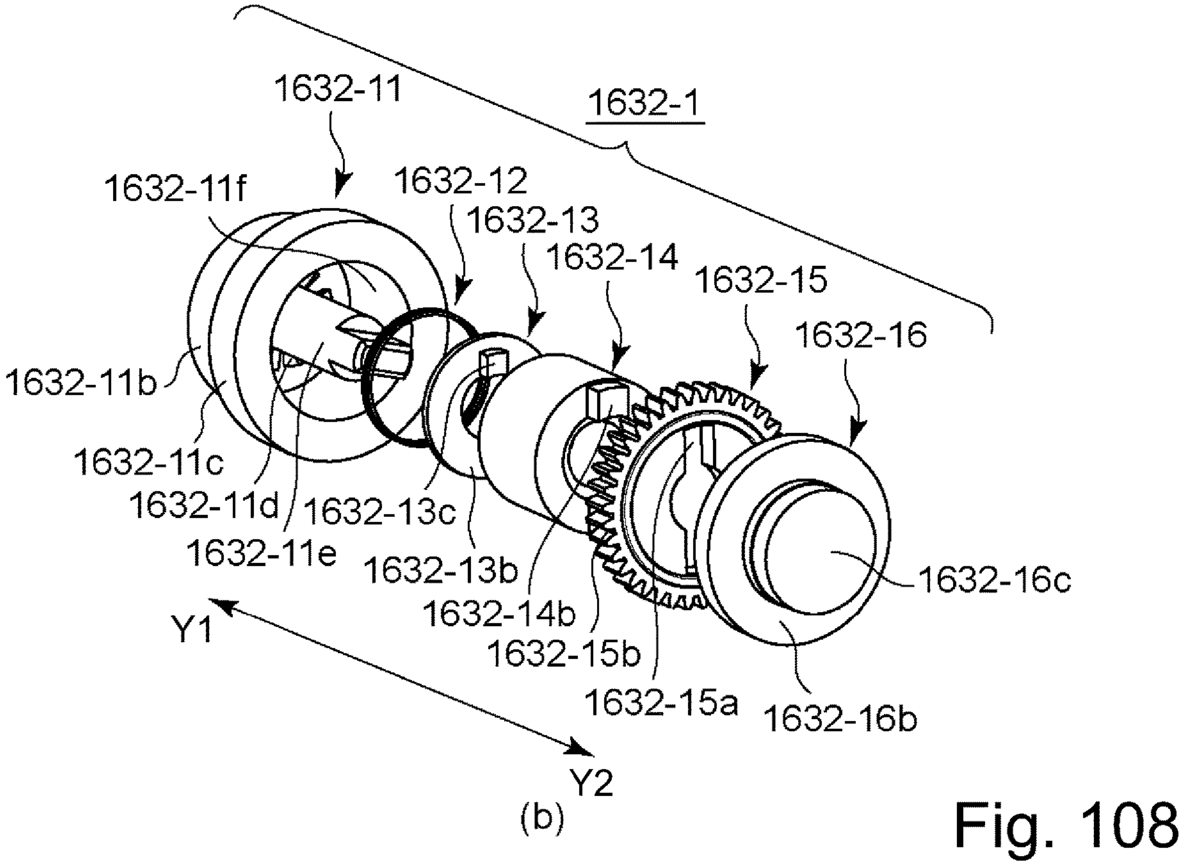

Next, referring to part (a) of FIG. 108 and part (b) of FIG. 108, the internal mechanism of the drive input gear unit 1632-1 will be described. The drive input gear unit 1632-1 includes the development coupling gear 1632-11, a compression spring 1632-12, a clutch plate 1632-13, a torque limiter 1632-14, a movable member drive gear 1632-15, and a transmission gear 1632-16. Only the movable member drive gear 1632-15 is shown as a detailed view of the gear portion 1632-15*b* of the gear, and the other gears are shown with the tooth shape omitted. In the development coupling gear 1632-11, a coupling portion (development coupling member) 1632-11*a* which engages with the development drive coupling 185 on the main assembly side and a developing roller drive gear 1632-11*c* which engages with the developing roller gear 131 are provided with the cylindrical portion 1632-11*b* therebetween. Further, the development coupling gear 1632-11 is provided with a projecting portion 1632-11*d* projecting from a side opposite to the side on which the coupling portion 1632-11*a* is provided so as to engage with the plurality of first projections 1632-13*a* of the clutch plate 1632-13 to transmit the drive. In addition, a driving shaft 1632-11*e* for transmitting the drive force to the transmission gear 1632-16 is provided extended in the same direction as the projecting portion 1632-11*d*, and a storage space 1632-11*f* is formed in the developing roller gear 1632-11*c* and the cylindrical portion 1632-11*b*. The clutch plate 1632-13 is provided with a second projecting portion 1632-13*c* projecting by way of a flange portion 1632-13*b* on the side opposite to the side on which a first projecting portion 1632-11*a* is provided, and is engageable with the recess 1632-14*a* of the torque limiter. The torque limiter 1632-14 is provided with a projecting portion 1632-14*b* which projects on the side opposite to the side on which the recess 1632-14*a* is provided so as to be engageable with the recess 1632-15*a* of the movable member drive gear 1632-15. The clutch plate 1632-13 and the torque limiter 1632-14 are structured to always rotate integrally. That is, they may be integrally molded. The transmission gear 1632-16 is provided with a recess 1632-16*a* which engages with a driving shaft 1632-11*e* extending from the development coupling gear 1632-11, and is structured to rotate always in interrelated with the development coupling gear 1632-11. Further, a transfer roller drive gear 1632-16*b* which engages with the toner feeding roller gear 133 (see FIG. 102) and a stirring drive gear 1632-16*c* which engages with a stirring gear that drives a toner stirring unit (not shown) are provided. The compression spring 1632-12 is placed in the accommodating space 1632-11*f* of the development coupling gear 1632-11 and between the clutch plate 1632-13, and urges the development coupling gear 1632-11 in the direction of arrow Y2, and urges the clutch plate 1632-13 in the direction of arrow Y1.

Figure 109:
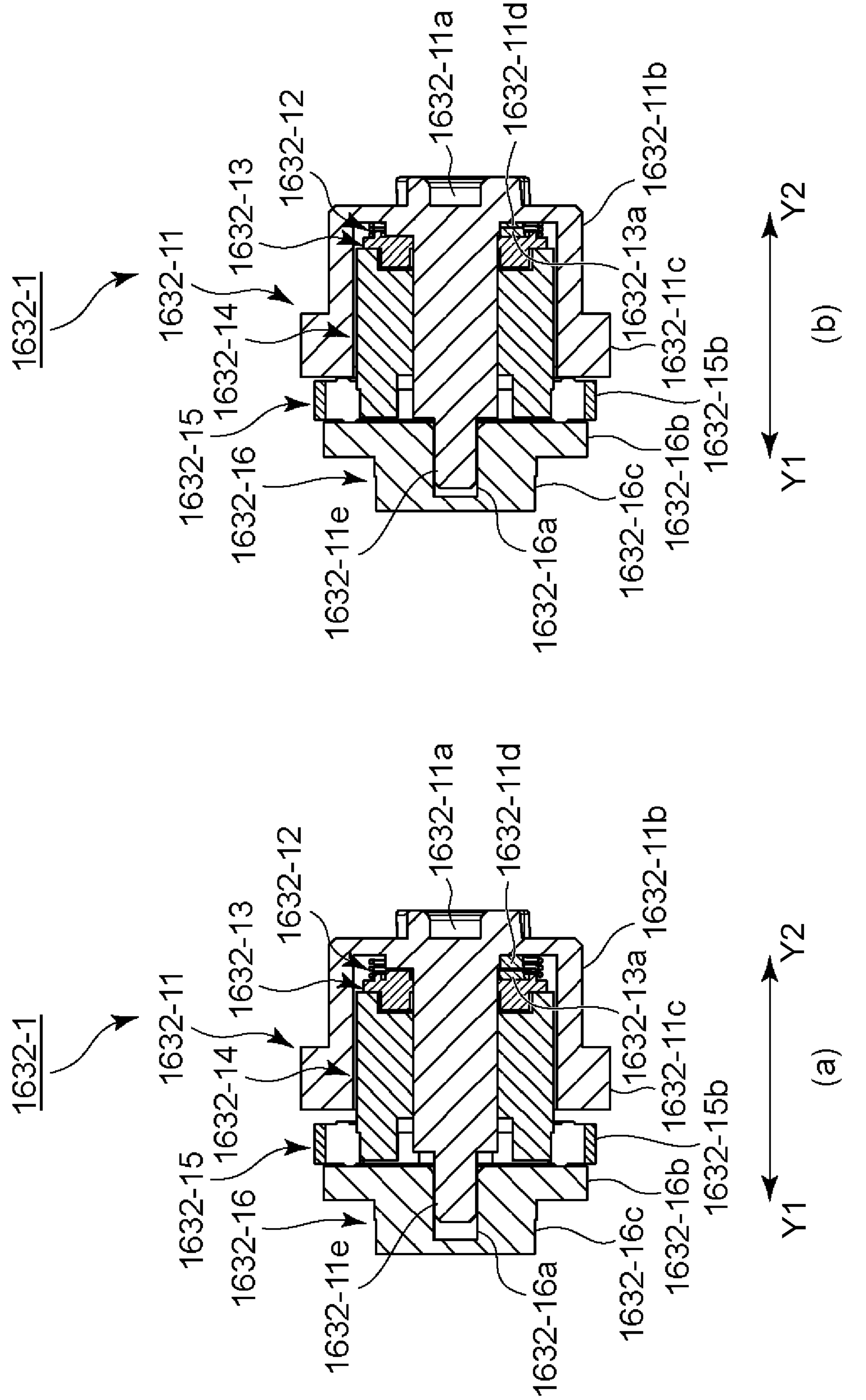
FIG. 109 is a sectional view of the development drive input gear unit.

Further, referring to FIG. 109, a mechanism for stopping the above-mentioned movable member 1652R at the projecting position when it moves to the projecting position will be described. Part (a) of FIG. 109 is a schematic cross-sectional view of the drive input gear unit 1632-1 when the process cartridge 1600 is mounted on the cartridge tray 1161 and the cartridge tray 1161 is inserted in the first mounting position. When the process cartridge 1600 is placed in the first mounting position, the projecting portion 1632-11*d* of the development coupling gear 1632-11 and the first projecting portion 1632-13*a* of the clutch plate 1632-13 are not engaged with each other by the urging force of the compression springs 1632-12, so that the rotational driving force of the development coupling gear 1632-11 is not transmitted to the clutch plate. On the other hand, the transmission gear 1632-16 is connected to the connecting shaft 1632-11*e* of the development coupling gear 1632-11 at the recess 1632-16*a*, and the rotational driving force of the development coupling gear 1632-11 is transmitted to the transmission gear 1632-16. Thereafter, the development drive coupling 185 on the main assembly side moves in the arrow Y1 direction in interrelation with the transition of the front door 11 of the image forming apparatus main assembly 170 from the open state to the closed state. Here, because the spring force of the compression spring 1632-12 is selected to be smaller than the pressing force of the development drive coupling 185 on the main assembly side, the development drive input gear 1632-11 moves in the direction of the arrow Y1. By the development drive input gear 1632-11 moving in the direction of the arrow Y1, the projection 1632-11*d* and the first projection 1632-13*a* of the clutch plate 1632-13 engage with each other so that rotational driving force is transmitted of the development coupling gear 1632-11 to the clutch plate 1632-13 (see part (b) of FIG. 109). As the clutch plate 1632-13 rotates, the torque limiter 1632-14 connected to the clutch plate 1632-13 also rotates, and the movable member drive gear 1632-15 connected to the torque limiter 1632-14 also rotates. As described above, by the rotation of the movable member, the movable member drive 1652R is moved to the projecting position. When moved to a predetermined projecting position, the movable member 1652R receives a predetermined urging force FT by the tension spring 153 (see FIG. 104). Here, the set value of the torque at which the torque limiter 1632-14 idles without transmitting the rotational driving force is set and so on as to be equivalent to the load torque generated by the urging force FT of the tension spring about the center of the drive input gear unit 1634-1 when the movable member 1652R is in the projecting position. By this, when the movable member 1652R receives a driving force from the movable member drive gear 1632-15 to move from the accommodated position (stand-by position) to the projecting position (operating position), the torque limiter 1632-14 slips, so that any more driving force is not received, by which the movable member 1652R stops at the projecting position.

With the above structure, the vertical movement of the movable member 1652R which may occur when the rack portion 1652Rx end of the movable member 1652R and the gear portion 1632-15*b* of the movable member drive gear 1632-15 make the intermittent contact is suppressed, and therefore, the projecting position of the movable member 1652R can be stabilized and noise can be suppressed.

Next, the operation of moving the movable member 1652R from the projecting position to the accommodated position will be described. As shown in FIG. 104, in a state where the movable member 1652R is located at the projecting position, in interrelation with the shifting of the front door 11 of the image forming apparatus main assembly 170 described above from the closed state to the open state, the development drive coupling 185 on the main assembly side moves in the direction of arrow Y2 in FIG. 109. Along with this, by the development coupling gear 1632-11 moving in the direction of arrow Y2 by the urging force of the compression spring 1632-12, the clutch plate 1632-13 is disengaged (state in part (a) of FIG. 109). That is, the movable member drive gear 1632-15 is in an independent state in which it does not rotate integrally with the other gears of the drive input gear unit 1632-1. By this, since the rack portion 1652Rx of the movable member 652R meshes with the independent movable member driving gear 1632-15, it can move substantially parallel to the direction of arrow Z1 in FIG. 104 by the urging force of the tension spring 153. When this operation is completed, the movable member 1652R does not project from the developing unit 1609 and is placed at the accommodated position (stand-by position) (state in FIG. 103).

Figure 110:
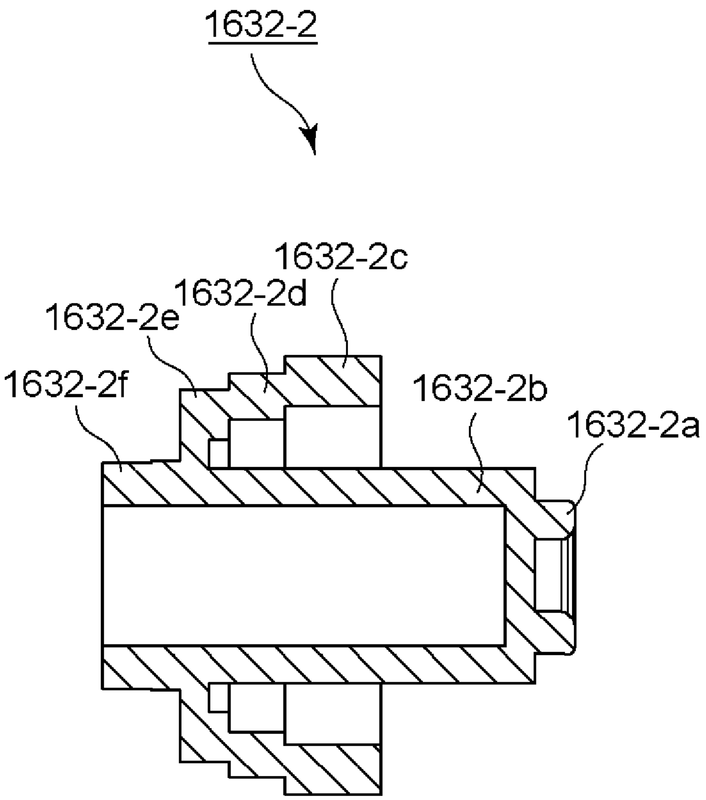
FIG. 110 is a sectional view of the development drive input gear unit.

In this embodiment, the torque limiter 1632-14 is provided in the development drive input gear unit 1632-1 as a mechanism for moving the movable member 1652R, but by allowing the above-mentioned movable member to move up and down, the cost reduction may be accomplished (see FIG. 110). FIG. 110 is a schematic cross-sectional view of the development drive input gear 1632-2 in which various functional portions of the development drive input gear unit 1632-1 are integrally molded. In FIGS. 108 and 109, the coupling portion 1632-11*a*, the cylindrical portion 1632-11*b*, the developing roller drive gear 1632-11*c*, the movable member drive gear 1632-15, the transfer roller drive gear 1632-16*b*, the stirring drive gear 1632-16*c* are integrated as a coupling portion 1632-2*a*, a cylindrical portion 1632-2*b*, a developing roller drive gear 1632-2*c*, a movable member drive gear 1632-2*d*, a feed roller drive gear 1632-2*e*, and a stirring drive gear 1632-2*f*, respectively. With such a structure, the movable member 1652R may be structured so as to be moved to the accommodated position by backlash in each of the development drive input gear 1632-2, the main assembly side development coupling 185, and a plurality of gears (not shown) which drive the main assembly side development coupling 185. Also, in the structure using the above-mentioned torque limiter 1632-14, the movement to the accommodated position may be effected by the backlash.

Figure 111:
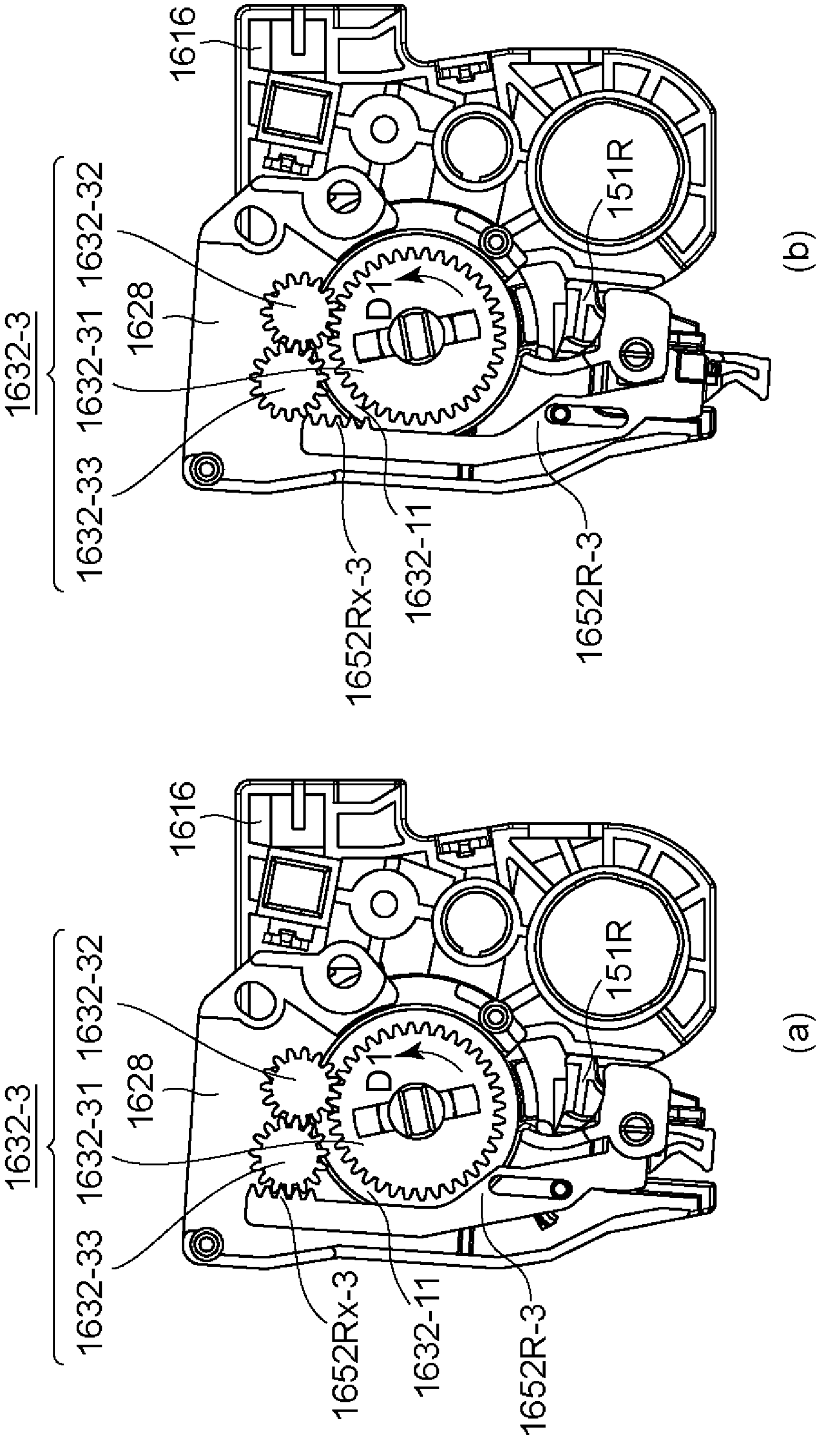
FIG. 111 is a sectional view of the process cartridge.

Further, in this embodiment, as a mechanism for moving the movable member 1652R between the projecting position and the accommodated position, the movable member drive gear 1632-15 for driving the movable member 1652R is provided on the driving shaft (same as the swinging shaft K) for transmitting the rotational driving force from the image forming apparatus main assembly 170 to the developing unit 1609, but the present invention is not limited to such an example. Such an example thereof is shown in FIG. 111. Part (a) of FIG. 11 and part (b) of FIG. 11 is a view of the process cartridge 1600 as viewed from the non-drive-side thereof when the movable member 1632R-3 is located at the accommodated position, omitting the members except for the drive-side cartridge cover member 1616, the development cover member 1628, the development coupling gear 1632-11, the movable member drive gear unit 1652R-3, the movable member 1652R-3 and the spacer 151R The movable member drive gear unit 1632-3 is structured such that the movable member drive gear 1632-33 is arranged by way of the first intermediate gear 1632-31 and the second intermediate gear 1632-32. The movable member drive gear 1632-33 is arranged so as to engage with the rack portion 1652Rx-3 of the movable member 1652R-3. With the above structure, the first intermediate gear 1632-31, the second intermediate gear 1632-32 and the rotatable member drive gear 1632-33 rotate in interrelation with the development coupling gear 1632-11 rotating in the arrow D1 direction to move the movable member drive 1652R-3 to the projecting position (see part (b) of FIG. 111), as described above the. Further, the movement from the projecting position to the accommodated position is the same as described above. As described above, the movable member drive gear for moving the movable member does not have to be provided on the swing axis K.

In addition, in this embodiment, the developing roller drive gear 1632-11*c* (1632-2*c*), the movable member drive gear 1632-15 (1632-2*d*), the transfer roller drive gear 1632-16*b* (1632-2*e*), and the stirring drive gear 1632-16*c* (1632-2*f*) are arranged in the order named in the direction from the upstream side toward the downstream side direction of the arrow Y1 in the from the drive-side end of the process cartridge 1600 upstream direction to the downstream, but the arrangement of various gears is not limited to this example, and the number of gear teeth and the tooth profile are not limited to such an example. Further, various gears may share a function, and for example, the developing roller drive gear 1632-2*c* may be given the function of the movable member drive gear 1632-2*d*, and the rack portion 1652Rx of the movable member 1652R is engaged with the developing roller drive gear 1632-2*c* so that the movable member 1652R is moved.

Figure 112:
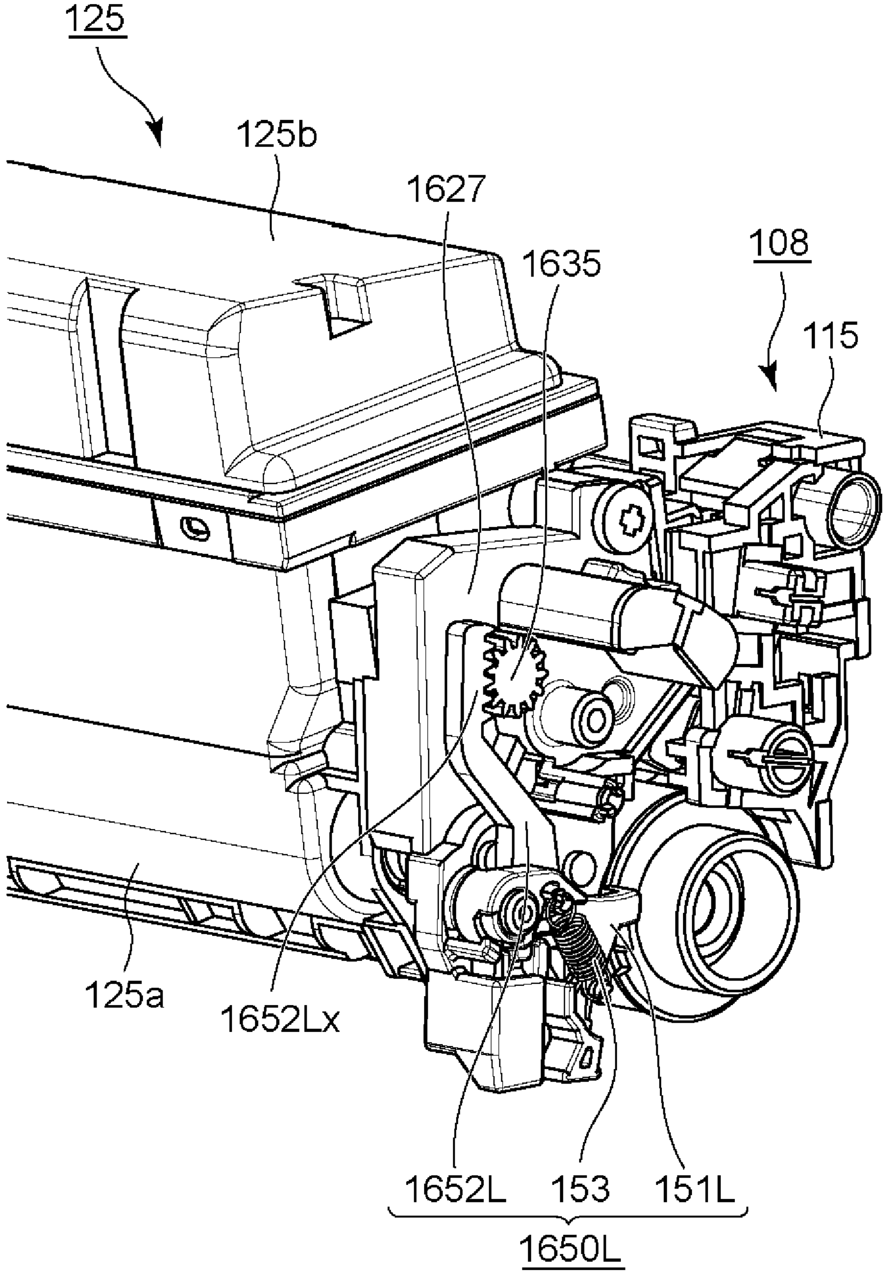
FIG. 112 is a perspective view of the process cartridge.
Figure 113:
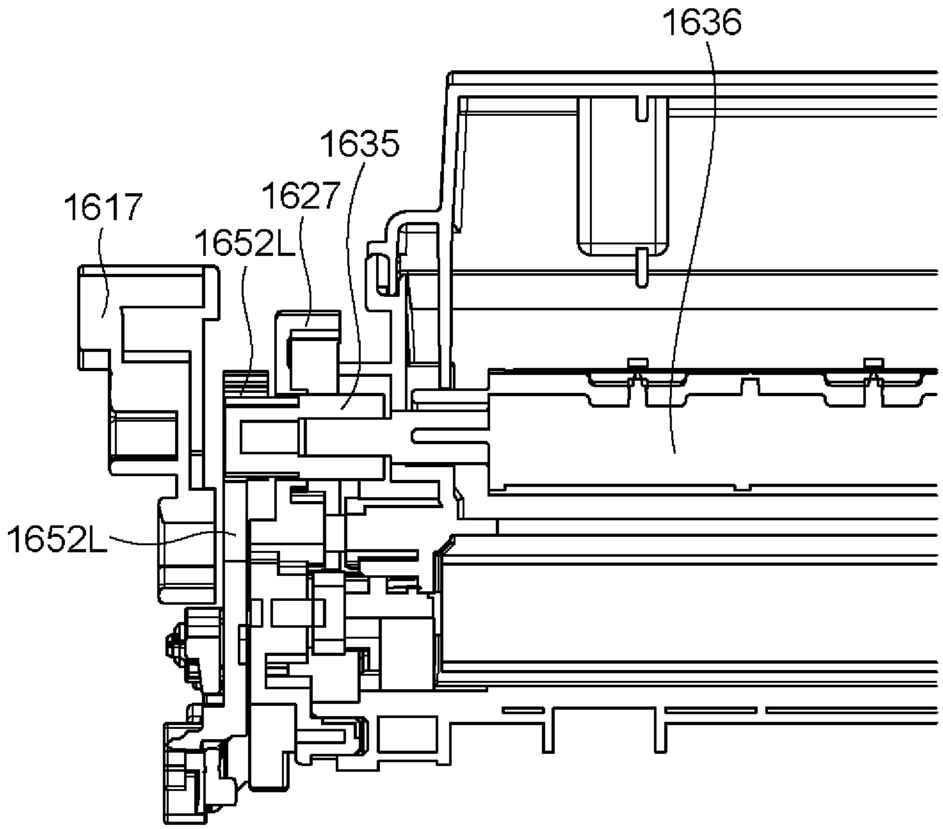
FIG. 113 is a sectional view of the process cartridge.

Next, referring to FIGS. 112 to 113, the separation/contact mechanism 1650L on the non-drive-side of the process cartridge 1600 in this embodiment will be described. Similarly to the drive-side separation/contact mechanism 1650R, the separation/contact mechanism 1650L includes a spacer 151L which is a restricting member, a movable member 1652L which is a pressing member, and a tension spring 153 (see FIG. 112). The movable member 1652L is provided with a rack portion 1652Lx, and is supported by a non-drive-side bearing so as to be linearly movable and rotatable. The rack portion 1652Lx is structured to engage with the non-drive-side movable member drive gear 1635 and is movable in interrelation with the rotation of the non-drive-side movable member driving gear 1635. The non-drive-side movable member drive gear 1635 is connected with the penetrating shaft (see FIG. 113), and the penetrating shaft 1636 is connected with the development drive input gear unit 1632-1 by way of a penetrating shaft gear (not shown). By this, when the development drive input gear unit 1632-1 receives a driving force from the main assembly side development coupling 185 and rotates, and in interrelation with this, the penetrating shaft 1636 rotates, and the non-drive-side movable member drive gear 1635 rotates, I which the movable member 1652L moves. As long as the penetrating shaft 1636 has the shaft which communicates between the drive-side and the non-drive-side of the process cartridge 1600, a toner feeding roller 1016 or a developing roller 106, for example, may be used, or may be further added.

The operation of contacting and separating the photosensitive member drum 104 and the developing roller 106 by the separation/contact mechanism 1650L is the same as those of the above-mentioned separation/contact mechanism 1650R on the drive-side.

Figure 114:
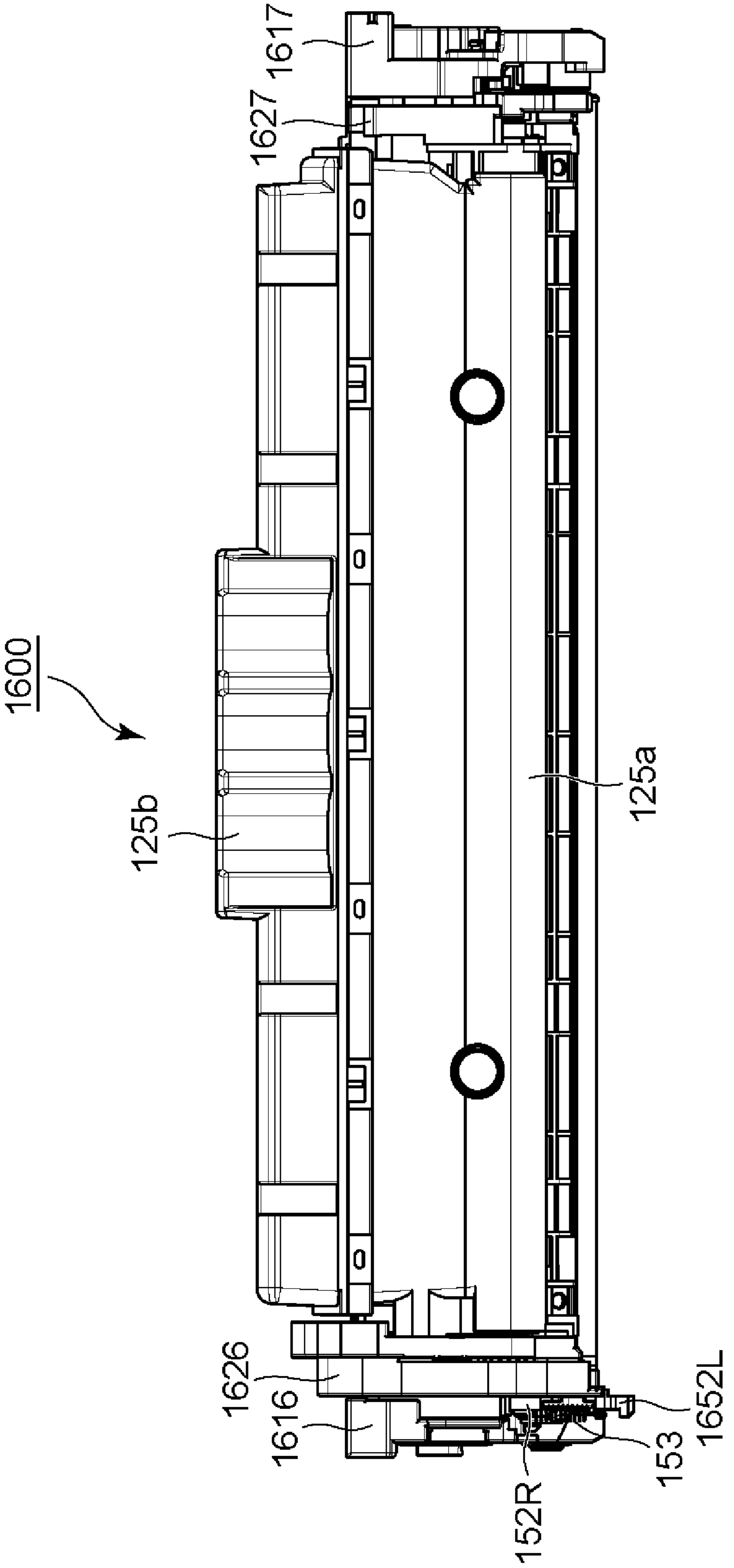
FIG. 114 is a side view of the process cartridge as viewed along a lateral direction.
Figure 115:
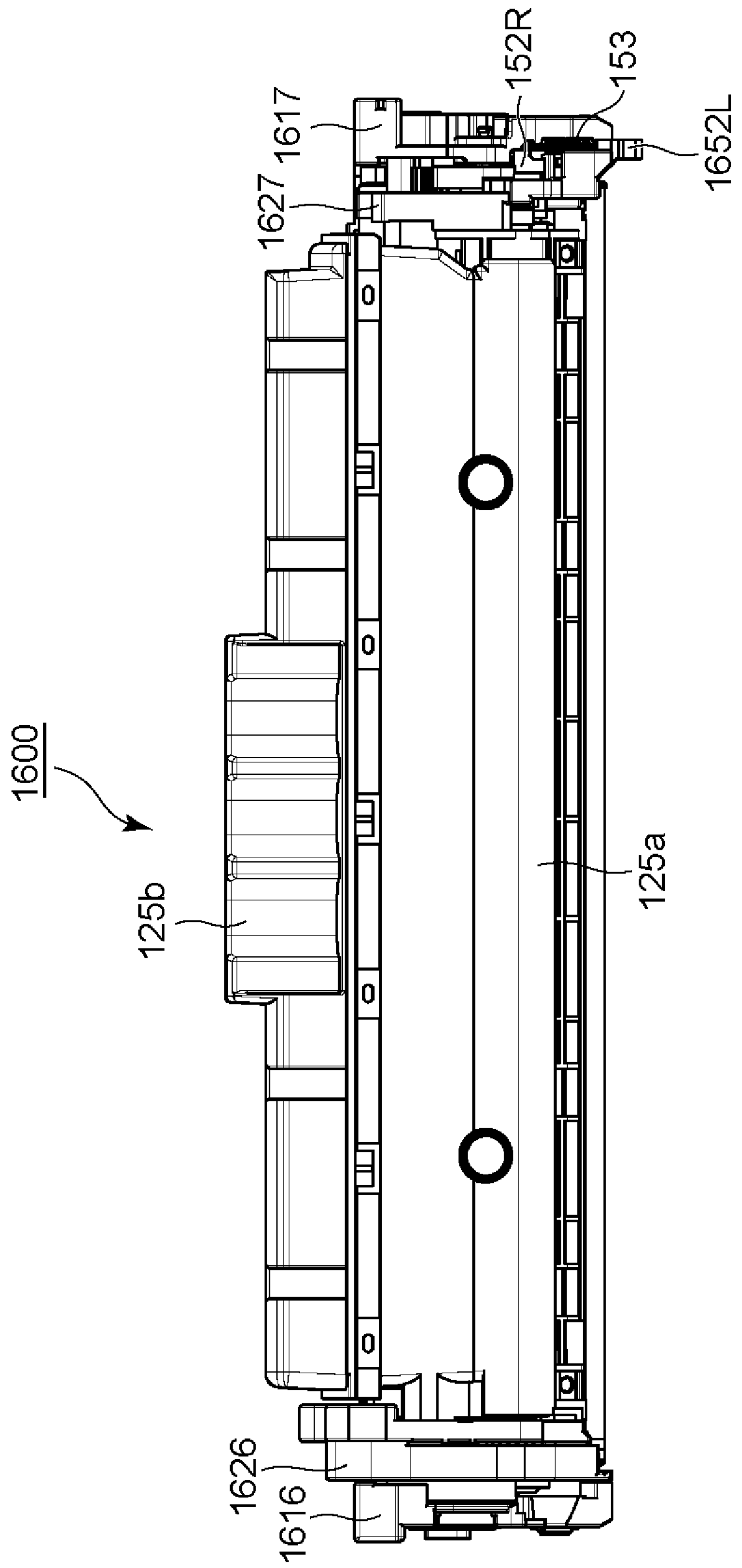
FIG. 115 is a side view of the process cartridge as viewed along the lateral direction.

As for the separation/contact mechanism in this embodiment, the separation/contact mechanism of the process cartridge 1600 may be provided on only one side as in the Embodiment 2. FIGS. 114 and 115 are perspective views of the process cartridge 1600 in a state where the movable member 1652 is projected to the projecting position by receiving the rotational driving force from the development coupling 185 on the main assembly side, and FIG. 114 is a view in which the separation/contact mechanism 1650R is provided only on the drive-side, and FIG. 115 is a view in which the separation/contact mechanism 1650L is provided only on the non-drive-side.

According to the structure of this embodiment described above, the same effect as that of the Embodiment 1 can be provided.

Further, in this embodiment, the movable member 1652R is moved by rotating the coupling portion (coupling member) 1632-11*a* by inputting a driving force. By the movement of the movable member 1652R, the first force receiving portion (retracting force receiving portion, separating force receiving portion) 1652Rk and the second force receiving portion (contact force receiving portion) 1652Rn are moved between the accommodated position (stand-by position) and the projecting position (operating position). With such a structure, it is possible to control the movement of the movable member 1652R depending on whether or not a driving force is input to the coupling portion (coupling member) 1632-11*a*.

Embodiment 8

Next, referring to FIGS. 116 to 128, Embodiment 8 will be described. In this embodiment, structures and operations different from those of the above-described embodiment will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same.

The process cartridge 1900 includes a separation/contact mechanism 1950R (see FIG. 116) on the drive-side and a separation/contact mechanism 1950L (see FIG. 126) on the non-drive-side. Regarding the separation/contact mechanism, the details of the separation/contact mechanism 1950R on the drive-side will first be described, and then the separation/contact mechanism 1950L on the non-drive-side will be described. Further, since the separation/contact mechanism has almost the same function on the drive-side and the non-drive-side, R is added to the reference sign of each member on the drive-side, and L is added to the reference sign of each member is driven on the non-drive-side.

Figure 120:
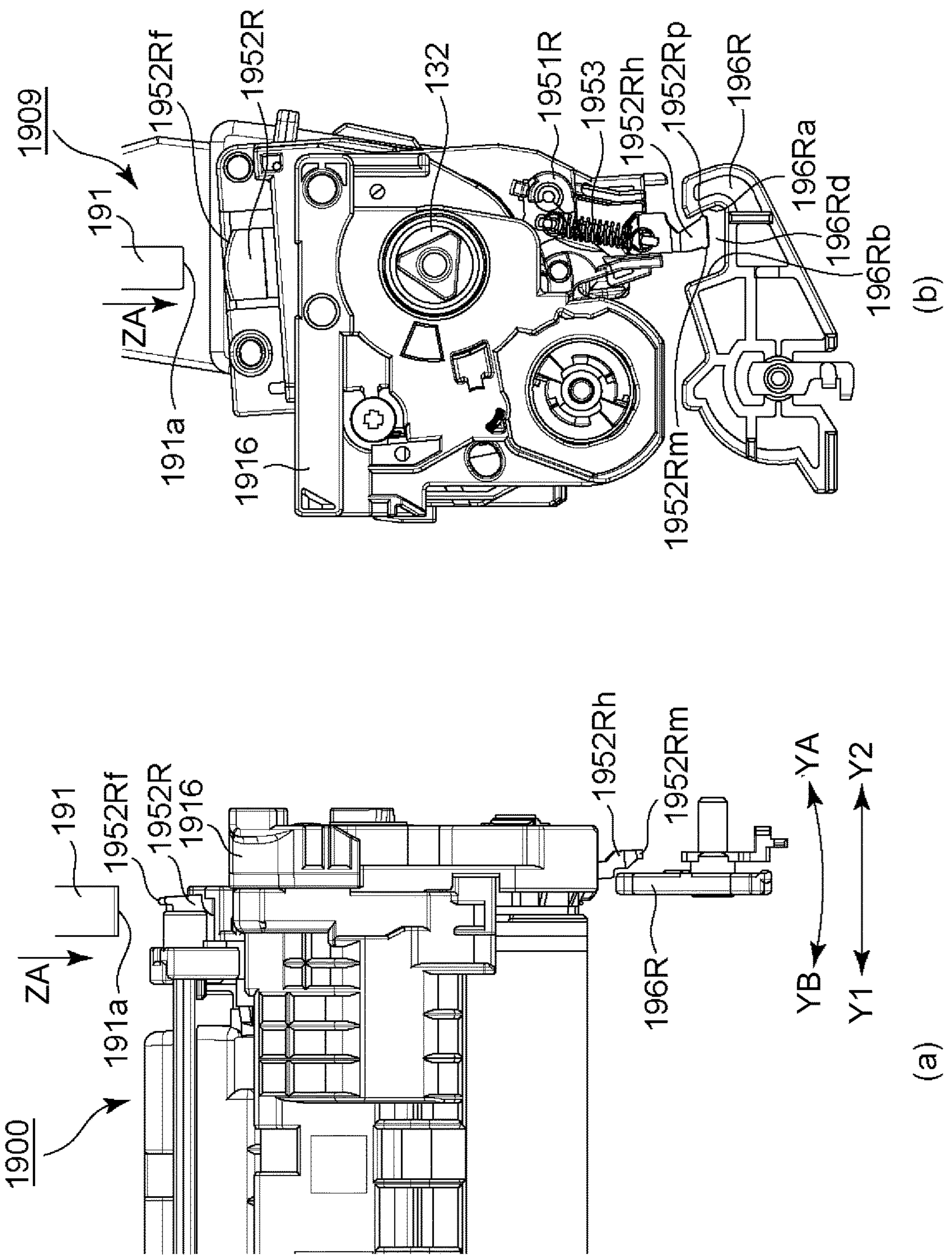

In this embodiment, the movable member 1952R corresponding to the movable member 152R in the Embodiment 1 avoids the separation control member 196R in the longitudinal direction (arrow Y2 direction) in the process of insertion and removal of the process cartridge 1900 into and from the image forming apparatus main assembly 170, as shown in FIG. 120 Further, when the mounting is completed, the movable member 1952R is in the same longitudinal position as the separation control member 196R, so that the contact separation operation can be performed as in the Embodiment 1. The insertion and removal while the movable member avoids the separation control member 196R will be described hereinafter.

[Drive-Side Process Cartridge Structure]

Figure 116:
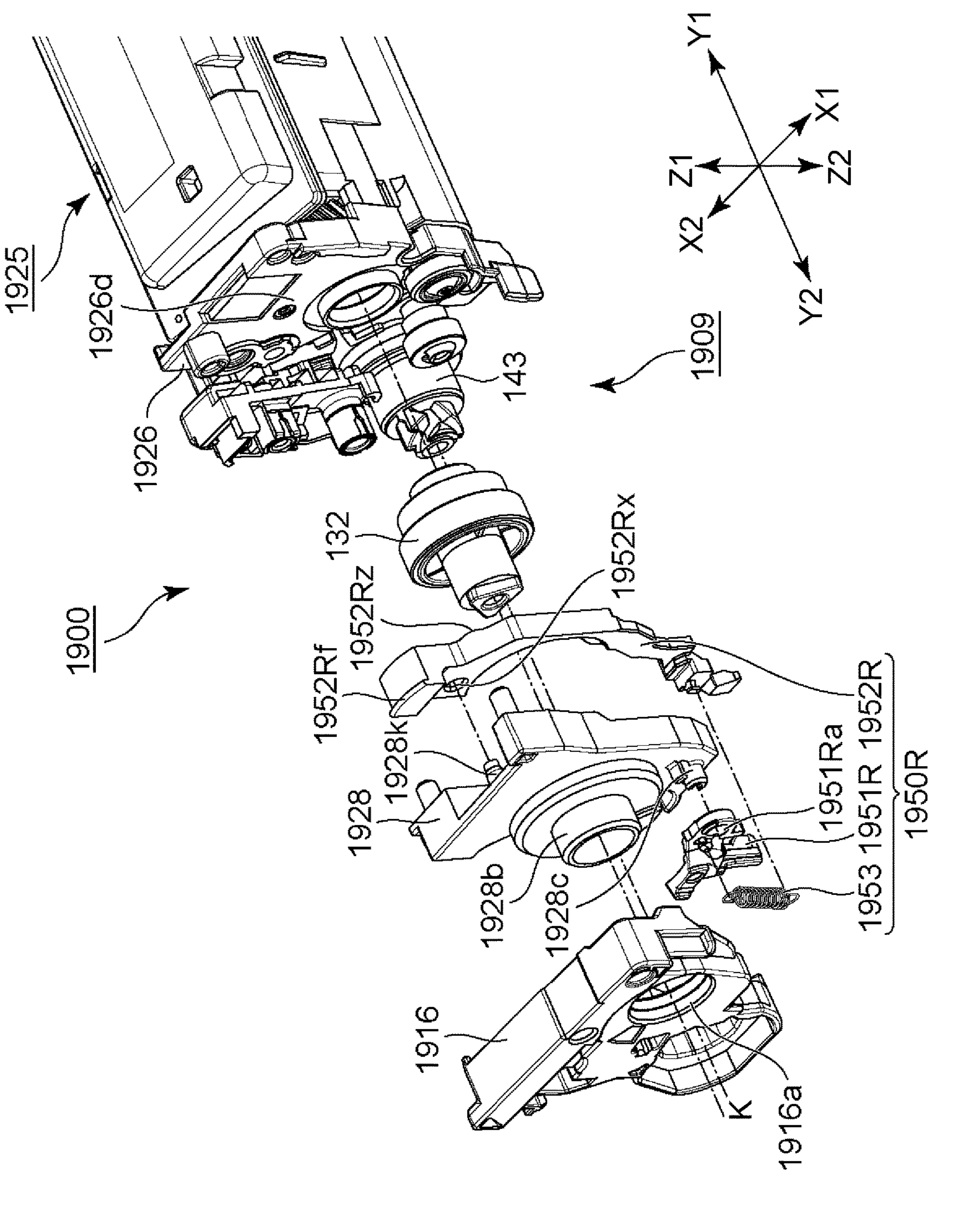
FIG. 116 is an exploded perspective view of a process cartridge.

FIG. 116 shows an assembly perspective view of the drive-side of the developing unit 1909 including the separation/contact mechanism 1950R. The separation/contact mechanism 1950R includes a spacer 1951R which is a restricting member (holding member), a movable member 1952R which is a pressing member, and a tension spring 1953. In this embodiment, the movable member 1952R is provided with a first oblong round hole 1952Rx and a second oblong round hole 1952Ry (see part (c) of FIG. 117), and an outer diameter of a second supporting portion 1928*k* of the development cover member 1928 is fitted with the inner walls of the oblong round hole 1952Rx and the second oblong round hole 1952Ry, so that the movable member 1952R is swingably supported about two swing axes which will be described hereinafter.

Further, similarly to the Embodiment 1, the inner diameter portion of the support receiving portion 1951Ra of the spacer 1951R is fitted with the first supporting portion 1928*c* of the development cover member 1928, the spacer 1951R is rotatably supported, and the movable member 1952R and the spacer 1951R are urged to attract each other by the tension spring 1953. Further, the outer diameter portion of the cylindrical portion 1928*b* of the development cover member 1928 is fitted into the developing unit supporting hole 1916*a* of the drive-side cartridge cover member 1916, the developing unit 1909 is supported so as to be rotatable about the swing axis K.

[Structure and Operation of Movable Member]

Next, referring to FIGS. 117 to 119, the structure of the movable member 1952R on the drive-side in this embodiment will be described in detail.

Figure 117:
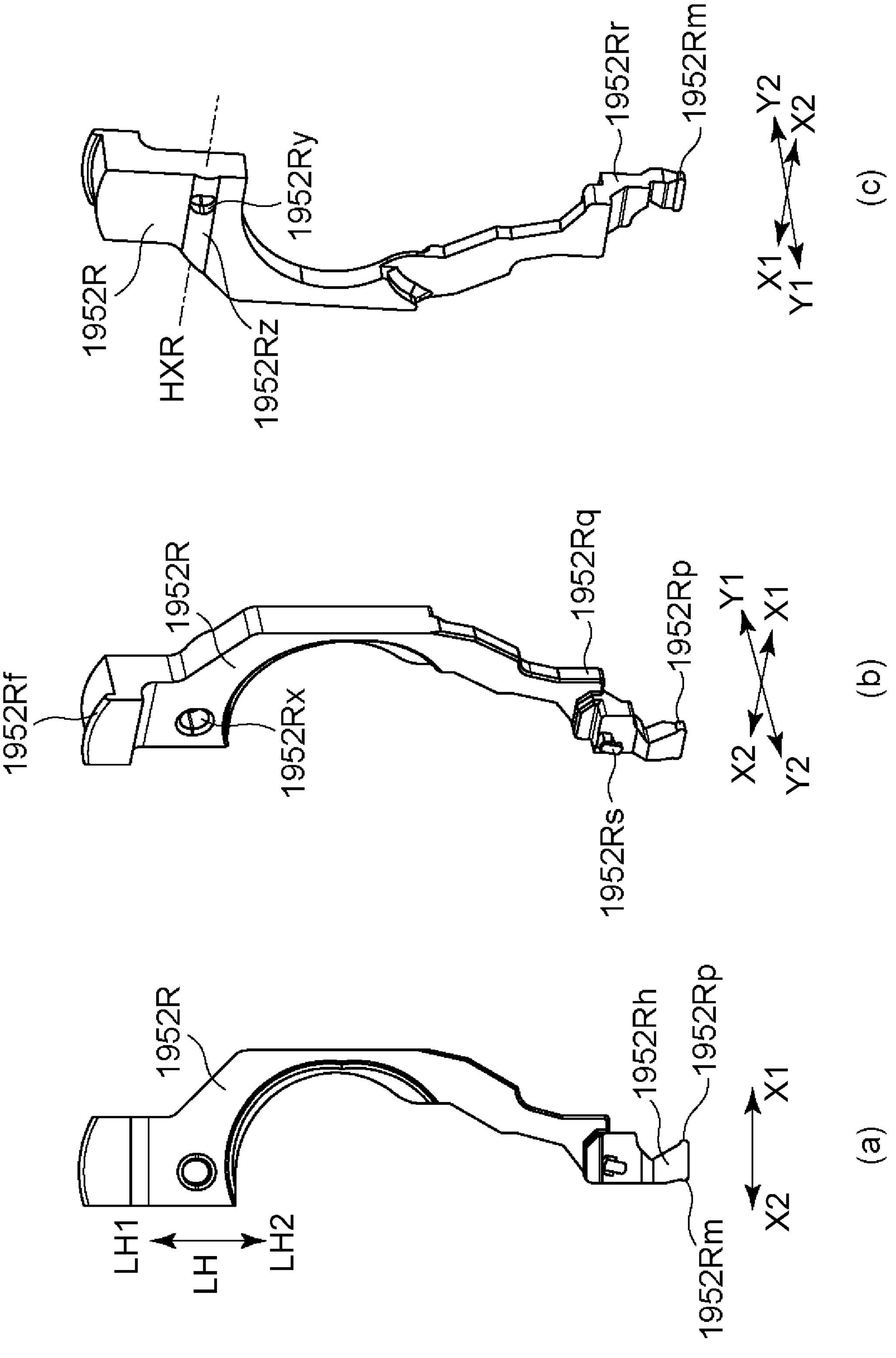
FIG. 117 is an illustration showing a movable member.

Part (a) of FIG. 117 is a front view of the movable member 1952R per se as viewed from the longitudinal direction of the process cartridge 1900 (in the direction of arrow Y1 in FIG. 116), and part (b) of FIG. 117 and part (c) of FIG. 117 is a perspective view of the movable member 1952R per se. The movable member 1952R is provided with a first oblong round hole 1952Rx and a second oblong round hole 1952Ry. Here, the longitudinal directions (LH) of the oblong round hole shapes of the first oblong round hole 1952Rx and the second oblong round hole 1952Ry are the same, the upward direction (approximately Z1 direction) is the arrow LH1, and the downward direction (approximately Z2 direction) is the arrow LH2. In addition, the axis perpendicular to the LH direction and perpendicular to the depth direction (Y1 direction) of the oblong round hole forming the first oblong round hole 1952Rx is axis HXR. The movable member 1952R has a cylindrical surface 1952Rz extending around an axis HXR. The Y1 direction is parallel to the rotation axis M2 of the developing roller 106 and the rotation axis M1 of the photosensitive drum 104 described in the Embodiment 1. In this embodiment, the first oblong round hole 1952Rx and the second oblong round hole 1952Ry are arranged so as to have a common apex in the direction of arrow LH1. Further, the first oblong round hole 1952Rx and the second oblong round hole 1952Ry communicate with each other, and the diameter of the first oblong round hole 1952Rx is selected to be larger than that of the second oblong round hole 1952Ry. In addition, the length of the first oblong round hole 1952Rx is selected to be larger than the length of the second oblong round hole 1952Ry.

Further, in the movable member 1952R, as in the Embodiment 1, a projecting portion 1952Rh is formed on the downstream side of the first oblong round hole 1952Rx in the arrow LH2 direction. A first force receiving surface 1952Rm and a second force receiving surface 1952Rp having an arc shape are provided on the projecting portion 1952Rh. The first force receiving surface 1952Rm and the second force receiving surface 1952Rp are the first force receiving portion (retracting force receiving portion, separating force receiving portion) and the second force receiving portion (contacting force applying portion) as in the Embodiment 1. On the other hand, the movable member 1952R has an arc-shaped pressed surface 1952Rf on the downstream side in the direction of the arrow LH1. Further, the movable member 1952R is provided with a spring-hooked portion 1952Rs to which the tension spring 1953 is mounted, a first pressing surface 1952Rq, and a second pressing surface 1952Rr, as in the Embodiment 1.

Figure 118:
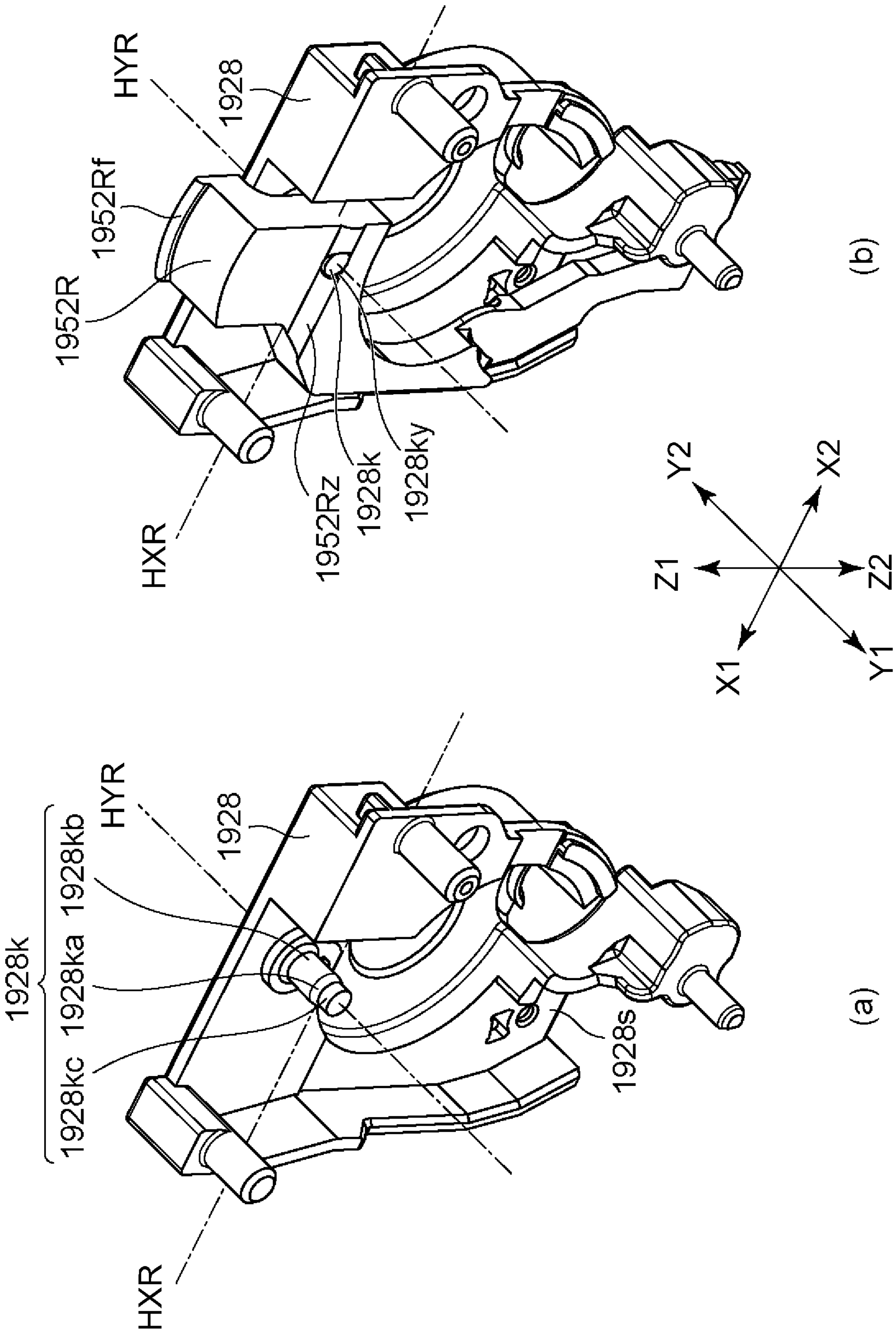
FIG. 118 is a perspective view of a development cover member and the movable member.

Part (a) of FIG. 118 is a perspective view illustrating only the development cover member 1928, and part (b) of FIG. 118 is a perspective view illustrating the development cover member 1928 and the movable member 1952R. The second supporting portion 1928*k* of the development cover member 1928 is formed by a first cylindrical portion 1928*kb*, a second swing portion 1928*ka* having a spherical surface, and a second cylindrical portion 1928*kc* having a diameter smaller than that of the first cylindrical portion 1928*kb*. Here, the axis passing through the center of the first cylindrical portion 1923*kb* and the second cylindrical portion 1928*kc* is HYR. The axis perpendicular to this HYR and passing through the spherical center of the second swingable portion 1928*ka* is the same as the above-mentioned HXR. In this embodiment, the second swingable portion 1928*ka* has the spherical surface, but this is not limiting and it will suffice if swinging of the movable member 1952R in the directions of arrows YA and YB (see FIG. 119) and swinging in the directions of arrows BA and BB (see FIG. 119) as will be described hereinafter are not hindered. It is not limited to this as long as it is a surface that is set within a range that does not interfere with. In addition, the diameters of the first oblong round hole 1952Rx and the second oblong round hole 1952Ry of the movable member 1952R and the positional relation in the direction of LH is not limited to this example, and it will suffice if the swinging in the directions of the arrows YA, YB and in the directions of arrows BA, BB with respect to the first cylindrical portion 1928 *kb* and the second cylindrical portion 1928 *kc* are not hindered.

Figure 119:
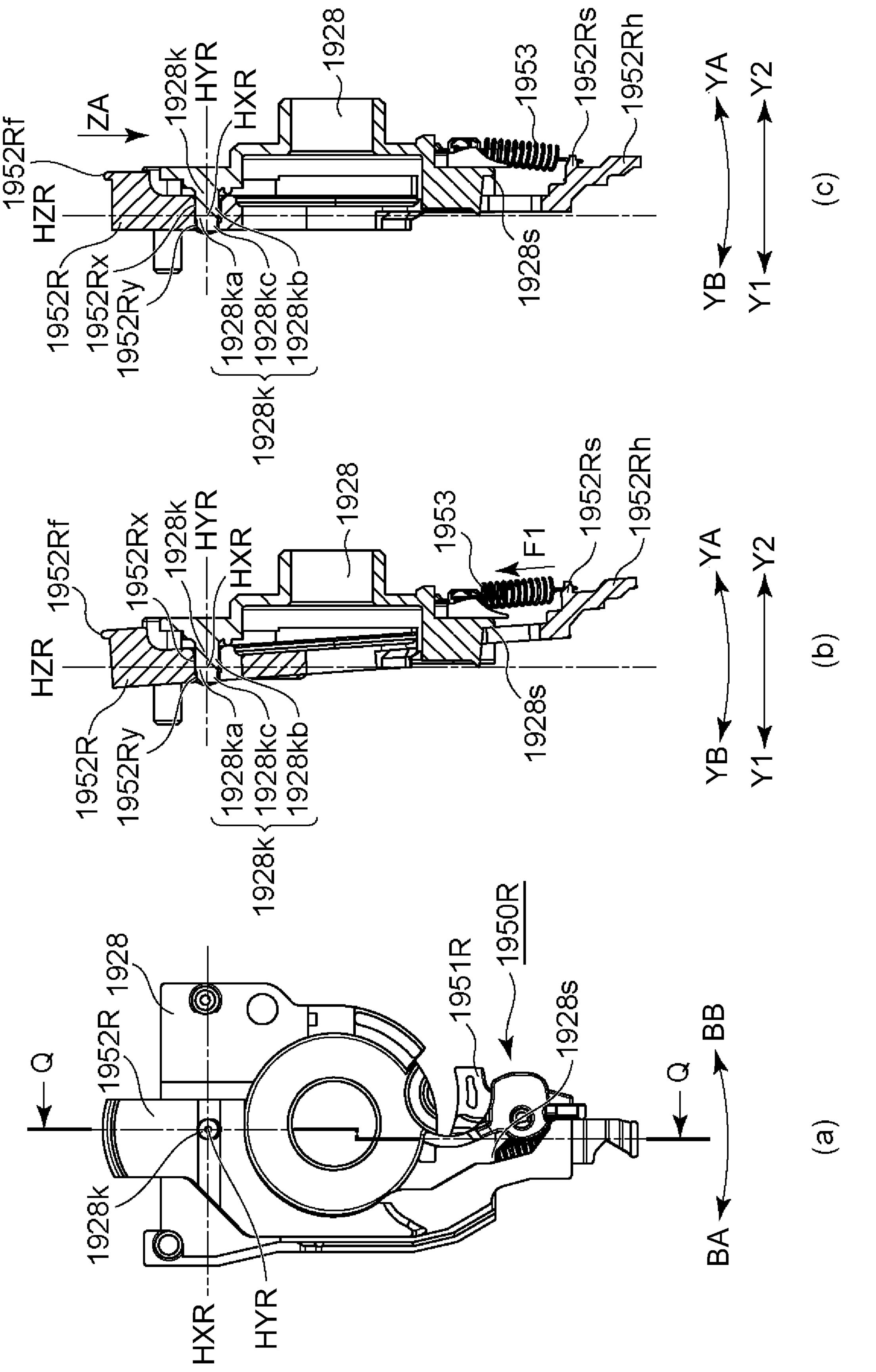
FIG. 119 is an illustration of the development cover member and a separation/contact mechanism.

FIG. 119 shows a state in which the separation/contact mechanism 1950R is mounted on the development cover member 1928. Part (a) of FIG. 119 is a view as seen in the longitudinal direction of the process cartridge 1900 (in the direction of arrow Y2 in FIG. 116). The longitudinal direction of the process cartridge 1900 is a direction parallel to the rotation axes M1, M2, and K described in the previous embodiment. The movable member 1952R is supported by the second supporting portion 1928*k* of the development cover member 1928 so as to be swingable in the directions of arrows BA and BB about HYR as in the Embodiment 1.

A cross-section taken along a line passing through the center (HYR) of the second supporting portion 1928*k* and parallel to the above-mentioned LH direction is shown in part (b) of FIG. 119 as a QQ cross-section. The movable member 1952R receives a force in the F1 direction by the tension spring 1953 in a state that the second swingable portion 1928*ka* and the inner wall of the first oblong round hole 1952Rx are in contact with each other. Here, the spring-hooked portion 1952Rs of the movable member 1952R is placed downstream, in the Y2 direction, of the contact point between the second swingable portion 1928*ka* and the first oblong round hole 1952Rx, and therefore, the spring force produces a moment about the axis HXR by the spring force in the arrow YA direction about on the axis HXR. The attitude of the movable member 1952R swinging in the direction of arrow YA is determined by contacting to the movable member restriction portion 1928*s* of the development cover member 1928, and the projecting portion 1952Rh projects in the Y2 direction. This position is a stand-by position of the movable member 1952R.

Next, when the pressed surface 1952Rf is pushed in the direction of arrow ZA from the state shown in part (b) of FIG. 119, it is placed downstream, in the Y2 direction, of the contact point between the second swingable portion 1928*ka* and the first oblong round hole 1952Rx, and therefore, a moment is produced in the direction of the arrow YB about the axis HXR. The projecting portion 1952Rh of the movable member 1952R moves in the Y1 direction so as to take the attitude shown in part (c) of FIG. 119. This position is an operating position of the movable member 1952R. The amount of pushing in the ZA direction is determined by the amount of movement of the cartridge pressing unit 191 of the image forming apparatus main assembly (not shown) in the ZA direction.

In order to restrict the movable member 1952R in rotating around the axis HYR and the axis HZR perpendicular to the axis HXR, the cylindrical surface 1952Rz contacts the regulation surface 1926*d* (see FIG. 116) of the drive-side bearing 1926 (not shown). In addition, the contact between the second cylindrical portion kc and the second oblong round hole 1952 Ry has the same rotation restricting effect.

With the above structure, the movable member 1952R is supported so as to be swingable in two directions about the shaft HYR and the shaft HXR.

[Mounting of Process Cartridge to Image Forming Apparatus Main Assembly]

Figure 121:
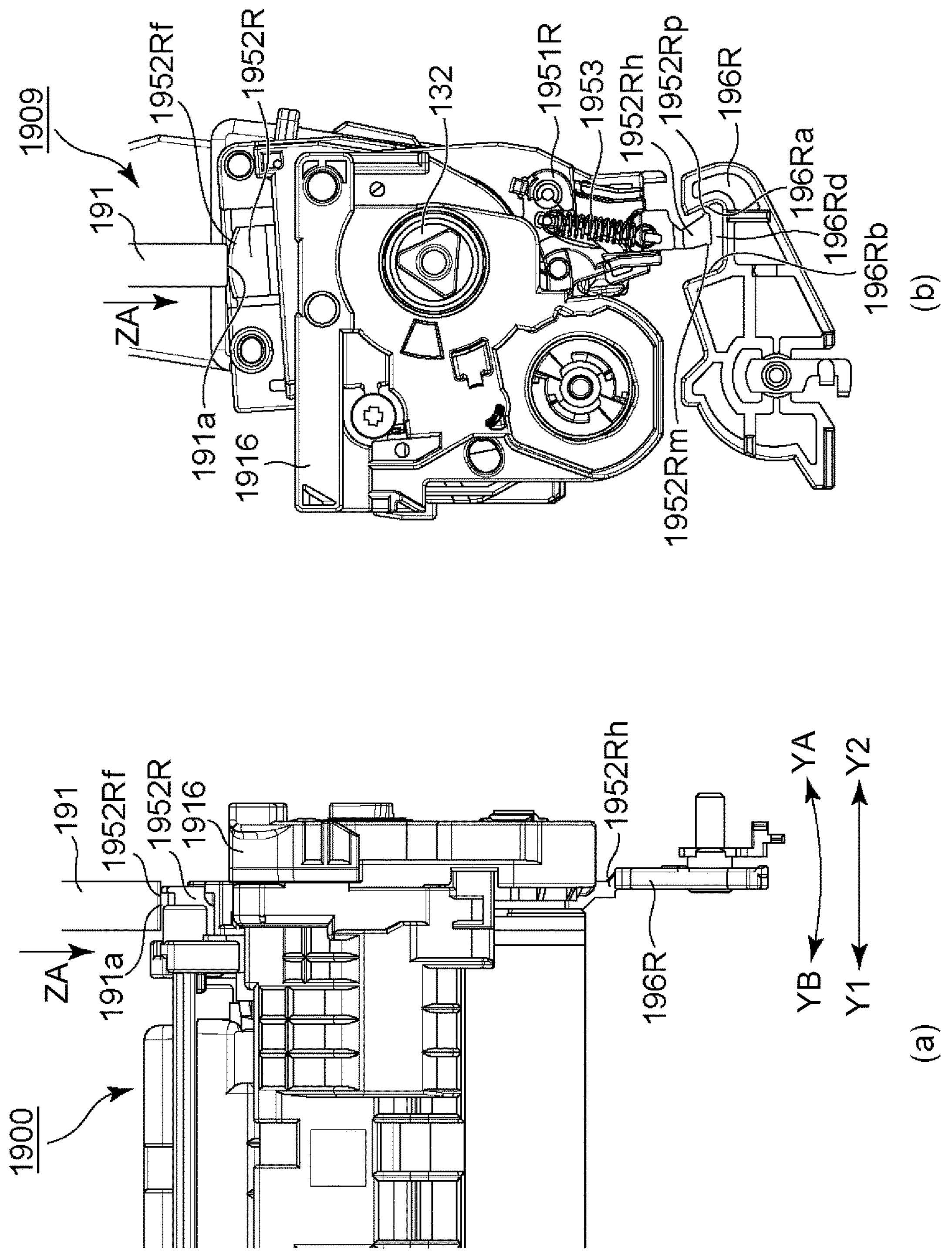

Next, referring to FIGS. 120 and 121, the description will be made as to the engaging operation of the separation/contact mechanism 1950R of the process cartridge 1900 and the development separation control unit 195 of the image forming apparatus main assembly 170 at the time when the process cartridge 1900 is mounted on the image forming apparatus main assembly 170 (not shown).

FIG. 120 is a view (part (a) of FIG. 120) of the image forming apparatus M as viewed from the front door side, and a view (part (b) of FIG. 120) of the process cartridge 1900 as viewed from the drive-side of the process cartridge 1900 with omission except for the process cartridge 1900, the cartridge pressing unit 191 and the separation control member 196R, at the time when the process cartridge 1900 is mounted on the cartridge tray 171 (not shown) of the image forming apparatus main assembly 170 and the cartridge tray is inserted into the first mounting position. The projecting portion 1952Rh of the movable member 1952R is placed at the stand-by position in which it has swung in the YA direction as described above when the cartridge tray 171 is inserted into the first mounting position. Therefore, the separation control member 196R can be inserted into the first mounting position as in the Embodiment 1 because it is retracted from the separation control member 196R in the direction of the arrow Y2. Further, at the first mounting position, the movable member 1952R is provided so that the projecting portion 1952Rh is accommodated in the space 196Rd of the separation control member 196R as viewed from the drive-side of the process cartridge as shown in part (b) of FIG. 120.

As in Embodiment 1, in interrelation with the transition of the front door 11 of the image forming apparatus main assembly 170 from the open state to the closed state, the cartridge pressing unit 191 lowers in the direction of arrow ZA and the first force applying portion 191*a* is brought into contact with the pressed surface 1952Rf of the movable member 1952R. Thereafter, when the cartridge pressing unit 191 is lowered to a predetermined position which is the second mounting position, the projecting portion 1952Rh of the movable member 1952R swings in the YB direction by the above-mentioned swing mechanism and reaches the operating position (state of FIG. 121). When this operation is completed, the first force application surface 196Ra of the separation control member 196R and the first force receiving surface 1952Rp of the movable member 1952R oppose each other as in the Embodiment 1, and the second force application surface 196Rb and the second force receiving surface 1952 Rm oppose each other. That is, in the directions of arrows Y1 and Y2, the projecting portion 1952Rh of the movable member 1952R and a portion of the separation control member 196R are overlapped each other.

When the process cartridge 1900 is removed from the image forming apparatus main assembly 170, the operation is opposite to the operation at the time of mounting, and the projecting portion 1952Rh of the movable member 1952R moves from the operating position to the stand-by position.

[Contact/Separation Operation of Developing Unit]

The contact/separation operation in this embodiment is the same as that in the Embodiment 1 as will be described below.

Figure 122:
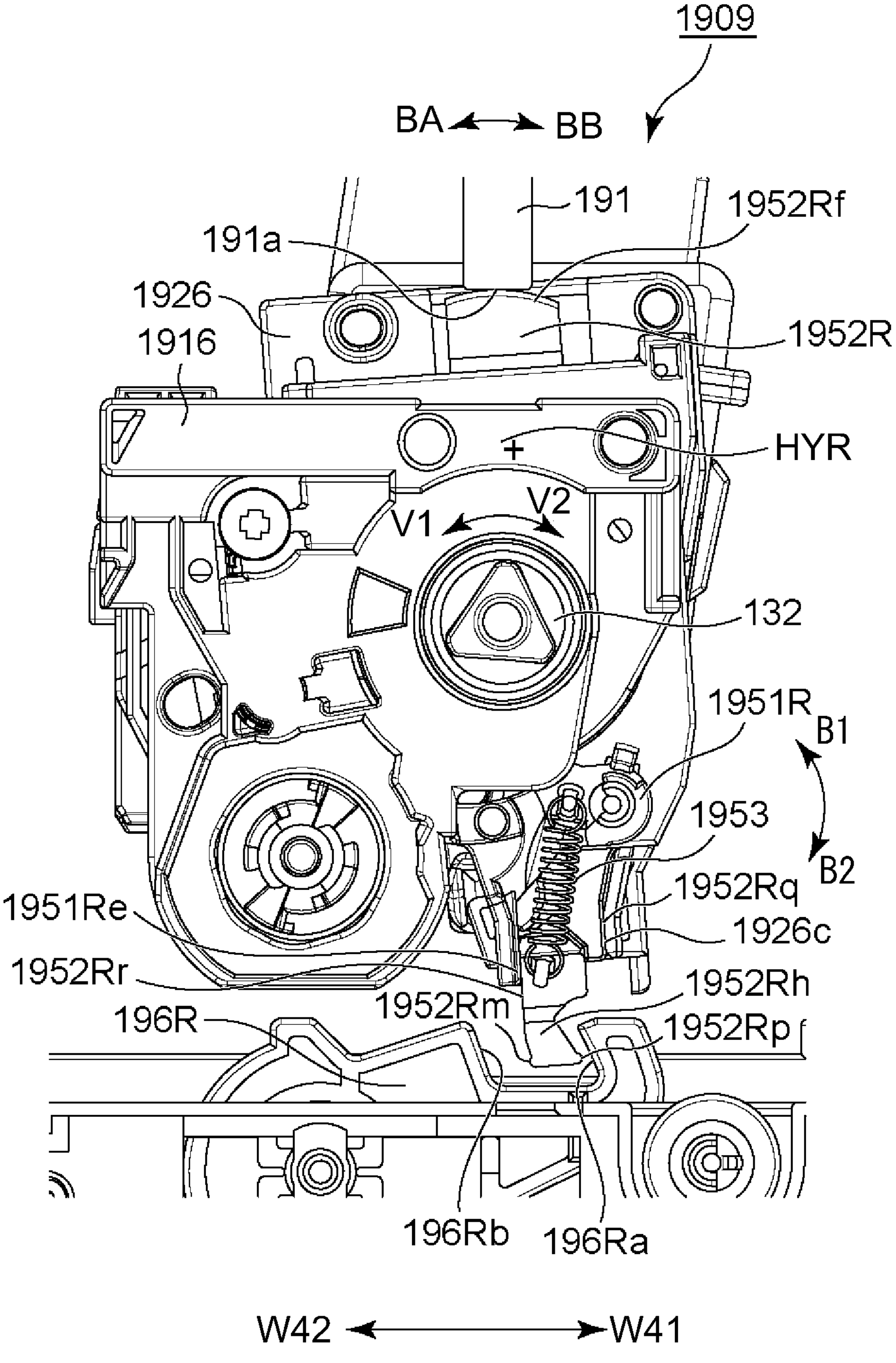
Figure 123:
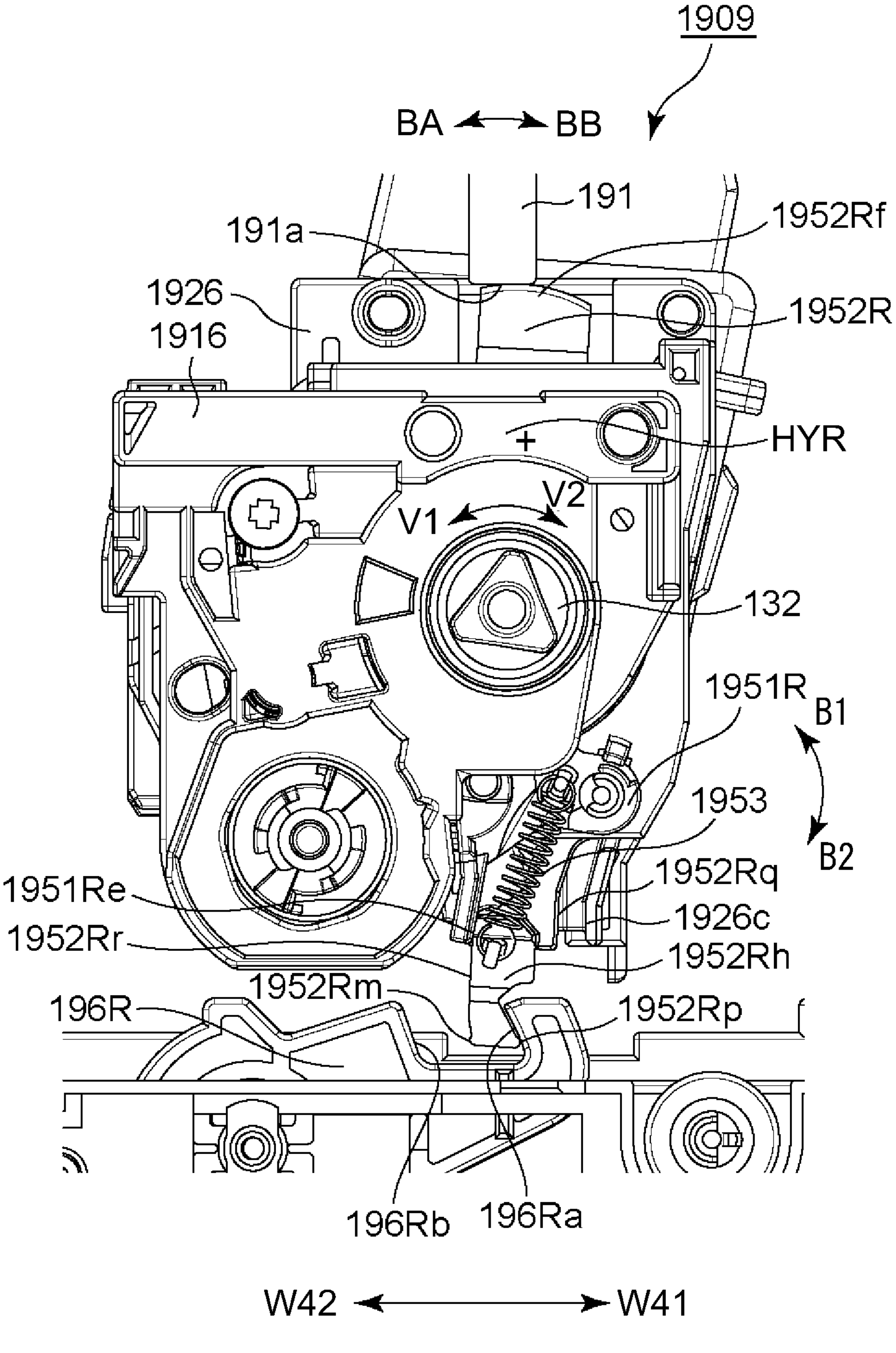

FIG. 122 shows a state in which the developing unit 1909 is placed at a separated position. When the separation control member 196R moves in the W42 direction from this state, the second force application surface 196Ra of the separation control member 196R and the second force receiving surface 1952Rp of the movable member 1952R come into contact with each other, and the movable member 1952R swings in the direction BB about the HYR. Further, as the movable member 1952R rotates, the spacer 1951R is rotated in the B2 direction while the second pressing surface 1952Rr of the movable member 1952R is in contact with the second pressed surface 1951Re of the spacer 1951R. Then, the spacer 1951R is rotated by the movable member 1952R to the separation release position (second position) where the contact surface (contact portion) 1951Rc (not shown) and the contact surface (non-contact portion) 116*c* are separated from each other. By this, the developing unit 1909 can move from the separated position to the contacting position where the developing roller 9 and the photosensitive member drum 104 contact each other (state in FIG. 123).

Figure 124:
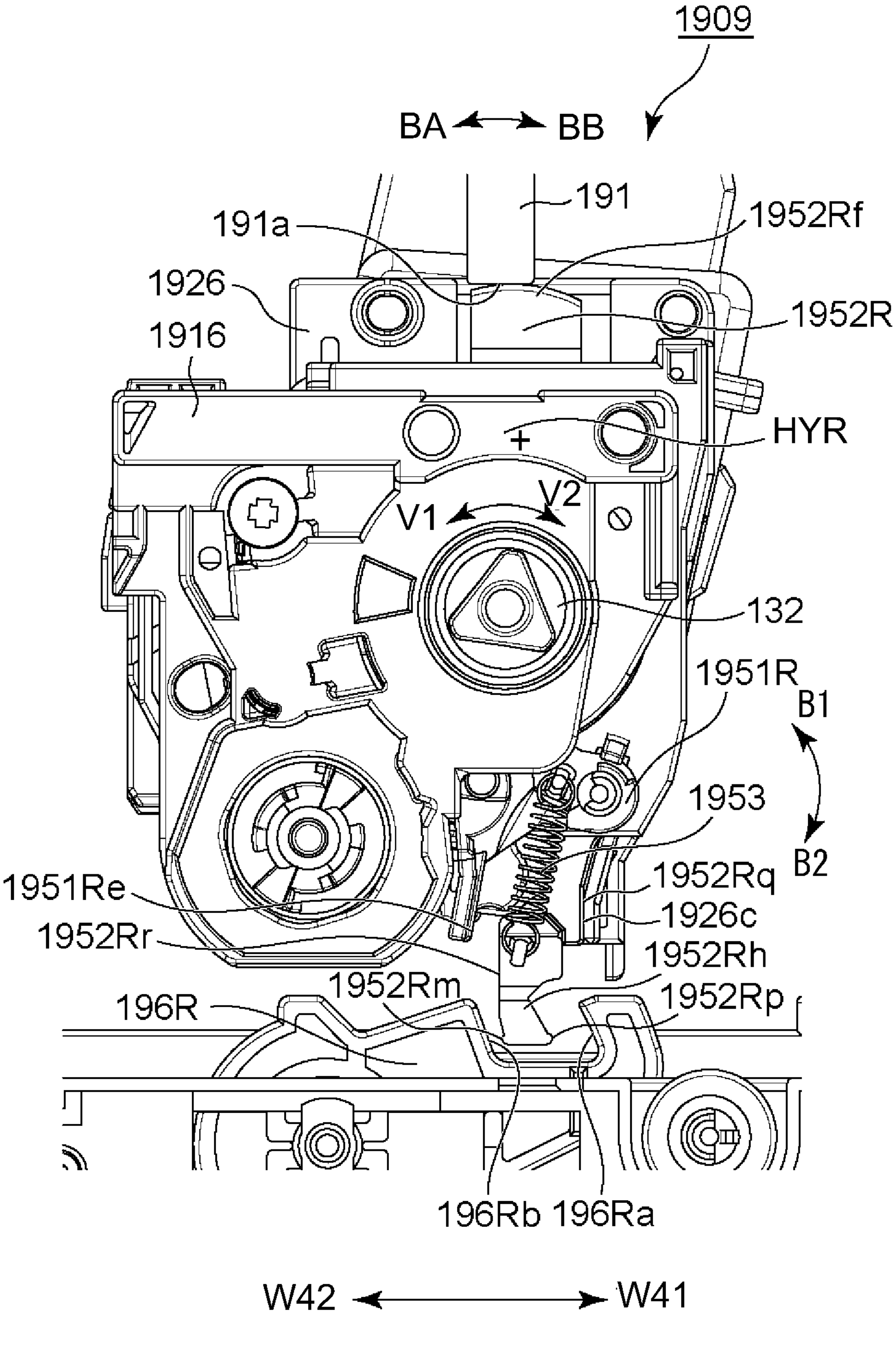

Thereafter, the separation control member 196R moves in the direction of W41 and returns to the home position (state in FIG. 124).

Figure 125:
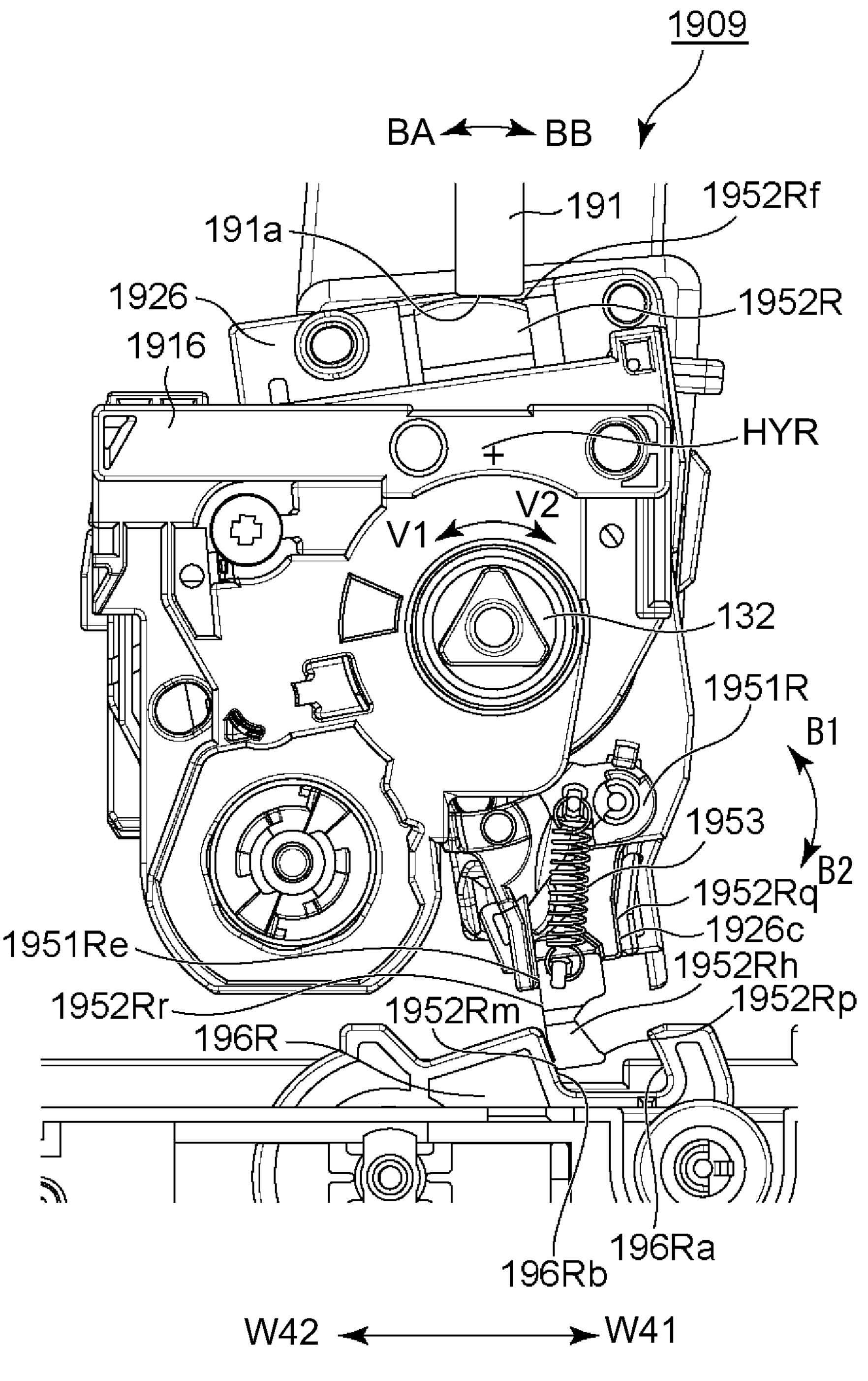

When the image forming operation is completed and the separation control member 196R moves in the W41 direction, the first force application surface 196Rb and the first force receiving surface 1952Rm come into contact with each other, and the first pressing surface 1952Rq of the movable member 1952R contacts the pressed surface 1926*c* of the drive-side bearing 1926, by which the developing unit rotates from the contact position in the direction of arrow V1 about the swing axis K (state in FIG. 125).

Thereafter, the separation control member 196R moves in the direction of W42 and returns to the home position, so that the spacer 1951R shifts to the separation holding position (first position) (state in FIG. 122).

[Non-Drive-Side Process Cartridge Structure]

Figure 126:
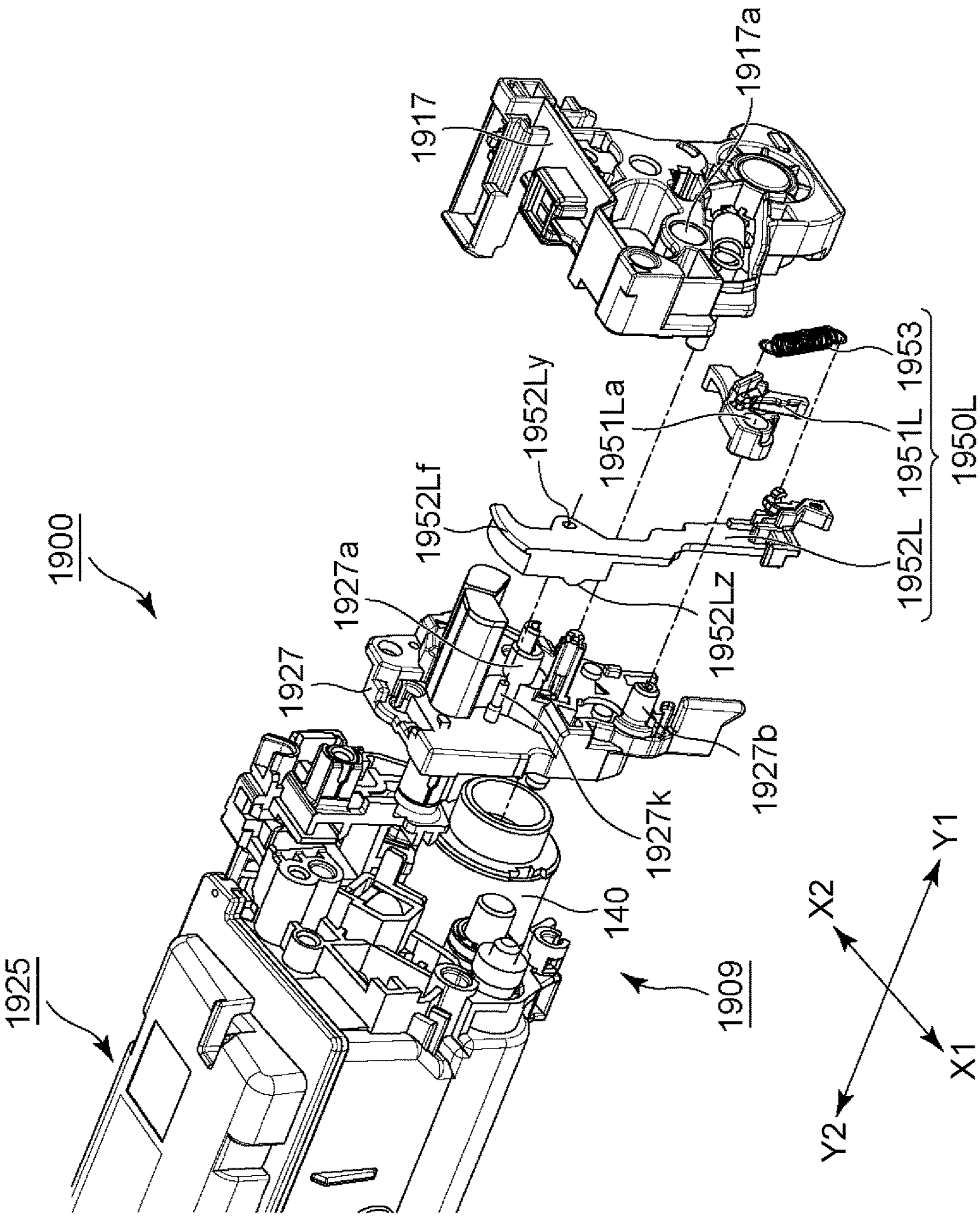

Next, referring to FIG. 126, the separation/contact mechanism 1950L on the non-drive-side of the process cartridge 1900 in this embodiment will be described. FIG. 126 shows an assembly perspective view of the non-drive-side of the developing unit 1909 including the separation/contact mechanism 1950L. Similarly to the drive-side separation/contact mechanism 1950R, the separation/contact mechanism 1950L includes a spacer 1951L which is a restricting member, a movable member 1952L which is a pressing member, and a tension spring 1953. Further, the movable member 1952L is provided with a first oblong round hole 1952Lx and a second oblong round hole 1952Ly (not shown), and an outer diameter portion of the second supporting portion 1927*e* of the non-drive-side bearing 1927 and the inner walls of the first oblong round hole 1952Lx and the first oblong round hole 1952Ly are fitted with each other. In addition, it is supported so as to be swingable about the two swinging shafts, namely, the shaft HXRL and the shaft HYRL.

Further, as in the Embodiment 1, the inner diameter portion of the support receiving portion 1951La of the spacer 1951L is fitted with the inner diameter portion of the first supporting portion 1927*b* of the non-drive-side bearing 1927, so that the spacer 1951L is rotatably supported, and the movable member 1952R and the spacer 1951L are urged to attract each other by the tension spring 1953. Further, the outer diameter portion of the cylindrical portion 1927*a* of the non-drive-side bearing 1927 is fitted into the developing unit supporting hole 1917*a* of the non-drive-side cartridge cover member 1917, so that the developing unit 1909 rotates about the swing axis K.

[Contact/Separation Operations of Developing Unit]

The operation of contacting and separating the photosensitive member drum 104 and the developing roller 106 by the separation/contact mechanism 1950L is the same as that of the above-mentioned separation/contact mechanism 1950R on the drive-side.

Figure 127:
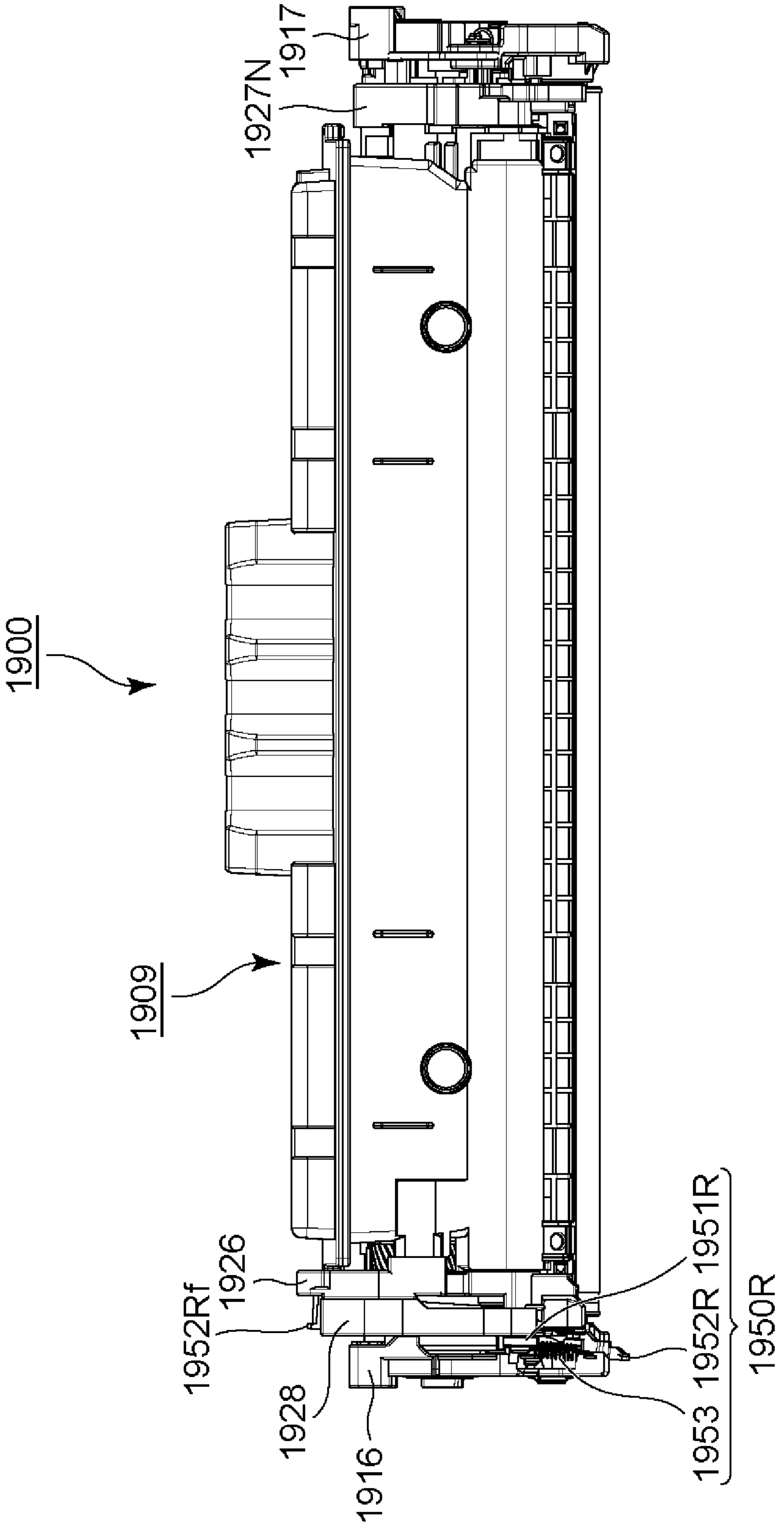
Figure 128:
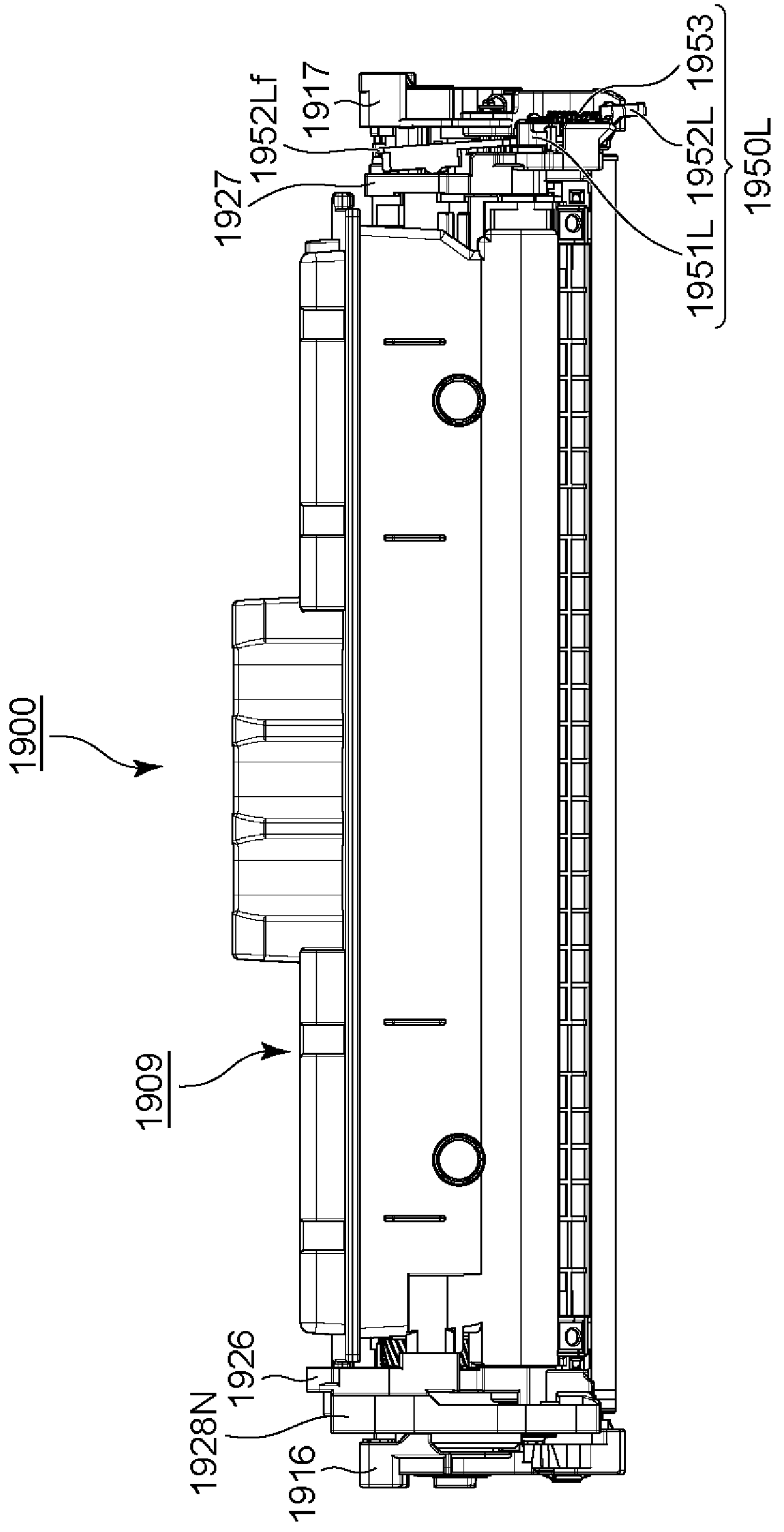

As for the separation/contact mechanism in this embodiment, the separation/contact mechanism of the process cartridge 1900 may be disposed on only one side as in the Embodiment 2. FIG. 127 shows a structure in which the separation/contact mechanism 1950R is provided only on the drive-side, and FIG. 128 shows a structure in which the separation/contact mechanism 1950L is provided only on the non-drive-side. However, it is necessary to appropriately set the spacing amount within a range of not affecting the image formation.

According to the structure of this embodiment described above, the same effect as that of the Embodiment 1 can be provided.

Further, in this embodiment, the projecting portion 1952Rh including the first force receiving surface 1952Rm constituting the first force receiving portion (retracting force receiving portion, separation force receiving portion) and the second force receiving surface 1952R constituting the second force receiving portion (contact force receiving portion) is movable in the YA direction. In this embodiment, by the movement thereof, the projection 1952Rh, the first force receiving surface 1952Rm, and the second force receiving surface 1952Rp are displaced at least in the Y2 direction (direction parallel to the rotation axis M1 and the rotation axis M2 of the Embodiment 1). By this, when the process cartridge 600 is inserted or removed into the apparatus main assembly 170, it can be avoided that the projecting portion 1952Rh, particularly the first force receiving surface 1952Rm and the second force receiving surface 1952Rp, and the apparatus main assembly 170, particularly the separation control member 196R interfere with each other, are engaged.

Further, in this embodiment, the amount of movement of the projecting portion 1952Rh in the pressing direction (ZA direction) of the pressing unit 191 at the time when the projecting portion 1952Rh moves from the stand-by position to the operating position, is small. Therefore, it is possible to set a small amount of movement of the pressing unit 191 required for the projecting portion 1952Rh to move from the stand-by position to the operating position, and further downsizing of the image forming apparatus main assembly 170 can be realized.

Embodiment 9

Hereinafter, Embodiment 9 disclosure will be described with reference to the drawings. In this embodiment, for the structure corresponding to the above-described Embodiment 1, the same reference numerals and characters are assigned, or the reference numerals in the first part is changed while the reference numerals and characters in the second part are the same.

In the following embodiment, an image forming apparatus in which four cartridges (hereinafter referred to as process cartridges) can be mounted and dismounted is illustrated as an image forming apparatus. The number of process cartridges mounted on the image forming apparatus is not limited to this example. It is selectable appropriately as needed. Further, in the embodiment described below, a laser beam printer is exemplified as one aspect of the image forming apparatus.

[Outline of Structure of Image Forming Apparatus]

Figure 130:
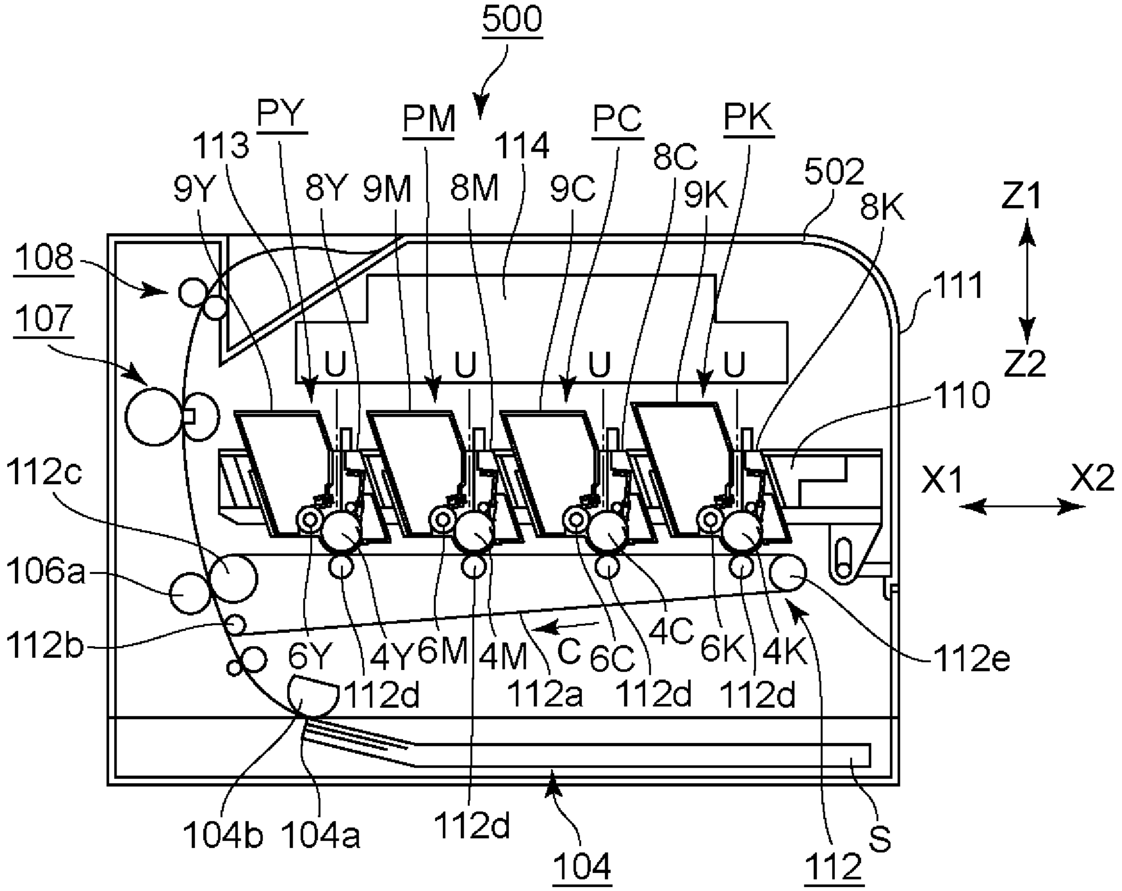
Figure 131:
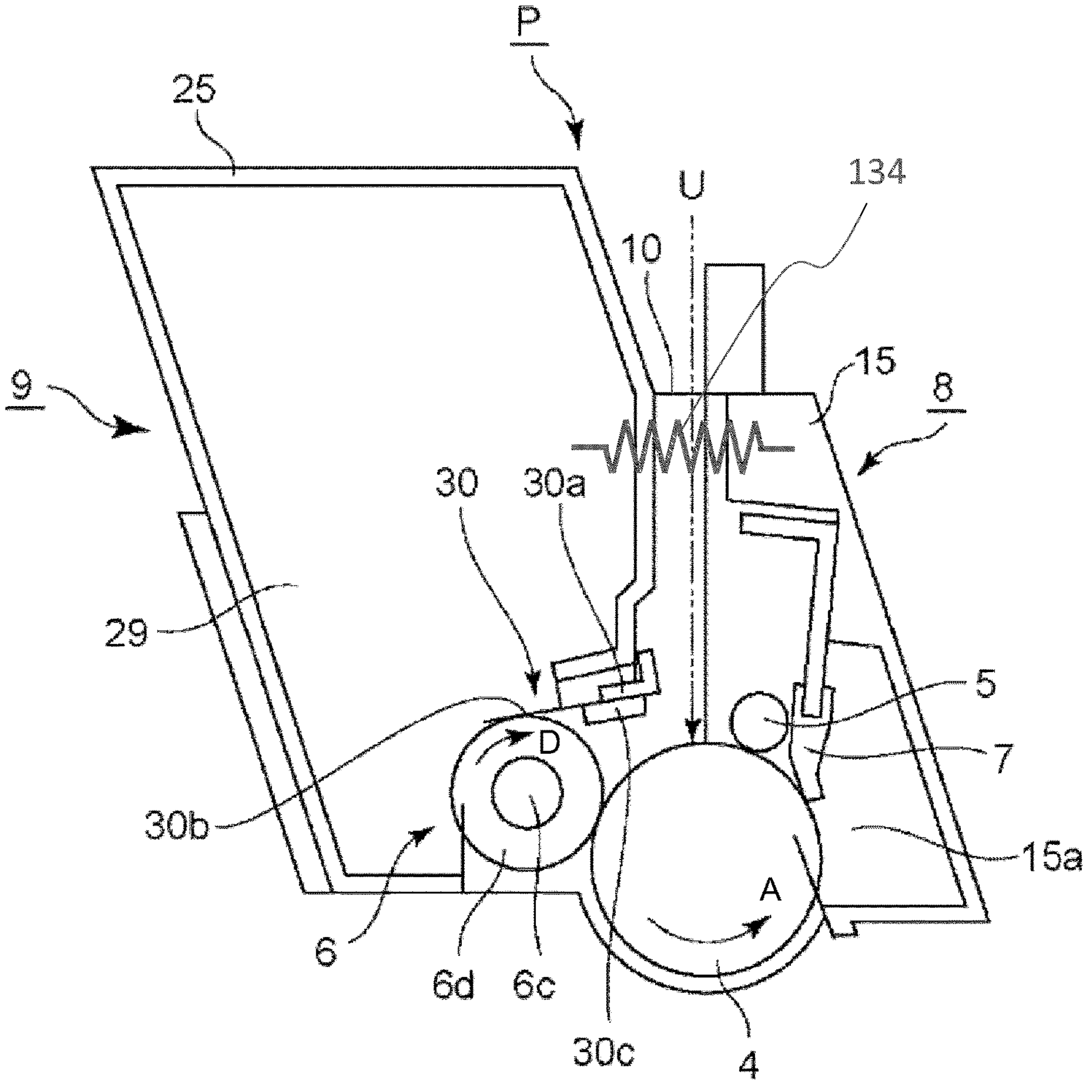

FIG. 130 is a schematic sectional view of the image forming apparatus 500. FIG. 131 is a cross-sectional view of the process cartridge P. Further, FIG. 132 is an exploded perspective view of the process cartridge P as viewed from the drive-side, which is one end side in the direction of the rotation axis of the photosensitive drum 4 (hereinafter referred to as the longitudinal direction).

The image forming apparatus 500 is a four-color full-color laser printer using an electrophotographic process, and forms a color image on the recording material S. The image forming apparatus 500 is a process cartridge type, and the process cartridge is dismountably mounted to the image forming apparatus main assembly 502 to form a color image on the recording material S.

Here, regarding the image forming apparatus 500, the side where the front door 111 is provided is the front surface (front surface), and the surface opposite to the front surface is the back surface (rear surface). Further, the right side of the image forming apparatus 500 as viewed from the front is referred to as a drive-side, and the left side is referred to as a non-drive-side. Further, as the image forming apparatus 500 is viewed from the front, the upper side is the upper surface and the lower side is the lower surface. FIG. 130 is a cross-sectional view of the image forming apparatus 500 as viewed from the non-drive-side, wherein the front side of the sheet of the drawing is the non-drive-side, the right side of the sheet of the drawing is the front side of the image forming apparatus 500, and the rear side of the sheet of the drawing is the drive-side of the image forming apparatus 500.

In the image forming apparatus main assembly (apparatus main assembly) 502, four process cartridges P (PY, PM, PC, PK)) namely, a first process cartridge PY, a second process cartridge PM, a third process cartridge PC, and a fourth process cartridge PK are arranged in a substantially horizontal direction.

Each of the first to fourth process cartridges P (PY, PM, PC, PK) includes the same electrophotographic process mechanism, but the color of the developer (hereinafter referred to as toner) is different. Rotational driving forces are transmitted to the first to fourth process cartridges P (PY, PM, PC, PK) from the drive output portion (not shown) of the image forming apparatus main assembly 502.

Further, a bias voltage (charging bias voltage, development bias voltage, and so on) is supplied from the image forming apparatus main assembly 502 to each of the first to fourth process cartridges P (PY, PM, PC, PK).

As shown in FIG. 131, each of the first to fourth process cartridges P (PY, PM, PC, PK) of this embodiment includes a drum unit (photosensitive member unit, first unit) 8. The drum unit 8 rotatably supports the photosensitive drum 4, and includes a charging member and a cleaning member as process means acting on the photosensitive drum 4. The photosensitive drum 4 is a tubular photosensitive member having a photosensitive layer on the outer peripheral surface.

Further, each of the first to fourth process cartridges P (PY, PM, PC, PK) includes a developing unit (second unit) 9 provided with a developing member for developing an electrostatic latent image on the photosensitive drum 4. The drum unit 8 and the developing unit 9 are coupled to each other. A more specific structure of the process cartridge P which will be described hereinafter.

The first process cartridge PY contains yellow (Y) toner in the developing container 25, and forms a yellow toner image on the surface of the photosensitive drum 4. The second process cartridge PM contains magenta (M) toner in the developing container 25, and forms a magenta-colored toner image on the surface of the photosensitive drum 4. The third process cartridge PC contains the cyan (C) toner in the developing container 25, and forms a cyan-colored toner image on the surface of the photosensitive drum 4. The fourth process cartridge PK contains black (K) toner in the developing container 25, and forms a black toner image on the surface of the photosensitive drum 4.

A laser scanner unit 114 as an exposure means is provided above the first to fourth process cartridges P (PY, PM, PC, PK). The laser scanner unit 114 outputs the laser beam U corresponding to the image information. The laser beam U passes through the exposure window 10 of the process cartridge P and scans and exposes the surface of the photosensitive drum 4.

An intermediary transfer belt unit 112 as a transfer member is provided below the first to fourth process cartridges P (PY, PM, PC, PK). The intermediary transfer belt unit 112 includes a drive roller **112*e*, a turn roller 112*c*, a tension roller 112*b*, and a flexible transfer belt 112*a*** extended around.

The lower surface of the photosensitive drum 4 of each of the first to fourth process cartridges P (PY, PM, PC, PK) is in contact with the upper surface of the transfer belt **112*a*. The contact portion is the primary transfer portion. Inside the transfer belt 112*a*, a primary transfer roller 112*d* is provided so as to oppose the photosensitive drum 4. The secondary transfer roller 106*a* contacts the turn roller 112*c* with the transfer belt 112*a* therebetween. The contact portion between the transfer belt 112*a* and the secondary transfer roller 106*a*** is the secondary transfer portion.

A feeding unit 104 is provided below the intermediary transfer belt unit 112. The feeding unit 104 includes a sheet feed tray **104*a* on which the recording material S is loaded and accommodated, and includes a sheet feed roller 104*b***.

A fixing device 107 and a paper discharge device 108 are provided on the upper left side of the image forming apparatus main assembly 502 in FIG. 130. The upper surface of the image forming apparatus main assembly 502 functions as a paper discharge tray 113. The toner image of the recording material S is fixed by the fixing means provided in the fixing device 107, and the toner image is discharged to the paper discharge tray 113.

[Image Forming Operation]

The operation for forming a full-color image is as follows. The photosensitive drum 4 of each of the first to fourth process cartridges P (PY, PM, PC, PK) is rotationally driven at a predetermined speed (in the direction of arrow A in FIG. 131). The transfer belt **112*a* is also rotationally driven in the forward direction (direction of arrow C in FIG. 130) relative to the rotation of the photosensitive drum at a speed corresponding to the speed of the photosensitive drum 4**.

The laser scanner unit 114 is also actuated. In synchronization with the operation of the laser scanner unit 114, the charging roller 5 uniformly charges the surface of the photosensitive drum 4 to a predetermined polarity and potential in each process cartridge. The laser scanner unit 114 scans and exposes the surface of each photosensitive drum 4 with laser beam U in accordance with the image signals of corresponding color. By this, an electrostatic latent image corresponding to the image signal of the corresponding color is formed on the surface of each photosensitive drum 4. The formed electrostatic latent image is developed by a developing roller 6 which is rotationally driven at a predetermined speed (in the direction of arrow D in FIG. 131).

By the electrophotographic image forming process operation as described above, a yellow toner image corresponding to the yellow component of the full-color image is formed on the photosensitive drum 4 of the first process cartridge PY. Then, the toner image is first transferred onto the transfer belt **112*a*. Similarly, a magenta color toner image corresponding to the magenta component of the full color image is formed on the photosensitive drum 4 of the second process cartridge PM. Then, the toner image is superimposed on the yellow toner image already transferred on the transfer belt 112*a* and first transferred. Similarly, a cyan toner image corresponding to the cyan component of the full-color image is formed on the photosensitive drum 4 of the third process cartridge PC. Then, the toner image is superimposed on the yellow-colored and magenta-colored toner images already transferred on the transfer belt 112***a* and first transferred. Similarly, a black toner image corresponding to the black component of the full-color image is formed on the photosensitive drum 4 of the fourth process cartridge PK. Then, the toner image is superimposed on the yellow, magenta, and cyan toner images already transferred on the transfer belt 112*a* and first transferred. In this manner, a four-color full-color unfixed toner image of yellow, magenta, cyan, and black is formed on the transfer belt 112*a*.

On the other hand, the recording materials S are separated and fed one by one at a predetermined control timing. The recording material S is introduced into the secondary transfer portion, which is the contact portion between the secondary transfer roller 106*a* and the transfer belt 112*a*, at a predetermined control timing. By this, in the process of transporting the recording material S to the secondary transfer portion, the four-color superimposed toner image on the transfer belt 112*a* is collectively transferred onto the surface of the recording material S.

[Overall Structure of Process Cartridge]

In this embodiment, the first to fourth process cartridges P (PY, PM, PC, PK) have the equivalent structure, but the colors of the contained toners are different. The process cartridge P includes a photosensitive drum 4 (4Y, 4M, 4C, 4K) and a process means which actable on the photosensitive drum 4. Here, examples of the process means are the charging means for charging the photosensitive drum 4, the developing means for developing the latent image formed on the photosensitive drum 4 by adhering toner to the photosensitive drum 4, and the cleaning means for removing residual toner remaining on the surface of the photosensitive drum 4. In this embodiment, the charging means (charging member) is a charging roller 5, the developing means (developing member) is a developing roller 6, and the cleaning means (cleaning member) is a cleaning blade 7. The process cartridge P is divided into a drum unit 8 (8Y, 8M, 8C, 8K) and a developing unit 9 (9Y, 9M, 9C, 9K). The developing roller 6 carries the toner on the surface thereof

[Drum Unit Structure]

As shown in FIGS. 131 and 132, the drum unit 8 includes the photosensitive drum 4, the charging roller 5, the cleaning blade 7, a waste toner container 15, aa waste toner storing portion 15*a*, a drive-side cartridge cover member 520, and a non-drive-side cartridge cover member 521. The photosensitive drum 4 is supported, so as to be rotatable about the axis (rotational axis) M1, by a drive-side cartridge cover member 520 and a non-drive side cartridge cover member 521 provided at both ends in the longitudinal direction of the process cartridge P. Further, as shown in FIG. 132, one longitudinal end side of the photosensitive drum 4 is provided with a photosensitive member coupling member 43 (fixed thereto) for receiving a driving force for rotating said photosensitive drum. The photosensitive member coupling member 43 is engaged with the coupling (not shown) as the drum drive output portion of the image forming apparatus main assembly 502 to be rotated by the driving force of the driving motor (not shown) of the image forming apparatus main assembly 502 about the rotational axis which is coaxial with the axis M1 The charging roller 5 is supported by the waste toner container 15 so that it is rotated by the photosensitive drum 4 in contact therewith. Further, the cleaning blade 7 is supported by the waste toner container 15 so as to contact the peripheral surface of the photosensitive drum 4 at a predetermined pressure. The untransferred residual toner removed from the peripheral surface of the photosensitive drum 4 by the cleaning blade 7 is stored in the waste toner storing portion 15*a* in the waste toner container 15. Of the drum unit (first unit) 8, the waste toner container 15, the drive-side cartridge cover member 520, and the non-drive-side cartridge cover member 521 constitute a drum frame (first frame).

[Developing Unit Structure]

As shown in FIG. 131, the developing unit 9 includes the developing roller (developing member) 6, a developing blade 30, the developing container 25, the development cover member 533, a stirring member 29*a* (not shown), a toner feeding roller 70 (not shown), and so on. The developing container 25 includes a toner accommodating portion 29 for storing toner to be supplied to the developing roller 6, and supports a developing blade 30 for regulating the toner layer thickness (thickness of the toner layer) on the peripheral surface of the developing roller 6. The developing blade 30 includes an elastic member 30*b* which is a sheet-like metal having a thickness of about 0.1 mm, and a member 30*a* which is a metal material having and an L-shaped cross-section to which the elastic member 30*b* is mounted by welding or the like and which is supported by the developing container 25. The developing blade 30 forms a toner layer having a predetermined thickness between the elastic member 130*b* and the developing roller 106. The developing blade 30 is mounted on the developing container 25 with fixing screws 30*c* at two locations at each of one end side and the other end side in the longitudinal direction. The developing roller 6 includes a core metal 6*c* and a rubber portion 6*d*. The developing roller 6 is supported rotatably about the axis (rotating axis) M2 by the drive-side bearing 526 and the non-drive-side bearing 27 mounted to the opposite ends in the longitudinal direction of the developing container 25. The stirring member 29*a* rotates to stir the toner in the toner accommodating portion 29. The toner feed roller (developer agent supply member) 70 contacts the developing roller 6 and supplies toner to the surface of the developing roller 6 while also scraping the toner off the surface of the developing roller 6.

Further, as shown in FIG. 132, a development coupling member 74 for receiving a driving force for rotating the developing roller 6 is provided on one end side of the developing unit 9 in the longitudinal direction. The development coupling member 74 engages with a main assembly side coupling member (not shown) as a development drive output portion of the image forming apparatus main assembly 502 to receive a rotational driving force of the drive motor (not shown) of the image forming apparatus main assembly 502, thus rotating about a rotation axis substantially parallel to the axis M2. The driving force input to the development coupling member 74 is transmitted by a driving train (not shown) provided in the developing unit 9, so that the developing roller 6 can be rotated in the direction of arrow D in FIG. 131. The development cover member 533 which supports and covers the development coupling member 74 and a gear train (not shown) is mounted to one end side of the developing container 25 in the longitudinal direction. Of the developing unit (second unit) 9, the developing container 25, the drive-side bearing 526, the non-drive-side bearing 27, and the development cover member 533 constitute the developing frame (second frame).

[Assembly of Drum Unit and Developing Unit]

Referring to FIG. 132, the assembling of the drum unit 8 and the developing unit 9 will be described. The drum unit 8 and the developing unit 9 are connected with each other by a drive-side cartridge cover member 520 and a non-drive-side cartridge cover member 521 provided at both ends in the longitudinal direction of the process cartridge P. The drive-side cartridge cover member 520 provided on one end side in the longitudinal direction of the process cartridge P is provided with a supporting hole 520*a* for permitting swinging (moving) the developing unit 9. Further, the non-drive-side cartridge cover member 521 provided on the other end side in the longitudinal direction of the process cartridge P is provided with a cylindrical support portion 521*a* for swingably supporting the developing unit 9. Further, the drive-side cartridge cover member 520 and the non-drive-side cartridge cover member 521 are provided with supporting holes 520*b* and 521*b* for rotatably supporting the photosensitive drum 4.

Here, on one end side, the outer peripheral surface of the cylindrical portion 533*b* of the development cover member 533 is fitted into the supporting hole 520*a* of the drive-side cartridge cover member 520. On the other end side, the support portion 521*a* of the non-drive-side cartridge cover member 521 is fitted into the hole of the non-drive-side bearing 27. Further, the end portions of the photosensitive drum 4 in the longitudinal direction are fitted in the supporting hole 520*b* of the drive-side cartridge cover member 520 and the supporting hole portion 521*b* of the non-drive-side cartridge cover member 521, respectively. And, the drive-side cartridge cover member 520 and the non-drive-side cartridge cover member are fixed to the waste toner container 15 by screws or adhesives (not shown). That is, the drive-side cartridge cover member 520 and the non-drive-side cartridge cover member 521 are integrated with the waste toner container 15 to constitute the drum unit 8.

By this, the developing unit 9 is supported by the drive-side cartridge cover member 520 and the non-drive-side cartridge cover member 521 so as to be movable (rotatable) relative to the drum unit 8 (photosensitive drum 4). Here, an axis connecting the supporting hole 520*a* of the drive-side cartridge cover member 520 and the support portion 521*a* of the non-drive-side cartridge cover member 521, that is, the rotation center of the developing unit 9 relative to the drum unit 8 is a swing axis (rotation axis, rotation axis) K. Further, the center line of the cylindrical portion 533*b* of the development cover member 533 is coaxial with the rotation axis of the development coupling member 74, and the developing unit 9 receives the driving force, at the swing axis K, from the image forming apparatus main assembly by way of the development coupling member 74. That is, the rotation axis of the development coupling member 74 is also the rotation axis K (swing axis K). When the assembly of the process cartridge P is completed, the swing axis K, the axis M1, and the axis M2 are substantially parallel to each other.

Further, a developing unit urging spring (second unit urging member) 134 is provided between the developing unit 9 and the drum unit 8. The development pressure spring 134 (see FIG. 131) urges the developing unit 9 to rotate it relative to the drum unit 8 in the direction of arrow V2 (see part (a) of FIG. 129 and part (b) of FIG. 129) about the swing axis K. The development pressure spring 134 urges the developing unit 9 in the direction of moving it from the separated position toward the developing position. The developing unit urging spring 134 is a coil spring and is an elastic member.

[Process Cartridge Mounting/Dismounting Structure]

Referring to FIGS. 130, 133 and 134, the cartridge tray (hereinafter referred to as a tray) 110 which supports the process cartridge will be described in more detail. FIG. 133 is a sectional view of the image forming apparatus 500 in which the tray 110 is inside the image forming apparatus main assembly 502 with the front door 111 open. FIG. 134 is a sectional view of the image forming apparatus 500 in which the tray 110 is outside the image forming apparatus main assembly 502 with the front door 111 open. As shown in FIGS. 133 and 134, the tray 110 is movable relative to the image forming apparatus main assembly 502 in the arrow X1 direction (pushing direction) and the arrow X2 direction (pulling direction). That is, the tray 110 is provided so as to be retractable and insertable with respect to the image forming apparatus main assembly 502, and the tray 110 is structured to be movable in a substantially horizontal direction when the image forming apparatus main assembly 502 is installed on a horizontal surface. Here, the state in which the tray 110 is outside the image forming apparatus main assembly 502 (state in FIG. 134) is referred to as an outside position. Further, a state in which the tray 110 is inside the image forming apparatus main assembly 502 with the front door open and the photosensitive drum 4 and the transfer belt 112*a* are spaced by a gap T1 (state in FIG. 133) is referred to as a first inner position.

The tray 110 is provided with a mounting portion 110*a* to which the process cartridge P can be dismountably mounted at the outer position shown in FIG. 134. Then, each process cartridge P mounted on the mounting portion 110*a* at the outer position of the tray 110 is supported by the tray 110 by the drive-side cartridge cover member 520 and the non-drive-side cartridge cover member 521 contacting the mounting portion 110*a*. Then, in the state where each process cartridge P is placed in the mounting portion 110*a*, the tray 110 is moved toward the inside the image forming apparatus main assembly 502, that is, the tray 110 is moved from the outer position to the first inner position. At this time, as shown in FIG. 133, each process cartridge P moves while maintaining a gap T1 between the transfer belt 112*a* and the photosensitive drum 4. Therefore, the tray 110 can move the process cartridge P inside the image forming apparatus main assembly 502 without contact of the photosensitive drum 4 to the transfer belt 112*a*. When the tray 110 is placed in the first inner position, the photosensitive drum 4 and the transfer belt 112*a* maintain a gap T1.

Here, the direction perpendicular to the X direction (X1, X2) of the arrow in FIG. 133 and perpendicular to the axis of the photosensitive drum 4 is referred to as the Z direction (arrows Z1, Z2 in FIG. 133). The tray 110 can be moved from the first inner position in the direction of arrow Z2 in FIG. 133 to the second inner position (state in FIG. 130) where the photosensitive drum 4 and the transfer belt 112*a* are in contact with each other to form an image. In this embodiment, the tray 110 placed at the first inner position moves in the direction of the arrow Z2 to the second inner position in FIG. 133 in interrelation with the operation of closing the front door 111 in the direction of the arrow R in FIG. 133 from the state where the front door 111 is open.

As described above, by using the tray 110, a plurality of process cartridges P can be collectively set at a position inside the image forming apparatus main assembly 502 where image formation is possible.

[Spacer]

Subsequently, referring to FIG. 135, the structure for contacting and separating the developing roller 6 included in the developing unit 9 relative to photosensitive drum 4 and will be described in detail. In the Embodiment 1, the spacers 51R and 51L are structured to be moved by receiving a force by way of the movable members 52R and 52L, but in the structure of this embodiment, the spacer is capable of receiving the force not through the movable member.

Part (a) of FIG. 135 and part (b) of FIG. 135 are perspective views of the spacer 510 per se. The spacer (spacer portion) 510 is a space-holding member for holding the space between the photosensitive drum 4 and the developing roller 6 with a predetermined space, and is a regulating member for regulating the position of the developing unit 9 relative to the drum unit 8.

The spacer (holding member) 510 has an annular shape and is provided with a supported hole (supported portion) 510*a* which is contacted by and is supported by the supporting portion 533*c* of the developing frame. The free end of the projecting portion (holding portion) 510*b* projecting from the supported hole 510*a* in the radial direction is provided with a contact surface 510*c* as a contacting contact portion having an arc surface extending about the axis of the supported hole 510*a*, the contact portion being a part of the drum unit 8.

The projecting portion (holding portion) 510*b* is a portion which connects the supported portion 510*a* and the contact surface 510*c* with each other, and has stiffness sufficient to maintain the spaced position of the developing unit 9 while being sandwiched between the drum unit 8 and the developing unit 9.

Further, it has a restricted surface (restricted portion) 510*k* adjacent to the contact surface 510*c*. Furthermore, the spacer 510 is provided with a projecting portion 510*d* projecting in the radial direction of the supported hole 510*a* and a force receiving portion (first force receiving portion, contact force receiving portion or a pressed portion) 510*e*) projecting from the projecting portion 510*d* along the axial direction of the supported hole 510*a*. Further, the spacer 510 includes a main body portion 510*f* connected to the supported hole 510*a*, and the main body portion 510*f* is provided with a spring-hooked portion 510*g* projecting in the axial direction of the supported hole 510*a* and has a first restricted surface 510*h* which is a surface perpendicular to the axial direction of the supported hole 510*a*.

[Spacer Assembly]

Figure 129:
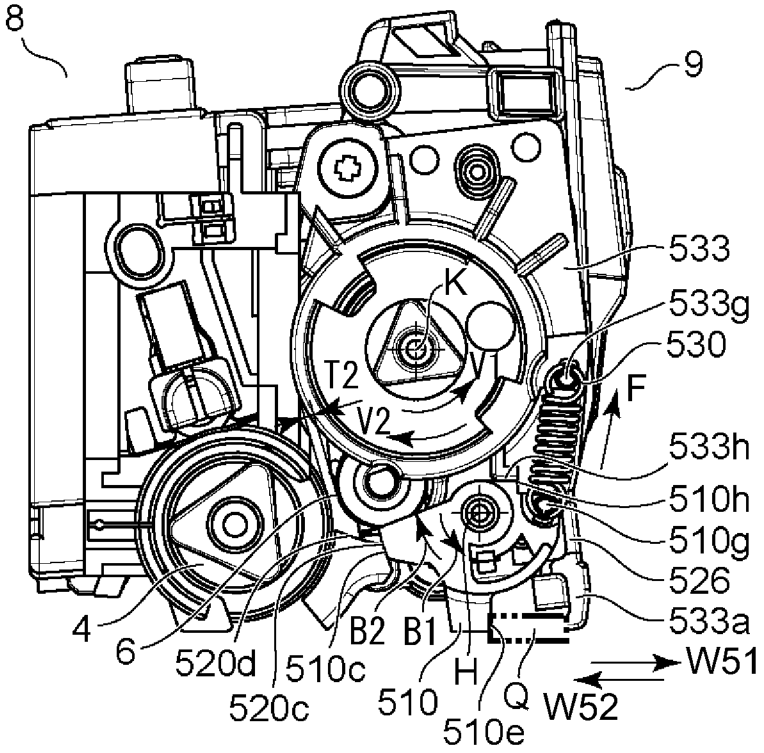
Figure 129:
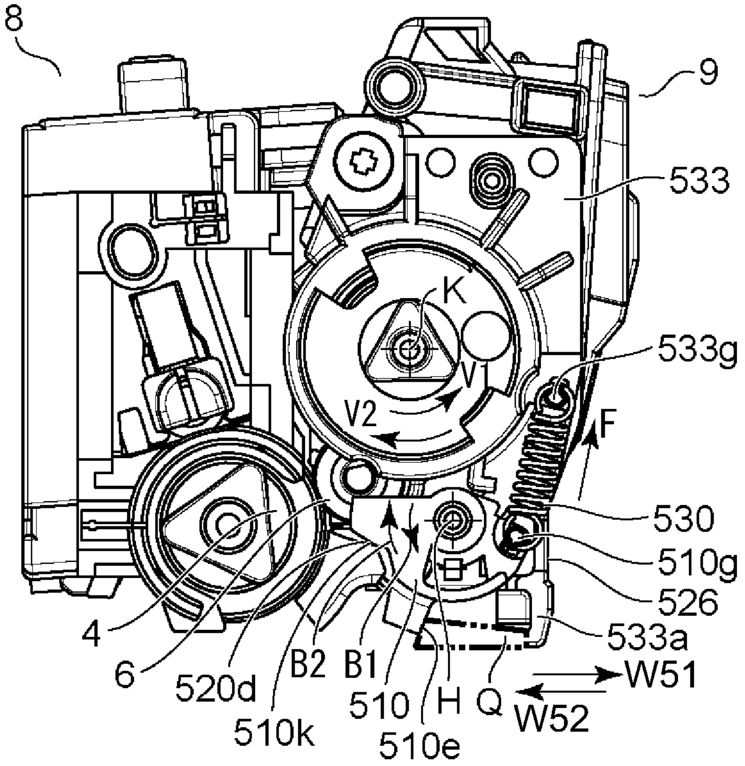

Next, referring to FIGS. 136, 137, and 129, the assembling of the spacer 510 will be described. FIG. 136 is a perspective view of the process cartridge P before assembling the spacer 510 as viewed from the drive-side, and FIG. 137 is a perspective view of the process cartridge P after assembling the spacer 510 as viewed from the drive-side. FIG. 129 is a view of the process cartridge P after assembling the spacer 510, as viewed from the drive-side along the swing axis K. Part (a) of FIG. 129 shows the developing unit 9 and the developing frame in the retracted position (separated position), and part (b) of FIG. 129 shows a state in which the developing unit 9 and the developing frame are in the developing position. A detailed description of the retracted position (separated position) and the developed position will be made hereinafter. In FIGS. 137 and 129, for the sake of explanation, the portions other than the contacted portion 520*c* and the spacer restricting surface (spacer restriction portion) 520*d* of the drive-side cartridge cover member 520 are omitted.

As described above, the developing unit 9 is supported so as to be rotatable about the swing axis K relative to the photosensitive drum 4 by fitting the outer diameter portion of the cylindrical portion 533*b* of the development cover member 533 into the supporting hole portion 520*a* of the drive-side cartridge cover member 520. Further, the development cover member 533 is provided with a cylindrical support portion 533*c* which projects in the longitudinal direction along the swing axis K. Then, the outer peripheral surface of the support portion 533*c* is fitted with the inner peripheral surface of the supported hole 510*a* of the spacer 510, and the support portion 533*c* rotatably supports the spacer 510. Here, the swing axis (rotation shaft) of the spacer 510 assembled to the development cover member 533 is referred to as a swing axis H. The swing axis H is substantially parallel to the swing axis K.

Further, the development cover member 533 is provided with a retaining portion 533*d* which projects in the longitudinal direction along the swing axis H. The retaining portion 533*d* can be elastically deformed in a direction away from the support portion 533*c* when the spacer is assembled to the development cover member 533. As shown in FIG. 137, the movement of the spacer 510 assembled to the development cover member 533 in the swing axis H direction is restricted by the retaining portion 533*d* being abutted by to the spacer 510. Further, even if the spacer 510 assembled to the development cover member rotates and changes its attitude, the retaining portion 533*d* contacts the spacer 510 to restrict the movement of the spacer 510.

As described above, the spacer 510 is rotatably supported by the development cover member of the developing unit 9 so as to be rotatable about the swing axis H.

Further, in this embodiment, there is provided a tension spring 530 which is an elastic member as an urging member (holding portion urging member) provided with a spacer portion urging portion (holding portion urging portion) which urges the spacer 510 in the direction of arrow B1 in FIG. 129. The tension spring is a coil spring. The tension spring 530 is assembled to a spring-hooked portion 533*g* provided on the development cover member 533 and projecting in the swing axis K direction, and a spring-hooked portion 510*g* of the spacer assembled to the development cover member 533. The spring-hooked portion 510*g* corresponds to the point of action of the tension spring 530, and the tension spring 530 moves the spacer (spacing holding member, holding member) in the direction of arrow B1 in FIG. 129 by applying a force to the spring-hooked portion 510*g* in the direction of the arrow F. Here, the direction of the arrow F in FIG. 129 is substantially parallel to the line connecting the spring-hooked portion 533*g* and the spring-hooked portion 510*g*. Then, as shown in part (a) of FIG. 129, a first restricted surface 510*h* of the spacer 510 urged by the tension spring 530 is brought into engagement with a first restriction surface 533*h* provided on the development cover member 533. By this, the movement of the spacer 510 in the direction of arrow B1 in FIG. 129 is restricted. That is, the position of the spacer 510 relative to the development cover member 533 in the rotational direction (arrow B1 direction) about the swing axis H is determined. Here, the state in which the first restricted surface 510*h* and the first restriction surface 533*h* are engaged with each other is referred to as a restriction position (first position) of the spacer 510.

In this embodiment, the tension spring 530 is used as an example of the urging member which urges the spacer 510 to the restriction position (first position), but the present invention is not limited to this. For example, the spacer 510 may be urged to the restriction position by using a torsion coil spring, a leaf spring, or the like as an urging member. Further, the material of the urging means may be metal, a mold or the like, which is elastic and can urge the spacer 510.

In this manner, the developing unit 9 provided with the spacer 510 and the tension spring 530 is coupled with the drum unit 8 by the drive-side cartridge cover 520 as described above.

As shown in FIG. 137, the force receiving portion 510*e* of the assembled spacer 510 is on the same side as the side where the development coupling member 74 or the photosensitive member coupling member 43 is placed with respect to the direction of the rotation axis M2 of the developing roller 6.

Further, as shown in FIG. 136, the drive-side cartridge cover 520 includes a contacted portion 520*c*. The contacted portion 520*c* is a ridge line portion formed at a corner where two surfaces perpendicular to the axis of the supporting hole 520*a* intersect, and is a ridge line portion extending substantially parallel to the axis of the supporting hole 520*a*. The ridge line portion as the contacted portion 520*c* may be a portion formed by chamfering, into a flat surface or a curved surface, a corner portion where two surfaces perpendicular to the axis of the supporting hole 520*a* intersect with each other. Further, as shown in FIGS. 137 and 129, the contacted portion 520*c* is opposed to the contact surface 510*c* of the spacer 510 located at the restriction position so as to be contactable thereto when the drive-side cartridge cover 520 is assembled to the developing unit 9 and the drum unit 8. Further, as described above, the developing unit 9 is rotatable about the swing axis K relative to the drum unit 8 and is subjected to the urging force by the developing unit urging spring (not shown). Then, when the contact surface 510*c* of the spacer 510 located at the restriction position and the contacted portion 520*c* come into contact with each other, the position of the developing unit 9 with respect to the drum unit 8 in the rotational direction about the swing axis K is determined. When the position is determined in this manner, the developing roller 6 and the photosensitive drum 4 of the developing unit 9 are spaced by a gap T2. Here, the state in which the developing roller is spaced from the photosensitive drum 4 by the gap T2 by the spacer 510 is referred to as the retracted position (spacing position) of the developing unit 9 (state in part (a) of FIG. 129). When the developing unit 9 is in the retracted position (separated position), it can be said that the developing frame is also in the retracted position (spaced position).

Further, when the developing unit 9 is in the retracted position, the force received by the contact surface 510*c* of the spacer 510 from the contacted portion 520*c* and the force received by the inner peripheral surface of the supported hole 510*a* from the supporting portion 533*c* are forces having vectors passing through the swing axis H (see part (a) of FIG. 129) Furthermore, these forces are orientated in opposite directions, and therefore, these forces are balanced. Therefore, when the developing unit 9 is in the retracted position, the force received by the contact surface 510*c* from the first contacted portion 520*c* does not produce a moment around the swing axis H on the spacer 510. The contacted portion 520*c* may be formed so as to form an arc surface centered on the axis of the supporting hole 520*a* when the developing unit 9 is in the retracted position. Even with such a structure, when the developing unit 9 is in the retracted position, the force received by the contact surface 510*c* from the first contacted portion 520*c* does not produce a moment around the swing axis H on the spacer 510.

Further, as shown in the FIG. 146 showing the positional relationship between the photosensitive drum 4 and the developing roller 6, when the developing unit 9 is placed at the retracted position, the axis M2 of the developing unit 9 may not parallel with the axis M1 of the photosensitive drum 4. Specifically, for example, the developing roller 6 may be partially spaced from the photosensitive drum 4 in the direction of the axis M1 of the photosensitive drum 4.

As described above, in the state that the spacer 510 is placed at the restriction position and the developing unit 9 is placed at the retracted position, when a force is applied to the force receiving portion 510*e* of the spacer 510 in the direction of the arrow B2 in part (a) of FIG. 129, the spacer 510 rotates from the restriction position in the direction of the arrow B2 in part (a) of FIG. 129. When the spacer 510 rotates in the direction of arrow B2, the contact surface 510*c* separates from the contacted portion 520*c*, and the developing unit can rotate in the direction of arrow V2 in part (a) of FIG. 129 from the retracted position. That is, the developing unit 9 rotates in the V2 direction from the retracted position, and the developing roller 6 included in the developing unit 9 becomes contactable to the photosensitive drum 4. Here, the position of the developing unit 9 in which the developing roller 6 and the photosensitive drum 4 contact with each other is referred to as a developing position (contact position) (state of part (b) of FIG. 129). When the developing unit 9 is in the developing position, it can be said that the developing frame is also in the developing position (contact position).

In addition, the position in which the spacer 510 rotates from the restriction position in the direction of the arrow B2 in part (a) of FIG. 129, the contact surface 510*c* separates from the contacted portion 520*c*, and the developing unit 9 is permitted to move from the retracted position (separated position) to the developing position (the contact position) is referred to an permission position (second position) (part (b) of FIG. 129). When the developing unit 9 is at the developing position, the restricted surface 510*k* of the spacer 510 contacts the spacer restricting surface (spacer restriction portion) 520*d* of the drive-side cartridge cover 520, so that the spacer 510 is maintained in the permission position (second position).

Further, the development cover member 533 is provided with a retracting force receiving portion (another force receiving portion, a second force receiving portion, a separating force receiving portion) 533*a* projecting in the radial direction of the cylindrical portion 533*b*. Similarly to the force receiving portion 510*e*, the retracting force receiving portion 533*a* is also arranged on the same side as the development coupling member 74 or the photosensitive member coupling member 43 with respect to the direction of the rotation axis of the developing roller 6. Since the development cover member 533 is fixed to the developing unit 9, when the developing unit 9 is in the developing position and a force is applied to the retracting force receiving portion 533*a* in the direction of the arrow W51 in part (b) of FIG. 129, the developing unit is rotated about the moving axis K in the direction of the arrow V1 in part (b) of FIG. 129 to the retracted position. Here, in part (a) of FIG. 129 and FIG. 129(*b*), the direction in which the retracting force receiving portion 533*a* moves when the developing unit 9 moves from the developing position to the retracting position is indicated by the arrow W51, and the direction opposite to the arrow W51 is indicated by the arrow W52. The W51 direction and the W52 direction are substantially horizontal directions, and are substantially parallel with the direction in which at least two of the first to fourth process cartridges PY, PM, PC, and PK mounted on the image forming apparatus main assembly 502 are arranged. Further, the W51 direction and the W52 direction are substantially parallel to the moving direction of the separation control member 540 which will be described hereinafter.

The force receiving portion 510*e* included in the spacer 510 assembled to the developing unit 9 is placed on the upstream side of the retracting force receiving portion 533*a* in the direction of W51 in part (a) of FIG. 129 and part (b) of FIG. 129. Further, as shown in part (a) of FIG. 129 and FIG. 129(*b*), as viewed from the drive-side along the swing axis K, the force receiving portion 510*e* and the retracting force receiving portion 533*a* are substantially opposed to each other, and the force receiving portion 510*e* and the retracting force receiving portion define a space Q surrounded by a two-dot chain line. The space Q is a space opened in the direction of gravity when the process cartridge P is mounted to the image forming apparatus main assembly 502. Further, the space Q is formed both in a state in which the developing unit 9 is placed in the retracted position and the spacer 510 is placed in the restriction position (part (a) of FIG. 129) and in a state in which the developing unit is placed in the developing position and the spacer 510 is placed in the permission position (part (b) of FIG. 129).

[Mounting to Main Assembly]

Next, referring to FIG. 138, the operation when the process cartridge P is mounted on the image forming apparatus main assembly 502 will be described. Part (a) of FIG. 138 is a view, as viewed from the drive-side, of a state in which the process cartridge P is placed at the first inner position where the photosensitive drum 4 and the transfer belt 112*a* are spaced from each other. Further, part (b) of FIG. 138 is a view, as viewed from the drive-side, of a state in which the process cartridge P is placed at the second inner position where the photosensitive drum 4 and the transfer belt 112*a* are in contact with each other. For the sake of explanation, in part (a) of FIG. 138 and part (b) of FIG. 138, parts are omitted except for the contacted portion 520*c* and the spacer restriction surface 520*d* of the drive-side cartridge cover 520.

The image forming apparatus main assembly 502 includes the separation control members (force applying member) 540 corresponding to respective process cartridges P (PY, PM, PC, PK). The separation control member 540 is disposed below the spacer 510 of the process cartridge P placed at the first inner position and the second inner position (in the Z1 direction in FIG. 138). The separation control member 540 includes a control portion (projecting portion) 540*a* projecting toward the process cartridge P, and the control portion 540*a* has a first force application surface (retracting force applying portion, separation force applying portion) 540*b* and a second force application surface (force applying portion, contact force applying portion) 540*c*. The control portion 540*a* of the separation control member 540 is provided below the lower surface of the space Q of the process cartridge P placed at the first inner position (in the Z1 direction in FIG. 138). Further, the separation control member 540 is placed so that a gap T5 is provided between the process cartridge P and the spacer 510 when the process cartridge P is at the first inner position (part (a) of FIG. 138). That is, as described above, the spacer 510 of the process cartridge P inserted into the inside of the image forming apparatus main assembly 502 by the tray 110 moving from the outer position to the first inner position enters into the main assembly 502 without contacting the separation control member 540. Then, when the process cartridge P is moved from the first inner position to the second inner position by closing the front door 111 as described above, the control portion 540*a* enters the space Q as shown in part (b) of FIG. 138.

Further, FIG. 142 shows a view of the process cartridge P set in the image forming apparatus 502 as viewed in the direction of arrow J in part (b) of FIG. 138. For better illustration, FIG. 142 shows the separation control member 540 with omission of portions other than the control portion 540*a*. In addition, some of the portions constituting the process cartridge P are omitted. The retracting force receiving portion 533*a* is disposed downstream of the force receiving portion 510*e* in the W51 direction (retraction direction, separation direction), and a space Q is formed between the force receiving portion 510*e* and the retracting force receiving portion 533*a* in the W51 direction. The W51 direction will be described in detail hereinafter.

As shown in FIG. 142, the force receiving portion 510*e* of the spacer 510 and the retracting force receiving portion 533*a* of the development cover member 533 are arranged so as to partially overlap each other in the direction along the swing axis K of the developing unit 9 to define the space Q. Further, when the process cartridge P is mounted at the second inner position (image formable position) and the control portion 540*a* enters the space Q, the control portion 540*a* is arranged such that the force receiving unit 510*e* and the retracting force receiving portion 533*a* overlap with each other in the direction along the swing axis K. Here, as shown in part (b) of FIG. 138, the description will be made as to a state in which the process cartridge P is mounted at the second inner position of the image forming apparatus main assembly 502 and the developing unit 9 is in the retracted position. In this state, there is a gap T3 between the force receiving portion 510*e* and the second force application surface 540*c*, and the position of the separation control member 540 providing a gap T4 between the retracting force receiving portion 533*a* and the first force application surface 540*b* is called the home position.

[Contact Operation]

Subsequently, referring to FIG. 139, the description will be made as to the operation of moving the developing unit 9 from the retracted position (separation position) to the developing position (contact position) inside the image forming apparatus main assembly 502. FIG. 139 is a view of the process cartridge P located at the second inner position inside the image forming apparatus main assembly 502, as viewed from the drive-side. For better illustration, the drive-side cartridge cover 520 is shown with omission of portions other than the contacted portion 520*c* and the spacer restriction surface 520*d*. Part (a) of FIG. 139 shows a state in which the developing unit 9 is in the retracted position (separated position) and the separation control member 540 is in the home position. Part (b) of FIG. 139 shows a state in which the developing unit 9 is moving from the retracted position to the developing position. Part (c) of FIG. 139 shows a state in which the developing unit 9 is placed at the developing position and the separation control member 540 is placed at the first position. Part (d) of FIG. 139 shows a state in which the developing unit 9 is placed at the developing position and the separation control member 540 is placed at the home position. Here, as described above, at the home position of the separation control member 540, there is a gap T3 between the second force application surface 540*c* and the force receiving portion 510*e* of the process cartridge P mounted at the second inner position, and there is a gap T4 between the first force application surface 540*b* and the retracting force receiving portion 533*a*. The first position will be described hereinafter.

The development coupling member 74 receives a driving force from the image forming apparatus main assembly 502 in the direction of the arrow V2 in part (a) of FIG. 139, so that the developing roller 6 rotates. That is, the developing unit 9 including the development coupling member 74 receives a moment in the arrow V2 direction about the swing axis K, from the image forming apparatus main assembly 502. When the developing unit 9 shown in part (a) of FIG. 139 is in the retracted position (separated position) and the spacer 510 is in the restriction position (first position), even if the developing unit 9 receives this moment, the contact surface 510*c* of the spacer 510 contacts the contacted portion 520*c*, the attitude of the developing unit 9 remains restricted to the retracted position (separated position) (held at the retracted position). The separation control member 540 of this embodiment is structured to be movable from the home position in the direction of the arrow W52 in part (a) of FIG. 139. When the separation control member 540 moves in the W52 direction, the second force application surface (contact force applying portion) 540*c* of the control portion 540*a* and the force receiving portion (contact force receiving portion) 510*e* of the spacer 510 are brought into contact with each other, and the spacer 510 is moved in the direction B2 in part (a) of FIG. 139. The spacer 510 that rotates in this manner moves to the permission position (second position) where the contact surface 510*c* and the contacted portion 520*c* are separated from each other. Here, the position of the separation control member 540 which moves the spacer 510 to the permission position shown in part (b) of FIG. 139 is referred to as a first position.

When the spacer 510 is moved to the permission position by the separation control member 540, the developing unit 9 rotates in the V2 direction by the moment received from the image forming apparatus main assembly 502 and the urging force of the developing unit urging spring 134, and moves to the developing position (contact position) where the developing roller 6 and the photosensitive drum 4 are in contact (part (c) of FIG. 139) with each other. Then, the separation control member 540 moves from the first position in the W51 direction and returns to the home position (part (d) of FIG. 139). The spacer 510 is urged by the tension spring in the direction of the arrow B1 (direction from the permission position (second position) to the restriction position (first position)) in the part (d) of FIG. 12. However, by the restricted surface 510*k* of the spacer 510 contacting the spacer restriction surface 520*d* of the drive-side cartridge cover 520, the movement of the spacer 510 toward the restriction position (first position) is restricted, and the spacer 510 is maintained in the permission position (second position).

As shown in part (d) of FIG. 139, also when the separation control member 540 returns to the home position with the developing unit 9 in the developing position and the spacer 510 in the permission position, the gap T3 is formed between the force receiving portion 510*e* (contact force receiving portion) of the spacer 510 and the second force application surface (contact force applying portion) 540*c* of the separation control member 540. Similarly, the gap T4 is formed between the retracting force receiving portion (separation force receiving portion) 533*a* and the first force application surface (separation force applying portion) 540*b*. That is, the separation control member 540 becomes in a non-contact state with the process cartridge P and is not subjected to a load.

By moving the separation control member 540 from the home position to the first position in this manner, the spacer 510 is moved from the restriction position to the permission position, and the developing unit 9 is moved from the retracted position to the development position in which the developing roller 9 and the photosensitive drum 4 contact with each other.

The force receiving portion 510*e* is a force for moving the spacer 510 from the restriction position (first position) to the permission position (second position), it can be said that the force (contact force) for moving the developing unit 9 and the developing frame from the retracted position (separation position) to the developing position is received from the separation control member 540.

With the developing unit 9 in the contact position (development position), the position of the developing unit 9 relative to the drum unit 8 is determined by being urged in the V2 direction by the drive torque received from the image forming apparatus main assembly 502 and the developing unit urging spring 134 and by the developing roller 6 contacting the photosensitive drum 4. Therefore, the photosensitive drum 4 can be said to be a positioning portion (second positioning portion) for positioning the developing roller of the developing unit 9 at the developing position. At this time, it can be said that the developing unit 9 is stably held by the drum unit 8. At this time, the spacer 151R in the separation release position is not directly concerned in the positioning of the developing unit 109. However, it can be said that the spacer 510 creates a situation in which the drum unit 8 can stably hold the developing unit 9 at the contact position (development position) by moving from the separation holding position to the separation release position.

[Separation Operation]

Subsequently, the operation of moving the developing unit 9 from the developing position to the retracting position will be described referring to FIG. 140. FIG. 140 is a view of the process cartridge P placed at the second inner position inside the image forming apparatus main assembly 502, as viewed from the drive-side, as in FIG. 139. For better illustration, the drive-side cartridge cover 520 is with the omission of parts other than the contacted portion 520*c* and the spacer restriction surface 520*d*. Part (a) of FIG. 140 shows a state in which the developing unit 9 is in the developing position and the separation control member 540 is in the home position. Part (b) of FIG. 140 shows a state in which the developing unit 9 is moving from the developing position to the retracted position. Part (c) of FIG. 140 shows a state in which the developing unit 9 is in the retracted position.

The separation control member 540 of this embodiment is structured to be movable from the home position in the direction of the arrow W51 in part (a) of FIG. 140. When the separation control member 540 moves in the W51 direction, the first force application surface 540*b* and the retracting force receiving portion (separation force receiving portion) 533*a* of the development cover member 533 come into contact with each other, and the retracting force receiving portion 533*a* moves at least in the W51 direction, and therefore, the developing unit 9 rotates in the direction of arrow V1 in FIG. 140. That is, the developing unit 9 moves from the developing position toward the retracted position (separated position) against the urging force of the developing unit urging spring 134. Thus, the W51 direction is a direction in which the retracting force receiving portion 533*a* at least moves by receiving a force from the first force application surface 540*b* in order to move the developing unit 9 from the developing position to the retracting position, and it can be called a retracting direction (separation direction). Then, as the developing unit 9 rotates in the direction of the arrow V1 in part (a) of FIG. 140, the restricted surface 510*k* of the spacer 510 and the spacer restriction surface 520*d* of the drive-side cartridge cover 520 are separated from each other. Therefore, the spacer 510 is rotated in the direction of the arrow B1 (direction from the permission position to the restriction position) in part (a) of FIG. 140 by the urging force of the tension spring 530. The spacer 510 rotates until the first restricted surface 510*h* comes into contact with the first restriction surface 533*h* of the development cover member 533, and moves to the restriction position (first position). When the developing unit 9 is moved from the developing position to the retracted position by the separation control member 540 and the spacer 510 is placed at the restriction position (first position), the gap T5 is formed between the contact surface 510*c* and the contacted surface 520*c*, as shown in part (b) of FIG. 140. Here, the position of the separation control member 540 shown in part (b) of FIG. 140 in which the developing unit 9 is rotated from the developing position toward the retracted position and the spacer 510 can be moved to the restriction position is referred to as a second position.

Further, when the separation control member 540 moves from the second position in the direction of the arrow W52 in part (b) of FIG. 140 and returns to the home position, the developing unit 9 rotates in the direction of the arrow V2 in FIG. 140 by the moment in the arrow V2 direction shown in FIG. 140 so that the contact surface 510*c* and the contacted portion 520*c* come into contact with each other. At this time, the spacer 510 is still maintained in the restriction position by the urging force of the tension spring 530. Therefore, the developing unit 9 is in a state where the retracting position is restricted by the spacer 510, and the developing roller 6 and the photosensitive drum 4 are spaced by the gap T2 (part (c) of FIG. 140). The moment in the V2 direction is produced by the urging force of the developing unit urging spring 134 and the driving force received by the development coupling member 74 from the image forming apparatus main assembly 502. That is, the developing unit 9 is restricted by the spacer 510 in the movement to the contact position against the driving force received from the image forming apparatus main assembly 502 and against the moment (urging force) in the arrow V2 direction by the urging of the development pressure spring 134, and is maintained in the separation position.

As described above, It can be said that the retracting force receiving portion (separation force receiving portion) 533*a* receives, from the separation control member 540, a force (retracting force, separation force) for moving the spacer 510 from the permission position (second position) to the restriction position (first position), for moving the developing unit 9 and the developing frame from the developing position to the retracting position (spaced position).

Further, as shown in part (c) of FIG. 140, when the separation control member 540 returns to the home position while the developing unit 9 is in the retracted position and the spacer 510 is in the restriction position, the gap T3 is formed between the force receiving portion (contact force receiving portion) 510*e* of the spacer 510 and the second force application surface (contact force applying portion) 540*c* of the separation control member 540. Similarly, the gap T4 is formed between the retracting force receiving portion (separating force receiving portion) 533*a* and the first force application surface (spacing force applying portion) 540*b*. That is, the separation control member 540 becomes in a non-contact state relative to the process cartridge P and is not subjected to a load.

As described above, in this embodiment, the spacer 510 moves from the permission position to the restriction position by moving the separation control member 540 from the home position to the second position. Then, by the separation control member 540 returning from the second position to the home position, the developing unit 9 becomes in a state of maintaining the retracted position by the spacer 510. That is, in this embodiment, the spacer 510 is in the restriction position, and the contact surface 510*c* and the contacted portion 520*c* are in contact with each other even when the retracting force receiving portion (separation force receiving portion) 533*a* and the first force application surface (separating force applying portion) 540*b* are separated from each other. Therefore, it is possible to restrict the developing unit 9 in moving to the developing position and maintain it in the retracted position (separated position).

In order to perform the above-mentioned contact operation and separation operation, the width between the force receiving portion 510*e* and the retracting force receiving portion 533*a* in the W51 direction or the W52 direction when the developing unit 9 is in the separated position is preferably 3.5 mm or more, and is further preferably 18.5 mm or less, even further preferably 10 mm or less. With such a dimensional relationship, it is possible to perform an appropriate contact operation and separation operation.

With the developing unit 9 in the separated position (retracted position), the position of the developing unit 9 relative to the drum unit 8 is determined by being urged in the V2 direction by the driving torque received from the image forming apparatus main assembly 502 and the developing unit urging spring 134, by the contact between the supported portion 510*a* and the supporting portion 533*c* and by the contact between the contact portion 510*c* and the contacted portion 520*c*. Therefore, the contacted portion 520*c* can be said to be a positioning portion (first positioning portion) for positioning the developing unit 9 when the photosensitive drum 4 is in the spaced position (retracted position). At this time, it can be said that the developing unit 9 is stably held by the drum unit 8. Further, it can be said that the spacer 510 at the restriction position (first position) creates a situation in which the drum unit 8 can stably hold the developing unit 9 at the spaced position (retracted position).

In this embodiment, by moving the separation control member 540 between the home position, the first position, and the second position in one direction (W51, W52), the contact/separation state between the developing roller 6 and the photosensitive drum 4 can be controlled. Therefore, the developing roller 6 can be brought into contact with the photosensitive drum 4 only when the image is formed, and the developing roller 6 can be maintained in a state of being spaced from the photosensitive drum 4 when the image is not formed. Therefore, even if the image is left for a long time without forming an image, the developing roller 6 and the photosensitive drum 4 are not deformed, and therefore, a stable image forming operation can be accomplished.

Further, in the process cartridge P, as viewed along the rotation axis M1 of the photosensitive drum 4 or the rotation axis M2 of the developing roller 6, the retracting force receiving portion (separation force receiving portion) 533*a* and the force receiving portion (contact force receiving portion) 510*e* are opposed to each other with a space formed therebetween. That is, in the W51 direction (or W52 direction), the retracting force receiving portion (separation force receiving portion) 533*a* and the force receiving portion (contact force receiving portion) 510*e* are arranged so as to form a gap therebetween. Further, regardless of whether the developing unit 9 is in the developing position or the retracting position, the retracting force receiving portion (separation force receiving portion) 533*a* is closer to the rotation axis M1 of the photosensitive drum 4 than the force receiving portion (contact force receiving portion) 510*e*, as viewed along the rotation axis M1 of the photosensitive drum 4 or the rotation axis M2 of the developing roller 6.

With such an arrangement, in the separation control member 540, one control portion 540*a* which is one projection projecting toward the process cartridge P is enough, the control portion 540*a* having the first force application surface (separation force applying portion) 540*b* and the second force application surface (contact force applying portion) 540*c*. For this reason, the stiffness required for the first force application surface 540*b* and the second force application surface 540*c* to act on the process cartridge P can be provided in one place of the control portion 540*a*, and the entire separation control member 540 or the control can be provided can be downsized. By this, the apparatus main assembly 502 can be downsized. Further, the cost can be reduced by reducing the volume of the separation control member 540 itself.

In addition, when the separation control member 540 is in the home position, no load is applied to the control portion 540*a* from the process cartridge P, so that the rigidity required for the mechanism for operating the separation control member 540 and the separation control member 540 can be reduced, and therefore, the downsizing can be accomplished correspondingly. Further, the load on the sliding portion of the mechanism for operating the separation control member 540 is also reduced, and therefore, wearing of the sliding portion and generation of abnormal noise can be suppressed.

Further, the first force application surface 540*b* of the control portion 540*a* directly presses the retracting force receiving portion 533*a* of the developing member b-member 533 fixed to the developing unit 9, so that the developing unit 9 is moved from the developing position to the retracting position. Therefore, the sliding friction at the time when moving the developing unit 9 from the developing position to the retracted position can be minimized, and therefore, the load applied to the control portion 540*a* can be further reduced.

Further, conventionally, the developing unit has a structure in which the developing unit is positioned at the retracted position by contact between the developing unit and the separation control member of the apparatus main assembly, and a positional error between the developing unit and the separation control member at the retracted position occurs by a position error due to a component tolerance or the like. Then, the position error of the retracted position causes a variation in the amount of separation between the developing roller and the photosensitive drum. In preparation for such a positional error in the retracted position of the developing unit, it is necessary to design the spacing amount so that the developing roller and the photosensitive drum can be sufficiently spaced even if the positional error occurs. Further, it is necessary to design a large gap or the like between the developing unit at the retracted position and another member in preparation for the positional error of the retracted position.

On the other hand, in this embodiment, the retracted position of the developing unit 9 is determined by the spacer 510, and therefore, the positional error between the separation control member 540 and the developing unit 9 is not influential. Therefore, since the position error at the retracted position of the developing unit 9 is reduced, the variation in the spacing amount between the developing roller 6 and the photosensitive drum 4 is also reduced correspondingly, and the spacing amount can be designed to be smaller. Since the amount of spacing can be reduced, the amount of movement of the developing unit 9 from the developing position to the retracted position is also small, and the process cartridge can be downsized. Further, the space for placing the process cartridge P in the main assembly can be reduced, and the image forming apparatus can be downsized. Alternatively, the space of the developing material accommodating portion 29 of the developing unit 9 can be increased, and the large-capacity process cartridge P can be placed in the image forming apparatus main assembly 502. Further, the gap between the developing unit 9 at the retracted position and another member (the drum unit 8, for example) can be designed to be smaller as the positional error at the retracted position is reduced.

Further, the spacer 510 is disposed on the same side with respect to the rotation axis direction of the development coupling 74 and the developing roller 6. By this, in the case that the developing unit 9 is restricted to the retracted position, the amount of deformation of the developing unit 9 by the moment received from the image forming apparatus main assembly 502 when the driving force is transmitted to the development coupling 74 can be reduced.

Further, the force receiving portion 510*e* of the spacer 510 is disposed on the same side as the photosensitive member coupling member 43 with respect to the rotation axis of the photosensitive member coupling member 43. By this, the timing at which the spacer 510 is moved from the regulated position to the permission position and the developing roller 6 is brought into contact with the photosensitive drum 4 which is rotating can be performed more accurately.

In this embodiment, the urging force of the tension spring 530 is used as a means for moving the spacer 510 from the permission position to the restriction position, but this disclosure is not limited to such an example. In another embodiment, as shown in FIG. 144, there is no spring 530 provided which urges the spacer 510 from the permission position towards the restriction position. In this embodiment, a spacer 710 moves from the permission position to the restriction position by rotation due to its own weight. When the developing unit 9 is moved from the developing position to the retracted position, the spacer 710 of FIG. 144 rotates in the direction B1 in part (a) of FIG. 144 due to its own weight, and moves from the permission position to the regulated position.

[Arrangement Details—Part 1]

Subsequently, referring to FIG. 141, the arrangement of the spacer 510 will be described in detail. FIG. 141 is a view of the process cartridge P as viewed from the drive-side along the direction of the rotation axis of the photosensitive drum 4. The developing unit 9 is placed at the retracted position, and the spacer 510 is placed at the restriction position. Further, for better illustration, the drive-side cartridge cover 520 is shown by omitting portions other than the contacted portion 520*c* and the spacer restriction surface 520*d*.

As shown in FIG. 141, the rotation axis (rotation center) of the photosensitive drum 4 is M1, the rotation axis (rotation center) of the developing roller 6 is M2, and the straight line connecting the rotation axis M1 of the photosensitive drum 4 the axis (center of rotation) K of the development coupling member 74 is line N1. In this embodiment, the rotation axis of the photosensitive member coupling member 43 is coaxial with the rotation axis M1. When the region is divided with the line N1 as the boundary, the rotation axis M2 of the developing roller 6 and the force receiving portion 510*e* are in the same side with respect to the line N1 as the boundary. Further, the distance between the rotating axis K of the development coupling member 74 and the rotating axis M2 of the developing roller 6 is e1, and the distance between the rotating axis K of the development coupling member 74 and the force receiving portion 510*e* is e2. In this case, the force receiving portion 510*e* is disposed so that the distance e2 is larger than the distance e1.

By disposing the force receiving portion 510*e* in this manner, the force, received from the image forming apparatus main assembly 502 by the force receiving portion 510*e*, for moving the spacer 510 from the restriction position to the permission position can be converted into a force for bringing the developing roller 6 into contact with the photosensitive drum 4. That is, when the spacer 510 is moved from the restriction position to the permission position, the developing roller 6 can be brought into contact with the photosensitive drum 4 more quickly, so that the timing at which the developing roller 6 is brought into contact with the rotating photosensitive drum 4 can be controlled with higher accuracy.

[Arrangement Details—Part 2]

Subsequently, referring to FIG. 143, the arrangement of the spacer 510 will be described in detail. FIG. 143 is a view of the process cartridge P as viewed from the drive-side along the direction of the rotation axis M1 of the photosensitive drum 4 or the rotation axis M2 of the developing roller. The developing unit 9 is placed at the developing position, and the spacer 510 is placed at the permission position. Further, for better illustration, the drive-side cartridge cover 520 is shown by omitting portions other than the contacted portion 520*c* and the spacer restriction surface 520*d*.

As shown in FIG. 143, the straight line connecting the rotation axis M1 of the photosensitive drum 4 and the rotation axis M2 of the developing roller 6 is line N2. When the region is divided by the line N2 (the upper side is a region AU1 and the lower side is a region AD1), at least a part of the force receiving portion 510*e* and at least a part of the retracting force receiving portion 533*a* are disposed in the region AD1 which is opposite to the region in which the rotation axis K of the development coupling member 74 exists. That is, at least a part of the force receiving portion 510*e* and at least a part of the retracting force receiving portion 533*a* are disposed in the region AD1 which is opposite to the region AU1 in which the rotation center K of the development coupling member 74 is provided. As described in the Embodiment 1, in the region AU1, the structure for movably supporting the developing unit 9 relative to the drum unit 8 and a driving member for driving the members provided in the developing unit 9 are provided. Therefore, it is possible to provide an efficient layout that avoids interference between the members by disposing at least a part of the force receiving portion 510*e* and at least a part of the retracting force receiving portion 533*a* in the region AD1 rather than in the region AU1. This is contributable to downsizing of the process cartridge 100 and the image forming apparatus M.

Further, a line perpendicular to the line N2 and passing through the contact point between the developing roller 6 and the photosensitive drum 4 is a line N3. When the region is divided by the line N3, at least a part of the force receiving portion 510*e* and at least a part of the retracting force receiving portion 533*a* are disposed in the region which is opposite to the region in which the rotation axis M1 of the photosensitive drum 4 exists, with respect to the line N3 as a boundary.

In the foregoing description, when the region is divided by the straight line N2 as viewed in the direction along the rotation axis M2, the regions AU1 and AD1 are the regions where the rotation axis K or the development coupling 32 is disposed, and the regions where the development coupling is not arranged, respectively. However, as another definition, when the region is divided by the straight line N2 as viewed in the direction along the rotation axis M2, the regions AU1 and the region AD1 may be defined as region where the charging roller 5 or the rotation axis M5 of the charging roller 5 or is disposed, and the region where it is not disposed.

As yet another definition, as the region is divided by the straight line N2 as viewed in the direction along the rotation axis M2, the region AU1 and the region AD1 may be defined as a region in which the developing blade 30, the proximity point 30*d* (see FIG. 240), and the stirring member 29*a* (FIG. 240) are provided and the region in which it is not provided. The proximity point 30*d* is the position closest to the surface of the developing roller 6 of the developing blade 30.

In an ordinary electrophotographic cartridge, particularly a cartridge usable with an in-line layout image forming apparatus, it is relatively difficult to arrange other members of the cartridge in the region AD1. Further, if the force receiving portion 510*e* and the retracting force receiving portion 533*a* are arranged in the region AD1, the apparatus main assembly 502 also has the following advantage. That is, the separation control member 540 of the apparatus main assembly 502 is arranged under the cartridge P and moved in the substantially horizontal direction (in this embodiment, the W51 and W52 directions and the arrangement direction of the photosensitive drum 4 or the cartridge P) to press the force receiving portion 510*e* and the retracting force receiving portion 533*a*. With such a structure, the separation control member 540 and the drive mechanism therefor can be of a relatively simple and small size structure. This is particularly remarkable in the in-line layout image forming apparatus. In this manner, disposing the force receiving portion 510*e* and the retracting force receiving portion 533*a* in the region AD1 can be expected to contribute to the downsizing and cost reduction of the apparatus main assembly 502.

The arrangement of the force receiving portion 510*e* and the retracting force receiving portion 533*a* has been described referring to FIG. 143 showing the cartridge P in the contact state, but the same relationship also applies to the cartridge P in the separated state as will be apparent from other Figures. Although Figure shows the cartridge P in the contact state, the arrangement of the force receiving portion 510*e* and the retracting force receiving portion 533*a* is the same as that described above.

Further, assuming that the direction perpendicular to the straight line N2 is the VD1 direction, the projecting portion 510*d* provided with the force receiving portion 510*e* and the retracting force receiving portion 533*a* in the form of the projecting portion are disposed at positions such that they are projected from the developing unit 9 at least in the direction VD1, when the movable member 152R is in the operating position. Therefore, the force receiving portion 510*e* and the retracting force receiving portion 533*a* can be arranged so that the first force application surface 540*b* of the separation control member 540 is contactable to the retracting force receiving portion 533*a* and so that the second force application surface 540*c* is contactable to the force receiving portion 510*e*. The same applies to the structure on the non-drive-side.

Further, the diameter of the developing roller 6 of this structure is smaller than the diameter of the photosensitive drum 4. By arranging the force receiving portion 510*e* in this manner, it can be disposed in a small space so that the drive transmitting portion (not shown) and the photosensitive drum 4 including the gear trains and the like for transmitting the driving force from the development coupling member 74 to the developing roller 6 are avoided. By this, the process car cartridge P can be downsized.

In the contact operation shown in part (b) of FIG. 139, the force receiving portion 510*e* receives a force (external force) from the second force application surface 540*c* of the separation control member 540 in a region opposite to the region in which the rotation axis M1 of the photosensitive drum 4 exists, with the line N3 as a boundary. The direction of the force received by the force receiving portion 510*e* from the second force application surface 540*c* (W52 direction) is the direction in which the developing unit 9 moves from the retracted position to the developing position. Therefore, the developing unit 9 can be moved more reliably from the retracted position to the developing position by the force received by the force receiving portion 510*e* from the second force application surface 540*c*.

[Arrangement Details—Part 3]

Referring to FIGS. 240 and 241, a concept similar to the concept of arranging at least a part of each of the force receiving portion 510*e* and the retracting force receiving portion 533*a* in the region AD1 as described above will be described.

FIGS. 240 and 241 are illustrations of the process cartridge P as viewed from the drive-side along the rotation axis M1 of the developing unit 9, the rotation axis K, or the rotation axis M2, Figure shows a separated state, and FIG. 241 shows a contact state. Since the arrangement of the spacer 510 described in the following is almost the same in the contact state and the separation state, only the separation state will be described referring to FIG. 240, and the description in the contact state will be omitted.

The rotation axis of the toner feeding roller (developer supply member) 107 is a rotation axis (rotation center) M6. Further, the process cartridge 100 includes a stirring member 108 which rotates and stirs the developer contained in the developing unit 109, and the rotation axis thereof is a rotation axis (rotation center) M7.

In FIG. 236, the intersection of the straight line N10 connecting the rotation axis M5 and the rotation axis M5 and the surface of the photosensitive drum 104, whichever is more remote from the rotation axis M5, is an intersection MX1. The tangent line to the surface of the photosensitive drum 104 passing through the intersection MX1 is a tangent line (predetermined tangent line) N11. The region is divided by the tangent line N11 as a boundary, and the region containing the rotation axis M1, the charging roller 105, the rotation axis M5, the development coupling portion 132*a*, the rotation axis K, the developing blade 130, the proximity point 130*d*, the toner feeding roller 107, the rotation axis M6, and the stirring member 129*a*, the rotation axis M7, or the pressed surface 152Rf is arranged is a region AU2, and the region where they do not exist is a region (predetermined region) AD2. Further, the regions AU2 and AD2 may be defined in another way as follows. That is, assuming that the direction parallel to the direction from the rotation axis M5 to the rotation axis M1 and orientating the same is VD10, the most downstream portion of the photosensitive drum 104 with respect to the direction VD10 is the intersection MX1. Then, with respect to the direction VD10, the region on the upstream side of the most downstream portion MX1 is the region AU2, and the region on the downstream side is the region (predetermined region) AD2. Regardless of such expression, the defined regions AU2 and AD2 are the same.

Then, at least a part of each force receiving portion 152Rk and 152Rn is disposed in the region AD2. As described above, arranging at least a part of each of the force receiving portions 152Rk and 152Rn in the region AD2 can be expected to contribute to the downsizing and cost reduction of the process cartridge 100 and the apparatus main assembly 170. This is for the same reason as when at least a part of each of the force receiving portions 152Rk and 152Rn is arranged in the region AD1. The same applies to the structure on the non-drive-side.

Further, the movable member 152R and the force receiving portions 152Rk and 152Rn are displaced at least in the VD10 direction by moving in the ZA direction and the opposite direction. By such displacement in the VD10 direction, when the process cartridge is inserted into or removed from the apparatus main assembly 170, it is possible to avoid that the movable member 152R and the force receiving portions 152Rk and 152Rn interfere with the separation control member 196R with the result of incapability of insertion and removal of the process cartridge 100. The same applies to the structure on the non-drive-side.

Further, let the direction perpendicular to the straight line N11 be VD10, the projecting portion 510*d* provided with the force receiving portion 510*e* and the retracting force receiving portion 533*a* in the form of the projecting portion are disposed at a position such that they are projected from the developing unit 9 at least in the VD10 direction, when the movable member 152R is in the operating position. Therefore, the force receiving portion 510*e* and the retracting force receiving portion 533*a* can be disposed so that the first force application surface 540*b* of the separation control member 540 is contactable with the retracting force apply surface 533*a* and so that the second force application surface 540*c* is contactable with the force receiving portion 510*e*. The same applies to the structure on the non-drive-side.

The arrangement relationship of each force receiving portion described above has the same relationship in all the examples described in the following.

Another Example 1 of Embodiment 9

In this embodiment, the spacer 510 is supported by the developing unit 9, but this disclosure is not limited to such an example. As another example 1, as shown in FIG. 145, the spacer 910 is supported by providing the drive-side cartridge cover member 920 of the drum unit 8 with a boss (support portion) 920*a* and inserting it into the hole (supported portion) of the spacer 910. In this example, when the spacer 910 is in the restriction position (first position), the contact portion 910*c* of the spacer 910 can contact the contacted portion provided on the developing frame (second frame) of the developing unit (second unit) 9 (not shown). When the contact portion 910*c* and the contacted portion (not shown) are in contact with each other, the developing unit 9 is positioned with the attitude in which the developing roller 6 and the photosensitive drum 4 are separated by a gap T2 (the developing unit 9 is in the retracted position). When the separation control member 540 moves in the W52 direction from the state where the developing unit 9 is in the retracted position (separated position), the second force application surface 540*c* of the control portion 540*a* and the force receiving portion 910*e* of the spacer 910 brought into contact with each other, so that the spacer 510 rotates in the direction of arrow B2 in FIG. 145. The spacer 910 which rotates in this manner moves to an permission position (second position) where the contact surface 910*c* and the contacted portion (not shown) of the developing unit 9 are spaced from each other. When the spacer 910 is moved to the permission position by the separation control member 540, the developing unit 9 is rotated by the moment received from the image forming apparatus main assembly 502 and the urging force of the developing unit urging spring 134, so that the developing unit 9 is moved to the developing position (contact position) in which the developing roller 6 and the photosensitive drum 4 are in contact with each other Further, the developing unit 9 in said another example 1 has the same structure as in embodiment 1 shown in FIG.

129 and so on, except for the structure of the spacer 910 and the structures contacting it, for example, the developing unit 9 includes the retracting force receiving portion 533*a* at the same position as that of the retracting force receiving portion 533*a* of embodiment 1 shown in FIG. 129 and so on.

Therefore, also in said another example 1, the straight line connecting the rotation axis M1 of the photosensitive drum 4 and the rotation axis M2 of the developing roller 6 is the line N2. When the region is divided by the line N2, at least a part of the force receiving portion 910*e* and at least a part of the retracting force receiving portion 533*a* are disposed in the region opposite to the region having the rotation axis K of the development coupling member 74 with the line N2 as the boundary. Further, a line perpendicular to the line N2 and passing through the contact point between the developing roller 6 and the photosensitive drum 4 is the line N3. When the region is divided by the line N3, at least a part of the force receiving portion 910*e* and at least a part of the retracting force receiving portion 533*a* are disposed in the region opposite to region having the rotation axis M1 of the photosensitive drum 4 with the line N3 as a boundary.

Another Example 2 of Embodiment 9

In Embodiment 9, the swing axis of the developing unit 9 and the rotation axis K of the development coupling member 74 are arranged coaxially, but the present invention is not limited to such an example. As another Example 2, as shown in FIG. 147, a supported hole 1333*f* may be provided in the development cover member 1333, a supporting portion 1315*b* may be provided on the drum frame 1315, the developing unit 9 may be made rotatable relative to the drum unit about the supporting portion 1315*b*. The engaging portion 74*a* is engageable with the main assembly side coupling member (not shown) of the development coupling member 74. In this example, the engaging portion 74*a* is provided with an axis eccentricity mechanism (Oldham coupling mechanism) for permitting axis eccentricity toward a circumference of a circle having a center on the support portion 1315*b*, relative to the other portion of the developing unit 9 (particularly the portion arranged on the downstream side in the drive transmission path) by this, the engagement between the development coupling member 74 and the main assembly side coupling member can be maintained regardless of whether the developing unit 9 is in the retracted position or the developing position.

Further, in place of the above-mentioned axis eccentricity mechanism (Oldham joint mechanism), the structure may be the one with which the engaging portion 74*a* of the development coupling member 74 allows the axis eccentricity with respect to the main assembly side coupling member and the driving force is transmitted at that time at the time when the axis eccentricity is eliminated (coaxial state is established). Alternatively, a mechanism may be employed in which when the engaging portion 74*a* is deviated with respect to the main assembly side coupling member, at least one of the engaging portion 74*a* and the main assembly side coupling member retracts in the axial direction with respect to the other, and when the axial deviation is eliminated (coaxial state is reestablished), the retraction is eliminated.

Another Example 3 of Embodiment 9

In the Embodiment 9 described above, the developing unit 9 swings about the swing axis K with respect to the drum unit 8 to move between the developing position (contact position) and the retracted position (separation position). However, the movement of the developing unit 9 between the developing position and the retracted position is not limited to swinging or rotating with respect to the drum unit 8. That is, in Embodiment 9, the developing unit 9 moves in a predetermined direction with respect to the drum unit 8 (for example, linear movement), by which the developing unit 9 moves between the development position and the retracted position, in modified example 3. Specifically, as shown in FIG. 148, it is possible that the supporting hole 1320*a* of the drive-side cartridge cover member 1320 has an oblong round hole shape with longitudinal direction thereof being the X1 direction (or X2 direction), so that the developing unit 9 is translated in the directions indicated by arrows X1 and X2 in FIG. 33, by which it is moved between the development position (contact position) and the retracted position (separation). Also in this modified example, as in alternative example 2 of the Embodiment 9, the engaging portion 74*a* includes an axis eccentricity mechanism (Oldham joint mechanism) which allows axis eccentricity in in the X2 direction (or the X1 direction) direction relative to the other portion of the developing unit (particularly the portion on the downstream side in the drive transmission path).

Further, in place of the above-mentioned axis eccentricity mechanism (Oldham joint mechanism), such a structure may be such that while the engaging portion 74*a* of the development coupling member 74 permits the axial eccentricity relative to the main assembly side coupling member, the driving force is transmitted at that time when the axis eccentricity is eliminated (becomes coaxial). Alternatively, a mechanism may be provided so that in the case that the engaging portion 74*a* is deviated relative to the main assembly side coupling member, at least one of the engaging portion 74*a* and the main assembly side coupling member retracts in the axial direction relative to the other, and when the eccentricity is eliminated (when they become coaxial), the retraction is released.

Embodiment 10

Referring to FIG. 149, the process cartridge and the image forming apparatus according to Embodiment 10 of the present disclosure will be described. Members having the same functions or structures as in Embodiment 9 are assigned by the same reference numerals, and detailed description thereof will be omitted. The process cartridge of this embodiment differs from that of Embodiment 9 only in the structure of the spacer and its surroundings, and the other portions are the same. The image forming apparatus is also the same as that of Embodiment 9.

In this embodiment, the spacer 610 is supported by the development cover member 533 as in Embodiment 9. On the other hand, the spacer 610 includes not only the force receiving portion (contact force receiving portion) 610*e* but also includes the retracting force receiving portion (separation force receiving portion) 610*m* as another force receiving portion which receives the force from the first force application surface 540*b*. FIG. 149 is a view of the process cartridge P placed at the second inner position inside the image forming apparatus main assembly 502, as viewed from the drive-side. For better illustration, the drive-side cartridge cover 520 is shown by omitting portions other than the contacted portion 520*c* and the spacer restriction surface 520*d*. Part (a) of FIG. 149 shows a state in which the developing unit 9 is in the developing position and the separation control member 540 is in the home position. Part (b) of FIG. 149 shows a state in which the developing unit 9 is in the process of moving from the developing position to the retracted position. Part (c) of FIG. 149 shows a state in which the developing unit 9 is in the retracted position.

The separation control member 540 is structured to be movable from the home position in the direction of the arrow W51 in part (a) of FIG. 149. When the separation control member 540 moves in the W51 direction, the first force application surface 540*b* and the retracting force receiving portion 610*m* of the spacer 610 are brought into contact with each other, and the spacer 610 rotates in the direction of the arrow B1 in part (a) of FIG. 149. During this rotation, the spacer 610 remains in contact with the spacer restriction surface 520*d* or the contacted portion 520*c*. Therefore, as the spacer 610 rotates, the distance between the spacer restricting surface 520*d* of the spacer 610 or the contact portion with the contacted portion 520*c* and the swing axis H of the spacer 610 increases. Therefore, the developing unit 9 rotates in the direction of arrow V1 in FIG. 149, and the developing unit 9 moves from the developing position to the retracted position. Further, as the developing unit 9 rotates in the direction of the arrow V1 in part (a) of FIG. 149, the spacer 610 separates from the spacer restriction surface 520*d* and the contacted portion 520*c* of the drive-side cartridge cover 520, and the spacer 610 is further rotates in the direction of the arrow B1 in shown in part (a) of FIG. 149. The spacer 610 rotates until the first restricted surface 610*h* comes into contact with the first restriction surface 533*h* of the development cover member 533, and reaches the restriction position. After the spacer reaches the restriction position, the first restricted surface 610*h* presses the first restriction surface 533*h*, so that the developing unit 9 rotates in the direction of arrow V1 in FIG. 149. Then, after the separation control member 540 moves to the second position, when it moves in the direction of the arrow W52 in part (b) of FIG. 149 and returns to the home position, the developing unit 9 maintains the separation position as in embodiment 9 by the spacer 610 placed at the restriction position.

Further, similarly to Embodiment 9, the straight line connecting the rotation axis M1 of the photosensitive drum 4 and the rotation axis of the developing roller 6 to M2 is a line N2. When the region is divided by the line N2, at least a part of the force receiving portion 610*e* and at least a part of the retracting force receiving portion 610*m* are disposed in the region opposite to the region including the rotation axis K of the development coupling member 74 with the line N2 as the boundary. Further, a line perpendicular to the line N2 and passing through the contact point between the developing roller 6 and the photosensitive drum 4 is the line N3. When the region is divided by the line N3, at least a part of the force receiving portion 610*e* and at least a part of the retracting force receiving portion 610*m* are disposed in the region opposite to the region having the rotation axis M1 of the photosensitive drum 4 with the line N3 as a boundary.

According to the structure of this embodiment described above, the same effects as those of the first and Embodiment 9s can be provided. Further, in this embodiment, since the force receiving portion 610*e* and the retracting force receiving portion 610*m* are the integral spacer 610, the distance between the force receiving portion 610*e* and the retracting force receiving portion 610*m* can be disposed more accurately. Therefore, the switching timing between the developing position and the retracting position of the developing unit 9 can be made accurate.

Further, in this embodiment, the spacer 610 can be moved from the permitting position to the restriction position by receiving a force for the retracting force receiving portion 610*m* to rotate in the direction of arrow B1 from the first force application surface 540*b*, the tension spring 530 used in embodiment 9 is not provided. Therefore, in the structure of this embodiment, the cost of the process cartridge can be reduced or the size can be reduced by the amount occupied by the tension spring 530 in the structure as compared with the Embodiment 9. However, similarly to the tension spring 530, a spring which is an elastic member may be provided as a developing frame urging member which urges the spacer 610 to rotate in the direction of arrow B1.

Embodiment 11

Referring to Figures and 151, an image forming apparatus according to the Embodiment 11 of the present disclosure will be described. Members including the same structure and function as in the Embodiment 9 are designated by the same reference numerals, and detailed description thereof will be omitted.

The process cartridge P of the Embodiment 9 is provided with two input portions including the development coupling member 74 which receives a driving force from the image forming apparatus main assembly 502 and transmits the driving force to the developing roller and the photosensitive member coupling member 43 which transmits the driving force to the photosensitive drum 4. In this embodiment, one input portion receives a driving force from the image forming apparatus main assembly 502, and the driving force is branched in the process cartridge P to rotate the photosensitive drum 4 and the developing roller 6. Other than these points, the process cartridge and image forming apparatus of this embodiment are the same as those of Embodiment 9. In this embodiment, the example 1 and example 2 will be described.

Example 1

FIG. 150 is a perspective view of the structure of Example 1 of this Embodiment in which the developing unit 9 is provided with a coupling member 174. For better illustration, some members are omitted. The coupling member 174 is arranged on the drive-side and engages with a coupling (not shown) of the image forming apparatus main assembly 502 to receive a driving force. The coupling member 174 is rotatably supported by a development cover member 533 (a portion of the developing frame) similarly to the development coupling member of the Embodiment 9. The coupling member 174 transmits the driving force to the gear 801, the gear 801 transmits the driving force to the gear 802, and the gear 802 transmits the driving force to the developing roller 6. Further, the developing roller 6 transmits the driving force to the gear 803, and the gear 803 transmits the driving force to the gear 804. The gear 804 transmits a driving force to the photosensitive drum 4, by which the photosensitive drum 4 rotates. That is, the driving force received from the image forming apparatus main assembly 502 by the coupling member 174 is branched in the process cartridge to rotate the developing roller 6 and the photosensitive drum 4. Therefore, the coupling member 174 is a coupling member for receiving the driving force for rotationally driving the photosensitive drum 4.

As shown in FIG. 150, the spacer 510 and the force receiving portion 510*e* thereof is provided on the same side as the side on which the coupling member 174 is disposed with respect to the rotation axis direction of the developing roller 6. By arranging the spacer 510 and the force receiving portion 510*e* of the spacer 510 in this manner, the spacer 510 receives the moment produced by the driving force received by the coupling member 174 from the image forming apparatus main assembly 502, in the neighborhood. Therefore, the deformation of the developing unit 9 can be made smaller, and the distance between the developing roller 6 and the photosensitive drum 4 can be controlled with high accuracy.

Example 2

FIG. 151 is a perspective view of the structure of the Example 2 in which the drum unit 8 is provided with the coupling member 143. For better illustration, some members are omitted. The coupling member 143 is disposed on the drive-side (fixed to the end of the photosensitive drum on the drive-side) and receives a driving force from the image forming apparatus main assembly 502. The coupling member 143 is rotatably supported by a non-drive-side cartridge cover member 521 (a portion of the drum frame) similarly to the photosensitive member coupling member 43 of the Embodiment 9. The coupling member 143 transmits a driving force to the photosensitive drum 4, by which the photosensitive drum 4 rotates. Further, the photosensitive drum 4 transmits the driving force to the gear 804, and the gear 804 transmits the driving force to the gear 803. The gear 803 transmits a driving force to the developing roller 6, by which the developing roller 6 rotates. That is, the driving force received from the image forming apparatus main assembly by the coupling member 143 is branched in the process cartridge to rotate the developing roller 6 and the photosensitive drum 4. Therefore, the coupling member 143 is a coupling member for receiving a driving force for rotationally driving the developing roller 6.

As shown in FIG. 151, the spacer 510 and the force receiving portion 510*e* thereof is provided on the same side as the side on which the coupling member 143 is disposed with respect to the rotation axis direction of the developing roller 6. In this manner, the spacer 510 and the force receiving portion 510*e* of the spacer 510 are arranged. By this, the spacer 510 can be switched between the restriction position and the permission position with higher accuracy relative to the photosensitive drum 4 rotated by the driving force received from the image forming apparatus main assembly 502. Therefore, the timing at which the developing roller 6 is brought into contact with the photosensitive drum 4 and the timing at which it is spaced from the photosensitive drum 4 can be controlled with high accuracy.

According to the structure of this embodiment described above, the same effect as that of the Embodiment 9 can be provided.

Embodiment 12

Referring to FIGS. 152 and 153, an embodiment of the process cartridge and the image forming apparatus according to the Embodiment 12 of the present invention will be described. In this embodiment, structures and operations different from those of the above-described embodiments will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same. This embodiment is the same as embodiment 9 except for the structure and operation of the spacer.

FIG. 152 is a view of the process cartridge P placed at the second inner position inside the image forming apparatus main assembly 502 as viewed from the drive-side. For better illustration, the drive-side cartridge cover member 820 is shown by omitting portions other than the first contacted surface 820*c*. Part (a) of FIG. 152 shows a state in which the developing unit is placed at the retracted position. Part (b) of FIG. 152 shows a state in which the developing unit is moving from the retracted position to the developing position. Part (c) of FIG. 152 shows a state in which the developing unit 9 is placed at the developing position. FIG. 153 is a partial cross-sectional view taken along a plane passing through the line XX shown in Figure (c), and shows the spacer 810 from below the development cover member 833. Part (a) of FIG. 153 shows a state in which the developing unit 9 is in the retracted position. Part (b) of FIG. 153 shows a state in which the developing unit 9 is moving from the retracted position to the developing position. Part (c) of FIG. 153 shows the state in which the developing unit 9 is in the developing position. Part (d) of FIG. 153 shows a state in which the developing unit 9 is moving from the developing position to the retracted position.

The spacer (holding member, spacing member, restricting member) 810 is provided with a supported hole (supported portion) 810*a* which is a second contact portion, and a projecting portion (supporting portion) 810*b* projecting from the supported hole 810*a* in the radial direction of the supported hole 810*a*. Further, the spacer 810 is provided at the free end of the projecting portion (holding portion) 810*b*, and has a first contact surface (contact surface) 810*c* as a first contact portion that contacts the first contacted surface 820*c* of the drum unit 8. It has a third contact surface 810*k* adjacent to the contact surface 810*c*, a force receiving portion (contact force receiving portion) 810*e*, a spring-hooked portion 810*g*, and a first restricted surface 810*h*.

Further, the development cover member 833 is provided with a support portion 833*c* and a first restriction surface 833*h* as shown in FIG. 153. In the Embodiment 9, the spacer 510 has been described as being disposed on the side surface of the development cover member 533, whereas in this embodiment, the spacer 810 is disposed below the development cover member 833. The outer diameter portion of the support portion 833*c* fits with the inner diameter portion of the supported hole 810*a* of the spacer 810, and the support portion 833*c* rotatably supports the spacer 810.

Further, a retracting force receiving portion (separation force receiving portion) 826*a* which engages with the first force application surface 540*b* of the separation control member 540 is provided on the drive-side bearing 826. Further, a torsion coil spring 830 as a urging means is provided on the drive-side bearing 826, and one end of the torsion coil spring 830 is engaged with the spring-hooked portion 810*g*. Therefore, the spacer 810 is urged by the torsion coil spring 830 in the direction of arrow B81 in FIG. 153 with the swing axis 8H as the center.

[Separation Operation]

First, referring to FIG. 153, the operation of moving the developing unit 9 from the development position (contact position) to the retracted position (separation position) will be described.

As shown in part (c) of FIG. 153, when the developing unit 9 is at the developing position, the torsion coil spring 830 urges the spacer 810 in the direction of arrow B81 about the supported hole 810*a* as the center of rotation. When the developing unit 9 is at the developing position (contact position), the third contact surface 810*k* of the spacer engages with the drive-side cartridge cover 820, so that the spacer 810 is restricted from moving in the direction of the arrow B81 in part (c) of FIG. 153. The position of the spacer

810 shown in part (c) of FIG. 153 is an permission position (second position) of the spacer 810.

When the separation control member 540 moves in the direction of W51 in part (d) of FIG. 153 from the position shown in part (c) of FIG. 153, the first force application surface 540*b* and the retracting force receiving portion 826*a* of the drive-side bearing 826 come into contact with each other. Further, when the separation control member 540 moves in the W51 direction and moves to the second position, the developing unit 9 rotates in the direction of the arrow V1 in part (a) of FIG. 152 and moves in the direction from the developing position to the retracted position.

Then, when the developing unit 9 rotates in the direction of the arrow V1 in FIG. 152, the spacer 810 mounted to the developing unit 9 also moves in the direction toward the retracted position, and the third contact surface 810*k* of the spacer 810 and the drive-side cartridge cover 820 separate from each other.

As shown in part (d) of FIG. 153, when the first contact surface (contact portion) 810*c* and the first contacted surface (contacted portion) 820*c* are separated from each other with the result that a gap T5 is formed, the spacer 810 is rotated in the direction of the arrow B81 in part (d) of FIG. 153 by the urging force of the torsion coil spring 830. The spacer 810 rotates until the first restricted surface 810*h* provided on the same surface as the first contact surface 810*c* comes into contact with the first restriction surface 833*h* of the development cover member 833. The position of the spacer 810 shown in part (d) of FIG. 153 is a restriction position (first position).

Then, when the separation control member 540 moves from the second position in the direction of the arrow W52 in part (d) of FIG. 153 and returns to the home position, the developing unit 9 moves in the direction of the arrow V2 in part (b) of FIG. 152 and the first contact surface (contact portion) 810*c* of the spacer 810 placed in in the restriction position and the first contacted surface (contacted portion) 820*c* are brought into contact with each other, and the developing unit 9 is maintained at the retracted position (separated position), as shown in part (a) of FIG. 152 and part (a) of FIG. 153. At this time, as in Embodiment 9, the separation control member 540 is separated from the retracting force receiving portion 826*a*, and therefore, the developing unit 9 placed at the retracted position does not impart a load on the separation control member 540.

[Contact Operation]

Next, the operation of the developing unit 9 moving from the retracted position to the developing position will be described.

When the separation control member 540 moves from the home position in the direction of the arrow W52 in part (b) of FIG. 152, as shown in part (b) of FIG. 153, the second force application surface 540*c* of the separation control member 540 and the force receiving portion 810*e* of the spacer 810 are brought into contact with each other.

The force receiving portion 810*e* has a cam shape in which a plurality of surfaces are continuously connected. In this embodiment, the force receiving surface 810*e*1 and the force receiving surface 810*e*2 are continuously connected with each other. When the separation control member 540 moves in the direction of the arrow W52, the separation control member 540 comes into contact with the force receiving surface 810*e*1 to rotate the spacer 810 in the B82 direction against the urging of the torsion coil spring 830 in the direction of the arrow B81. The cam shape is profiled such that in the region where the separation control member 540 contacts the force receiving surface 810*e*1, the spacer 810 rotates in the direction of the arrow B82 as the separation control member 540 moves in the direction of the arrow W52.

Further, in the region where the separation control member 540 contacts the force receiving surface 810*e*2, the amount of rotation of the spacer 810 in the direction of arrow B82 is set to be small with respect to the movement of the separation control member 540 in the direction of arrow W52. By setting a region where the rotation amount of the spacer 810 is small, the spacer 810 is surely moved to an permission position by the movement of the separation control member 540, and the amount of rotation of the spacer 810 in the direction of arrow B82 by variation of the movement amount of the separation control member 540 is suppressed. Part (d) of FIG. 153 shows a state in which the separation control member 540 is in contact with the force receiving surface 810*e*2.

By the way, when the spacer 810 rotates in the direction of arrow B82, the region where the first contact surface 810*c* and the first contacted surface 820*c* come into contact with each other gradually decreases. Then, when the spacer 810 rotates in the direction of arrow B82 to an permission position where the first contact surface 810*c* and the first contacted surface 820*c* are separated from each other, the developing unit 9 rotates in the V2 direction in part (b) of FIG. 152 to move to the developing position where the developing roller 6 and the photosensitive drum 4 are in contact with each other as shown in part (c) of FIG. 152.

At this time, the spacer 810 urged in the direction of arrow B81 by the torsion coil spring is maintained in the permission position (second position) by the third contact surface 810*k* contacting the side surface side of the drive-side cartridge cover 820 as shown in part (c) of FIG. 153.

As shown in part (c) of FIG. 152 and FIG. 153(*c*), after the developing unit 9 moves to the contact position, the separation control member 540 returns to the home position and separates from the spacer 810 as in the Embodiment 9, and therefore, the developing unit 9 placed at the developing position does not impart a load on the separation control member 540.

As described above, in this embodiment, the spacer 810 is disposed below the development cover member 833 and is rotated in the direction of arrow B82 to move the first contact surface (contact portion) 810*c* relative to the first contacted surface 520*c* in the longitudinal direction of the process cartridge P. That is, by moving the first contact surface 810*c* relative to the first contacted surface 520*c* at least in the longitudinal direction of the process cartridge P (in the direction of the rotation axis M1 or the rotation axis M2), the spacer 810 is moved between the permission position (second position) and the restriction position (first position) in the longitudinal direction of the process cartridge P (the direction of the rotation axis M1 or the rotation axis M2).

According to the structure of this embodiment described above, the same effects as those of the first and Embodiment 9s can be provided.

Further, as has been described referring to FIG. 143, the straight line connecting the rotation axis M1 of the photosensitive drum 4 and the rotation axis M2 of the developing roller 6 is line N2. Also in this embodiment, when the region is divided by the line N2, at least a part of the force receiving portion 810*e* and at least a part of the retracting force receiving portion 826*a* are disposed in a region opposite to the region in which the rotation axis K of the development coupling member 74, with the line N2 as a boundary. Further, when the region is divided by the line N3 perpendicular to the line N2 and passing through the contact point between the developing roller 6 and the photosensitive drum 4, at least a part of the force receiving portion 810*e* and at least a part of the retracting force receiving portion 826*a* is disposed in the region opposite to the region in which the rotation axis M1 of the photosensitive drum 4 exists, with the line N3 as a boundary.

In this region, the force receiving portion 810*e* receives a force from the separation control member 540 provided in the main assembly as an external force. The direction (W52) of the force received by the force receiving portion 810*e* as an external force is the direction in which the developing unit 9 switches from the spaced state to the contacted state. Therefore, the developing unit 9 can be more reliably switched from the separated state to the contacted state by the external force received by the force receiving unit 810*e*.

Embodiment 13

Referring to FIG. 154, an embodiment of the process cartridge and the image forming apparatus according to Embodiment 13 of the present invention will be described. In this embodiment, structures and operations different from those of the above-described embodiment will be mainly described, and description of similar structures and operations will be omitted. For the structure corresponding to that in the above-described embodiment, the same reference numerals and characters are assigned, or the reference numerals in the first part is changed while the reference numerals and characters in the second part are the same. This embodiment is the same as in embodiment 9 except for the structure and operation of the spacer.

FIG. 154 is a view of the process cartridge P located at the second inner position inside the image forming apparatus main assembly 502 as viewed from the drive-side. For better illustration, the drive-side cartridge cover member 920 is shown by omitting portions other than the support portion 920*a* and the first contacted surface 920*c*. Part (a) of FIG. 154 shows a state in which the developing unit 9 is moving from the retracted position to the developing position. Part (b) of FIG. 154 shows a state in which the developing unit 9 is placed at the retracted position. Part (c) of FIG. 154 shows a state in which the developing unit 9 is placed at the developing position. Part (d) of FIG. 154 shows a state in which the developing unit 9 is moving from the developing position to the retracted position.

In this embodiment as well, as in the Embodiment 9, the spacer (restriction member, holding member) 910 is movable between the permission position (second position) at which the developing unit 9 can move to the developing position (contact position) and the restriction position (first position) in which the developing unit 9 is maintained at the retracted position (separated position). The spacer 910 is provided with a supported hole (supported portion) 910*a* and a projecting portion (holding portion) 910*b* projecting from the supported hole 910*a* in the radial direction of the supported hole 910*a*. Further, the spacer 910 is provided with the first contact surface (contact portion) 910*c* as the first contact portion which contacts the first contacted surface 920*c* of the drum unit 8 and which is provided at the free end of the projecting portion (holding portion) 910*b*, a retraction control surface (at-separation pressed portion) 910*d* and a contact control surface (at-contact pressed portion) 910*e*. The first contact surface 910*c* has an arc shape, and the center of the arc shape is substantially the same as the center of the supported hole 910*a*. Further, the retraction control surface 910*d* and the contact control surface 910*e* are opposed surfaces, and a space 910*s* exists between the retraction control surface 910*d* and the contact control surface 910*e*.

In this embodiment, the spacer 910 is arranged coaxially with the developing roller 6. That is, it can rotate about the rotation axis M2 which is the same as that of the developing roller 6. It is provided with a spacer support portion 96 formed by extending the core metal of the developing roller 6 in the longitudinal direction, and by the supported hole 910*a* of the spacer 910 engaging with the spacer support portion 96, the spacer 910 is rotatably supported by the developing roller 6.

The movable member 950 includes a supported hole 950*a*, a switching control portion 950*b*, a force receiving portion (contact force receiving portion) 950*e*, and a retracting force receiving portion (separation force receiving portion) 950*m*.

The movable member 950 is arranged on the drive-side cartridge cover 920, and by the supported hole 950*a* engaging with the support portion 920*a* provided on the drive-side cartridge cover 920, the movable member 950 is rotatably supported by the drive-side cartridge cover 920.

The movable member 950 is adjacent to the spacer 910, and the switching control portion 950*b* is disposed in the space 910*s* between the retraction control surface 910*d* and the contact control surface 910*e*. Further, a space 950*s* is provided between the force receiving portion 950*e* of the movable member 950 and the retracting force receiving portion 950*m*.

[Separation Operation]

Hereinafter, referring to FIG. 154, the operation in this embodiment will be described.

First, the operation of the developing unit 9 moving from the developing position to the retracted position will be described. As shown in part (c) of FIG. 154, when the developing unit 9 is placed at the developing position (contact position), the spacer 910 is in the permission position (second position) in which the first contact surface (contact portion) 910*c* and the first contacted surface (contacted surface) 920*c* are separated from each other.

When the separation control member 540 moves in the direction of arrow W51 as shown in part (d) of FIG. 154 from the position shown in part (c) of FIG. 154, the first force application surface 540*b* and the retracting force receiving portion 950*m* of the movable member 950 come into contact with each other. Further, when the separation control member 540 moves in the arrow W51 direction, the movable member 950 rotatably supported by the drive-side cartridge cover 920 receives a force from the first force application surface 540*b* and is rotated in the direction indicated by the arrow B1 in part (d) of FIG. 154.

When the movable member 950 rotates in the direction of arrow B1, the at-separation contact portion of the switching control portion 950*b* contacts the retraction control surface (at-separation contacted portion) 910*d*, and the spacer 910 is rotated in the arrow B3 in part (d) of FIG. 154. By this, the spacer 910 rotates and moves to the restriction position (first position) where the first contact surface (contact portion) 910*c* contacts the first contacted surface (contacted portion) 920*c*, and the developing unit 9 moves to the retracted position (separated position) shown in part (a) of FIG. 154.

At this time, since the first contact surface 910*c* has an arc shape, the direction of the reaction force from the first contacted surface 920*c* is toward the center of the arc shape. The arcuate center of the first contact surface 910*c* is substantially the same as the center of the supported hole 910*a* and the center of the developing roller 6. The first contact surface 910*c* directs the reaction force direction from the first contacted surface 920*c* toward the rotation center of the spacer 910, so that the rotation moment of the spacer generated from the reaction force from the first contacted surface 920*c* is suppressed. As a result, the spacer 910 can stably maintain the restriction position (first position) at the retracted position, and the developing unit 9 can stably maintain the retracted position. The shapes of the contact surface 910*c* and the first contacted surface 920*c* are selected such that the developing roller 6 and the photosensitive drum 4 are spaced by the gap T2 in part (a) of FIG. 154, at the retracted position where the first contact surface 910*c* contacts the first contacted surface 920*c*.

When the separation control member 540 moves from the second position in the direction of the arrow W52 in part (b) of FIG. 154 and moves to the home position, the portion having the first force application surface 540*b* and the second force application surface 540*c* of the separation control member 540 moves in the space 950*s* of the movable member 950 are applied. That is, the first force application surface 540*b* and the second force application surface 540*c* located at the home position are in a state of being separated from the movable member 950, and therefore, the developing unit 9 placed at the retracted position does not impart a load on the separation control member 540.

[Contact Operation]

Next, the operation of the developing unit 9 moving from the retracted position to the developing position will be described. When the separation control member 540 moves from the home position in the direction of the arrow W52 in part (a) of FIG. 154, as shown in part (b) of FIG. 154, the second force application surface 540*c* of the separation control member 540 and the force receiving portion 950*e* of the movable member 950 come into contact with each other, and the movable member 950 rotates in the arrow B2 direction in part (b) of FIG. 154. When the separation control member 540 moves to the first position and the movable member 950 rotates, the at-contact pressing portion of the switching control portion 950*b* contacts the contact control surface (contact pressed portion) 910*e* provided on the spacer 910, and the spacer 910 is rotationally moved in the B4 direction in part (b) of FIG. 154. As a result, the first contact surface 910*c* and the first contacted surface 920*c* are separated from each other, and the spacer 910 moves to the permission position.

When the spacer 910 moves to the permission position, the developing unit 9 rotates in the V2 direction in part (b) of FIG. 154, and moves to the developing position where the developing roller 6 and the photosensitive drum 4 contact each other (state in part (c) of FIG. 154). Then, when the separation control member 540 moves from the first position to the home position, the portion of the separation control member 540 having the first force application surface 540*b* and the second force application surface 540*c* moves in the space 950*s* of the movable member 950 and develops to maintain the state away from the developing unit 9.

In this embodiment, the separation control member 540 moves in the space 950*s* of the movable member 950 when moving from the first position to the home position and when moving from the second position to the home position, and the state in which the separation control member 540 and the movable member 950 are separated from each other is maintained. The structure for preventing the separation control member 540 from receiving a load from the developing unit 9 at the home position is not limited to described examples, and the structure as shown in FIG. 155 may be employed.

That is, the structure may be such that the space 950*s* of the movable member 950 is reduced, and the force receiving portion (contact force receiving portion) 950*e* and the retracting force receiving portion (separation force receiving portion) 950*m* of the movable member 950 are brought into contact with the first force application surface 540*b* and the second force application surface 540*c* of the separation control member 540, at the same time. Further, the structure may be such that when the process cartridge P is mounted to the image forming apparatus main assembly 502, the receiving portion 950*e* and the retracting force receiving portion 950*m* sandwich the first force application surface 540*b* and the second force application surface 540*c* of the separation control member 540 and are made integral, or they may be integrated by bonding using double-sided tape or the like. However, when the movable member 950 and the separation control member 540 are structured in this manner, the space 910*s* between the switching control portion 950*b* and the retraction control surface 910*d* and the contact control surface 910*e* is structured as follows. As shown in FIG. 155, the space 910*s* in which the switching control portion 950*b* is provided is expanded, and when the separation control member 540 is placed at the home position, the switching control portion 950*b* is in a state of being separated from the retraction control surface 910*d* and the contact control surface 910*e*. That is, when the developing unit 9 is placed at the retracted position, the switching control portion 950*b* and the retraction control surface 910*d* are separated from each other, and therefore, the developing unit 9 can suppress the load applied to the separation control member 540.

Further, also when the developing unit 9 is placed at the developing position, the switching control portion 950*b* and the contact control surface 910*e* are separated from each other, and therefore, the developing unit 9 suppresses the load applied to the separation control member 540.

According to the structure of this embodiment described above, the same effects as those of the first and Embodiment 9s can be provided.

In the structure shown in FIG. 155, the force receiving portion 950*e* of the movable member 950 of the developing unit 9 receives the force from the separation control member 540 mounted in the main assembly as an external force, as in the embodiments described in the foregoing. The direction (W52) of the force received by the force receiving portion 950*e* as an external force is the direction in which the developing unit 9 switches from the separation state to the contacted state. Therefore, the developing unit 9 can be more reliably switched from the separated state to the contacted state by the external force received by the force receiving unit 950*e*.

Embodiment 14

Referring to FIGS. 156 and 157, an embodiment of the process cartridge and the image forming apparatus according to the 14th embodiment of the present invention will be described. In this embodiment, structures and operations different from those of the above-described embodiment will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same. This embodiment is the same as embodiment 9 except for the structure and operation of the spacer.

FIGS. 156 and 157 are illustrations of the process cartridge P placed at the second inner position inside the image forming apparatus main assembly 502 as viewed from the drive-side. For better illustration, the drive-side cartridge cover 1120 is shown with the omission of the portions other than the first contacted surface 1120*c* and the spring-hooked portion 1120*e*.

First, referring to FIG. 156, the operation of the developing unit 9 moving from the developing position (contact position) to the retracting position (separated position) will be described.

Also, in this embodiment, similarly to the Embodiment 9, the spacer 1110 can move the permission position where the developing unit 9 can move to the developing position and the restriction position where the developing unit 9 is maintained in the retracted position.

Further, the separation control member 540 mounted in the image forming apparatus main assembly 502 is capable of moving the first position for moving the spacer (restriction member holding member) to a permission position (second position) and the second position for moving the spacer 1110 to the restriction position (first position). Further, the separation control member 540 is structured to be movable between the first position and the second position to the home position where the separation control member 540 does not contact the force receiving portion 1110*e* or the retracting force receiving portion 1133*a*.

Part (a) of FIG. 156 shows a state in which the developing unit 9 is in the developing position and the separation control member 540 is in the first position. Part (b) of FIG. 156 and FIG. 156(*c*) show a state in which the separation control member 540 is moving from the first position to the second position and the developing unit 9 is moving from the developing position to the retracted position. Part (d) of FIG. 156 shows a state in which the developing unit 9 is in the retracted position and the separation control member 540 is in the home position.

As shown in part (a) of FIG. 156, the spacer 1110 provided with a retracting force receiving portion 1110*m* is arranged on the development cover member 1133 as in the Embodiment 9. That is, the spacer 1110 is rotatably supported by the development cover member 1133 by engaging the supported hole (supported portion) 1110*a*, which is the second contact portion, with the supporting portion 1133*c*.

Further, the spacer 1110 is provided with a spring-hooked portion 1110*g* projecting in the axial direction of a supported hole 1110*a*. The drive-side cartridge cover 1120 also has a spring-hooked portion 1120*e* projecting from the first contacted surface 1120*c* in the axial direction of the supported hole 1110*a*, and the tension spring 1130 as a holding portion urging member is assembled to a spring-hooked portion 1110*g* and the spring-hooked portion 1120*e*.

The spring-hooked portion 1110*g* corresponds to the point of action of the tension spring 1130, and the tension spring 1130 applies a force to the spring-hooked portion 1110*g* in the direction of the arrow F5 in part (a) of FIG. 156. Here, the direction of the arrow F5 in part (a) of FIG. 156 is substantially parallel to the line connecting the spring-hooked portion 1110*g* and the spring-hooked portion 1120*e*. That is, as shown in part (a) of FIG. 156, when the developing unit 9 is placed at the developing position, the tension spring 1130 applies the force to the spacer 1110 in the direction of the arrow F5 in part (a) of FIG. 156 to urge the spacer 1110 about the supported hole 1110*a* in the direction of the arrow B2 in part (a) of FIG. 156.

[Separation Operation]

The separation control member 540 is structured to be movable from the first position shown in part (a) of FIG. 156 in the direction of the arrow W51 in part (a) of FIG. 156. When the separation control member 540 moves in the W51 direction, the first force application surface 540*b* and the retracting force receiving portion 1110*m* of the spacer 1110 come into contact with each other, and the third contact surface 1110*k* of the spacer 1110 rotates in the direction of the arrow B1 until it comes in contact with the spring-hooked portion 1120*e*. (State shown in part (b) of FIG. 156)

Further, when the separation control member 540 moves in the direction of W51 to the second position shown in part (c) of FIG. 156, the developing unit 9 rotates in the direction of the arrow V1 in part (b) of FIG. 156 and moves from the developed position to the retracted position. Further, the third contact surface 1110*k* of the spacer is separated from the spring-hooked portion 1120*e* and rotates in the direction of the arrow B1 in part (b) of FIG. 156 until the first restricted surface 1110*h* comes into contact with the first restriction surface 1133*h*, and to the restriction position (1st position). (State shown in part (c) of FIG. 156)

At this time, the spring-hooked portion 1110*g* moves in the direction of the arrow B1 in part (b) of FIG. 156 with the rotation of the spacer 1110, and therefore, the action direction of the tension spring 1130 switches from the direction of the arrow F5 in part (a) of FIG. 156 to the direction of the arrow F6 in part (c) of FIG. 156. That is, as shown in part (c) of FIG. 156, the tension spring 1130 applies a force to the spacer 1110 in the direction of the arrow F6 in part (c) of FIG. 156, and the spacer 1110 is urged in the direction of the arrow B1 in part (c) of FIG. 156 about the supported hole 1110*a*.

By switching the direction in which the tension spring 1130 acts on the spacer in this manner, the direction in which the tension spring 1130 urges the spacer 1110 is the same as the direction in which the spacer 1110 moves by the movement of the separation control member 540 in the W51 direction, and therefore, the spacer 1110 can be stably moved from the permission position (second position) to the restriction position (first position).

Then, when the separation control member 540 moves from the second position in the direction of the arrow W52 in part (c) of FIG. 156 to the home position, the developing unit 9 moves in the direction of the arrow V2 in FIG. 156(*c*), by which the first contact surface (contact portion) 1110*c* of the spacer 1110 placed at the restriction position (first position) and the first contacted surface (contacted portion) 1120*c* of the drive-side cartridge cover 1120 are brought into contact with each other. At this time, in the spacer 1110, the supported hole (supported portion) 1110*a* is in contact with the supporting portion 1133*c* of the development cover member 1133. Therefore, the portion connecting the supported hole 1110*a* of the spacer 1110 and the first contact surface 1110*c* functions as a holding portion for holding the development cover member 1133, similarly to the projecting portion (holding portion) 510*b* of the Embodiment 9. Function. As a result, the developing unit 9 is maintained in the retracted position (separated position) (the state shown in part (d) of FIG. 156). At this time, as in the Embodiment 9, the separation control member 540 placed at the home position is separated from the spacer 1110, so that the developing unit 9 placed at the retracted position does not impart a load on the separation control member 540.

Further, in the state where the developing unit 9 shown in part (d) of FIG. 156 is placed at the retracted position, the tension spring 1130 applies a force in the direction of the arrow F6 in part (d) of FIG. 156 to the spacer 1110 to urge the spacer 1110 in the direction of the arrow B1, and therefore, the spacer 1110 can stably maintain the restriction position (first position), and the developing unit 9 can stably maintain the retracted position (separated position).

[Contact Operation]

Next, referring to FIG. 157, the operation of moving the developing unit 9 from the retracted position (separated position) to the developing position (contact position) will be described. Part (a) of FIG. 157 shows a state in which the developing unit 9 is in the retracted position and the separation control member 540 is in the home position. Part (b) of FIG. 157 shows a state in which the separation control member 540 is moving from the home position toward the first position and the developing unit 9 is moving from the retracted position to the developing position. Part (c) of FIG. 157 shows a state in which the developing unit is in the developing position and the separation control member 540 is in the first position.

When the separation control member 540 moves from the home position in the direction of the arrow W52 in part (a) of FIG. 157, the second force application surface 540*c* of the separation control member 540 and the force receiving portion 1110*e* of the spacer 1110 are brought into contact with each other to rotate the spacer 1110 in the direction of the arrow B2 in part (b) of FIG. 157. When the separation control member 540 moves to the first position and the spacer 1110 rotates, the first contact surface 1110*c* and the first contacted surface 1120*c* of the drive-side cartridge cover 1120 are separated from each other, and the spacer 1110 is moved to the permission position (second position). When the spacer 1110 moves to the permission position, the developing unit 9 rotates in the V2 direction in part (b) of FIG. 157 and moves to the developing position (contact position) in which the developing roller 6 and the photosensitive drum 4 contact with each other (contact position) (state shown part (c) of FIG. 157). Since the separation control member 540 moved to the first position is separated from the spacer 1110 of the developing unit 9 moved to the developing position, the separation control member 540 is not subjected to a loaded from the developing unit 9.

Further, when the developing unit 9 moves from the retracted position to the developing position in this manner, the spring-hooked portion 1110*g* of the spacer 1110 moves in the direction of the arrow B2 in part (b) of FIG. 156 with the rotation of the spacer 1110. The direction of action of the tension spring 1130 is switched from the direction of the arrow F6 in part (a) of FIG. 157 to the direction of the arrow F5 in part (c) of FIG. 157, and the direction in which the tension spring 1130 urges the spacer 1110 is switched from the direction of the arrow B1 in part (a) of FIG. 157 to the direction of the arrow B2. That is, the urging direction of the spacer 1110 by the tension spring 1130 becomes the same as the rotational direction of the spacer 1110 by the movement of the separation control member 540 in the W52 direction, and therefore, the spacer 1110 can be stably moved from the restriction position (first position) to the permission position (second position).

According to the structure of this embodiment described above, the same effects as those of the first and Embodiment 9s can be provided.

Further, in this embodiment, the urging direction of the spacer 1110 by the tension spring can be made to be the same as the rotational direction of the spacer by the separation control member 540, so that the movement of the spacer 1110 between the permission position and the restriction position can be stabilized. That is, the control of the attitude of the developing unit 9 can be stabilized.

Further, in this embodiment, when the developing unit 9 is in the developing position, the separation control member 540 is stopped at the first position, but the present invention is not limited to this Example. As in the Embodiment 9, the structure may be such that the separation control member 540 moved from the second position to the first position may be returned from the first position to the home position and then it is stopped.

Embodiment 15

Referring to FIGS. 158, 159 and 160, the process cartridge and the image forming apparatus according to the Embodiment 15 of the present invention will be described. In this embodiment, structures and operations different from those of the above-described embodiment will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same. This embodiment is the same as in Embodiment 9 except for the structure and operation of the spacer. In the Embodiment 9, the spacer 510 is structured to move between the restriction position and the permission position by rotating relative to the developing unit (or developing frame) or the drum unit (or drum frame), but the movement of the spacer 510 relative to the developing frame is not limited to rotation. That is, referring to the Embodiment 9, the spacer 510 is modified to have a structure in which the spacer 510 moves in a predetermined direction relative to the developing frame (linear movement, for example) between the restriction position and the permission position. Further, in this embodiment, the spacer 1210 is supported by the drum unit (or the drum frame) as in the other Example 1 of Embodiment 9.

In this embodiment as well as in the Embodiment 9, the spacer 1210 is movable between the permission position (second position) in which the developing unit 9 can move to the developing position and the restriction position (first position) in which the developing unit 9 is maintained in the retracted position.

Further, the separation control member 540 mounted in the image forming apparatus main assembly 502 can move between the first position for moving the spacer 1210 to the permission position and the second position for moving the spacer 1210 to the restriction position. Further, the separation control member 540 is structured to be movable to a home in which the separation control member 540 does not contact the force receiving portion (contact force receiving portion) 1210*e* and the retracting force receiving portion (separation force receiving portion) 1233*a* between the first position and the second position.

In Embodiment 9, the spacer 510 is mounted on the developing unit 9, but in this embodiment, the spacer 1210 is mounted on the drive-side cartridge cover member 1220. FIG. 158 is a perspective view illustrating the spacer 1210 mounted on the drive-side cartridge cover member 1220. As shown in FIG. 158, a support portion 1220*f* is provided on the drive-side cartridge cover member 1220, and the supported hole (supported portion) 1210*a* of the spacer 1210 engages with the support portion 1220*f*, by which the spacer 1210 is supported by the drive-side cartridge cover member 1220. The supported hole 1210*a* has an oblong round hole shape, and the spacer 1210 is supported movably in the directions of arrows B3 and B4 in FIG. 158. The directions of arrows B3 and B4 in FIG. 158 are substantially parallel to the directions of arrows Z1 and Z2 in FIG. 5.

The spacer 1210 is provided with a projecting portion 1210*b* projecting from the supported hole 1210*a*. Further, the spacer 1210 is provided with a first contact surface (contact portion) 1210*c* corresponding to the first contact portion, at the free end of the projection 1210*b*, and is provided with a first restricted surface 1210*h* connecting with a first contact surface 1210*c* on the side surface of the projection 1210*b*. Further, the spacer 1210 is provided with a force receiving portion (contact force receiving portion) 1210*e* in the direction of arrow B4 of the supported hole 1210*a* in FIG. 158.

[Separation Operation]

Referring first to FIG. 159, the operation of the developing unit 9 moving from the developing position (contact position) to the retracting position (separated position) will be described. FIG. 159 is a view of the process cartridge P int the second inner position inside the image forming apparatus main assembly 502 as viewed from the drive-side. For better illustration, the drive-side cartridge cover 1220 is shown by omitting portions other than the support portion 1220*f*. Part (a) of FIG. 159 shows a state of the developing position of the developing unit 9. Part (b) of FIG. 159 shows a state in which the developing unit is moving from the developing position to the retracted position. Part (c) of FIG. 159 shows a state in which the developing unit 9 is in the retracted position.

As shown in part (a) of FIG. 159, the development cover member 1233 is provided with a restriction portion 1233*e* projecting in the swing axis K direction (outside in the longitudinal direction) of the developing unit 9. When the developing unit 9 is located at the developing position, the first restricted surface 1210*h* of the spacer 1210 engages with the restriction portion 1233*e*, so that the movement of the spacer 1210 in the direction of the arrow B4 in part (a) of FIG. 159 is restricted. The position of the spacer 1210 shown in part (a) of FIG. 159 is an permission position (second position) of the spacer 1210.

The separation control member 540 moves in the direction of the arrow W51 in Figure (a), and the first force application surface 540*b* comes into contact with the retracting force receiving portion (separation force receiving portion) 1233*a* of the development cover member 1233. Further, when the separation control member 540 moves in the W51 direction and moves to the second position, the developing unit 9 rotates in the direction of the arrow V1 in part (b) of FIG. 159 and moves from the developing position to the retracted position. At this time, the restriction portion 1233*e* of the development cover member 1233 moves with the rotation of the developing unit 9, and therefore, the first restricted surface 1210*h* is separated from the restriction portion 1233*e*, and the spacer 1210 is moved in the direction of the arrow B4 in part (b) of FIG. 159 by its own weight. The position of the spacer 1210 shown in part (b) of FIG. 159 is the restriction position (first position).

Then, when the separation control member 540 moves from the second position in the direction of the arrow W52 in part (b) of FIG. 159 to returns to the home position, the developing unit 9 moves in the direction of the arrow V2 in part (b) of FIG. 159, and the first contact surface 1210*c* of the positioned spacer placed in the restriction position and the restriction portion 1233*e* are brought into contact with each other, and the developing unit 9 is maintained in the retracted position (state shown in part (c) of FIG. 159). At this time, as in the Embodiment 9, the separation control member 540 is separated from the spacer 1210, so that the developing unit 9 located at the retracted position does not apply a load on the separation control member 540.

[Contact Operation]

Next, referring to FIG. 160, the operation of moving the developing unit 9 from the retracted position (separation position) to the developing position (contact position) will be described. FIG. 160 is a view of the process cartridge P placed at the second inner position inside the image forming apparatus main assembly 502 as viewed from the drive-side. For better illustration, the drive-side cartridge cover 1220 is shown by omitting portions other than the support portion 1220*f*.

Part (a) of FIG. 160 shows a state in which the developing unit 9 is placed at the retracted position. Part (b) of FIG. 160 and part (c) of FIG. 160 show a state in which the developing unit 9 is moving from the retracted position to the developing position. Part (c) of FIG. 160 shows a state in which the developing unit 9 is placed at the developing position.

When the separation control member 540 moves from the home position in the direction of the arrow W52 in part (a) of FIG. 160, the second force application surface 540*c* of the separation control member 540 and the force receiving portion (contact force receiving portion) 1210*e* of the spacer 1210 come into contact with each other (part (b) of FIG. 160). Further, when the separation control member 540 moves in the direction of the arrow W52 in part (b) of FIG. 160, the spacer 1210 urged by the separation control member moves in the direction of B3 in part (b) of FIG. 160, and the spacer 1210 moves to the permission position (second position) where the first contact surface 1210*c* and the restriction portion 1233*e* are separated from each other (part (c) of FIG. 160). When the spacer moves to the permission position, the developing unit 9 rotates in the V2 direction in part (c) of FIG. 160 and moves to the developing position where the developing roller 6 and the photosensitive drum 4 are in contact with each other (part (d) of FIG. 160). After the developing unit 9 moves to the developing position, the separation control member 540 returns to the home position and separates from the spacer 1210, as in the Embodiment 9, and therefore, the developing unit 9 placed at the developing position does not impart a load on the separation control member 540.

According to the structure of this embodiment described above, the same effects as those of the first and Embodiment 9s can be provided.

As described above, in this embodiment, the spacer 1210 supported by the drive-side cartridge cover member 1220 (drum unit 8) is linearly moved between the permission position (second position) and the restriction position (first position), by which the position of the developing unit 9 relative to the drum unit 8 can be changed.

Embodiment 16

Next, referring to FIGS. 161 to 164, Embodiment 16 will be described. In this embodiment, structures and operations different from those of the above-described embodiment will be mainly described, and description of similar structures and operations will be omitted. Further, for the structure corresponding to the above-described embodiment, the same reference numerals and characters are assigned, or the reference numerals in the first part is changed while the reference numerals and characters in the second part are the same. In this embodiment, a case where the process cartridge separation/contact mechanism is arranged only on the drive-side will be described.

[Upper Placement of Spacer]

In Embodiments 1 to 15, the spacers are disposed in the neighborhood of the photosensitive drum and the developing roller, but the present invention is not limited to such examples, and the spacers are placed at arbitrary positions on the drive-side cartridge cover member according to the applied condition of structure. Here, referring to FIGS. 161 and 162, as an example thereof, a case where the spacer is provided above the swing axis K of the developing unit will be described.

FIG. 161 is an exploded perspective view of the drive-side cartridge cover member 1716, the tension spring 1753, the spacer 1751A, the movable member 1752A, and the development cover member (a part of the developing frame) 1728, and part (b) of FIG. 161 shows a view as seen from the non-drive-side direction. FIG. 162 is a cross-sectional view of the process cartridge 1700A, and is a view illustrating the operation relating to the separation/contact mechanism. Part (a) of FIG. 162 shows a state of separation of the developing unit 1709A, and part (b) of FIG. 162 shows a state of contact of the developing unit 1709A.

First, referring to FIG. 162, the spacer (holding member, restricting member) 1751A will be described. The supported hole 1751Aa is rotatably supported by the first supporting portion (support portion) 1728Ac of the development cover member 1728A provided on the side opposite to the developing roller 1706 with respect to the swing axis K of the developing unit 1709A. The separation holding portion (holding portion) 1751Ab projects from the supported hole 1751Aa in the downstream direction of V2, which is the rotational direction when the developing unit is in the contact position, and is provided with a contact surface (contact portion) 1751Ac at its free end. Further, it is provided with a second restricted surface 1751Ak adjacent to the contact surface 1751Ac. The second pressed portion 1751Ad projects from the supported hole 1751Aa in the direction opposite to the swing axis K. Further, the free end of the second pressed portion 1751Ad has a second pressed surface 1751Ae on the surface on the counterclockwise B1 direction side about the supported hole 1751Aa. A spring-hooked portion 1751Ag is provided on a downstream side of the second pressed surface 1751Ae with respect to the counterclockwise B1 direction about the supported hole 1751Aa. Further, the spring-hooked portion 1751Ag is disposed on a downstream side of the straight line connecting the supported hole 1751Aa and the spring-hooked portion 1752As of the movable member 1752A which will be described hereinafter in the counterclockwise direction about the spring-hooked portion 1752As.

Next, the movable member 1752A will be described. The oblong supported hole 1752Aa is rotatably supported by the second supporting portion 1728Ak of the development cover member 1728A provided at substantially the center of the movable member 1752A. The second pressing surface (at-contact pressing portion) 1752Ar is opposed to the second pressed portion (at-contact pressed portion) 1751Ae of the spacer 1751A in the counterclockwise direction B1 about the first supporting portion 1728Ac of the development cover member 1728A. The spring-hooked portion 1752As is provided between the oblong supported hole 1752Aa and the second pressing surface 1752Ar. The other structures of the movable member 1752A are the same as those in the Embodiment 1, and therefore, the description thereof will be omitted.

Next, the drive-side cartridge cover member 1716A will be described. The drive-side cartridge cover member 1716A is provided with a contact surface (contacted portion) 1716Ac which contacts the contact surface 1751Ac of the spacer 1751A in a state in which the developing unit 1709A is separated (part (a) of FIG. 162). Further, it is provided with a second restriction surface 1716Ac adjacent to the contact surface 1716Ac on the swing axis K side.

Next, the tension spring 1753 is mounted to the spring-hooked portion 1751Ag of the spacer 1751A and to the spring-hooked portion 1752As of the movable member 1752A. Then, the tension spring 1753 applies an urging force in the counterclockwise direction B1 about the supported hole 1751Aa of the spacer 1751A.

[Contact and Separation Operations]

Next, the operation of the contact separation mechanism will be described. First, as shown in part (a) of FIG. 162, when the developing unit 1709A is in the development spaced state in the retracted position (spaced position), the contact surface 1751Ac of the spacer 1751A is in contact with the contact surface 1751Ac of the drive-side cartridge cover member 1716A. By this, the spacing amount P1 between the photosensitive drum 1704 and the developing roller 1706 is maintained. At this time, the spacer 1751A is in the restriction position (first position).

Next, the operation of changing from the state of development separation to the state of development contact shown in part (b) of FIG. 162 will be described. By the separation control member 196R (not shown) of the main assembly 170 moving in the W42 direction and contacting and pressing against the second force receiving portion (contact force receiving portion) 1752An, the movable member 1752A is rotated about the second supporting portion 1728Ak in the BB direction (clockwise direction). Then, by the second pressing surface 1752Ar coming into contact with the second pressed surface 1751Ae, the spacer 1751A is rotated clockwise around the first supporting portion 1728Ac in the B2 direction to move from the restriction position (first position) to the permission position (second position). By this, the developing unit 1709A rotates around the swing axis K and moves to the developing position (contact position), so that the developing roller 1706 and the photosensitive drum 1704 come into contact with each other (development contact state).

Next, the operation of changing from the development contact state shown in part (b) of FIG. 162 to the development separation state shown in part (a) of FIG. 162 will be described. From the state shown in part (b) of FIG. 162, the separation control member 196R (shown) of the apparatus main assembly 170 moves in the direction of W41 to contact to the first force receiving portion (retracting force receiving portion, separating force receiving portion) 1752Ak. By this, the movable member 1752A is rotated about 1728Ak in the opposite direction (counterclockwise direction), that is, in the BB direction. Then, the developing frame pressing surface (at-separation pressing portion) 1752Aq presses the pressed surface (at-separation pressed portion) 1728Ah of the development cover member 1728, by which the developing unit 1709A is rotated about the swing axis K. At this time, the spacer 1751A rotates in the counterclockwise direction B1 about the first supporting portion 1728Ac by the action of the tension spring 1753. By this, the contact surface 1751Ac of the spacer 1751A comes into contact with the contact surface 1751Ac of the drive-side cartridge cover member 1716A, so that the separated state of the developing unit 1709A is maintained.

As described above, according to this embodiment, the arrangement can be such that the spacer 1751A is disposed on the side opposite to the side in which the second force receiving portion (contact force receiving portion) 1752An and the first force receiving portion (retracting force receiving portion, separating force receiving portion) are disposed, with respect to the swing axis 1752Ak (or above the swing axis K).

Further, the spacer 1751A of this embodiment has a structure in which it can move between the first position and the second position by receiving a force from the separation control member 196R of the apparatus main assembly 170 by way of the movable member 1752A. However, the spacer 1751A of this embodiment may receive the force directly from the separation control member 196R of the apparatus main assembly 170 without using the movable member as shown in the Embodiment 9, and may move between the first position and the second position.

Another Example of Embodiment 16

In this alternative embodiment, referring to FIGS. 163 and 164, a structure in which the developing unit is held in a spaced state by hooking the spacer on the drum unit will be described. FIG. 163 is an exploded perspective view of the tension spring 1753, the spacer 1751A, the movable member 1752A, and the development cover member 1728, wherein part (a) of FIG. 163 is a view as seen from the drive-side and part (b) of FIG. 163 is a view as seen from the non-drive-side. FIG. 164 is a sectional view of the process cartridge 1700B, and illustrates the operation relating to the separation/contact mechanism, in which (a) shows the state of separation of the developing unit 1709A, and (b) shows the state of contact of the developing unit 1709A.

First, referring to FIGS. 163 and 164, the drum frame 1715B will be described. The drum frame 1715B has an engaging portion (drum unit (drum frame) side engaging portion) 1715Bb on the side opposite to the side in which the developing roller 1706 with respect to a line connecting the swing axis K of the developing unit 1709B and the photosensitive drum 1704 axis. The engaging portion 1715Bb extends toward the developing unit 1709B, and a contacted surface 1715Bc facing the drum unit 1708B direction is provided at the free end thereof. Then, the engaging portion 1715Bb is provided with a second restriction surface 1715Bd, adjacent to the contacted surface 1715Bc, which faces in the direction away from the photosensitive drum 1704.

Next, the spacer 1751B will be described. The supported hole (supported portion) 1751Ba is rotatably supported by the first supporting portion 1728Bc of the development cover member (part of the developing frame) 1728B. That is, the supported hole (supported portion) 1751Ba is in contact with the first supporting portion 1728Bc. Further, the first supporting portion 1728Bc is disposed on the side opposite, with respect to the swing axis K of the developing unit 1709B, to the side having the developing roller 1706, the second force receiving portion (contact force receiving portion) 1752Bn, and the first force receiving portion (retracting force receiving portion, separation) 1752Bk. The separation holding portion (holding portion, spacer side engaging portion) 1751Bb is provided so as to project (extend) from the supported hole 1751Ba toward the engaging portion 1715Bb of the drum frame 1715B. In other words, the separation holding portion 1751Bb is provided so as to project from the supported hole 1751Ba in the direction from the downstream to the upstream in the V2 direction in which the developing unit 1709 rotates from the separated state to the contact state. At the free end of the separation holding portion 1751Bb, a contact surface (contact portion) 1751Bc facing the direction of the developing unit 1709B is provided. The contact surface 1751Bc is disposed so as to abut to the contacted surface 1715Bc of the drum frame 1715 in the state that the developing unit 1709A is separated. Further, the separation holding portion 1751Bb is provided with a second restricted surface 1751Bk which is adjacent to the contact surface 1751Bc and which faces toward the photosensitive drum 1704 (the direction opposite to the direction toward the second restriction surface 1715Bd). The second pressed portion 1751Bd projects from the supported hole 1751Ba in the direction opposite to the swing axis K. Further, the free end of the second pressed portion 1751Bd has a second pressed surface (at-contact force receiving portion) 1751Be on the surface on the downstream side in the counterclockwise B1 about the supported hole 1751Ba. The spring-hooked portion 1751Bg is provided on the separation holding portion 1751Bb at a position between the supported hole 1751Aa and the contact surface 1751Bc. Further, the spring-hooked portion 1751Bg is disposed on the downstream side in the counterclockwise direction about the spring-hooked portion 1752Bs with respect to the straight line connecting the supported hole 1751Ba and the spring-hooked portion 1752Bs of the movable member 1752B which will be described hereinafter.

Next, the movable member 1752B will be described. The oblong supported hole 1752Ba is rotatably supported by the second supporting portion 1728Bk of the development cover member 1728B provided at substantially the center of the movable member 1752B. The second pressing surface (at-contact pressing portion) 175Br is provided so as to oppose the second pressed portion 1751Be of the spacer 1751B in the counterclockwise B1 direction about the first supporting portion 1728Bc of the development cover member 1728B. The spring-hooked portion 1752Bs is provided between the oblong supported hole 1752Ba and the second pressing surface 1752Br. Further, the movable member 1752B is provided with the second force receiving portion (contact force receiving portion) 1752Bn and the first force receiving portion (retracting force receiving portion, separating force receiving portion) 1752Bk which receive a force from the separation control member 196R (not shown) of the apparatus main assembly 170. The other structures of the movable member 1752B are the same as those in the Embodiment 1, and therefore, the description thereof will be omitted.

The tension spring 1753 is mounted to the spring-hooked portion 1751Bg of the spacer 1751B and the spring-hooked portion 1752Bs of the movable member 1752B. Then, the tension spring 1753 urges the spacer 1751A in a direction of rotating in the B1 direction (counterclockwise in the drawing) about the supported hole 1751Aa of the spacer 1751A.

[Contact and Separation Operations]

Next, the contact operation and the separation operation will be described. First, when the developing unit 1709B is in the separated state as shown in part (a) of FIG. 164, the contact surface 1751Bc of the spacer 1751B is in contact (engagement) with the contacted surface 1715Bc of the drum frame 1715B, and the supported hole (supported portion) 1751Ba is in contact with the first supporting portion 1728Bc. Therefore, the movement (rotation) in the V2 direction from the retracted position (separation position) of the developing unit 1709B to the developing position (contact position) is restricted so that the developing roller 1706 maintains the spacing amount P1 from the photosensitive drum 1704. The position of the spacer 1751B at this time is the restriction position (first position).

Next, the operation of shifting the developing unit 1709B from the separated state to the contacted state as shown in part (b) of FIG. 164 will be described. The separation control member 196R (not shown) moves in the W42 direction and presses the second force receiving portion (contact force receiving portion) 1752Bn in the W42 direction, so that the movable member 1752B rotates clockwise (in the BB direction) about the second supporting portion 1728Bk. Then, by the second pressing surface (at-contact pressing portion) 1752Br being brought into contact with the second pressed surface (at-contact pressed portion) 1751Be, the spacer 1751B is rotated about the first supporting portion 1728Bc in the B2 direction (clockwise direction in the Figure). By this, the contact surface 1751Bc moves in the B2 direction with respect to the contacted surface 1715Bc, and is separated from the contacted surface 1715Bc, so that the engagement between the engaging portion 1715Bb and the separation holding portion 1751Bb is released. The position of the spacer 1751B at this time is the permission position (second position). By the movement of the spacer 1751B from the restriction position to the permission position in this manner, the restriction on the movement of the developing unit 1709B in the V2 direction (the direction from the retracted position to the developing position) is released. Therefore, the developing unit 1709B rotates in the V2 direction about the swing axis K until the developing roller 1706 and the photosensitive drum 1704 come into contact with each other, and the movement to the developing position (contacting position) is completed.

Finally, the operation of changing from the development contact state as shown in part (b) of FIG. 164 to the spaced state shown in part (a) of FIG. 164 will be described. From the contact state shown in part (b) of FIG. 164, the separation control member 196R (shown) moves in the W41 direction and presses the first force receiving portion (retracting force receiving portion, separating force receiving portion) 1752Bk in the W41 direction. By this, the movable member 1752B is rotated about 1728Bk in the opposite direction (counterclockwise direction) in the BB direction. Then, by the developing frame pressing surface (at-separation pressing portion) 1752Bq urging the pressed surface (at-separation pressed portion) 1728Bh of the development cover member 1728B, the developing unit 1709B is rotated about the swing axis K in the V2 (counterclockwise) direction. At this time, the spacer 1751B rotates in the counterclockwise direction B1 about the first supporting portion 1728Bc by the action of the tension spring 1753. By this, as shown in part (a) of FIG. 164, the contact surface 1751Bc of the spacer 1751B comes into contact with the contacted surface 1715Bc of the drum frame 1715B, and the engaging portion 1715Bb and the separation holding portion 1751Bb engage with each other, so that the separated state of the developing unit 1709B is maintained.

The spacer 1751B of this embodiment has been described as having a structure in which it can move between the first position and the second position by receiving a force from the separation control member 196R of the apparatus main assembly 170 by way of the movable member 1752B. However, the spacer 1751B of this embodiment may be modified to have a movable structure for receiving a force directly from the separation control member 196R of the apparatus main assembly 170 without using the movable member as shown in the Embodiment 9 to move between the first position and the second position.

According to the structure of this embodiment described above, the same effects as those of Embodiments 1 and 9 can be provided.

Further, according to this embodiment, the spacer 1751B can be disposed on a side opposite to the side having the second force receiving portion (contact force receiving portion) 1752Bn and the first force receiving portion (retracting force receiving portion, separating force receiving portion) 1752Bk with respect to the swing axis K (or above the swing axis K).

Embodiment 17

In this embodiment, structures and operations different from those of the above-described embodiment will be mainly described, and description of similar structures and operations will be omitted. Further, for the structures corresponding to those of the above-described embodiment, the same reference numerals and characters are assigned, or the reference numerals in the first part is changed while the reference numerals and characters in the second part are the same. In this embodiment, in the process cartridge separation/contact mechanism, a structure will be described in which the separation is released by the moment when the spacer holds the separation is greater than the moment when the separation control member of the main assembly releases the separation by way of the movable member. In addition, the specific description will be made in the sections [Structure of separation/contact mechanism], [Contact operation of developing unit], and [Separation operation of developing unit]. Since the structures of other process cartridges are the same as those in the Embodiment 1, they are omitted here. Further, since the non-drive-side has the same structure as the drive-side and operates in the same manner, the description of this embodiment will be described on the drive-side, and the description of the non-drive-side will be omitted.

[Structure of Separation/Contact Mechanism]

The structure in which the photosensitive drum 104 of the process cartridge 1800 and the developing roller 106 of the developing unit 1809 are spaced from and contacted with each other in this embodiment will be described in detail. Part (a) of FIG. 165 is a side view of the drive-side of the process cartridge alone, and part (b) of FIG. 165 shows a side view of the non-drive-side of the process cartridge alone. The drive-side has a separation/contact mechanism 1850R, and the non-drive-side has a separation/contact mechanism 1850L. FIG. 166 shows an assembly perspective view of the drive-side of the developing unit 1809 including the separation/contact mechanism 1850R. FIG. 167 shows an assembly perspective view of the non-drive-side of the developing unit 1809 including the separation/contact mechanism 1850L. Here, the details of the separation/contact mechanism 1850R on the drive-side will be described. Since the separation/contact mechanism has almost the same functions at the drive-side and the non-drive-side, R is added to the numerals of each member for the drive-side. For the non-drive-side, the reference signs are the same as that of the drive-side, and L is added in place of R.

The separation/contact mechanism 1850R includes a spacer (separation holding member, restriction member), a movable member 1852R, and a tension spring 1853, and the spacer includes a drum side engaging portion 1855R for engagement with the developing side engaging portion 1854R and the developing side engaging portion 1854R.

FIG. 168 is an enlarged view of the developing side engaging portion 1854R. The developing side engaging portion 1854R is provided on the developing unit 1809. The developing side engaging portion 1854R is integrally molded using resin material, together with the development cover member 1828. Further, as viewed in the direction of FIG. 165, the developing side engaging portion 1854R is disposed such that an angle formed between a line connecting the first force receiving surface 1852Rm (see FIG. 173) and the swing axis K, which will be described later, and the swing axis K, and a line connecting the developing side engaging portion 1854R and the swing axis K is obtuse. Further, the developing side engaging portion 1854R is provided with a developing side engaging claw 1854Ra which contacts the drum side engaging portion 1855R in the separation state and a plate-shaped developing side holding portion 1854Rb which connects the development cover member 1828 that is a portion of the developing frame and the developing side engaging claw 1854Ra. The developing side engaging claw 1854Ra has a developing side engaging surface (contacting portion) 1854Rc which contacts the drum side engaging portion 1855R in the separation state, and a developing side engagement return surface 1854Rd which contacts the drum side engaging portion 1855R in the process of transition from the contact state to the separation state. For the reason which will be described hereinafter, it is preferable that the amount of movement of the developing side spacer is large when the developing unit rotates about the swing axis K. Therefore, in this embodiment, the developing side spacer is provided at the position described above where the distance between the developing side spacer and the swing axis K can be made larger, but this feature is not restrictive.

In this embodiment, the developing side engaging portion 1854R is provided on the development cover member 1828 which is a part of the developing frame, but the present invention is not limited to such an example, and the developing side engaging portion 1854R may be provided on another member constituting a part of the developing frame.

FIG. 169 shows an enlarged view of the drum side engaging portion 1855R. The drum side engaging portion 1855R is provided on the drum unit 1808 so as to engage with a developing-side engaging portion 1854R and hold the developing unit 1809 in a spaced state. The drum side engaging portion 1855R is integrally molded with resin on the first drum frame portion 1815. Further, the drum side engaging portion 1855R includes a drum side engaging claw 1855Ra which engages with the developing-side engaging claw 1854Ra in the separation state, and a plate-shaped drum side holding portion 1855Rb which connects the first drum frame portion 1815, and the drum side engaging claw 1855Ra. Further, the drum side engaging claw 1855Ra includes a drum side engaging surface (contacted portion) 1855Rc which contacts the developing-side engaging surface 1854Rc in the separation state, and a drum side engagement return surface 1854Rd which is contacted with the development side return surface 1854Rd in the process of transition from the contact state to the separation state. In this embodiment, the drum side engaging portion 1855R is provided on the first drum frame portion 1815 which is a part of the drum frame, but the present invention is not limited to such an example, and it may be provided on another member constituting a part of the drum frame such as the drive-side cartridge cover member 1816.

FIG. 170 is a perspective view in which the developing side engaging portion 1854R and the drum side engaging portion 1855R are engaged with each other, that is, the developing unit 1809 is in the separated state. In the state in which the developing side engaging portion 1854R and the drum side engaging portion 1855R are engaged with each other, the developing side holding portion 1854Rb is substantially parallel to the drum side holding portion 1855Rb. In this state, it can be said that the developing side engaging portion 1854R and the drum side engaging portion 1855R which constitute the spacer are in the restriction positions (first position, engaging position), respectively.

As shown in FIG. 166, the movable member 1852R is held rotatably about the third support portion 1828*m* by engaging the support receiving portion 1852Ra of the movable member 1852R with the third support portion 1828*m*. Further, the movable member 1852R has a first force receiving surface (retracting force receiving portion, separating force receiving portion) 1852Rm and a second force receiving surface (contact force receiving portion) 1852Rp (see FIG. 171) which can be engaged with the separation control member 196R (FIG. 173) mounted in the apparatus main assembly, and it includes a spring-hooked portion 1852Rs which engages with the tension spring 1853.

Further, as shown in FIG. 165, the ends of the tension spring 1853 are engaged with the spring-hooked portion 1852Rs of the movable member 1852 and the spring-hooked portion 1828*g* of the development cover member 1828, respectively. Therefore, the movable member 1852 is urged by the tension spring 1853 in the upward direction CA about the third support portion 1828*m* as the center of rotation.

[Contact Operation of Developing Unit]

Next, referring to FIGS. 170 to 175, the operation of bringing the photosensitive drum 104 and the developing roller 106 into contact with each other by the separation/contact mechanism 1850R will be described in detail. FIGS. 170, 173, and 177 are perspective views of the drive-side of the process cartridge 1800. FIGS. 171, 174, 175, and 178 are side views of the process cartridge 1800 mounted in the main assembly and the separation control member which will be described hereinafter. In FIGS. 171 and 174, 175 and 178, parts (a) is a side view of the drive-side, and parts (b) is a side view of the non-drive-side. FIGS. 172 and 176 are illustrations of the process cartridge 180 as viewed from above along the directions perpendicular to the rotation axes M2 of the developing roller 106 and U1 and U2. The U1 and U2 directions are perpendicular to the rotation axis M2 of the developing roller 106 and are parallel to the W41 and W42 directions.

In the structure of this embodiment, the development input coupling 132 receives a driving force from the image forming apparatus main assembly 170 in the direction of arrow V2 in FIG. 171 to rotate the developing roller 106. That is, the developing unit 1809 including the development input coupling 132 receives the torque in the arrow V2 direction from the image forming apparatus main assembly 170. As shown in FIG. 170, when the developing unit 1809 is in a separated position and the developing side engaging portion 1854R and the drum side engaging portion 1855R engage with each other, the developing unit 1809 is subjected to the above torque and the development pressure spring described later, so that the developing unit 1809 is held in the separated position against the urging force. Let Tr1 be the torque produced in the developing unit by the torque from the apparatus main assembly 170 and the urging force of the development pressure spring 134, in the V2 direction.

Similarly, to an Embodiment 1, the image forming apparatus main assembly 170 of this embodiment includes the separation control member 196R and the cartridge pressing unit 121 corresponding to each process cartridge 1800 as described above. The separation control member 196R projects toward the process cartridge 1800 and has a space of 196Rd. Further, as in the Embodiment 1 described above, the cartridge pressing unit 121 presses the pressed surface 1852Rf of the movable member 1852R in interrelation with the transition of the front door 111 from the open state to the closed state, and the movable member 1852R moves downward. When it projects to a predetermined position, a part of the movable member enters the space 196Rd of the separation control member 196R, and the separation control member 196R, and the separation control member 196R has a first force application surface 196Ra and a second force application surface 196Rb which are opposed to the first force receiving surface 1852Rm and the second force receiving surface 1852Rp of the movable member 1852R with the space 196Rd therebetween. The first force application surface 196Ra and the second force application surface 196Rb are connected by way of a connecting portion 196Rc on the lower surface side of the image forming apparatus main assembly 170. Further, the separation control member 196R is supported by a control sheet metal (not shown) rotatably about the rotation center 196Re. The separation control member 196R is normally urged in the E1 direction by an urging spring (not shown), and it is restricted in rotation in the rotational direction by a holder (not shown). Further, the control sheet metal (not shown) is structured to be movable in the W41 and W42 directions from the home position by a control mechanism (not shown), and therefore, the separation control member 196R is structured to be movable in the W41 and W42 directions.

When the separation control member 196R moves in the W42 direction, the second force application surface 196Ra of the separation control member 196R and the second force receiving surface 1852Rp of the movable member 1852R come into contact with each other, and the movable member 1852R rotates in the direction CA about the support receiving portion 1852Ra until the development cover pressing surface 1852Rr of the movable member 1852R contacts the movable member locking portion 1828*h* provided on the development cover member 1828. Further, when the separation control member 196R moves in the W42 direction, the movable member 1852R presses the movable member locking portion 1828*h* of the development cover member 1828, so that torque in the V2 direction is produced in the developing unit 1809. Let this torque be Tr2, and the maximum value that can be generated by the main assembly be Tr2MAX.

Next, referring to FIGS. 170-175, the description will be made as to the forces produced in the developing side engaging portion 1854R and the drum side engaging portion 1855R and the behavior of each component at the time when the separation control member 196R described above moves in the W42 direction and a torque in the V2 direction is produced in the developing unit 1809. First, a state in which the developing side engaging surface 1844Rc and the drum side engaging surface 1855Rc are in contact with each other is an engaging state (state in FIG. 170). At this time, of the directions of the normal forces N1 and between the developing side engaging surface 1854Rc and the drum side engaging surface 1855Rc shown in FIGS. 170 and 171, the short side component of the process cartridge is an axis U (FIG. 170). Further, the direction which is parallel to the axis U and in which the developing side engaging portion 1854R moves when the developing unit 1809 rotates in the V2 direction is U1, and the opposite direction is U2. When the developing unit 1809 receives torque in the V2 direction, the developing side engaging portion 1854R receives a force in the U1 direction. The direction from the non-drive-side to the drive-side parallel to the longitudinal direction of the process cartridge 1800 is the direction J1, and the opposite direction is the direction J2. At this time, as shown in FIG. 172, of the normal force produced between the developing side engaging surface 1854Rc and the drum side engaging surface 1855Rc, the normal force applied to the developing side engaging surface 1854Rc is the normal force N1, and the normal force applied to the drum side engaging surface 1854Rc is the normal force N1'. The normal force N1 is produced so that the developing side holding portion 1854Rb bends (elastically deforms) so that the developing side engaging claw 1854Ra rotates counterclockwise in FIG. 172 about the fulcrum S. The normal force N1' is produced so that the drum side engaging claw 1855Ra bends (elastically deforms) the drum side holding portion 1855Rb so as to rotate counterclockwise in FIG. 172 about the fulcrum S'. That is, the developing side holding portion 1854Rb bends in the J1 direction, and the drum side holding portion 1855Rb bends in the J2 direction. Then, when the developing side engaging portion 1854R receives a predetermined force in the U2 direction and moves in the U2 direction, the developing side holding portion 1854Rb and the drum side holding surface 1855Rb are bent until the developing side engaging surface 1854Rc and the drum side engaging surface 1855Rc do not contact each other, by which the engagement is broken. In this manner, the state in which the developing side holding portion 1854Rb and the drum side holding portion 1855Rb are bent until the developing side engaging surface 1854Rc and the drum side engaging surface 1855Rc do not contact with each other, can be said that the developing side engaging portion 1854R and the drum side engaging portion 1855R constituting the spacer is in the permission position (second position, disengaging position), respectively. Further, the magnitude of the force required to disengage this engagement is Fa.

After the engagement is released, the developing side engaging portion 1854R and the drum side engaging portion 1855R are flexed by restoring the elastic deformation of the developing side holding portion 1854Rb and the drum side engaging portion 1855Rb as shown in FIG. 173, by which the deformation is released. Then, the development side engagement return surface 1854Rd and the drum side engagement return surface 1855Rd become in a state of facing each other. At the same time, the developing unit 1809 rotates in the V2 direction and moves to the contact position (development position) where the developing roller 106 and the photosensitive drum 104 are in contact with each other (state in FIG. 174). At this time, the separation control member 196R has moved in the W42 direction by a sufficient amount to disengage the developing side engaging portion 1854R and the drum side engaging portion 1855R from each other, and this position after the movement (FIG. 174) is the first position. It is preferable that the distance between the home position and the first position is small because the main assembly mechanism for driving the separation control member 196R can be downsized and the load can be reduced. Further, by increasing the distance between the developing side engaging portion 1854R and the swing axis K, the amount of movement of the developing side engaging portion 1854R can be increased, and the amount of rotation of the developing unit 1809 required to disengage the developing side engaging portion 1854R and the drum side engaging portion 1855R from each other can be reduced. After moving to the first position, the separation control member 196R moves in the W41 direction and returns to the home position. At this time, the movable member 1852R is rotated in the CB direction by the tension spring 1853, and the first pressing surface 1852Rq of the movable member 1852R and the first pressing surface 1828*k* of the development cover member 1828 come into contact with each other (state of FIG. 175). By this, gaps T3 and T4 are formed, and the separation control member 196R is placed at a position not acting on the movable member 1852R. The transition from the state of FIG. 174 to the state of FIG. 175 is performed without a delay.

As described above, in the structure of this embodiment, the movable member 1852R is rotated by the movement of the separation control member 196R from the home position to the first position, and further, by the movable member coming into contact with the development cover member to cause the developing unit 1809, the developing side engaging portion 1854R and the drum side engaging portion 1855R are moved to a permission position (second position), thus these engagements are released. This makes it possible for the developing unit 1809 to move from the spaced position to the contacting position where the developing roller 106 and the photosensitive drum 104 are in contact with each other. The position of the separation control member 196R in FIG. 175 is the same as that in FIG. 171.

Here, it will be described how the magnitudes of torque and force produced in the process of transitioning the developing unit 1809 from the spaced state to the contacted state are selected. As shown in FIG. 171, let L be the length of the line segment Y connecting the swing axis K and the contact points between the developing side engaging surface 1854Rc and the drum side engaging surface 1855Rc as the process cartridge 1800 is viewed from the longitudinal drive-side, and let θ be the angle formed by the line segment Y and the above-mentioned direction U. When the relationship between Tr1, Tr2, and Fa described above is expressed using L and θ, the selection is made to satisfy the following formulas (1) and (2):

$$Tr1/L \sin\theta < Fa \quad (1)$$

$$(Tr1+Tr2MAX)/L \sin\theta > Fa \quad (2)$$

[Separation Operation of Development Unit]

Next, referring to FIGS. 171 and 175 to 178, the operation of moving the developing unit 1809 from the contact position to the separated position by the separation/contact mechanism 1850R will be described in detail.

The separation control member 196R in this embodiment is structured to be movable from the home position in the direction of arrow W41 in FIG. 175. When the separation control member 196R moves in the W41 direction, the first force application surface 196Rb and the first force receiving surface 1852Rm of the movable member 1852R are brought into contact with each other, and the movable member 1852R rotates in the CB direction about the support receiving portion 1852Ra in the direction of CB. By the first pressing surface (not shown) of the movable member 1852R contacting the first pressing surface (not shown) of the development cover member 1828, the developing unit rotates in the V1 direction from the contact position. By the developing unit rotating in the V1 direction, the developing side engaging portion 1854R moves in the U2 direction, and the developing side re-engagement assisting surface 1855Rd and the drum side re-engagement assisting surface 1854Rd are brought into contact with each other. Further, by the separation control member 196R moving in the 41 direction, torque in the V1 direction is generated in the developing unit 1809 about the swing axis K. The magnitude of the torque in the V1 direction is Tr3, and the maximum value which can be produced by the main assembly is Tr3MAX. Since Tr3MAX is designed to satisfy Tr3MAX>Tr1, the developing unit 1809 rotates in the V1 direction.

Next, referring to FIGS. 175 to 178, the description will be made as to the forces to the developing side engaging portion 1854R and the drum side engaging portion 1855R and the behavior of each component at the time when the separation control member 196R described above moves in the W41 direction and the developing unit 1809 rotates in the V1 direction. When the developing unit 1809 rotates in the V1 direction, the developing side engaging portion 1854R moves in the U2 direction. When the developing side engaging portion 1854R moves in the U2 direction, the developing side re-engagement assisting surface 1854Rd and the drum side re-engagement assisting surface 1855Rd are brought into contact with each other. At this time, as shown in FIG. 176, of the normal force produced between the development side engagement return surface 1854Rd and the drum side engagement return surface 1855Rd, the normal force applied to the development side engagement return surface 1854Rd is the normal force N2, and the normal force applied to the drum side engaging surface 1854Rd is the normal force N2'. The normal force N2 is produced so that the developing side holding portion 1854Rb bends (elastically deforms) so as to rotate the developing side engaging claw 1854Ra counterclockwise in FIG. 176 about the fulcrum S. The normal force N2' is produced so that the drum side engaging claw 1855Ra bends (elastically deforms) the drum side holding portion 1855Rb in the direction of rotating counterclockwise in FIG. 176 about the fulcrum S'. That is, the developing side holding portion 1854Rb bends in the direction J1, and the drum side holding portion 1855Rb bends in the direction J2. Then, when the developing side engaging portion 1854R receives a predetermined force in the U1 direction and moves in the U2 direction, the developing side holding portion 1854Rb and the developing side holding portion 1854Rb deform until the developing side re-engagement assisting surface 1854Rd and the drum side re-engagement assisting surface 1855Rd become out of contact with each other. In this state, it can be said that the developing side engaging portion 1854R and the drum side engaging portion 1855R constituting the spacer are in the permission positions (second position, disengagement position), respectively. The constant force that the developing side engaging portion 1854R receives in the U2 direction is Fb.

Further, as the developing side engaging portion 1854R advances in the U2 direction, the bending of the developing side holding portion 1854Rb and the drum side engaging portion 1855Rb is released as shown in FIG. 177, and the developing side engaging surface 1854Rc and a drum side engaging portion 1855Rc becomes in a state of facing each other. That is, the developing side engaging portion 1854R and the drum side engaging portion 1855R are engaged. At this time, by the movement of the separation control member 196R in the W41 direction until a gap is formed between the developing side engaging surface 1854Rc and the drum side engaging surface 1855Rc in the W42 direction, the developing side engaging portion 1854R and the drum side engaging portion 1855R are securely engaged with each other. The position (FIG. 178) of the separation control member 196R after the movement is the second position. After moving to the second position, the separation control member 196R moves in the W42 direction and returns to the home position. At this time, the developing unit 1809R is rotated in the V2 direction by the development pressure spring 134, so that the developing side engaging surface 1854Rc and the drum side engaging surface 1855Rc are brought into contact with each other (state in FIG. 171). At this time, it can be said that the developing side engaging portion 1854R and the drum side engaging portion 1855R constituting the spacer are at the restriction positions (first position, engaging position), respectively. At this time, the gap T3 and the gap T4 are formed, and the separation control member 196R is placed at a position of not acting on the movable member 1852R. The transition from the state of FIG. 178 to the state of FIG. 171 is performed without a delay.

As described above, in this embodiment, by the separation control member 196R moving from the home position to the second position, the developing side engaging portion 1854R moves in the U2 direction, and the developing side engaging portion 1854R engages with the drum side engaging portion 1855R. Then, by the separation control member 196R returning from the second position to the home position, the developing side engaging surface 1854Rc and the drum side engaging surface 1855Rc are brought into contact with each other, and the developing unit 1809 is maintained at the separated position (retracted position) by the spacer (developing side engaging portion 1854R and the developing side engaging portion 1854R)

Here, it will be described how the magnitudes of the torque and the force generated in the process of transitioning from the contacted state to the spaced state of the developing unit 1809 described above are determined. As shown in FIG. 175, Let L' be the length of the line segment Y' connecting the swing axis K and the contact points between the developing side engaging surface 1854Rc and the drum side engaging surface 1855Rc as the process cartridge 1800 is viewed from the longitudinal drive-side, and let θ' be the angle formed by the line segment Y' and the above-mentioned direction U. The relationship between Tr1, Tr3, and Fb are determined to satisfy the following, using L' and θ':

$$(Tr3\text{MAX}-Tr1)/L' \sin\theta' \geq Fb \quad (3)$$

In this embodiment, when the developing unit 1809 is moved from the retracted position (separation position) to the development position (contact position) and when it is moved from the development position (contact position) to the retracted position (separation position), both the side holding portion 1854Rb and the drum side holding portion 1855Rb elastically deform, but at least one of them may be flexed (elastically deformed). Even when only one of the developing side holding portion 1854Rb and the drum side holding portion 1855Rb bends (elastic deformation), it can be said that in this bent state, the developing side engaging portion 1854R and the developing side engaging portion 1854R constituting the spacer are in the permission position (second position, disengagement position).

Further, in this embodiment, the developing side engaging portion 1854R and the developing side engaging portion 1854R are structured to engage and disengage by a snap-fit structure, but use may be made to a magnetic force such as a magnet or a hook-and-loop fastener to engage and disengage them.

As described above, according to this embodiment, the same effects as those of Examples 1 and 9 can be provided.

Further, in the Embodiment 1 and so on, it is necessary that the spacer is be movably supported by either the developing frame or the drum frame, but in this embodiment, the members constituting the spacer are bent (elastically deformed), and therefore, the structure can be simplified accordingly. Further, by integrally forming it on the developing frame and the members constituting the drum frame as in this embodiment, the cost of the process cartridge 1800 can be reduced by improving the assembling property and reducing the number of parts.

Embodiment 18

Referring to FIGS. 179, 180, and 181, an embodiment of the process cartridge and the image forming apparatus according to the eighteenth embodiment of the present invention will be described. In this embodiment, structures and operations different from those of the above-described embodiment will be mainly described, and description of similar structures and operations will be omitted. Further, for the structure corresponding to the above-described embodiments, the same reference numerals and characters are assigned, or the reference numerals in the first part is changed while the reference numerals and characters in the second part are the same.

In this embodiment, the development cover member 2033 has a force receiving portion (first force receiving portion, contact force receiving portion) 2033*e*, and the spacer 2010 has a retracting force receiving portion (second force receiving portion, separating force receiving portion) 2010*m*.

FIG. 181 is a perspective view of the drive-side cartridge cover 2020 per se. The drive-side cartridge cover 2020 of this embodiment has a deformation portion 2020*f*. The deformation portion 2020*f* comprises an arm portion 2020*e*, a first contacted surface 2020*c*, and a third contacted surface 2020*d*. One end of the arm 2020*e* is fixed to the outer peripheral surface of the cylindrical portion forming the supporting hole 2020*b* which supports the photosensitive drum 4, and extends toward the supporting hole 2020*a* in which the developing unit 9 is supported. A first contacted surface 2020*c* and a third contacted surface 2020*d* are arranged at the other end. That is, the deformation portion 2020*f* has a cantilever shape in which one end is fixed, and when the arm 2020*e* is deformed, the first contacted surface 2020*c* and the third contacted surface 2020*d* on the other end side can move up and down substantially in the direction of arrow Z2 in FIG. 181 which is the direction of gravity. Here, as shown in part (a) of FIG. 181, the state in which the arm 2020*e* is not deformed is a the maintaining state of the deformation portion 2020*f*. Further, as shown in part (b) of FIG. 181, the state in which the arm 2020*e* is deformed, and the first contacted surface 2020*c* and the third contacted surface 2020*d* are moved from the maintaining state in the direction of arrow Z2 in Figure (downward in the direction of gravity) is the permission state of the deformation portion 2020*f*. Details of the maintaining state and the permission state of the deformation portion 2020*f* will be described in detail hereinafter.

FIGS. 179 and 180 are illustrations of the process cartridge P placed in the second inner position inside the image forming apparatus main assembly 502 as in FIG. 2 concerned with Embodiment 9 as viewed from the drive-side. For better illustration, the drive-side cartridge cover is shown with omission of the parts other than the arm 2020*e* of the deformation portion 2020*f*, the first contacted surface 2020*c*, and the third contacted surface 2020*d*.

Part (a) of FIG. 179 shows a state in which the spacer 2010 is in the permission position (second position), the developing unit 9 is in the developing position (contact position), and the separation control member 540 is in the home position. In part (b) of FIG. 179 and part (c) of FIG. 179 show a state in the process of the separation control member 540 moving from the home position to the second position, the spacer 2010 moving from the permission position (second position) to the regulated position (first position), and the developing unit 9 moving from the developing position (contact position) to the retracting position (separation position). Part (d) of FIG. 179 shows a state in which the spacer 2010 is in the restriction position (first position), the developing unit 9 is in the retracted position (separation position), and the separation control member 540 is in the home position.

The spacers (restriction member, spacing member, holding member) 2010 of this embodiment are similar to those of the Embodiment 9, and as shown in part (a) of FIG. 179, there are provided the supported hole (second contact portion) 2010*a* and the projecting portion (holding portion) Part) 2010*b*, the first contact surface (contact part) 2010*c*. The supported hole (second contact portion) 2010*a* is rotatably supported by a support portion 2033*c*, which is the shaft of the development cover member 2033. Further, the spacer 2010 is urged by a tension spring 530 (a urging means) in the direction of arrow B1 in part (a) of FIG. 179. Further, the spacer 2010 is provided with a retracting force receiving portion (second force receiving portion, separating force receiving portion) 2010*m* similar to Embodiment 10. The retracting force receiving portion 2010*m* has a shape projecting in the direction of arrow Z2 in part (a) of FIG. 179.

The development cover member 2033 of this embodiment is fixed to the developing unit 9 in the same manner as in the Embodiment 9. The force receiving portion 2033*e* provided on the development cover member 2033 has a shape projecting in the direction of arrow Z2 in part (a) of FIG. 179, similarly to the retracting force receiving portion 2010*m*.

The separation control member 540 of this embodiment is provided in the image forming apparatus main assembly 502 as in the Embodiment 9. As shown in part (a) of FIG. 179, the force receiving portion 2033*e*, the separation control member 540, and the retracting force receiving portion 2010*m* are arranged in this order in the direction of the arrow W51 in part (a) of FIG. 179. Similarly to Embodiment 9, the separation control member 540 is movable. Further, the separation control member 540 is structured to be movable between the first position and the second position to the home position where the force receiving portion 2033*e* and the retracting force receiving portion 2010*m* do not contact with each other, between the first position and the second position.

[Separation Operation]

Referring first to FIG. 179, the operation of moving the developing unit 9 from the developing position (contact position) to the retracted position (separation position) will be described. When the separation control member 540 moves in the direction of the arrow W51 in part (a) of FIG. 179 which is the direction toward the second position from the home position shown in part (a) of FIG. 179, the first force application surface 540*b* and the retracting force receiving portions 2010*m* of the spacer 2010 are brought into contact with each other so that the first force application surface 540*b* presses the portion 2010*m*. The spacer 2010 of which the retracting force receiving portion 2010*m* is pressed presses the third contacted surface 2020*d* of the deformation portion 2020*f* at the third contact surface 2010*k* in the direction of the arrow N6 in part (b) of FIG. 179, while rotating in the direction of the arrow B1 in part (b) of FIG. 179, which is the direction from the permission position to the restriction position. Then, in the deformation portion 2020*f* pressed at the third contacted surface 2020*d*, the arm 2020*e* is deformed, and the first contacted surface 2020*c* and the third contacted surface 2020*d* are moved in the direction of the Z2 in part (b) of FIG. 179, and it changes from the maintaining state to the permission state in which the cantilever is bent (elastically deformed) (state in part (b) of FIG. 179). As shown in part (b) of FIG. 179, when the deformed portion changes from the maintaining state to the permission state, the developing unit 9 rotates in the direction of the arrow V1 in part (b) of FIG. 179 and can move from the developed position to the retracted position.

Further, as shown in part (c) of FIG. 179, when the separation control member 540 moves to the second position, the spacer 2010 and the deformation portion 2020*f* are separated from each other, by which the deformation portion 2020*f* returns from the permission state to the maintaining state by the elastic force.

Further, when the separation control member 540 moves from the second position in the direction of the arrow W52 in part (c) of FIG. 179 back to the home position again, the separation control member 540 and the spacer 2010 are separated from each other, and the developing unit 9 is rotated in the direction of the arrow V2 in part (c) of FIG. 179 by the driving force received by the development coupling member 74. Then, the first contact surface (contact portion) 2010*c* of the spacer 2010 placed at the restriction position (first position) and the first contact surface (contact portion) 2020*c* of the deformation portion 2020*f* contact with each other, and the attitude of the developing unit 9 is maintained at the retracted position (separated position) (state shown in part (d) of FIG. 179).

As shown in part (d) of FIG. 179, since the separation control member 540 placed at the home position is separated from the spacer 2010, the separation control member 540 is not loaded by the developing unit 9.

As described above, the developing unit 9 can be moved from the development position (contact position) to the retracted position (separation position) by the operation of the separation control member 540 moving from the home position to the second position and returning to the home position again.

[Contact Operation]

Next, referring to FIG. 180, the operation of moving the developing unit 9 from the retracted position (separation position) to the developing position (contact position) will be described.

Part (a) of FIG. 180 shows a state in which the spacer 2010 is in the restriction position (first position), the developing unit 9 is in the retracted position (separation position), and the separation control member 540 is in the home position. Part (b) of FIGS. 180 and 180 (*c*) show a state in which the separation control member 540 is moving from the home position toward the first position and the developing unit 9 is moving from the retracted position to the developing position. Part (d) of FIG. 180 shows a state in which the spacer 2010 is in the permission position (second position), the developing unit 9 is in the developing position (contact position), and the separation control member 540 is in the home position.

When the separation control member 540 moves from the home position in the direction of the arrow W52 in part (a) of FIG. 180, which is the first position direction, the second force application surface 540*c* of the separation control member 540 and the force receiving portion 2033*e* of the development cover member 2033 are brought into contact with each other (state in part (b) of FIG. 180). Further, when the separation control member 540 moves in the first position direction, the force exerted by the first contact surface 2010*c* on the first contacted surface 2020*c* in the direction of arrow N7 in part (b) of FIG. 180 increases. Then, the arm 2020*e* is deformed by this force, and the first contacted surface 2020*c* and the third contacted surface 2020*d* move in the direction of arrow Z2 in part (b) of FIG. 180. That is, the deformation portion 2020*f* bends (elastically deforms) and shifts from the maintaining state to the permission state (State of part (c) of FIG. 180).

When the separation control member 540 further moves in the direction of the arrow W52 in part (c) of FIG. 180 from the state shown in part (c) of FIG. 180, the developing unit 9 rotates in the direction of the arrow V2 in part (c) of FIG. 180 and moves from the retracted position to the developed position by a force received from the second force application surface 540*c* by the force receiving portion 2033*e*. At this time, while the third contacted surface 2020*d* is in contact with the third contact surface 2010*k* of the spacer 2010, the deformation portion 2020*f* returns from the permission state to the maintaining state by the elastic force. At the same time, the spacer 2010, which receives a reaction force on the third contact surface 2010*k*, rotates in the direction of arrow B2 in part (c) of FIG. 180 relative to the developing unit 9, and the phase of the spacer 2010 changes from the restriction position (first position) to the permissible position (second position).

The separation control member 540 moves from the home position to the second position, moves the attitude of the developing unit 9 from the retracted position to the developing position, and then moves in the direction of the arrow W52 in part (d) of FIG. 180 to return to the home position again.

As shown in part (d) of FIG. 180, the separation control member 540 placed at the home position is separated from the force receiving portion 2033*e*, and therefore, the separation control member 540 is not loaded by the developing unit 9.

As described above, the developing unit 9 can be moved from the retracted position to the developed position by the operation of the separation control member 540 moving from the home position to the first position and returning to the home position.

Further, in this embodiment, the deformation portion 2020*f* has been described as having a beam shape, but the present invention is not limited to such an example. The structure may be such that a shape different from the beam shape may be deformed, so that the first contacted surface 2020*c* and the third contacted surface 2020*d* are movable between the permission state in which the developing unit 9 can rotate, the maintaining state in which the attitude thereof is maintained with the developing unit 9 being in the retracted position and the developing position. The deformation portion 2020*f* is structured to move between the permission state and the maintaining state relative to the drive-side cartridge cover 2020 so that the spacer 2010 can move between the restriction position and the permission position. Therefore, it can be said that the deformation portion 2020*f* is a spacer on the drum unit side.

According to the structure of this embodiment described above, the same effects as those of the first and Embodiment 9s can be provided.

Further, in this embodiment, the development cover member 2033 fixed to the developing unit 9 is provided with the force receiving portion 2033*e*, and the spacer 2010 is provided with the retracting force receiving portion 2010*m*, by which the attitude of the developing unit 9 can be controlled stably.

Embodiment 19

Referring to FIG. 182, an embodiment of the process cartridge and the image forming apparatus according to the nineteenth embodiment of the present invention will be described. In this embodiment, structures and operations different from those of the above-described embodiment will be mainly described, and description of similar structures and operations will be omitted. For the structure corresponding to that in the above-described embodiment, the same reference numerals and characters are assigned, or the reference numerals in the first part is changed while the reference numerals and characters in the second part are the same.

In this embodiment, the force receiving portion (first force receiving portion, contact force receiving portion) 2133*e* and the retracting force receiving portion (second force receiving portion, separating force receiving portion) 2133*m* are provided on the cover member 2133 fixed to the developing unit 9.

Further, the drive-side cartridge cover 2020 of this embodiment is the same as that of the 18th embodiment, and has a structure having a deformation portion 2020*f*.

FIG. 182 is a view of the process cartridge P placed at the second inner position inside the image forming apparatus main assembly 502 as viewed from the drive-side, as in FIG. 2 of the Embodiment 9. For better illustration, the drive-side cartridge cover 2020 is shown with the parts being omitted with the exception of the arm 2020*e* of the deformation portion 2020*f*, the first contacted surface 2020*c*, and the third contacted surface 2020*d*.

Part (a) of FIG. 182 shows a state in which the spacer 2110 is in the permission position (second position), the developing unit 9 is in the developing position (contact position), and the separation control member 540 is in the home position. Part (b) of FIG. 182 and part (c) of FIG. 182, shows the state in which the separation control member 540 is moving from the home position to the second position, and the developing unit 9 is moving from the developing position (contact position) to the retracting position (separation position). Part (d) of FIG. 182 shows a state in which the spacer 2110 is in the restriction position (first position), the developing unit 9 is in the retracted position (separation position), and the separation control member 540 is in the home position.

As shown in part (a) of FIG. 182, the spacer (restriction member, holding member, separation holding member) 2110 of this embodiment includes a supported hole (second contact portion) 2110*a*, a projecting portion (holding portion) 2110*b*, and a first contact surface (contact part) 2110*c*, as in the Embodiment 9. The supported hole 2110*a* is rotatably supported by the support portion 2133*c*, which is the shaft of the development cover member 2133, and the spacer 2110 is urged in the direction of the arrow B1 in part (a) of FIG. 182 by the tension spring 530 (biasing means).

Further, the development cover member 2133 of this embodiment is fixed to the developing unit 9 in the same manner as in the Embodiment 9. The development cover member is provided with the force receiving portion 2133*e* which is the same as in embodiment 21, and further is provided further with a retracting force receiving portion 2133*m*. Similar to the force receiving portion 2133*e*, the retracting force receiving portion 2133*m* has a shape projecting in the direction of arrow Z2 in part (a) of FIG. 182.

The separation control member 540 of this embodiment is included in the image forming apparatus main assembly 502 as in the Embodiment 9. As shown in part (a) of FIG. 182, the separation control member 540 is disposed between the projecting force receiving portion 2133*e* and the retracting force receiving portion 2133*m* (in the direction of the arrows W51 and W52 in part (a) of FIG. 182).

Similarly to the Embodiment 9, the separation control member 540 can move between the first position and the second position. Further, the separation control member 540 is structured to be movable to the position not contacting the force receiving portion 2133*e* and the retracting force receiving portion 2133*m*, between the first position and the second position to a home position.

[Separation Operation]

Referring to FIG. 182, the operation of moving the developing unit 9 from the development position (contact position) to the retracted position (separation position) will be described.

When the separation control member 540 moves from the home position shown in part (a) of FIG. 182 to the direction of the arrow W51 in part (a) of FIG. 182, which is the second position direction, the first force application surface 540*b* and the retracting force receiving portion 2133*m* come into contact with each other, and the first force application surface 540*b* presses the retracting force receiving portion 2133*m*. When the retracting force receiving portion 2133*m* is pressed, the developing unit 9 rotates from the developing position to the retracting position in the direction of the arrow V1 in part (a) of FIG. 182. At this time, the attitude of the spacer 2110 is restricted by the contact between the third contact surface 2110*k* of the spacer 2110 and the third contacted surface 2020*d*.

Further, when the separation control member 540 moves in the direction of the arrow W51 in part (b) of FIG. 182 to the second position, the third contact surface 2110*k* and the third contacted surface 2020*d* are separated from each other, and the spacer 2110 is rotated from the permission position (second position) to the restriction position (first position) by the urging force of a tension spring 530 (State of part (c) of FIG. 182).

When the separation control member 540 moves from the second position in the direction of the arrow W52 in part (c) of FIG. 182 and returns to the home position again, the developing unit 9 is rotated in the V2 direction by the driving force received by the development coupling member as shown by the arrow in part (c) of FIG. 182. Then, the first contact surface (contact portion) 2110*c* of the spacer 2110 located at the restriction position and the first contacted surface (contacted portion) 2020*c* of the deformation portion 2020*f* which is in the maintaining state come into contact with each other, and the attitude of the developing unit 9 is maintained in the retracted position (state shown in part (d) of FIG. 182).

As shown in part (d) of FIG. 182, since the separation control member 540 located at the home position is separated from the spacer 2110, the separation control member 540 is not loaded by the developing unit 9.

In the manner described above, the developing unit 9 can be moved from the development position to the retracted position by the operation of the separation control member 540 moving from the home position to the second position and returning to the home position again.

In this embodiment, when the developing unit 9 moves from the developing position to the retracted position, the deformation portion 2020*f* does not change from the maintaining state to the permission state. On the other hand, when the developing unit 9 moves from the retracted position to the developing position, the deformation portion 2020*f* is changed to the maintaining state and the permission state as in above-described Embodiment 18.

In this embodiment, the deformation portion 2020*f* has been described as having a beam shape, but the present invention is not limited to such an example. The structure may be such that the shape different from the beam shape is deformed, and the first contacted surface 2020*c* and the third contacted surface 2020*d* are movable between an permission state in which the developing unit 9 can rotate, and the maintaining state in which the attitude is maintained with the developing unit 9 being in the retracted position and the developing position.

The deformation portion 2020*f* is structured to move between the permission state and the maintaining state relative to the drive-side cartridge cover 2020 so that the spacer can move between the restriction position and the permission position. Therefore, it can be said that the deformation portion 2020*f* is a spacer on the drum unit side.

According to the structure of this embodiment described above, the same effects as those of the first and Embodiment 1 and 9 can be provided.

Further, in this embodiment, the attitude of the developing unit 9 can be stably controlled with the structure in which the development cover member 2133 fixed to the developing unit 9 has the force receiving portion (first force receiving portion, contact force receiving portion) 2133*e* and the retracting force receiving portion (second force receiving portion, separating force) 2133*m*.

Embodiment 20

Referring to FIGS. 183 to 191, Embodiments of the process cartridge and the image forming apparatus according to embodiment 22 of the present invention will be described.

In this embodiment, structures and operations different from those of the above-described embodiment will be mainly described, and description of similar structures and operations will be omitted. For the structure corresponding to that in the above-described embodiment, the same reference numerals and characters are assigned, or the reference numerals in the first part is changed while the reference numerals and characters in the second part are the same.

[Constituent Parts]

First, the structure of each component in this embodiment will be described.

The lever 22510 is provided with a force receiving portion (first force receiving portion, contact force receiving portion) 22510*e* and a retracting force receiving portion (second force receiving portion, separating force receiving portion) 22510*a*. Further, the lever 22510 is supported, at the supported hole 22510*d* thereof, by a supporting shaft 2233*b* provided in the development cover member 2233 which is a portion of the development frame and is rotatably mounted. Further, the lever 22510 is provided with an abutting portion 22510*b*.

A stopper portion 2233*a* is integrally provided on the development cover member 2233. By abutting against the abutting portion 22510*b*, the clockwise (V4 direction) and counterclockwise (V3 direction) rotation of the lever 22510 is restricted.

[Spring]

A tension spring (separation direction urging member) 22541 and a tension spring (contact direction urging member) 22542 are mounted between the drum unit 2208 and the developing unit 2209. The hook portion 22541*b* on one end side of the tension spring is mounted to the boss 2208*b* which is a portion of the drum frame of the drum unit 2208.

The other end hook portion 22541*a* of the tension spring 22541 is mounted to a boss 2209*a* which is a portion of the developing frame of the developing unit 2209. A counterclockwise moment (in the V1 direction) about the swing axis K acts on the developing unit 2209 by the tension spring 22541. Next, the tension spring 22542 will be described.

One end side hook portion 22542*b* of the tension spring 22542 is mounted to a boss 2208*c* which is a portion of the drum frame of the drum unit 2208. The other end hook portion 22542*a* of the tension spring 22542 is mounted to a shaft member 22511 which can slide in the oblong round hole 22510*c* of the lever 22510. The shaft member 22511 is constrained from moving in a direction parallel to the direction of the developing roller rotation axis M2, and can slide only in the longitudinal direction of the oblong round hole 22510*c*. By this tension spring 22542, it is possible to apply a clockwise moment (in the V2 direction) about the swing axis K to the developing unit 2209.

[Outline of Operation]

Next, referring to part (a) of FIG. 184 and part (b) of FIG. 184, the outline of the operation of this embodiment will be described. In the state of part (a) of FIG. 184, the developing unit 2209 is in the retracted position (separated position) with respect to the drum unit 2208 by the urging force of the tension spring 22541, in the free state of the process cartridge. At this time, the moment M2' produced by the tension spring 22542 is smaller than the moment M1' produced by the tension spring 22541. Further, the abutting portion 2209*b* of the developing unit 2209 and the abutting portion 2208*d* of the drum unit 2208 are in contact with each other, and the rotation of the developing unit 2209 in the arrow V1 direction is restricted. Therefore, it can be said that the drum unit 2208 stably maintains the developing unit 2209 in the retracted position (separated position). At this time, it is assumed that the lever 22510 and the tension spring 22542 constituting the holding portion are in the first positions for the drum unit 2208 to stably hold the developing unit in the retracted position (separation position).

As having been described in Embodiment 1, the separation control member 22540 moves from the home position to the first position (direction of arrow W52) and returns to the home position. By this, the lever 22510 rotates about the rotation center 22510*d* to move to the second position (part (b) of FIG. 183). By this operation, the relative position of the other end hook 22542*a* of the tension spring 22542 to the oblong round hole 22510*c* of the shaft member 2251 changes, such that the distance from the swing axis center K to the shaft member 22511 increases (L1 and L2'). At this time, the moment M2 produced by the tension spring 22542 is larger than the moment M1 produced by the tension spring 22541. By this, the developing unit 2209 moves from the retracted position (part (a) of FIG. 184) to the developing position (part (b) of FIG. 184). At this time, the developing roller and the photosensitive member drum 104 are in contact with each other, and the rotation of the developing unit 2209 in the arrow V2 direction is restricted. Therefore, it can be said that the drum unit 2208 stably maintains the developing unit 2209 at the developing position (contact position). At this time, it is assumed that the lever 22510 and the tension spring constituting the holding portion are in the second positions for the drum unit 2208 to stably maintains the developing unit 2209 at the developing position (contact position).

[Contact Operation]

Next, referring to FIGS. 185 to 187, the details of the operation of the developing unit 2209 moving from the retracted position (separated position) to the developing position (contact position) will be described. First, as shown in part (a) of FIG. 185, the separation control member 22540 moves in the direction of arrow W52. Next, the separation control member 22540 further moves in the direction of the arrow W52 while contacting and pressing the force receiving portion (first force receiving portion, contact force receiving portion) 22510*e*, and the developing unit 2209 is rotated about the swing axis K in the direction of arrow V2 (direction from the retracted position to the developed position). Then, by contacting of the developing roller 105 to the photosensitive drum 104, the position of the developing unit 2209 is determined at the developing position, and the rotation is stopped.

Further, when the separation control member 22540 continues to move in the direction of arrow W52, and the lever 22510 is rotated in the V4 direction (from the first position to the second position) about the rotation center 22510*d* the lever 22510 with the movement of the force receiving portion 22510*e* in the direction of W52. When the angle (0 shown in part (a) of FIG. 186) formed by the central axis of the oblong round hole 22510*c* and the coil central axis of the tension spring 22542 exceeds 90°, The shaft member 22511 connected to the other end of the tension spring 22542 slides in the oblong round hole 22510*c* of the lever 22510 in the direction of arrow W53. Then, when the line connecting the center of the shaft member 22511 and the center of the boss 2208*c* exceeds the neutral point (in this case, the rotation center 2510*d*), the lever is rotated in the arrow V4 direction by the tensile force of the tension spring 22542. Finally, as shown in part (b) of FIG. 186, the first abutting portion 22510*b*1 of the abutting portion 22510*b* of the lever 22510 abuts against the first stopper portion 2233*a*1 of the stopper portion 2233*a*. By this, the rotation of the lever 22510 in the arrow V4 direction is stopped, and the position is determined at the second position. Further, the position of the shaft member 22511 is determined by abutting at the end portion 22510*f* of the oblong round hole 22510*c*, and the tension force of the tension spring 22542 acts on the developing unit 2209. Although the details will be described hereinafter, in this state, as to the rotational moment around the rotational axis K, the rotational moment M2 produced by the tension spring 22542 is larger than the rotational moment M1 produced by the tension spring 22541, and therefore, the developing unit 2209 can be maintained at the developing position (contact position).

Next, the separation control member 22540 moves in the direction of arrow W51. And, it return to the position (home position) in which the separation control member and the lever 22510 are not in contact with each other, and the movement of the developing unit 2209 from the retracted position to the developing position is completed.

[Separation Operation]

Next, the operation from the developing position (contact position) to the retracting position (separation position) will be described. As shown in part (a) of FIG. 188, when the developing unit is in the developing position, the separation control member 22540 starts moving in the direction of arrow W51.

Then, the first force application surface 22540*b* of the control member 22540 abuts and presses the retracting force receiving portion (second force receiving portion, separating force receiving portion) 22510*a* of the lever 22510, by which the developing unit 2209 starts to rotate in the arrow V1 direction (direction from the development position to the retracted position). When the abutting portion 2209*b* of the developing unit 2209 and the abutting portion 2208*d* of the drum unit 2208 come into contact with each other as shown in part (b) of FIG. 188, the rotation of the developing unit 2209 in the arrow V1 direction is restricted, and the position of the developing unit is determined at the retracted position.

Then, as shown in part (a) of FIG. 189, when the separation control member 22510 continues further to move in the direction of the arrow W51, the retracting force receiving portion 22510*a* is further pressed and the lever 22510 is rotated in the direction of the arrow V3 (direction from the second position to the first position) about the rotation center **22510*d*. Then, the shaft member 2251 to which the other end hook 22542*a* is connected slides in the oblong round hole 22510*c* in the direction of arrow W53. Further, when the separation control member 22510 moves in the direction of the arrow W51, the line connecting the position of the tension spring 22542 with the center of the shaft member 22511 and the center of the boss 2208*c* goes beyond the neutral point (in this case, the rotation center 2510*d*). As shown in part (b) of FIG. 189, after passing through the neutral point, the shaft member 22511 further moves in the oblong round hole 22510*c* in the direction of arrow W53 by the tension force of the tension spring 22542. When the shaft member 22511 abuts to the upper end of the oblong round hole 22510*c* so that the movement in the W53 direction is stopped, the lever 22510 is rotated in the arrow V3 direction by the force of the tension spring 22542**.

Then, as shown in part (a) of FIG. 190, the lever 22510 abuts finally against the second stopper portion **2233*a*2 of the stopper portion 2233*a* at the second abutting portion 22510*b*2 of the abutting portion 22510*b*. By this, the rotation of the lever 22510 relative to the development cover member 2233 is stopped, and the position is determined at the first position. Although the details will be described hereinafter, in this state, the distance between the tension spring 22542 and the swing axis K is shorter than the distance between the tension spring 22541 and the swing axis K, so that the rotation moment M2' in the arrow V2 direction is less than the moment at the developed position. Then, since it is smaller than the rotational moment M1' in the V1 direction generated by the tension spring 22541, it is possible to maintain the attitude of the retracted position (separation position). Then, as shown in part (b) of FIG. 190, the separation control member moves in the direction of arrow W52, returns to a position (home position) not in contact with the separation control member 22540 and the lever 22510**, and the movement operation to the retracted position is completed.

[Relationship of Forces]

Next, referring to part (a) of FIG. 191 and FIG. 191(*b*), the relationship between the forces acting on the developing unit when the developing unit 2209 is in the developing position and the retracted position will be described. Part (a) of FIG. 191 is an illustration showing the force acting on the developing unit 2209 at the developing position, and part (b) of FIG. 191 is an illustration showing the force acting on the developing unit 2209 at the retracted position. Here, the moments acting in the directions of arrows V1 and V2 at the development position are M1 and M2, respectively, and the moments acting in the directions of arrows V1 and V2 around the swing axis K at the retracted position are M1' and M2', respectively. And, the distance from the swing axis K to the boss **2209*a* at the developing position is L1, the distance from the swing axis K to the shaft member 22511 is L2, and the distance from the swing axis K to the shaft member 22511 at the retracted position is L2'**.

First, referring to part (a) of FIG. 191, the relationship of forces at the developing position will be described. When the balance of moments is considered about the swing axis K, the moment M1 generated by the tension spring 22541 is expressed by M1=F1·L1. The moment M2 produced by the tension spring 22542 is expressed by M2=F2·L2. The distance between the rotation center K and the boss **2209*a* at the development position is L1, and the distance between the rotation center K and the boss 2208*c* and F1 is L2. Further, of the forces received by the boss 2209*a* from the tension spring 22541, the force in a tangential direction of a circle passing through the boss 2209*a* about the rotation center K is F1, and of the force received by the boss 2208*c* from the tension spring 22542, the force in a tangential direction of a circle passing through the boss 2208*c* about the rotation center K is F2**.

Here, in order to maintain the attitude (stable holding) at the developing position, M2 and M1 are set so as to satisfy the following formula (1).

$$M2>M1 \qquad (1)$$

Next, referring to part (b) of FIG. 191, the relationship of forces at the retracted position will be described.

Assuming that the moments acting in the directions of the arrows V1 and V2 are M1' and M2', respectively, the moment produced by the tension spring 22541 is, when considering the balance of the moments about the swing axis K as described above, satisfy M1'=F1' L1. The moment M2' produced by the tension spring 22542 is expressed by M2'=F2' L2'. Here, the distance between the rotation center K and the boss **2209*a* at the retracted position is L1', and the distance between the rotation center K and the boss 2208*c* and F1 is L2'. Further, of the forces received by the boss 2209*a* from the tension spring 22541, the force in the tangential direction of a circle passing through the boss 2209*a* about the rotation center K is F1', and the force received by the boss 2208*c* from the tension spring 22542 in the tangential direction of a circle passing through the boss 2208*c* about the rotation center K is F2'**.

Here, in order to maintain the attitude (stable holding) at the retracted position, M1' and M2' are set so as to satisfy the following formula (2).

$$M2'<M1' \qquad (2)$$

Further, in the retracted position, the urging force F2' of the tension spring 22542 may be 0 (zero) because the equation 2 may be satisfied.

[Holding Mechanism]

In the above-described embodiment, the structure for the drum unit 2208 to stably hold the developing unit 2209 at the retracted position and the developing position is the lever 22510 and the tension spring 22542 capable of taking the first position and the second position, respectively. However, it is also possible to see the structure of this embodiment as follows. That is, as a holding mechanism in which the drum unit 2208 stably holds the developing unit 2209 at the retracted position and the developing position, at least the lever 22510, the tension spring 22542, the boss **2208*c*, the shaft member 22511, the tension spring 22541, the boss 2208*b*, and the boss 2209*a* may be considered. In this case, it can be said that when the lever 22510 and the tension spring 22542 are in the first positions and the developing unit 2209 is in the retracted position, the holding mechanism is in the first state, and when the lever 22510 and the tension spring 22542 are in the second positions and the developing unit 2209** is in the developing position, the holding mechanism is in the second state.

As described above, in this embodiment, the developing unit 2209 is constantly urged by the tension spring 22541 in the direction from the developing position to the retracted position. Then, by changing the positions of the lever 22510 and the tension spring 22542 as the holding portion, the magnitude of the moment produced in the developing unit 2209 by the urging force of the tension spring 22542 is changed, and the movement between the developing position and the retracting position is carried out. With such a structure as well, the drum unit can stably hold the developing unit at each of the developing position and the retracting position. Therefore, the same effect as in Embodiments 1 and 9 can be provided.

Further, in this embodiment, the developing unit 2209 is urged toward the retracted position by the moment of the tension spring 22541 even when it is in the developing position, but the developing roller 105 is urged toward the photosensitive drum 104 by the moment of the tension spring 22542 so that the position of the developing unit 2209 can be determined. Therefore, the developing roller 105 can be contacted with the photosensitive drum 104 with an appropriate pressure.

Embodiment 21

Referring to FIGS. 192 to 194, a process cartridge and an image forming apparatus according to Embodiment 21 of the present invention will be described. In this embodiment, structures and operations different from those of the above-described embodiment will be mainly described, and description of similar structures and operations will be omitted. For the structure corresponding to that in the above-described embodiments, the same reference numerals and characters are assigned, or the reference numerals in the first part is changed while the reference numerals and characters in the second part are the same.

FIGS. 192 and 194 are illustrations of the process cartridge P as viewed from the drive-side inside the image forming apparatus main assembly 502. A urging member 2410*a* holding portion that can be moved between a development holding position (first position) for the developing unit 9 to stably hold at the developing position and a separation holding position (second position) for stably holding the developing unit 9 at the retracted position. In this embodiment, the urging member (restriction member, holding member, separation holding member) 2410 is a compression coil spring provided between the drum unit 8 and the developing unit 9. One end of the urging member 2410 is an end coil shape portion 2410*b*, and the other end is a hook shape portion 2410*c*.

The drum unit 8 is provided with an urging member supporting portion 2481 as a portion of a drum frame for supporting the end coil shape portion 2410*b* which is one end portion of the urging member 2410. The urging member supporting portion 2484 includes an urging member seating portion 2481*b* for receiving the end coil shape portion 2410*b* and an urging member outer diameter supporting portion 2481*c* for supporting the coil portion outer diameter side of the urging member 2410. One end side of the urging member is supported by the urging member seating portion 2481*b* and the urging member outer diameter supporting portion 2481*c*, so that the urging member seating portion 2481*b* is supported substantially linearly in the normal line direction.

Here, a straight line L80 is a line normal to the urging member seating portion 2484*b* on which the end coil shape portion 2410*b* which is one end of the urging member 2410 is seated, and passes through the swing axis K of the developing unit 9.

Next, the development cover member (a portion of the developing frame) 2433 of the developing unit 9 is provided with a spring-hooked portion 2433*c* having a cylindrical shape for supporting the hook shape portion 2410*c*. One end side of the urging member 2410 is supported by the drum unit 8, and the hook shape portion 2410*c* on the other end side is supported by engaging with the spring-hooked portion 2433*c* of the developing unit 9. The urging member 2410 is a compression coil spring, and is compressed between the drum unit 8 and the developing unit 9.

In this embodiment, the development cover member 2433 is provided with a force receiving portion (first force receiving portion, contact force receiving portion) 2433*e* for engaging with the separation control member 2440 provided in the image forming apparatus main assembly 502, and a retracting force receiving portion (second force receiving portion, separating force receiving portion) 2433*m*.

The separation control member 2440 is movable between a first position for moving the urging member 2410 to the contact holding position and a second position for moving the urging member 2410 to the separation holding position. Further, the separation control member 2440 is structured to be movable to a home position where the separation control member 2440 does not contact the force receiving portion 2433*e* and the retracting force receiving portion 2433*m*, between the first position and the second position.

Next, the description will be made as to behavior in which the urging member 2410 moves between the contact holding position (second position) for holding the developing unit 9 at the developing position (contacting position) and the separation holding position (first position) for holding the developing unit 9 at the retracting position (separating position). In part (a) of FIG. 192, the developing unit 9 is in the developing position, and the separation control member 2440 is in the first position. In part (c) of FIG. 192, the developing unit 9 is in the separated position, and the separation control member 2440 is in the second position. Part (b) of FIG. 192 shows a state in which the developing unit 9 is in the process of switching from the developing position shown in part (a) of FIG. 192 to the spaced position shown in part (c) of FIG. 192. In part (d) of FIG. 192, the developing unit 9 is in the spaced position, and the separation control member 2440 is in the home position.

In part (a) of FIG. 192, the developing unit 9 is in the developing position, and the spring-hooked portion 2433*c* is placed on the downstream side in the arrow V2 direction from the straight line L80. When the separation control member 2440 moves from the first position in the W51 direction, the first force application surface 2440*b* and the retracting force receiving portion 2433*m* are brought into contact with each other, and the developing unit is rotated about the swing axis K in the V1 direction in part (b) of FIG. 192.

In part (b) of FIG. 192, as a result of the developing unit 9 rotating in the V1 direction from part (a) of FIG. 192, the spring-hooked portion 2433*c* is placed on the straight line L80.

Further, when the separation control member 2440 moves in the direction of W51 to the second position shown in part (c) of FIG. 192, the developing unit 9 rotates in the direction of the arrow V1 in part (b) of FIG. 192, and the spring-hooked portion 2433*c* becomes downstream of the straight line L80 in the V1 direction.

Here, part (a) of FIG. 193 to part (c) of FIG. 193 show the engagement state between the hook shape portion 2410*c* and the spring-hooked portion 2433*c* in part (a) of FIG. 192 to part (c) of FIG. 192, respectively. Referring to part (a) of FIG. 193 to part (c) of FIG. 193, the direction of the force received from the urging member 2410 to the spring-hooked portion 2433*c* in each engaged state will be described.

First, part (a) of FIG. 193 will be explained. In part (a) of FIG. 193 and part (a) of FIG. 192, the developing unit 9 is in the developing position, and the spring-hooked portion 2433*c* is placed on the downstream side in the arrow V2 direction from the straight line L80.

As described above, several turns of the coil on one end side of the urging member 2410 are supported by the urging member seating portion 2481*b* and the urging member outer diameter supporting portion 2488*c*, so that is supported substantially linearly in the direction substantially normal to the urging member seating portion 2481*b*.

On the other hand, the hook shape portion 2410*c* of the urging member 2410 is engaged with the spring-hooked portion 2433*c* placed on the downstream side in the arrow V2 direction from the straight line L80. Therefore, the urging member 2410 is arranged between the urging member supporting portion 2481 and the spring-hooked portion 2433*c* in an inclined state relative to the straight line L80.

The hook shape portion 2410*c* is engaged with the cylindrical spring-hooked portion 2433*c*. The inner diameter of the hook shape portion 2410*c* is larger than the outer diameter of the cylindrical portion of the spring-hooked portion 2433*c*, and therefore, the hook shape portion 2410*c* is rotatable relative to the spring-hooked portion 2433*c*.

Here, the intersection of the line L81 connecting the swing axis K of the developing unit 9 and the center of the spring-hooked portion 2433*c* and the cylindrical shape of the spring-hooked portion 2433*c* is a position P24*b*. Next, the position P24*a* of the hook shape portion 2410*c* and the spring-hooked portion 2433*c* when the developing unit 9 shown in part (a) of FIG. 192 is in the developing position is located on the downstream side in the arrow V1 direction from the position P24*b*.

The urging member 2410 is a compression coil spring compressed between the urging member supporting portion 2481 and the spring-hooked portion 2433*c*. At position P24*a*, the columnar portion of the spring-hooked portion 2433*c* contacts the coil-side (one end side) portion of the hook shape portion 2410*c*. As a result, the force received by the cylindrical portion of the spring-hooked portion 2433*c* is directed toward the center of the spring-hooked portion 2433*c* cylindrical portion. That is, the spring-hooked portion 2433*c* receives a force from the urging member 2410 in the direction of the arrow F85 in part (a) of FIG. 192 and part (a) of FIG. 193.

The directions of the arrow F85 in part (a) of FIGS. 192 and 193 (*a*) are inclined toward the arrow V2 in part (a) of FIG. 192 with respect to the straight line L80. By doing so, the developing unit 9 which receives the force in the direction of arrow F85 from the urging member 2410 is urged to rotate in the direction of V2 (from the retracted position to the developing position). That is, as shown in part (a) of FIG. 192, when the developing unit 9 is placed at the developing position, the urging member 2410 is at the contact holding position (second position) in which the developing unit 9 can move to the developing position.

[Separation Operation]

Subsequently, the process of moving from the state shown in part (a) of FIG. 192 to the state shown in part (c) of FIG. 192 by way of the state shown in part (b) of FIG. 192 will be described. Part (b) of FIGS. 192 and (c) show the state in which the separation control member 2440 is moving from the first position to the second position, and the developing unit 9 is moving from the developing position (contact position) to the retracting position (separation position).

When the separation control member 2440 moves from the first position shown in part (a) of FIG. 192 in the direction of the arrow W51 in part (a) of FIG. 192, the first force application surface 2440*b* and the retracting force receiving portion 2433*m* come into contact with each other, so that the developing unit 9 rotates about the swing axis K in the direction of the arrow V1 in part (b) of FIG. 192 (state shown in part (b) of FIG. 192).

In part (b) of FIG. 192, as a result of the developing unit 9 rotating in the V1 direction from part (a) of FIG. 192, the spring-hooked portion 2433*c* is on the straight line L80. As the spring-hooked portion 2433*c* moves, the hook shape portion 2410*c* rotates with respect to the spring-hooked portion 2433*c* from the state shown in part (a) of FIG. 193, and is brought into contact with the spring-hooked portion 2433*c* at the position P24*b* in part (b) of FIG. 193. In this state, the urging member 2410 is placed in a compressed state between the urging member supporting portion 2481 and the spring-hooked portion 2433*c* substantially in parallel with the straight line L80.

At position P24*b*, the spring-hooked portion 2433*c* receives a force from the urging member 2410 in the direction of the arrow F86 in part (b) of FIGS. 192 and 193 (*b*), which is substantially the same direction as the straight line L80. That is, the force in the direction of the arrow F86 is directed toward the center of the swing axis K of the developing unit 9, and therefore, the moment for rotating the developing unit 9 is unlikely to be produced.

Next, with the movement from the position shown in part (b) of FIG. 192 to that shown in part (c) of FIG. 192, the spring-hooked portion 2433*c* moves toward downstream of the straight line L80 in the arrow V1 direction. As described above, since the inner diameter of the hook shape portion 2410*c* is larger than the outer diameter of the cylindrical portion of the spring-hooked portion 2433*c*, the hook shape portion 2410*c* is rotatable with respect to the spring-hooked portion 2433*c*. Therefore, as the spring-hooked portion 2433*c* moves, the hook shape portion 2410*c* rotates relative to the spring-hooked portion 2433*c* from the state shown in part (b) of FIG. 193, and it is brought into contact with the spring-hooked portion 2433*c* at the position P24*c* in part (c) of FIG. 193.

In this state, the spring-hooked portion 2433*c* receives a force at the position P24*c* in the direction of the arrow F87 in part (c) of FIG. 193 toward the center of a columnar portion of the spring-hooked portion 2433*c*.

As shown in the direction of the arrow F87 in part (c) of FIG. 193, it is inclined with respect to the straight line L80 toward the downstream side of the arrow V1 in part (b) of FIG. 192, and is placed in a compressed state between the urging member supporting member 2481 and the spring-hooked portion 2433*c*. By this, the developing unit 9 which receives the force in the direction of arrow F87 from the urging member 2410 is urged by a moment in the V1 direction (direction from the developing position to the retracted position).

In this manner, the spring-hooked portion 2433*c* moves as the developing unit 9 rotates, so that the direction of the force acting on the spring-hooked portion 2433*c* by the urging member 2410 is switched. By this, the urging direction of the urging member 2410 on the spring-hooked portion 2433*c* is the same as the direction in which the developing unit moves from the contact holding position to the separation holding position, and therefore, the urging member 2410 can be stably moved from the holding position (second position) to the separation holding position (first position). The developing unit 9 rotates until the developing frame comes into contact with a rotation stop portion (positioning portion at the time of retraction) (not shown) provided on the drum frame of the drum unit 8, and is positioned in contact with the rotation stop portion and is maintained at the retracted position (separation position). At this time, it can be said that the developing unit 9 is stably held in the retracted position (separated position) by the drum unit 8.

Part (d) of FIG. 192 shows a state in which the developing unit 9 is in the retracted position and the separation control member 2440 is in the home position. Similarly to the Embodiment 9, even when the separation control member 2440 is at the home position, the developing unit 9 is maintained at the retracted position, and the separation control member 2440 can be maintained in the state not contacting the force receiving portion 2433*e* and the retracting force receiving portion 2433*m*. Therefore, the developing unit 9 placed at the retracted position does not apply a load on the separation control member 2440 (state shown in part (d) of FIG. 192).

[Contact Operation]

Next, referring to FIG. 194, the operation of moving the developing unit 9 from the retracted position to the developed position will be described. Part (a) of FIG. 194 shows a state in which the developing unit 9 is in the retracted position and the separation control member 2440 is in the home position. Part (b) of FIG. 194 shows a state in which the separation control member 2440 is moving from the home position to the first position in the W52 direction in part (b) of FIG. 194 and the developing unit 9 is moving from the retracted position to the developing position. Part (c) of FIG. 194 shows a state in which the developing unit 9 is placed at the developing position and the separation control member 2440 is placed at the first position.

When the separation control member 2440 moves from the home position in the direction of the arrow W52 in part (a) of FIG. 194, the second force application surface 2440*c* of the separation control member 2440 and the force receiving portion 2433*e* of the development cover member 2433 come into contact with each other, and the developing unit 9 rotates in the V2 direction in part (b) of FIG. 194. As the developing unit 9 rotates in the V2 direction in part (b) of FIG. 194, the spring-hooked portion 2433*c* changes from the state of part (c) of FIG. 193 to the state of part (b) of FIG. 193 by way of the state of part (a) of FIG. 193. In the state of part (a) of FIG. 193, the urging member 2410 is in the contact holding position (second position) for applying a moment in the V2 direction to the developing unit 9.

When the urging member 2410 moves to the contact holding position, the developing unit rotates in the V2 direction in part (b) of FIG. 194 and moves to the developing position in which the developing roller 6 and the photosensitive drum 4 are in contact with each other (state shown in part (c) of FIG. 194). The separation control member 2440 moved to the first position is separated from the force receiving portion 2433*e* of the developing unit 9 moved to the developing position, so that no load is applied to the separation control member 2440 from the developing unit 9. At this time, it can be said that the developing unit 9 is stably held at the developing position (contact position) by the drum unit 8.

As described above, the acting direction of the urging member 2410 is switched from the direction of the arrow F85 in part (a) of FIG. 194 to the direction of the arrow F87 in part (c) of FIG. 194, and the direction of the moment for rotating the developing unit 9 by the urging member 2410 switches from the direction of the arrow V1 in part (c) of FIG. 194 to the direction of the arrow V2 in part (b) of FIG. 194. That is, since the urging direction of the urging member 2410 to the developing unit 9 is the same as the rotational direction of the developing unit 9 by the movement of the separation control member 2440, the urging member 2410 can be stably moved from the separation holding position (first position) to the contact holding position (second position).

In this embodiment, the urging member 2410 comprises a compression coil spring, but the present invention is not limited to such an example. That is, the urging member 2410 may include a tension spring. However, in order to align the moving direction of the separation control member 2440 with the urging direction of the urging member to the developing unit 9, it is necessary that a movable member 950 for switching the rotational direction as shown in the Embodiment 13 is additionally provided.

[Holding Mechanism]

In the above-described embodiment, the structure for the drum unit 8 to stably hold the developing unit 9 at the retracted position and the developed position is the urging member 2410 capable of taking the first position and the second position is the holding portion. However, it is also possible to see the structure of this embodiment as follows. That is, as a holding mechanism with which the drum unit 8 stably holds the developing unit 9 at the retracted position and the developing position, at least the urging member 2410, the urging member supporting portion 2488, and the spring-hooked portion 2433*c* can be mentioned. In this case, it can be said that when the urging member takes the first position and the developing unit 9 takes the retracted position, the holding mechanism is in the first state, and when the urging member 2410 takes the second position and the developing unit 9 takes the developing position, the holding mechanism is in the second state.

According to the structure of this embodiment described above, the same effects as those of Embodiment 1 and 9 can be provided.

Further, according to this embodiment, since the direction in which the developing unit 9 is urged by the urging member 2410 can be changed to match the direction in which the developing unit 9 is urged by the separation control member 2440, the movement of the urging member 2410 between the contact holding position (second position) and the separation holding position (first position) can be stabilized. That is, the control of the attitude of the developing unit 9 can be stabilized.

Embodiment 22

Referring to FIGS. 195 and 196, an embodiment of the process cartridge and the image forming apparatus according to embodiment 22 of the present invention will be described.

In this embodiment, structures and operations different from those of the Embodiment 9 will be mainly described, and description of similar structures and operations will be omitted. For the structure corresponding to that in above-described Embodiment 9, the same reference numerals and characters are assigned, or the reference numerals in the first part is changed while the reference numerals and characters in the second part are the same.

In this embodiment, the developing unit 9 maintains the retracted position by engaging between the tray 110 which supports the process cartridge P and the holding member 2510 of the image forming apparatus main assembly 502 described in the Embodiment 9. The details will be described below.

The mounting portion 110*a* for mounting the process cartridge of the tray 110 shown in FIGS. 130 and 134 is provided with a plurality of partitions 110*b* (110*b*M, 110*b*C, in FIGS. 195 and 196) corresponding to the process cartridges PY, PM, PC, and PK, respectively. By these partitions 110*b*, four spaces for accommodating the four process cartridges PY, PM, PC, and PK are formed the mounting portion 110*a*.

FIGS. 195 and 196 are illustrations of the second process cartridge PM placed in the second inner position inside the image forming apparatus main assembly 502 shown in FIG. 130 of an Embodiment 9, as viewed from the drive-side.

Referring first to FIG. 195, an operation in which the developing unit 9 of the process cartridge PM carried between the partitions 110*b*M and 110*b*C moves from the developing position to the retracted position will be described.

Part (a) of FIG. 195 shows a state in which the developing unit 9 is in the developing position and the separation control member 540 is in the home position. Part (b) of FIG. 195 and part (c) of FIG. 195 show a state in which the separation control member 540 is moving from the home position to the second position and the developing unit 9 is moving from the developing position to the retracting position. Part (d) of FIG. 195 shows a state in which the developing unit is in the retracted position and the separation control member 540 is in the home position.

The holding member 2510 of this embodiment is the same as that of the Embodiment 9, and as shown in part (a) of FIG. 195, the supported hole (second contact portion, contact portion) 2510*a* is rotatably supported by the supporting shaft 2533*c* of the development cover member 2533, and is urged by a tension spring 530 (a urging means) in the direction of the arrow B1 in part (a) of FIG. 195. Further, by the first restricted surface 2510*h* of the holding member 2510 being brought into contact with the first restriction surface 2533*h* of the development cover member 2533, the rotation of the holding member 2510 urged by the tension spring 530 is restricted. The holding member 2510 is provided with a projecting portion (holding portion) 2501*b* projecting from the supported hole 2510*a* in the direction opposite to that of the photosensitive drum 4, and is provided with a partition contact portion (engaging portion) 2510*s* at the free end of the projecting shape. Further, the holding member 2510 is provided with the force receiving portion (first force receiving portion, contact force receiving portion) 2510*e* projecting in the direction of arrow Z2 in part (a) of FIG. 195, similarly to the Embodiment 9.

The development cover member 2533 is fixed to the developing unit 9 as in the Embodiment 9, and is provided with a retracting force receiving portion (second force receiving portion, separating force receiving portion) 2533*m* projecting in the direction of arrow Z2 in part (a) of FIG. 195.

The separation control member 540 of this embodiment is provided in the image forming apparatus main assembly 502 as in the Embodiment 9. As shown in part (a) of FIG. 195, the force receiving portion 2510*e*, the separation control member 540, and the retracting force receiving portion 2533*m* are arranged in this order in the direction of the arrow W51 in part (a) of FIG. 195. Similarly to the Embodiment 9, the separation control member 540 can move between the first position and the second position. Further, the separation control member 540 is structured to be movable to a home position at which it does not contact the force receiving portion 2510*e* and the retracting force receiving portion 2533*m* between the first position and the second position.

[Separation Operation]

When the separation control member 540 moves in the direction which is from the home position shown in part (a) of FIG. 195 toward the second position (direction of arrow W51), the first force application surface 540*b* and the retracting force receiving portion 2533*m* of the development cover member 2533 are brought into contact with each other, and the first force application surface 540*b* urges the retracting force receiving portion 2533*m*. As shown in part (b) of FIG. 195, when the retracting force receiving portion 2533*m* is urged, the developing unit 9 is rotated in the V1 direction which is the direction from the developing position to the retracting position around the swing axis K. At this time, the holding member 2510 supported by the development cover member 2533 also rotates about the swing axis K in the direction of the arrow V1 in part (b) of FIG. 195, and the partition contact portion 2510*s* of the holding member 2510 is brought into contact with the partition 110*b*M. Then, the partition contact portion 2510*s* receives a reaction force from the partition 110*b*M in the direction of the arrow N8 in part (b) of FIG. 195. By this, the holding member 2510 rotates in the direction of the arrow B2 in part (b) of FIG. 195 about the supported hole (second contact portion) 2510*a* and the support portion 2533*c*, and the partition contact portion 2510*s* rotates and moves. Therefore, the partition contact portion 2510*s* moves in the direction of arrow Z2 in part (b) of FIG. 195 beyond the lower end portion 110*b*Ma of the partition 110*b*M.

When the separation control member 540 moves from the state shown in part (b) of FIG. 195 in the direction of the arrow W51 in part (b) of FIG. 195 and moves to the second position shown in part (c) of FIG. 195, the partition contact portion 2510*s* moves in the direction of the arrow W51 in part (b) of FIG. 195 beyond the partition 110*b*M. When the partition contact portion 2510*s* is separated from the partition 110*b*M, the holding member 2510 is rotated by the tension spring 530 in the direction of the arrow B1 in part (c) of FIG. 195 about the supported hole (second contact portion) 2510*a* and the support portion 2533*c*. Then, the attitude of the holding member 2510 is restricted by the second restricted surface 2510*t* of the holding member 2510 contacting the lower end portion 110*b*Ma of the partition 110*b*M (state of part (c) of FIG. 195). The position of the holding member 2510 at this time is a position circumventing the partition 110*b*M in order to engage with the partition 110*b*M.

When the separation control member 540 moves in the direction of the arrow W52 in part (c) of FIG. 195 and returns to the home position from the second position from the state shown in part (c) of FIG. 195, the developing unit 9 is rotated in the direction of arrow V2 in part (c) of FIG. 195 by the driving force received by the development coupling member 74. Then, the holding member 2510 supported by the development cover member 2533 also rotates and moves in the direction of the arrow V2 in part (c) of FIG. 195, and the partition contact portion 2510*s* is brought into contact with the contact portion 110*b*Mb of the partition 110*b*M. When the partition contact portion 2510*s* contacts the contact portion (contacted portion, engaging portion) 110*b*Mb of the partition 110*b*M, the rotation of the developing unit 9 stops (state shown in part (d) of FIG. 195). At this time, the holding member 2510 is in the restriction position (separation holding position, first position) in which, one end of the projecting portion (holding portion) 2501*b* contacts (engages) the contact portion (contacted portion, engaging portion) 110*b*Mb of the partition 110*b*M, and at the other end, the supported hole 2510*a* contacts the support portion 2533*c*. That is, the holding member 2510 is engaged with the partition 110*b*M. Therefore, the developing unit 9 is maintained (stably held) at the retracted position (separated position).

As shown in part (d) of FIG. 195, the separation control member 540 placed at the home position is separated from the holding member 2510 and the development cover member 2533, and therefore, no load is applied thereto from the developing unit 9.

As described above, the developing unit 9 can be moved from the development position (contact position) to the retracted position (separation operation) by the operation of the separation control member 540 moving from the home position to the second position and returning to the home position again.

[Contact Operation]

Next, referring to FIG. 196, the operation of moving the developing unit 9 from the retracted position to the developed position will be described. Part (a) of FIG. 196 shows a state in which the developing unit 9 is in the retracted position and the separation control member 540 is in the home position. Part (b) of FIG. 196 and part (c) of FIG. 196 show a state in which the separation control member 540 is moving from the home position in the W52 direction, and the developing unit 9 is moving from the retracted position to the developing position. Part (d) of FIG. 196 shows a state in which the developing unit 9 is located at the developing position and the separation control member 540 is located at the home position.

As shown in part (b) of FIG. 196, when the separation control member 540 moves in the direction which is from the home position toward the first position (direction of arrow W52), the second force application surface 540*c* of the separation control member 540 and the force receiving portion 2510*e* of the holding member 2510 are brought into contact with each other, and the second force application surface 540*c* urges the force receiving portion 2510*e*. The holding member 2510 thus urged by the force receiving portion 2510*e* is rotated about the supported hole (second contact portion) 2510*a* and the supporting portion 2533*c* in the direction of the arrow B2 in part (b) of FIG. 196. When the holding member 2510 rotates, the partition contact portion 2510*s* rotationally moves in the direction of the arrow B2 in part (b) of FIG. 196, and therefore, the partition contact portion 2510*s* is moved beyond the lower end portion 110*b*Ma of the partition 110*b*M in the arrow Z2 direction in part (b) of FIG. 196, so that the contact portion (contacted portion, engaging portion) 110*b*Mb and the partition contact portion 2510*s* are separated from each other, and the engagement between the holding member 2510 and the partition 110*b*M is broken. The position of the holding member 2510 at this time is a position which circumvents the partition 110*b*M in order to release the engagement with the partition 110*b*M, and is also a position for allowing the developing unit 9 to move to the developing position (contact position).

When the partition contact portion 2510*s* is separated from the partition 110*b*M, the partition contact portion 2510*s* comes into contact with the contact portion 110*b*Mb of the partition 110*b*M, so that the developing unit 9 maintained in the retracted position is rotated in the arrow V2 direction by the driving force received by the development coupling member 74 and the urging force of the developing unit urging spring 134 (see FIG. 131, and so on) and is moved to the developing position (contact position) (state in part (c) of FIG. 196).

When the separation control member 540 shown in part (c) of FIG. 196 moves from the first position in the direction of the arrow W51 in part (c) of FIG. 196 toward the home position, the holding member 2510 is rotated by the tension spring 530 in the B1 direction. Then, the attitude of the holding member 2510 is restricted by the first restricted surface 2510*h* of the holding member 2510 coming into contact with the first restriction surface 2533*h* of the development cover member 2533. (State of part (d) of FIG. 196)

As shown in part (d) of FIG. 196, the separation control member 540 placed at the home position is separated from the holding member 2510 and the development cover member 2533, so that no load is applied thereto from the developing unit 9.

As described above, the developing unit 9 can be moved from the retracted position to the developed position by the operation of the separation control member 540 moving from the home position to the first position and returning to the home position again.

As described above, the holding member 2510 is provided with a portion (projecting portion 2501*b*) projecting from the developing unit 9 (or the developing frame) in the direction crossing the rotation axis M2 of the developing roller (in this embodiment, the direction perpendicular to each other). Further, the projecting portion is provided with an engaging portion 2510*s*. Therefore, the engaging portion 2510*s* can be engaged with the tray 110 to hold the developing unit 9 at a predetermined position (retracted position (separated position) in this embodiment).

The direction in which the holding member 2510 projects from the developing unit 9 (or the developing frame) is not limited to the direction crossing the rotation axis M2 of the developing roller (the direction perpendicular to each other in this embodiment).

Further, in this embodiment, the holding member 2510 is structured to engage with the partition 110*b* of the tray 110, but the present invention is not limited to such an example. For example, the holding member 2510 may be engaged with another portion of the tray 110 or another portion of the image forming apparatus main assembly 502 to hold the developing unit 9 at a predetermined position. Further, in this embodiment, the position of the developing unit 9 when the holding member 2510 is engaged with the ray 110 or the like is the retracted position (separation position), but the developing unit 9 may be held at the developing position (contact position). In this case, in place of the developing unit urging spring 134, a tension spring (separation direction urging member) 22541 or the like as described in the 20th embodiment may be used so that the developing unit 9 is urged in the direction from the developing position to the retracted position.

According to the structure of this embodiment described above, the same effects as those of Embodiment 1 and 9 can be provided.

Embodiment 23

Referring to FIGS. 197 to 200, a process cartridge and an image forming apparatus according to the embodiment 23 of the present invention will be described. In this embodiment, structures and operations different from those of the above-described embodiment 22 will be mainly described, and description of similar structures and operations will be omitted. For the structure corresponding to that in above-described Embodiment 22, the same reference numerals and characters are assigned, or the reference numerals in the first part is changed while the reference numerals and characters in the second part are the same.

In this embodiment, a part of the tray 110 of the image forming apparatus main assembly 502 described in the 22nd embodiment and supporting the process cartridge P and the slope 2633*b*2 of the holding member 2633*b* which is a portion of the developing unit 2690 are brought into contact with each other, so that the developing unit 2609 is maintained at the retracted position. The details will be described below.

As shown in FIG. 197, the mounting portion 110*a* for mounting the process cartridge of the tray 110 includes a plurality of partitions 110*b* (110*b*M, 110*b*C, and so on) corresponding to the process cartridges PY, PM, PC, and PK, respectively. By these partitions 110*b*, four spaces for accommodating the four process cartridges PY, PM, PC, and PK are formed in the mounting portion 110*a*.

FIGS. 197 to 200 are illustrations of the second process cartridge PM placed at the second inner position inside the image forming apparatus main assembly 502 shown in FIG. 130 of the Embodiment 9, as viewed from the drive-side. For better illustration, FIGS. 197 to 200 are illustrations in which the tray 110 is partially cut so that the separation control member and the partition 110*b* can be seen. FIGS. 201 to 203 are partially enlarged views of the holding member portion in each embodiment, in which (a) shows a state of a retracted position, and (b) shows a state of a developed position.

[Movement to Development Position]

First, referring to FIGS. 197 to 198, the operation of the developing unit 2609 of the process cartridge PM installed between the partitions 110*b*M and 110*b*C from the retracted position to the developing position will be described. Part (a) of FIG. 197 shows a state in which the developing unit 2609 is in the retracted position and the separation control member 26540 is in the home position. Part (b) of FIG. 197 and part (a) of FIG. 198 show a state in which the separation control member 26540 is moving from the home position to the first position and the developing unit 2609 is moving from the retracted position to the developing position.

Part (b) of FIG. 198 shows a state in which the developing unit 2609 is in the developing position and the separation control member 26540 is in the home position.

The separation control member 26540 of this embodiment is provided in the image forming apparatus main assembly 502 as in the Embodiment 9. As shown in part (a) of FIG. 197, the force receiving portion 2633*e*, the separation control member 26540, and the retracting force receiving portion 2633*a* are arranged in this order in the direction of the arrow W51. Similarly to an Embodiment 9, the separation control member 26540 can move between the first position and the second position. Further, the separation control member is structured to be movable to the home position in which the force receiving portion 2633*e* and the retracting force receiving portion 2633*a* do not contact each other, between the first position and the second position.

The development cover member 2633, which is a portion of the developing frame, is provided with a force receiving portion 2633*e* and a retracting force receiving portion 2633*a*. Further, the development cover member 2633 is provided integrally with a holding member 2633*b*. The holding member 2633*b* is provided with an elastic portion 2633*f* which flexes when a force is applied, a curved surface 2633*b*1, and a contact portion slope 2633*b*2. In this embodiment, elasticity is provided by a molded leaf spring made of resin mold. However, as another example, the holding member 2633*s* may have a metal spring 2633*s*1 as shown in FIG. 202, or the holding member 2633*t* itself may be a metal leaf spring as shown in FIG. 203.

[Contact Operation]

When the separation control member 26540 moves from the home position shown in part (a) of FIG. 197 in the direction of the arrow W52, which is the direction toward the first position, the first force application surface 26540*c* and the force receiving portion provided on the development cover member 2633 (first force receiving portion, contact force receiving portion) 2633*e* are brought into contact with each other, so that the first force application surface 26540*c* urges the force receiving portion 2633*e*. As shown in part (b) of FIG. 197, when the force receiving portion 2633*e* urges the first force application surface 26540*c*, the developing unit 2609 is rotated from the retracted position (separated position) about the swing axis K toward the developing position (direction of arrow V2 in part (b) of FIG. 90.

At this time, the holding member 2633*b* provided on the development cover member 2633 also rotates about the swing axis K in the direction of the arrow V2, and the slope 2633*b*2 of the holding member 2633*b* abuts against the partition 110*b*C due to the component force of the slope, and the elastic portion 2633*f* flexes (elastically deforms).

Then, as shown in part (a) of FIG. 198 and part (b) of FIG. 201, the surface 110*b*C2 of the partition 110*b*C and the curved surface 2633*b*1 come into contact with each other, and the holding member 2633*b* is placed in the gap between the partition 110*b*C and the developing frame of the developing unit 2609. In this state, the developing unit 2609 is in the developing position (contact position), and the developing unit is maintained in the developing position by the driving torque of the developing roller from the image forming apparatus main assembly and the urging by the developing unit urging spring (see FIG. 130 and the like).

The curved surface 2633*b*1 has an arc shape (see part (b) of FIG. 201) in which the center of the arc is the same as the swing axis K at the time when it is bent, and the reaction force produced when the developing unit 2609 is in the developing position does not act as a moment to rotate the developing unit 2609 in the V1 direction or the V2 direction.

As shown in part (b) of FIG. 198, the separation control member 26540 placed at the home position is separated from the force receiving portion 2633*e*, and therefore, the no load is applied from the developing unit 9.

As described above, the developing unit 9 is moved from the retracting position (separation position) to the developing position (contact position) By the separation control member 26540 moving from the home position to the first position and returning to the home position again.

[Separation Operation]

Next, referring to FIGS. 199 to 200, the operation will be described in which the developing unit 2609 of the process cartridge PM installed between the partition 110*b*M and the partition 110*b*C moves from the development position (contact position) to the retracted position (separation position). Part (a) of FIG. 199 shows a state in which the developing unit 2609 is in the developing position and the separation control member 26540 is in the home position. Part (b) of FIG. 199 and part (a) of FIG. 200 show a state in which the separation control member is moving from the home position to the second position and the developing unit 9 is moving from the developing position to the retracted position. Part (b) of FIG. 200 shows a state in which the developing unit 9 is in the retracted position and the separation control member 26540 is in the home position.

When the separation control member 26540 moves from the home position shown in part (a) of FIG. 199 in the direction of the arrow W51, which is the direction toward the second position, the first force application surface 26540*b* is brought into contact with and urges force receiving portion (second force receiving portion, separating force receiving portion) 2633*a* provided on the development cover member 2633.

As shown in part (b) of FIG. 199, when the retracting force receiving portion 2633*a* is urged against the first force application surface 26540*b*, the developing unit 2609 is rotated about the swing axis K in the direction which is a direction from the developing position to the retracting position (arrow V1 direction). With further rotation, the elastic deformation of the elastic portion 2633*f* is restored, and the contact point between the corner portion 110*b*C1 of the partition 110*b*C and the holding member 2633*b* moves from the curved surface 2633*b*1 to the slope 2633*b*2 Then, it receives the reaction force F26 from the corner of the partition 110*b*C on the slope 2633*b*2 (See part (a) of FIG. 201). By the slope 2633*b*2, a moment for rotating the developing unit 2609 in the arrow V1 direction is produced, and the moment balances with the moment in the V2 direction (gravity of the developing unit 2609, driving torque received from the apparatus main assembly, and so on), so that the position (separation position) is maintained (held). That is, in this embodiment, the slope 2633*b*2 of the holding member (holding portion) 2633*b* is an engaging portion which engages with the corner portion (engaged portion) of the partition 110*b*C.

Then, as shown in part (b) of FIG. 200, the separation control member 26540 located at the home position is separated from the retracting force receiving portion 2633*a*, so that no load is applied thereto from the developing unit 9.

As described above, by the separation control member 540 moving from the home position to the second position and returning to the home position again, the developing unit can be moved from the contact position (contact position) to the retracted position (separation position), the retracted position can be maintained.

In this embodiment, when the developing unit 2609 is in the developing position, the curved surface 2633*b*1 and the partition 110*b*C are in contact with each other, but they may be separated from each other. Further, the direction in which the holding member 2510 projects from the developing unit 9 (or the developing frame) is not limited to the direction crossing the rotation axis M2 of the developing roller (the direction perpendicular to each other in this embodiment).

Further, in this embodiment, the holding member 2633*b* of the developing unit 2609 is brought into contact with the partition 110*b*C of the tray 110 to hold the developing unit at a predetermined position (retracted position), but this is not limiting to the present invention. That is, the holding member 2633*b* may be contacted with a of the tray 110 other than the partition bC or a of the image forming apparatus main assembly 502 other than the tray 110 to hold the developing unit 2609 at a predetermined position (retracted position).

Further, in this embodiment, the force receiving portion (contact force receiving portion) 2633*e* and the retracting force receiving portion (separation force receiving portion) 2633*a* are provided on the development cover member 2633 constituting the developing frame of the developing unit 2609, but the present invention is not limited to such an example.

That is, the developing unit is provided with movable members (152R, 152L, and so on) which are pressed by the cartridge pressing unit 191 or the like and move from the stand-by position to the operating position in the ZA direction as shown in Embodiments 1 to 8 and the like. Further, a force receiving portion (contact force receiving portion) 2633*e* and a retracting force receiving portion (separation force receiving portion) 2633*a* are provided at positions where a force can be received from the separation control member (196) when the movable member is in the operating position. As a specific example, the retracting force receiving portion (separation force receiving portion) 2633*a* is disposed at the position where the first force receiving portion 152Rk is provided, and the force receiving portion (contact force receiving portion) 2633*e* is disposed at the position where the second force receiving portion 152Rn is provided.

When the force receiving portion (contact force receiving portion) 2633*e* receives a force in the W42 direction, the developing unit moves in the direction which is from the separation position to the contact position, and when the retracting force receiving portion (contact force receiving portion) 2633*a* receives a force in the W41 direction, the force is transmitted from the movable member to the developing frame so that the developing unit moves in the direction which is from the contact position to the separation position.

With such a structure, the above-mentioned contact operation is carried out, by the developing unit moving in the direction which is a direction from the separation position to the contact position, and the separation operation described above is carried out, by the developing unit moving in the direction which is a direction from the contact position to the separation position.

Another Example of Embodiment 23

Another embodiment, that is, embodiment 23 will be described. In this embodiment, as shown in FIG. 204, the holding member 2633'*b* is provided so as to project at least in the direction of the rotation axis M2 of the developing roller. The holding member 2633'*b* is brought into contact with a side surface portion 110*b*CS and an almost horizontal surface portion 110*b*C3 of the tray 110 to maintain (hold) the developing unit 2609 in the retracted position (separated position).

A hole (opening, cut-away portion) 520'H is provided in the drive-side cartridge cover member 520', which is a part of the drum frame. The holding member 2633'*b* provided integrally with the development cover member 2633' which is a part of the developing frame penetrates the hole 520'H to contact the almost horizontal surface portion 110*b*C3.

The relationship between the holding member 2633' of the developing unit 2609, the side surface portion 110*b*CS, and the almost horizontal surface portion 110*b*C3 is similar to the relationship between the holding member 2633, the partition 110*b*C, the corner portion 110*b*C1, or the surface 110*b*C2 in the above-described embodiment 26.

FIG. 205 is a view illustrating the movement of the holding member 2633' in which the drive-side cartridge cover member 520' is not shown for better illustration.

Part (a) of FIG. 205 is an illustration showing a state in which the developing unit 2609 is in the retracted position (separated position). At this time, the slope 2633'*b*2 and the almost horizontal surface portion 110*b*C3 are in contact with the holding member 2633'*b*, and therefore, the developing unit 2609 is maintained (held) at the retracted position.

Part (b) of FIG. 205 is an illustration showing a state in which the developing unit 2609 is in the developing position (contact position). At this time, the holding member 2633'*b* is in a state where at least a portion of the flat surface 2633'*b*1 is submerged below the almost horizontal surface portion 110*b*C3 (see part (c) of FIG. 205), and the developing unit 2609 is maintained (held) in the developing position (contact position).

According to the structure of this embodiment described above, the same effects as those of the first and Embodiment 9s can be provided.

Embodiment 24

In this embodiment, structures and operations different from those of the Embodiment 1 described above will be mainly described, and description of similar structures and operations will be omitted. For the structure corresponding to that in above-described Embodiment 1, the same reference numerals and characters are assigned, or the reference numerals in the first part is changed while the reference numerals and characters in the second part are the same.

FIG. 206 is a perspective view of the cartridge tray 1771. FIG. 207 is a cross-sectional view of a process cartridge 1700C and a cartridge tray 1771, and is a view illustrating the operation related to the separation/contact mechanism, wherein (a) shows a separation state, and (b) shows a contact state.

First, the cartridge tray 1771 will be described. As shown in FIG. 206, a contacted portion 1771*b* (M, C, K (Y is unillustrated)) extending inward in the longitudinal direction is provided at the longitudinal end of the cartridge tray 1771. Since all Y, M, C and K parts have the same structure, the suffix YMCK will be omitted in the following. The contacted portion 1771 is provided with a contacted surface 1771*c* facing the arrow X1 direction (the pushing direction of the cartridge tray 1771). Further, a second restriction surface 1771*d* adjacent to the contacted surface 1771*c* on the upper side (Z1 direction) is provided.

Next, referring to FIG. 207, the structure of the process cartridge 1700C will be described. The drive-side cartridge cover member 1716C, which is a portion of the drum frame, does not have a portion corresponding to the contacted surface 116*c* of the process cartridge 100, and instead, a space portion 1716Ce is provided to permit insertion of the contacted portion 1771*b* of the cartridge tray 1771. In the other respects, the structure of the process cartridge 1700C is the same as that of the process cartridge 100. Particularly, the process cartridge 1700C is similar to the process cartridge 100 in that it has a movable member 1752R and a spacer (restriction member, holding member) 1751R.

Next, the arrangement when the process cartridge 1700C is mounted on the cartridge tray will be described. The main difference between the Embodiment 1 and this embodiment is that the portion corresponding to the contacted surface 116*c* of the drive-side cartridge cover member 116 of Embodiment 1 is the contacted surface 1771*c* of the cartridge tray 1771. Therefore, in the spaced state of the developing unit 1709 shown in part (a) of FIG. 207, the contact portion 1751Rc of the spacer 1751R contacts the contacted surface 1771*c*. Further, in the contacted state of the developing unit 1709 shown in part (b) of FIG. 207, the contact portion 1751Rc of the spacer 1751R is separated from the contacted surface 1771*c*, and the restricted surface (restricted portion) 1751Rk contacts the second restriction surface 1771*d*.

By applying the above structure, it is possible to provide the contacted surface on the cartridge tray 1771. The description of the operation of the separation/contact mechanism is the same as that in the Embodiment 1, and therefore, the description thereof will be omitted.

Further, in this embodiment, the contact/separation mechanism is provided only on the drive-side, but it may be provided only on the non-drive-side or may be provided on both of the drive-side and the non-drive-side. It can be appropriately selected according to the structure to which the invention is applied.

According to the structure of this embodiment described above, the same effects as those of the first and Embodiment 9s can be provided.

Embodiment 25

Referring to FIGS. 208 to 211, Embodiment 25 of the present invention will be described. In this embodiment, structures and operations different from those of the above-described embodiment 14 will be mainly described, and description of similar structures and operations will be omitted. For the structure corresponding to that in above-described Embodiment 14, the same reference numerals and characters are assigned, or the reference numerals in the first part is changed while the reference numerals and characters in the second part are the same.

FIG. 208 is an illustration showing a state before the process cartridge P and the spacer 1110 are engaged. FIG. 209 is an illustration showing a state in which the process cartridge P and the spacer 1110 have been engaged. FIG. 210 is a partially enlarged view sequentially illustrating the process in which the process cartridge P and the spacer 1110 are being engaged with each other.

In this embodiment, there is no space between the force receiving portion (separation force receiving portion) 1110*m* and the force receiving portion (first force receiving portion, contact force receiving portion) 1110*e* of the retracting force receiving portion (second force receiving portion) of the spacer 1110, when the process cartridge P is in a free state (natural state not mounted to the image forming apparatus 502) and in the state before the tray 110 is lowered.

As shown in FIG. 208, an elastic member 1110SG1 (see FIG. 210) and an elastic member 1110SG2 are integrally mounted to the spacer 1110 between the retracting force receiving portion 1110*m* and the force receiving portion 1110*e*. The elastic members 1110SG1 and 1110SG2 are made of cushioning material such as urethane foam, but elastic members such as low-hardness rubber members and silicone members may also be used. Further, the elastic members 1110SG1 and 1110SG2 may be mounted to the retracting force receiving portion 1110*m* and the force receiving portion 1110*e* by using double-sided tape or an adhesive.

As shown in part (a) of FIGS. 208 and 210 (*a*), a slit portion 110SL is provided between the elastic members 1110SG1 and 1110SG2, and in the free state of the process cartridge, the elastic members 1110SG1 and the elastic members 1110SG2 are in close contact with each other without a gap therebetween. In this example, two elastic members are used, but a structure in which a slit portion is provided in single elastic member may be used.

As shown in part (b) of FIG. 210, when the process cartridge is lowered in the main assembly, the first force application surface 540*b* and the second force application surface 540*c* enter the slit portion 1110SL, and finally, the state shown in FIG. 209 and part (c) of FIG. 210 results. In this state, the retracting force receiving portion 1110*m* and the force receiving portion 1110*e* can receive the separation force and the contact force from the separation control member 540 by way of the elastic members 1110SG1 or 1110SG2 provided between the force application portions 540*b* and 540*c*.

FIG. 211 is an illustration showing an operation in which the developing unit 9 moves between the developing position (contact position) and the retracting position (separation position). Part (a) of FIG. 211 shows a state in which the developing unit 9 is in the developing position and the separation control member 540 is in the home position. When the developing unit 9 is moved to the retracted position, the separation control member 540 moves in the direction of W51, so that the state shown in part (b) of FIG. 211 is changed to the state shown in part (c) of FIG. 211. When the separation control member 540 moves from there in the W52 direction and returns to the home position, the developing unit 9 is placed in the retracted position as shown in part (d) of FIG. 211. When the developing unit 9 is moved to the developing position, the separation control member 540 moves in the direction of W52 from the state shown in part (d) of FIG. 211 to move the developing unit 9 to the developing position, and then the separation control member 540 moves in the direction W51 to return to the home position, and the state shown in part (a) of FIG. 211 results.

Such movement between the developing position (contact position) and the retracting position (separation position) of the developing unit 9 is the same operation as that in the Embodiment 11 described above, and therefore, the details thereof will be omitted. In this embodiment, even when the separation control member 540 is in the home position, the separation control member 540 and the elastic members 1110SG1 and 1110SG2 are in contact with each other. Therefore, the elastic force of the elastic members 1110SG1 and 1110SG2 is relatively small so that a high load is not applied to the separation control member 540.

According to the structure of this embodiment described above, the same effects as those of the first and Embodiment 9s can be provided.

Further, according to this embodiment, in the space between the retracting force receiving portion (second force receiving portion, separation force receiving portion) 1110*m* and the force receiving portion (first force receiving portion, contact force receiving portion) 1110*e*, the elastic members 1110SG1 and 1110SG2 are provided. By providing the elastic members 1110SG1 and 1110SG2 in this manner, it is possible to prevent foreign matter from entering the space between the two force receiving portions with the result of incapability of receiving the force from the separation control member 540.

Another Example of Embodiment 25

Referring to FIGS. 212 and 213, another Example of Embodiment 25 will be described. In this other example, only the points different from those of the 25th embodiment will be described. In this example, the space between the retracting force receiving portion (second force receiving portion, separating force receiving portion) 2810*m* and the force receiving portion (first force receiving portion, contact force receiving portion) 2810*e* of the spacer 2810 can be closed.

FIGS. 212 and 213 are partially enlarged views showing behavior in which the retracting force receiving portion 2810*m* and the force receiving portion 2810*e* engage with the separation control member. Part (a) of FIG. 213 is a partially enlarged view illustrating a state in which the developing unit 9 is in the developing position, and part (b) of FIG. 213 is a partially enlarged view illustrating a state in which the developing unit 9 is in the retracted position.

The retracting force receiving portion 2810*m* and the force receiving portion 2810*e* are rotatably supported by the spacer 2810, and both are structured to be attracted to each other by the spring member 2810SP. Further, the spacer 2810 is provided with a rotation stop portion 2810STP1 and a 2810STP2 to restrict the rotations of the force receiving portion 2810*e* and the retracting force receiving portion 2810*m*, respectively. Slopes 2810*m*1 and 2810*e*1 are provided at the lower ends of the retracting force receiving portion 2810*m* and the force receiving portion 2810*e*.

In the free state of the process cartridge P (natural state in which the process cartridge P is not mounted to the image forming apparatus 502) before the tray 110 is lowered, the retracting force receiving portion 2810*m* and the force receiving portion 2810*e* are in close contact with each other and no space is formed therebetween, as shown in FIG. 212.

Next, as shown in part (a) of FIG. 213, when the process cartridge P supported by the tray 110 in the image forming apparatus 502 begins to lower, the first force application surface 540*b* and the second force application surface 540*c* comes into contact with slopes 2810*m*1 and 2810*e*1, and opens between the retracting force receiving portion 2810*m* and the force receiving portion 2810*e* against the urging force of the spring member 2810SP. Further, as the process cartridge P lowers, the first force application surface 540*b* and the second force application surface 540*c* enter between the retracting force receiving portion 2810*m* and the force receiving portion 2810*e* to further open between the retracting force receiving portion 2810*m* and the force receiving portion 2810*e*. Finally, the state shown in part (b) of FIG. 213 results, in which the first force application surface 540*b* and the second force application surface of the separation control member 540 are in the space formed between the retracting force receiving portion 2810*m* and the force receiving portion 2810*e*.

Part (a) of FIG. 214 is a partially enlarged view illustrating the relationship between the separation control member 540 and the spacer 2810 when the developing unit 9 is in the developing position, and part (b) of FIG. 214 is a partially enlarged view for illustrating the separation control member and the spacer 2810 in the state in which the developing unit 9 in the retracted position. Both part (a) of FIG. 214 and FIG. 214(*b*) show a state in which the separation control member 540 is in the home position. When moving the developing unit 9 from the developing position to the retracting position, the separation control member 540 moves in the direction of W51 from the state shown in part (a) of FIG. 214, presses the retracting force receiving portion 2810*m* to rotate it in the counterclockwise direction and bring it into contact with the rotation stop portion 2810STP2. By the separation control member 540 further moving in the direction of W51, the retracting force receiving portion 2810*m* in contact with the rotation stop portion 2810STP2 is further pressed, and the spacer 2810 itself is pressed by way of the rotation stop portion 2810STP2 to rotate it in the counterclockwise direction. By this, the spacer 2810 is moves to the restriction position (first position), and the developing unit 9 moves to the retracted position. Further, the separation control member 540 returns to the home position while maintaining the developing unit 9 in the retracted position, by moving in the direction of W52, and the state shown in part (b) of FIG. 214 results.

When moving the developing unit 9 from the retracted position to the developing position, the separation control member 540 moves in the W52 direction from the state shown in part (b) of FIG. 214, presses the force receiving portion 2810*e* to rotate it in the clockwise direction and bring it into contact with the rotation stop 2810STP2. Further, by the separation control member 540 moving in the W52 direction, the force receiving portion 2810*e* in contact with the rotation stop portion 2810STP1 is further pressed, and the spacer 2810 itself is pressed by way of the rotation stop portion 2810STP1 to rotate it clockwisely. By this, the spacer 2810 moves to the permission position (second position), and the developing unit 9 moves to the developing position. Further, the separation control member 540 returns to the home position while maintaining the developing unit 9 at the developing position by moving in the direction of W51, and the state shown in part (a) of FIG. 214 result.

Further, only one of the retracting force receiving portion 2810*m* and the force receiving portion 2810 may be structured to be rotatable (movable) relative to the spacer 2810.

In this example, in the state shown in part (a) of FIG. 214 and FIG. 214(*b*), between the retracting force receiving portion 2810*m* and the rotation stop portion 2810STP2, and between the force receiving portion 2810*e* and the rotation stop portion 2810STP1, there is a slight gap. By providing this gap, a positional error between the separation control member 540 at the home position and the rotation stop 2810STP2 and the rotation stop 2810STP1 of the developing unit 9 at the development position and the retracted position is permission position, and it can be avoided that the separation control member 540 is subjected to a high load.

According to the structure of the present alternative embodiment described above, the same effects as those of Embodiments 1 and 9 can be provided.

According to this example, the space between the retracting force receiving portion (second force receiving portion, separation force receiving portion) 2810*m* and the force receiving portion (first force receiving portion, contact force receiving portion) 2810*e* can be closed. By closing the space in this manner, it is possible to prevent foreign matter from entering the space between these two force receiving portions with the result of incapability of receiving the force from the separation control member 540.

Embodiment 26

Next, referring to FIGS. 215 to 224, Embodiment 26 will be described. In this embodiment, structures and operations different from those of the Embodiment 1 described above will be mainly described, and description of similar structures and operations will be omitted. For the structure corresponding to that in above-described Embodiment 1, the same reference numerals and characters are assigned, or the reference numerals in the first part is changed while the reference numerals and characters in the second part are the same.

The process cartridges 100 of Embodiments 1 to 25 have been described as including a drum unit 108 and a developing unit 109, but the cartridge of this embodiment (developing cartridge 2311) does not include a drum unit 108. In this embodiment, the tray 2371 is provided with a photosensitive drum 2304 and a charging roller 2305, which are rotatably supported thereon. The developing unit 2309 is structured as a developing cartridge 2311 which is removable from the tray 2371. The structure of the tray 2371 and the mounting of the developing cartridge 2311 onto the tray 2371 will be described hereinafter. Similarly to the Embodiment 1, in the developing cartridge 2311, the side on which the development coupling portion 2332*a* of the development drive input gear is provided is the drive-side, and the opposite side with respect to the axial direction of the rotating axis M2 of the developing roller 2306 (parallel to the Y1 and Y2 directions in FIG. 217) is the non-drive-side.

Similarly to Embodiment 1, is provided with a separation/contact mechanism 2350R (see FIG. 217) is provided on the drive-side of the developing cartridge 2311, and a separation/contact mechanism 2350L (see FIG. 218) is provided on the non-drive-side. Further, since the separation/contact mechanism has almost the same function on the drive-side and the non-drive-side, R is added to the reference sign of each member on the drive-side, and L is added to the reference sign of each member on the non-drive-side with the same reference signs except for R and L.

[Tray Structure of Image Forming Apparatus]

Referring to FIGS. 215 to 216, the tray 2371 which supports the developing cartridge 2311 will be described in detail. FIGS. 215 and 216 are perspective views of the tray 2371 in an image forming apparatus (not shown). The tray 2371 is provided with a drive-side plate 2371*a* at the end in the arrow Y2 direction, a non-drive-side plate 2371*b* at the end in the arrow Y1 direction, and a drum holding member 2371*c* between them, they are formed integrally.

The drive-side side plate 2371*a* includes a positioning portion 2371Rv having straight portions 2371Rv1 and 2371Rv2, and has a positioning function for supporting and positioning the arc portion 2316*e* (see FIG. 217) of the drive-side supporting member 2316 of the developing cartridge 2311 as will be described hereinafter. Further, the straight portion 2371Rv1 and the straight portion 2371Rv2 form a substantially V-shape, and the angle θR formed between them is larger than 0° and smaller than 180°.

The non-drive-side plate 2371*b* is provided with a positioning portion 2371Lv comprising straight portions 2371Lv1 and 2371Lv2, and has a positioning function for supporting and positioning the arc portion 2317*e* (see FIG. 218) of the non-drive-side supporting member of the developing cartridge 2311 which will be described hereinafter. Further, the straight portion 2371Lv1 and the straight portion 2371Lv2 form a substantially V-shape, and the angle θL formed between them is larger than 0° and smaller than 180°.

The drum holding member 2371*c* rotatably supports the photosensitive drum 2304. The photosensitive drum 2304 is provided with a drum coupling member 2343 at the end in the Y2 direction of the arrow, and is structured to receive a driving force and rotate by engaging with a drum drive coupling on the main assembly side (not shown). Further, the drum holding member 2371*c* rotatably supports the charging roller 2305 on the photosensitive drum by way of a supporting member (not shown), the peripheral surface of the charging roller 2305 is contacted with the photosensitive drum 23041 to make the charging roller 2305 to be rotated by the photosensitive drum 2304.

Further, the drum holding member 2371*c* has a contacted surface (contact portion) is provided with 2371Rd which faces the separated holding surface (contact portion) 2351Rc (see FIG. 226) of the spacer 2351R, and which keeps the developing unit 2309 in a separated state, as in the Embodiment 1. Similarly, on the non-drive-side, the drum holding member 2371*c* has a contacted surface (contacting portion) 2371Ld facing the separation holding surface (contacting portion) 2351Lc of the spacer 2351L. Further, the drum holding member 2371*c* has a longitudinal positioning recess 2371*e* for determining the positions of the developing cartridge 2311 in the directions of arrows Y1 and Y2.

In addition, the drum holding member 2371*c* has rotation stop projections 2371Rk and 2371Lk for rotating and positioning the developing cartridge 2311 as will be described hereinafter. However, in this embodiment, only at the position where the developing unit accommodating the yellow (Y) toner is inserted (hereinafter, the insertion position of each color developing unit is referred to as a station), the rotation stop projections 2371Rk and 2371Lk for the yellow developing unit is provided not on the drum holding member 2371*c* but on the side plate connecting member 2371*w*. Further, in this embodiment, the rotation stop projections 2371Rk and 2371Lk are structured to stop the rotation of the developing cartridge of the adjacent station in the direction of arrow X1 instead of the developing cartridge of the station. The rotation stopper projections 2371Rk and 2371Lk may be provided on the drum holding member 2371*c* which holds the photosensitive drum of the same station so as to restrict the rotation of the developing unit of the same station. However, with respect to one developing unit, it is preferable that the positioning portions 2371Rv, 2371Lv and the rotation stop projections 2371Rk, 2371Lk are disposed at positions as remote as possible from each other in the same XZ cross-section (cross portion consisting of the arrow X direction and the Z direction) on the drive-side and the non-drive-side, respectively.

[Developing Cartridge Structure]

Next, referring to FIGS. 217 and 218, the developing cartridge 2311 to be mounted on the tray 2371 will be described in detail. FIG. 217 is an assembly perspective view of the drive-side of the developing cartridge 2311 including the separation/contact mechanism 2350R. In this embodiment, in order that the developing roller 2306 placed in the developing unit is capable of taking the developing position and the retracting position by moving relative to the photosensitive drum 2304 (see FIGS. 215 and 216) supported by the tray 2371, there is provided a drive-side supporting member 2316 which rotatably supports 2309. When the developing cartridge 2311 is mounted on the tray 2371, the drive-side supporting member is fixed to the tray 2371.

The drive-side supporting member 2316 is provided with a cylindrical support portion 2316*a* which fits with the outer diameter portion of the cylindrical portion 2328*b* of the development cover member 2328 and supports it rotatably. Here, the central axis of the cylindrical support portion 2316*a* of the development cover member 2328 is the same as the swing axis K described in the Embodiment 1, and is the rotation center of the developing unit and the development drive input gear 2332. Hereinafter, this central axis is referred to as a swing axis K. The development cover member 2328 is provided with supporting member locking portions 2328*m* and 2328*n* extending in the arrow Y2 direction on the radial outer side of the cylindrical portion 2328*b*.

The supporting member locking portions 2328*m* and 2328*n* have supporting member locking surfaces 2328*m*1 and 2328*n*1 which extend toward the cylindrical portion 2328*b* of the development cover member 2328 at the end in the Y2 direction of the arrow and engage with the locked surface 2316*h* of the drive-side supporting member 2316 to restrict the movement of the drive-side supporting member 2316 in the arrow Y2 direction. A gap (not shown) is provided between the locked surface 2316*h* and the supporting member locking surfaces 2328*m*1 and 2328*n*1 so as not to hinder the rotation of the developing unit 2309 integrated with the development cover member 2328. Further, the drive-side supporting member 2316 has an arc portion 2316*e* centered on a swing axis K which contacts the straight portions 2371Rv1 and 2371Rv2 of the positioning portion 2371Rv of the tray 2371. Further, substantially right above the arc portion 2316*e* in the arrow Z1 direction, there is provided a pressed portion 2316*g* pressed by the supporting member pressing portion 2391*b* which will be described hereinafter. However, the arc portion 2316*e* does not have to be an arc centered on the center of rotation of the developing unit, and the arrangement and shape are not limited to those of this example. In addition, the drive-side supporting member 2316 is provided with a rotation stop projection 2316*f* which engages with the rotation stop projection 2371Rk of the tray 2371 in the directions of arrows X1 and X2. The positioning of the drive-side supporting member 2316 relative to the tray 2371 will be described hereinafter.

The separation/contact mechanism 2350R includes a spacer 2351R which is a restriction member (separation holding member), a movable member 2352R which is a pressing member, and a tension spring 2353. Similarly to the Embodiment 1, the development cover member 2328 is provided with a first supporting portion 2328*c* and a second supporting portion 2328*k*. The first supporting portion 2328*c* is fitted with the support receiving portion 2351Ra of the spacer 2351R and is rotatably supported thereby. Further, the second supporting portion 2328*k* is fitted with the oblong support receiving portion 2352Ra of the movable member 2352R and is rotatably supported. Further, the tension spring 2353 urges the movable member 2352R and the spacer 2351R to attract each other.

In the foregoing, the structure of the developing unit 2309 on the drive-side is described, and the developing cartridge 2311 on the drive-side after assembly is shown in FIG. 219.

FIG. 218 is an assembly perspective view of the non-drive-side of the developing cartridge 2311 including the separation/contact mechanism 2350L. The developing cartridge includes a non-drive-side supporting member 2317 as a member having the same function as the drive-side supporting member 2316.

The non-drive-side supporting member 2317 includes a cylindrical support portion (not shown) which fits with the outer diameter portion of the cylindrical portion 2327*a* of the non-drive-side bearing 2327 and supports it rotatably. The non-drive-side bearing 2327 is provided with supporting member locking portions 2327*m* and 2327*n* extending in the direction of arrow Y1. The supporting member locking portions 2327*m* and 2327*n* has, at the end in the arrow Y1 direction, supporting member locking surfaces 2327*m*1 and 2327*n*1 which engage with the locked surfaces 2317*h* and 2317*k* of the non-drive-side supporting member 2317 to restrict the movement, in the direction of the arrow Y1, of the non-drive-side supporting member 2317. A gap (not shown) is provided between the locked surfaces 2317*h* and 2317*k* and the supporting member locking surfaces 2317*m*1 and 2317*n*1 to prevent interference when the developing unit 2309 integrated with the non-drive-side bearing rotates. Here, the central axis of the cylindrical portion 2327*a* of the non-drive-side bearing 2327 is the same as the swing axis K described above, and is also the rotation center of the developing unit 2309. Further, the non-drive-side supporting member 2317 has an arc portion 2317*e* centered on a swing axis K which contacts the straight portions 2371Lv1 and 2371Lv2 of the positioning portion 2371Lv of the tray 2371. In addition, substantially right above the arc portion 2317*e* in the arrow Z1 direction, there is provided a pressed portion 2317*g* pressed by the supporting member pressing portion 2390*b* which will be described hereinafter. However, the arc portion 2317*e* does not have to be an arc centered on the center of rotation of the developing unit, and the arrangement and shape are not limited to those of this example. In addition, the non-drive-side supporting member 2317 is provided with a rotation stop recess 2317*f* which engages with the rotation stop projection 2371Lk of the tray 2371 in the directions of arrows X1 and X2. The positioning of the non-drive-side supporting member 2317 with respect to the tray will be described hereinafter.

Similarly to the Embodiment 1, the non-drive-side is provided with a development pressure spring 2334 as an urging member for producing an urging force for bringing the developing roller into contact with the photosensitive drum 2304. The development pressure spring 2334 is assembled between the spring-hooked portion 2327*k* of the non-drive-side bearing 2327 and the spring-hooked portion 2317*m* of the non-drive-side supporting member 2327. In this embodiment, the spring-hooked portion 2317*m* of the non-drive-side supporting member 2327 is disposed on the downstream side in the arrow BB direction (same as the BB direction described in Example 1) with respect to the spring-hooked portion 2327*k* of the non-drive-side bearing 2327, and the development pressure spring 2334 is used as a tension spring, but the development pressure spring 2334 may be used as a compression spring by disposing the spring-hooked portion 2317*m* on the upstream side in the arrow BB direction. Further, an urging member or the like having the same function as the development pressure spring 2334 which brings the developing roller 2306 into contact with the photosensitive drum 2304 may be provided on the tray 2371, and the structure for applying the urging force is not limited to such examples. The separation/contact mechanism 2350L includes a spacer 2351L which is a restriction member, a movable member 2352L which is a pressing member, and a tension spring 2353. Similarly to the Embodiment 1, the non-drive-side bearing 2327 is provided with a first supporting portion 2327*b* and a second supporting portion 2327*e*. The first supporting portion 2327*b* is fitted with the support receiving portion 2351La of the spacer 2351L and is rotatably supported thereby. Further, the second supporting portion 2327*e* is fitted with the oblong support receiving portion 2352La of the movable member 2352L and is rotatably supported thereby. Further, the tension spring 2353 urges the movable member 2352L and the spacer 2351L to attract each other.

Further, the non-drive-side end of the developing frame 2325 is provided with a longitudinal positioning projection 2325*a* which is integral with the developing frame and projects in the direction of arrow X2 (73 in FIG. 219).

The structure of the non-drive-side developing unit 2309 has been described in the foregoing, and the non-drive-side developing cartridge 2311 after assembly is shown in FIG. 220.

With the above-described structure, when the developing unit 2309 is mounted on the tray 2371, the drive-side supporting member 2316 and the non-drive-side supporting member 2317 are fixed to the tray 2371, by which the developing unit 2309 is rotatable about the swing axis K.

[Positioning of Developing Cartridge]

Next, a structure in which the developing cartridge 2311 is mounted on the tray 2371 and the position of the developing cartridge 2311 is determined will be described in detail.

FIGS. 221 and 222 are a drive-side perspective view and a non-drive-side perspective view illustrating a process of mounting the developing cartridge 2311 on the tray 2371 for four colors (2311Y, 2311M, 2311C, 2311K). First, on the drive-side, the position in the arrow Z direction is determined by the contact of the arc portion 2316*e* of the drive-side supporting member 2316 with the straight portions 2371Rv1 and 2371Rv2 of the positioning portion 2371Rv of the tray 2371 (FIG. 215, FIG. 217). Further, by engaging the rotation stop projection 2371Rk of the rotation stop projection 2371 with the rotation stop recess 2316*f* of the drive-side supporting member 2316, the rotation in the XZ cross-section including the arrow X and the arrow Z is restricted (see FIGS. 215 and 217). Similarly, on the non-drive-side, the position in the arrow Z direction is determined by the contact of the arc portion 2317*e* of the non-drive-side supporting member 2317 with the straight portions 2371Lv1 and 2371Lv2 of the positioning portion 2371Lv of the tray described above (see FIGS. 215 and 218). Further, by engaging the rotation stop projection 2371Lk of the tray 2371 with the rotation stop recess 2317*f* of the non-drive-side supporting member 2317, rotation in the XZ cross-section including the arrow X and the arrow Z is restricted (FIG. 215, FIG. 218). Further, the longitudinal positioning projection 2325*a* disposed on the non-drive-side of the developing frame 2325 engages with the longitudinal positioning recess 2371*e* of the tray 2371, so that the movement in the arrow Y direction is restricted (72 and 73 in FIG. 215). With the above positioning structure, the developing unit 2309 can be positioned with respect to the tray 2371 in the developing unit mounting complete attitude shown in FIG. 223 (drive-side perspective view) and FIG. 224 (non-drive-side perspective view).

Referring to FIG. 225, a structure in which the tray 2371 is mounted on the main assembly of the image forming apparatus (not shown) and the attitude of the developing unit 2309 is maintained will be described. Here, for simplification of the description, the Y station among the four color stations will be described as a representative example. The structures which will be described in the in the following are the same for other stations. FIG. 225 shows a drive-side (FIG. 225 (part (a) of FIG. 225) and the non-drive-side (part (b) of FIG. 225) as viewed in their respective directions when the tray 2371 is mounted in the main assembly of the image forming apparatus and the front door (synonymous with the front door 11 described in the Embodiment 1) (not shown) is moved to the closed state. In part (a) of FIG. 225 and FIG. 225(*b*), a part of the supporting member pressing portions 2391*b* and 2390*b* is deleted by the partial cross-sectional line CS, and the details will be described hereinafter.

Cartridge pressing units 2390 and 2391 include first force application portions 2391*a* and 2390*a* which have a function of pushing down the movable members 2352R and 2352L of the developing unit 2309 as in the Embodiment 1. In addition, they also include the supporting member pressing portion 2391*b*, 2390*b* which press the drive-side supporting member 2316 and the non-drive-side supporting member 2317 against the straight portions (2371Rv1 and 2371Rv2, 2371Lv1 and 2371Lv2) of the positioning portions 2371Rv and 2371Lv of the tray 2371 by an urging member (not shown). The supporting member pressing portions 2391*b* and 2390*b* contact the pressed portions 2316*g* and 2317*g*, respectively, and press the drive-side supporting member 2316 and the non-drive-side supporting member 2317 in the direction of arrow ZA with a predetermined urging force. By this, the positions and orientations of the drive-side supporting member 2316 and the non-drive-side supporting member 2317 in the XZ cross-section can be stably maintained in the image forming apparatus main assembly. Also in the Y direction of the arrow, the position of the developing cartridge 2311 is determined in the image forming apparatus main assembly by the longitudinal position restriction portion (not shown).

Here, with the structure of this embodiment, it is desirable that the positioning portion 2371Rv and the rotation stop projection 2371Rk of the tray 2371, the cylindrical support portion 2316*a* of the drive-side supporting member 2316, and the supporting member pressing portion 2391*b* of the cartridge pressing unit 2391 are arranged substantially at the same position in the direction of the arrows Y. Similarly, on the non-drive-side, it is desirable that the positioning portion 2371Lv and the rotation stop projection 2371Lk of the tray 2371, the cylindrical support portion 2317*a* of the non-drive-side supporting member 2317, and the supporting member pressing portion 2390*b* of the cartridge pressing unit are arranged substantially at the same position in the direction of the arrow Y. By arranging in this manner, the drive-side supporting member 2316 and the non-drive-side supporting member 2317 are constrained from tilting in the image forming apparatus main assembly, so that unnecessary increase in sliding resistance when the developing unit 2309 is rotated is suppressed.

[Contact/Separation Operation of Developing Unit]

Since the contact/separation operation in this embodiment is the same as that in the Embodiment 1 as described hereinafter, the separation/contact mechanism 2350R on the drive-side will be briefly described, and the description about the non-drive-side will be omitted because it is the same as the drive-side. Referring to FIGS. 226 to 229, the description will be made. The tray 2371 and the supporting member pressing portion 2391*b* are omitted.

FIG. 226 shows a state in which the developing unit 2309 is placed at a separated position (retracted position). When the separation control member 2396R moves in the W42 direction from this state, the second force application surface 2396Ra of the separation control member 2396R and the second force receiving surface 2352Rp of the movable member 2352R come into contact with each other, and the movable member 2352R swings in the BB direction about the support portion 2328*k* (see FIG. 217) of the development cover member 2328. Further, as the movable member 2352R rotates, the spacer 2351R is rotated in the B2 direction while the second pressing surface 2352Rr of the movable member 2352R is in contact with the second pressed surface 2351Re of the spacer 2351R. Then, the spacer 2351R is rotated by the movable member 2352R to the separation release position (permission position, second position) where the separation holding surface (contact portion) 2351Rc and the contacted surface (contacted portion) 2371*d* of the tray 2371 are separated. By this, the developing unit 2309 can move from the separated position to the contact position (development position) where the developing roller 2306 and the photosensitive drum 2304 are in contact with each other (state in FIG. 227).

Thereafter, the separation control member 2396R moves in the direction of W41 and returns to the home position (state of FIG. 228).

When the image forming operation is completed and the separation control member 2396R moves in the W41 direction, the first force application surface 2396Rb and the first force receiving surface 2352Rm are brought into contact with each other, and by the first pressing surface 2352Rq of the movable member 2352R contacting the pressed surface 2326*c* (see FIG. 217) of the second bearing 2326 on the drive-side, the developing unit is rotated from the contact position in the direction of arrow V1 about the swing axis K (state in FIG. 229).

Thereafter, the separation control member 2396R moves in the W42 direction and returns to the home position, by which the spacer 2351R contacts the contact surface 2371*d* of the tray 2371 again, and shifts to the restriction position (separation holding position, first position). By this, the state is established in which the separation control member 2396R does not act on the movable member 2352R (state in FIG. 226).

According to the structure of this embodiment described above, the same effects as those of the first and Embodiment 9s can be obtained.

According to this embodiment, the structure of moving the developing unit between the developing position and the retracting position as described in Embodiments 1 to 25 can be also applied to a developing cartridge not including a photosensitive drum or the like.

Another Example 1 of Embodiment 26

In embodiment 26, the tray 2371 is provided with a contacted surface (contacted portion) 2371*d* which contacts the separation holding surface (contact portion) 2351Rc of the spacer 2351R. In this Example, a contacted surface (contacted portion) 2316*c* is provided on the drive-side supporting member 2316 of the developing unit. In this Example, the structure and operation different from those of the above-described 26 will be mainly described, and the description of the same structure and operation will be omitted. The same reference numerals are assigned to the structures corresponding to the above-described Embodiment 26.

[Developing Cartridge Structure]

Similarly to the 26th embodiment, when the developing cartridge 2311 is mounted on the tray 2371, the drive-side supporting member 2316 is fixed to the tray 2371, and the developing unit 2309 swings relative to the drive-side supporting member 2316 in the V1 and V2 directions about the swing axis K.

As shown in FIG. 242, the drive-side supporting member 2316 has a contact surface (contact portion) 2316*c* which contacts the separation holding surface (contact portion) 2351Rc of the spacer 2351R. Further, the developing cartridge 2311 is provided with a development pressure spring (biasing member) 2334 having one end which is connected to the drive-side supporting member 2316 and the other end which is connected to the drive-side bearing 2326. The development pressure spring 2334 urges the drive-side bearing 2326 so that the developing unit 2309 rotates relative to the drive-side supporting member 2316 in the V2 direction. The V2 direction is a direction in which the developing unit 2309 is moved from the retracted position (separation position) to the developing position (contact position) when the developing cartridge 2311 is mounted on the tray 2371.

The non-drive-side of the developing cartridge 2311 has the same structure as the drive-side.

[Contact/Separation Operation of Developing Unit]

Since the contact separation operation in this embodiment is the same as in Embodiments 1 and 26, as will be described hereinafter, the separation/contact mechanism 2350R on the drive-side will be briefly described, and the description about the non-drive-side will be the same as that the drive-side, and therefore, it is omitted. The description will be made, referring to FIGS. 242 to 245. The tray 2371 and the supporting member pressing portion 2391*b* are omitted.

FIG. 242 shows a state in which the developing unit 2309 is located at a separated position (retracted position). When the separation control member 2396R moves in the W42 direction from this state, the second force application surface 2396Ra of the separation control member 2396R and the second force receiving surface 2352Rp of the movable member 2352R come into contact with each other, and the movable member 2352R swings in the BB direction about the second supporting portion 2328*k* (see FIG. 217) of the development cover member 2328. As the movable member 2352R further rotates, the spacer 2351R is rotated in the B2 direction while the second pressing surface 2352Rr of the movable member 2352R is in contact with the second pressed surface 2351Re of the spacer 2351R. Then, the spacer 2351R is rotated by the movable member 2352R to the separation release position (permission position, second position) where the separation holding surface (contact portion) 2351Rc and the contacted surface 2316*c* of the drive-side supporting member 2316 are separated. By this, the developing unit 2309 is enabled to move from the separated position to the contact position (development position) where the developing roller 2306 and the photosensitive drum 2304 are in contact with each other (state shown in FIG. 243).

Thereafter, the separation control member 2396R moves in the direction of W41 and returns to the home position (state shown in FIG. 244).

When the image forming operation is completed and the separation control member 2396R moves in the W41 direction, the first force application surface 2396Rb and the first force receiving surface 2352Rm come into contact with each other, and by the first pressing surface 2352Rq of the movable member 2352R coming into contact with the first pressed surface 2326*c* (see FIG. 217) of the drive-side bearing 2326, the developing unit 2309 is rotated from the contact position in the direction of arrow V1 about the swing axis K (state shown in FIG. 245).

Thereafter, the separation control member 2396R moves in the direction of W42 and returns to the home position, so that the spacer 2351R comes into contact with the contacted surface 2316*c* of the drive-side supporting member 2316 again and shifts to the restriction position (separation holding position, first position). By this, the state is established in which the separation control member 2396R does not act on the movable member 2352R (the state shown in FIG. 242).

[Mounting and Dismounting of Developing Cartridge Relative to Tray]

In this alternative embodiment, when the developing cartridge 2311 in the state where the developing unit 2309 is in the retracted position as shown in FIG. 242 is mounted on the tray 2371, the developing unit 2309 is maintained in the retracted position. This is because the spacer 2351R contacts the contacted surface 2316*c* of the drive-side supporting member 2316 to maintain the state of being in the restriction position (separation holding position, first position). For the same reason, also when the developing cartridge 2311 with the developing unit 2309 in the retracted position is removed from the tray 2371 as shown in FIG. 242, the developing unit 2309 maintains the retracted position.

According to the structure of this embodiment described above, the same effects as those of the first and Embodiment 9s can be provided.

According to this alternative embodiment, the structure of moving the developing unit between the developing position and the retracting position as described in Embodiments 1 to 25 can be applied to the developing cartridge not including a photosensitive drum or the like.

Further, according to this embodiment, since the retracted position of the developing unit 2309 can be determined in the developing cartridge 2311, the position accuracy of the retracted position can be improved as compared with the Embodiment 26. In addition, the developing cartridge 2311 can be mounted to or removed from the tray 2371 while maintaining the retracted position of the developing unit 2309. Therefore, it is possible to prevent the developing roller 2306 and the photosensitive drum 2304 from coming into contact with each other when the developing cartridge is being mounted to or removed from the tray 2371.

Another Example 2 of Embodiment 26

In the 26th embodiment and the other embodiment 1 of the 26th embodiment, the drum holding member 2371*c* which supports the photosensitive drum 2304 is integrally structured on the tray 2371. In this alternative Example, the drum holding member which supports the photosensitive drum and the charging roller is structured as a drum cartridge which can be mounted to and dismounted from the tray. Referring to FIGS. 230 to 234, the description will be made. In this other embodiment, the structure and operation different from those of the above-described will be mainly described, and the description of the same structure and operation will be omitted. Further, the same reference numerals are assigned to the structures corresponding to the above-described Embodiment 26.

FIG. 230 is a perspective view of the drive-side showing a process of mounting the developing cartridge 2311 and the drum cartridge 2308 on the tray 2372 for four colors. The tray 2372 is provided with a drive-side plate 2372*a* at the end in the arrow Y2 direction and a non-drive-side plate 2372*b* at the end in the arrow Y1 direction, and is integrally structured by way of a side plate connecting member 2372*w* (Y, M, C, K).

The drive-side plate 2372*a* is provided with a drum cartridge positioning portion 2372Rx which determines the position and orientation of the drum cartridge 2308, and a drum cartridge rotation stop projection 2372Rm. Similarly, it is provided further with a developing cartridge positioning portion 2372Rv which determines the position and orientation of the developing cartridge 2311, and a developing cartridge rotation stop projection 2372Rk.

The non-drive-side plate 2372*b* is provided with a drum cartridge positioning portion 2372Lx which determines the position and orientation of the drum cartridge 2308, and a drum cartridge rotation stop projection 2372Lm. Similarly, it is provided further with a developing cartridge positioning portion 2372Lv which determines the position and orientation of the developing cartridge 2311, and a developing cartridge rotation stop projection 2372Lk.

The drum cartridge 2308 includes a drive-side drum supporting member 2318 and a non-drive-side drum supporting member 2319 which rotatably support the photosensitive drum 2304, and a drum frame portion 2315 which rotatably supports the charging roller 2305, and they are formed integrally. The drive-side drum supporting member 2318 has an arc portion 2318*e* centered on a swing axis K which is in contact with the straight portions 2372Rv1 and 2372Rv2 of the positioning portion 2372Rv of the tray 2372. Further, substantially right above the arc portion 2318*e* in the arrow Z1 direction, there is provided a pressed portion 2318*g* pressed by a drum cartridge pressing portion (not shown) provided on the image forming apparatus main assembly 170. In addition, the drive-side drum supporting member 2318 is provided with a rotation stop projection 2317*f* which engages with the rotation stop projection 2372Rk of the tray 2372 in the directions of arrows X1 and X2. Further, the drive-side drum supporting member 2318 is provided with contacted surface (contacted portion) 2318*c* in contact with the separation holding surface (contact portion) 2351Rc of the spacer 2351R to hold the developing unit 2309 in the retracted position (separation position).

The positioning of the drive-side drum supporting member 2318 with respect to the tray 2372 is the same as the above-described structure (structure of the developing cartridge 2311 and the tray 2371), and therefore, the description thereof will be omitted. Similarly, the non-drive-side drum supporting member 2319 also has an arc portion 2319*e* centered on a swing axis K which contacts the straight portions 2372Lv1 and 2372Lv2 of the positioning portion 2372Lv of the tray 2372. Further, substantially right above the arc portion 2319*e* in the arrow Z1 direction, there is provided a pressed portion 2319*g* pressed by a drum cartridge pressing portion (not shown). In addition, the non-drive-side drum supporting member 2319 is provided with a rotation stop projection 2317*f* for engagement with the rotation stop projection 2372Lk of the tray 2372 in the directions of arrows X1 and X2. Since the positioning of the non-drive-side drum supporting member relative to the tray 2372 is the same as the above-described structure, the description thereof will be omitted.

Next, positioning of the drum cartridge 2308 on the tray 2372 will be described. First, as shown in FIGS. 231 and 232, the drum cartridge 2308 is pressed toward the positioning portions 2372Rv and 2372Lv of the tray 2372 in the Z2 direction by the main assembly drum cartridge pressing portion (not shown). By this, as shown in FIGS. 233 and 234, the arc portions 2318*e* and 2319*e* are pressed against the straight portions 2372Rv1, 2372Rv2, 2372Lv1 and 2372Lv2 in the Z2 direction. By this, the position of the drum cartridge in the Z2 direction is determined. Further, the drum cartridge rotation stop projections 2372Rm and 2372Lm of the tray 2372 engage with the drum cartridge rotation stop recesses 2318*f* and 2319*f* of the drive-side drum supporting member 2319 and the non-drive-side drum supporting member 2319, by which the rotation of the drum cartridge rotation in the XZ plane is restricted. Further, the movement in the arrow Y direction is restricted by the abutment between an unshown longitudinal direction abutment portion of the non-drive-side drum supporting member 2319 and an unshown longitudinal direction restricting portion of the tray 2372. With the above positioning structure, the drum cartridge 2308 can be positioned relative to the tray 2372 in the drum cartridge mounting complete attitude shown in FIGS. 233 and 234.

Since the mounting of the developing cartridge 2311 on the tray 2372 is the same as the above-described structure (structure of the developing cartridge 2311 and the tray 2371), the description thereof will be omitted.

The separation/contact mechanism in this embodiment may be provided on only one side of the developing unit 2309 on the drive-side or the non-drive-side, as in the Embodiment 2.

According to the structure of this embodiment described above, the same effects as those of the first and Embodiment 9s can be provided.

According to this alternative embodiment, a structure with which the developing unit is moved between the developing position and the retracted position as described in Embodiments 1 to 25 can be used with the structure in which the drum cartridge and the developing cartridge can be mounted to and dismounted from the image forming apparatus.

Examples of Structures (or Concepts) Corresponding to the Disclosure of the Embodiments The structures (or concepts) corresponding to the above-mentioned disclosure of the embodiments will be stated in the following: However, the above-mentioned disclosure of this embodiments is not limited to the following examples, and also discloses structures not stated in the following:

<<STRUCTURE Aa>>

(Structure Aa1)

A cartridge comprising:

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a contact force receiving portion capable of receiving a contacting force for moving the holding portion from the first position toward the second position to move the second unit to the developing position when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Aa2)

A cartridge according to Structure Aa1, wherein when the holding portion is in the first position, the holding portion is capable of restricting movement of the second unit from the spaced position to the developing position, and when the holding portion is in the second position, the holding portion permits movement of the second unit from the spaced position to the developing position.

(Structure Aa3)

A cartridge according to Structure Aa2, wherein when the holding portion is in the first position, the holding portion restricts movement of the second unit from the space position to the developing position by contacting with the first unit and the second unit.

(Structure Aa4)

A cartridge according to Structure Aa3, further comprising a holding member including the holding portion, wherein the second unit is provided with a second frame rotatably supporting the developing member.

(Structure Aa5)

A cartridge according to Structure Aa4, wherein the contact force receiving portion is provided on the holding member.

(Structure Aa6)

A cartridge according to Structure Aa5, further comprising a spacing force receiving portion for receiving a spacing force for moving the holding portion from the second position to the first position to move the second unit to the spaced position, when the second unit is in the developing position.

(Structure Aa7)

A cartridge according to Structure Aa6, wherein the spacing force receiving portion is provided on the second frame.

(Structure Aa8)

A cartridge according to Structure Aa6, wherein the spacing force receiving portion is provided on the holding member.

(Structure Aa9)

A cartridge according to Structure Aa4, wherein the contact force receiving portion is provided on the second frame.

(Structure Aa10)

A cartridge according to Structure Aa9, further comprising a spacing force receiving portion for receiving a spacing force for moving the holding portion from the second position to the first position to move the second unit to the space position, when the second unit is in the developing position, wherein the spacing force receiving portion is provided on the second frame.

(Structure Aa11)

A cartridge according to Structure Aa4, further comprising a movable member provided with a pressing portion and the contact force receiving portion, wherein the holding member is provided with a pressed portion, and wherein the holding portion is moved from the first position toward the second position by the pressing portion pressing the pressed portion as a result of movement of the movable member by a force received by the contact force receiving portion.

(Structure Aa12)

A cartridge according to Structure Aa11, further comprising a spacing force receiving portion for receiving a spacing force for moving the holding portion from the second position toward the first position to move the second unit to the space position when the second unit is in the developing position, wherein the spacing force receiving portion is provided on the movable member.

(Structure Aa13)

A cartridge according to any one of Structures Aa3-12, further comprising a holding portion urging member for urging the holding portion from the second position toward the first position.

(Structure Aa14)

A cartridge according to Structure Aa13, wherein the holding portion urging member includes an elastic member.

(Structure Aa15)

A cartridge according to Structure Aa14, wherein the elastic member includes a spring.

(Structure Aa16)

A cartridge according to Structure Aa3, further comprising a holding portion urging member for urging the holding portion in a direction from the second position toward the first position when the holding portion is in the first position, and for urging the holding portion in a direction from the first position toward the second position when the holding portion is in the second position.

(Structure Aa17)

A cartridge according to Structure Aa16, wherein the holding portion urging member includes an elastic member.

(Structure Aa18)

A cartridge according to Structure Aa17, wherein the elastic member includes a spring.

(Structure Aa19)

A cartridge according to any one of Structures Aa4-18, wherein the holding member is movably supported by the second frame.

(Structure Aa20)

A cartridge according to Structure Aa19, wherein the holding member is rotatably supported by the second frame.

(Structure Aa21)

A cartridge according to Structure Aa19 or Aa20, wherein the first unit includes a first frame rotatably supporting photosensitive member, and the second unit is movable between the spaced position and the developing position by rotation of the second frame relative to the first frame, wherein the holding member disposed on an opposite side of the contact force receiving portion with respect to a rotation axis of the second frame.

(Structure Aa22)

A cartridge according to Structure Aa4, wherein the first unit includes a first frame rotatably supporting the photosensitive member, and the holding member is movably supported by the first frame.

(Structure Aa23)

A cartridge according to Structure Aa4, wherein the first unit includes a first frame rotatably supporting the photosensitive member, and the holding member is integrally formed with the first frame and/or the second frame, and wherein the holding portion is movable between the first position and the second position by deformation of the holding member relative to the first frame and/or the second frame.

(Structure Aa24)

A cartridge according to any one of Structures Aa1-Aa23, further comprising a second unit urging member for urging the second unit in a direction from the spaced position toward the developing position.

(Structure Aa25)

A cartridge according to Structure Aa24, wherein the second unit urging member includes an elastic member.

(Structure Aa26)

A cartridge according to Structure Aa14, wherein the elastic member includes a spring.

(Structure Aa27)

A cartridge according to Structures Aa24-Aa26, wherein when the holding portion is in the first position, the holding portion is capable of restricting movement of the second unit from the spaced position to the developing position against an urging force of the second unit urging member.

(Structure Aa28)

A cartridge according to any one of Structures Aa2-27, further comprising

- a first positioning portion provided in the first unit position the second unit in the spaced position;
- a second positioning portion provided in the first unit to position the second unit in the developing position, and
- an urging portion for urging the second unit toward the first positioning portion and the second positioning portion,
- wherein when the holding portion is in the first position, the second unit is held in the spaced position in a state that the second unit is urged toward the first positioning portion by the urging portion, and when the holding portion is in the second position, the second unit is held in the developing position in the state that the second unit is urged toward the second positioning portion by the urging portion.

(Structure Aa29)

A cartridge according to Structure Aa28, further comprising a holding member including the holding portion, wherein the second unit includes a second frame rotatably supporting the developing member.

(Structure Aa30)

A cartridge according to any one of Structures Aa2-27, further comprising a first positioning portion provided in the first unit position the second unit in the spaced position;

a second positioning portion provided in the first unit to position the second unit in the developing position, wherein in a state in which the cartridge is oriented such that the photosensitive member is in a lower position, when the holding portion is in the first position, the second unit is supported by the first unit in a state that the second unit is in the spaced position while being urged toward the first positioning portion by a weight thereof, when holding portion is in the second position, the second unit is supported by the first unit in a state that the second unit is in the developing position while being urged toward the second positioning portion by a weight thereof.

(Structure Aa31)

A cartridge according to Structure Aa30, further comprising a holding member including the holding portion, wherein the second unit includes a second frame rotatably supporting the developing member.

(Structure Aa32)

A cartridge according to Structure Aa1, further comprising a spacing force receiving portion for receiving a spacing force for moving the holding portion from the second position toward the first position to move the second unit to the spaced position, wherein when the second unit is in the spaced position, a space is capable of being formed between the contact force receiving portion and the spacing force receiving portion, and wherein as seen in a direction along a rotational axis of the developing member in a state that the space is formed, the contact force receiving portion disposed at a position closer to the rotational axis of the photosensitive member than the spacing force receiving portion.

(Structure Aa33)

A cartridge according to Structure Aa32, further comprising a holding member including the holding portion, wherein the second unit includes a second frame rotatably supporting the developing member, and the contact force receiving portion is provided on the holding member, and the spacing force receiving portion is provided on the second frame.

(Structure Aa34)

A cartridge according to Structure Aa32 or 33, wherein as seen in the direction of an axial direction of the developing member in the state that the space is formed, the contact force receiving portion and the spacing force receiving portion are opposed to each other with the space therebetween.

(Structure Aa35)

A cartridge according to Structure Aa32, further comprising a holding member including the holding portion, wherein the contact force receiving portion is provided on the holding portion so as to be movable relative to the holding member.

(Structure Aa36)

A cartridge according to Structure Aa35, wherein the spacing force receiving portion is provided on the holding portion so as to be movable relative to the holding member.

(Structure Aa37)

A cartridge according to Structure Aa32, further comprising a holding member including the holding portion, wherein the spacing force receiving portion is provided on the holding portion so as to be movable relative to the holding member.

(Structure Aa38)

A cartridge according to Structure Aa1, wherein the contact force receiving portion is movable between a stand-by position and an operating position where the contact force receiving portion is projected more from the second unit than in the stand-by position, by movement thereof in a predetermined direction, wherein when the second unit in the spaced position and the contact force receiving portion is in the operating position, the contact force receiving portion is capable of moving the holding portion from the first position to the second position by moving in a first direction crossing with the predetermined direction by receiving a contact force.

(Structure Aa39)

A cartridge according to Structure Aa38, further comprising a holding member including a pressed portion and the holding portion, and a movable member provided with the contact force receiving portion, wherein by the contact force receiving portion receiving the contact force to move in the first direction, the pressing portion presses the pressed portion to move the holding portion from the first position to the second position.

(Structure Aa40)

A cartridge according to Structure Aa39, wherein the contact force receiving portion displaces in a direction parallel with a direction perpendicular to the axial direction of the developing member.

(Structure Aa41)

A cartridge according to Structure Aa40, wherein the contact force receiving portion is moved in the first directions by rotation of the movable member about a predetermined rotational axis, and the contact force receiving portion is moved in the predetermined direction by movement of the movable member in the direction crossing with the predetermined rotational axis.

(Structure Aa42)

A cartridge according to Structure Aa40, wherein the first unit includes a first frame rotatably supporting the photosensitive member, and the second unit includes a second frame rotatably supporting the developing member, and wherein the movable member supported by the second frame, and the contact force receiving portion is moved in the predetermined direction the movement of the second frame relative to the first frame.

(Structure Aa43)

A cartridge according to Structure Aa40, wherein the first unit includes a first frame rotatably supporting the photosensitive member, and a supported portion supported to support the first frame, wherein the second unit includes a second frame rotatably supporting the developing member, wherein the second frame supported by the first frame, and the movable member is supported by the second frame, and wherein the contact force receiving portion movable in the predetermined direction by movement of the first frame and the second frame relative to the first frame supporting portion.

(Structure Aa44)

A cartridge of according to Structure Aa40, further comprising a rotational driving force receiving portion, wherein the movable member is movable by a driving force from the rotational driving force receiving portion so that the contact force receiving portion moves in the predetermined direction.

(Structure Aa45)

A cartridge according to Structure Aa39, wherein the contact force receiving portion the displaceable in a direction parallel with an axial direction of at least the developing member by movement of the contact force receiving portion in the predetermined direction.

(Structure Aa46)

A cartridge according to Structure Aa45, wherein the contact force receiving portion is movable in the predetermined direction by swing of the movable member about an axis crossing with the rotational axis of the developing member.

(Structure Aa47)

A cartridge according to Structure Aa39, further comprising an urging member having an one end portion connected with the holding member and another end portion connected with the movable member, wherein the urging member is capable of urging the holding member such that the holding portion moves from the second position to the first position, and is capable of urging the movable member such that the contact force receiving portion moves from the operating position to the stand-by position.

(Structure Aa48)

A cartridge according to Structure Aa38, further comprising a spacing force receiving portion for receiving a spacing force for moving the holding portion from the second position toward the first position to move the second unit to the spaced position, wherein the spacing force receiving portion is movable between a stand-by position and an operating position where the spacing force receiving portion is projected more from the second unit than in the stand-by position, by movement thereof in the predetermined direction, and wherein when the second unit is in the developing position and the spacing force receiving portion in the operating position, the holding portion is capable of being moved from the second position toward the first position by the spacing force receiving portion receiving a spacing force to move in a second direction crossing with the predetermined direction.

(Structure Aa49)

A cartridge according to any one of Structures Aa38-43, 45-48, further comprising an operating force receiving portion for receiving an operating force for moving the contact force receiving portion from the stand-by position to the operating position.

(Structure Aa50)

A cartridge according to Structure Aa1, wherein the contact force receiving portion is movable in a direction parallel with the line while maintaining a state in which at least a part of the developing member is spaced more from the photosensitive member than when the contact force receiving portion is in the developing position.

(Structure Aa51)

A cartridge according to Structure Aa1, further comprising a spacing force receiving portion for receiving a spacing force for moving the holding portion from the second position to the first position to move the second unit to the spaced position, when the second unit is in the developing position, wherein the spacing force receiving portion is movable in a direction parallel with the line while maintaining a state in which at least a part of the developing member is spaced from the photosensitive member.

(Structure Aa52)

A cartridge according to Structure Aa50, wherein the spacing force receiving portion is movable in a direction parallel with the line by linear movement thereof while maintaining a state in which at least a part of the developing member is spaced from the photosensitive member.

(Structure Aa53)

A cartridge according Structure Aa52, wherein the second unit the movable between the spaced position and the developing position by rotation thereof relative to the first unit, and wherein by movement of the second unit from the spaced position such that the developing member is further away from the photosensitive member, the spacing force receiving portion moves in a direction parallel with the line while maintaining a state in which at least a part of the developing member is spaced from the photosensitive member.

(Structure Aa54)

A cartridge according to Structure Aa50, wherein the contact force receiving portion is movable in a direction parallel with the line, while maintaining a state in which the developing member is in contact with the photosensitive member.

(Structure Aa55)

A cartridge according to Structure Aa54, wherein the holding portion is supported so as to be movable relative to the second unit, and the contact force receiving portion is movable in a direction parallel with the line while maintaining a state in which the developing member is in contact with the photosensitive member, by movement of the holding portion relative to the second unit.

(Structure Aa56)

A cartridge according to Structure Aa1, wherein when the holding portion is in the second position, the holding portion is capable of restricting movement of the second unit from the developing position to the spaced position, and when the holding portion is in the first position, the holding portion permits movement of the second unit from the spaced position to the developing position.

(Structure Aa57)

A cartridge according to Structure Aa56, wherein the holding portion is provided with an urging portion, and wherein when the holding portion is in the second position, movement of the second unit from the developing position to the spaced position is restricted by urging the second unit in a direction from the spaced position toward the developing position by the urging portion.

(Structure Aa58)

A cartridge according to Structure Aa57, wherein when the holding portion is in the first position, the second unit is permitted to move to the spaced position by the urging portion not urging the second unit in the direction from the spaced position to the developing position.

(Structure Aa59)

A cartridge according to Structure Aa57, wherein when the holding portion is in the second position, the urging portion urges the second unit in the direction from the spaced position toward the developing position with an urging force Which is smaller than that when urging the second unit in the direction from the spaced position toward the developing position.

(Structure Aa60)

A cartridge according to any one of Structures Aa56-59, further comprising a second unit urging member for urging the second unit in a direction from the developing position toward the spaced position.

(Structure Aa61)

A cartridge according to Structure Aa60, wherein the second unit urging member includes an elastic member.

(Structure Aa62)

A cartridge according to Structure Aa61, wherein the elastic member includes a spring.

(Structure Aa63)

A cartridge according to Structure Aa1, wherein when the holding portion is in the first position, the holding portion is capable of restricting movement of the second unit from the spaced position to the developing position, and when the holding portion is in the second position, the holding portion is capable of restricting movement of the second unit from the developing position to the spaced position.

(Structure Aa64)

A cartridge according Structure Aa63, wherein the holding portion is provided with an urging portion, and when the holding portion is in the first position, movement of the second unit from the spaced position to the developing position is restricted by urging the second unit in a direction from the developing position toward the spaced position by the urging portion, and when the holding portion is in the second position, movement of the second unit from the developing position to the spaced position is restricted by urging the second unit in a direction from the spaced position toward the developing position by the urging portion.

(Structure Aa65)

A cartridge according to Structure Aa1, further comprising a movable member movable relative to the second unit provided with a spacing force receiving portion for receiving a spacing force for moving the holding portion from the second position toward the first position to move the second unit to the spaced position when the second unit is in the developing position, and a pressing portion capable of pressing the second unit, wherein when the second unit is in the contact position, the movable member is capable of taking a transmission enabled state in which a force received by the spacing force receiving portion is capable of being transmitted to the pressing portion to move the second unit, and a transmission disabled state in which the force received by the spacing force receiving portion is not transmitted to the pressing portion.

(Structure Aa66)

A cartridge according to any one of Structures Aa1-65, wherein when the cartridge is divided into sections by a line connecting the rotational center of the photosensitive member and the rotational center of the developing member as seen in a direction of the rotational axis of the developing member in the state that the second unit is in the spaced position, at least a part of the contact force receiving portion is disposed in a section opposite from the section including the rotational center of the charging member.

(Structure Aa67)

A cartridge according to any one of Structures Aa1-65, further comprising a coupling member for receiving a driving force for rotationally driving the developing member.

(Structure Aa68)

A cartridge according to Structure Aa67, wherein as viewed along the rotational axis direction of the photosensitive member in a state that the second unit is in the spaced position, when the cartridge is divided into sections by a line connecting the rotational center of the photosensitive member and the rotational center of the developing member, at least a part of the contact force receiving portion is disposed in a section opposite from a section including the coupling member.

(Structure Aa69)

A cartridge according to Structure Aa67, wherein when another predetermined tangential line is a tangential line of a surface of the developing member at an intersection, which is more remote from a rotational center of the coupling member, of intersections between a line connecting a rotational center of the coupling member and a rotational center of the developing member and the surface of the developing member, as viewed along the direction of the rotational axis of the developing member, and another predetermined section is a section in which the rotational center of the coupling member does not exist when the cartridge is divided into sections by the another predetermined tangent line, and wherein when the second unit is in the spaced position, the contact force receiving portion is disposed in the another section, as viewed along the direction of the rotational axis of the developing member.

(Structure Aa70)

A cartridge according to Structure Aa69, wherein as viewed in an axial direction of the developing member, the contact force receiving portion is provided on a projected portion projected from second unit in a direction parallel with a line connecting at least a rotational center of the coupling member and a rotational center of the developing member.

(Structure Aa71)

A cartridge according to Structure Aa67, further comprising a supply member contactable with the developing member to supply toner to the developing member, wherein in a state that the second unit is in the spaced position, when the cartridge is divided into sections by a line connecting a rotational center of the developing member and a rotational center of the supplying member as viewed along the direction of the rotational axis of the developing member, at least a part of the contact force receiving portion is disposed in a section opposite from a section including the rotational center of the coupling.

(Structure Aa72)

A cartridge according to Structure Aa67, wherein the contact force receiving portion is disposed on a side in which the coupling member is provided with respect to a direction of the rotational axis of the developing member.

<<STRUCTURE Ab>>

(Structure Ab1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a spacing force receiving portion capable of receiving a spacing force for moving the holding portion from the second position toward the first position to moves the second unit to the spaced position, when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structure Ab1)

As for dependent structures of Structure Ab1, the dependent structures of Structure Aa1 and the structures of the embodiments may be properly selected and used.

<<STRUCTURE Ba>>

(Structure Ba1)

A cartridge mountable to a main assembly of an image forming apparatus, the image forming apparatus including a contact force applying portion and a spacing force applying portion, the cartridge comprising:

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position;

a contact force receiving portion capable of receiving a contacting force for moving the holding portion from the first position toward the second position to move the second unit to the developing position when the second unit is in the spaced position; and a spacing force receiving portion capable of receiving a spacing force for moving the holding portion from the second position to the first position to move the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the contact force receiving portion is disposed in the predetermined section, as viewed along the direction of the rotational axis of the developing members, and wherein when the holding portion is in the first position and the second unit is in the spaced position, the spacing force applying portion and the spacing force receiving portion are in a state of being separated from each other, and the contact force applying portion and the contact force receiving portion are in the state of being separated from each other.

(Structure Ba2)

As cartridge according to Structure Ba1, wherein when the holding portion is in the first position, the holding portion is capable of restricting movement of the second unit from the separated position to the developing position, and when the holding portion is in the second position, the holding portion permits movement of the second unit from the spaced position to the developing position.

(Structure Ba3)

A cartridge according to Structure Ba2, wherein when the holding portion is in the first position, the holding portion restricts movement of the second unit from the spaced position to the developing position by contacting the first unit and the second unit.

(Structure Ba4)

A cartridge according to Structure Ba3, further comprising a holding member including the holding portion, wherein the second unit is provided with a second frame rotatably supporting the developing member.

(Structure Ba5)

A cartridge according to Structure Ba4, wherein the contact force receiving portion is provided on the holding member.

(Structure Ba6)

A cartridge according to Structure Ba4 or 5, wherein the spacing force receiving portion is provided on the second frame.

(Structure Ba7)

A cartridge according to Structure Ba4 or 5, wherein the spacing force receiving portion provided on the holding member.

(Structure Ba8)

A cartridge according to Structure Ba4, wherein the contact force receiving portion is provided on the second frame.

(Structure Ba9)

A cartridge according to Structure Ba8, further comprising a spacing force receiving portion, provided on the second frame, for receiving a spacing force for moving the holding portion from the second position toward the first position to move the second unit through the spaced position, when the second unit is in the developing position.

(Structure Ba10)

A cartridge according to Structure Ba4, further comprising a movable member provided with a pressing portion and the contact force receiving portion, wherein the holding member is provided with a pressed portion, wherein the holding portion is moved from the first position toward the second position by the pressing portion pressing the pressed portion as a result of movement of the movable member by a force received by the contact force receiving portion.

(Structure Ba11)

A cartridge according to Structure Ba10, further comprising a spacing force receiving portion, provided on the movable member, for receiving a spacing force for moving the holding portion from the second position to the first position to move the second units to the spaced position, when the second unit is in the developing position.

(Structure Ba12)

A cartridge according to any one of Structures Ba3-11, further comprising a holding portion urging member for urging the holding portion from the second position toward the first position.

(Structure Ba13)

A cartridge according to the Structure Ba12, wherein the holding portion urging member includes an elastic member.

(Structure Ba14)

A cartridge according to Structure Ba14, wherein the elastic member includes a spring.

(Structure Ba15)

A cartridge according to Structure Ba3, further comprising a holding portion urging member for urging the holding portion in a direction from the second position toward the first position when the holding portion is in the first position, and for urging the holding portion in a direction from the first position toward the second position when the holding portion is in the second position.

(Structure Ba16)

A cartridge according to the Structure Ba15, wherein the holding portion urging member includes an elastic member.

(Structure Ba17)

A cartridge according to Structure Ba16, wherein the elastic member includes a spring.

(Structure Ba18)

A cartridge according to any one of Structures Ba4-17, wherein the holding member is movably supported by the second frame.

(Structure Ba19)

A cartridge according to Structure Ba18, wherein the holding member is rotatably supported by the second frame.

A cartridge according to Structure Ba18 or 19, wherein the first unit includes a first frame rotatably supporting the photosensitive member, and the second unit is movable between the spaced position and the developing position by rotation of the second frame relative to the first frame, and wherein the holding member disposed on an opposite side from the contact force receiving portion with respect to a rotational center of the second frame.

(Structure Ba21)

A cartridge according to Structure Ba4, wherein the first unit includes a first frame rotatably supporting the photosensitive member, and the holding member is movably supported by the first frame.

(Structure Ba22)

A cartridge according to Structure Ba4, wherein the first unit includes a first frame rotatably supporting the photosensitive member, and the holding member is integrally formed with the first frame and/or the second frame, and the holding portion is movable between the first position and the second position by deformation of the holding member relative to the first frame and/or the second frame.

(Structure Ba23)

A cartridge according to any one of Structures Ba1-22, further comprising a second unit urging member for urging the second unit in a direction from the spaced position toward the developing position.

(Structure Ba24)

A cartridge according to Structure Ba23, wherein the second unit urging member includes an elastic member.

(Structure Ba25)

A cartridge according to Structure Ba24, wherein the elastic member includes a spring.

(Structure Ba26)

A cartridge according to Structure Ba23-25 wherein when the holding portion is in the first position, the holding portion is capable of restricting movement of the second unit from the spaced position toward the developing position against an urging force of the second unit urging member.

(Structure Ba27)

A cartridge according to any one of Structures Ba2-26, further comprising, a first positioning portion, provided on the first unit, for positioning the second unit in the spaced position, a second positioning portion provided in the first unit to position the second unit in the developing position, and an urging portion for urging the second unit toward the first positioning portion and the second positioning portion, wherein when the holding portion is in the first position, the second unit is held in the spaced position in a state that the second unit is urged toward the first positioning portion by the urging portion, and when the holding portion is in the second position, the second unit is held in the developing position in the state that the second unit is urged toward the second positioning portion by the urging portion.

(Structure Ba28)

A cartridge according to Structure Ba27, further comprising a holding member including the holding portion, wherein the second unit includes a second frame rotatably supporting the developing member.

(Structure Ba29)

A cartridge according to any one of Structures Ba2-26, further comprising a first positioning portion, provided on the first unit, for positioning the second unit in the spaced position, a second positioning portion provided on the first unit to position the second unit in the developing position, and wherein in a state in which the cartridge is oriented such that the photosensitive member is in a lower position, when the holding portion is in the first position, the second unit is supported by the first unit in a state that the second unit is in the spaced position while being urged toward the first positioning portion by a weight thereof, and when holding portion is in the second position, the second unit is supported by the first unit in a state that the second unit is in the developing position while being urged toward the second positioning portion by a weight thereof.

(Structure Ba30)

A cartridge according to Structure Ba29, further comprising a holding member including the holding portion, wherein the second unit includes a second frame rotatably supporting the developing member.

(Structure Ba31)

A cartridge according to Structure Ba1, wherein when the second unit is in the spaced position, a space is capable of being formed between the contact force receiving portion and the spacing force receiving portion, wherein as seen in a direction along a rotational axis of the developing member in a state that the space is formed, the contact force receiving portion disposed at a position closer to the rotational axis of the photosensitive member than the spacing force receiving portion.

(Structure Ba32)

A cartridge according to Structure Ba31, further comprising a holding member including the holding portion, wherein the second unit includes a second frame rotatably supporting the developing member, and the contact force receiving portion is provided on the holding member, and the spacing force receiving portion is provided on the second frame.

(Structure Ba33)

A cartridge according to Structures Ba31 or 32, wherein as viewed along a direction of the axis of the developing member in the state the space is formed, the contact force receiving portion and the spacing force receiving portion are opposed to each other with the space therebetween.

(Structure Ba34)

A cartridge according to Structure Ba31, further comprising a holding member including the holding portion, wherein the contact force receiving portion is provided on the holding portion so as to be movable relative to the holding member.

(Structure Ba35)

A cartridge according to Structure Ba34, wherein the spacing force receiving portion is provided so as to be movable relative to the holding member.

(Structure Ba36)

A cartridge according to Structure Ba31, further comprising a holding member including the holding portion, wherein the spacing force receiving portion is provided on the holding portion so as to be movable relative to the holding member.

(Structure Ba37)

A cartridge according to Structure Ba1, wherein the contact force receiving portion is movable between a stand-by position and an operating position where the contact force receiving portion is projected more from the second unit than in the stand-by position, by movement thereof in a predetermined direction, and wherein when the second unit in the spaced position and the contact force receiving portion is in the operating position, the contact force receiving portion is capable of moving the holding portion from the first position to the second position by moving in a first direction crossing with the predetermined direction by receiving a contact force.

(Structure Ba38)

A cartridge according to Structure Ba37, further comprising a holding member including a pressed portion and the holding portion, and a movable member includes a pressing portion and the contact force receiving portion, wherein by the contact force receiving portion receiving the contact force to move in the first direction, the pressing portion presses the pressed portion to move the holding portion from the first position to the second position.

(Structure Ba39)

A cartridge according to Structure Ba38, wherein the contact force receiving portion is displaceable in a direction parallel with a direction perpendicular to an axial direction of the developing member, the movement of the contact force receiving portion in the predetermined direction.

(Structure Ba40)

A cartridge according to Structure Ba39, wherein the contact force receiving portion movable in the first direction by rotation of the movable member about a predetermined rotational axis, and the contact force receiving portion is movable in the predetermined direction by movement of the movable member in a direction crossing with the predetermined rotational axis.

(Structure Ba41)

A cartridge according to Structure Ba39, wherein the first unit includes a first frame rotatably supporting the photosensitive member, and the second unit includes a second frame rotatably supporting the developing member, wherein the movable member supported by the second frame, and the contact force receiving portion is moved in the predetermined direction the movement of the second frame relative to the first frame.

(Structure Ba42)

A cartridge according to Structure Ba39, wherein the first unit includes a first frame rotatably supporting the photosensitive member, and a supported portion supported to support first frame, and the second unit includes a second frame rotatably supporting the developing member, wherein the second frame supported by the first frame, and the movable member is supported by the second frame, and wherein the contact force receiving portion movable in the predetermined direction by movement of the first frame and the second frame relative to the first frame supporting portion.

(Structure Ba43)

A cartridge according to Structure Ba39, further comprising a rotational driving force receiving portion, wherein the movable member is movable by a driving force from the rotational driving force receiving portion so that the contact force receiving portion moves in the predetermined direction.

(Structure Ba44)

A cartridge according to Structure Ba38, wherein the contact force receiving portion is displaceable at least in a direction parallel with an axial direction of the developing member.

(Structure Ba45)

A cartridge according to Structure Ba44, the contact force receiving portion is movable in the predetermined direction by swing of the movable member about an axis crossing with the rotational axis of the developing member.

(Structure Ba46)

A cartridge according to Structure Ba38, further comprising an urging member having an end connected with the holding member and the other end connected with the movable member, wherein the urging member is capable of urging the holding member such that the holding portion moves from the second position to the first position, and is capable of urging the movable member such that the contact force receiving portion moves from the operating position to the stand-by position.

(Structure Ba47)

A cartridge according to Structure Ba37, wherein the spacing force receiving portion is movable between a stand-by position and an operating position where the spacing force receiving portion is projected more from the second unit than in the stand-by position, by movement thereof in the predetermined direction, wherein when the second unit is in the developing position and the spacing force receiving portion in the operating position, the holding portion is capable of being moved from the second position toward the first position by the spacing force receiving portion receiving a spacing force to move in a second direction crossing with the predetermined direction.

(Structure Ba48)

A cartridge according to any one of Structures Ba37-42, 44-47, further comprising an operating force receiving portion for receiving an operating force for moving the contact force receiving portion from the stand-by position to the operating position.

(Structure Ba49)

A cartridge according to Structure Ba1, wherein the contact force receiving portion is movable in a direction parallel with the line while maintaining a state in which at least a part of the developing member is spaced more from the photosensitive member than when the contact force receiving portion is in the developing position.

(Structure Ba50)

A cartridge according to Structure Ba1, wherein the spacing force receiving portion movable in a direction parallel with the line while maintaining a state in which at least a part of the developing member is spaced from the photosensitive member.

(Structure Ba51)

A cartridge according to Structure Ba49, wherein the spacing force receiving portion is movable in a direction parallel with the line while maintaining a state in which at least a part of the developing member is spaced from the photosensitive member, by linear movement of the spacing force receiving portion.

(Structure Ba52)

A cartridge according to Structure Ba51, wherein the second unit is movable between the spaced position and the developing position by rotation thereof relative to the first unit, wherein by movement of the second unit from the spaced position such that the developing member is further away from the photosensitive member, the spacing force receiving portion moves in a direction parallel with the line while maintaining a state in which at least a part of the developing member is spaced from the photosensitive member.

(Structure Ba53)

A cartridge according to Structure Ba49, wherein the contact force receiving portion is movable in a direction parallel with the line while maintaining a state in which the developing member is in contact with the photosensitive member.

(Structure Ba54)

A cartridge according to Structure Ba53, wherein the holding portion it supported so as to be movable relative to the second unit, and wherein by a movement of the holding portion relative to the second unit, the contact force receiving portion is movable in a direction parallel with the line while maintaining a state in which the developing member Is in contact with the photosensitive member.

(Structure Ba55)

A cartridge according to Structure Ba1, wherein the holding portion is capable of restricting movement of the second unit from the developing position to the spaced position when the holding portion is in the second position, and the holding portion permits movement of the second unit from the spaced position to the developing position.

(Structure Ba56)

A cartridge according to Structure Ba55, further comprising a second unit urging member for urging the second unit from the developing position to the spaced position.

(Structure Ba57)

A cartridge according to Structure Ba1, wherein when the holding portion is in the first position, the holding portion is capable of restricting movement of the second unit from the separated position to the developing position, and when the holding portion is in the second position, the holding portion is capable of restricting movement of the second unit from the developing position to the spaced position.

(Structure Ba58)

A cartridge according to Structure Ba57, wherein the holding portion is provided with an urging portion, and wherein when the holding portion is in the first position, movement of the second unit from the spaced position to the developing position by urging the second unit in a direction from the developing position toward the spaced position is restricted by the urging portion, and when the holding portion is in the second position, movement of the second unit from the developing position to the spaced position is restricted by urging the second unit in a direction from the spaced position toward the developing position by the urging position.

(Structure Ba59)

A cartridge according to Structure Ba1, further comprising a movable member movable relative to the second unit and including the spacing force receiving portion and a pressing portion capable of pressing the second unit, wherein when the second unit is in the contact position, the movable member is capable of taking a transmission enabled state in which a force received by the spacing force receiving portion is capable of being transmitted to the pressing portion to move the second unit, and a transmission disabled state in which the force received by the spacing force receiving portion is not transmitted to the pressing portion.

(Structure Ba60)

A cartridge according to any one of Structures Ba1-59, wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is in a section opposite from a section including is rotation center of the charging member.

(Structure Ba61)

A cartridge according to any one of Structures Ba1-59, further comprising a coupling member for receiving a driving force for rotationally driving the developing member.

(Structure Ba62)

A cartridge according to Structure Ba61, wherein when the cartridge is divided into sections by a line connecting a rotational center of the photosensitive member and a rotational center of the developing member, in a state that the second unit is in the spaced position, at least a part of the contact force receiving portion is disposed in an a section opposite from a section including the coupling member.

(Structure Ba63)

A cartridge according to Structure Ba61, wherein when another predetermined tangential line is a tangential line of a surface of the developing member at an intersection, which is more remote from a rotational center of the coupling member, of intersections between a line connecting a rotational center of the coupling member and a rotational center of the developing member and the surface of the developing member, as viewed along the direction of the rotational axis of the developing member, and when the cartridge is divided into sections by the another predetermined tangent line, another predetermined section is a section in which the rotational center of the coupling member does not exist, and wherein as viewed along the direction of the rotational axis of the developing member when the second unit is in the spaced position, the contact force receiving portion is in the another predetermined section.

(Structure Ba64)

A cartridge according to Structure Ba63, when as viewed along the direction of the axis of the developing member, the contact force receiving portion is provided on a projected portion projected from the second unit at least in a direction parallel with a line connecting a rotation center of the coupling member and a rotation center of the developing member.

(Structure Ba65)

A cartridge according to Structure Ba61, further comprising a supplying member contactable to the developing member to supply toner to the developing member, wherein in a state that the second unit is in the spaced position, when the cartridge is divided into sections by a line connecting a rotational center of the developing member and a rotational center of the supplying member as viewed along the direction of the rotational axis of the developing member, at least a part of the contact force receiving portion is disposed in a section opposite from a section including the rotational center of the coupling.

(Structure Ba66)

A cartridge according to Structure Ba61, wherein the contact force receiving portion is disposed on a side including the coupling member with respect to a direction of the rotational axis of the developing member.

(Other Dependent Structures of Structure Ba1)

As for dependent structures of Structure Ba1, the dependent structures of Structure Aa1 and the structures of the embodiments may be properly selected and used.

<<STRUCTURE Bb>>

(Structure Bb1)

A cartridge detachably mountable to a main assembly of an image forming apparatus, the image forming apparatus including a contact force applying portion and a spacing force applying portion, the cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position;

a contact force receiving portion capable of receiving a contacting force for moving the holding portion from the first position toward the second position to move the second unit to the developing position when the second unit is in the spaced position; and a spacing force receiving portion capable of receiving a spacing force for moving the holding portion from the second position to the first position to move the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the direction of the rotational axis of the developing member when the second unit is in the developing position, the spacing force receiving portion is disposed in the predetermined section, and wherein when the holding portion is in the first position and the second unit is in the spaced position, the spacing force applying portion and the spacing force receiving portion are in a state of being separated from each other, and the contact force applying portion and the contact force receiving portion are in the state of being separated from each other.

(Dependent Structures of Structure Bb1)

As for dependent structures of Structure Bb1, the dependent structures of Structure Aa1, Structure Ba1 and the structures of the embodiments may be properly selected and used.

<<STRUCTURE Ca>>

(Structure Ca1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by one of the first unit and the second unit and movable between a restricting position for restricting movement of the second unit from the retracted position to the developing position by contacting the other of the first unit and the second unit, and a permitting position for permitting the movement of the second unit from the retracted position to the developing position; and a contact force receiving portion capable of receiving a contacting force for moving the holding portion from the restricting position toward the permitting position to move the second unit to the developing position, when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Ca2)

A cartridge according to Structure Ca1, wherein when the holding portion is in the restriction position, movement of the second unit from the spaced position to the developing position is restricted by contacting the first unit and the second unit.

(Structure Ca3)

A cartridge according to Structure Ca1 or 2, further comprising a holding member including the holding portion, wherein the second unit is provided with a second frame rotatably supporting the developing member.

(Structure Ca4)

A cartridge according to Structure Ca3, wherein the contact force receiving portion is provided on the holding member.

(Structure Ca5)

A cartridge according to Structure Ca4, further comprising a spacing force receiving portion for receiving a spacing force for moving the holding portion from the permitting position toward the restricting position to move the second unit to the spaced position when the second unit is in the developing position.

(Structure Ca6)

A cartridge according to Structure Ca5, wherein the spacing force receiving portion provided on the second frame.

(Structure Ca1)

A cartridge according to Structure Ca6, wherein the spacing force receiving portion is provided on the holding member.

(Structure Ca8)

A cartridge according to Structure Ca3, wherein the contact force receiving portion is provided on the second frame.

(Structure Ca9)

A cartridge according to Structure Ca8, further comprising a spacing force receiving portion for receiving a spacing force for moving the holding portion from the permitting position toward the restricting position to move the second unit to the spaced position when the second unit is in the developing position, wherein the spacing force receiving portion is provided on the second frame.

(Structure Ca10)

A cartridge according to Structure Ca3, further comprising a movable member provided with a pressing portion and the contact force receiving portion, wherein the holding member is provided with a pressed portion, wherein by pressing the pressed member by the pressing portion as a result of movement of the movable member receiving a force at the contacting force receiving portion, the holding portion is moved from the restriction position toward the permitting position.

A cartridge according to Structure Ca10, further comprising a spacing force receiving portion for receiving a spacing force for moving the holding portion from the permitting position toward the restricting position to move the second unit to the spaced position when the second unit is in the developing position, wherein the spacing force receiving portion is provided on the movable member.

(Structure Ca12)

A cartridge according to any one of Structures Ca1-11, further comprising holding portion urging member for urging the holding portion in a direction from the permitting position toward the restriction position.

(Structure Ca13)

A cartridge according to the Structure Ca12, wherein the holding portion urging member includes an elastic member.

(Structure Ca14)

A cartridge according to Structure Ca13, wherein the elastic member includes a spring.

(Structure Ca15)

A cartridge according to any one of Structures Ca1-11, further comprising a holding portion urging member for urging the holding portion in a direction from the permitting position toward the restriction position when the holding portion is in the restriction position, and for urging the holding portion in a direction from the restriction position toward the permitting position when the holding portion is in the permitting position.

(Structure Ca16)

A cartridge according to the Structure Ca15, wherein the holding portion urging member includes an elastic member.

(Structure Ca17)

A cartridge according to Structure Ca16, wherein the elastic member includes a spring.

(Structure Ca18)

A cartridge according to Structure Ca2, wherein the holding member movably supported by the second frame.

(Structure Ca19)

A cartridge according to Structure Ca18, wherein the holding member is rotatably supported by the second frame.

(Structure Ca20)

A cartridge according to Structure Ca18 or 19, wherein the first unit includes a first frame rotatably supporting the photosensitive member, and the second unit is movable between the spaced position and the developing position by rotation of the second frame relative to the first frame, and wherein the holding member disposed on an opposite side from the contact force receiving portion with respect to a rotational center of the second frame.

(Structure Ca21)

A cartridge according to Structure Ca2, wherein the first unit includes a first frame rotatably supporting the photosensitive member, and the holding member is movably supported by the first frame.

(Structure Ca22)

A cartridge according to Structure Ca2, wherein the first unit includes a first frame rotatably supporting the photosensitive member, and the holding member is integrally formed with the first frame or the second frame, wherein the holding portion is moved between the restriction position and the permitting position by deformation of the holding member relative to the first frame and/or the second frame.

(Structure Ca23)

A cartridge according to any one of Structures Ca1-23, further comprising a second unit urging member for urging the second unit in a direction from the spaced position toward the developing position.

(Structure Ca24)

A cartridge according to Structure Ca23, wherein the second unit urging member includes an elastic member.

(Structure Ca25)

A cartridge according to Structure Ca24, wherein the elastic member includes a spring.

(Structure Ca26)

A cartridge according to any one of Structures Ca23-25, wherein when the holding portion is in the restriction position, the holding portion is capable of restricting movement of the second unit from the spaced position to the developing position against an urging force of the second unit urging member.

(Structure Ca27)

A cartridge according to any one of Structures Ca1-26, further comprising,

- a restriction positioning portion, provided on the first unit, for positioning the second unit in the spaced position,
- a permitting position determination portion, provided on the first unit, for positioning the second unit in the developing position, and
- an urging portion for urging the second unit toward the restriction positioning portion and the permitting position determination portion,
- wherein when the holding portion is in the restriction position, the second unit is held in the spaced position in a state that the second unit is urged by the urging portion toward the restriction positioning portion, and when the holding portion is in the permitting position, the second unit is held in the developing position in a state that the second unit is urged by the urging portion toward the permitting position determination portion.

(Structure Ca28)

A cartridge according to Structure Ca27, further comprising a holding member including the holding portion, wherein the second unit includes a second frame rotatably supporting the developing member.

(Structure Ca29)

A cartridge according to any one of Structures Ca1-26, further comprising a restriction positioning portion, provided on the first unit, for positioning the second unit in the spaced position, and a permitting position determination portion, provided on the first unit, for positioning the second unit in the developing position,

- wherein in a state in which the cartridge is oriented such that the photosensitive member is in a lower position, when the holding portion is in the restriction position, the second unit is supported by the first unit in a state in which the second unit is in the spaced position while being urged by the weight thereof toward the restriction positioning portion, and when the holding portion is in the permitting position, the second unit it supported by the first unit in a state in which the second unit it is in the developing position while being urged by the weight thereof toward the permission position positioning-portion.

(Structure Ca30)

A cartridge according to Structure Ca29, further comprising a holding member including the holding portion, wherein the second unit includes a second frame rotatably supporting the developing member.

(Structure Ca31)

A cartridge according to Structure Ca1, further comprising spacing force receiving portion for receiving a spacing force for moving the holding portion from the permitting position toward the restricting position to move the second unit to the spaced position when the second unit is in the developing position,

- wherein when the second unit is in the spaced position, a space is capable of being formed between the contact force receiving portion and the spacing force receiving portion, and
- wherein as seen in a direction along a rotational axis of the developing member in a state that the space is formed, the contact force receiving portion disposed at a position closer to the rotational axis of the photosensitive member than the spacing force receiving portion.

(Structure Ca32)

A cartridge according to Structure Ca31, further comprising a holding member including the holding portion, wherein the second unit includes a second frame rotatably supporting the developing member, and the contact force receiving portion is provided on the holding member, and the spacing force receiving portion is provided on the second frame.

(Structure Ca33)

A cartridge according to Structure Ca31, wherein as viewed along a direction of the axis of the developing member in the state the space is formed, the contact force receiving portion and the spacing force receiving portion are opposed to each other with the space therebetween.

(Structure Ca34)

A cartridge according to Structure Ca31, further comprising a holding member including the holding portion, wherein the contact force receiving portion is provided on the holding portion so as to be movable relative to the holding member.

(Structure Ca35)

A cartridge according to Structure Ca34, wherein the spacing force receiving portion is provided so as to be movable relative to the holding member.

(Structure Ca36)

A cartridge according to Structure Ca31, further comprising a holding member including the holding portion, wherein the spacing force receiving portion is provided on the holding portion so as to be movable relative to the holding member.

(Structure Ca37)

A cartridge according to Structure Ca1, wherein the contact force receiving portion is movable between a stand-by position and an operating position where the contact force receiving portion is projected from the second unit than in the stand-by position, by movement thereof in a predetermined direction, and

- wherein when the second unit is in the spaced position and the contact force receiving portion is in the operating position, the contact force receiving portion is capable of moving the holding portion from the restriction position toward the permitting position by receiving a contact force to move in a first direction crossing with the predetermined direction.

(Structure Ca38)

A cartridge according to Structure Ca37, further comprising a holding member including a pressed portion and the holding portion, and a movable member includes a pressing portion and the contact force receiving portion, wherein the pressing portion presses the pressed portion by the contact force receiving portion receiving a contact force to move in the first direction, thereby moving the holding portion from the restriction position toward the permitting position.

(Structure Ca39)

A cartridge according to Structure Ca38, wherein the contact force receiving portion is displaceable in a direction parallel with a direction perpendicular to an axial direction of the developing member, the movement of the contact force receiving portion in the predetermined direction.

(Structure Ca40)

A cartridge according to Structure Ca39, wherein the contact force receiving portion movable in the first direction by rotation of the movable member about a predetermined rotational axis, and the contact force receiving portion is movable in the predetermined direction by movement of the movable member in a direction crossing with the predetermined rotational axis.

(Structure Ca41)

A cartridge according to Structure Ca39, wherein the first unit includes a first frame rotatably supporting the photosensitive member, and the second unit includes a second frame rotatably supporting the developing member, wherein the movable member supported by the second frame, and the contact force receiving portion is moved in the predetermined direction the movement of the second frame relative to the first frame.

(Structure Ca42)

A cartridge according to Structure Ca39, wherein the first unit includes a first frame rotatably supporting the photosensitive member, and a supported portion supported to support first frame, and the second unit includes a second frame rotatably supporting the developing member, wherein the second frame supported by the first frame, and the movable member is supported by the second frame, and wherein the contact force receiving portion movable in the predetermined direction by movement of the first frame and the second frame relative to the first frame supporting portion.

(Structure Ca43)

A cartridge according to Structure Ca39, further comprising a rotational driving force receiving portion, the movable member is movable by a driving force from the rotational driving force receiving portion so that the contact force receiving portion moves in the predetermined direction.

(Structure Ca44)

A cartridge according to Structure Ca38, wherein the contact force receiving portion is displaceable at least in a direction parallel with an axial direction of the developing member.

(Structure Ca45)

A cartridge according to Structure Ca44, the contact force receiving portion is movable in the predetermined direction by swing of the movable member about an axis crossing with the rotational axis of the developing member.

(Structure Ca46)

A cartridge according to Structure Ca38, further comprising an urging member having an end connected with the holding member and the other end connected with the movable member, the urging member is capable of urging the holding member so that the holding portion moves from the permitting position toward the restriction position, and is capable of urging the movable member so that the contact force receiving portion moves from the operating position toward the stand-by position.

(Structure Ca47)

A cartridge according to Structure Ca37, further comprising spacing force receiving portion for receiving a spacing force for moving the holding portion from the permitting position toward the restricting position to move the second unit to the spaced position when the second unit is in the developing position, wherein the spacing force receiving portion is movable between a stand-by position and an operating position where the spacing force receiving portion is projected more from the second unit than in the stand-by position, by movement thereof in the predetermined direction, and wherein when the second unit is in the developing position and the spacing force receiving portion is in the operating position, the spacing force receiving portion is capable of moving the holding portion from the permitting position toward the restriction position by receiving a spacing force to move in a second direction crossing with the predetermined direction.

(Structure Ca48)

A cartridge according to any one of Structures Ca37-47, further comprising an operating force receiving portion for receiving an operating force for moving the contact force receiving portion from the stand-by position to the operating position.

(Structure Ca49)

A cartridge according to Structure Ca1, wherein the contact force receiving portion is movable in a direction parallel with the line while maintaining a state in which at least a part of the developing member is spaced more from the photosensitive member than when the contact force receiving portion is in the developing position.

(Structure Ca50)

A cartridge according to Structure Ca1, further comprising a spacing force receiving portion for receiving a spacing force for moving the holding portion from the permitting position toward the restricting position to move the second unit to the spaced position when the second unit is in the developing position, wherein the spacing force receiving portion is movable in a direction parallel with the line while maintaining a state in which at least a part of the developing member is spaced from the photosensitive member.

(Structure Ca51)

A cartridge according to Structure Ca49, wherein the spacing force receiving portion is movable in a direction parallel with the line while maintaining a state in which at least a part of the developing member is spaced from the photosensitive member, by linear movement of the spacing force receiving portion.

(Structure Ca52)

A cartridge according to Structure Ca51, wherein the second unit is movable between the spaced position and the developing position by rotation thereof relative to the first unit, wherein by movement of the second unit from the spaced position such that the developing member is further away from the photosensitive member, the spacing force receiving portion moves in a direction parallel with the line while maintaining a state in which at least a part of the developing member is spaced from the photosensitive member.

<<STRUCTURE Ca>>

A cartridge according to Structure Ca49, wherein the contact force receiving portion is movable in a direction parallel with the line while maintaining a state in which the developing member is in contact with the photosensitive member.

(Structure Ca54)

A cartridge according to Structure Ca53, wherein the holding portion it supported so as to be movable relative to the second unit, and wherein by a movement of the holding portion relative to the second unit, the contact force receiving portion is movable in a direction parallel with the line while maintaining a state in which the developing member Is in contact with the photosensitive member.

(Structure Ca55)

A cartridge according to Structure Ca1, further comprising a movable member movable relative to the second unit, the movable member being provided with a spacing force receiving portion for receiving a spacing force for moving the holding portion from the permitting position toward the restricting position to move the second unit to the spaced position when the second unit is in the developing position, and being provided with a pressing portion capable of pressing the second unit, wherein when the second unit is in the contact position, the movable member is capable of taking a transmission enabled state in which a force received by the spacing force receiving portion is capable of being transmitted to the pressing portion to move the second unit, and a transmission disabled state in which the force received by the spacing force receiving portion is not transmitted to the pressing portion.

(Structure Ca56)

A cartridge according to any one of Structures Ca1-55, wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is in a section opposite from a section including is rotation center of the charging member.

(Structure Ca57)

A cartridge according to any one of Structures Ca1-55, further comprising a coupling member for receiving a driving force for rotationally driving the developing member.

(Structure Ca58)

A cartridge according to Structure Ca57, wherein when the cartridge is divided into sections by a line connecting a rotational center of the photosensitive member and a rotational center of the developing member, in a state that the second unit is in the spaced position, at least a part of the contact force receiving portion is disposed in an a section opposite from a section including the coupling member.

(Structure Ca59)

A cartridge according to Structure Ca57, wherein when another predetermined tangential line is a tangential line of a surface of the developing member at an intersection, which is more remote from a rotational center of the coupling member, of intersections between a line connecting a rotational center of the coupling member and a rotational center of the developing member and the surface of the developing member, as viewed along the direction of the rotational axis of the developing member, and when the cartridge is divided into sections by the another predetermined tangent line, another predetermined section is a section in which the rotational center of the coupling member does not exist, and wherein as viewed along the direction of the rotational axis of the developing member when the second unit is in the spaced position, the contact force receiving portion is in the another predetermined section.

(Structure Ca60)

A cartridge according to Structure Ca59, when as viewed along the direction of the axis of the developing member, the contact force receiving portion is provided on a projected portion projected from the second unit at least in a direction parallel with a line connecting a rotation center of the coupling member and a rotation center of the developing member.

(Structure Ca61)

A cartridge according to Structure Ca57, further comprising a supplying member contactable to the developing member to supply toner to the developing member, wherein in a state that the second unit is in the spaced position, when the cartridge is divided into sections by a line connecting a rotational center of the developing member and a rotational center of the supplying member as viewed along the direction of the rotational axis of the developing member, at least a part of the contact force receiving portion is disposed in a section opposite from a section including the rotational center of the coupling.

(Structure Ca62)

A cartridge according to Structure Ca57, wherein the contact force receiving portion is disposed on a side including the coupling member with respect to a direction of the rotational axis of the developing member.

(Other Dependent Structures of Structure Ca1)

As for dependent structures of Structure Ca1, the dependent structures of Structure Aa1 and the structures of the embodiments may be properly selected and used.

<<STRUCTURE Cb>>

(Structure Cb1)

A cartridge comprising:

photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by one of the first unit and the second unit and movable between a restricting position for restricting movement of the second unit from the retracted position to the developing position by contacting the other of the first unit and the second unit, and a permitting position for permitting the movement of the second unit from the retracted position to the developing position; and a spacing force receiving portion capable of receiving a spacing force for moving the holding portion from the permitting position to the restriction position to move the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structure Cb1)

As for dependent structures of Structure Cb1, the dependent structures of Structure Aa1, Structure Ca1 and the structures of the embodiments may be properly selected and used.

<<STRUCTURE Da, Db>>

(Structure Da1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding mechanism movably supported by the first unit or the second unit and capable of taking a first state for stably holding the second unit in the spaced position by the first unit and a second state for stably holding a second unit in the developing position by the first unit; and a contact force receiving portion capable of receiving a contact force for shifting the holding mechanism from the first state to the second state to move the second unit to the developing position when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Db1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding mechanism movably supported by the first unit or the second unit and capable of taking a first state for stably holding the second unit in the spaced position by the first unit and a second state for stably holding a second unit in the developing position by the first unit; and a spacing force receiving portion capable of receiving a spacing force for shifting the holding portion from the second state to the first state to move the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structure Da1, Db1)

As for dependent structures of Structures Da1, Db1, the dependent structures of Structure Aa1 and the structures of the embodiments may be properly selected and used.

<<STRUCTURES Ea, Eb, Ec, Ed>>

(Structure Ea1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a contact force receiving portion capable of receiving a contacting force for moving the holding portion from the first position toward the second position to move the second unit to the developing position when the second unit is in the spaced position, wherein the contact force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is disposed in a section opposite from a section including the rotation center of the charging member.

(Structure Eb1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a spacing force receiving portion capable of receiving a spacing force for moving the holding portion from the second position toward the first position to moves the second unit to the spaced position, when the second unit is in the developing position, wherein the spacing force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state in which the second unit is in the developing position, at least a part of the spacing force receiving portion disposed in a section opposite from a section including the rotation center of the charging member.

(Structure Ec1)

A cartridge comprising:

a photosensitive member;

a first unit including the photosensitive member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a contact force receiving portion capable of receiving a contacting force for moving the holding portion from the first position toward the second position to move the second unit to the developing position when the second unit is in the spaced position, wherein the contact force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is disposed in a section opposite from a section including the rotational center of the coupling member.

(Structure Ed1)

A cartridge comprising:

a photosensitive member;

a first unit including the photosensitive member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a spacing force receiving portion capable of receiving a spacing force for moving the holding portion from the second position toward the first position to moves the second unit to the spaced position, when the second unit is in the developing position, wherein the spacing force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state in which the second unit is in the developing position, at least a part of the spacing force receiving portion is disposed in a section opposite from a section including the rotational center of the coupling member.

(Dependent Structure of Structures Ea1, Eb1, Ec1, Ed1).

As for dependent structures of Structure Aa1, the dependent structures of Structure Aa1 and the structures of the embodiments may be properly selected and used.

<<STRUCTURE Fa, Fb>>

(Structure Fa1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit;

a contact force receiving portion capable of receiving a contacting force for moving the holding portion from the first position toward the second position to move the second unit to the developing position when the second unit is in the spaced position; and a spacing force receiving portion capable of receiving a spacing force for moving the holding portion from the second position toward the first position to moves the second unit to the spaced position, when the second unit is in the developing position, wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is disposed in a second opposite from a section including the rotation center of the charging member, and wherein when the cartridge is divided into sections by a line connecting a rotational center of the photosensitive member and a rotational center of the developing member as viewed along the direction of the rotational axis of the developing member in a state in which the second unit is in the developing position, at least a part of the spacing force receiving portion disposed in a section opposite from a section including the rotation center of the charging member.

(Structure Fb1)

A cartridge comprising:

a photosensitive member;

a first unit including the photosensitive member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit;

a contact force receiving portion capable of receiving a contacting force for moving the holding portion from the first position toward the second position to move the second unit to the developing position when the second unit is in the spaced position; and a spacing force receiving portion capable of receiving a spacing force for moving the holding portion from the second position toward the first position to moves the second unit to the spaced position, when the second unit is in the developing position, wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is disposed in a second opposite from a section including the rotation center of the charging member, and wherein when the cartridge is divided into sections by a line connecting a rotational center of the photosensitive member and a rotational center of the developing member as viewed along the direction of the rotational axis of the developing member in a state in which the second unit is in the developing position, at least a part of the spacing force receiving portion is disposed in a section opposite from a section including the rotational center of the coupling member.

(Dependent Structure of Structures Fa1, Fb1)

As for dependent structures of Structures Fa1, Fb1, the dependent structures of Structure Aa1 and the structures of the embodiments may be properly selected and used.

<<STRUCTURE Ga, Gb>>

(Structure Ga1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a first positioning portion, provided on the first unit, for positioning the second unit in the spaced position;

a second positioning portion provided on the first unit to position the second unit in the developing position;

an urging portion for urging the second unit toward the first positioning portion and the second positioning portion;

a holding portion provided in the first unit or the second unit and the movable between a first position in which the second unit is capable of being held in the spaced position in a state in which the second unit is urged toward the first positioning portion by the urging portion, and a second position in which the second unit is capable of being held in the developing position in a state in which the second unit is urged toward the second positioning portion by the urging portion; and a contact force receiving portion capable of receiving a contacting force for moving the holding portion from the first position toward the second position to move the second unit to the developing position when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Gb1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a first positioning portion, provided on the first unit, for positioning the second unit in the spaced position;

a second positioning portion provided in the first unit to position the second unit in the developing position; and an urging portion for urging the second unit toward the first positioning portion and the second positioning portion;

a holding portion provided in the first unit or the second unit and the movable between a first position in which the second unit is capable of being held in the spaced position in a state in which the second unit is urged toward the first positioning portion by the urging portion, and a second position in which the second unit is capable of being held in the developing position in a state in which the second unit is urged toward the second positioning portion by the urging portion; and a spacing force receiving portion capable of receiving a spacing force for moving the holding portion from the second position to the first position to move the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structures Ga1, Gb1)

As for dependent structures of Structures Ga1, Gb1, the dependent structures of Structure Aa1 and the structures of the embodiments may be properly selected and used.

<<STRUCTURE Ha, Hb>>

(Structure Ha1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a first positioning portion, provided on the first unit, for positioning the second unit in the spaced position;

a second positioning portion provided in the first unit to position the second unit in the developing position, and a holding portion provided on the first unit or the second unit and movable between a first position and a second position; and a contact force receiving portion capable of receiving a contacting force for moving the holding portion from the first position toward the second position to move the second unit to the developing position when the second unit is in the spaced position, wherein in a state in which the cartridge is oriented such that the photosensitive member is in a lower position, when the holding portion is in the first position, the second unit is supported by the first unit in a state in which the second unit is in the spaced position while being urged by a weight thereof toward the first positioning portion, and when the holding portion is in the second position, the second unit it supported by the first unit in a state in which the second unit is in the developing position while being urged by the weight thereof toward the second positioning portion, and wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Hb1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a first positioning portion, provided on the first unit, for positioning the second unit in the spaced position;

a second positioning portion provided in the first unit to position the second unit in the developing position;

a holding portion provided on the first unit or the second unit and movable between a first position and a second position; and a spacing force receiving portion capable of receiving a spacing force for moving the holding portion from the second position to the first position to move the second unit to the spaced position when the second unit is in the developing position, wherein in a state in which the cartridge is oriented such that the photosensitive member is in a lower position, when the holding portion is in the first position, the second unit is supported by the first unit in a state in which the second unit is in the spaced position while being urged by a weight thereof toward the first positioning portion, and when the holding portion is in the second position, the second unit it supported by the first unit in a state in which the second unit is in the developing position while being urged by the weight thereof toward the second positioning portion, and wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structures Ha1, Hb1)

As for dependent structures of Structures Ha1, Hb1, the dependent structures of Structure Aa1 and the structures of the embodiments may be properly selected and used.

<<STRUCTURE Ia>>

A cartridge comprising:

a photosensitive member;

a charging member capable of charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a contact force receiving portion for receiving a contact force for moving the second unit to the developing position when the second unit is in the spaced position; and a spacing force receiving portion for receiving a spacing force for moving the second unit to the retracted position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the direction of the rotational axis of the developing member when the second unit is in the spaced position, the contact force receiving portion and the spacing force receiving portion are disposed in the predetermined section, wherein when the second unit is in the spaced position, a space is capable of being formed between the contact force receiving portion and the spacing force receiving portion, and wherein as seen in a direction along a rotational axis of the developing member in a state that the space is formed, the contact force receiving portion disposed at a position closer to the rotational axis of the photosensitive member than the spacing force receiving portion.

(Dependent Structure of Structure Ia1)

As for dependent structures of Structure Ia1, the dependent structures of Structure Aa1 and the structures of the embodiments may be properly selected and used.

<<STRUCTURE Ja>>

(Structure Ja1)

A cartridge comprising:

a photosensitive member;

a charging member capable of charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a contact force receiving portion for receiving a contact force for moving the second unit to the developing position when the second unit is in the spaced position; and a spacing force receiving portion for receiving a spacing force for moving the second unit to the retracted position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the direction of the rotational axis of the developing member when the second unit is in the spaced position, the contact force receiving portion and the spacing force receiving portion are disposed in the predetermined section, wherein when the second unit is in the spaced position, a space is capable of being formed between the contact force receiving portion and the spacing force receiving portion, and wherein as viewed in an axial direction of the developing member in a state in which the space is formed, the contact force receiving portion and the spacing force receiving portion are opposed to each other with the space therebetween.

(Dependent Structure of Structure Ja1)

As for dependent structures of Structure Ja1, the dependent structures of Structure Aa1 and the structures of the embodiments may be properly selected and used.

<<STRUCTURE Ka>>

(Structure Ka1)

A cartridge comprising:

a photosensitive member;

a first unit including the photosensitive member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a contact force receiving portion capable of receiving a contacting force for moving the holding portion from the first position toward the second position to move the second unit to the developing position when the second unit is in the spaced position, wherein the contact force receiving portion is movable between a stand-by position and an operating position where the contact force receiving portion is projected more from the second unit than in the stand-by position, by movement thereof in the predetermined direction, and wherein when the second unit in the spaced position and the contact force receiving portion is in the operating position, the contact force receiving portion is capable of moving the holding portion from the first position to the second position by moving in a first direction crossing with the predetermined direction by receiving a contact force.

(Structure Ka2)

A cartridge according to Structure Ka1, wherein when the holding portion is in the first position, the holding portion is capable of restricting movement of the second unit from the separated position to the developing position, and when the holding portion is in the second position, the holding portion permits movement of the second unit from the spaced position to the developing position.

(Structure Ka3)

A cartridge according to Structure Aa67, wherein the holding portion restricts movement of the second unit from the spaced position to the developing position is restricted by contacting the first unit and the second unit when the holding portion is in the first position.

(Structure Ka4)

A cartridge according to Structure Ka3, further comprising a holding member including a holding portion, wherein the second unit is provided with a second frame rotatably supporting the developing member.

(Structure Ka5)

A cartridge according to Structure Ka4, wherein the movable member is provided with a pressing portion, and the holding member is provided with a pressed portion, wherein the holding portion is moved from the first position toward the second position by the pressing portion pressing the pressed portion as a result of movement of the movable member by a force received by the contact force receiving portion.

(Structure Ka6)

A cartridge according to Structure Kay, further comprising a spacing force receiving portion for receiving a spacing force for moving the holding portion from the second position toward the first positions to move the second unit to the spaced position when the second unit is in the developing position, wherein the spacing force receiving portion is provided on the movable member.

(Structure Ka7)

A cartridge according to any one of Structures Ka1-6, further comprising a holding portion urging member for urging the holding portion in the direction from the second position toward the first position.

(Structure Ka8)

A cartridge according to Structure Ka7, wherein the holding portion urging member includes an elastic member.

(Structure Ka9)

A cartridge according to Structure Ka8, wherein the elastic member includes a spring.

(Structure Ka10)

A cartridge according to Structure Ka4, wherein the holding member is movably supported by the second frame.

(Structure Ka11)

A cartridge according to Structure Ka10, wherein the holding member is rotatably supported by the second frame.

(Structure Ka12)

A cartridge according to Structure Ka10 or 11, wherein the first unit includes a first frame rotatably supporting the photosensitive member, and the second frame movable between the spaced position and the developing position by rotating relative to the first frame, and wherein the holding member is disposed on a side opposite from a side including the contact force receiving portion with the rotation center of the second frame therebetween.

(Structure Ka13)

A cartridge according to any one of Structures Ka1-12, further comprising a second unit urging member for urging the second unit from the spaced position toward the developing position.

(Structure Ka14)

A cartridge according to Structure Ka13, wherein the second unit urging member includes an elastic member.

(Structure Ka15)

A cartridge according to Structure Ka14, wherein the elastic member includes a spring.

(Structure Ka16)

A cartridge according to any one of Structure Ka13-15, further comprising the holding portion is capable of restricting movement of the second unit from the spaced position to the developing position against an urging force of the second unit urging member when the holding portion is in the first position.

(Structure Ka17)

A cartridge according to any one of Structures Ka2-16, further comprising:

- a first positioning portion, provided on the first unit, for positioning the second unit in the spaced position;
- a second positioning portion provided in the first unit to position the second unit in the developing position, and
- an urging portion for urging the second unit toward the first positioning portion and the second positioning portion, wherein when the holding portion is in the first position, the second unit is held in the spaced position in a state that the second unit is urged toward the first positioning portion by the urging portion, and when the holding portion is in the second position, the second unit is held in the developing position in the state that the second unit is urged toward the second positioning portion by the urging portion.

<<STRUCTURE Ka>>

A cartridge according to Structure Ka17, further comprising a holding member including the holding portion, wherein the second unit includes a second frame rotatably supporting the developing member.

(Structure Ka19)

A cartridge according to any one of Structures Ka2-16, further comprising a first positioning portion, provided on the first unit, for positioning the second unit in the spaced position; and a second positioning portion provided in the first unit to position the second unit in the developing position, wherein in a state in which the cartridge is oriented such that the photosensitive member is in a lower position, when the holding portion is in the first position, the second unit is supported by the first unit in a state that the second unit is in the spaced position while being urged toward the first positioning portion by a weight thereof, when holding portion is in the second position, the second unit is supported by the first unit in a state that the second unit is in the developing position while being urged toward the second positioning portion by a weight thereof.

(Structure Ka20)

A cartridge according to Structure Ka19, further comprising a holding member including the holding portion, wherein the second unit includes a second frame rotatably supporting the developing member.

(Structure Ka21)

A cartridge according to Structure Ka1, further comprising a holding member including a pressed portion and the holding portion, and a movable member including a pressing portion and the contact force receiving portion, wherein by the contact force receiving portion receiving the contact force to move in the first direction, the pressing portion presses the pressed portion to move the holding portion from the first position to the second position.

(Structure Ka22)

A cartridge according to Structure Ka21, wherein by movement of the contact force receiving portion in the predetermined direction, the contact force receiving portion is displaced in a direction parallel with a direction perpendicular to an axial direction of the developing member.

(Structure Ka23)

A cartridge according to Structure Ka22, wherein by rotation of the movable member about a predetermined rotational axis, the contact force receiving portion is moved in the first direction, and by movement of the movable member in a direction crossing with the predetermined rotational axis, the contact force receiving portion is moved in the predetermined direction.

(Structure Ka24)

A cartridge according to Structure Ka22, wherein the first unit includes a first frame rotatably supporting the photosensitive member, and the second unit includes a second frame rotatably supporting the developing member, and wherein the movable member supported by the second frame, and the contact force receiving portion is moved in the predetermined direction the movement of the second frame relative to the first frame.

(Structure Ka25)

A cartridge according to Structure Ka22, wherein the first unit includes a first frame rotatably supporting the photosensitive member and a supported portion for supporting the first frame, and wherein the second unit includes a second frame rotatably supporting the developing member, wherein the second frame supported by the first frame, and the movable member is supported by the second frame, and wherein the contact force receiving portion movable in the predetermined direction by movement of the first frame and the second frame relative to the first frame supporting portion.

(Structure Ka26)

A cartridge according to Structure Ka22, further comprising a rotational driving force receiving portion, wherein the movable member is moved by a driving force from the rotational driving force receiving portion such that the contact force receiving portion moves in the predetermined direction.

(Structure Ka27)

A cartridge according to Structure Ka21, wherein the contact force receiving portion is displaced at least in a direction parallel with an axial direction of the developing member by movement of the contact force receiving portion in the predetermined direction.

(Structure Ka28)

A cartridge according to Structure Ka27, wherein the contact force receiving portion is moved in the predetermined direction by swing of the movable member about an axis crossing with a rotational axis of the developing member.

(Structure Ka29)

A cartridge according to Structure Ka21, further comprising: an urging member having one end connected with the holding member and the other end connected with the movable member, wherein the urging member is capable of urging the holding member such that the holding portion moves from the second position to the first position, and is capable of urging the movable member such that the contact force receiving portion moves from the operating position to the stand-by position.

(Structure Ka30)

A cartridge according to Structure Ka20, further comprising a spacing force receiving portion for receiving a spacing force for moving the holding portion from the second position toward the first position to move the second unit to the spaced position when the second unit is in the developing position, wherein the spacing force receiving portion is movable between a stand-by position and an operating position where the spacing force receiving portion is projected more from the second unit than in the stand-by position, by movement thereof in the predetermined direction, and wherein when the second unit is in the developing position and the spacing force receiving portion in the operating position, the holding portion is capable of being moved from the second position toward the first position by the spacing force receiving portion receiving a spacing force to move in a second direction crossing with the predetermined direction.

(Structure Ka31)

A cartridge according to any one of Structures Ka20-30, further comprising: an operating force receiving portion for receiving an operating force for moving the contact force receiving portion from the stand-by position to the operating position.

(Structure Ka32)

A cartridge according to Structure Ka1, wherein the contact force receiving portion is movable in the predetermined direction while maintaining a state in which at least a part of the developing member is spaced more from the photosensitive member than when the contact force receiving portion is in the developing position.

(Structure Ka33)

A cartridge according to Structure Ka1, further comprising a spacing force receiving portion for receiving a spacing force for moving the holding portion from the second position to the first position to move the second unit to the spaced position when the second unit is in the developing position, wherein the spacing force receiving portion is movable in the predetermined direction while maintaining the state in which at least a part of the developing member is spaced from the photosensitive member.

(Structure Ka34)

A cartridge according to Structure Ka33, wherein the spacing force receiving portion is moved by linear movement in the predetermined direction while maintaining a state in which at least a part of the developing member is spaced from the photosensitive member.

(Structure Ka36)

A cartridge according to Structure Ka32, wherein the contact force receiving portion is movable in the predetermined direction while maintaining a state in which the developing member is in contact with the photosensitive member.

(Structure Ka38)

A cartridge according to Structure Ka1, further comprising a movable member including a spacing force receiving portion for receiving a spacing force for moving the holding portion from the second position to the first position to move the second unit to the spaced position when the second unit is in the developing position, and a pressing portion capable of pressing the second unit, the movable member and being movable relative to the second unit, wherein when the second unit is in the contact position, the movable member is capable of taking a transmission enabled state in which a force received by the spacing force receiving portion is capable of being transmitted to the pressing portion to move the second unit, and a transmission disabled state in which the force received by the spacing force receiving portion is not transmitted to the pressing portion.

(Structure Ka39)

A cartridge according to any one of Structures Ka1-38, further comprising a coupling member for receiving a driving force for rotationally driving the developing member.

(Structure Ka40)

A cartridge according to Structure Ka39, wherein the contact force receiving portion is disposed on a side in which the coupling member is provided with respect to a direction of the rotational axis of the developing member.

(Other Dependent Structures of Structure Ka1)

As for dependent structures of Structure Aa1, the dependent structures of Structure Aa1 and the structures of the embodiments may be properly selected and used.

<<STRUCTURE Kb>>

(Structure Kb1)

A cartridge comprising:

a photosensitive member;

a first unit including the photosensitive member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a spacing force receiving portion capable of receiving a spacing force for moving the holding portion from the second position to the first position to move the second unit to the spaced position when the second unit is in the developing position, wherein the spacing force receiving portion is movable between a stand-by position and an operating position where the spacing force receiving portion is projected more from the second unit than in the stand-by position, by movement thereof in a predetermined direction, and wherein when the second unit is in the developing position and the spacing force receiving portion these the operating position, the spacing force receiving portion is movable in the second direction crossing with the predetermined direction by receiving a spacing force, thereby moving the holding portion from the second position to the first position.

(Dependent Structure of Structure Kb1)

As for dependent structures of Structure Kb1, the dependent structures of Structure Aa1, Structure Ka1 and the structures of the embodiments may be properly selected and used.

<<STRUCTURE La, Lb>>

(Structure La1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position;

a contact force receiving portion capable of receiving a contacting force for moving the holding portion from the first position toward the second position to move the second unit to the developing position when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Lb1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position; and a spacing force receiving portion capable of receiving a spacing force for moving the holding portion from the second position toward the first position to moves the second unit to the spaced position, when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent structure of Structure La1, Lb11)

As for dependent structures of Structure La1, Lb1, the dependent structures of Structure Aa1 and the structures of the embodiments may be properly selected and used.

<<STRUCTURE Ma, Mb>>

(Structure Ma1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position; and a contact force receiving portion capable of receiving a contacting force for moving the holding portion from the first position toward the second position to move the second unit to the developing position when the second unit is in the spaced position, wherein the contact force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state that the second unit is in the spaced position, at least a part of the contact force receiving portion is disposed in a section opposite from a section including the rotation center of the charging member.

(Structure Mb1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit, the holding portion and being movable between a first position for holding the second unit in the spaced position and a second position for holding the second unit in the developing position; and a spacing force receiving portion capable of receiving a spacing force for moving the holding portion from the second position toward the first position to moves the second unit to the spaced position, when the second unit is in the developing position, wherein the spacing force receiving portion is disposed on a side including the coupling member with respect to a direction of the rotational axis of the developing member, and wherein when the cartridge is divided into sections by a line connecting a rotational center of the photosensitive member and a rotational center of the developing member as viewed along the direction of the rotational axis of the developing member in a state in which the second unit is in the developing position, at least a part of the spacing force receiving portion disposed in a section opposite from a section including the rotation center of the charging member.

(Dependent structure of Structures Ma1, Mb1)

As for dependent structures of Structure Aa1, the dependent structures of Structure Aa1 and the structures of the embodiments may be properly selected and used.

<<STRUCTURE Na, Nb>>

(Structure Na1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a contact force receiving portion capable of receiving a contact force for moving the second unit to the developing position when the second unit is in the spaced position, and wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the direction of the rotational axis of the developing member when the second unit is in the spaced position, the contact force receiving portion is disposed in the predetermined section, and wherein the contact force receiving portion is movable in a direction parallel with the line in a state that the second unit is in the spaced position.

(Structure Nb1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member; and a spacing force receiving portion capable of receiving a spacing force for moving the second unit to the spaced position when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, wherein as viewed along the direction of the rotational axis of the developing member when the second unit is in the developing position, the spacing force receiving portion is disposed in the predetermined section, and wherein the spacing force receiving portion is movable in a direction parallel with the line while maintaining a state that the second unit is in the developing position.

(Structure Nc1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member; and a contact force receiving portion capable of receiving a contact force for moving the second unit to the developing position when the second unit is in the spaced position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, wherein as viewed along the direction of the rotational axis of the developing member when the second unit is in the developing position, the contact force receiving portion is disposed in the predetermined section, and wherein the contact force receiving portion is movable in a direction parallel with the line while maintaining a state in which the second unit is in the developing position.

(Dependent Structure of Structure-Na1, Nb1, Nc1)

As for dependent structures of Structure Aa1, the dependent structures of Structure Aa1 and the structures of the embodiments may be properly selected and used.

<<STRUCTURE Oa, Ob>>

(Structure Oa1)

A cartridge mountable to a main assembly of an image forming apparatus, the main assembly including a first moving force applying portion and a second moving force applying portion, the cartridge comprising:

a first unit;

a developing member for depositing toner onto a photosensitive member;

a second unit including the developing member and movable between a predetermined position and a retracted position in which at least a part of the developing member is retracted from the predetermined position by moving relative to the first unit;

a coupling member for receiving a driving force for rotationally driving the developing member;

a holding portion movably supported by the first unit or the second unit and movable between a first position for holding the second unit in the retracted position and a second position for holding the second unit in the predetermined position;

a first moving force receiving portion capable of receiving a first moving force for moving the holding portion from the first position to the second position to move the second unit to the predetermined position, when the second unit is in the retracted position; and a second moving force receiving portion capable of receiving a second moving force for moving the holding portion from the second position to the first position to move the second unit to the retracted position when the second unit is in the predetermined position;

wherein when another predetermined tangential line is a tangential line of a surface of the photosensitive member at an intersection, which is more remote from a rotational center of the coupling member, of intersections between a line connecting a rotational center of the coupling member and a rotational center of the photosensitive member and the surface of the photosensitive member, as viewed along a direction of a rotational axis of the developing member, and the cartridge is divided by the another predetermined tangential line into sections, another predetermined section is a section in which the rotational center of the coupling member does not exist, and wherein as viewed along the rotational axis of the developing member when the second unit is in the retracted position, the first moving force receiving portion is in the another predetermined section, and wherein when the holding portion is in the first position and the second unit is in the retracted position, the second moving force applying portion the second moving force receiving portion are in a state of being spaced from each other, and the first moving force applying portion and the first moving force receiving portion are in a state of being spaced from each other.

(Structure Ob1)

A cartridge mountable to a main assembly of an image forming apparatus, the main assembly including a first moving force applying portion and a second moving force applying portion, the cartridge comprising:

a first unit;

a developing member for depositing toner onto a photosensitive member;

a second unit including the developing member and movable between a predetermined position and a retracted position in which at least a part of the developing member is retracted from the predetermined position by moving relative to the first unit;

a coupling member for receiving a driving force for rotationally driving the developing member;

a holding portion movably supported by the first unit or the second unit and movable between a first position for holding the second unit in the retracted position and a second position for holding the second unit in the predetermined position;

a first moving force receiving portion capable of receiving a first moving force for moving the holding portion from the first position to the second position to move the second unit to the predetermined position, when the second unit is in the retracted position; and a second moving force receiving portion capable of receiving a second moving force for moving the holding portion from the second position to the first position to move the second unit to the retracted position, when the second unit is in the predetermined position;

wherein when another predetermined tangential line is a tangential line of a surface of the photosensitive member at an intersection, which is more remote from a rotational center of the coupling member, of intersections between a line connecting a rotational center of the coupling member and a rotational center of the photosensitive member and the surface of the photosensitive member, as viewed along a direction of a rotational axis of the developing member, and the cartridge is divided by the another predetermined tangential line into sections, another predetermined section is a section in which the rotational center of the coupling member does not exist, and wherein as viewed along the rotational axis of the developing member when the second unit is in the predetermined position, the second moving force receiving portion is in the another predetermined section, and wherein when the holding portion is in the first position and the second unit is in the predetermined position, the second moving force applying portion the second moving force receiving portion are in a state of being spaced from each other, and the first moving force applying portion and the first moving force receiving portion are in a state of being spaced from each other.

(Dependent structure of Structure Oa1, Ob1)

As for dependent structures of Structure Aa1, the dependent structures of Structure Aa1 and the structures of the embodiments may be properly selected and used.

<<STRUCTURE Pa>>

(Structure Pa1)

A cartridge comprising:

a first unit;

a developing member for depositing toner onto a photosensitive member;

a second unit including the developing member and movable between a predetermined position and a retracted position in which at least a part of the developing member is retracted from the predetermined position by moving relative to the first unit;

a holding portion movably supported by the first unit or the second unit and movable between a first position for stably holding the second unit in the retracted position by the first unit, and a second position for stably holding the second unit in the predetermined position by the first unit;

a first moving force receiving portion capable of receiving a first moving force for moving the holding portion from the first position to the second position to move the second unit to the predetermined position, when the second unit is in the retracted position;

a second moving force receiving portion capable of receiving a second moving force for moving the holding portion from the second position to the first position to move the second unit to the retracted position, when the second unit is in the predetermined position; and a coupling member for receiving a driving force for rotationally driving the developing member, wherein when another predetermined tangential line is a tangential line of a surface of the photosensitive member at an intersection, which is more remote from a rotational center of the coupling member, of intersections between a line connecting a rotational center of the coupling member and a rotational center of the photosensitive member and the surface of the photosensitive member, as viewed along a direction of a rotational axis of the developing member, and the cartridge is divided by the another predetermined tangential line into sections, another predetermined section is a section in which the rotational center of the coupling member does not exist, and wherein as viewed along the rotational axis of the developing member when the second unit is in the retracted position, the first moving force receiving portion is in the another predetermined section, and wherein as viewed along the rotational axis of the developing member when the second unit is in the predetermined position, the second moving force receiving portion is in the another predetermined section.

(Dependent structure of Structure Pa1)

As for dependent structures of Structure Pa1, the dependent structures of Structure Aa1 and the structures of the embodiments may be properly selected and used.

<<STRUCTURE Qa>>

(Structure Qa1)

A cartridge comprising:

a first unit;

a developing member for depositing toner onto a photosensitive member;

a second unit including the developing member and movable between a predetermined position and a retracted position in which at least a part of the developing member is retracted from the predetermined position by moving relative to the first unit;

a coupling member for receiving a driving force for rotationally driving the developing member;

a holding portion movably supported by the first unit or the second unit and movable between a first position for stably holding the second unit in the retracted position by the first unit, and a second position for stably holding the second unit in the predetermined position by the first unit; and a first moving force receiving portion capable of receiving a first moving force for moving the holding portion from the first position to the second position to move the second unit to the predetermined position, when the second unit is in the retracted position;

wherein when another predetermined tangential line is a tangential line of a surface of the photosensitive member at an intersection, which is more remote from a rotational center of the coupling member, of intersections between a line connecting a rotational center of the coupling member and a rotational center of the photosensitive member and the surface of the photosensitive member, as viewed along a direction of a rotational axis of the developing member, and the cartridge is divided by the another predetermined tangential line into sections, another predetermined section is a section in which the rotational center of the coupling member does not exist, and wherein as viewed along the rotational axis of the developing member when the second unit is in the retracted position, the first moving force receiving portion is in the another predetermined section, and wherein the first moving force receiving portion is provided on a projected portion projected from second unit at least in the direction, as is viewed along the rotational axis of the developing member.

(Dependent Structure of Structure Qa1)

As for dependent structures of Structure Qa1, the dependent structures of Structure Aa1 and the structures of the embodiments may be properly selected and used.

<<STRUCTURE Ra>>

(Structure Ra1)

A cartridge comprising:

a first unit;

a developing member for depositing toner onto a photosensitive member;

a second unit including the developing member and movable between a predetermined position and a retracted position in which at least a part of the developing member is retracted from the predetermined position by moving relative to the first unit;

a coupling member for receiving a driving force for rotationally driving the developing member;

a holding portion movably supported by the first unit or the second unit and movable between first position for stably holding the second unit by the first unit in the retracted position, and a third position four stably holding the second unit by the first unit in the predetermined position; and a first moving force receiving portion capable of receiving a first moving force for moving the holding portion from the first position to the second position to move the second unit to the predetermined position, when the second unit is in the retracted position, wherein the first moving force receiving portion is movable between a stand-by position in the operating position where the first moving force receiving portion is projected more from the second unit than in the stand-by position, by movement thereof in a predetermined direction, wherein when the second unit is in the retracted position and the first moving force receiving portion is in the operating position, the first moving force receiving portion is capable of moving the holding portion from the first position to the second position by movement thereof in the first direction crossing with the predetermined direction by receiving a first moving force, and wherein when another predetermined tangential line is a tangential line of a surface of the photosensitive member at an intersection, which is more remote from a rotational center of the coupling member, of intersections between a line connecting a rotational center of the coupling member and a rotational center of the photosensitive member and the surface of the photosensitive member, as viewed along a direction of a rotational axis of the developing member, and the cartridge is divided by the another predetermined tangential line into sections, another predetermined section is a section in which the rotational center of the coupling member does not exist, and wherein as viewed along the rotational axis of the developing member when the second unit is in the retracted position and the first moving force receiving portion is in the operating position, the first moving force receiving portion is in the another predetermined section.

(Dependent Structure of Structure Ra1)

As for dependent structures of Structure Ra1, the dependent structures of Structure Aa1 and the structures of the embodiments may be properly selected and used.

<<STRUCTURE Sa>>

(Structure Sa1)

A cartridge mountable to a main assembly of an image forming apparatus, the image forming apparatus including an engaged portion, a contact force applying portion and a spacing force applying portion, the cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a holding portion, provided on the second unit, for holding the second unit in the spaced position by engagement with the engaged portion;

a contact force receiving portion for receiving, from the contact force applying portion, a contact force for disconnecting engagement between the holding portion and the engaged portion and for moving the second unit to the developing position; and a spacing force receiving portion for receiving, from the spacing force applying portion, a spacing force for moving the second unit to the retracted position and for engaging the holding portion with the main assembly of the apparatus.

A cartridge according to Structure Sa1, wherein the second unit is provided with a second frame rotatably supporting the developing member.

(Structure Sa3)

A cartridge according to Structure Sa2, wherein the contact force receiving portion is provided on the second frame.

(Structure Sa4)

A cartridge according to Structures Sa2 or 11, wherein the spacing force receiving portion is provided on the second frame.

(Structure Sa5)

A cartridge according to any one of Structures Sa2-4, wherein the holding portion is projected from the second unit in a direction crossing with a rotational axis of the developing member.

(Structure Sa6)

A cartridge according to Structure Sa5, wherein the holding portion is projected from the second unit in a direction away from the first unit.

(Structure Sa7)

A cartridge according to Structure Sa5, wherein the holding portion is projected from the second unit in a direction away from the photosensitive member.

(Structure Sa8)

A cartridge according to Structure Sa5, wherein the holding portion projects from the second unit in a direction in parallel with the rotational axis of the developing member.

(Structure Sa9)

A cartridge according to Structure Sa2, wherein the holding portion is movably supported by the second frame.

(Structure Sa10)

A cartridge according to Structure Sa9, wherein the holding portion is rotatably supported by the second frame.

(Structure Sa11)

A cartridge according to Structure Sa9 or 10, further comprising an urging member for urging the holding portion.

(Structure Sa12)

A cartridge according to any one of Structures Sa9-11, wherein the holding portion is provided with an elastic portion.

(Structure Sa13)

A cartridge according to Structure Sa2, wherein the holding portion and the elastic portion are integrally formed with the second frame.

(Structure Sa14)

A cartridge according to any one of Structures Sa1-13, wherein the main assembly includes a tray which is movable in the state of carrying the cartridge, and the engaged portion is provided in the tray.

(Structure Sa15)

A cartridge according to Structure Sa, wherein when the second unit is in the spaced position, a space is capable of being formed between the contact force receiving portion and the spacing force receiving portion, and wherein as viewed along the direction of the rotational axis of the developing member in a state in which the space is formed, the contact force receiving portion is closer to the rotational axis of the photosensitive member than the spacing force receiving portion.

(Structure Sa16)

A cartridge according to Structure Sa, wherein as viewed in an axial direction of the developing member in a state in which the space is formed, the contact force receiving portion and the spacing force receiving portion are opposed to each other with the space therebetween.

(Other Dependent Structures of Structure Sa1)

As for dependent structures of Structure Sa1, the dependent structures of Structure Aa1 and the structures of the embodiments may be properly selected and used.

<<STRUCTURE Ta, Tb>>

(Structure Ta1)

A cartridge comprising:
- a photosensitive member;
- a charging member for charging the photosensitive member;
- a first unit including the photosensitive member and the charging member;
- a developing member for depositing toner onto the photosensitive member;
- a developing device frame rotatably supporting the developing member;
- a second unit including the developing member and the developing device frame and movable between the developing position in which toner is capable of being deposited from the developing member onto the photosensitive member and a spaced position in which at least a part of the developing member is away from the photosensitive member, by movement thereof relative to the first unit;
- a projected portion provided projected from the developing device frame and movable relative to the developing device frame; and
- a contact force receiving portion for receiving, from the contact force applying portion, a contact force for moving the second unit to the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein as viewed along the rotational axis of the developing member when the second unit is in the spaced position, the contact force receiving portion is in the predetermined section.

(Structure Tb1)

A cartridge comprising:
- a photosensitive member;
- a charging member for charging the photosensitive member;
- a first unit including the photosensitive member and the charging member;
- a developing member for depositing toner onto the photosensitive member;
- a developing device frame rotatably supporting the developing member;
- a second unit including the developing member and the developing device frame and movable between the developing position in which toner is capable of being deposited from the developing member onto the photosensitive member and a spaced position in which at least a part of the developing member is away from the photosensitive member, by movement thereof relative to the first unit;
- a projected portion provided projected from the developing device frame and movable relative to the developing device frame; and
- a spacing force receiving portion for receiving, from the spacing force applying portion, a spacing force for engaging the holding portion with the main assembly of the apparatus, when the second unit is in the developing position, wherein when a predetermined tangential line is a tangential line of a surface of the photosensitive member at an intersection, which is more remote from a rotational center of the charging member, of intersections between a line connecting a rotational center of the charging member and a rotational center of the photosensitive member and the surface of the photosensitive member, as viewed along a direction of a rotational axis of the developing member, and the cartridge is divided by the predetermined tangential line into sections, a predetermined section is a section in which the rotational center of the charging member does not exist, and wherein the spacing force receiving portion is disposed in the predetermined section as viewed along the direction of the rotational axis of the developing member, when the second unit is in the developing position.

(Dependent Structure of Structures Ta1, Tb1)

As for dependent structures of Structures Ta1, Tb1, the dependent structures of Structure Aa1 and the structures of the embodiments may be properly selected and used.

<<STRUCTURE Ua>>

(Structure Ua1)

A cartridge comprising:

a photosensitive member;

a charging member for charging the photosensitive member;

a first unit including the photosensitive member and the charging member;

a developing member for depositing toner onto the photosensitive member;

a coupling member for receiving a driving force for rotationally driving the developing member;

a second unit including the developing member and movable between a developing position in which the toner is capable of being deposited onto the photosensitive member from the developing member and a spaced position in which at least a part of the developing member is spaced from the photosensitive member;

a holding portion movably supported by the first unit or the second unit and movable between a first position for stably holding the second unit in the spaced position by the first unit and a second position for stably holding a second unit in the developing position by the first unit; and a movable member movable relative to the second unit, the movable member being provided with a spacing force receiving portion for receiving a spacing force for moving the holding portion from the second position toward the first position to move the second unit to the spaced position and being provided with a pressing portion capable of pressing the second unit, wherein when the second unit is in the contact position, the movable member is capable of taking a transmission enabled state in which a force received by the spacing force receiving portion is capable of being transmitted to the pressing portion to move the second unit, and a transmission disabled state in which the force received by the spacing force receiving portion is not transmitted to the pressing portion.

(Dependent structure of Structure Ua1)

As for dependent structures of Structure Ua1, the dependent structures of Structure Aa1 and the structures of the embodiments may be properly selected and used.

<<STRUCTURE Va, Vb>>

(Structure Va1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a coupling member for receiving a driving force for rotating the developing member;

a holding portion movably supported by the first unit or the second unit and movable between a restriction position for restricting movement of the second unit, and a permitting position for permitting movement of the second unit from the spaced position to the developing position; and a spacing force receiving portion for receiving a spacing force for moving the holding portion from the restriction position to the permitting position to move the second unit to the spaced position, when the second unit is in the developing position.

(Structure Vb1)

A cartridge comprising:

a photosensitive member;

a charging member for charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a coupling member for receiving a driving force for rotating the developing member;

a holding portion movably supported by the first unit or the second unit and movable between a restriction position for restricting movement of the second unit, and a permitting position for permitting movement of the second unit from the spaced position to the developing position;

a contact force receiving portion for receiving a contact force for moving the holding portion from the permitting position to the restriction position to move the second unit to the developing position, when the second unit is in the spaced position.

(Dependent Structure of Structures Va1, Vb1)

As for dependent structures of Structures Va1, Vb1, the dependent structures of Structure Aa1 and the structures of the embodiments may be properly selected and used.

INDUSTRIAL APPLICABILITY

A cartridge and an electrophotographic image formation device including a first unit having a photosensitive member, and a second unit including a developing member for depositing toner onto the photosensitive member and the movable between a developing position and a spaced position is provided.

The present invention is not restricted to the foregoing embodiments, but may be changed and modified without departing from the spirit of the present invention. therefore, the following claims are attached hereto to make public the scope of the present invention.

This application claims the Convention Priorities from Japanese patent applications 2019-050356 filed Mar. 18, 2019 and 2019-050357 filed Mar. 18, 2019, all disclosure of which are incorporated herein.

The invention claimed is:

1. A cartridge comprising:

a photosensitive member;

a charging member capable of charging the photosensitive member;

a first unit including the photosensitive member and the charging member;

a developing member for depositing toner onto the photosensitive member;

a second unit including the developing member and movable between a developing position in which the toner is capable of being deposited onto the photosensitive member from the developing member and a spaced position in which at least a part of the developing member is spaced from the photosensitive member;

a contact force receiving portion for receiving a contact force for moving the second unit to the developing position when the second unit is in the spaced position; and a spacing force receiving portion for receiving a spacing force for moving the second unit to the spaced position when the second unit is in the developing position, wherein, as viewed along a direction of a rotational axis of the developing member when the second unit is in the spaced position, the cartridge is divided into a first section and a second section by a line that (i) is tangential to a surface of the photosensitive member at a side of the photosensitive member that is opposite to a side of the photosensitive member that is adjacent to the charging roller and (ii) intersects a line that extends through a rotational axis of the photosensitive member and a rotational axis of the charging roller, with the rotational axis of the photosensitive member and the rotational axis of the charging roller being in the first section and the contact force receiving portion and the spacing force receiving portion being in the second section, wherein, when the second unit is in the spaced position, a space is capable of being formed between the contact force receiving portion and the spacing force receiving portion, and wherein, as seen in a direction along a rotational axis of the developing member in a state that the space between the contact force receiving portion and the spacing force receiving portion is formed, the contact force receiving portion disposed at a position closer to the rotational axis of the photosensitive member than the spacing force receiving portion is to the rotational axis of the photosensitive member.

2. A cartridge according to claim 1, further comprising a holding portion movably supported by the first unit or the second unit and movable between a first position for stably holding the second unit in the spaced position by the first unit and a second position for stably holding the second unit in the developing position by the first unit.

3. A cartridge according to claim 2, wherein, when the holding portion is in the first position, the holding portion is capable of restricting movement of the second unit from the spaced position to the developing position, and, when the holding portion is in the second position, the holding portion permits movement of the second unit from the spaced position to the developing position.

4. A cartridge according to claim 2, further comprising a holding member including the holding portion, wherein the second unit includes a frame rotatably supporting the developing member, and wherein the contact force receiving portion is provided on the holding member, and the spacing force receiving portion is provided on the frame.

5. A cartridge according to claim 2, further comprising a holding member including the holding portion, wherein the contact force receiving portion is provided on the holding member so as to be movable relative to the holding member.

6. A cartridge according to claim 5, wherein the spacing force receiving portion is provided on the holding member so as to be movable relative to the holding member.

7. A cartridge according to claim 2, further comprising a holding member including the holding portion, wherein the spacing force receiving portion is provided on the holding member so as to be movable relative to the holding member.

8. A cartridge according to claim 1, further comprising a lever movable relative to the second unit between a first position for stably holding the second unit in the spaced position by the first unit and a second position for stably holding a second unit in the developing position by the first unit, wherein, when lever is in the second position, the movement of the second unit from the developing position to the spaced position is restricted, and when the lever is in the first position, the movement of the second unit from the spaced position to the developing position is permitted.

9. A cartridge according to claim 8, wherein the lever is provided with an urging portion, and wherein, when the lever is in the second position, the movement of the second unit from the developing position to the spaced position is restricted by urging the second unit in a direction from the spaced position toward the developing position by the urging portion.

10. A cartridge according to claim 9, wherein, when the lever is in the first position, the second unit is permitted to move to the spaced position by the urging portion not urging the second unit in the direction from the spaced position to the developing position.

11. A cartridge according to claim 9, wherein, when the lever is in the first position, the urging portion urges the second unit in the direction from the spaced position toward the developing position with an urging force that is less than that when the lever is in the second position.

12. A cartridge according to claim 8, further comprising a second unit urging member for urging the second unit in a direction from the developing position toward the spaced position.

13. A cartridge according to claim 12, wherein the second unit urging member includes an elastic member.

14. A cartridge according to claim 13, wherein the elastic member includes a spring.

15. A cartridge according to claim 2, wherein the holding portion is provided between the first unit and the second unit, and wherein, when the holding portion is in the first position, the holding portion is capable of restricting movement of the second unit from the spaced position to the developing position, and when the holding portion is in the second position, the holding portion is capable of restricting movement of the second unit from the developing position to the spaced position.

16. A cartridge according to claim 15, wherein the holding portion is provided with an urging portion, and when the holding portion is in the first position, movement of the second unit from the spaced position to the developing position is restricted by urging the second unit in a direction from the developing position toward the spaced position by the urging portion, and when the holding portion is in the second position, movement of the second unit from the developing position to the spaced position is restricted by urging the second unit in a direction from the spaced position toward the developing position by the urging portion.

17. A cartridge according to claim 3, further comprising:
- a first positioning portion provided in the first unit to position the second unit in the spaced position;
- a second positioning portion provided in the first unit to position the second unit in the developing position; and
- an urging portion for urging the second unit toward the first positioning portion and the second positioning portion,
- wherein, when the holding portion is in the first position, the second unit is held in the spaced position in a state that the second unit is urged toward the first positioning portion by the urging portion, and, when the holding portion is in the second position, the second unit is held in the developing position in the state that the second unit is urged toward the second positioning portion by the urging portion.

18. A cartridge according to claim 17, further comprising a holding member including the holding portion,
- wherein the second unit includes a frame rotatably supporting the developing member.

19. A cartridge according to claim 3, further comprising a first positioning portion provided in the first unit to position the second unit in the spaced position, and a second positioning portion provided in the first unit to position the second unit in the developing position,
- wherein, in a state in which the cartridge is oriented such that the photosensitive member is in a lower position, (i) when the holding portion is in the first position, the second unit is supported by the first unit in a state that the second unit is in the spaced position while being urged toward the first positioning portion by a weight thereof, and (ii) when holding portion is in the second position, the second unit is supported by the first unit in a state that the second unit is in the developing position while being urged toward the second positioning portion by a weight thereof.

20. A cartridge according to claim 19, further comprising a holding member including the holding portion,
- wherein the second unit includes a frame rotatably supporting the developing member.

21. A cartridge according to claim 3, wherein, when the holding portion is in the first position, the holding portion restricts movement of the second unit from the spaced position to the developing position by contacting the first unit and the second unit.

22. A cartridge according to claim 21, further comprising a holding portion urging member for urging the holding portion from the second position toward the first position.

23. A cartridge according to claim 22, wherein the holding portion urging member includes an elastic member.

24. A cartridge according to claim 23, wherein the elastic member includes a spring.

25. A cartridge according to claim 21, further comprising a holding portion urging member for urging the holding portion in a direction from the second position toward the first position when the holding portion is in the first position, and for urging the holding portion in a direction from the first position toward the second position when the holding portion is in the second position.

26. A cartridge according to claim 25, wherein the holding portion urging member includes an elastic member.

27. A cartridge according to claim 26, wherein the elastic member includes a spring.

28. A cartridge according to claim 21, further comprising a holding member including the holding portion,
- wherein the second unit is provided with a frame rotatably supporting the developing member.

29. A cartridge according to claim 28, wherein the contact force receiving portion is provided on the frame.

30. A cartridge according to claim 29, wherein the spacing force receiving portion is provided on the frame.

31. A cartridge according to claim 28, wherein the holding member is movably supported by the frame.

32. A cartridge according to claim 31, wherein the holding member is rotatably supported by the frame.

33. A cartridge according to claim 31, wherein the first unit includes a first frame rotatably supporting photosensitive member and the frame rotatably supporting the developing member is a second frame, and the second unit is movable between the spaced position and the developing position by rotation of the second frame relative to the first frame, and
- wherein the holding member is disposed on an opposite side of the contact force receiving portion with respect to a rotational axis of the second frame.

34. A cartridge according to claim 28, wherein the first unit includes a first frame rotatably supporting the photosensitive member and the frame rotatably supporting the developing member is a second frame, and the holding member is movably supported by the first frame.

35. A cartridge according to claim 28, wherein the first unit includes a first frame rotatably supporting the photosensitive member and the frame rotatably supporting the developing member is a second frame, and the holding member is integrally formed with the first frame and/or the second frame, and
- wherein the holding portion is movable between the first position and the second position by deformation of the holding member relative to the first frame and/or the second frame.

36. A cartridge according to claim 28, wherein the contact force receiving portion is provided on the holding member.

37. A cartridge according to claim 36, wherein the spacing force receiving portion is capable of receiving the spacing force to move the holding portion from the second position to the first position to move the second unit to the spaced position.

38. A cartridge according to claim 37, wherein the spacing force receiving portion is provided on the frame.

39. A cartridge according to claim 37, wherein the spacing force receiving portion is provided on the holding member.

40. A cartridge according to claim 1, further comprising a second unit urging member for urging the second unit in a direction from the spaced position toward the developing position.

41. A cartridge according to claim 40, wherein the second unit urging member includes an elastic member.

42. A cartridge according to claim 41, wherein the elastic member includes a spring.

43. A cartridge according to claim 40, further comprising a holding portion urging member for urging the holding portion from the second position toward the first position,
- wherein, when the holding portion is in the first position, the holding portion is capable of restricting movement of the second unit from the spaced position to the developing position against an urging force of the second unit urging member.

44. A cartridge according to claim 1, wherein, as seen in the direction of rotational axis of the developing member in the state that the space is formed, the contact force receiving portion and the spacing force receiving portion are opposed to each other with the space therebetween.

45. A cartridge according to claim 1, wherein when the cartridge is divided into sections by a line connecting the rotational center of the photosensitive member and the rotational center of the developing member as seen in a direction of the rotational axis of the developing member in the state that the second unit is in the spaced position, at least a part of the contact force receiving portion is disposed in a section opposite from the section including the rotational center of the charging member.

46. A cartridge according to claim 1, further comprising a coupling member for receiving a driving force for rotationally driving the developing member.

47. A cartridge according to claim 46, wherein, as viewed along the rotational axis direction of the photosensitive member in a state that the second unit is in the spaced position, when the cartridge is divided into sections by a line connecting the rotational center of the photosensitive member and the rotational center of the developing member, at least a part of the contact force receiving portion is disposed in a section opposite from a section including the coupling member.

48. A cartridge according to claim 46, wherein when another predetermined tangential line is a tangential line of a surface of the developing member at an intersection, which is more remote from a rotational center of the coupling member, of intersections between a line connecting a rotational center of the coupling member and a rotational center of the developing member and the surface of the developing member, as viewed along the direction of the rotational axis of the developing member, and another predetermined section is a section in which the rotational center of the coupling member does not exist when the cartridge is divided into sections by the another predetermined tangent line, and wherein when the second unit is in the spaced position, the contact force receiving portion is disposed in the another section, as viewed along the direction of the rotational axis of the developing member.

49. A cartridge according to claim 48, wherein, as viewed in an axial direction of the developing member, the contact force receiving portion is provided on a projected portion projected from second unit at least in a direction parallel with a line connecting a rotational center of the coupling member and a rotational center of the developing member.

50. A cartridge according to claim 46, further comprising a supply member contactable with the developing member to supply toner to the developing member, wherein in a state that the second unit is in the spaced position, when the cartridge is divided into sections by a line connecting a rotational center of the developing member and a rotational center of the supplying member as viewed along the direction of the rotational axis of the developing member, at least a part of the contact force receiving portion is disposed in a section opposite from a section including the rotational center of the coupling.

51. A cartridge according to claim 46, wherein the contact force receiving portion is disposed on a side in which the coupling member is provided with respect to a direction of the rotational axis of the developing member.

* * * * *